US011932797B2

(12) United States Patent
Hirschmann et al.

(10) Patent No.: US 11,932,797 B2
(45) Date of Patent: Mar. 19, 2024

(54) LIQUID-CRYSTALLINE MEDIUM

(71) Applicant: Merck Patent GmbH, Darmstadt (DE)

(72) Inventors: Harald Hirschmann, Darmstadt (DE); Monika Bauer, Seligenstadt (DE); Martina Windhorst, Muenster (DE); Marcus Reuter, Darmstadt (DE); Kristin Weiss, Gross-Zimmern (DE)

(73) Assignee: MERCK PATENT GMBH, Darmstadt (DE)

(*) Notice: Subject to any disclaimer, the term of this patent is extended or adjusted under 35 U.S.C. 154(b) by 0 days.

(21) Appl. No.: 17/161,964

(22) Filed: Jan. 29, 2021

(65) Prior Publication Data

US 2022/0325180 A1 Oct. 13, 2022

Related U.S. Application Data

(62) Division of application No. 16/196,488, filed on Nov. 20, 2018, now Pat. No. 11,008,515.

(30) Foreign Application Priority Data

Nov. 24, 2017 (DE) ........................ 102017010883.8
Sep. 28, 2018 (EP) .................................... 18197753

(51) Int. Cl.
*G02F 1/1333* (2006.01)
*C09K 19/30* (2006.01)
(Continued)

(52) U.S. Cl.
CPC .......... *C09K 19/3491* (2013.01); *C09K 19/30* (2013.01); *C09K 19/3001* (2013.01);
(Continued)

(58) Field of Classification Search
CPC ................ C09K 19/3491; C09K 19/30; C09K 19/3001; C09K 19/3003; C09K 19/3066;
(Continued)

(56) References Cited

U.S. PATENT DOCUMENTS 6,017,469 A 1/2000 Reiffenrath et al.
8,277,684 B2 10/2012 Klasen-Memmer et al.
(Continued)

FOREIGN PATENT DOCUMENTS

CN 1147829 A 4/1997
CN 101790574 A 7/2010
(Continued)

OTHER PUBLICATIONS

Search report in corresponding EP18207798.2 dated Apr. 9, 2019 (pp. 1-13).

(Continued)

*Primary Examiner* — Geraldina Visconti
(74) *Attorney, Agent, or Firm* — Millen, White, Zelano & Branigan, P.C.; Brion P. Heaney

(57) ABSTRACT

A liquid-crystalline medium which comprises at least one compound selected from the group of compounds of the formulae IA to IH,

IA

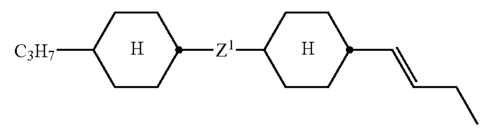

IB

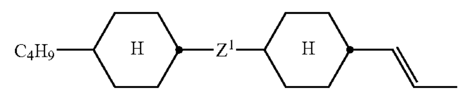

IC

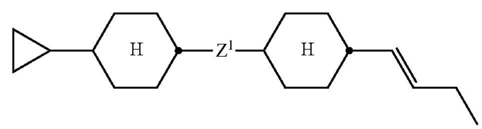

ID

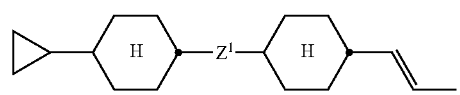

IE

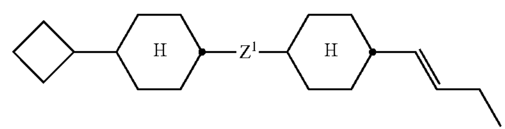

IF

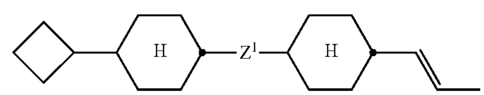

IG

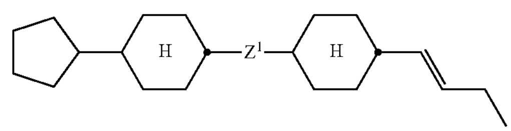

IH

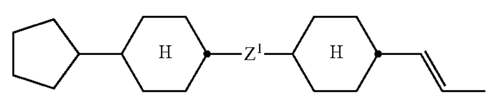

in which $Z^1$ denotes a single bond, —$CH_2CH_2$—, —CH═CH—, —$CH_2O$—, —$OCH_2$—, —$CF_2O$—, —$OCF_2$—, —COO—, —OCO—, —$C_2F_4$—, —$(CH_2)_4$—, —CHFCHF—, —$CF_2CH_2$—, —$CH_2CF_2$—, —C≡C—, —CF═CF—, —CH═CHCHO— or —$CH_2CF_2O$—, and the use thereof for an active-matrix display, in particular based on the VA, PSA, PS-VA, PALC, FFS, PS-FFS, SA-VA, PS-IPS or IPS effect.

34 Claims, No Drawings

(51) Int. Cl.

| | |
|---|---|
| ***C09K 19/32*** | (2006.01) |
| ***C09K 19/34*** | (2006.01) |
| ***C09K 19/54*** | (2006.01) |
| ***C09K 19/56*** | (2006.01) |
| ***C09K 19/58*** | (2006.01) |
| *C09K 19/04* | (2006.01) |
| *C09K 19/12* | (2006.01) |
| *G02F 1/1362* | (2006.01) |

(52) U.S. Cl.

CPC ...... *C09K 19/3003* (2013.01); *C09K 19/3066* (2013.01); *C09K 19/3068* (2013.01); *C09K 19/3098* (2013.01); *C09K 19/32* (2013.01); *C09K 19/322* (2013.01); *C09K 19/3402* (2013.01); *C09K 19/3405* (2013.01); *C09K 19/542* (2013.01); *C09K 19/56* (2013.01); *C09K 19/58* (2013.01); *C09K 19/586* (2013.01); *C09K 19/588* (2013.01); *C09K 2019/0411* (2013.01); *C09K 2019/0466* (2013.01); *C09K 2019/123* (2013.01); *C09K 2019/3004* (2013.01); *C09K 2019/3009* (2013.01); *C09K 2019/301* (2013.01); *C09K 2019/3015* (2013.01); *C09K 2019/3016* (2013.01); *C09K 2019/3021* (2013.01); *C09K 2019/3027* (2013.01); *C09K 2019/303* (2013.01); *C09K 2019/305* (2013.01); *C09K 2019/3071* (2013.01); *C09K 2019/3078* (2013.01); *C09K 2019/3096* (2013.01); *C09K 2019/327* (2013.01); *C09K 2019/3408* (2013.01); *C09K 2019/3422* (2013.01); *C09K 2019/3425* (2013.01); *C09K 2019/548* (2013.01); *G02F 1/1362* (2013.01)

(58) Field of Classification Search

CPC ............ C09K 19/3068; C09K 19/3098; C09K 19/32; C09K 19/322; C09K 19/3402; C09K 19/3405; C09K 19/542; C09K 19/56; C09K 19/58; C09K 19/586; C09K 19/588; C09K 2019/0411; C09K 2019/0466; C09K 2019/123; C09K 2019/3004; C09K 2019/3009; C09K 2019/301; C09K 2019/3015; C09K 2019/3016; C09K 2019/3021; C09K 2019/3027; C09K 2019/303; C09K 2019/305; C09K 2019/3071; C09K 2019/3078; C09K 2019/3096; C09K 2019/327; C09K 2019/3408; C09K 2019/3422; C09K 2019/3425; C09K 2019/548; G02F 1/1362; G02F 1/1333

See application file for complete search history.

(56) References Cited

U.S. PATENT DOCUMENTS

| | | | | |
|---|---|---|---|---|
| 8,999,459 | B2 | 4/2015 | Bernatz et al. | |
| 9,499,745 | B2 | 11/2016 | Yanai et al. | |
| 9,994,768 | B2 | 6/2018 | Furusato et al. | |
| 10,214,691 | B2 * | 2/2019 | Hirschmann | C09K 19/3405 |
| 11,008,515 | B2 * | 5/2021 | Hirschmann | C09K 19/3001 |
| 2015/0048276 | A1 | 2/2015 | Goebel et al. | |
| 2015/0076405 | A1 | 3/2015 | Han et al. | |
| 2016/0002532 | A1 | 1/2016 | Saito et al. | |
| 2016/0264865 | A1 * | 9/2016 | Hirschmann | C09K 19/3066 |
| 2017/0233651 | A1 | 8/2017 | Han et al. | |

FOREIGN PATENT DOCUMENTS

| | | | |
|---|---|---|---|
| CN | 101796162 | A | 8/2010 |
| CN | 104650928 | A | 5/2015 |
| CN | 104837955 | A | 8/2015 |
| CN | 105722949 | A | 6/2016 |
| CN | 105969402 | A | 9/2016 |
| DE | 102008036808 | A1 | 2/2009 |
| DE | 102008035718 | A1 | 3/2009 |
| EP | 2930223 | B1 | 5/2017 |
| EP | 2837671 | B1 | 10/2017 |
| EP | 3070147 | B1 | 1/2019 |

OTHER PUBLICATIONS

Search report in corresponding ROC (Taiwan) Patent Application No. 107141923 dated May 5, 2022 (pp. 1-13).

Notice of Reasons for Rejection in corresponding JP Patent Application No. 2018-218822 dated Oct. 4, 2022 (pp. 1-6).

Office Action in corresponding CN Application No. 201811405005.7 dated Mar. 15, 2023 (pp. 1-12).

* cited by examiner

LIQUID-CRYSTALLINE MEDIUM

The invention includes a liquid-crystalline medium which comprises at least one compound selected from the group of the compounds of the formulae IA to IH,

IA

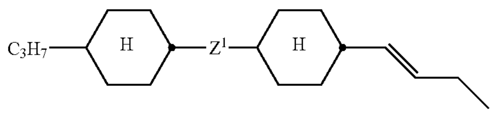

IB

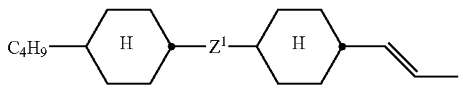

IC

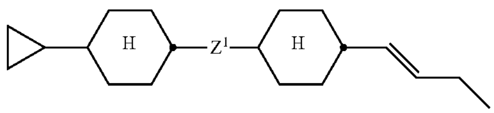

ID

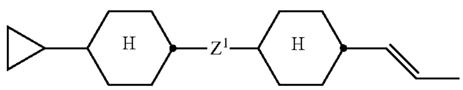

IE

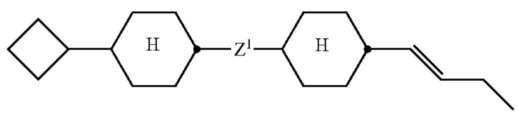

IF

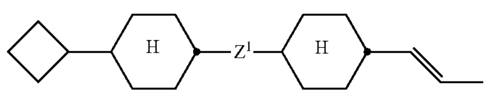

IG

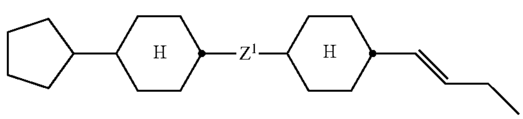

IH

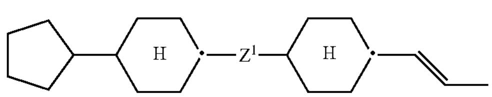

in which $Z^1$ denotes a single bond, —$CH_2CH_2$—, —CH═CH—, —$CH_2O$—, —$OCH_2$—, —$CF_2O$—, —$OCF_2$—, —COO—, —OCO—, —$C_2F_4$—, —$(CH_2)_4$—, —CHFCHF—, —$CF_2CH_2$—, —$CH_2CF_2$—, —C≡C—, —CF═CF—, —CH═CHCHO— or —$CH_2CF_2O$—.

Media of this type can be used, in particular, for electro-optical displays having active-matrix addressing based on the ECB effect and for IPS (in-plane switching) displays or FFS (fringe field switching) displays.

The principle of electrically controlled birefringence, the ECB effect or also DAP (deformation of aligned phases) effect, was described for the first time in 1971 (M. F. Schieckel and K. Fahrenschon, "Deformation of nematic liquid crystals with vertical orientation in electrical fields", Appl. Phys. Lett. 19 (1971), 3912). This was followed by papers by J. F. Kahn (Appl. Phys. Lett. 20 (1972), 1193) and G. Labrunie and J. Robert (J. Appl. Phys. 44 (1973), 4869).

The papers by J. Robert and F. Clerc (SID 80 Digest Techn. Papers (1980), 30), J. Duchene (Displays 7 (1986), 3) and H. Schad (SID 82 Digest Techn. Papers (1982), 244) showed that liquid-crystalline phases must have high values for the ratio of the elastic constants $K_3/K_1$, high values for the optical anisotropy $\Delta n$ and values for the dielectric anisotropy of $\Delta\varepsilon \leq -0.5$ in order to be suitable for use in high-information display elements based on the ECB effect. Electro-optical display elements based on the ECB effect have a homeotropic edge alignment (VA technology=vertically aligned). Dielectrically negative liquid-crystal media can also be used in displays which use the so-called IPS or FFS effect.

Displays which use the ECB effect, as so-called VAN (vertically aligned nematic) displays, for example in the MVA (multi-domain vertical alignment, for example: Yoshide, H. et al., paper 3.1: "MVA LCD for Notebook or Mobile PCs . . . ", SID 2004 International Symposium, Digest of Technical Papers, XXXV, Book I, pp. 6 to 9, and Liu, C. T. et al., paper 15.1: "A 46-inch TFT-LCD HDTV Technology . . . ", SID 2004 International Symposium, Digest of Technical Papers, XXXV, Book II, pp. 750 to 753), PVA (patterned vertical alignment, for example: Kim, Sang Soo, paper 15.4: "Super PVA Sets New State-of-the-Art for LCD-TV", SID 2004 International Symposium, Digest of Technical Papers, XXXV, Book II, pp. 760 to 763), ASV (advanced super view, for example: Shigeta, Mitzuhiro and Fukuoka, Hirofumi, paper 15.2: "Development of High Quality LCDTV", SID 2004 International Symposium, Digest of Technical Papers, XXXV, Book II, pp. 754 to 757) modes, have established themselves as one of the three more recent types of liquid-crystal display that are currently the most important, in particular for television applications, besides IPS (in-plane switching) displays (for example: Yeo, S. D., paper 15.3: "An LC Display for the TV Application", SID 2004 International Symposium, Digest of Technical Papers, XXXV, Book II, pp. 758 & 759) and the long-known TN (twisted nematic) displays. The technologies are compared in general form, for example, in Souk, Jun, SID Seminar 2004, seminar M-6: "Recent Advances in LCD Technology", Seminar Lecture Notes, M-6/1 to M-6/26, and Miller, Ian, SID Seminar 2004, seminar M-7: "LCD-Television", Seminar Lecture Notes, M-7/1 to M-7/32. Although the response times of modern ECB displays have already been significantly improved by addressing methods with overdrive, for example: Kim, Hyeon Kyeong et al., paper 9.1: "A 57-in. Wide UXGA TFT-LCD for HDTV Application", SID 2004 International Symposium, Digest of Technical Papers, XXXV, Book I, pp. 106 to 109, the achievement of video-compatible response times, in particular on switching of grey shades, is still a problem which has not yet been satisfactorily solved.

Industrial application of this effect in electro-optical display elements requires LC phases, which have to satisfy a multiplicity of requirements. Particularly important here are chemical resistance to moisture, air and physical influences, such as heat, infrared, visible and ultraviolet radiation and direct and alternating electric fields.

Furthermore, industrially usable LC phases are required to have a liquid-crystalline mesophase in a suitable temperature range and low viscosity. None of the hitherto-disclosed series of compounds having a liquid-crystalline mesophase includes a single compound which meets all these requirements. Mixtures of two to 25, preferably three to 18, compounds are therefore generally prepared in order to obtain substances which can be used as LC phases. However, it has not been possible to prepare optimum phases easily in this way since no liquid-crystal materials having significantly negative dielectric anisotropy and adequate long-term stability were hitherto available.

Matrix liquid-crystal displays (MLC displays) are known. Non-linear elements which can be used for individual switching of the individual pixels are, for example, active elements (i.e. transistors). The term “active matrix” is then used, where a distinction can be made between two types:

1. MOS (metal oxide semiconductor) transistors on a silicon wafer as substrate
2. thin-film transistors (TFTs) on a glass plate as substrate.

In the case of type 1, the electro-optical effect used is usually dynamic scattering or the guest-host effect. The use of single-crystal silicon as substrate material restricts the display size, since even modular assembly of various part-displays results in problems at the joints.

In the case of the more promising type 2, which is preferred, the electro-optical effect used is usually the TN effect.

A distinction is made between two technologies: TFTs comprising compound semiconductors, such as, for example, CdSe, or TFTs based on polycrystalline or amorphous silicon. The latter technology is being worked on intensively worldwide.

The TFT matrix is applied to the inside of one glass plate of the display, while the other glass plate carries the transparent counterelectrode on its inside. Compared with the size of the pixel electrode, the TFT is very small and has virtually no adverse effect on the image. This technology can also be extended to fully colour-capable displays, in which a mosaic of red, green and blue filters is arranged in such a way that a filter element is opposite each switchable pixel.

The term MLC displays here encompasses any matrix display with integrated non-linear elements, i.e. besides the active matrix, also displays with passive elements, such as varistors or diodes (MIM=metal-insulator-metal).

MLC displays of this type are particularly suitable for TV applications (for example pocket TVs) or for high-information displays in automobile or aircraft construction. Besides problems regarding the angle dependence of the contrast and the response times, difficulties also arise in MLC displays due to insufficiently high specific resistance of the liquid-crystal mixtures [TOGASHI, S., SEKIGUCHI, K., TANABE, H., YAMAMOTO, E., SORIMACHI, K., TAJIMA, E., WATANABE, H., SHIMIZU, H., Proc. Eurodisplay 84, September 1984: A 210-288 Matrix LCD Controlled by Double Stage Diode Rings, pp. 141 ff., Paris; STROMER, M., Proc. Eurodisplay 84, September 1984: Design of Thin Film Transistors for Matrix Addressing of Television Liquid Crystal Displays, pp. 145 ff., Paris]. With decreasing resistance, the contrast of an MLC display deteriorates. Since the specific resistance of the liquid-crystal mixture generally drops over the life of an MLC display owing to interaction with the inside surfaces of the display, a high (initial) resistance is very important for displays that have to have acceptable resistance values over along operating period.

There is still a great demand for MLC displays having very high specific resistance at the same time as a large working-temperature range, short response times and a low threshold voltage, with the aid of which various grey shades can be generated.

The disadvantage of the MLC-TN displays frequently used is due to their comparatively low contrast, the relatively high viewing-angle dependence and the difficulty of generating grey shades in these displays.

VA displays have significantly better viewing-angle dependencies and are therefore principally used for televisions and monitors. However, there continues to be a need to improve the response times here. However, properties such as, for example, the low-temperature stability and the reliability must not be impaired at the same time.

The invention is based on an object, for example, of providing liquid-crystal mixtures, in particular for monitor and TV applications, based on the ECB effect or on the IPS or FFS effect, which do not have the disadvantages indicated above, or only do so to a reduced extent. In particular, it must be ensured for monitors and televisions that they also work at extremely high and extremely low temperatures and at the same time have short response times and at the same time have an improved reliability behaviour, in particular exhibit no or significantly reduced image sticking after long operating times. Other objectives are described or are apparent from the description herein.

Neutral bicyclic compounds having a terminal double bond, such as, for example, the compound of the formula

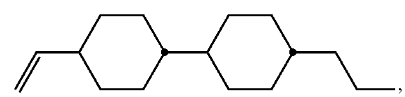

are frequently employed if liquid-crystalline mixtures having fast response times are required. However, compounds of this type have the disadvantage that, in some applications, they lead to an impairment of the display properties, such as, for example, increased occurrence of image sticking.

Compounds of the Formula

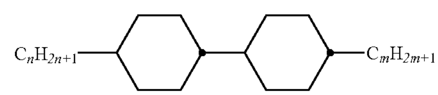

in which n and m each, independently of one another, denote 1, 2, 3, 4, 5 or 6, have the disadvantage that they are generally not soluble in high concentrations in liquid-crystal mixtures, which in turn has an adverse effect on the response time.

An object of the present invention is therefore to find liquid-crystal mixtures which on the one hand have fast response times and on the other hand have good reliability due to the use of neutral compounds which have good solubility in liquid-crystal mixtures.

Surprisingly, it is possible to improve the rotational viscosity values and thus the response times if one or more, preferably at least one or two, compounds of the general formulae IA to IH are used in liquid-crystal mixtures, in particular in LC mixtures having negative dielectric anisotropy Δε, preferably for VA, IPS and FFS displays. With the aid of the compounds of the formulae IA to IH, which contain a non-terminal double bond, it is possible to prepare liquid-crystal mixtures, preferably VA, PS-VA, PSA, IPS and FFS mixtures, which have short response times, at the same time good phase properties and good low-temperature behaviour.

The liquid-crystalline mixtures according to the invention are distinguished, for example, by a very good ratio of the rotational viscosities and the elastic constants, preferably $K_3$. In particular, the reliability is improved. This includes, in particular, ODF mura and also interactions with peripheral materials, such as, for example, the adhesive frame, which is frequently also called “corner mura”. Furthermore, image sticking is minimised.

The invention thus relates to a liquid-crystalline medium which comprises at least one compound of the formula IA, IB, IC, ID, IE, IF, IG and/or IH.

The mixtures according to the invention preferably exhibit very broad nematic phase ranges with clearing points ≥65° C., preferably ≥70° C., in particular ≥75° C., very favourable values of the capacitive threshold, relatively high values of the holding ratio and at the same time very good low-temperature stabilities at −20° C. and −30° C., as well as very low rotational viscosity values and short response times. The mixtures according to the invention are furthermore distinguished by the fact that, in addition to the improvement in the rotational viscosity 71, relatively high values of the elastic constants $K_3$ for improving the response times can be observed. The compounds of the formulae IA to IH are suitable, in particular, for the preparation of liquid-crystalline mixtures having a negative Δε.

Some preferred embodiments of the mixtures according to the invention are indicated below.

In the compounds of the formulae IA to IH, $Z^1$, independently of one another, preferably denotes a single bond.

Preferred compounds of the formulae IA to IH are shown below:

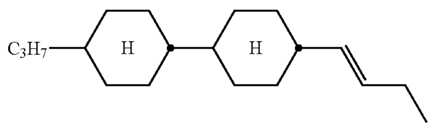

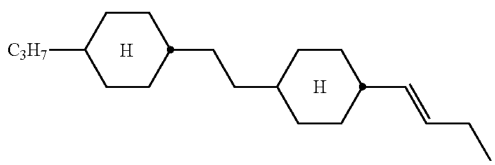

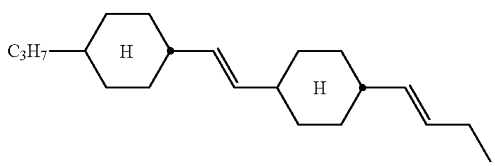

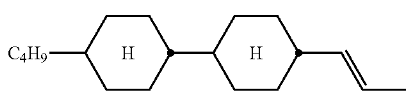

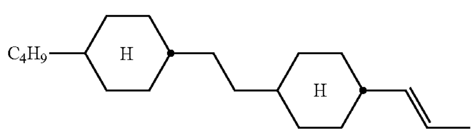

-continued

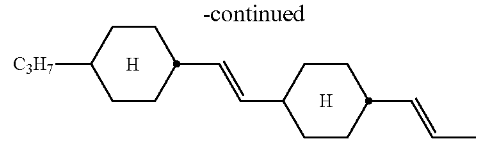

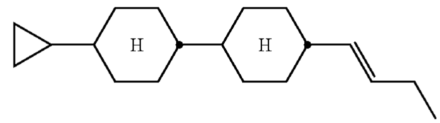

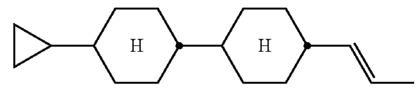

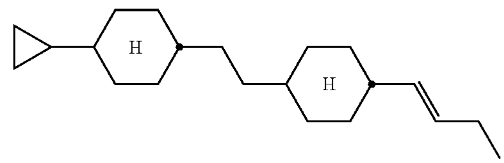

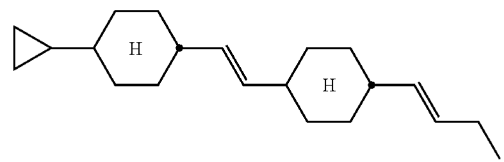

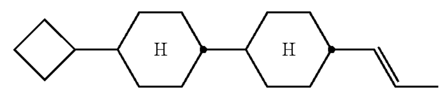

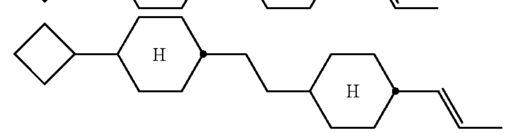

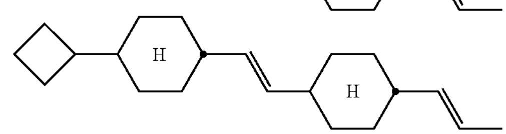

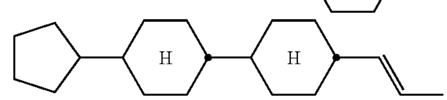

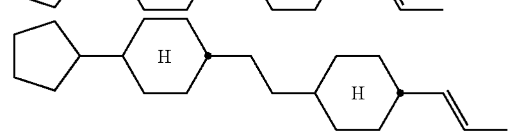

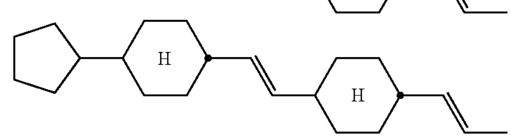

The compounds of the formulae IA to IH are preferably prepared as follows:

Scheme 1

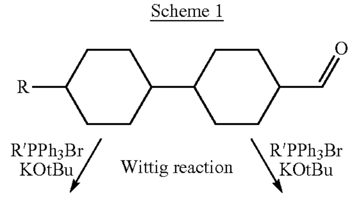

-continued

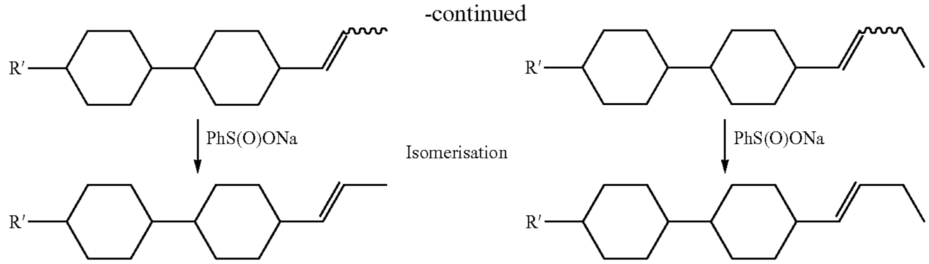

R'═$C_3H$, $C_4H_9$, cyclopropyl, cyclobutyl or cyclopentyl

Particularly preferred compounds are prepared as follows:

Scheme 2

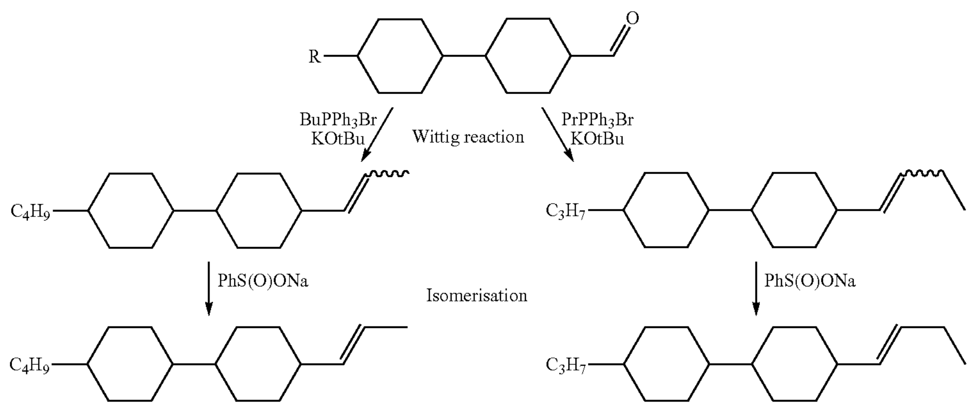

The media according to the invention preferably comprise one or two compounds from the group of the compounds of the formulae IA to IH.

The compounds of the formulae IA to IH are preferably employed in the liquid-crystalline medium in amounts of 1-50% by weight, preferably 5 50% by weight and very particularly preferably 10-50% by weight.

Preferred embodiments of the liquid-crystalline medium according to the invention are indicated below:

a) Liquid-crystalline medium which additionally comprises one or more compounds selected from the group of the compounds of the formulae IIA, IIB and IIC,

IIA

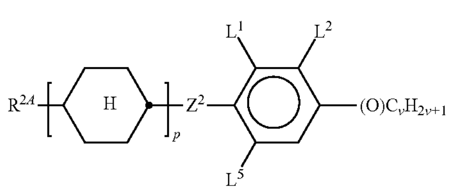

IIB

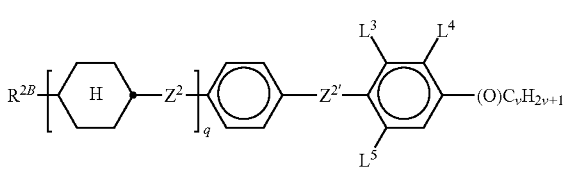

-continued

IIC

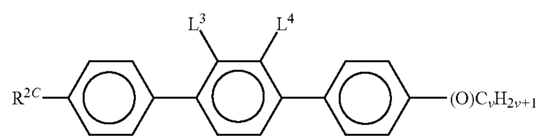

in which $R^{2A}$, $R^{2B}$ and $R^{2C}$ each, independently of one another, denote H, an alkyl or alkenyl radical having up to 15 C atoms which is unsubstituted, monosubstituted by CN or $CF_3$ or at least monosubstituted by halogen, where, in addition, one or more $CH_2$ groups in these radicals may be replaced by —O—, —S—,

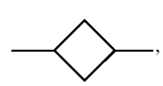

—C≡C—, —$CF_2$O—, —O$CF_2$—, —OC—O— or —OCO— in such a way that O atoms are not linked directly to one another, a cyclopropyl ring, cyclobutyl ring or cyclopentyl ring, $L^{1-4}$ each, independently of one another, denote F, Cl, $CF_3$ or $CHF_2$, $L^5$ denotes H or $CH_3$, $Z^2$ and $Z^Z$ each, independently of one another, denote a single bond, —$CH_2CH_2$—, —CH═CH—, —$CF_2$O—, —$OCF_2$—, —$CH_2$ O—, —$OCH_2$—, —COO—, —OCO—, —$C_2F_4$—, —CF═CF—, —C≡C—, or —CH═$CHCH_2O$—, p denotes 0, 1 or 2, where, if p=0, $Z^2$ denotes a single bond, q denotes 0 or 1, and v denotes 1 to 6.

In the compounds of the formulae IIA and IIB, $Z^2$ may have identical or different meanings. In the compounds of the formula IIB, $Z^2$ and $Z^{2'}$ may have identical or different meanings.

In the compounds of the formulae IIA, IIB and IIC, $R^{2A}$, $R^{2B}$ and $R^{2C}$ each preferably denote alkyl having 1-6 C atoms, in particular $CH_3$, $C_2H_5$, n-$C_3H$, n-$C_4H_9$, n-$C_5H_{11}$, furthermore alkenyl, in particular $CH_2$═CH, $CH_3$CH═CH, $C_2H_5$CH═CH, $C_3H_7$CH═CH In the compounds of the formulae IIA and IIB, $L^1$, $L^2$, $L^3$ and $L^4$ preferably denote $L^1$=$L^2$=F and $L^3$=$L^4$=F, furthermore $L^1$=F and $L^2$=Cl, $L^1$=Cl and $L^2$=F, $L^3$=F and $L^4$=Cl, $L^3$=Cl and $L^4$=F. $Z^2$ and $Z^{2'}$ in the formulae IIA and IIB preferably each, independently of one another, denote a single bond, furthermore a —$C_2H_4$— bridge.

If in the formula IIB $Z^2$=—$C_2H_4$— or —$CH_2O$—, $Z^{2'}$ is preferably a single bond or, if $Z^2$=—$C_2H_4$— or —$CH_2O$—, $Z^2$ is preferably a single bond. In the compounds of the formulae IIA and IIB, (O)$C_vH_{2v+1}$ preferably denotes $OC_vH_{2v+1}$, furthermore $C_vH_{2v+1}$. In the compounds of the formula IIC, (O)$C_vH_{2v+1}$ preferably denotes $C_vH_{2v+1}$.

In the compounds of the formula IIC, $L^3$ and $L^4$ preferably each denote F.

In the compounds of the formulae IIA and IIB, $L^5$ denotes H or $CH_3$, preferably H.

Preferred compounds of the formulae IIA, IIB and IIC are indicated below:

IIA-1

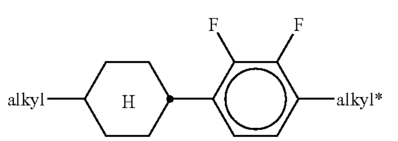

IIA-2

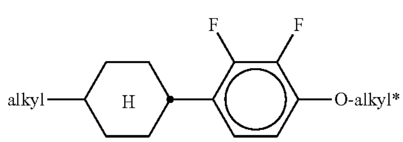

IIA-3

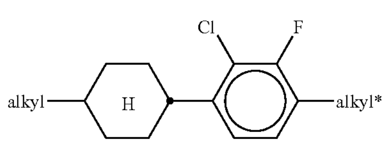

IIA-4

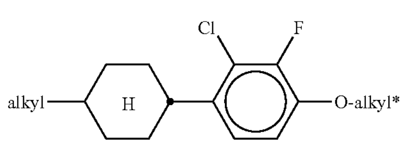

IIA-5

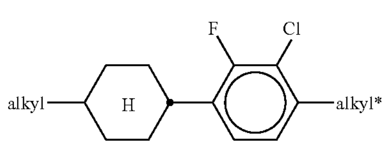

-continued

IIA-6

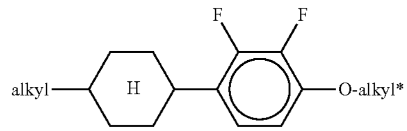

IIA-7

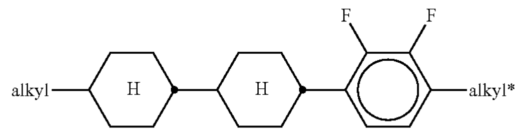

IIA-8

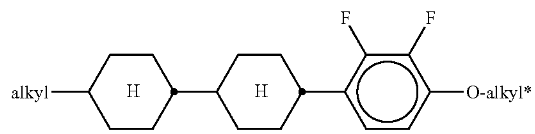

IIA-9

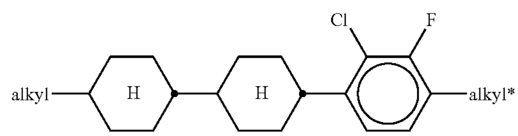

IIA-10

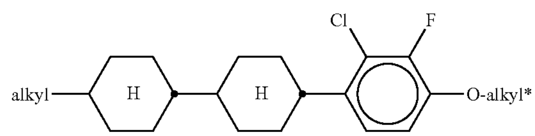

IIA-11

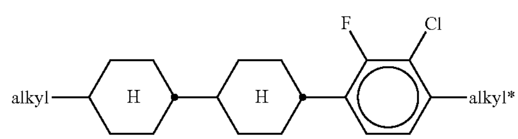

IIA-12

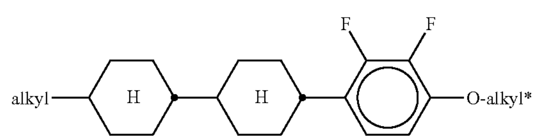

IIA-13

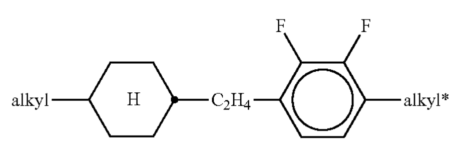

IIA-14

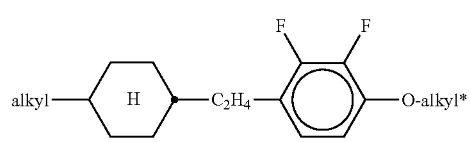

IIA-15

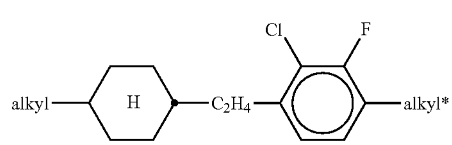

-continued
IIA-16
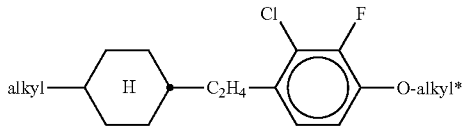
IIA-17
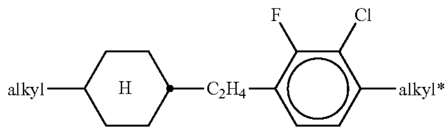
IIA-18
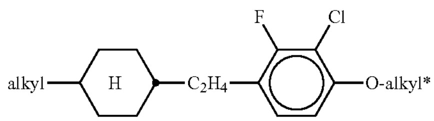
IIA-19
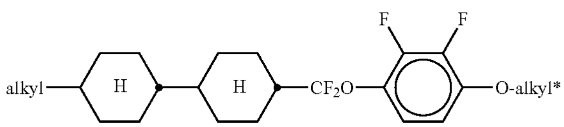
IIA-20
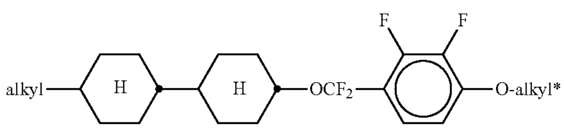
IIA-21
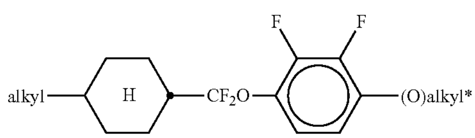
IIA-22
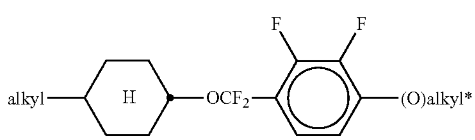
IIA-23
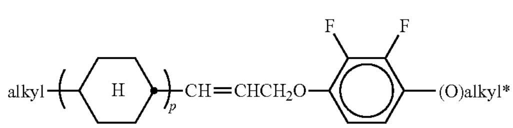
IIA-24
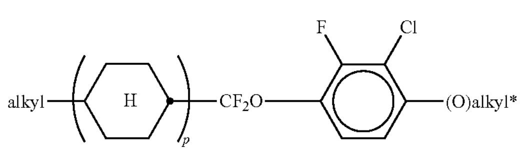
IIA-25
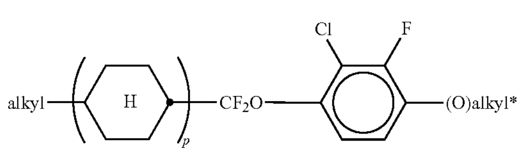
-continued
IIA-26
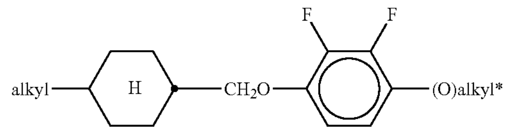
IIA-27
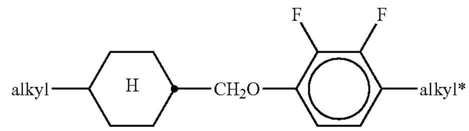
IIA-28
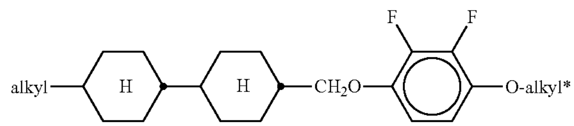
IIA-29
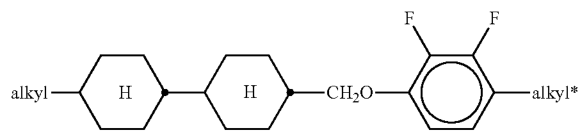
IIA-30
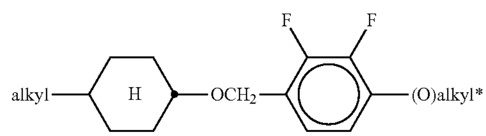
IIA-31
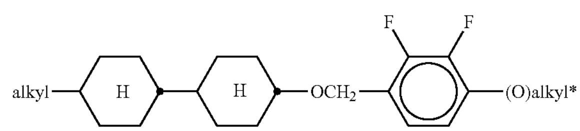
IIA-32
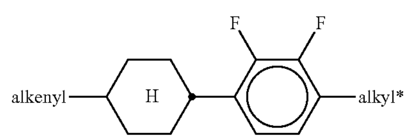
IIA-33
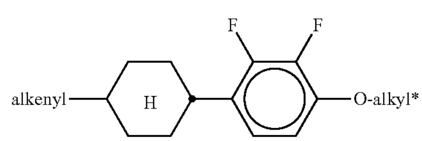
IIIA-34
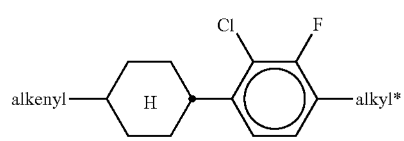
IIA-35
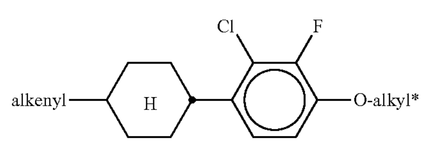
IIIA-36
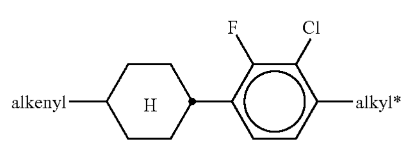

-continued
IIA-37
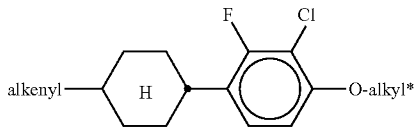
IIA-38
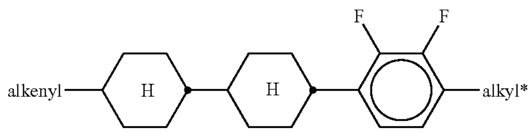
IIIA-39
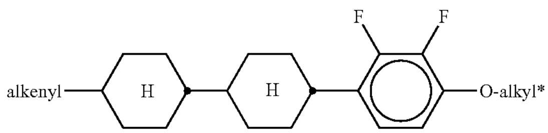
IIA-40
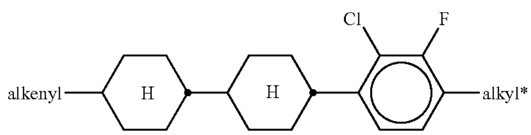
IIA-41
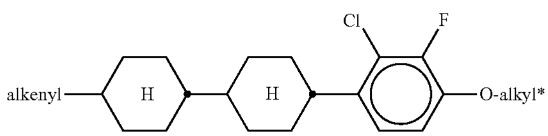
IIA-42
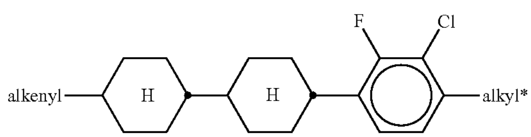
IIIA-43
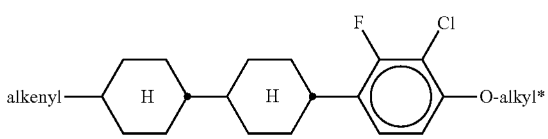
IIIA-44
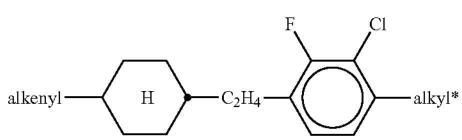
IIA-45
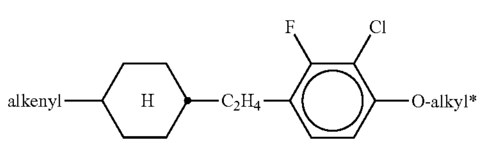
IIA-46
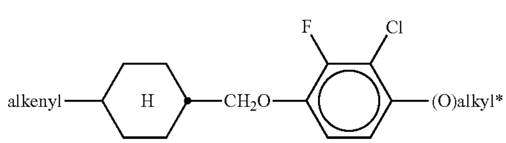
-continued
IIIA-47
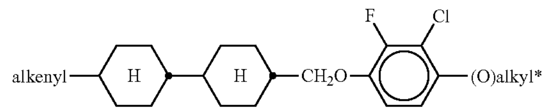
IIIA-48
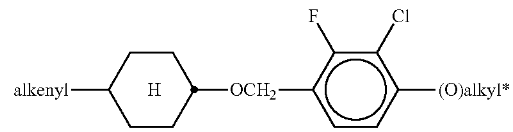
IIA-49
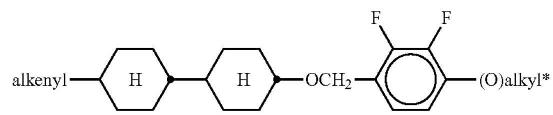
IIA-50
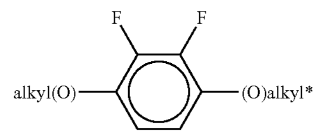
IIA-51
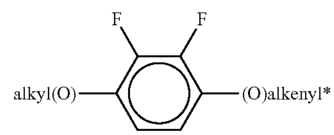
IIA-52
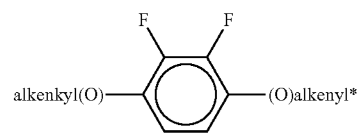
IIA-53
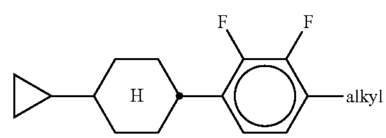
IIA-54
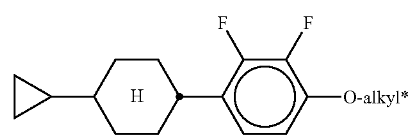
IIA-55
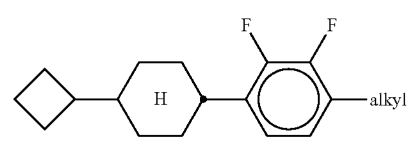
IIA-56
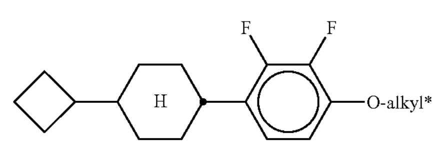
IIA-57
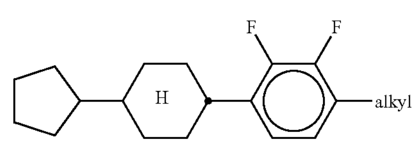

-continued
IIA-58
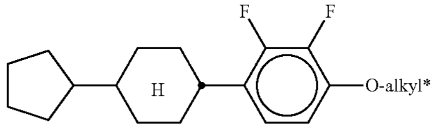
IIA-59
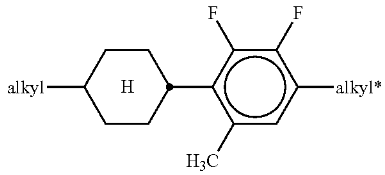
IIA-60
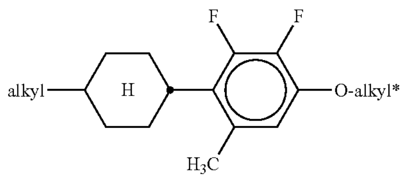
IIA-61
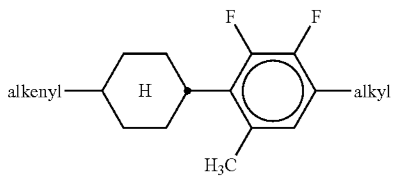
IIA-62
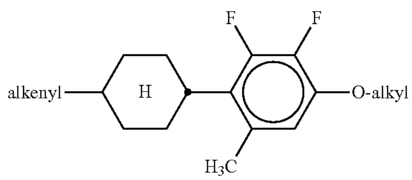
IIA-63
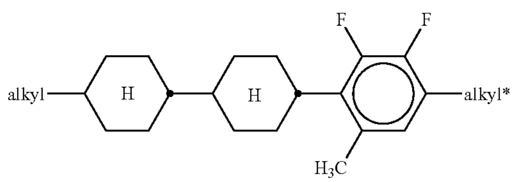
IIA-64
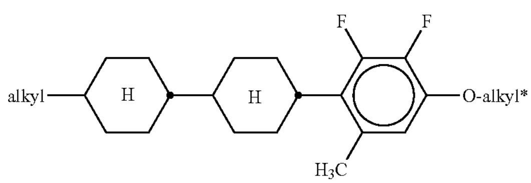
IIA-65
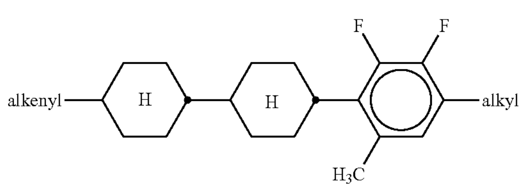
-continued
IIA-66
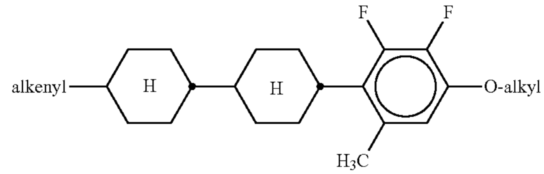
IIB-1
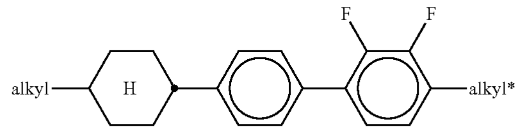
IIB-2
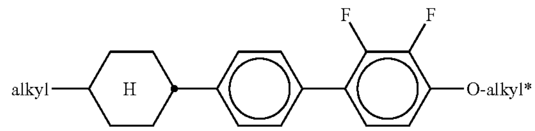
IIB-3
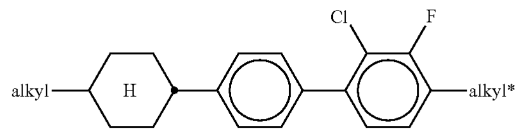
IIB-4
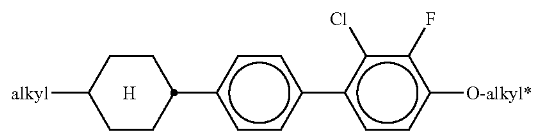
IIB-5
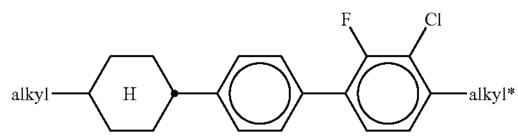
IIB-6
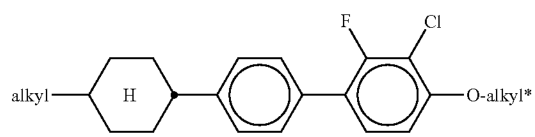
IIB-7
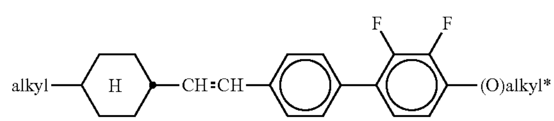
IIB-8
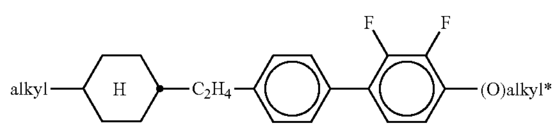
IIB-9
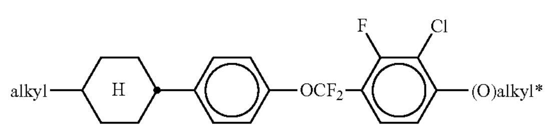

-continued
IIB-10
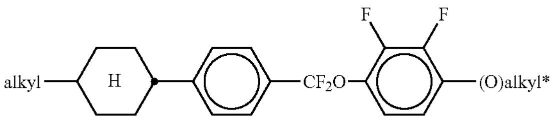
IIB-11
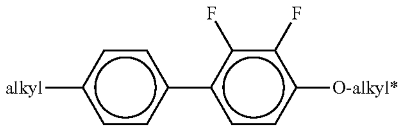
IIB-12
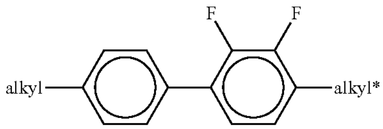
IIB-13
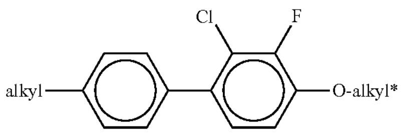
IIB-14
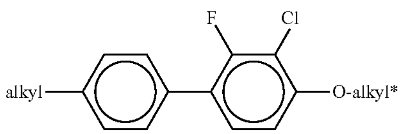
IIB-15
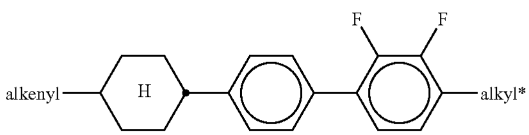
IIB-16
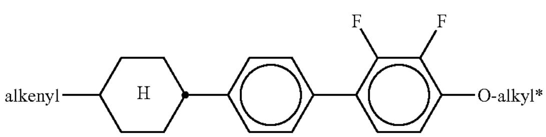
IIB-17
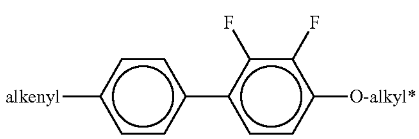
IIB-18
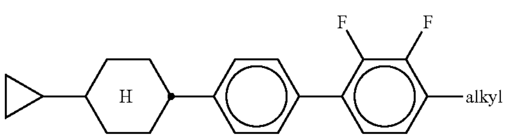
IIB-19
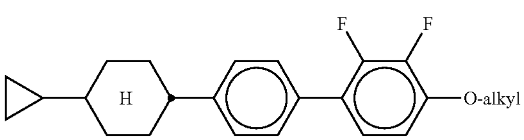
IIB-20
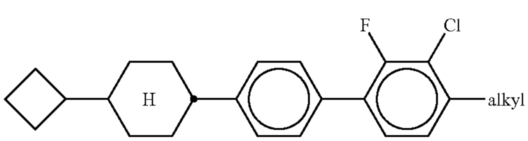
-continued
IIB-21
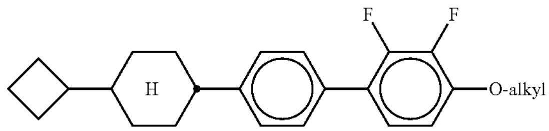
IIB-22
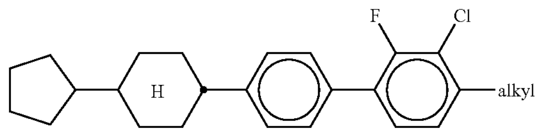
IIB-23
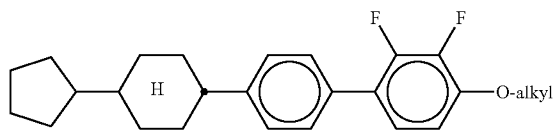
IIB-24
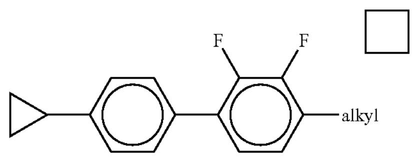
IIB-25
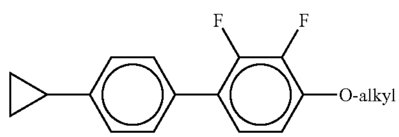
IIB-26
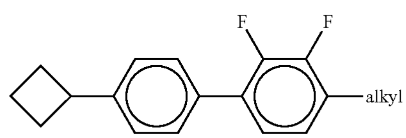
IIB-27
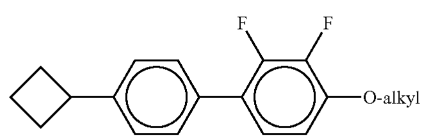
IIB-28
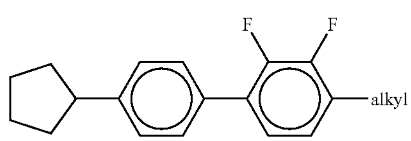
IIB-29
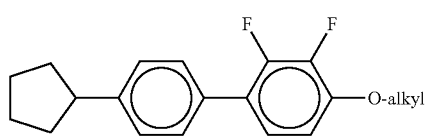
IIB-30
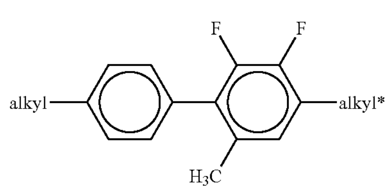

-continued

IIB-31

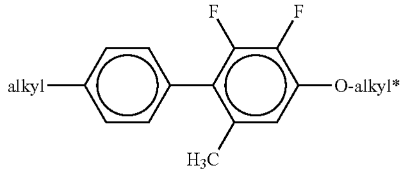

IIB-32

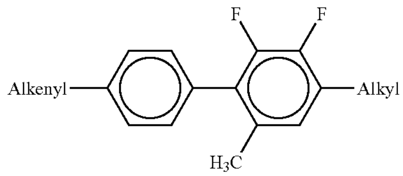

IIB-33

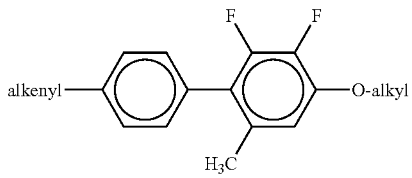

IIB-34

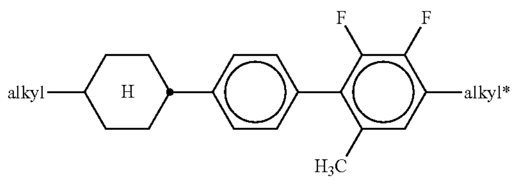

IIB-35

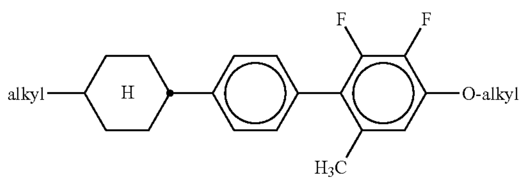

IIB-36

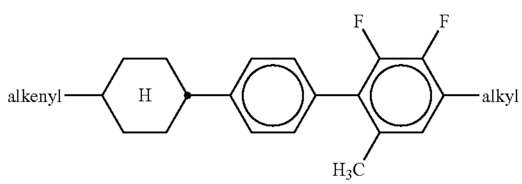

IIB-37

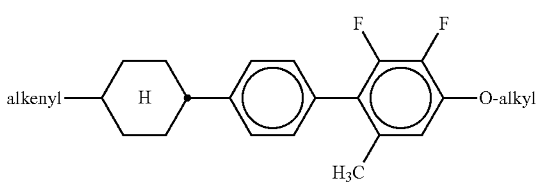

IIC-1

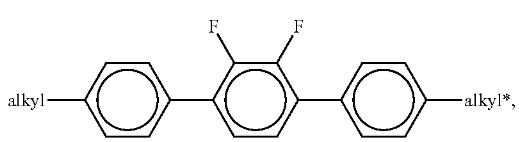

in which alkyl and alkyl* each, independently of one another, denote a straight-chain alkyl radical having 1-6 C atoms and alkenyl and alkenyl* each, independently of one another, denote a straight-chain alkenyl radical having 2-6 C atoms. Alkenyl preferably denotes $CH_2{=}CH$, $CH_3CH{=}CH$ or $CH_2{=}CHC_2H_4$.

Particularly preferred mixtures according to the invention comprise one or more compounds of the formulae IIA-2, IIA-8, IIA-14, IIA-26, II-28, IIA-33, IIA-39, IIA-45, IIA-46, IIA-47, IIA-50, IIB-2, IIB-11, IIB-16, IIB-17 or IIC-1.

The proportion of compounds of the formulae IIA and/or IIB in the mixture as a whole is preferably at least 20% by weight.

Particularly preferred media according to the invention comprise at least one compound of the formula IIC-1,

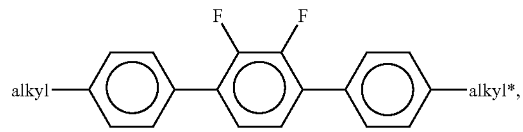

in which alkyl and alkyl* have the meanings indicated above, preferably in amounts of >3% by weight, in particular >5% by weight and particularly preferably 5-25% by weight.

b) Liquid-crystalline medium which additionally comprises one or more compounds of the formula III,

III

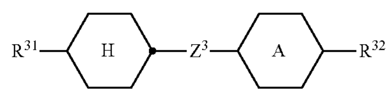

in which $R^{31}$ and $R^{32}$ each, independently of one another, denote a straight-chain alkyl, alkoxy, alkenyl, alkoxyalkyl or alkenyloxy radical having up to 12 C atoms, and

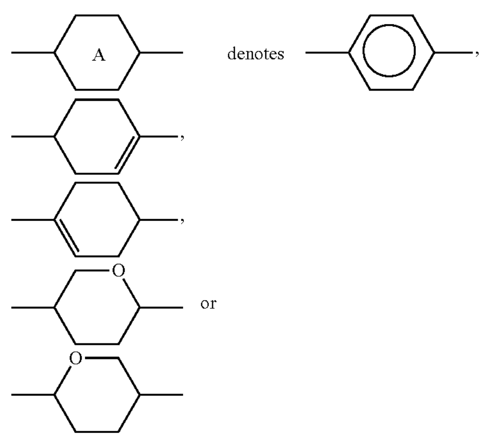

$Z^3$ denotes a single bond, $—CH_2CH_2—$, $—CH{=}CH—$, $—CF_2O—$, $—OCF_2—$, $—CH_2O—$, $—O\ CH_2—$, $—COO—$, $—OCO—$, $—C_2F_4—$, $—C_4H_8—$, $—C{\equiv}C—$, $—CF{=}CF—$.

Preferred compounds of the formula III are indicated below:

IIIa

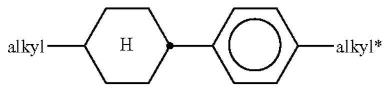

IIIb

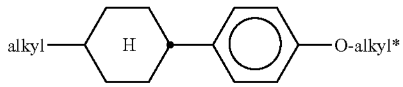

IIIc

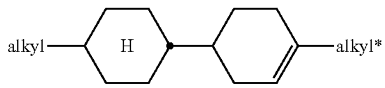

IIId

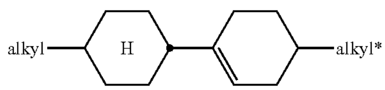

in which alkyl and alkyl* each, independently of one another, denote a straight-chain alkyl radical having 1-6 C atoms.

alkenyl and alkenyl* each, independently of one another, denote a straight-chain alkenyl radical having 2-6 C atoms.

c) Liquid-crystalline medium which additionally comprises one or more tetracyclic compounds of the formulae

V-1

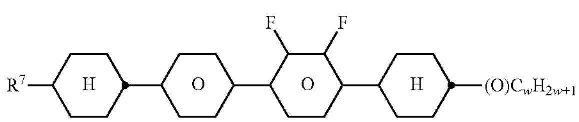

V-2

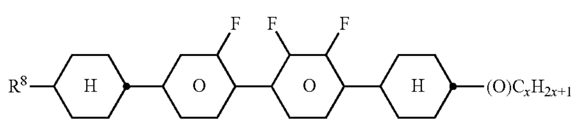

V-3

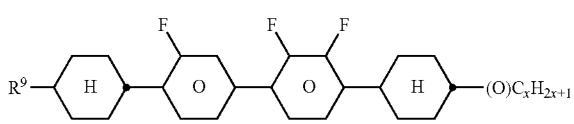

V-4

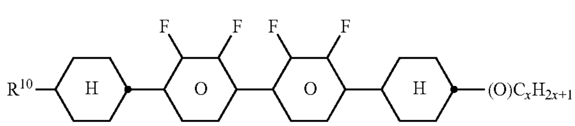

V-5

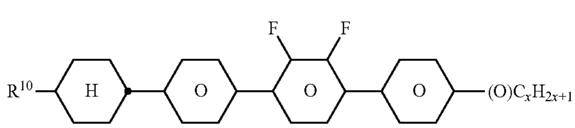

V-6

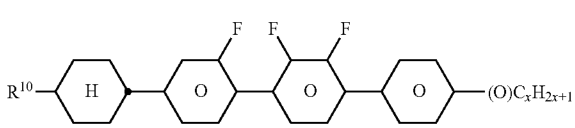

-continued

V-7

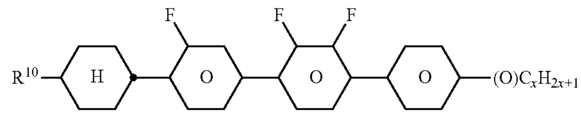

V-8

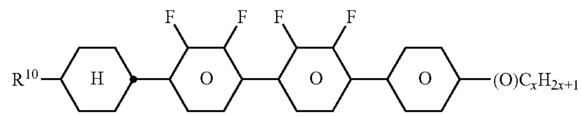

V-9

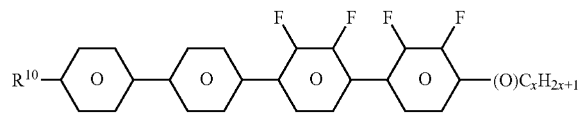

V-10

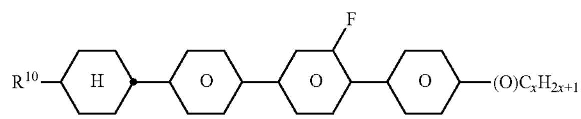

in which $R^{7-10}$ each, independently of one another, denote H, an alkyl or alkenyl radical having up to 15 C atoms which is unsubstituted, monosubstituted by CN or $CF_3$ or at least monosubstituted by halogen, where, in addition, one or more $CH_2$ groups in these radicals may be replaced by —O—, —S—,

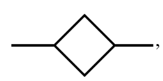

—C≡C—, —$CF_2$O—, —O$CF_2$—, —OC—O— or —O—CO— in such a way that O atoms are not linked directly to one another, a cyclopropyl ring, cyclobutyl ring or cyclopentyl ring, and w and x each, independently of one another, denote 1 to 6.

Particular preference is given to mixtures comprising at least one compound of the formula V-9 and/or of the formula V-10.

d) Liquid-crystalline medium which additionally comprises one or more compounds of the formulae Y-1 to Y-6,

Y-1

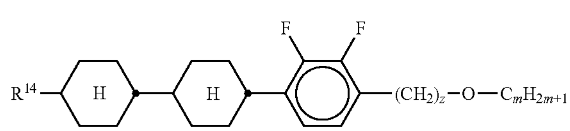

Y-2

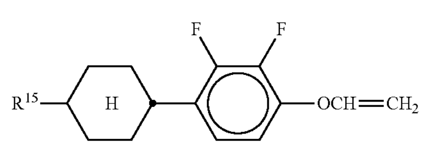

-continued

Y-3
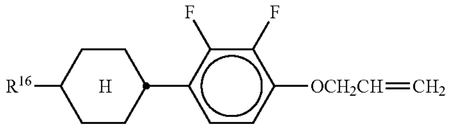

Y-4
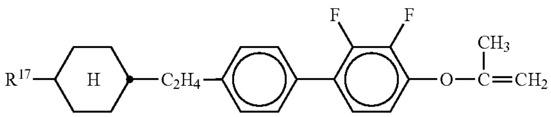

Y-5
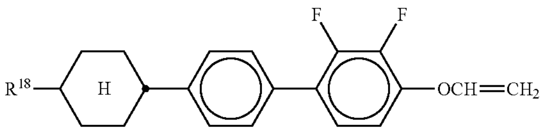

Y-6
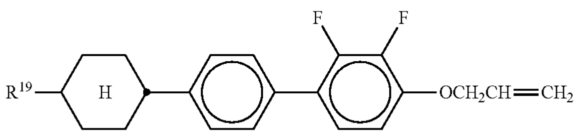

in which $R^{14}$-$R^{19}$ each, independently of one another, denote an alkyl or alkoxy radical having 1-6 C atoms; z and m each, independently of one another, denote 1-6; x denotes 0, 1, 2 or 3.

The medium according to the invention particularly preferably comprises one or more compounds of the formulae Y-1 to Y-6, preferably in amounts of ≥5% by weight.

e) Liquid-crystalline medium additionally comprising one or more fluorinated terphenyls of the formulae T-1 to T-22, T-1
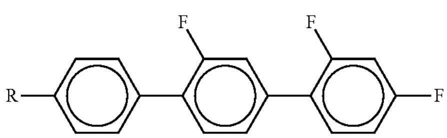

T-2
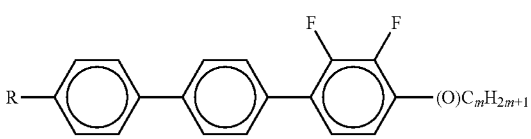

T-3
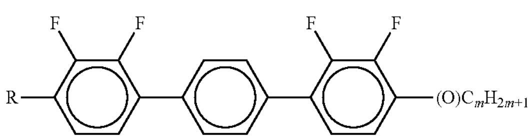

T-4
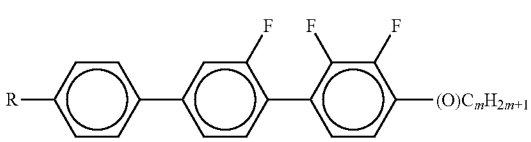

-continued

T-5
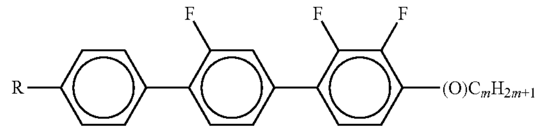

T-6
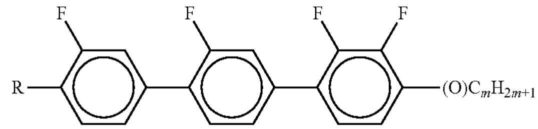

T-7
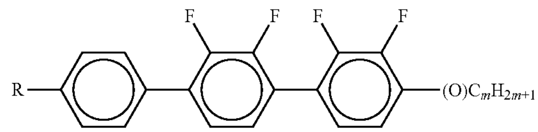

T-8
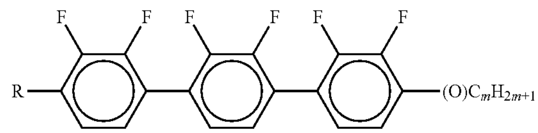

T-9
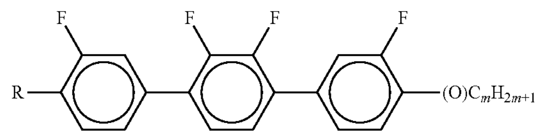

T-10
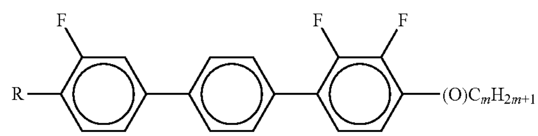

T-11
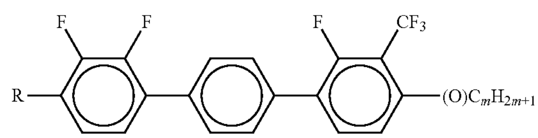

T-12
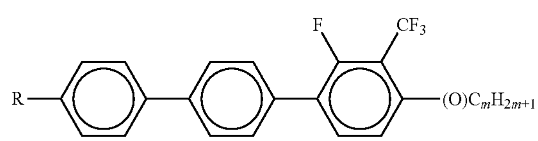

T-13
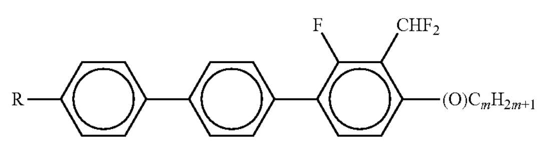

T-14
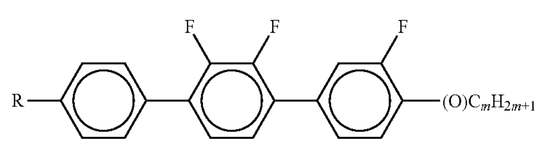

-continued

T-15

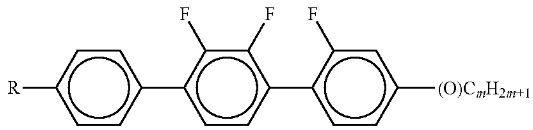

T-16

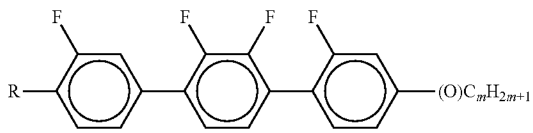

T-17

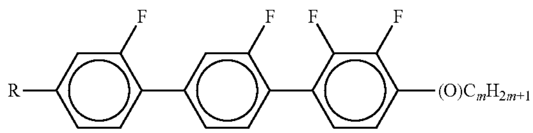

T-18

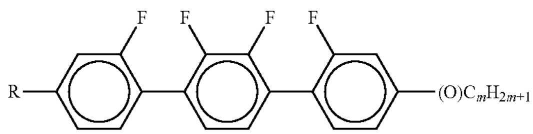

T-19

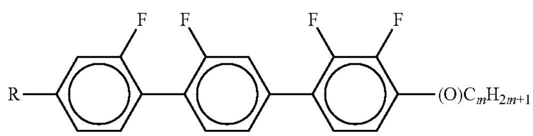

T-20

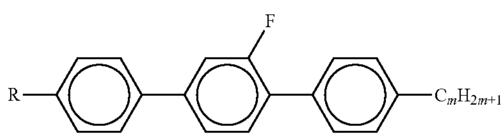

T-21

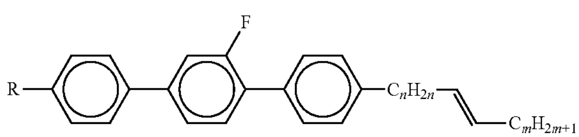

T-22

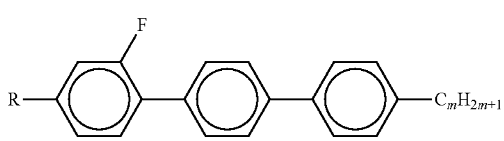

in which

R denotes a straight-chain alkyl or alkoxy radical having 1-7 C atoms, and m=0, 1, 2, 3, 4, 5 or 6 and n denotes 0, 1, 2, 3 or 4.

R preferably denotes methyl, ethyl, propyl, butyl, pentyl, hexyl, methoxy, ethoxy, propoxy, butoxy, or pentoxy.

The medium according to the invention preferably comprises the terphenyls of the formulae T-1 to T-22 in amounts of 2-30% by weight, in particular 5-20% by weight.

Particular preference is given to compounds of the formulae T-1, T-2, T-5, T-20 and T-21. In these compounds, R preferably denotes alkyl, furthermore alkoxy, each having 1-6 C atoms. In the compounds of the formula T-20, R preferably denotes alkyl or alkenyl, in particular alkyl. In the compound of the formula T-21, R preferably denotes alkyl.

The terphenyls are preferably employed in the mixtures according to the invention if the Δn value of the mixture is to be ≥0.1. Preferred mixtures comprise 2-20% by weight of one or more terphenyl compounds selected from the group of the compounds T-1 to T-22.

f) Liquid-crystalline medium additionally comprising one or more biphenyls of the formulae B-1 to B-3,

B-1

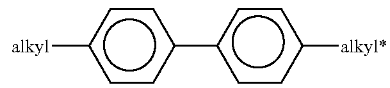

B-2

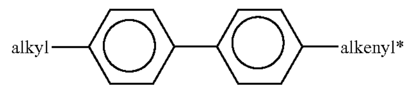

B-3

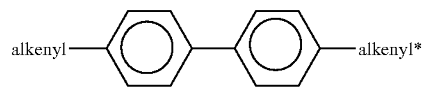

in which alkyl and alkyl* each, independently of one another, denote a straight-chain alkyl radical having 1-6 C atoms, and alkenyl and alkenyl* each, independently of one another, denote a straight-chain alkenyl radical having 2-6 C atoms.

The proportion of the biphenyls of the formulae B-1 to B-3 in the mixture as a whole is preferably at least 3% by weight, in particular ≥5% by weight.

Of the compounds of the formulae B-1 to B-3, the compounds of the formulae B-1 and B-2 are particularly preferred.

Particularly preferred biphenyls are

B-1a

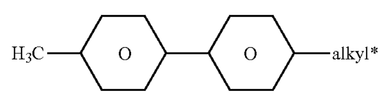

B-2a

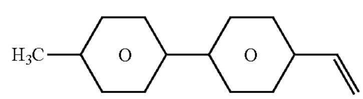

B-2b

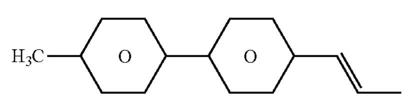

B-2c

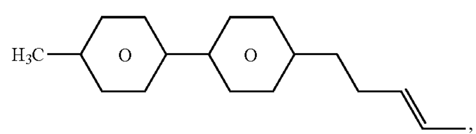

in which alkyl* denotes an alkyl radical having 1-6 C atoms. The medium according to the invention particularly preferably comprises one or more compounds of the formulae B-1a and/or B-2c.

Preferred compounds of the formula B-1a are, in particular, the compounds of the formulae B-1a-1

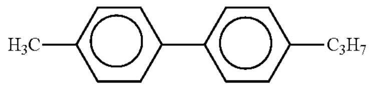

B-1a-2

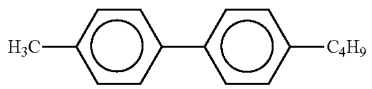

B-1a-3

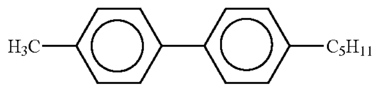

g) Liquid-crystalline medium additionally comprising at least one compound of the formulae Z-1 to Z-7,

Z-1

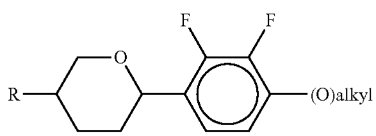

Z-2

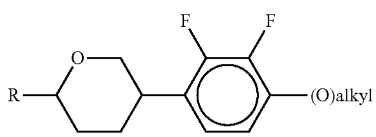

Z-3

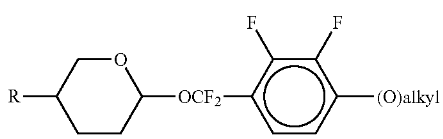

Z-4

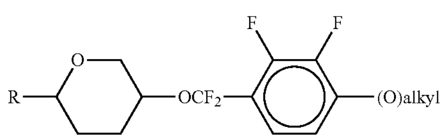

Z-5

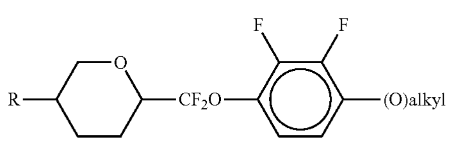

Z-6

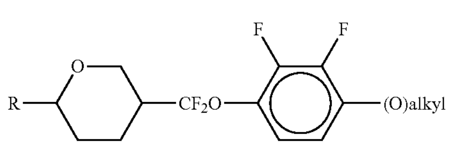

Z-7

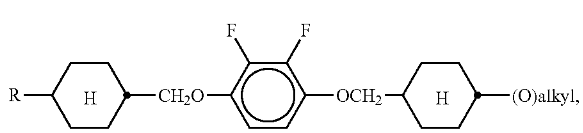

in which R denotes H, an alkyl or alkenyl radical having up to 15 C atoms which is unsubstituted, monosubstituted by CN or $CF_3$ or at least monosubstituted by halogen, where, in addition, one or more $CH_2$ groups in these radicals may be replaced by —O—, —S—,

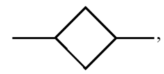

—C≡C—, —$CF_2$O—, —O$CF_2$—, —OC—O— or —O—CO— in such a way that O atoms are not linked directly to one another, a cyclopropyl ring, cyclobutyl ring or cyclopentyl ring, and alkyl denotes an alkyl radical having 1-6 C atoms.

h) Liquid-crystalline medium additionally comprising at least one compound of the formulae O-1 to O-17,

O-1

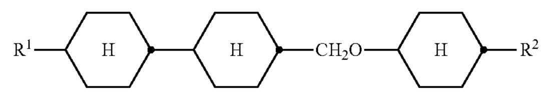

O-2

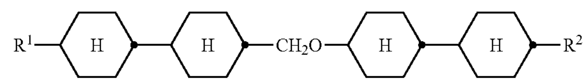

O-3

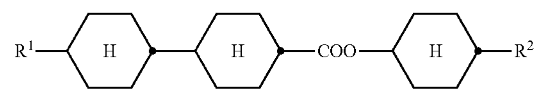

O-4

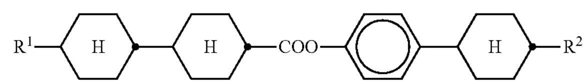

O-5

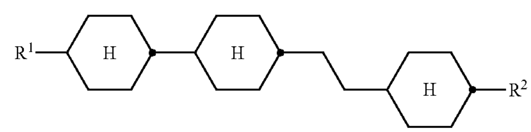

O-6

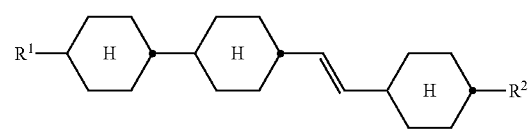

O-7

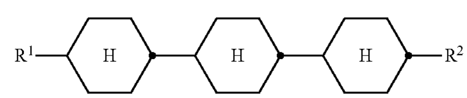

O-8

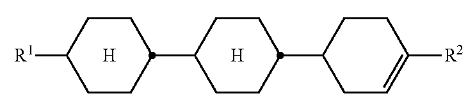

O-9

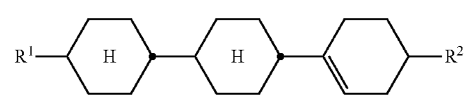

O-10

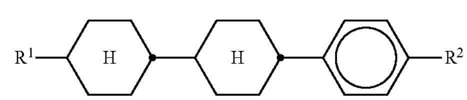

O-11

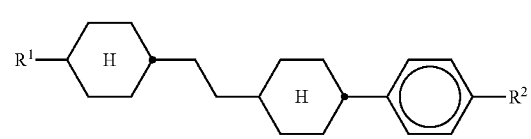

-continued

O-12

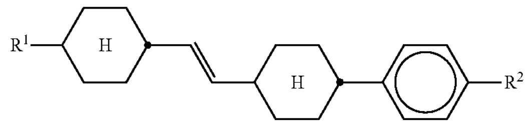

O-13

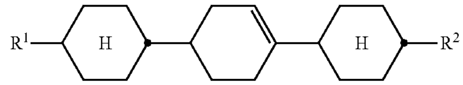

O-14

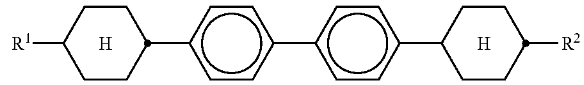

O-15

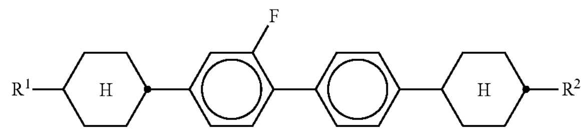

O-16

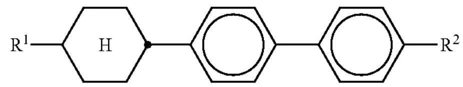

O-17

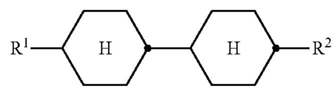

in which $R^1$ and $R^2$ each, independently of one another, denote H, an alkyl or alkenyl radical having up to 15 C atoms which is unsubstituted, monosubstituted by CN or $CF_3$ or at least monosubstituted by halogen, where, in addition, one or more $CH_2$ groups in these radicals may be replaced by —O—, —S—,

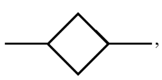

—C≡C—, —$CF_2$O—, —O$CF_2$—, —OC—O— or —O—CO— in such a way that O atoms are not linked directly to one another, a cyclopropyl ring, cyclobutyl ring or cyclopentyl ring. $R^1$ and $R^2$ preferably each, independently of one another, denote straight-chain alkyl or alkenyl, where the compounds of the formula O-17 are not identical with the compounds of the formulae IA and IB.

Preferred media comprise one or more compounds of the formulae O-1, O-3, O-4, O-6, O-7, O-10, O-11, O-12, O-14, O-15, O-16 and/or O-17.

Mixtures according to the invention very particularly preferably comprise the compounds of the formula O-10, O-12, O-16 and/or O-17, in particular in amounts of 5-30% by weight.

Preferred compounds of the formula O-17 are selected from the group of the compounds of the formulae

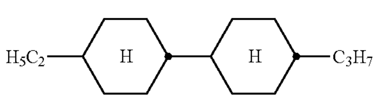

-continued

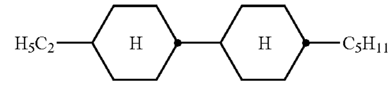

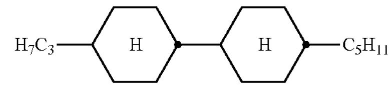

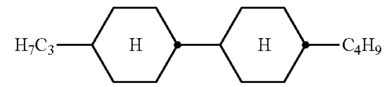

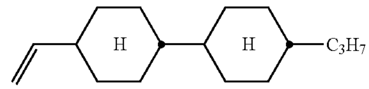

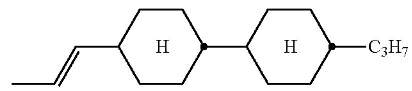

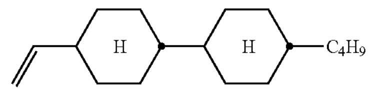

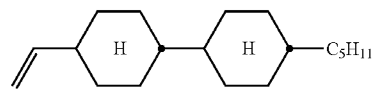

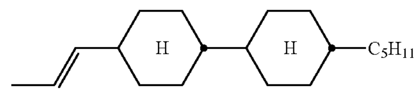

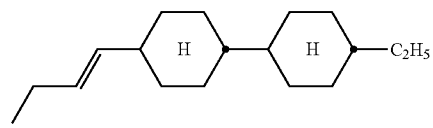

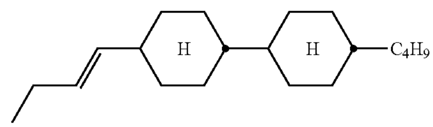

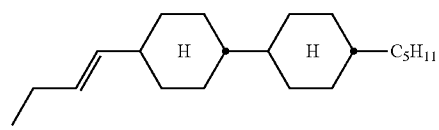

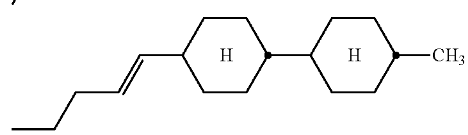

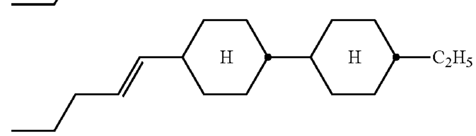

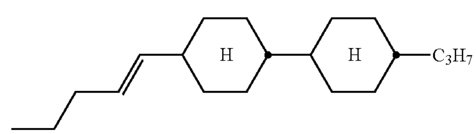

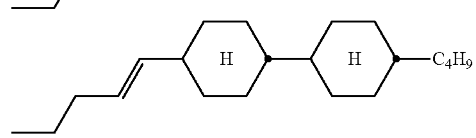

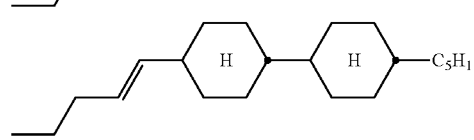

-continued
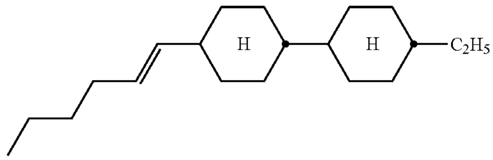
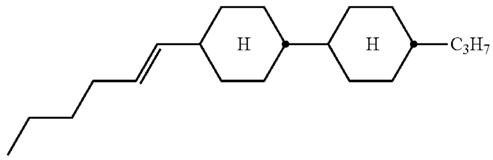
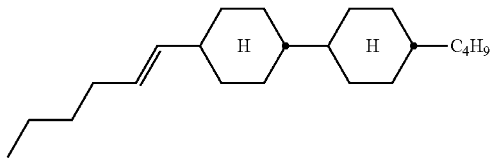
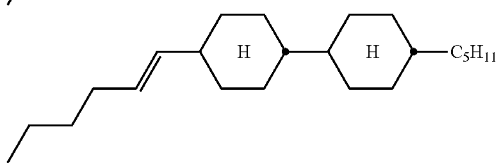
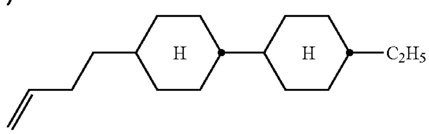
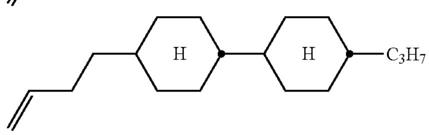
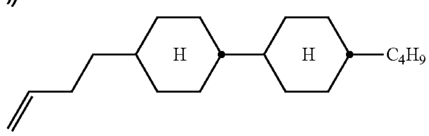
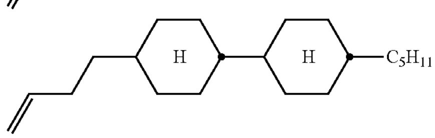
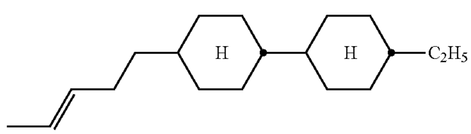
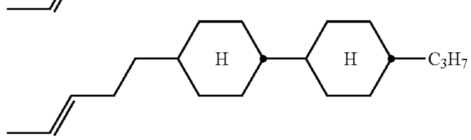
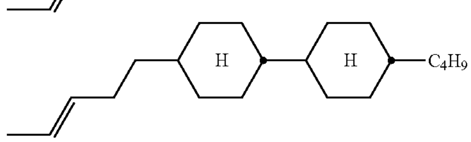
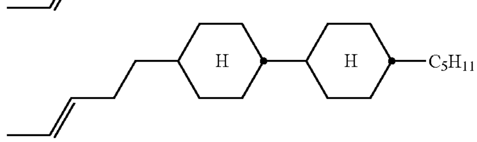
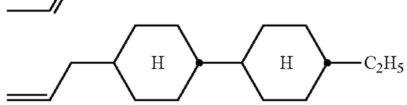
-continued
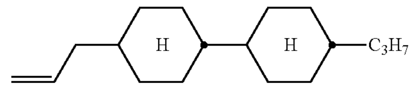
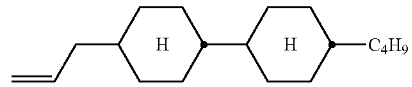
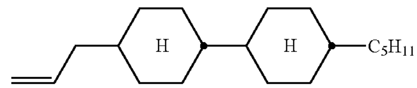
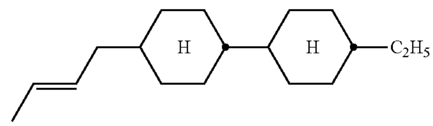
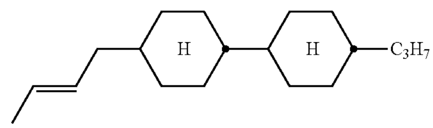
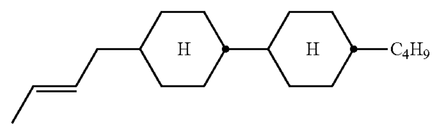
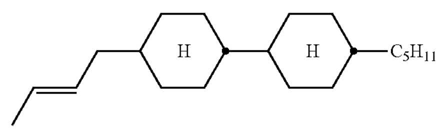
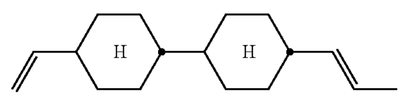
Preference is furthermore given to compounds of the formula O-17 which contain a non-terminal double bond in the alkenyl side chain:
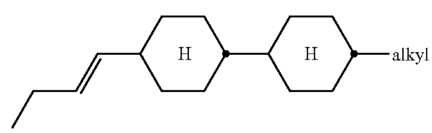
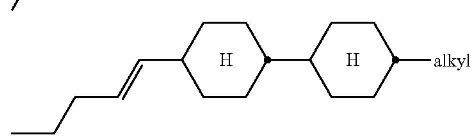
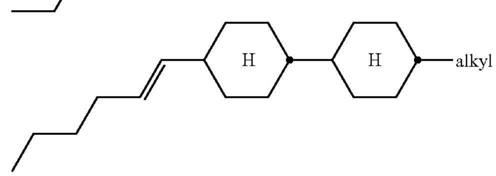
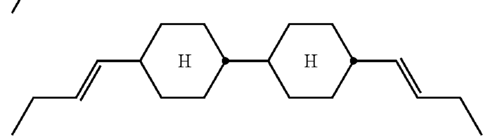
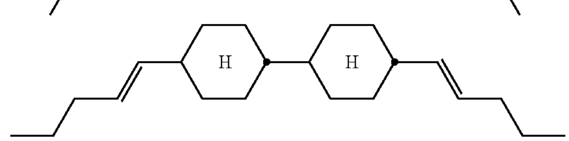

-continued

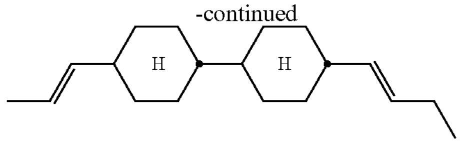

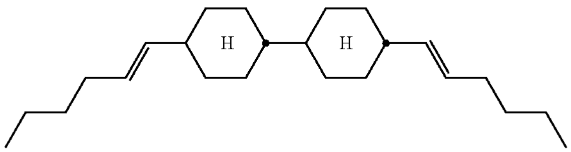

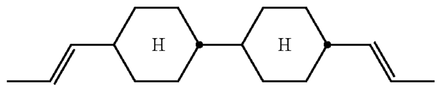

The proportion of compounds of the formula O-17 in the mixture as a whole is preferably at least 5% by weight.

i) Liquid-crystalline medium additionally comprising at least one compound of the formula

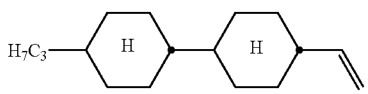

and/or

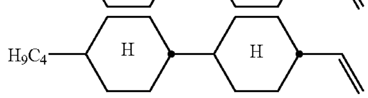

and/or

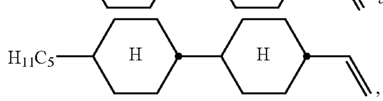

preferably in total amounts of ≥5% by weight, in particular ≥10% by weight.

Preference is furthermore given to mixtures according to the invention comprising the compound (acronym: CC-3-V1)

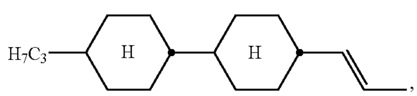

preferably in amounts of 2-15% by weight.

Preferred mixtures comprise 5-60% by weight, preferably 10-55% by weight, in particular 20-50% by weight, of the compound of the formula (acronym: CC-3-V)

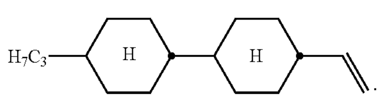

Preference is furthermore given to mixtures which comprise a compound of the formula (acronym: CC-3-V)

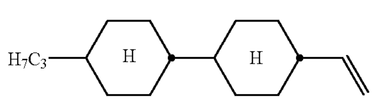

and a compound of the formula (acronym: CC-3-V1)

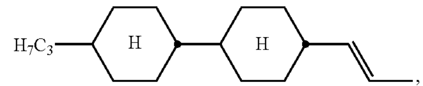

preferably in amounts of 10-60% by weight.

j) Liquid-crystalline medium additionally comprising at least one compound of the formula O-10 and at least one compound of the formula O-17 selected from the group of the following compounds:

O-10a

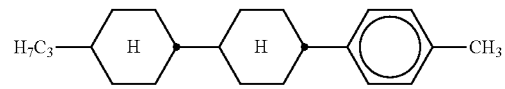

O-10b

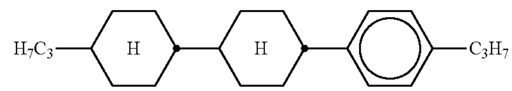

O-17a

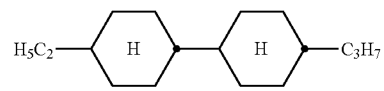

O-17b

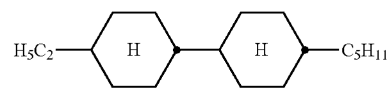

O-17c

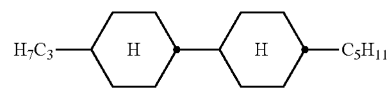

O-17d

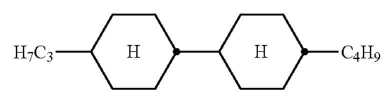

The medium according to the invention particularly preferably comprises the tricyclic compounds of the formula O-10a and/or of the formula O-10b in combination with one or more bicyclic compounds of the formulae O-17a to O-17d. The total proportion of the compounds of the formulae O-10a and/or O-10b in combination with one or more compounds selected from the bicyclic compounds of the formulae O-17a to O-17d is 5-40%, very particularly preferably 15-35%.

Very particularly preferred mixtures comprise compounds O-10a and O-17a:

O-10a

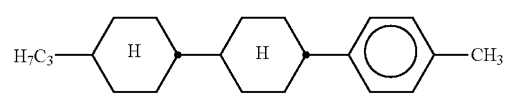

O-17a

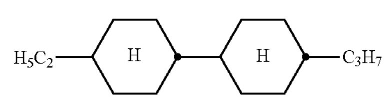

Compounds O-1a and O-17a are preferably present in the mixture in a concentration of 15-35%, particularly preferably 15-25% and especially preferably 18-22%, based on the mixture as a whole.

Very particularly preferred mixtures comprise the compounds O-10b and O-17a:

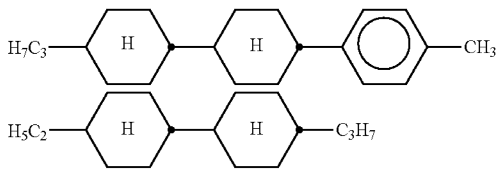

The compounds O-10b and O-17a are preferably present in the mixture in a concentration of 15-35%, particularly preferably 15-25% and especially preferably 18-22%, based on the mixture as a whole.

Very particularly preferred mixtures comprise the following three compounds:

O-10a

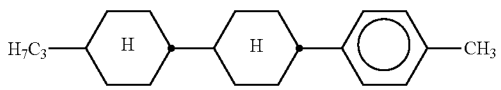

O-10b

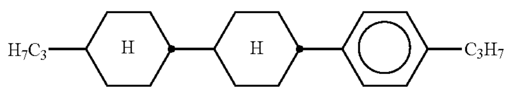

O-17a

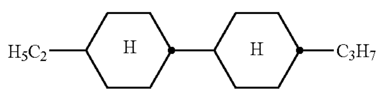

The compounds O-10a, O-10b and O-17a are preferably present in the mixture in a concentration of 15-35%, particularly preferably 15-25% and especially preferably 18-22%, based on the mixture as a whole.

Preferred mixtures comprise at least one compound selected from the group of the compounds

O-6

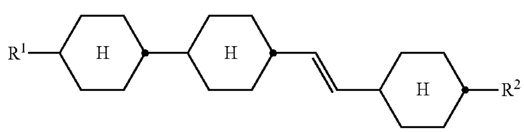

O-7

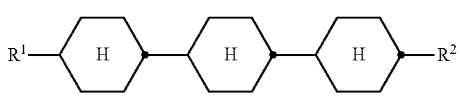

O-10

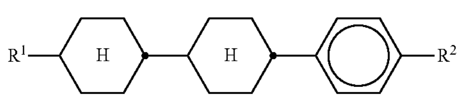

O-17

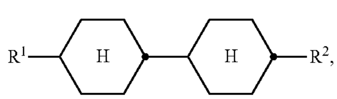

in which R and $R^2$ have the meanings indicated above. In the compounds O-6, O-7 and O-17, R preferably denotes alkyl or alkenyl having 1-6 or 2-6 C atoms respectively, and $R^2$ preferably denotes alkenyl having 2-6 C atoms. In the compounds of the formula O-10, $R^1$ preferably denotes alkyl or alkenyl having 1-6 or 2-6 C atoms respectively, and $R^2$ preferably denotes alkyl having 1-6 C atoms.

Preferred mixtures comprise at least one compound selected from the group of the compounds of the formulae O-6a, O-6b, O-7a, O-7b, O-17e, O-17f, O-17g and O-17h:

O-6a

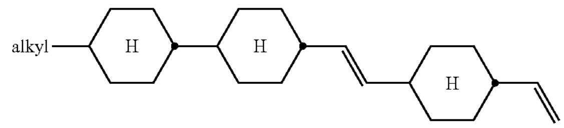

O-6b

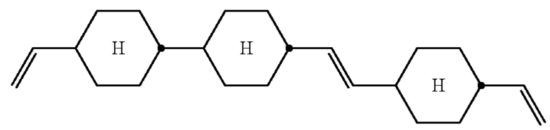

O-7a

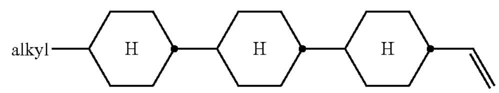

O-7b

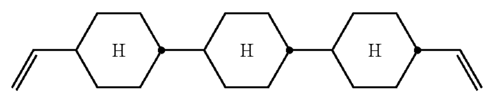

O-17e

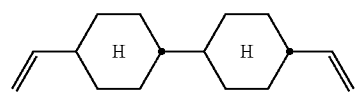

O-17f

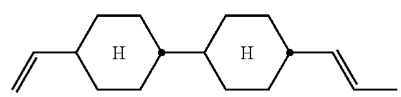

O-17g

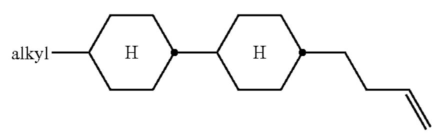

O-17h

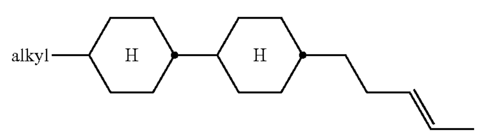

in which alkyl denotes an alkyl radical having 1-6 C atoms.

The compounds of the formulae O-6, O-7 and O-17e-h are preferably present in the mixtures according to the invention in amounts of 1 40% by weight, in particular 2-35% by weight and very particularly preferably 2-30% by weight.

k) Preferred liquid-crystalline media according to the invention comprise one or more substances which contain a tetrahydronaphthyl or naphthyl unit, such as, for example, the compounds of the formulae N-1 to N-5,

N-1

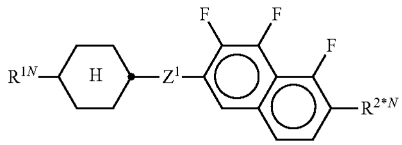

N-2

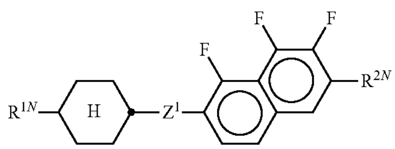

N-3

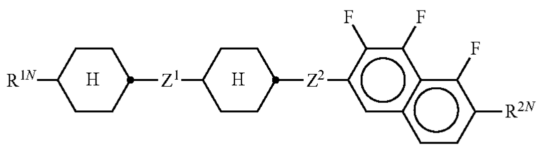

N-4

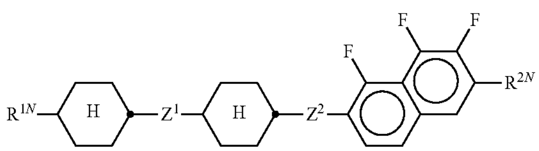

N-5

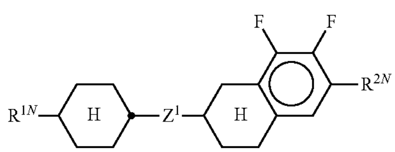

in which $R^{1N}$ and $R^{2N}$ each, independently of one another, denote H, an alkyl or alkenyl radical having up to 15 C atoms which is unsubstituted, monosubstituted by CN or $CF_3$ or at least monosubstituted by halogen, where, in addition, one or more $CH_2$ groups in these radicals may be replaced by —O—, —S—,

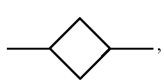

—C≡C—, —$CF_2$O—, —O$CF_2$—, —OC—O— or —O—CO— in such a way that O atoms are not linked directly to one another, a cyclopropyl ring, cyclobutyl ring or cyclopentyl ring, preferably denote straight-chain alkyl, straight-chain alkoxy or straight-chain alkenyl, and $Z^1$ and $Z^2$ each, independently of one another, denote —$C_2H_4$—, —CH═CH—, —$(CH_2)_4$—, —$(CH_2)_3$O—, —O$(CH_2)_3$—, —CH═CH$CH_2CH_2$—, —$CH_2CH_2$CH═CH—, —$CH_2$O—, —O$CH_2$—, —CO O—, —OCO—, —$C_2F_4$—, —CF═CF—, —CF═CH—, —CH═CF—, —C≡C—, —$CF_2$O—, —O$CF_2$—, —$CH_2$— or a single bond.

l) Preferred mixtures comprise one or more compounds selected from the group of the compounds of the formulae BC, CR, PH-1, PH-2, BF-1, BF-2, BS-1 and BS-2,

BC

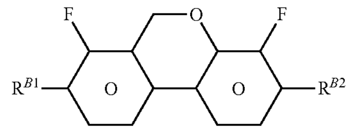

CR

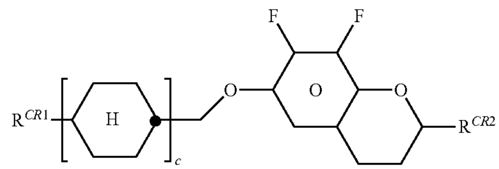

PH-1

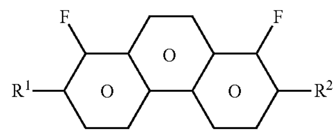

PH-2

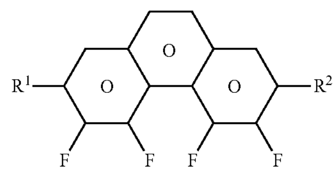

BF-1

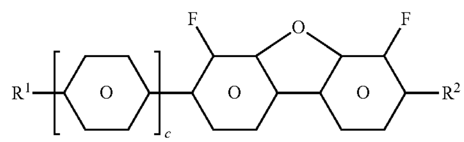

BF-2

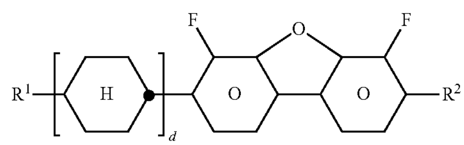

BS-1

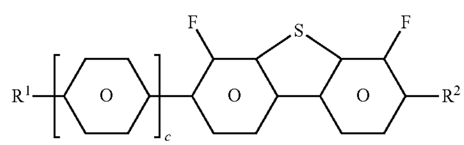

BS-2

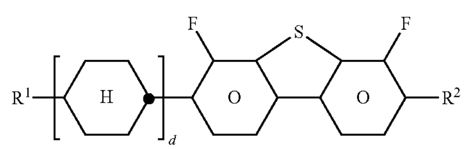

in which $R^{B1}$, $R^{B2}$, $R^{CR1}$, $R^{CR2}$, $R^1$, $R^2$ each, independently of one another, denote H, an alkyl or alkenyl radical having up to 15 C atoms which is unsubstituted, monosubstituted by CN or $CF_3$ or at least monosubstituted by halogen, where, in addition, one or more $CH_2$ groups in these radicals may be replaced by —O—, —S—,

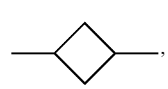

—C≡C—, —$CF_2$O—, —O$CF_2$—, —OC—O— or —O—CO— in such a way that O atoms are not linked directly to one another, a cyclopropyl ring, cyclobutyl ring or cyclopentyl ring. c is 0, 1 or 2 and d is 1 or 2. $R^1$ and $R^2$ preferably, independently of one another, denote alkyl, alkoxy, alkenyl or alkenyloxy having 1 or 2 to 6 C atoms respectively.

The mixtures according to the invention preferably comprise the compounds of the formulae BC, CR, PH-1, PH-2 and/or BF in amounts of 3 to 20% by weight, in particular in amounts of 3 to 15% by weight.

Particularly preferred compounds of the formulae BC and CR, are the compounds BF-1, BF-2, BS-1 and BS-2,

BC-1

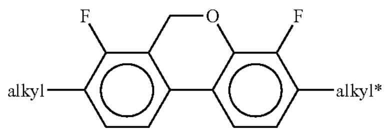

BC-2

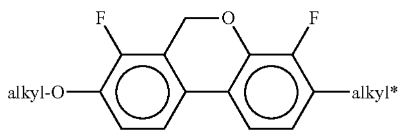

BC-3

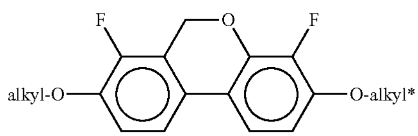

BC-4

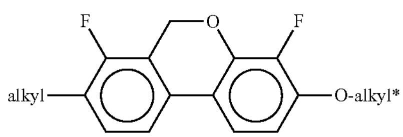

BC-5

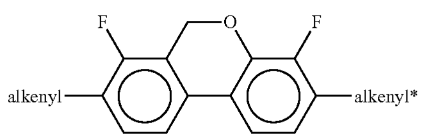

BC-6

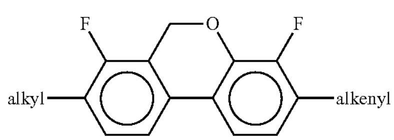

BC-7

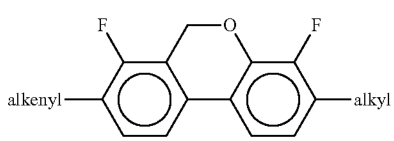

CR-1

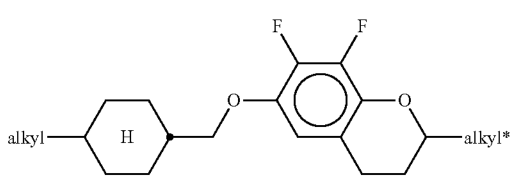

CR-2

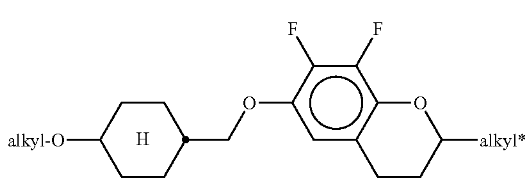

-continued

CR-3

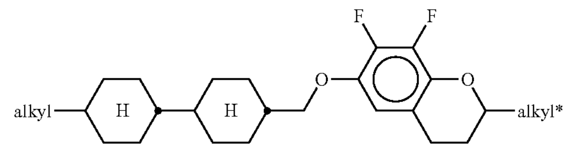

CR-4

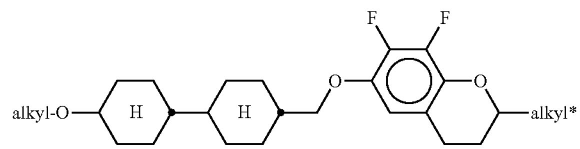

CR-5

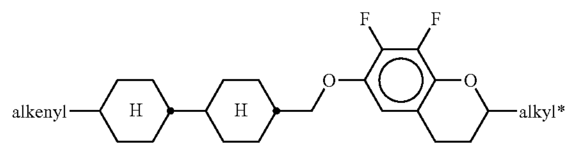

BF-1a

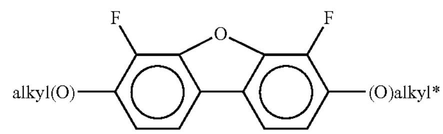

BS-1a

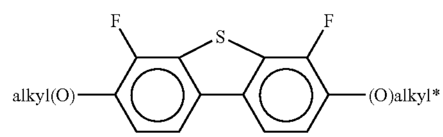

in which alkyl and alkyl* each, independently of one another, denote a straight-chain alkyl radical having 1-6 C atoms, alkenyl and alkenyl* each, independently of one another, denote a straight-chain alkenyl radical having 2-6 C atoms, and (O)alkyl and (O)alkyl* denote alkyl or Oalkyl and alkyl* or Oalkyl* respectively.

Very particular preference is given to mixtures comprising one, two or three compounds of the formula BC-2, BF-1a and/or BS-1a.

m) Preferred mixtures comprise one or more indane compounds of the formula In,

In

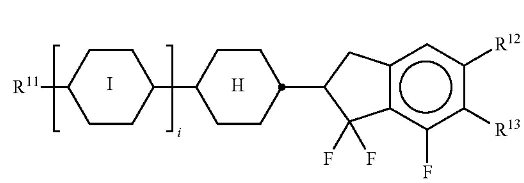

in which $R^{11}$, $R^{12}$, $R^{13}$ each, independently of one another, denote a straight-chain alkyl, alkoxy, alkoxyalkyl or alkenyl radical having 1-6 C atoms, $R^{12}$ and $R^{13}$ additionally denote halogen, preferably F,
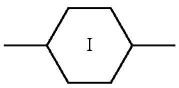
denotes
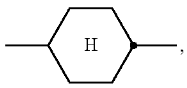
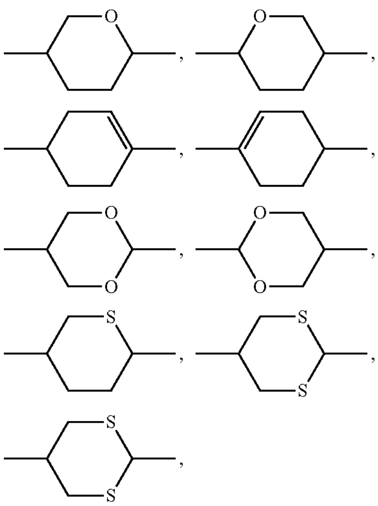
i denotes 0, 1 or 2.
Preferred compounds of the formula In are the compounds of the formulae In-1 to In-16 indicated below:
In-1
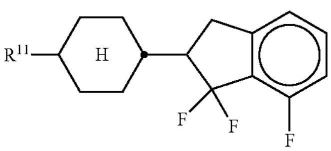
In-2
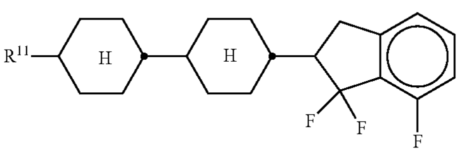
In-3
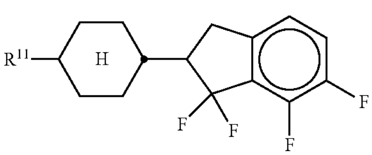
In-4
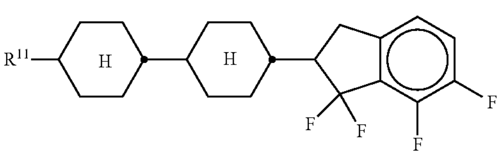
In-5
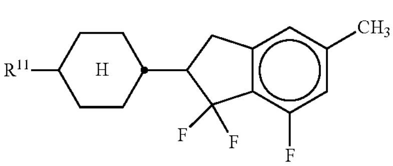
-continued
In-6
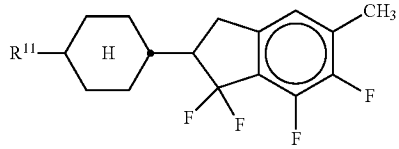
In-7
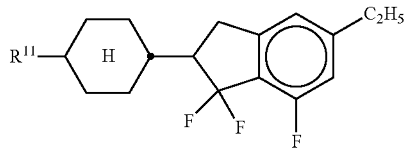
In-8
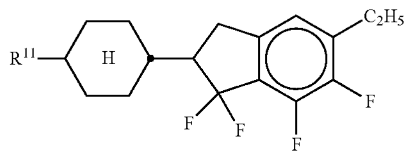
In-9
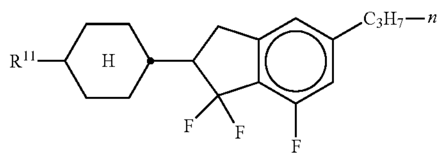
In-10
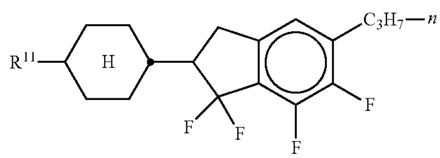
In-11
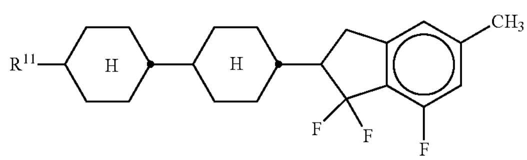
In-12
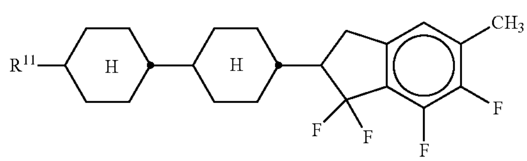
In-13
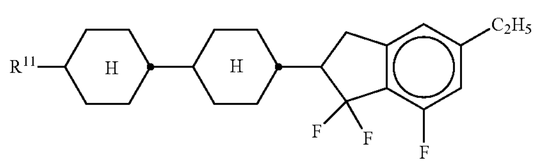
In-14
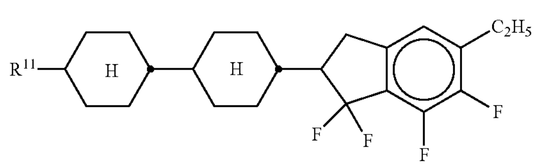

-continued

In-15

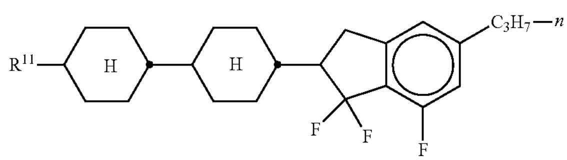

In-16

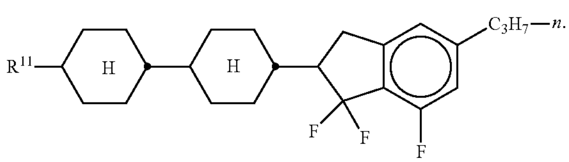

Particular preference is given to the compounds of the formulae In-1, In-2, In-3 and In-4.

The compounds of the formula In and the sub-formulae In-1 to In-16 are preferably employed in the mixtures according to the invention in concentrations 5% by weight, in particular 5-30% by weight and very particularly preferably 5-25% by weight.

n) Preferred mixtures additionally comprise one or more compounds of the formulae L-1 to L-11,

L-1

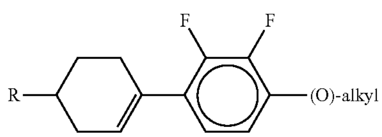

L-2

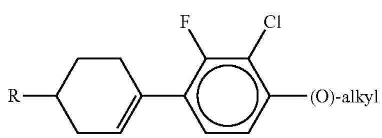

L-3

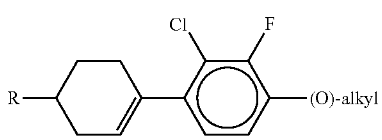

L-4

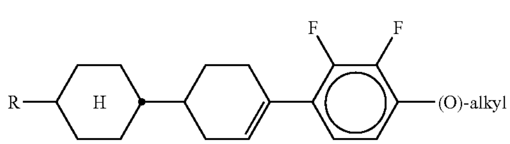

L-5

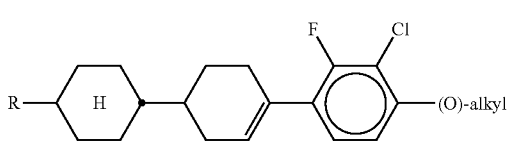

L-6

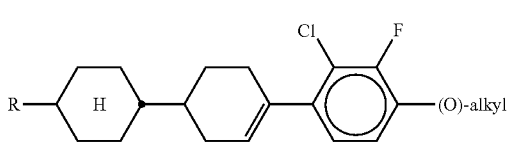

-continued

L-7

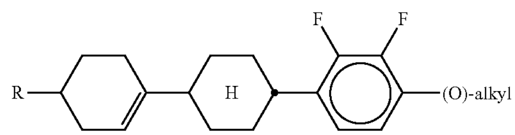

L-8

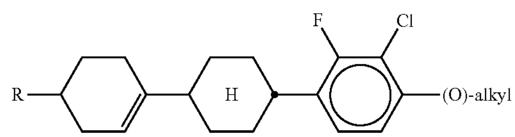

L-9

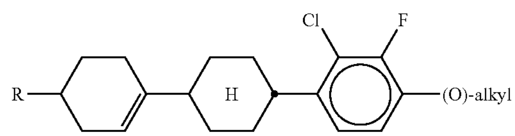

L-10

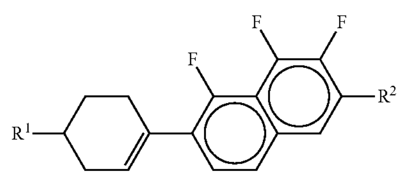

L-11

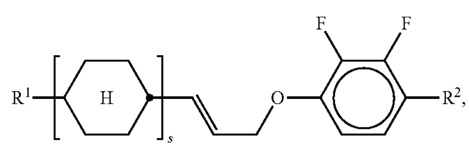

in which

R, $R^1$ and $R^2$ each, independently of one another, denote H, an alkyl or alkenyl radical having up to 15 C atoms which is unsubstituted, monosubstituted by CN or $CF_3$ or at least monosubstituted by halogen, where, in addition, one or more $CH_2$ groups in these radicals may be replaced by —O—, —S—,

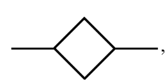

—C≡C—, —$CF_2$O—, —O$CF_2$—, —OC—O— or —O—CO— in such a way that O atoms are not linked directly to one another, a cyclopropyl ring, cyclobutyl ring or cyclopentyl ring, and alkyl denotes an alkyl radical having 1-6 C atoms. s denotes 1 or 2.

Particular preference is given to the compounds of the formulae L-1 and L-4, in particular L-4.

The compounds of the formulae L-1 to L-11 are preferably employed in concentrations of 5-50% by weight, in particular 5-40% by weight and very particularly preferably 10-40% by weight.

Particularly preferred mixture concepts are indicated below: (the acronyms used are explained in Table A). n and m here each, independently of one another, denote 1-15, preferably 1-6.

The mixtures according to the invention preferably comprise

CPY-n-Om, in particular CPY-2-O2, CPY-3-O2 and/or CPY-5-O2, preferably in concentrations >5%, in particular 10-30%, based on the mixture as a whole, and/or CY-n-Om, preferably CY-3-O2, CY-3-O4, CY-5-O2 and/or CY-5-O4, preferably in concentrations >5%, in particular 15-50%, based on the mixture as a whole, and/or CCY-n-Om, preferably CCY-4-02, CCY-3-O2, CCY-3-03, CCY-3-01 and/or CCY-5-O2, preferably in concentrations >5%, in particular 10-30%, based on the mixture as a whole, and/or CLY-n-Om, preferably CLY-2-O4, CLY-3-O2 and/or CLY-3-O3, preferably in concentrations >5%, in particular 10-30%, based on the mixture as a whole, and/or CK-n-F, preferably CK-3-F, CK-4-F and/or CK-5-F, preferably >5%, in particular 5-25%, based on the mixture as a whole.

Preference is furthermore given to mixtures according to the invention which comprise the following mixture concepts:

(n and m each, independently of one another, denote 1-6.)

CPY-n-Om and CY-n-Om, preferably in concentrations of 10-80%, based on the mixture as a whole, and/or CPY-n-Om and CK-n-F, preferably in concentrations of 10-70%, based on the mixture as a whole, and/or Y-nO-Om, preferably Y-4O-O4, in particular in concentrations of 2-20% by weight, based on the mixture as a whole, and/or CPY-n-Om and PY-n-Om, preferably CPY-2-O2 and/or CPY-3-O2 and PY-3-02, preferably in concentrations of 10-45%, based on the mixture as a whole, and/or CPY-n-Om and CLY-n-Om, preferably in concentrations of 10-80%, based on the mixture as a whole, and/or CCVC-n-V, preferably CCVC-3-V, preferably in concentrations of 2 10%, based on the mixture as a whole, and/or CCC-n-V, preferably CCC-2-V and/or CCC-3-V, preferably in concentrations of 2-10%, based on the mixture as a whole, and/or CC-1V-V2, preferably in concentrations of 5-50%, based on the mixture as a whole, and/or CC-2V-V2, preferably in concentrations of 5-50%, based on the mixture as a whole.

Preferred mixture concepts according to the invention comprise one of the following combinations of liquid-crystalline compounds (n, m=1, 2, 3, 4, 5 or 6, unless defined otherwise):

CC-4-V1+CCH-nm+CY-3-O2
CC-4-V1+CCH-nm+CY-3-O2+CCY-3-O2
CC-4-V1+CCOY-n-O2, where n=2, 3 or 4, for example
CC-4-V1+CCOY—V-Om, where m=2 or 3, for example
CC-4-V1+CCY-1V-O2
CC-4-V1+CCY-V-O1
CC-4-V1+CCY-V-O2
CC-4-V1+CCY-V-O4
CC-4-V1+CCY-V2-O2
CC-4-V1+PY-3-O2
CC-4-V1+COY-n-O2, where n=2 or 3
CC-4-V1+COY-1V-O2
CC-4-V1+COY-1V-O1
CC-4-V1+CPY—V-Om, where m=2 or 4
CC-4-V1+CY—V-Om, where m=2 or 4
CC-4-V1+PY-V2-O2
CC-4-V1+CC-3-V1
CC-3-V2+CCH-nm+CY-3-O2
CC-3-V2+CCH-nm+CY-3-O2+CCY-3-O2
CC-3-V2+CCOY-n-O2, where n=2, 3 or 4
CC-3-V2+CCOY—V-Om, where m=2 or 3
CC-3-V2+CCY-1V-O2
CC-3-V2+CCY-V-O1
CC-3-V2+CCY-V-O2
CC-3-V2+CCY-V-O4
CC-3-V2+CCY-V2-O2
CC-3-V2+PY-3-O2
CC-3-V2+COY-n-O2, where n=2 or 3
CC-3-V2+COY-1V-O2
CC-3-V2+COY-1V-O1
CC-3-V2+CPY—V-Om, where m=2 or 4
CC-3-V2+CY—V-Om, where m=2 or 4
CC-3-V2+PY-V2-O2
CC-3-V2+CC-3-V1.

The medium according to the invention preferably comprises more than one compound of the formula CC-n-Vm, where n=2-6 and m=1-6. The compounds of the formula CC-n-Vm include, in particular, compounds of the formulae CC-4-V1, CC-3-V1 and CC-3-V2. The total concentration of compounds of the formula CC-n-Vm in the mixture according to the invention is preferably 5-45% by weight, in particular 15-35%.

In a preferred embodiment, the medium according to the invention, besides one or more compounds of the formulae IA to IH, comprises at least one compound selected from the group of the compounds of the formulae T-20, T-21, IIA-26, IIA-28, IIIA-33, IIA-39, IIA-50, IIA-51, IIB-16, BF-1, BF-2, V-10, O-6a, L-4 and CC-3-V.

The invention furthermore relates to an electro-optical display having active-matrix addressing based on the ECB, VA, PS-VA, PA-VA, IPS, PS-IPS, SA-VA, UB-FFS, FFS or PS-FFS effect, characterised in that it contains, as dielectric, a liquid-crystalline medium as described above.

The liquid-crystalline medium according to the invention preferably has a nematic phase from ≤−20° C. to ≥70° C., particularly preferably from ≤−30° C. to ≥80° C., very particularly preferably from ≤−40° C. to ≥90° C.

The expression "have a nematic phase" here means on the one hand that no smectic phase and no crystallisation are observed at low temperatures at the corresponding temperature and on the other hand that clearing still does not occur on heating from the nematic phase. The investigation at low temperatures is carried out in a flow viscometer at the corresponding temperature and checked by storage in test cells having a layer thickness corresponding to the electro-optical use for at least 100 hours. If the storage stability at a temperature of −20° C. in a corresponding test cell is 1000 h or more, the medium is referred to as stable at this temperature. At temperatures of −30° C. and −40° C., the corresponding times are 500 h and 250 h respectively. At high temperatures, the clearing point is measured by conventional methods in capillaries.

The liquid-crystal mixture preferably has a nematic phase range of at least 60 K and a flow viscosity $\nu_{20}$ of at most 30 $mm^2 \cdot s^{-1}$ at 20° C.

The values of the birefringence Δn in the liquid-crystal mixture are generally between 0.07 and 0.16, preferably between 0.08 and 0.13.

The liquid-crystal mixture according to the invention has a Δε of −0.5 to −8.0, in particular −2.5 to −6.0, where Δε denotes the dielectric anisotropy. The rotational viscosity $\gamma 1$ at 20° C. is preferably ≤150 mPa-s, in particular ≤120 mPa·s.

The liquid-crystal media according to the invention have relatively low values for the threshold voltage ($V_0$). They are preferably in the range from 1.7 V to 3.0 V, particularly preferably ≤2.5 V and very particularly preferably ≤2.3 V.

For the present invention, the term "threshold voltage" relates to the capacitive threshold ($V_0$), also known as the Freedericks threshold, unless explicitly indicated otherwise.

In addition, the liquid-crystal media according to the invention have high values for the voltage holding ratio in liquid-crystal cells.

In general, liquid-crystal media having a low addressing voltage or threshold voltage exhibit a lower voltage holding ratio than those having a higher addressing voltage or threshold voltage and vice versa.

For the present invention, the term "dielectrically positive compounds" denotes compounds having a $\Delta\varepsilon \geq 1.5$, the term "dielectrically neutral compounds" denotes those having $-1.5 \leq \Delta\varepsilon \leq 1.5$ and the term "dielectrically negative compounds" denotes those having $\Delta\varepsilon < -1.5$. The dielectric anisotropy of the compounds is determined here by dissolving 10% of the compounds in a liquid-crystalline host and determining the capacitance of the resultant mixture in at least one test cell in each case having a layer thickness of 20 μm with homeotropic and with homogeneous surface alignment at 1 kHz. The measurement voltage is typically 0.5 V to 1.0 V, but is always lower than the capacitive threshold of the respective liquid-crystal mixture investigated.

All temperature values indicated for the present invention are in ° C.

The mixtures according to the invention are suitable for all VA-TFT applications, such as, for example, VAN, MVA, (S)-PVA, ASV, PSA (polymer sustained VA) and PS-VA (polymer stabilized VA), SA-VA (surface alignment VA), SS-VA (surface stabilised VA). They are furthermore suitable for IPS (in-plane switching) and FFS (fringe field switching) applications having negative Δε.

The nematic liquid-crystal mixtures in the displays according to the invention may comprise two components A and B, which themselves consist of one or more individual compounds.

Component A has significantly negative dielectric anisotropy and gives the nematic phase a dielectric anisotropy of ≤−0.5. Besides one or more compounds of the formulae IA to IH, it preferably comprises the compounds of the formulae IIA, IIB and/or IIC, furthermore one or more compounds of the formula O-17.

The proportion of component A is preferably between 45 and 100%, in particular between 60 and 100%.

For component A, one (or more) individual compound(s) which has (have) a value of $\Delta\varepsilon \leq -0.8$ is (are) preferably selected. This value would be more negative, the smaller the proportion A in the mixture as a whole.

Component B has pronounced nematogeneity and a flow viscosity of not greater than 30 $mm^2 \cdot s^{-1}$, preferably not greater than 25 $mm^2 \cdot s^{-1}$, at 20° C.

A multiplicity of suitable materials is known to the person skilled in the art from the literature for this purpose. Particular preference is given to compounds of the formula O-17.

Particularly preferred individual compounds in component B are extremely low-viscosity nematic liquid crystals having a flow viscosity of not greater than 18 $mm^2 \cdot s^{-1}$, preferably not greater than 12 $mm^2 \cdot s^{-1}$, at 20° C.

Component B is monotropically or enantiotropically nematic, has no smectic phases and is able to prevent the occurrence of smectic phases down to very low temperatures in liquid-crystal mixtures. For example, if various materials of high nematogeneity are added to a smectic liquid-crystal mixture, the nematogeneity of these materials can be compared through the degree of suppression of smectic phases that is achieved.

The mixture may optionally also comprise a component C, comprising compounds having a dielectric anisotropy of $\Delta\varepsilon \geq 1.5$. These so-called positive compounds are generally present in a mixture of negative dielectric anisotropy in amounts of ≤20% by weight, based on the mixture as a whole.

If the mixture according to the invention comprises one or more compounds having a dielectric anisotropy of $\Delta\varepsilon \geq 1.5$. these are preferably one or more compounds selected from the group of the compounds of the formulae P-1 to P-5,

P-1

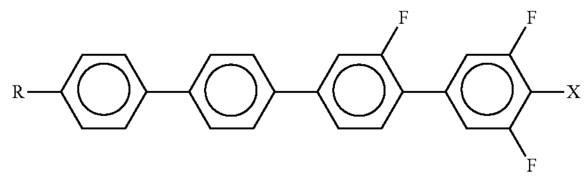

P-2

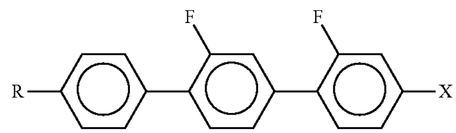

P-3

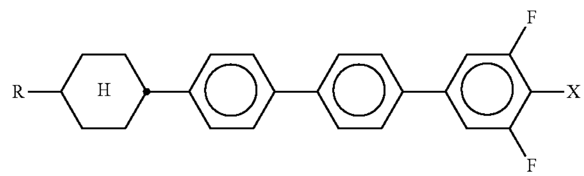

P-4

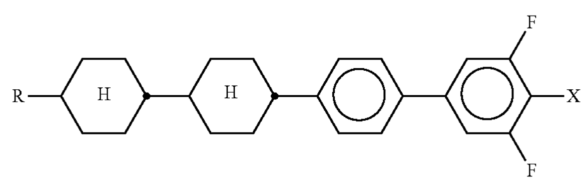

P-5

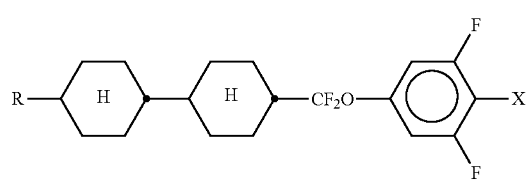

in which

R denotes straight-chain alkyl, alkoxy or alkenyl, each having 1 or 2 to 6 C atoms respectively or a cycloalkyl ring having 3, 4 or 5 C atoms, and X denotes F, Cl, $CF_3$, $OCF_3$, $OCHFCF_3$ or $CCF_2CHFCF_3$, preferably F or $OCF_3$.

The compounds of the formulae P-1 to P-5 are preferably employed in the mixtures according to the invention in concentrations of 1-15%, in particular 2-10%.

Particular preference is given to the compound of the formula

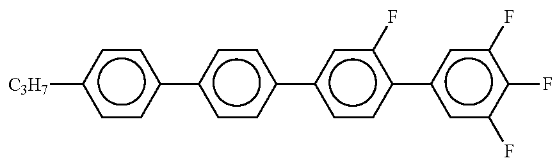

which is preferably employed in the mixtures according to the invention in amounts of 2-15%.

In addition, these liquid-crystal phases may also comprise more than 18 components, preferably 18 to 25 components.

Besides one or more compounds of the formulae IA to IH, the phases preferably comprise 4 to 15, in particular 5 to 12, and particularly preferably <10, compounds of the formulae IIA, IIB and/or IIC and optionally one or more compounds of the formula O-17.

Besides compounds of the formulae IA to IH and the compounds of the formulae IIA, IIB and/or IIC and optionally O-17, other constituents may also be present, for example in an amount of up to 45% of the mixture as a whole, but preferably up to 35%, in particular up to 10%.

The other constituents are preferably selected from nematic or nematogenic substances, in particular known substances, from the classes of the azoxybenzenes, benzylideneanilines, biphenyls, terphenyls, phenyl or cyclohexyl benzoates, phenyl or cyclohexyl cyclohexanecarboxylates, phenylcyclohexanes, cyclohexylbiphenyls, cyclohexylcyclohexanes, cyclohexylnaphthalenes, 1,4-biscyclohexylbiphenyls or cyclohexylpyrimidines, phenyl- or cyclohexyldioxanes, optionally halogenated stilbenes, benzyl phenyl ethers, tolans and substituted cinnamic acid esters.

The most important compounds which are suitable as constituents of liquid-crystal phases of this type can be characterised by the formula IV $$R^{20}\text{-L-G-E-}R^{21} \quad \text{IV}$$

in which L and E each denote a carbo- or heterocyclic ring system from the group formed by 1,4-disubstituted benzene and cyclohexane rings, 4,4'-disubstituted biphenyl, phenylcyclohexane and cyclohexylcyclohexane systems, 2,5-disubstituted pyrimidine and 1,3-dioxane rings, 2,6-disubstituted naphthalene, di- and tetrahydronaphthalene, quinazoline and tetrahydroquinazoline,

| | | |
|---|---|---|
| G denotes | —CH═CH— | —N(O)═N— |
| | —CH═CQ- | —CH═N(O)— |
| | —C≡C— | $—CH_2—CH_2—$ |
| | —CO—O— | $—CH_2—O—$ |
| | —CO—S— | $—CH_2—S—$ |
| | —CH═N— | —COO-Phe-COO— |
| | $—CF_2O—$ | —CF═CF— |
| | $—OCF_2—$ | $—OCH_2—$ |
| | $—(CH_2)_4—$ | $—(CH_2)_3O—$ |

or a C—C single bond, Q denotes halogen, preferably chlorine, or —CN, and $R^{20}$ and $R^{21}$ each denote alkyl, alkenyl, alkoxy, alkoxyalkyl or alkoxycarbonyloxy having up to 18, preferably up to 8, carbon atoms, or one of these radicals alternatively denotes CN, NC, $NO_2$, NCS, $CF_3$, $SF_5$, $OCF_3$, F, Cl or Br.

In most of these compounds, $R^{20}$ and $R^{21}$ are different from one another, one of these radicals usually being an alkyl or alkoxy group. Other variants of the proposed substituents are also common. Many such substances or also mixtures thereof are commercially available. All these substances can be prepared by methods known from the literature.

It goes without saying for the person skilled in the art that the VA, IPS or FFS mixture according to the invention may also comprise compounds in which, for example, H, N, O, Cl and F have been replaced by the corresponding isotopes.

Polymerisable compounds, so-called reactive mesogens (RMs), for example as disclosed in U.S. Pat. No. 6,861,107, may furthermore be added to the mixtures according to the invention in concentrations of preferably 0.01-5% by weight, particularly preferably 0.2-2% by weight, based on the mixture. These mixtures may optionally also comprise an initiator, as described, for example, in U.S. Pat. No. 6,781,665. The initiator, for example Irganox-1076 from BASF, is preferably added to the mixture comprising polymerisable compounds in amounts of 0-1%. Mixtures of this type can be used for so-called polymer-stabilised VA modes (PS-VA) or PSA (polymer sustained VA), in which polymerisation of the reactive mesogens is intended to take place in the liquid-crystalline mixture. The prerequisite for this is that the liquid-crystal mixture itself does not comprise any polymerisable components.

In a preferred embodiment of the invention, the polymerisable compounds are selected from the compounds of the formula M $$R^{Ma}\text{-}A^{M1}\text{-}(Z^{M1}\text{-}A^{M2})_{m1}\text{-}R^{Mb} \quad \text{M}$$

in which the individual radicals have the following meaning:

$R^{Ma}$ and $R^{Mb}$ each, independently of one another, denote P, P-Sp-, H, halogen, $SF_5$, $NO_2$, an alkyl, alkenyl or alkynyl group, where at least one of the radicals $R^{Ma}$ and $R^{Mb}$ preferably denotes or contains a group P or P-Sp-, P denotes a polymerisable group, Sp denotes a spacer group or a single bond, $A^{M1}$ and $A^{M2}$ each, independently of one another, denote an aromatic, heteroaromatic, alicyclic or heterocyclic group, preferably having 4 to 25 ring atoms, preferably C atoms, which also includes or may contain annellated rings, and which may optionally be mono- or polysubstituted by L, L denotes P, P-Sp-, OH, $CH_2OH$, F, Cl, Br, I, —CN, $—NO_2$, —NCO, —NCS, —OCN, —SCN, $—C({=}O)N(R^x)_2$, $—C({=}O)Y^1$, $—C({=}O)R^x$, $—N(R^x)_2$, optionally substituted silyl, optionally substituted aryl having 6 to 20 C atoms, or straight-chain or branched alkyl, alkoxy, alkylcarbonyl, alkoxycarbonyl, alkylcarbonyloxy or alkoxycarbonyloxy having 1 to 25 C atoms, in which, in addition, one or more H atoms may be replaced by F, Cl, P or P-Sp-, preferably P, P-Sp-, H, OH, $CH_2OH$, halogen, $SF_5$, $NO_2$, an alkyl, alkenyl or alkynyl group, $Y^1$ denotes halogen, $Z^{M1}$ denotes —O—, —S—, —CO—, —CO—O—, —OCO—, —O—CO—O—, $—OCH_2—$, $—CH_2O—$, $—SCH_2—$, $—CH_2S—$, $—CF_2O—$, $—OCF_2—$, $—CF_2S—$, $—SCF_2—$, $—(CH_2)_{n1}—$, $—CF_2CH_2—$, $—CH_2CF_2—$, $—(CF_2)_{n1}—$, —CH═CH—, —CF═CF—, —C≡C—, —CH═CH—, —COO—, —OCO—CH═CH—, $CR^0R^{00}$ or a single bond, $R^0$ and $R^{00}$ each, independently of one another, denote H or alkyl having 1 to 12 C atoms, $R^x$ denotes P, P-Sp-, H, halogen, straight-chain, branched or cyclic alkyl having 1 to 25 C atoms, in which, in addition, one or more non-adjacent $CH_2$ groups may be replaced by —O—, —S—, —CO—, —CO—O—, —O—CO—, —O—CO—O— in such a way that O and/or S atoms are not linked directly to one another, and in which, in addition, one or more H atoms may be replaced by F, Cl, P or P-Sp-, an optionally substituted aryl or aryloxy group having 6 to 40 C atoms, or an optionally substituted heteroaryl or heteroaryloxy group having 2 to 40 C atoms, m1 denotes 0, 1, 2, 3 or 4 and n1 denotes 1, 2, 3 or 4, where at least one, preferably one, two or three, particularly preferably one or two, from the group $R^{Ma}$, $R^{Mb}$ and the substituents L present denotes a group P or P-Sp- or contains at least one group P or P-Sp-.

Particularly preferred compounds of the formula M are those in which $R^{Ma}$ and $R^{Mb}$ each, independently of one another, denote P, P-Sp-, H, F, Cl, Br, I, —CN, —$NO_2$, —NCO, —NCS, —OCN, —SCN, $SF_5$ or straight-chain or branched alkyl having 1 to 25 C atoms, in which, in addition, one or more non-adjacent $CH_2$ groups may each be replaced, independently of one another, by —C($R^0$)═C($R^{00}$)—, —C≡C—, —N($R^{00}$)—, —O—, —S—, —CO—, —CO—O—, —O—CO—, —O—CO—O— in such a way that O and/or S atoms are not linked directly to one another, and in which, in addition, one or more H atoms may be replaced by F, Cl, Br, I, CN, P or P-Sp-, where at least one of the radicals $R^{Ma}$ and $R^{Mb}$ preferably denotes or contains a group P or P-Sp-, $A^{M1}$ and $A^{M2}$ each, independently of one another, denote 1,4-phenylene, naphthalene-1,4-diyl, naphthalene-2,6-diyl, phenanthrene-2,7-diyl, anthracene-2,7-diyl, fluorene-2,7-diyl, coumarine, flavone, where, in addition, one or more CH groups in these groups may be replaced by N, cyclohexane-1,4-diyl, in which, in addition, one or more non-adjacent $CH_2$ groups may be replaced by O and/or S, 1,4-cyclohexenylene, bicyclo[1.1.1]-pentane-1,3-diyl, bicyclo[2.2.2]octane-1,4-diyl, spiro[3.3]heptane-2,6-diyl, piperidine-1,4-diyl, decahydronaphthalene-2,6-diyl, 1,2,3,4-tetrahydronaphthalene-2,6-diyl, indane-2,5-diyl or octahydro-4,7-methanoindane-2,5-diyl, where all these groups may be unsubstituted or mono- or polysubstituted by L, L denotes P, P-Sp-, OH, $CH_2OH$, F, Cl, Br, I, —CN, —$NO_2$, —NCO, —NCS, —OCN, —SCN, —C(═O)N($R^x$)$_2$, —C(═O)$Y^1$, —C(═O)$R^x$, —N($R^x$)$_2$, optionally substituted silyl, optionally substituted aryl having 6 to 20 C atoms, or straight-chain or branched alkyl, alkoxy, alkylcarbonyl, alkoxycarbonyl, alkylcarbonyloxy or alkoxycarbonyloxy having 1 to 25 C atoms, in which, in addition, one or more H atoms may be replaced by F, Cl, P or P-Sp-, P denotes a polymerisable group, $Y^1$ denotes halogen, $R^x$ denotes P, P-Sp-, H, halogen, straight-chain, branched or cyclic alkyl having 1 to 25 C atoms, in which, in addition, one or more non-adjacent $CH_2$ groups may be replaced by —O—, —S—, —CO—, —CO—O—, —O—CO—, —O—CO—O— in such a way that O and/or S atoms are not linked directly to one another, and in which, in addition, one or more H atoms may be replaced by F, Cl, P or P-Sp-, an optionally substituted aryl or aryloxy group having 6 to 40 C atoms, or an optionally substituted heteroaryl or heteroaryloxy group having 2 to 40 C atoms.

Very particular preference is given to compounds of the formula M in which one of $R^{Ma}$ and $R^{Mb}$ or both denote P or P-Sp-.

Suitable and preferred RMs or monomers or comonomers for use in liquid-crystalline media and PS-VA displays or PSA displays according to the invention are selected, for example from the following formulae:

M1

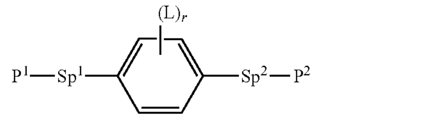

M2

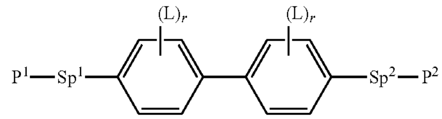

M3

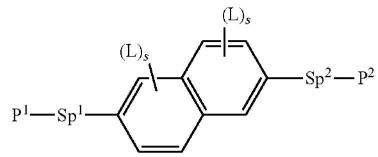

M4

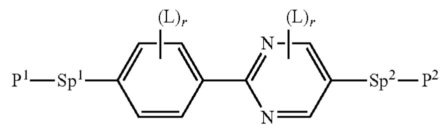

M5

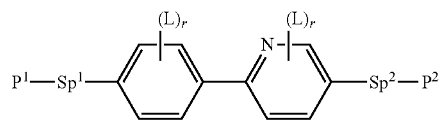

M6

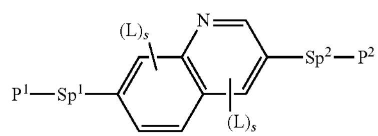

M7

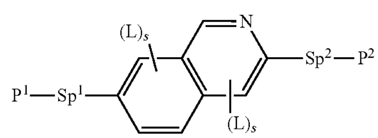

M8

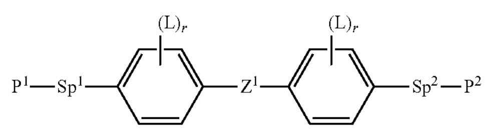

M9

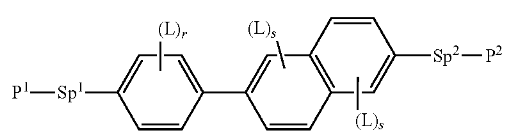

M10

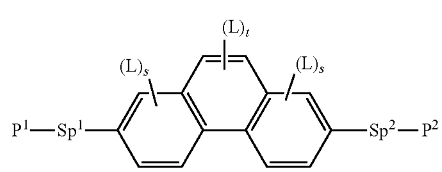

M11

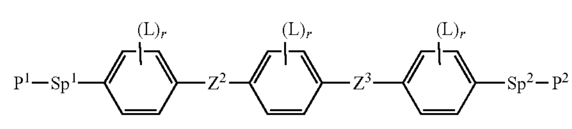

-continued
M12
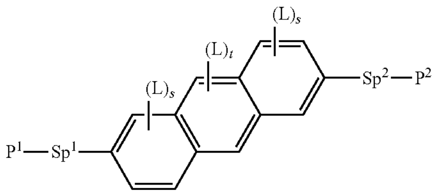
M13
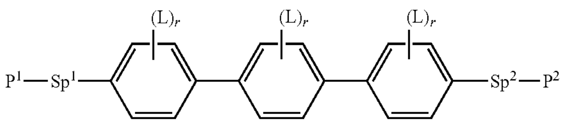
M14
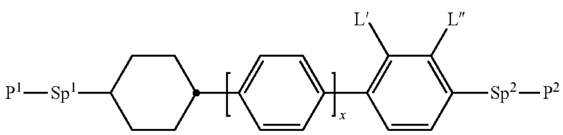
M15
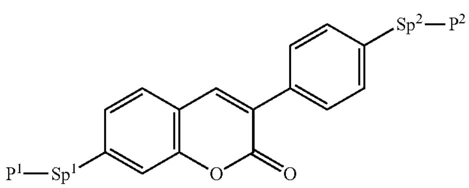
M16
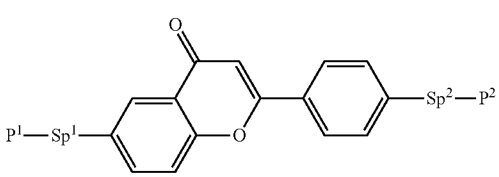
M17
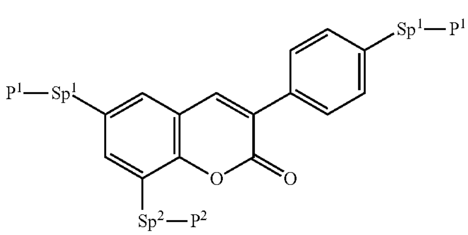
M18
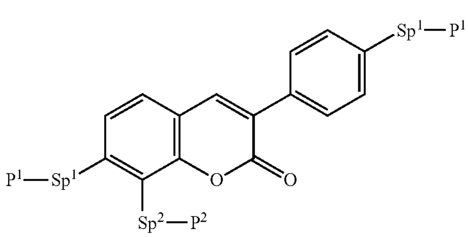
M19
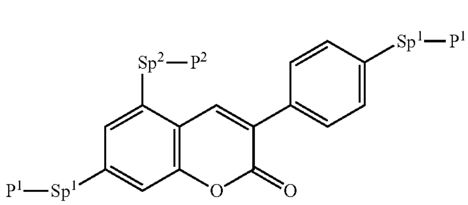
-continued
M20
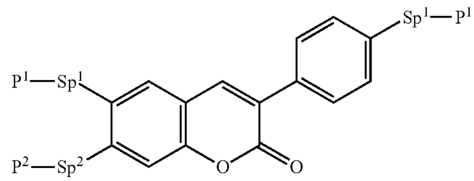
M21
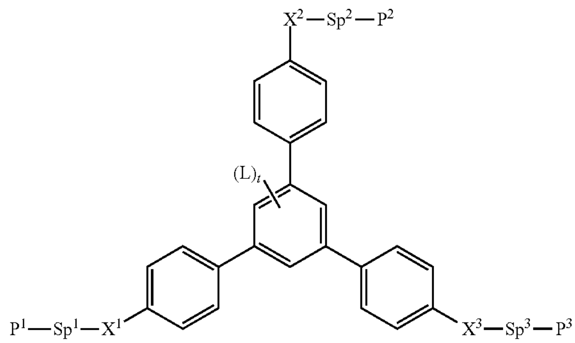
M22
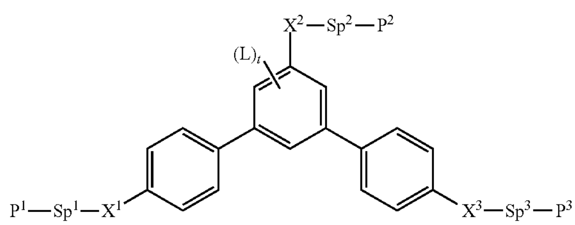
M23
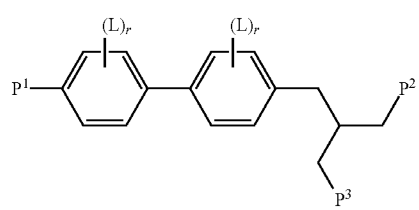
M24
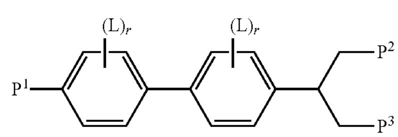
M25
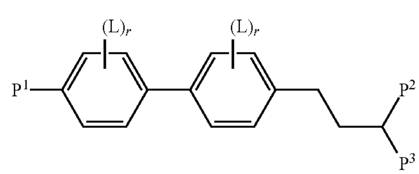
M26
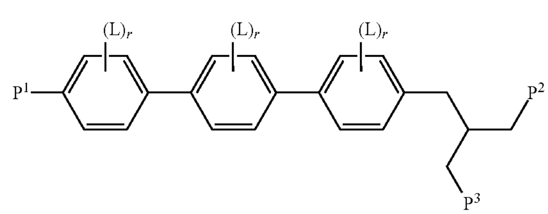

-continued

M27

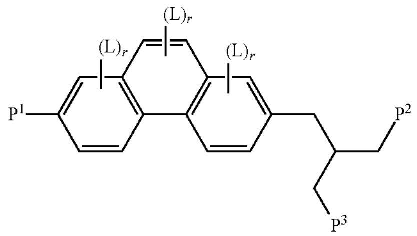

M28

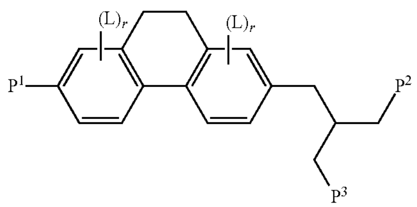

M29

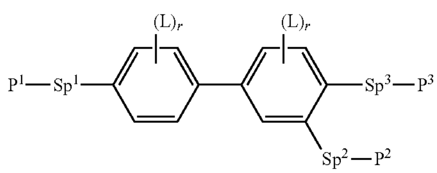

M30

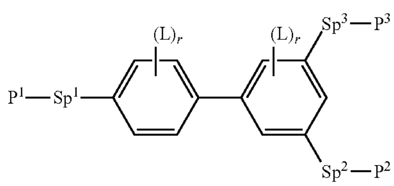

M31

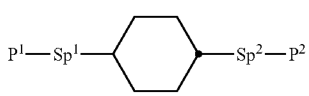

M32

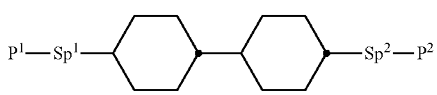

M33

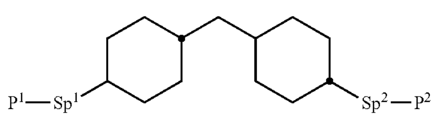

M34

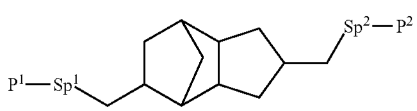

M35

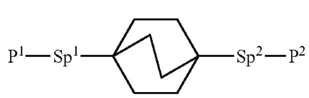

M36

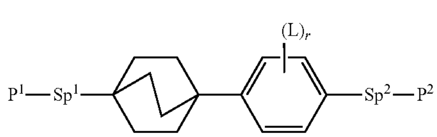

M37

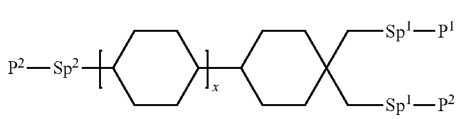

-continued

M38

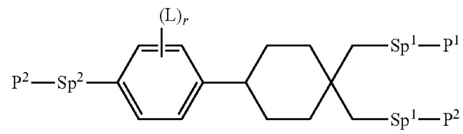

M39

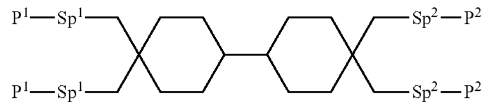

M40

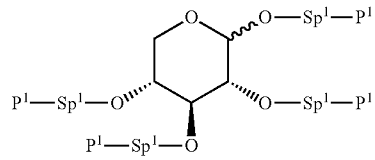

M41

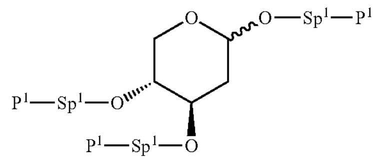

M42

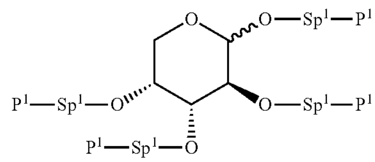

M43

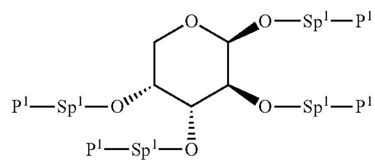

M44

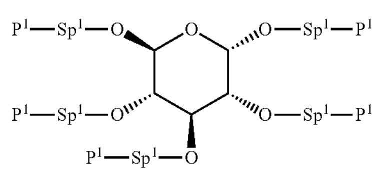

in which the individual radicals have the following meanings:

$P^1$,$P^2$ and $P^3$ each, identically or differently, denote a polymerisable group, preferably having one of the meanings indicated above and below for P, particularly preferably an acrylate, methacrylate, fluoroacrylate, oxetane, vinyloxy or epoxy group, $Sp^1$, $Sp^2$ and $Sp^3$ each, independently of one another, denote a single bond or a spacer group, preferably having one of the meanings indicated above and below for $Sp^a$, and particularly preferably —$(CH_2)_{p1}$—, —$(CH_2)_{p1}$—O—, —$(CH_2)_{p1}$—CO—O— or —$(CH_2)_{p1}$—O—CO—O—, in which p1 is an integer from 1 to 12, and where in the last-mentioned groups the linking to the adjacent ring takes place via the O atom, where one or more of the radicals $P^1$-$Sp^1$-, $P^2$-$Sp^2$- and $P^3$-$Sp^3$- may also denote $R^{aa}$, with the proviso that at least one of the radicals $P^1$-$Sp^1$-, $P^2$—$Sp^2$- and $P^3$-$Sp^3$- present does not denote $R^{aa}$, $R^{aa}$ denotes H, F, Cl, CN or straight-chain or branched alkyl having 1 to 25 C atoms, in which, in addition, one or more non-adjacent $CH_2$ groups may each be replaced, independently of one another, by $C(R^0)=C(R^{00})$—, —C≡C—, —$N(R^0)$—, —O—, —S—, —CO—, —CO—O—, —O—CO—, —O—CO—O— in such a way that O and/or S atoms are not linked directly to one another, and in which, in addition, one or more H atoms may be replaced by F, Cl, CN or $P^1$-$Sp^1$-, particularly preferably straight-chain or branched, optionally mono- or polyfluorinated, alkyl, alkoxy, alkenyl, alkynyl, alkylcarbonyl, alkoxycarbonyl or alkylcarbonyloxy having 1 to 12 C atoms (where the alkenyl and alkynyl radicals have at least two and the branched radicals at least three C atoms), $R^0$, $R^{00}$ each, independently of one another and on each occurrence identically or differently, denote H or alkyl having 1 to 12 C atoms, $R^y$ and $R^z$ each, independently of one another, denote H, F, $CH_3$ or $CF_3$, $X^1$, $X^2$ and $X^3$ each, independently of one another, denote —CO—O—, O—CO— or a single bond, $Z^1$ denotes-O—, —CO—, —$C(R^yR^z)$— or —$CF_2CF_2$—, $Z^2$ and $Z^3$ each, independently of one another, denote —CO—O—, —O—CO—, —$CH_2O$—, —$OCH_2$—, —$CF_2O$—, —$OCF_2$— or —$(CH_2)_n$—, where n is 2, 3 or 4, L on each occurrence, identically or differently, denotes F, Cl, CN, SCN, $SF_5$ or straight-chain or branched, optionally mono- or polyfluorinated, alkyl, alkoxy, alkenyl, alkynyl, alkylcarbonyl, alkoxycarbonyl, alkylcarbonyloxy or alkoxycarbonyloxy having 1 to 12 C atoms, preferably F or $CH_3$, L' and L" each, independently of one another, denote H, $CH_3$, F or C, r denotes 0, 1, 2, 3 or 4, s denotes 0, 1, 2 or 3, t denotes 0, 1 or 2, x denotes 0 or 1.

In the compounds of the formulae M1 to M36,

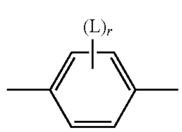

preferably denotes

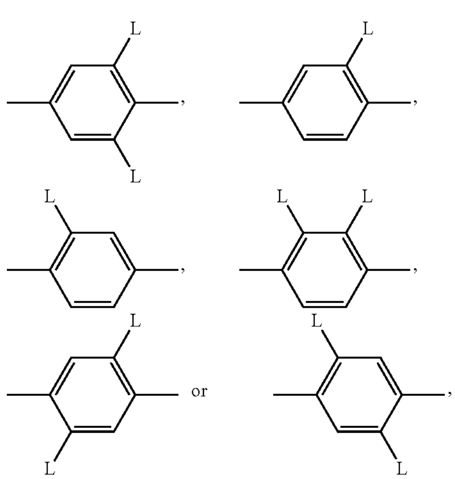

in which L, identically or differently on each occurrence, has one of the above meanings and preferably denotes F, C, CN, $NO_2$, $CH_3$, $C_2H_5$, $C(CH_3)_3$, $CH(CH_3)_2$, $CH_2CH(CH_3)C_2H_5$, $OCH_3$, $OC_2H_5$, $COCH_3$, $COC_2H_5$, $COOCH_3$, $COOC_2H_5$, $CF_3$, $OCF_3$, $OCHF_2$, $OC_2F_5$ or P-Sp-, particularly preferably F, Cl, CN, $CH_3$, $C_2H_5$, $OCH_3$, $COCH_3$, $OCF_3$ or P-Sp-, very particularly preferably F, Cl, $CH_3$, $OCH_3$, $COCH_3$ or $OCF_3$, in particular F or $CH_3$.

Suitable polymerisable compounds are listed, for example, in Table D.

The liquid-crystalline media in accordance with the present application preferably comprise in total 0.1 to 10%, preferably 0.2 to 4.0%, particularly preferably 0.2 to 2.0%, of polymerisable compounds.

Particular preference is given to the polymerisable compounds of the formula M and the formulae RM-1 to RM-102.

The mixtures according to the invention may furthermore comprise conventional additives, such as, for example, stabilisers, antioxidants, UV absorbers, nanoparticles, microparticles, etc.

The structure of the liquid-crystal displays according to the invention corresponds to the usual geometry, as described, for example, in EP-A 0 240 379.

The following examples are intended to explain the invention without limiting it. Above and below, percent data denote percent by weight; all temperatures are indicated in degrees Celsius.

Throughout the patent application, 1,4-cyclohexylene rings and 1,4-phenylene rings are depicted as follows:

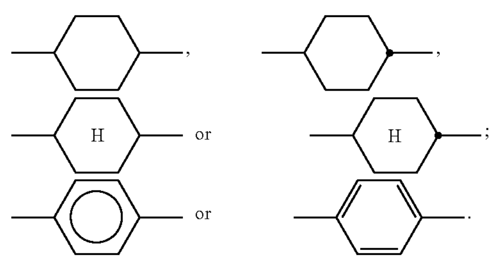

The cyclohexylene rings are trans-14-cyclohexylene rings.

Throughout the patent application and in the working examples, the structures of the liquid-crystal compounds are indicated by means of acronyms. Unless indicated otherwise, the transformation into chemical formulae is carried out in accordance with Tables 1-3. All radicals $C_nH_{2n+1}$, $C_mH_{2m+1}$ and $C_{m'}H_{2m'+1}$ or $C_nH_{2n}$ n and $C_mH_{2m}$ are straight-chain alkyl radicals or alkylene radicals respectively, in each case having n, m, m' or z C atoms respectively. n, m, m', z each denote, independently of one another, 1, 2, 3, 4, 5, 6, 7, 8, 9, 10, 11 or 12, preferably 1, 2, 3, 4, 5 or 6. In Table 1 the ring elements of the respective compound are coded, in Table 2 the bridging members are listed and in Table 3 the meanings of the symbols for the left-hand or right-hand side chains of the compounds are indicated.

TABLE 1

| Ring elements |
|---|
| 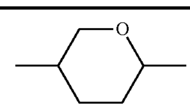 A |

TABLE 1-continued
| Ring elements |
| --- |
| 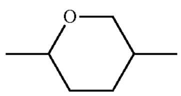 AI |
| 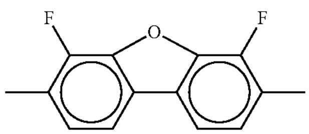 B |
| 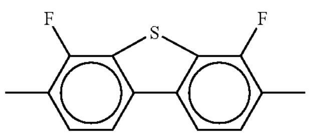 B(S) |
| 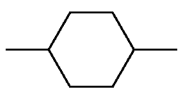 C |
| 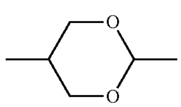 D |
| 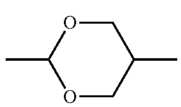 DI |
| 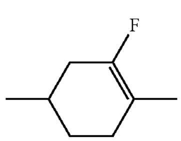 F |
| 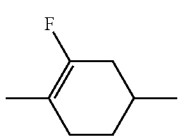 FI |
| 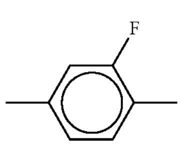 G |
TABLE 1-continued
| Ring elements |
| --- |
| 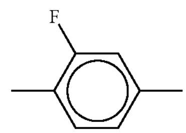 GI |
| 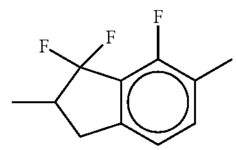 K |
| 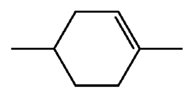 L |
| 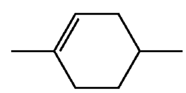 LI |
| 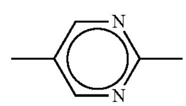 M |
| 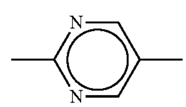 MI |
| 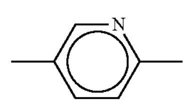 N |
| 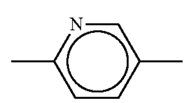 NI |
| 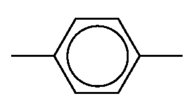 P |
| 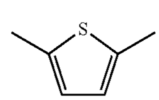 S |

TABLE 1-continued

Ring elements

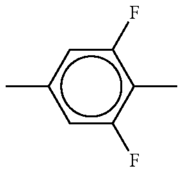

U

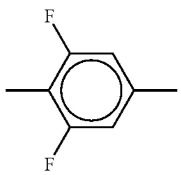

UI

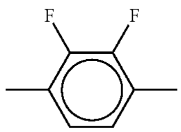

Y

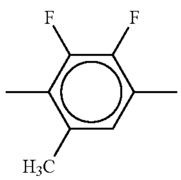

Y1

TABLE 1-continued

Ring elements

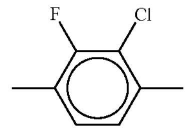

Y(F, Cl)

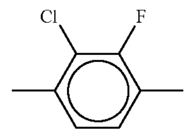

Y(Cl, F)

TABLE 2

| Bridging members | | | |
|---|---|---|---|
| E | $—CH_2CH_2—$ | | |
| V | —CH═CH— | | |
| T | —C≡C— | | |
| W | $—CF_2CF_2—$ | | |
| Z | —COO— | ZI | —OCO— |
| O | $—CH_2O—$ | OI | $—OCH_2—$ |
| Q | $—CF_2O—$ | QI | $—OCF_2—$ |

TABLE 3

| Side chains | | | |
|---|---|---|---|
| Left-hand side chain | | Right-hand side chain | |
| n- | $C_nH_{2n+1}—$ | -n | $—C_nH_{2n+1}$ |
| nO- | $C_nH_{2n+1}—O—$ | -On | $—O—C_nH_{2n+1}$ |
| nS- | $C_nH_{2n+1}—S—$ | -Sn | $—S—C_nH_{2n+1}$ |
| V- | $CH_2═CH—$ | -V | $—CH═CH_2$ |
| nV- | $C_nH_{2n+1}—CH═CH—$ | -nV | $—C_nH_{2n}—CH═CH_2$ |
| Vn- | $CH_2═CH—C_nH_{2n}—$ | -Vn | $—CH═CH—C_nH_{2n+1}$ |
| nVm- | $C_nH_{2n+1}—CH═CH—C_mH_{2m}—$ | -nVm | $—C_nH_{2n}—CH═CH\text{-}C_mH_{2m+1}$ |
| N- | N≡C— | -N | —C≡N |
| F- | F— | -F | —F |
| Cl- | Cl— | -Cl | —Cl |
| M- | $CFH_2—$ | -M | $—CFH_2$ |
| D- | $CF_2H—$ | -D | $—CF_2H$ |
| T- | $CF_3—$ | -T | $—CF_3$ |
| MO- | $CFH_2O—$ | -OM | $—OCFH_2$ |
| DO- | $CF_2HO—$ | -OD | $—OCF_2H$ |
| TO- | $CF_3O—$ | -OT | $—OCF_3$ |
| T- | $CF_3—$ | -T | $—CF_3$ |
| A- | H—C≡C— | -A | —C≡C—H |
| C3- | 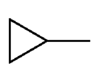 | -3C | 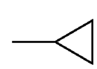 |
| C4- | 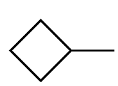 | -4C | 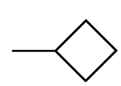 |

TABLE 3-continued

| Side chains | | | |
|---|---|---|---|
| Left-hand side chain | | Right-hand side chain | |
| C5- | 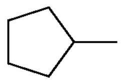 | -5C | 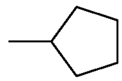 |

Besides one or more compounds of the formulae IA to IH, the mixtures according to the invention preferably comprise one or more compounds of the compounds from Table A mentioned below.

TABLE A

| The following abbreviations are used: (n, m, m', z: each, independently of one another, 1, 2, 3, 4, 5 or 6; (O)$C_mH_{2m+1}$ means $OC_mH_{2m+1}$ or $C_mH_{2m+1}$) |
|---|
| 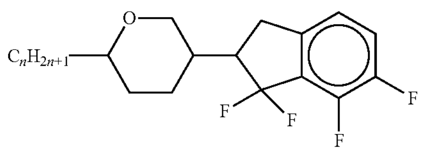 |
| AIK-n-F |
| 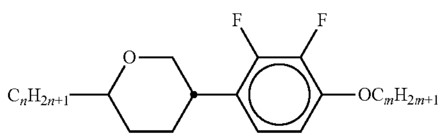 |
| AIY-n-Om |
| 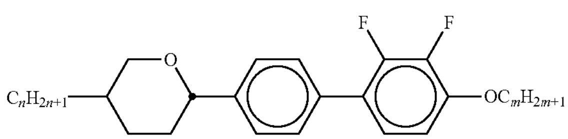 |
| APY-n-Om |
| 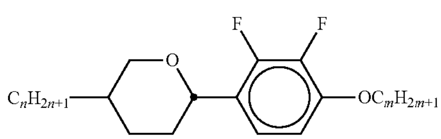 |
| AY-n-Om |
| 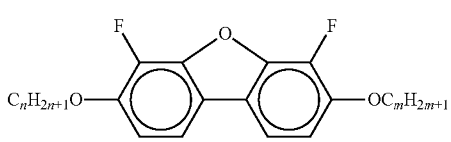 |
| B-nO-Om |
| 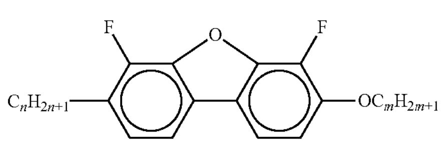 |
| B-n-Om |

TABLE A-continued
| The following abbreviations are used: (n, m, m', z: each, independently of one another, 1, 2, 3, 4, 5 or 6; $(O)C_mH_{2m+1}$ means $OC_mH_{2m+1}$ or $C_mH_{2m+1}$) |
| --- |
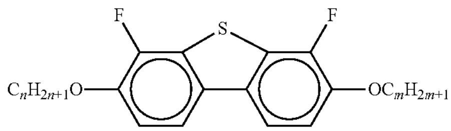
B(S)-nO-Om
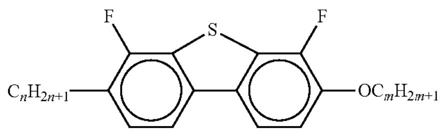
B(S)-n-Om
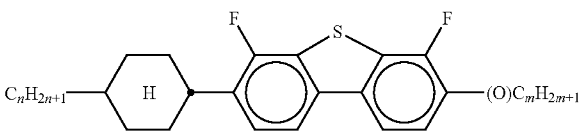
CB(S)-n-(O)m
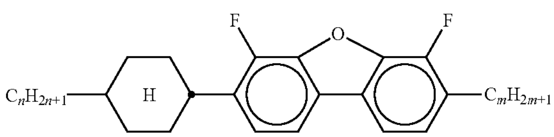
CB-n-m
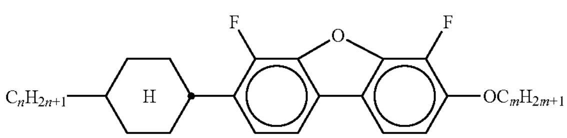
CB-n-Om
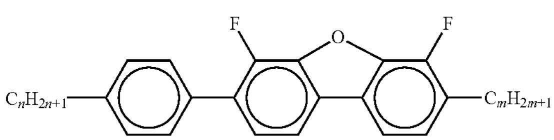
PB-n-m
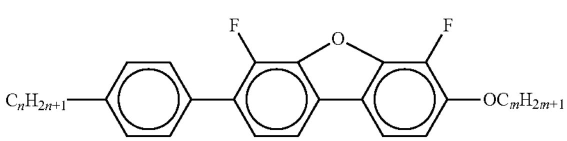
PB-n-Om
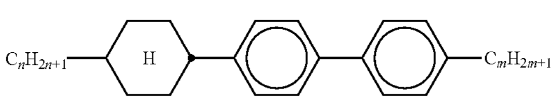
BCH-nm TABLE A-continued
| The following abbreviations are used: (n, m, m', z: each, independently of one another, 1, 2, 3, 4, 5 or 6; (O)$C_mH_{2m+1}$ means $OC_mH_{2m+1}$ or $C_mH_{2m+1}$) |
|---|
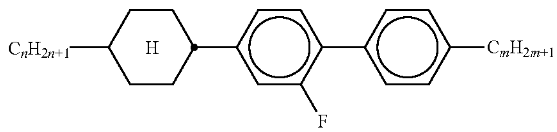
BCH-nmF
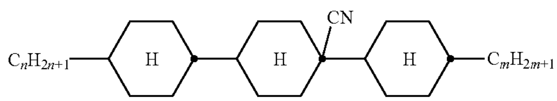
BCN-nm
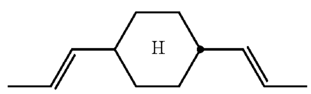
C-1V-V1
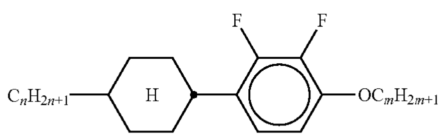
CY-n-Om
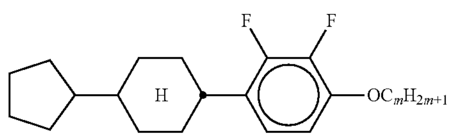
CY-C5-Om
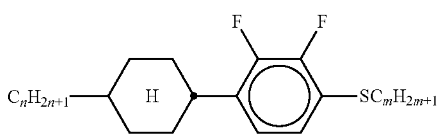
CY-n-Sm
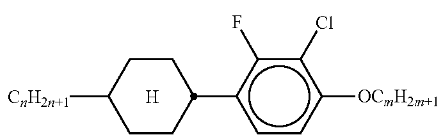
CY(F, Cl)-n-Om
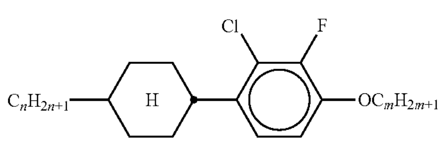
CY(Cl, F)-n-Om
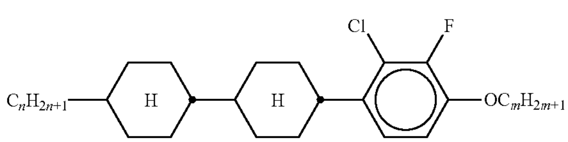
CCY-n-Om TABLE A-continued
| The following abbreviations are used: (n, m, m', z: each, independently of one another, 1, 2, 3, 4, 5 or 6; (O)$C_mH_{2m+1}$ means $OC_mH_{2m+1}$ or $C_mH_{2m+1}$) |
|---|
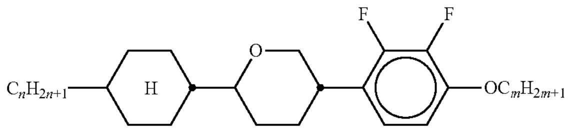
CAIY-n-Om
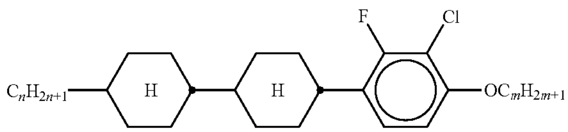
CCY(F, Cl)-n-Om
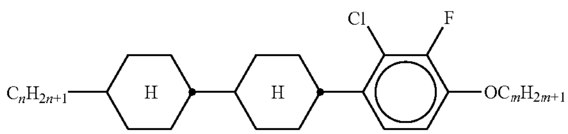
CCY(Cl, F)-n-Om
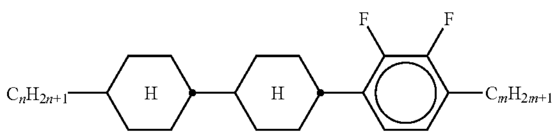
CCY-n-m
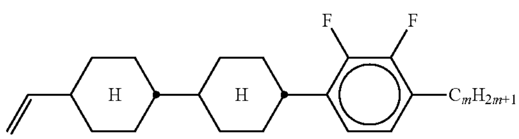
CCY-V-m
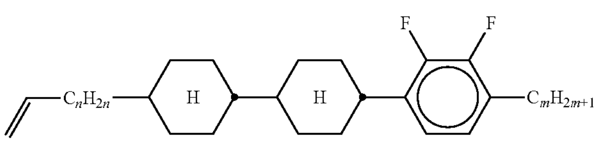
CCY-Vn-m
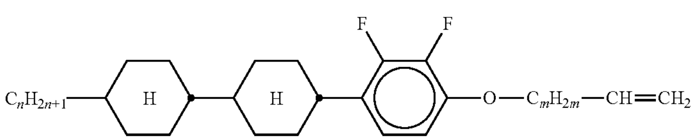
CCY-n-OmV
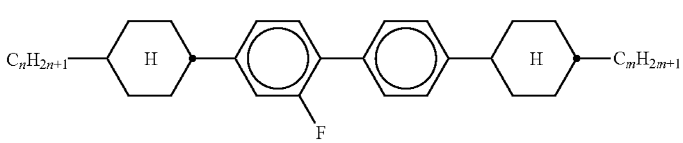
CBC-nmF TABLE A-continued
| The following abbreviations are used: (n, m, m', z: each, independently of one another, 1, 2, 3, 4, 5 or 6; (O)$C_mH_{2m+1}$ means $OC_mH_{2m+1}$ or $C_mH_{2m+1}$) |
| --- |
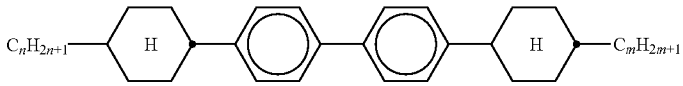
CBC-nm
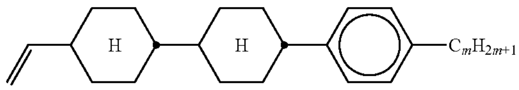
CCP-V-m
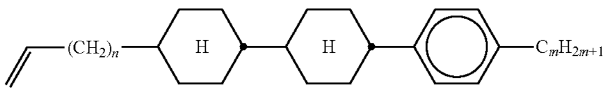
CCP-Vn-m
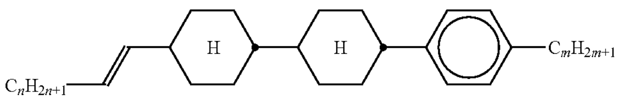
CCP-nV-m
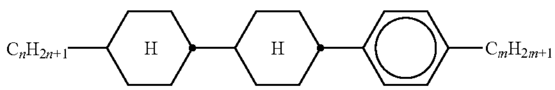
CCP-n-m
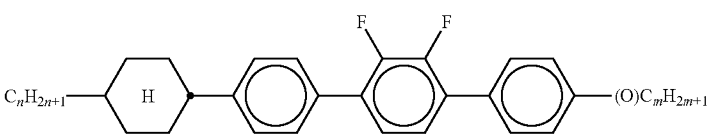
CPYP-n-(O)m
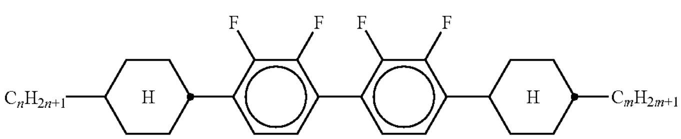
CYYC-n-m
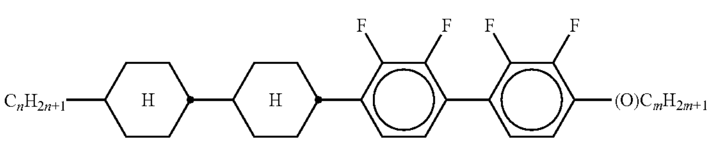
CCYY-n-(O)m
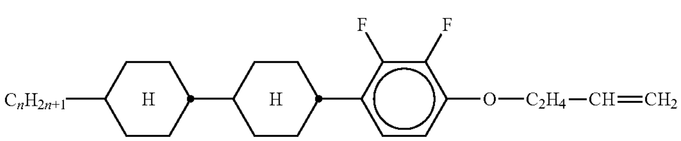
CCY-n-O2V
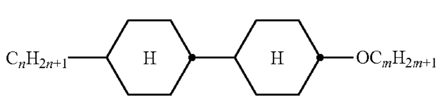
CCH-nOm TABLE A-continued
| The following abbreviations are used: (n, m, m', z: each, independently of one another, 1, 2, 3, 4, 5 or 6; (O)$C_mH_{2m+1}$ means $OC_mH_{2m+1}$ or $C_mH_{2m+1}$) |
|---|
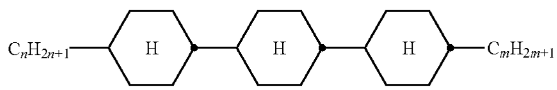
CCC-n-m
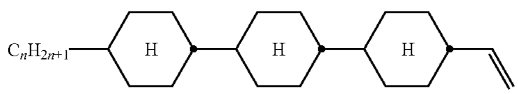
CCC-n-V
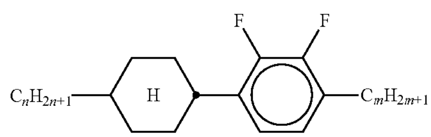
CY-n-m
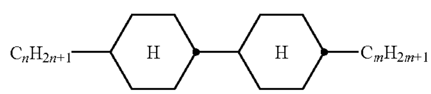
CCH-nm
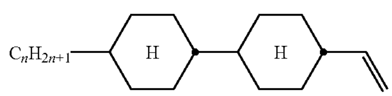
CC-n-V
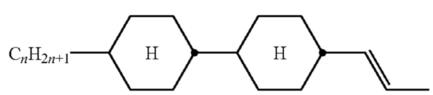
CC-n-V1
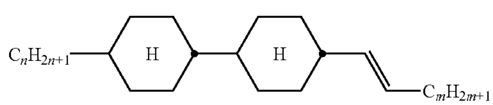
CC-n-Vm
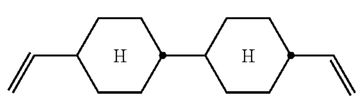
CC-V-V
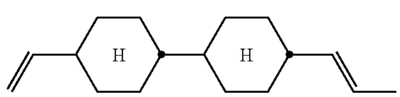
CC-V-V1
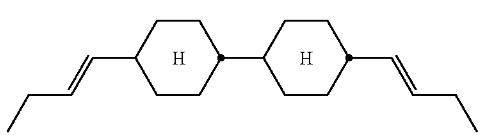
CC-2V-V2

TABLE A-continued
| The following abbreviations are used: (n, m, m', z: each, independently of one another, 1, 2, 3, 4, 5 or 6; (O)$C_mH_{2m+1}$ means $OC_mH_{2m+1}$ or $C_mH_{2m+1}$) |
|---|
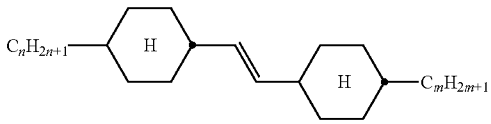
CVC-n-m
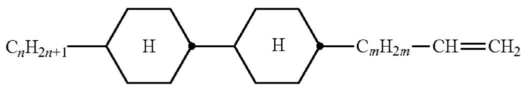
CC-n-mV
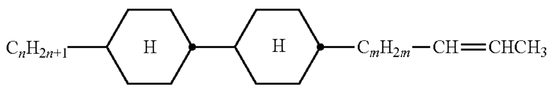
CC-n-mV1
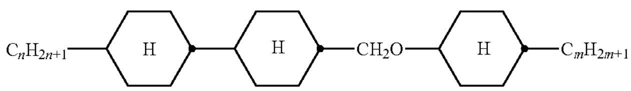
CCOC-n-m
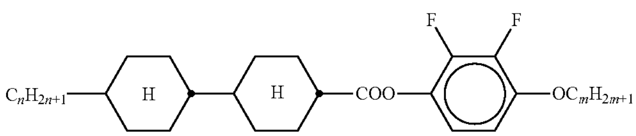
CP-nOmFF
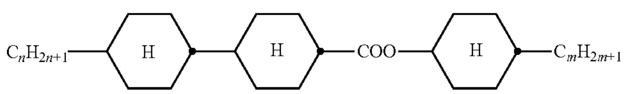
CH-nm
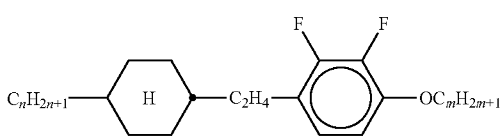
CEY-n-Om
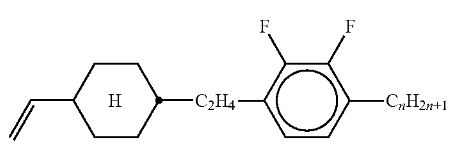
CEY-V-n
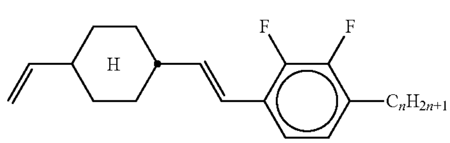
CVY-V-n TABLE A-continued
| The following abbreviations are used: (n, m, m', z: each, independently of one another, 1, 2, 3, 4, 5 or 6; (O)$C_mH_{2m+1}$ means $OC_mH_{2m+1}$ or $C_mH_{2m+1}$) |
| --- |
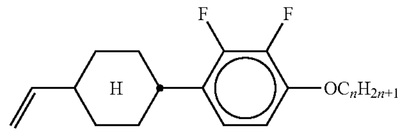
CY-V-On
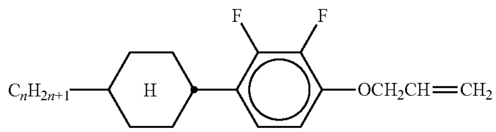
CY-n-O1V
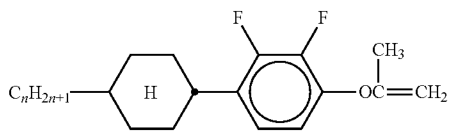
CY-n-OC($CH_3$)=$CH_2$
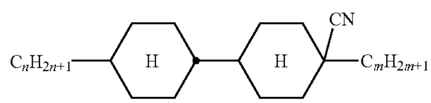
CCN-nm
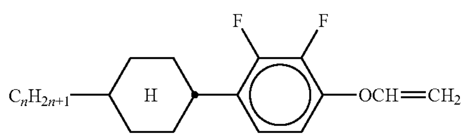
CY-n-OV
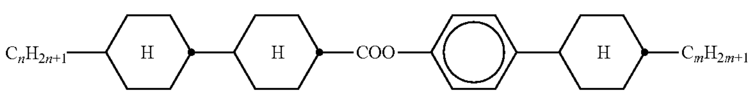
CCPC-nm
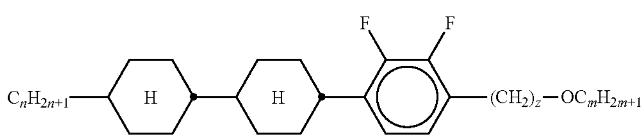
CCY-n-zOm
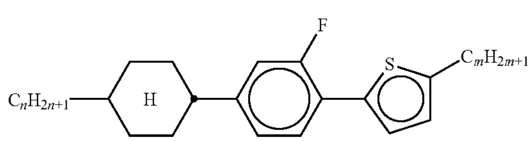
CGS-n-m
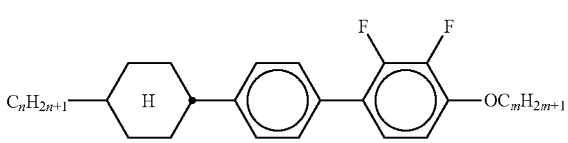
CPY-n-Om TABLE A-continued
| The following abbreviations are used: (n, m, m', z: each, independently of one another, 1, 2, 3, 4, 5 or 6; (O)$C_mH_{2m+1}$ means $OC_mH_{2m+1}$ or $C_mH_{2m+1}$) |
| --- |
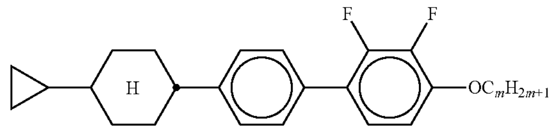
CPY-C3-Om
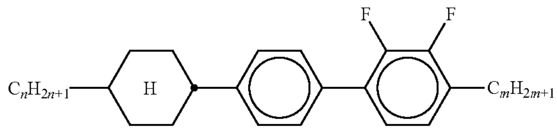
CPY-n-m
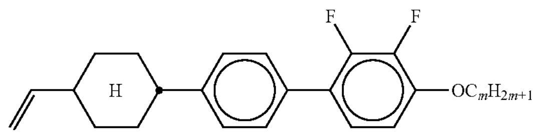
CPY-V-Om
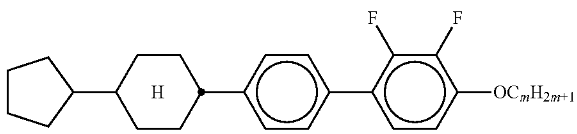
CPY-C5-Om
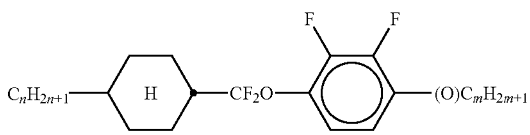
CQY-n-(O)m
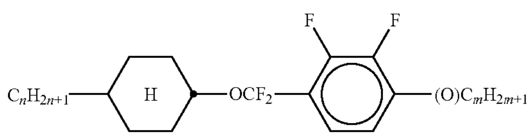
CQIY-n-(O)m
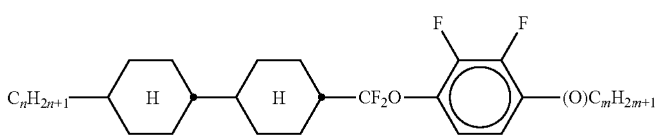
CCQY-n-(O)m
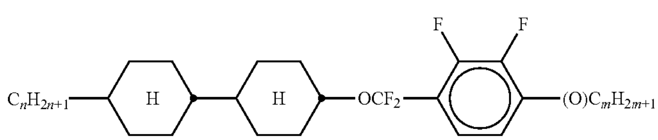
CCQIY-n-(O)m
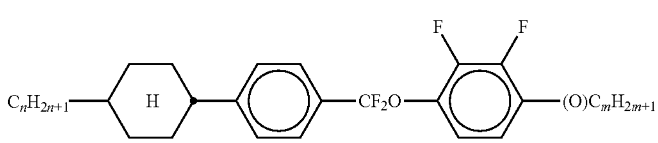
CPQY-n-(O)m TABLE A-continued
| The following abbreviations are used: (n, m, m', z: each, independently of one another, 1, 2, 3, 4, 5 or 6; $(O)C_mH_{2m+1}$ means $OC_mH_{2m+1}$ or $C_mH_{2m+1}$) |
| --- |
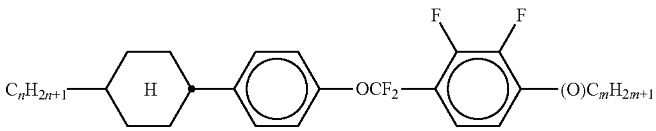
CPQIY-n-(O)m
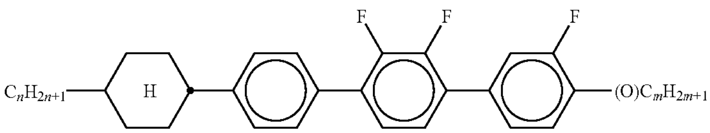
CPYG-n-(O)m
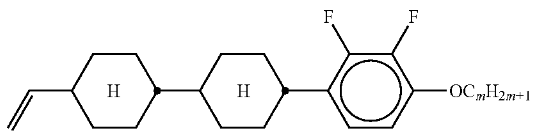
CCY-V-Om
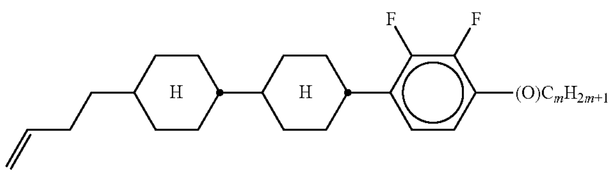
CCY-V2-(O)m
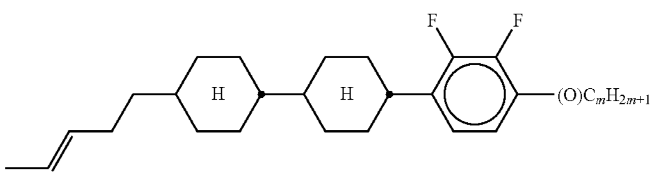
CCY-1V2-(O)m
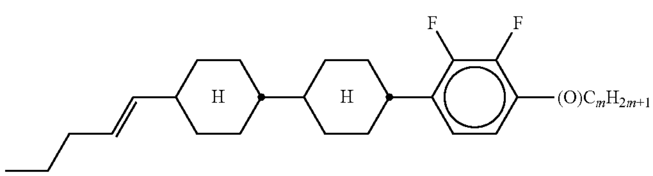
CCY-3V-(O)m
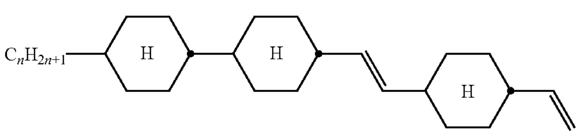
CCVC-n-V
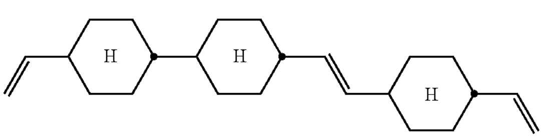
CCVC-V-V TABLE A-continued
The following abbreviations are used:
(n, m, m', z: each, independently of one another, 1, 2, 3, 4, 5 or 6;
$(O)C_mH_{2m+1}$ means $OC_mH_{2m+1}$ or $C_mH_{2m+1}$)
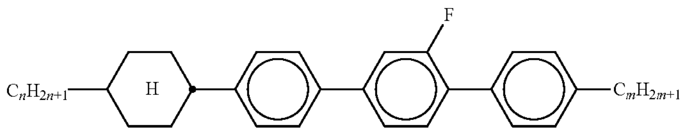
CPGP-n-m
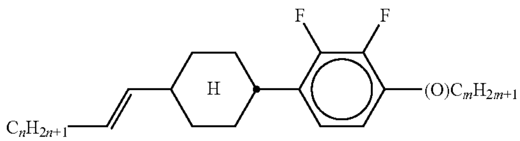
CY-nV-(O)m
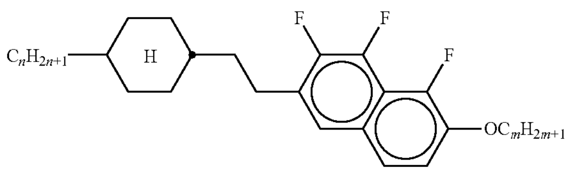
CENaph-n-Om
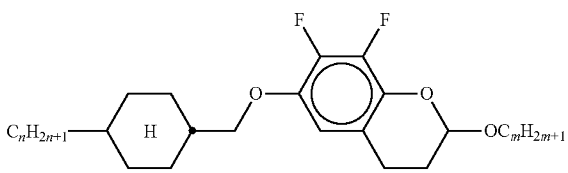
COChrom-n-Om
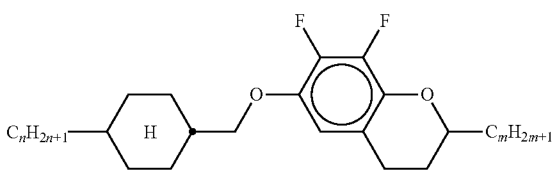
COChrom-n-m
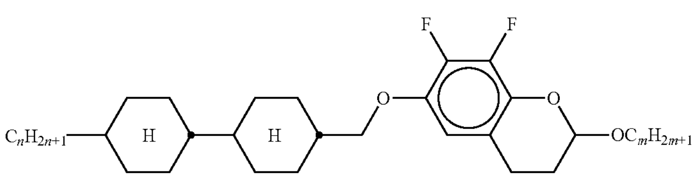
CCOChrom-n-Om
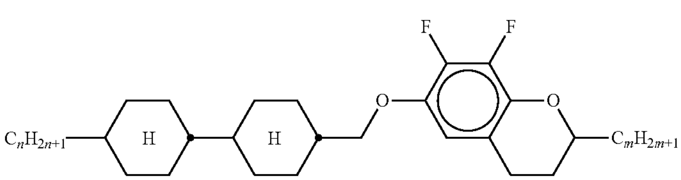
CCOChrom-n-m TABLE A-continued
The following abbreviations are used:
(n, m, m', z: each, independently of one another, 1, 2, 3, 4, 5 or 6;
(O)$C_mH_{2m+1}$ means $OC_mH_{2m+1}$ or $C_mH_{2m+1}$)
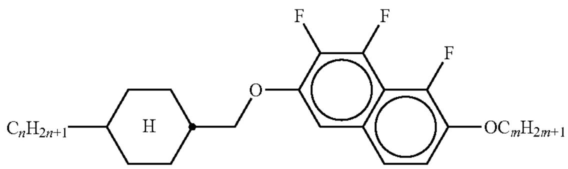
CONaph-n-Om
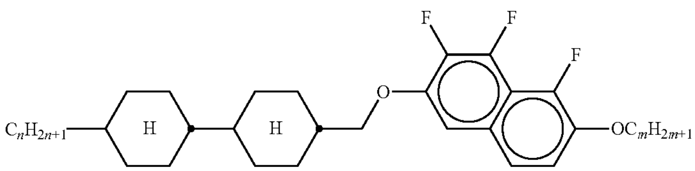
CCONaph-n-Om
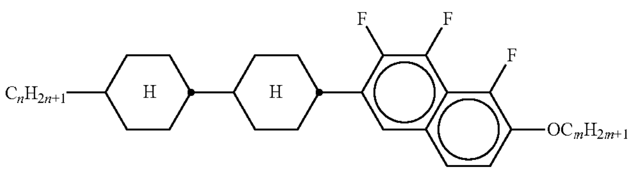
CCNaph-n-Om
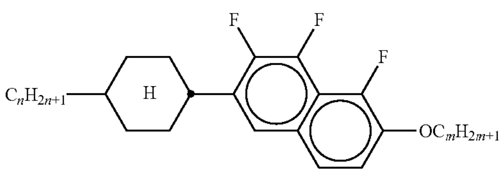
CNaph-n-Om
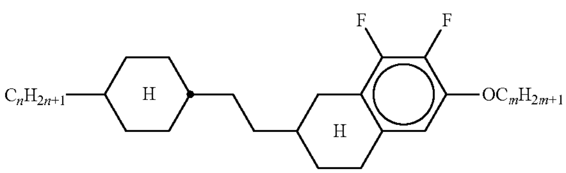
CETNaph-n-Om
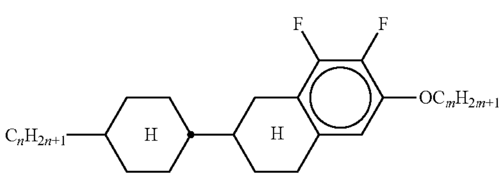
CTNaph-n-Om
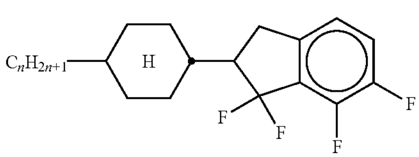
CK-n-F TABLE A-continued
The following abbreviations are used:
(n, m, m', z: each, independently of one another, 1, 2, 3, 4, 5 or 6;
(O)$C_mH_{2m+1}$ means $OC_mH_{2m+1}$ or $C_mH_{2m+1}$)
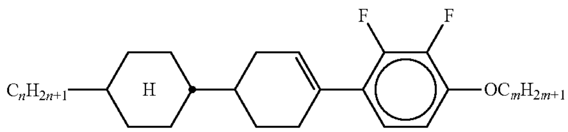
CLY-n-Om
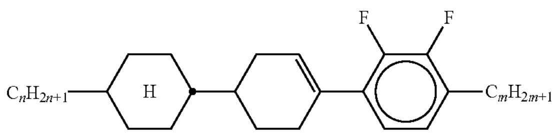
CLY-n-m
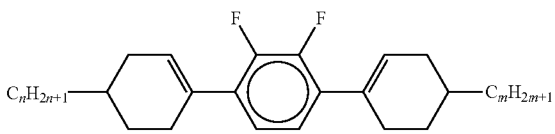
LYLI-n-m
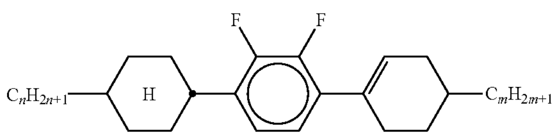
CYLI-n-m
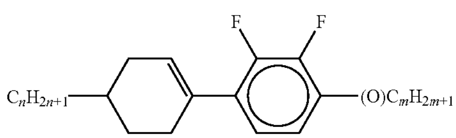
LY-n-(O)m
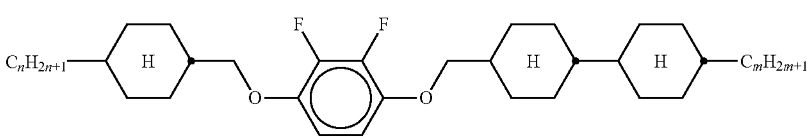
COYOICC-n-m
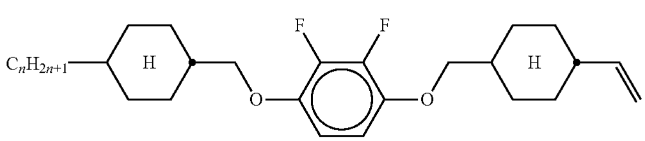
COYOIC-n-V
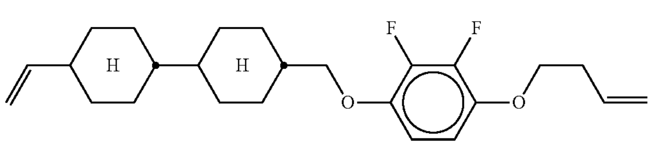
CCOY-V-O2V TABLE A-continued
| The following abbreviations are used: (n, m, m', z: each, independently of one another, 1, 2, 3, 4, 5 or 6; $(O)C_mH_{2m+1}$ means $OC_mH_{2m+1}$ or $C_mH_{2m+1}$) |
|---|
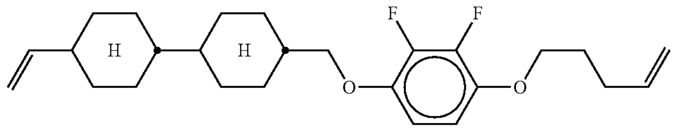
CCOY-V-O3V
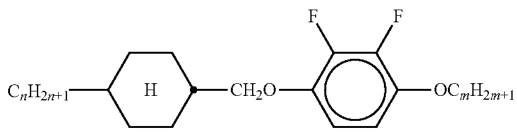
COY-n-Om
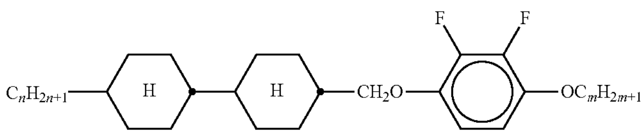
CCOY-n-Om
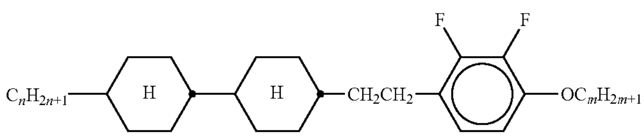
CCEY-n-Om
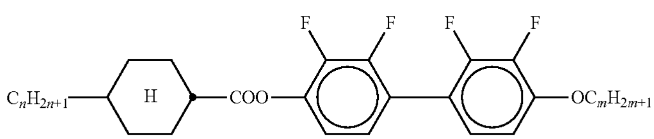
CZYY-n-Om
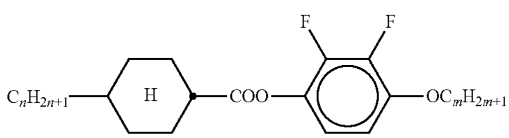
D-nOmFF
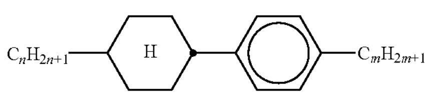
PCH-nm
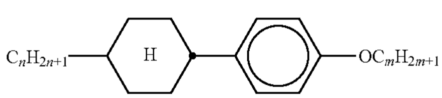
PCH-nOm
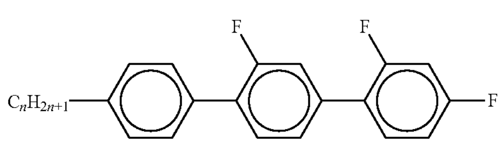
PGIGI-n-F TABLE A-continued
| The following abbreviations are used: (n, m, m', z: each, independently of one another, 1, 2, 3, 4, 5 or 6; (O)$C_mH_{2m+1}$ means $OC_mH_{2m+1}$ or $C_mH_{2m+1}$) |
|---|
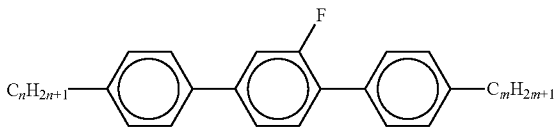
PGP-n-m
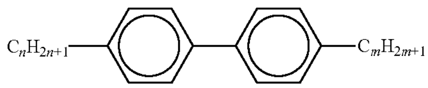
PP-n-m
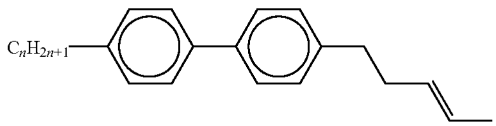
PP-n-2V1
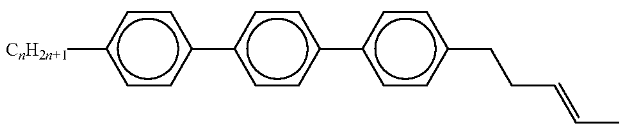
PPP-n-2V1
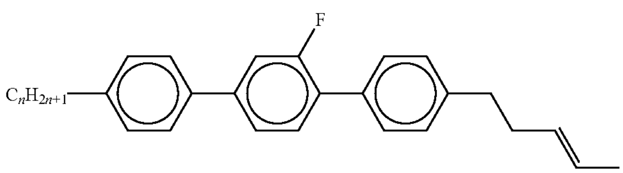
PGP-n-2V1
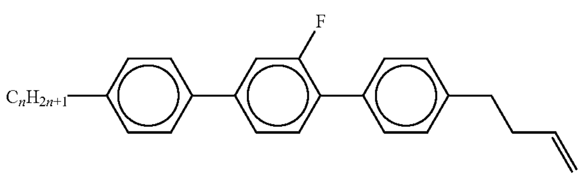
PGP-n-2V
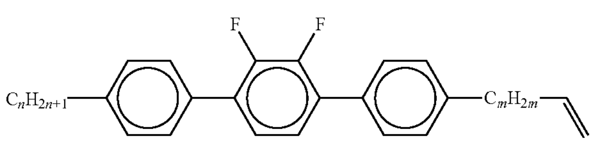
PYP-n-mV
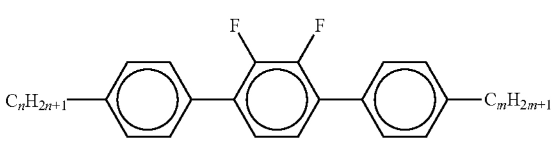
PYP-n-m TABLE A-continued
| The following abbreviations are used: (n, m, m', z: each, independently of one another, 1, 2, 3, 4, 5 or 6; (O)$C_mH_{2m+1}$ means $OC_mH_{2m+1}$ or $C_mH_{2m+1}$) |
|---|
| 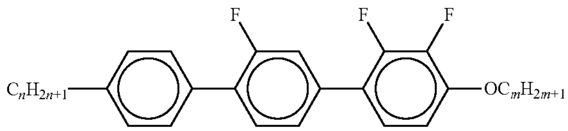 PGIY-n-Om |
| 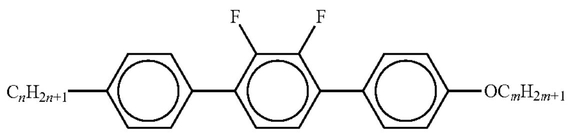 PYP-n-Om |
| 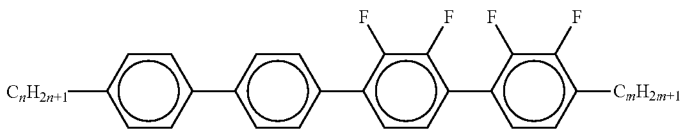 PPYY-n-m |
| 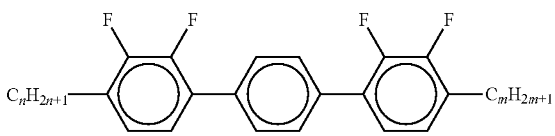 YPY-n-m |
| 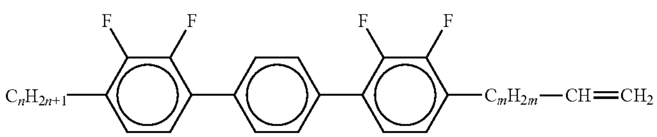 YPY-n-mV |
| 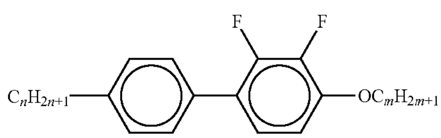 PY-n-Om |
| 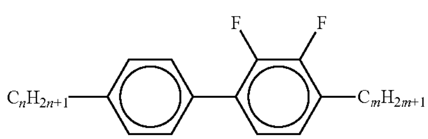 PY-n-m |
| 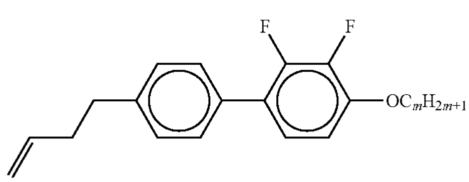 PY-V2-Om |

TABLE A-continued
| The following abbreviations are used: (n, m, m', z: each, independently of one another, 1, 2, 3, 4, 5 or 6; (O)$C_mH_{2m+1}$ means $OC_mH_{2m+1}$ or $C_mH_{2m+1}$) |
|---|
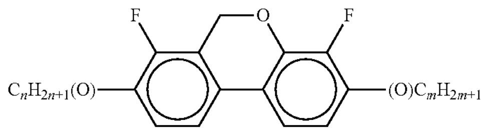
DFDBC-n(O)-(O)m
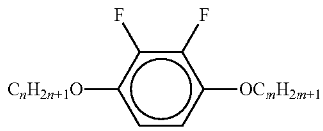
Y-nO-Om
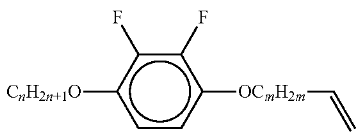
Y-nO-OmV
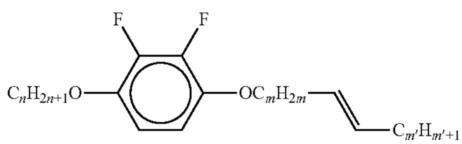
Y-nO-OmVm'
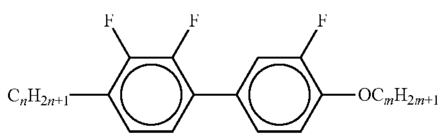
YG-n-Om
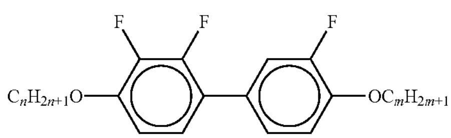
YG-nO-Om
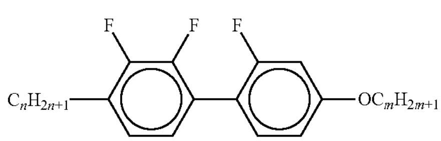
YGI-n-Om
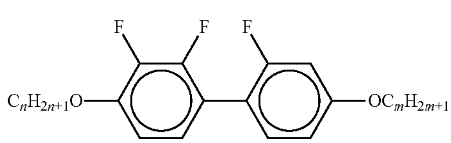
YGI-nO-Om TABLE A-continued

| The following abbreviations are used: (n, m, m', z: each, independently of one another, 1, 2, 3, 4, 5 or 6; (O)$C_mH_{2m+1}$ means $OC_mH_{2m+1}$ or $C_mH_{2m+1}$) |
|---|
| 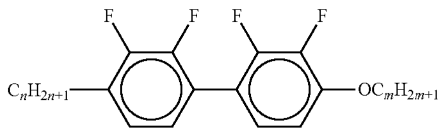 YY-n-Om |
| 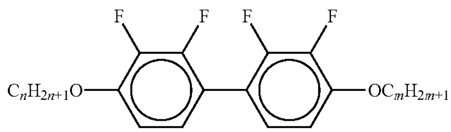 YY-nO-Om |

The liquid-crystal mixtures which can be used in accordance with the invention are prepared in a manner which is conventional per se. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing.

By means of suitable additives, the liquid-crystal phases according to the invention can be modified in such a way that they can be employed in any type of, for example, ECB, VAN, IPS, GH or ASM-VA LCD display that has been disclosed to date.

The dielectrics may also comprise further additives known to the person skilled in the art and described in the literature, such as, for example, UV absorbers, antioxidants, nanoparticles and free-radical scavengers. For example, 0-15% of pleochroic dyes, stabilisers, such as, for example, phenols, HALS (hindered amine light stabilisers), for example Tinuvin 770 (=bis(2,2,6,6-tetramethyl-4-piperidyl) sebacinate), or chiral dopants may be added. Suitable stabilisers for the mixtures according to the invention are, in particular, those listed in Table B.

For example, 0-15% of pleochroic dyes may be added, furthermore conductive salts, preferably ethyldimethyldodecylammonium 4-hexoxybenzoate, tetrabutylammonium tetraphenylboranate or complex salts of crown ethers (cf., for example, Haller et al., Mol. Cryst. Liq. Cryst., Volume 24, pages 249-258 (1973)), may be added in order to improve the conductivity or substances may be added in order to modify the dielectric anisotropy, the viscosity and/or the alignment of the nematic phases. Substances of this type are described, for example, in DE-A 22 09 127, 22 40 864, 23 21 632, 23 38 281, 24 50 088, 26 37 430 and 28 53 728.

TABLE B

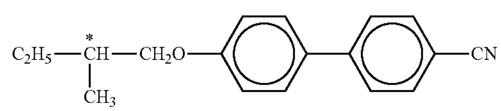

C 15

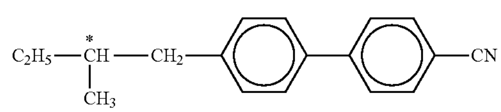

CB 15

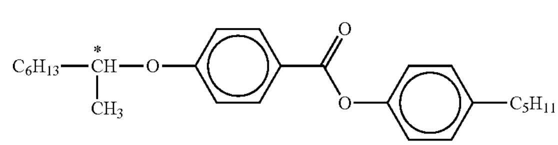

CM 21

TABLE B-continued
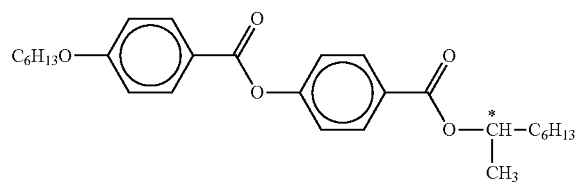
R/S-811
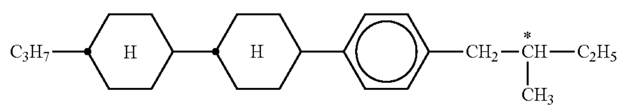
CM 44
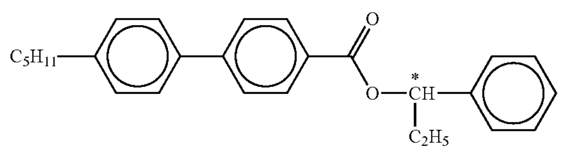
CM 45
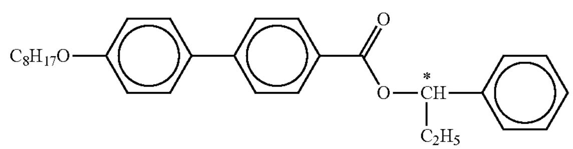
CM 47
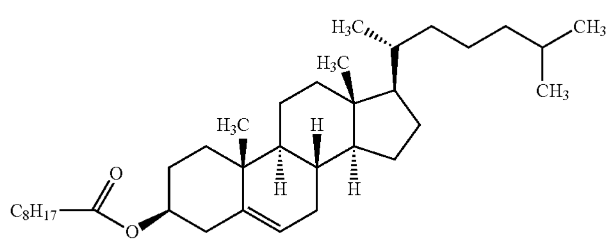
CN
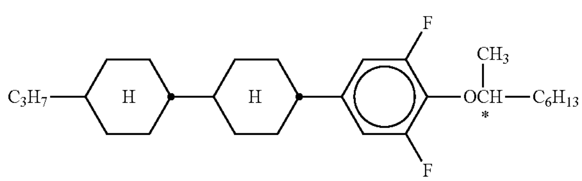
R/S-2011
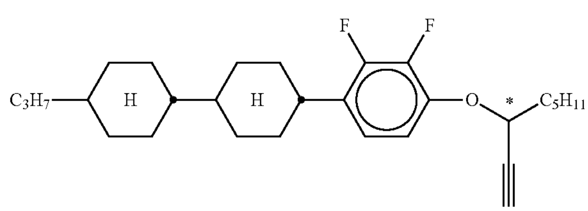
R/S-3011

TABLE B-continued
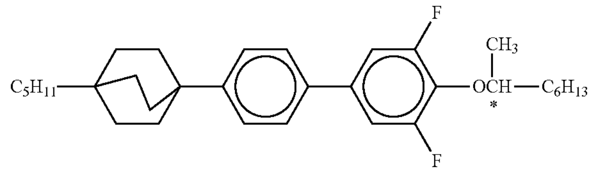
R/S-4011
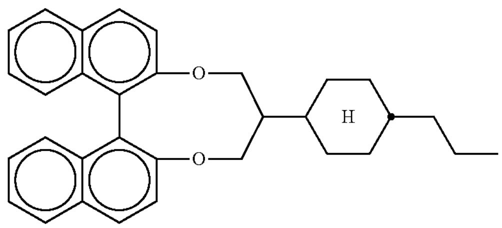
R/S-5011
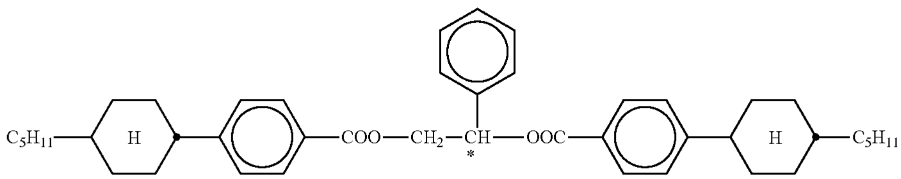
R/S-1011
Table B shows possible dopants which can be added to the mixtures according to the invention. If the mixtures comprise a dopant, it is added in amounts of 0.01-4% by weight, preferably 0.01-3% by weight.
TABLE C
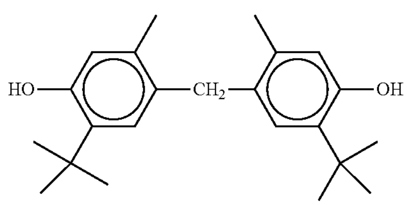
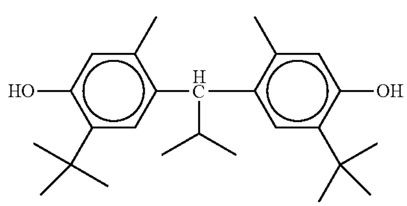
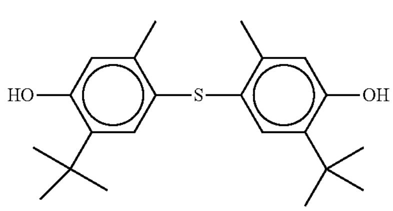

TABLE C-continued
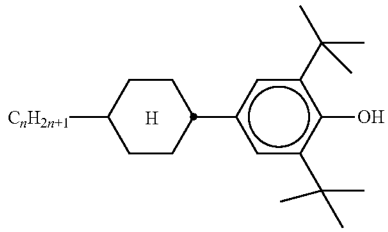
n = 1, 2, 3, 4, 5, 6 or 7
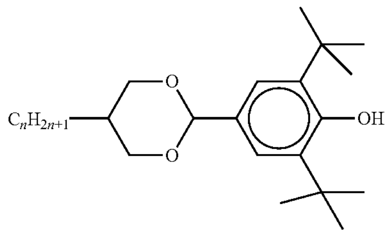
n = 1, 2, 3, 4, 5, 6 or 7
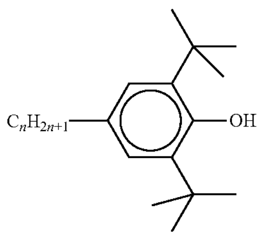
n = 1, 2, 3, 4, 5, 6 or 7
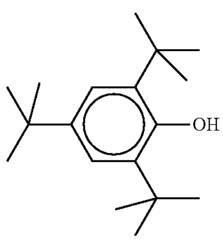
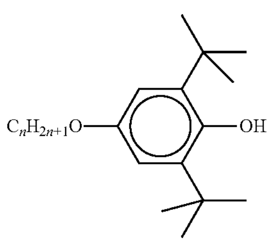
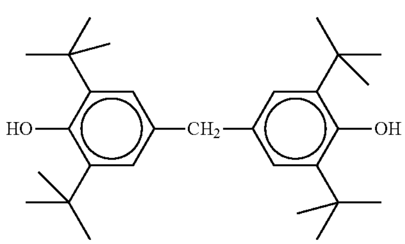

TABLE C-continued
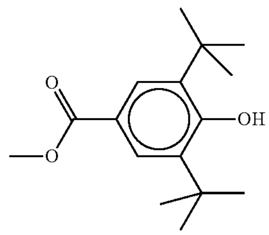
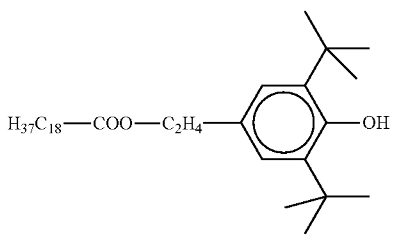
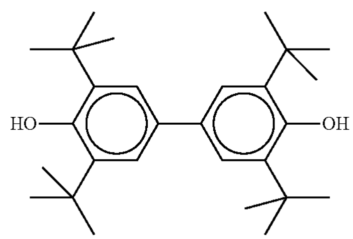
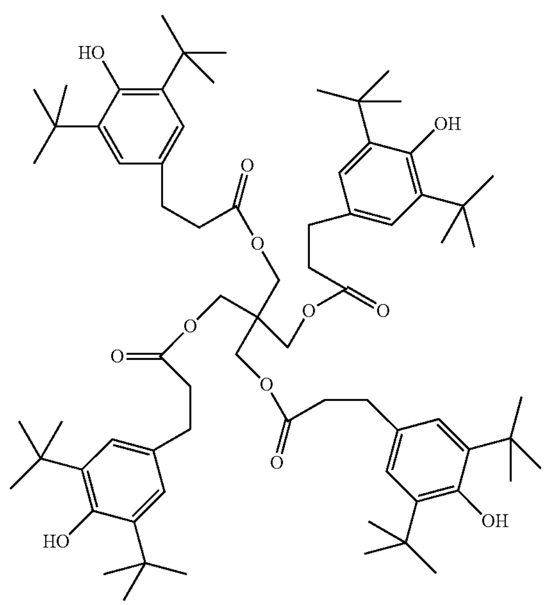 [SMILES: CC(C)(C)c1cc(CCC(=O)OCC(COC(=O)CCc2cc(C(C)(C)C)c(O)c(C(C)(C)C)c2)(COC(=O)CCc2cc(C(C)(C)C)c(O)c(C(C)(C)C)c2)COC(=O)CCc2cc(C(C)(C)C)c(O)c(C(C)(C)C)c2)cc(C(C)(C)C)c1O]
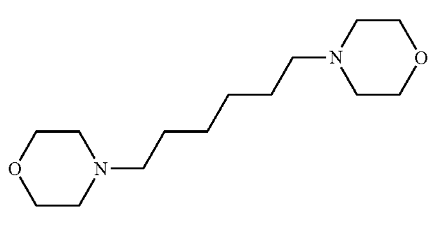 [SMILES: C(CCCN1CCOCC1)CCN1CCOCC1]

TABLE C-continued
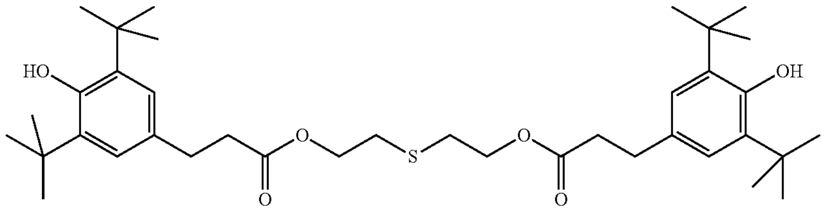 [SMILES: CC(C)(C)c1cc(CCC(=O)OCCSCCOC(=O)CCc2cc(C(C)(C)C)c(O)c(C(C)(C)C)c2)cc(C(C)(C)C)c1O]
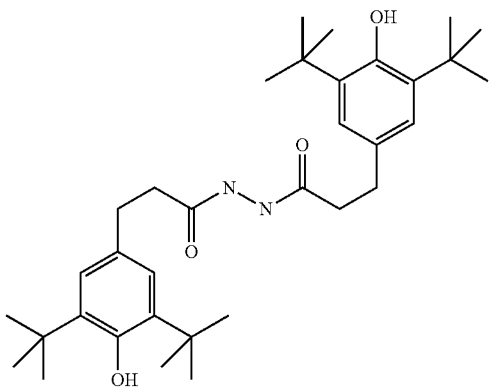 [SMILES: CC(C)(C)c1cc(CCC(=O)NNC(=O)CCc2cc(C(C)(C)C)c(O)c(C(C)(C)C)c2)cc(C(C)(C)C)c1O]
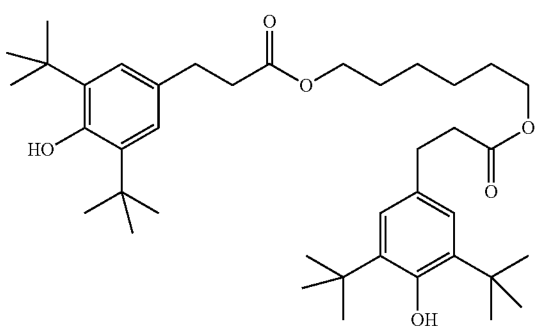 [SMILES: CC(C)(C)c1cc(CCC(=O)OCCCCCCOC(=O)CCc2cc(C(C)(C)C)c(O)c(C(C)(C)C)c2)cc(C(C)(C)C)c1O]
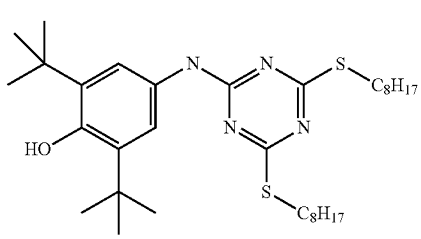

TABLE C-continued
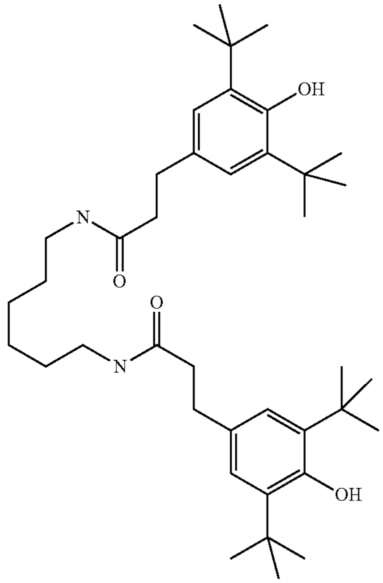 [SMILES: CC(C)(C)c1cc(CCC(=O)NCCCCCCNC(=O)CCc2cc(C(C)(C)C)c(O)c(C(C)(C)C)c2)cc(C(C)(C)C)c1O]
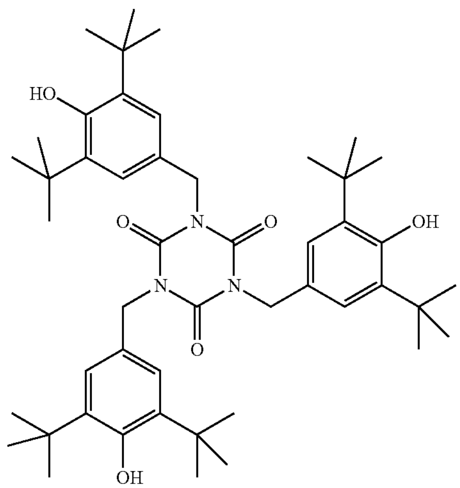 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]
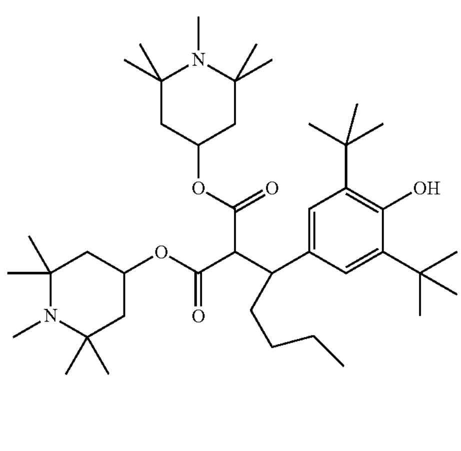 [SMILES: CCCCC(c1cc(C(C)(C)C)c(O)c(C(C)(C)C)c1)C(C(=O)OC1CC(C)(C)N(C)C(C)(C)C1)C(=O)OC1CC(C)(C)N(C)C(C)(C)C1]

TABLE C-continued
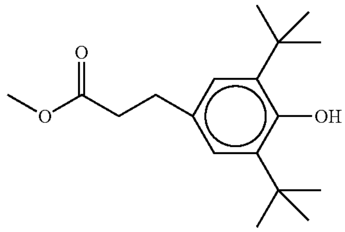
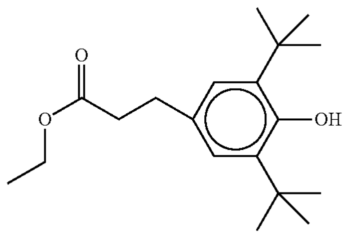
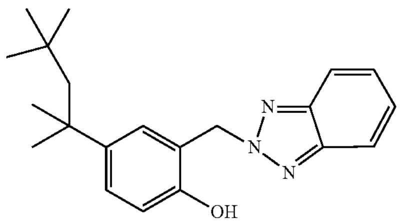 [SMILES: CC(C)(C)CC(C)(C)c1ccc(O)c(Cn2nc3ccccc3n2)c1]
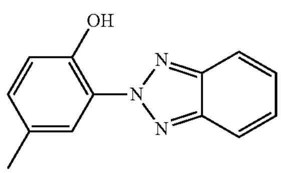 [SMILES: Cc1ccc(O)c(-n2nc3ccccc3n2)c1]
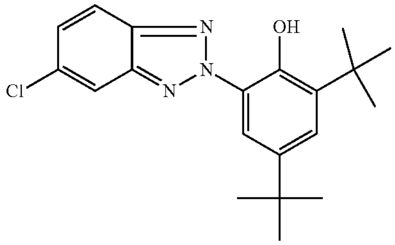 [SMILES: CC(C)(C)c1cc(-n2nc3ccc(Cl)cc3n2)c(O)c(C(C)(C)C)c1]
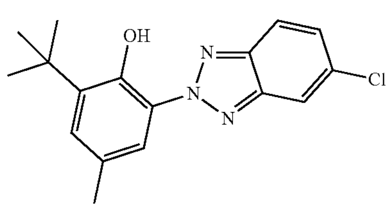 [SMILES: Cc1cc(-n2nc3ccc(Cl)cc3n2)c(O)c(C(C)(C)C)c1]

TABLE C-continued
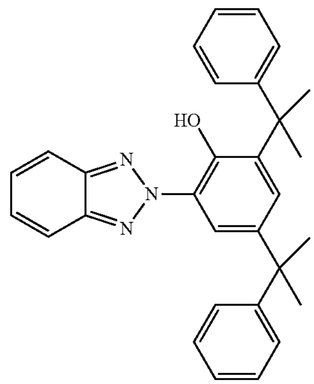 [SMILES: CC(C)(c1ccccc1)c1cc(-n2nc3ccccc3n2)c(O)c(C(C)(C)c2ccccc2)c1]
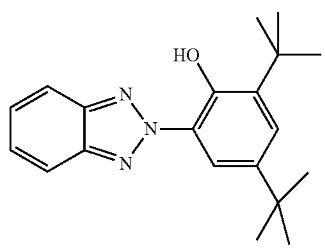 [SMILES: CC(C)(C)c1cc(-n2nc3ccccc3n2)c(O)c(C(C)(C)C)c1]
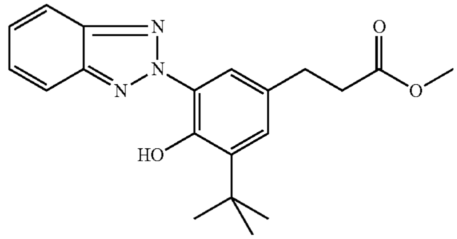 [SMILES: COC(=O)CCc1cc(-n2nc3ccccc3n2)c(O)c(C(C)(C)C)c1]
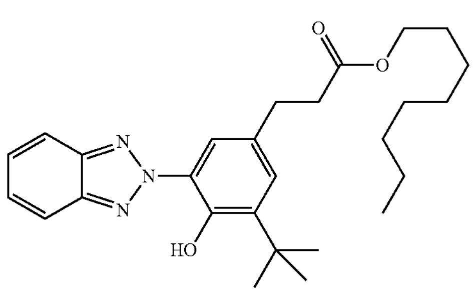 [SMILES: CCCCCCCCOC(=O)CCc1cc(-n2nc3ccccc3n2)c(O)c(C(C)(C)C)c1]

TABLE C-continued
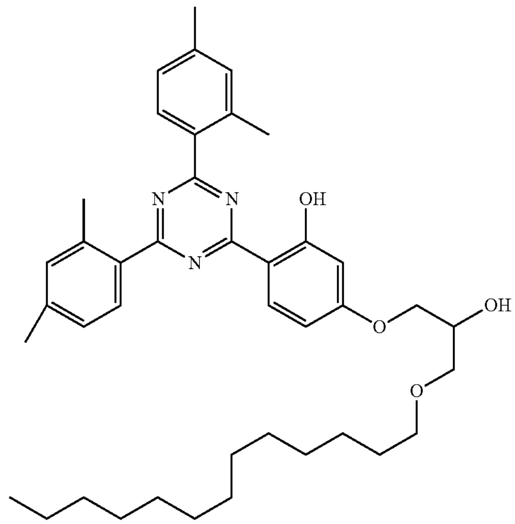 [SMILES: CCCCCCCCCCCCCOCC(O)COc1ccc(-c2nc(-c3ccc(C)cc3C)nc(-c3ccc(C)cc3C)n2)c(O)c1]
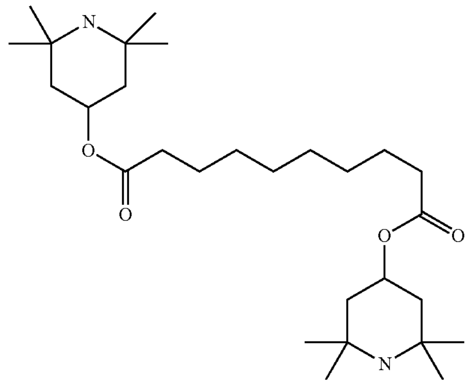
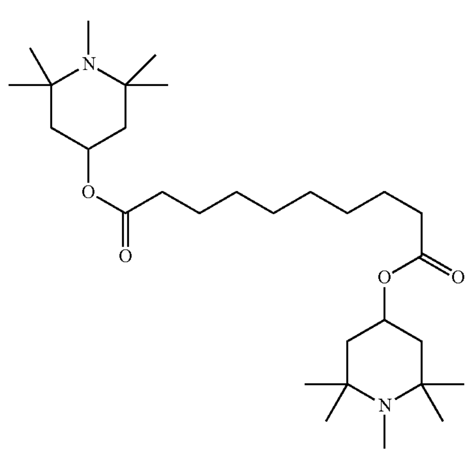

TABLE C-continued
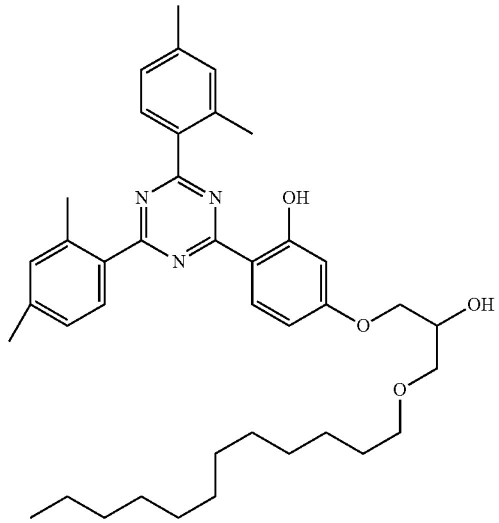 [SMILES: CCCCCCCCCCCCOCC(O)COc1ccc(-c2nc(-c3ccc(C)cc3C)nc(-c3ccc(C)cc3C)n2)c(O)c1]
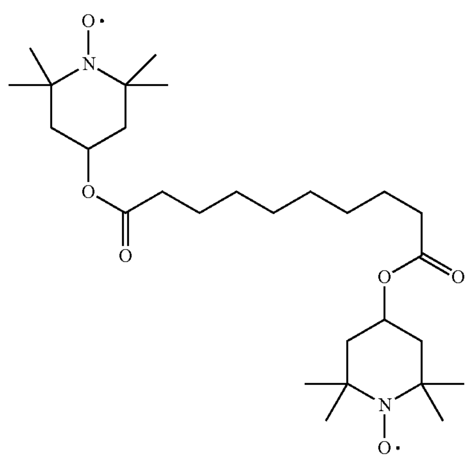
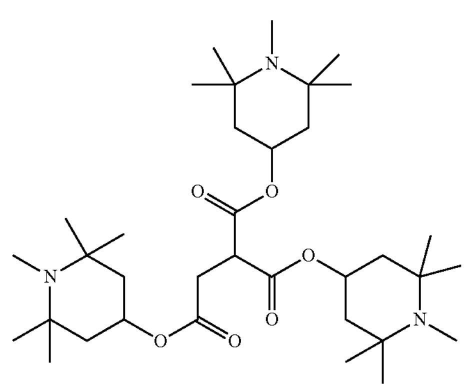

TABLE C-continued
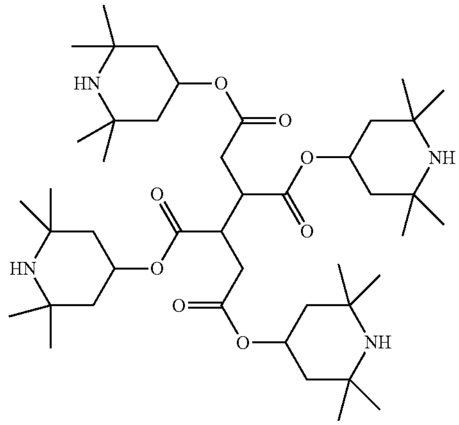
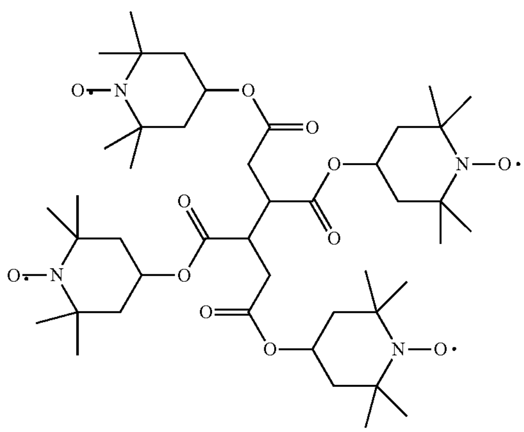
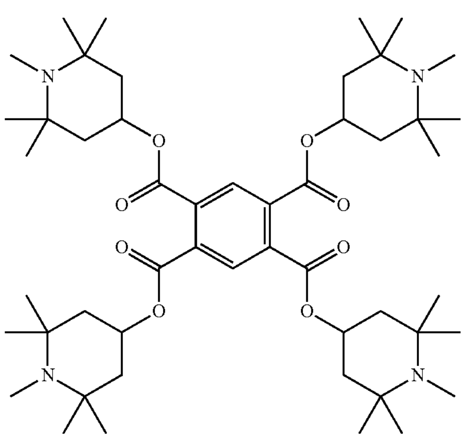

TABLE C-continued
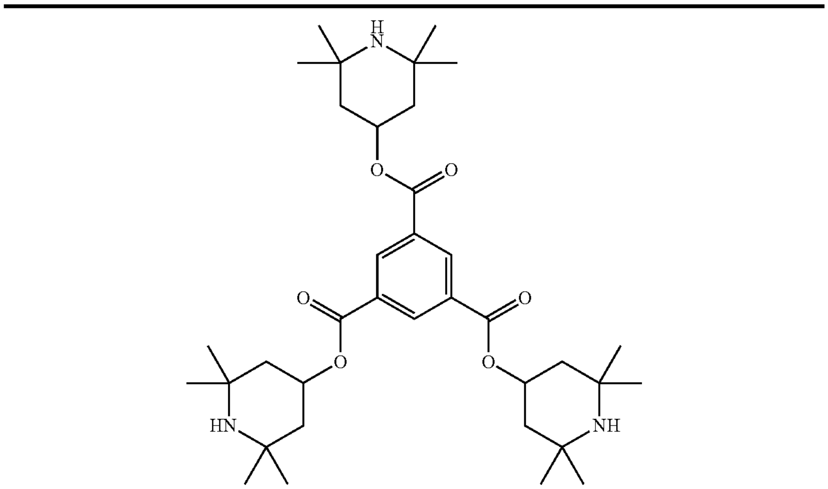
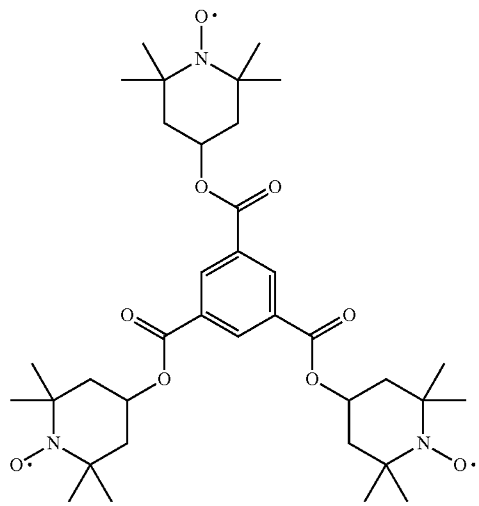
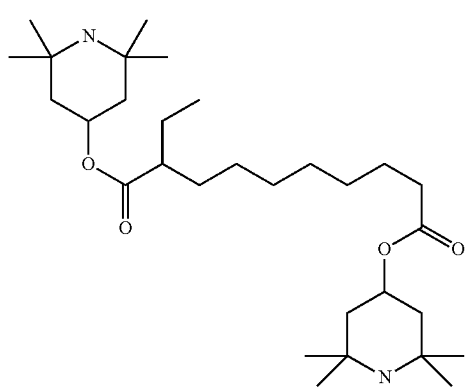

TABLE C-continued
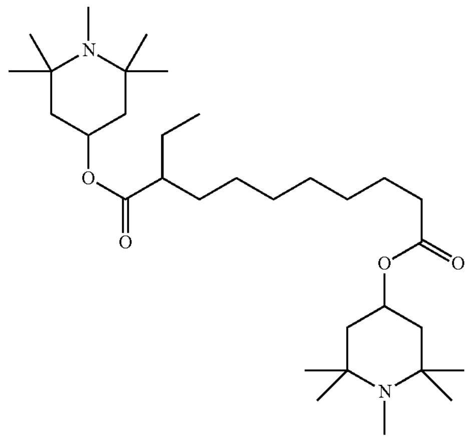
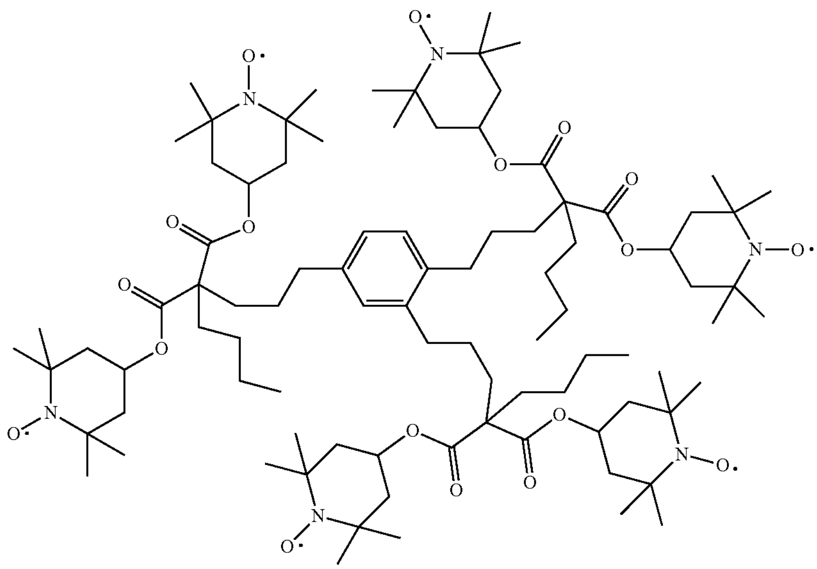
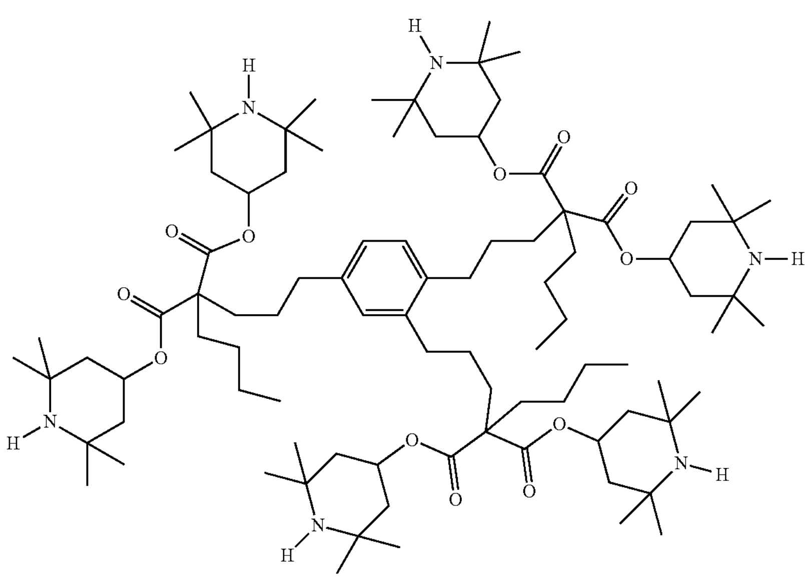 [SMILES: CCCCC(CCCc1ccc(CCCC(CCCC)(C(=O)OC2CC(C)(C)NC(C)(C)C2)C(=O)OC2CC(C)(C)NC(C)(C)C2)c(CCCC(CCCC)(C(=O)OC2CC(C)(C)NC(C)(C)C2)C(=O)OC2CC(C)(C)NC(C)(C)C2)c1)(C(=O)OC1CC(C)(C)NC(C)(C)C1)C(=O)OC1CC(C)(C)NC(C)(C)C1]

TABLE C-continued
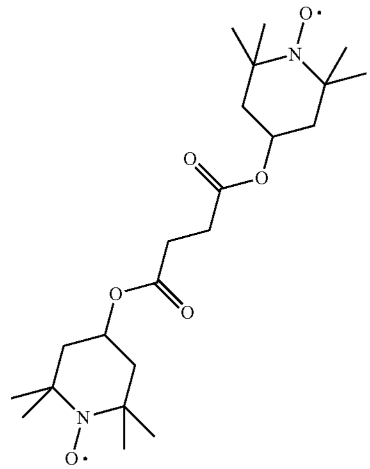
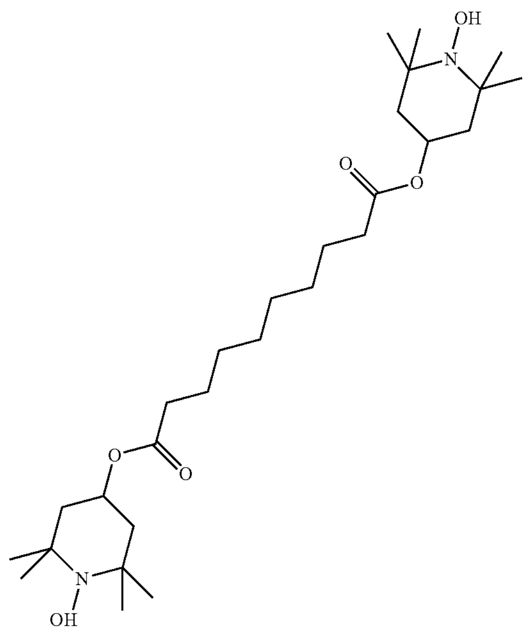
Stabilisers which can be added, for example, to the mixtures according to the invention in amounts of O-10% by weight, preferably 0.001-5% by weight, in particular 0.001-1% by weight, are shown below.
TABLE D
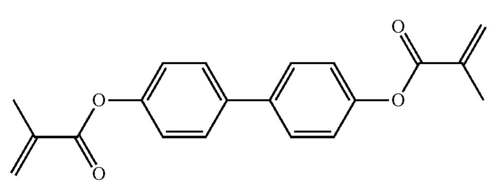 [SMILES: C=C(C)C(=O)Oc1ccc(-c2ccc(OC(=O)C(=C)C)cc2)cc1]
RM-1
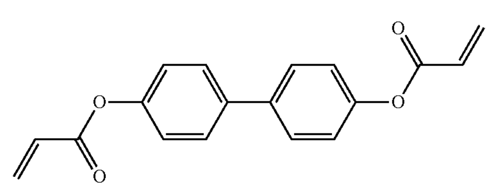 [SMILES: C=CC(=O)Oc1ccc(-c2ccc(OC(=O)C=C)cc2)cc1]
RM-2

TABLE D-continued
RM-3
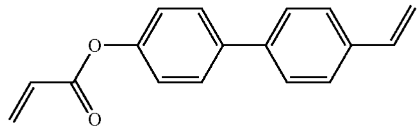 [SMILES: C=CC(=O)Oc1ccc(-c2ccc(C=C)cc2)cc1]
RM-4
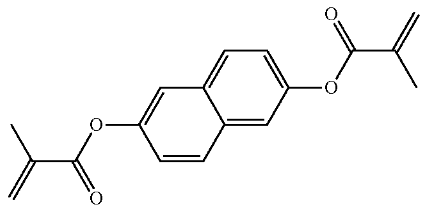 [SMILES: C=C(C)C(=O)Oc1ccc2cc(OC(=O)C(=C)C)ccc2c1]
RM-5
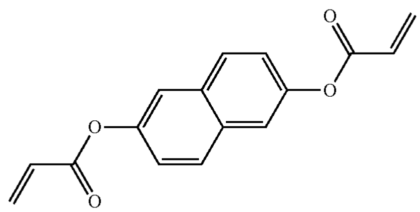 [SMILES: C=CC(=O)Oc1ccc2cc(OC(=O)C=C)ccc2c1]
RM-6
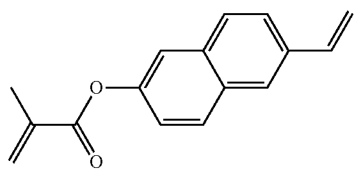 [SMILES: C=Cc1ccc2cc(OC(=O)C(=C)C)ccc2c1]
RM-7
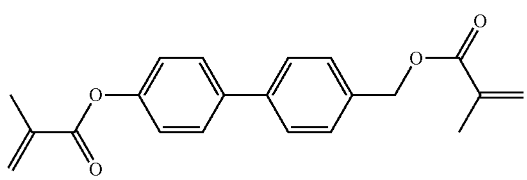 [SMILES: C=C(C)C(=O)OCc1ccc(-c2ccc(OC(=O)C(=C)C)cc2)cc1]
RM-8
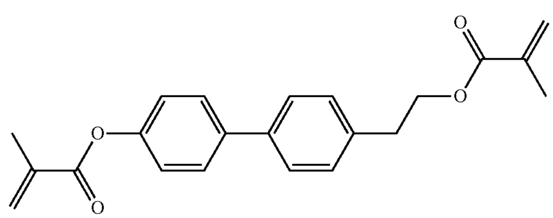 [SMILES: C=C(C)C(=O)OCCc1ccc(-c2ccc(OC(=O)C(=C)C)cc2)cc1]
RM-9
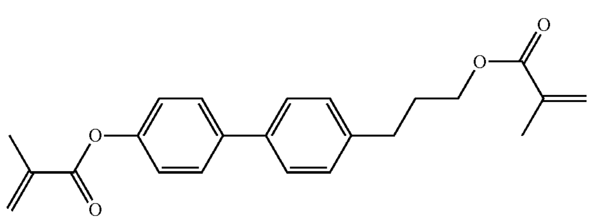 [SMILES: C=C(C)C(=O)OCCCc1ccc(-c2ccc(OC(=O)C(=C)C)cc2)cc1]
RM-10
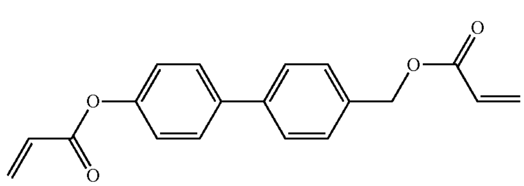 [SMILES: C=CC(=O)OCc1ccc(-c2ccc(OC(=O)C=C)cc2)cc1]

TABLE D-continued
RM-11
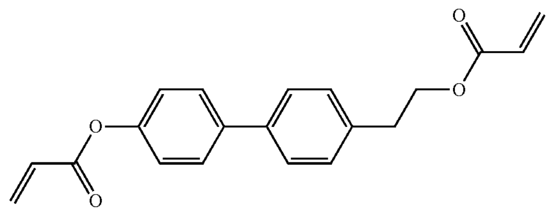 [SMILES: C=CC(=O)OCCc1ccc(-c2ccc(OC(=O)C=C)cc2)cc1]
RM-12
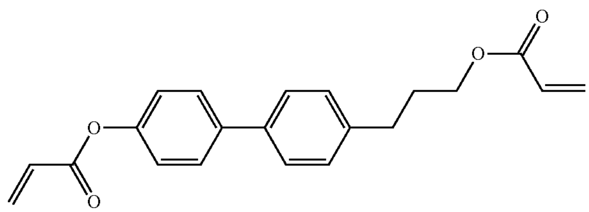 [SMILES: C=CC(=O)OCCCc1ccc(-c2ccc(OC(=O)C=C)cc2)cc1]
RM-13
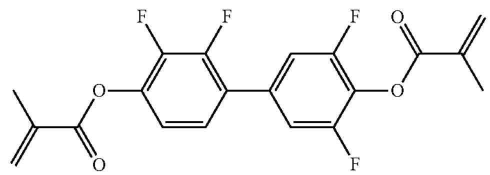 [SMILES: C=C(C)C(=O)Oc1ccc(-c2cc(F)c(OC(=O)C(=C)C)c(F)c2)c(F)c1F]
RM-14
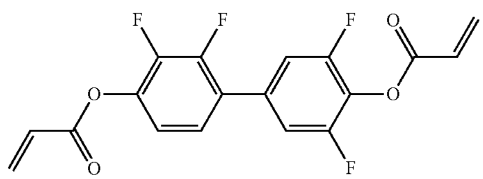
RM-15
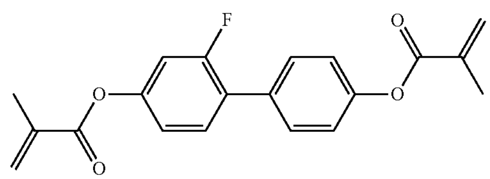
RM-16
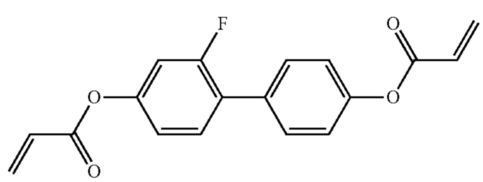 [SMILES: C=CC(=O)Oc1ccc(-c2ccc(OC(=O)C=C)cc2F)cc1]
RM-17
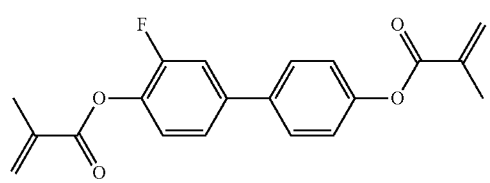 [SMILES: C=C(C)C(=O)Oc1ccc(-c2ccc(OC(=O)C(=C)C)c(F)c2)cc1]
RM-18
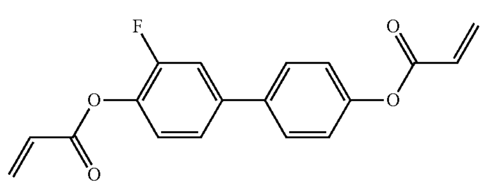

TABLE D-continued
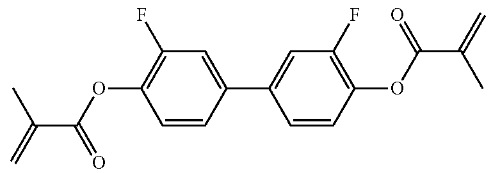
RM-19
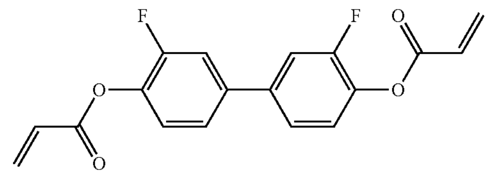
RM-20
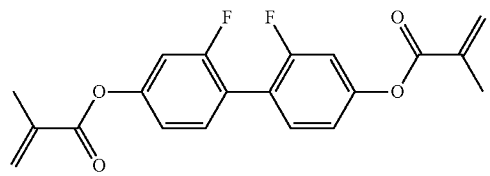
RM-21
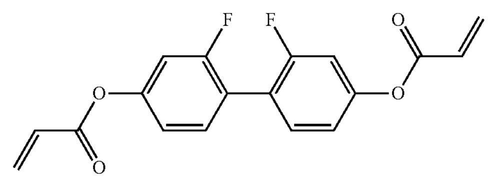 [SMILES: C=CC(=O)Oc1ccc(-c2ccc(OC(=O)C=C)cc2F)c(F)c1]
RM-22
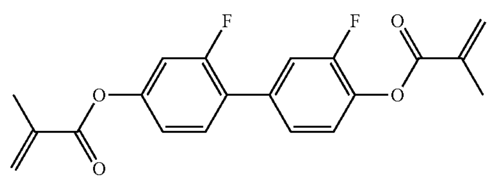
RM-23
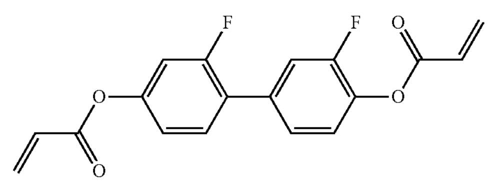
RM-24
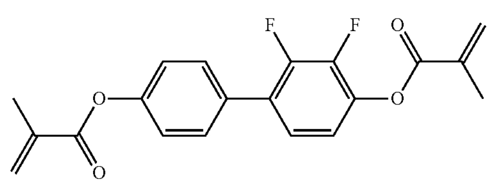 [SMILES: C=C(C)C(=O)Oc1ccc(-c2ccc(OC(=O)C(=C)C)c(F)c2F)cc1]
RM-25
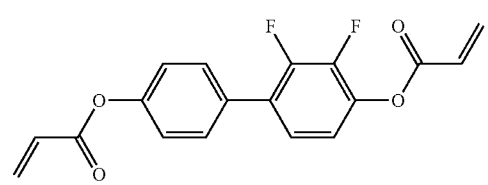
RM-26
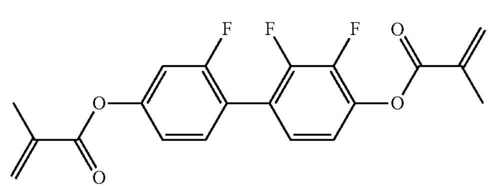
RM-27

TABLE D-continued
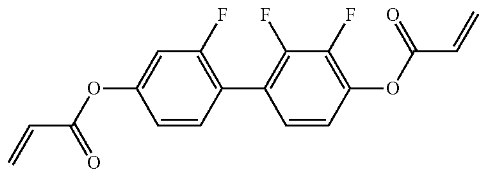 [SMILES: C=CC(=O)Oc1ccc(-c2ccc(OC(=O)C=C)c(F)c2F)c(F)c1]
RM-28
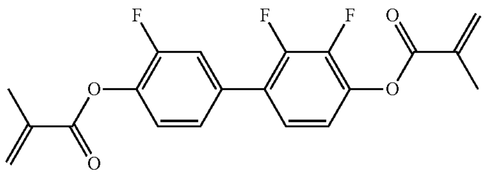 [SMILES: C=C(C)C(=O)Oc1ccc(-c2ccc(OC(=O)C(=C)C)c(F)c2F)cc1F]
RM-29
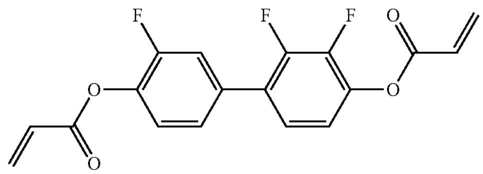 [SMILES: C=CC(=O)Oc1ccc(-c2ccc(OC(=O)C=C)c(F)c2F)cc1F]
RM-30
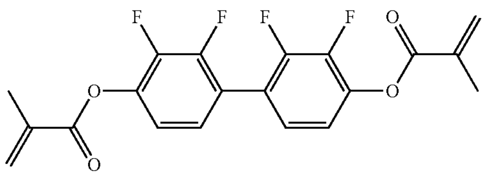 [SMILES: C=C(C)C(=O)Oc1ccc(-c2ccc(OC(=O)C(=C)C)c(F)c2F)c(F)c1F]
RM-31
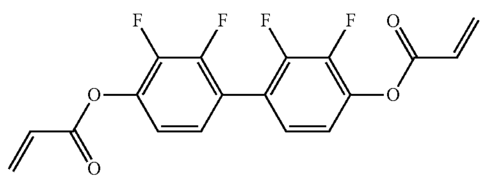 [SMILES: C=CC(=O)Oc1ccc(-c2ccc(OC(=O)C=C)c(F)c2F)c(F)c1F]
RM-32
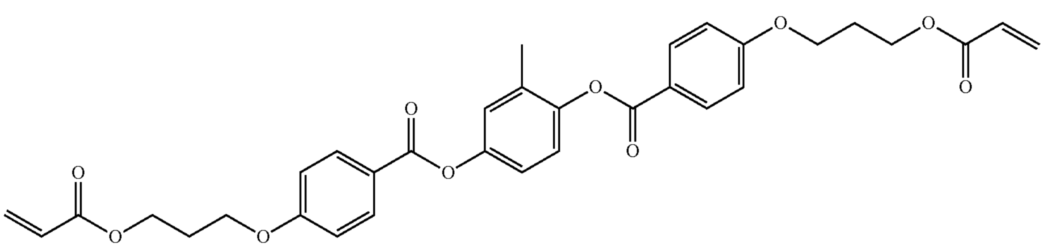 [SMILES: C=CC(=O)OCCCOc1ccc(C(=O)Oc2ccc(OC(=O)c3ccc(OCCCOC(=O)C=C)cc3)c(C)c2)cc1]
RM-33
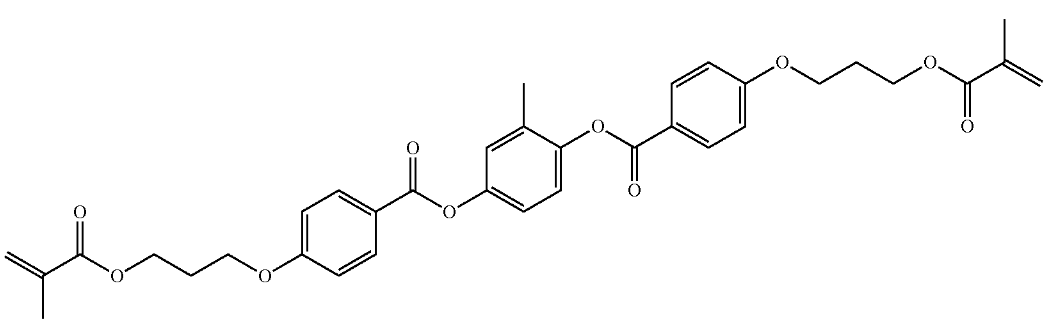 [SMILES: C=C(C)C(=O)OCCCOc1ccc(C(=O)Oc2ccc(OC(=O)c3ccc(OCCCOC(=O)C(=C)C)cc3)c(C)c2)cc1]
RM-34

TABLE D-continued
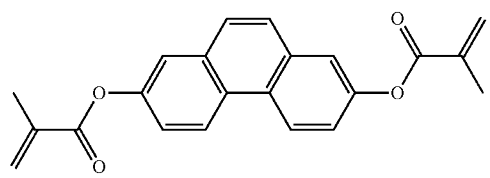
RM-35
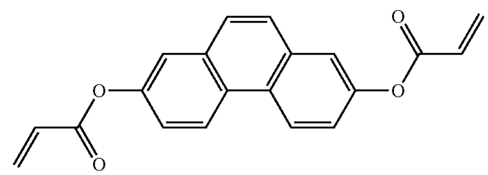 [SMILES: C=CC(=O)Oc1ccc2c(ccc3cc(OC(=O)C=C)ccc32)c1]
RM-36
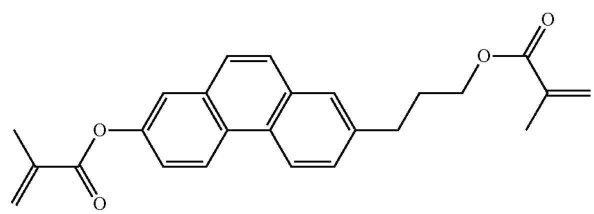 [SMILES: C=C(C)C(=O)OCCCc1ccc2c(ccc3cc(OC(=O)C(=C)C)ccc32)c1]
RM-37
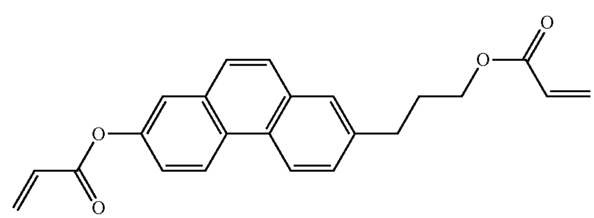 [SMILES: C=CC(=O)OCCCc1ccc2c(ccc3cc(OC(=O)C=C)ccc32)c1]
RM-38
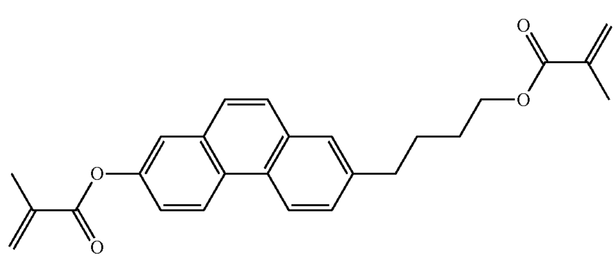 [SMILES: C=C(C)C(=O)OCCCCc1ccc2c(ccc3cc(OC(=O)C(=C)C)ccc32)c1]
RM-39
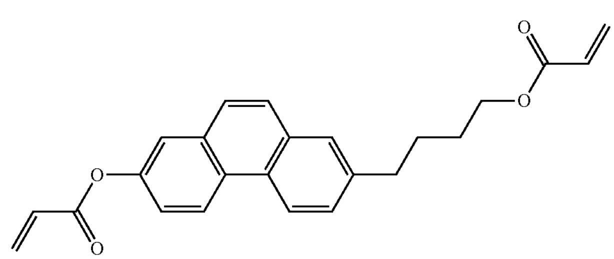 [SMILES: C=CC(=O)OCCCCc1ccc2c(ccc3cc(OC(=O)C=C)ccc32)c1]
RM-40
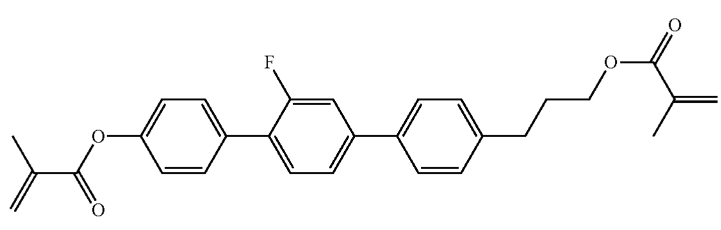 [SMILES: C=C(C)C(=O)OCCCc1ccc(-c2ccc(-c3ccc(OC(=O)C(=C)C)cc3)c(F)c2)cc1]
RM-41

TABLE D-continued
RM-42
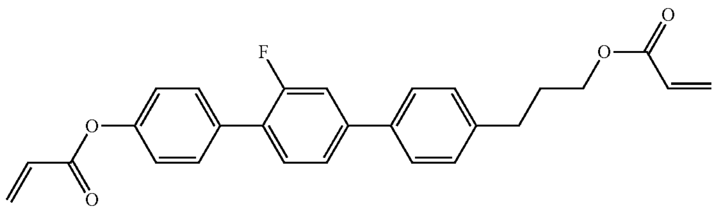 [SMILES: C=CC(=O)OCCCc1ccc(-c2ccc(-c3ccc(OC(=O)C=C)cc3)c(F)c2)cc1]
RM-43
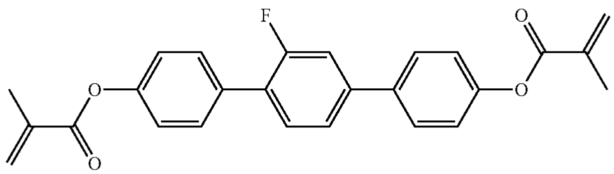
RM-44
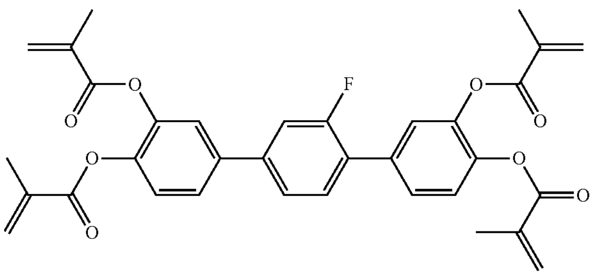 [SMILES: C=C(C)C(=O)Oc1ccc(-c2ccc(-c3ccc(OC(=O)C(=C)C)c(OC(=O)C(=C)C)c3)c(F)c2)cc1OC(=O)C(=C)C]
RM-45
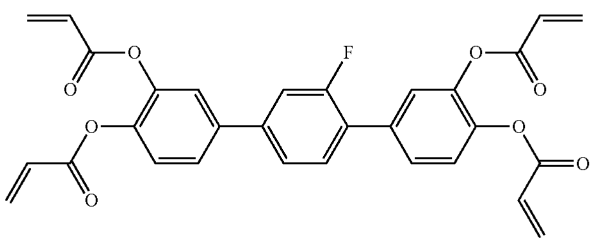 [SMILES: C=CC(=O)Oc1ccc(-c2ccc(-c3ccc(OC(=O)C=C)c(OC(=O)C=C)c3)c(F)c2)cc1OC(=O)C=C]
RM-46
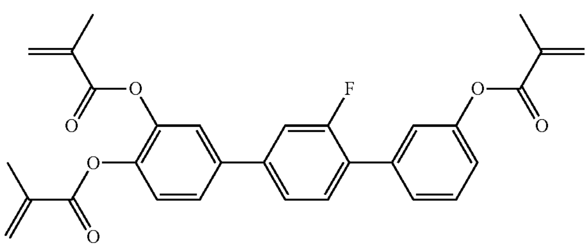 [SMILES: C=C(C)C(=O)Oc1cccc(-c2ccc(-c3ccc(OC(=O)C(=C)C)c(OC(=O)C(=C)C)c3)cc2F)c1]
RM-47
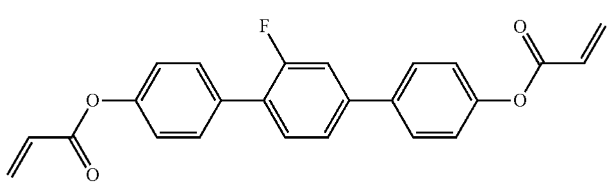 [SMILES: C=CC(=O)Oc1ccc(-c2ccc(-c3ccc(OC(=O)C=C)cc3)c(F)c2)cc1]
RM-48
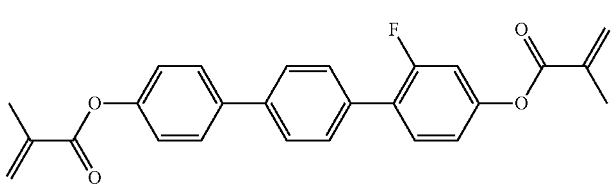 [SMILES: C=C(C)C(=O)Oc1ccc(-c2ccc(-c3ccc(OC(=O)C(=C)C)cc3F)cc2)cc1]

TABLE D-continued
RM-49
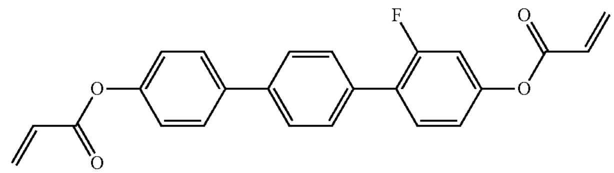 [SMILES: C=CC(=O)Oc1ccc(-c2ccc(-c3ccc(OC(=O)C=C)cc3F)cc2)cc1]
RM-50
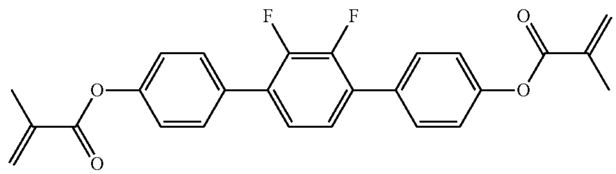 [SMILES: C=C(C)C(=O)Oc1ccc(-c2ccc(-c3ccc(OC(=O)C(=C)C)cc3)c(F)c2F)cc1]
RM-51
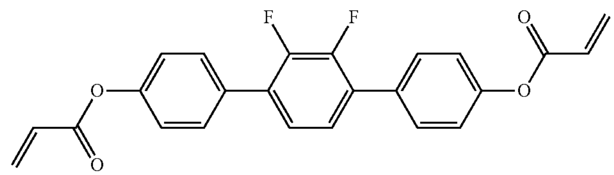 [SMILES: C=CC(=O)Oc1ccc(-c2ccc(-c3ccc(OC(=O)C=C)cc3)c(F)c2F)cc1]
RM-52
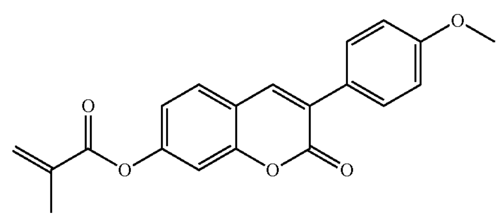 [SMILES: C=C(C)C(=O)Oc1ccc2cc(-c3ccc(OC)cc3)c(=O)oc2c1]
RM-53
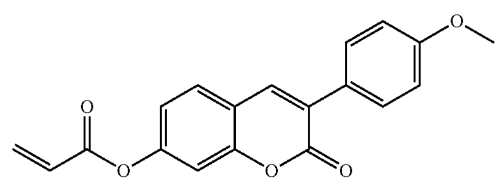 [SMILES: C=CC(=O)Oc1ccc2cc(-c3ccc(OC)cc3)c(=O)oc2c1]
RM-54
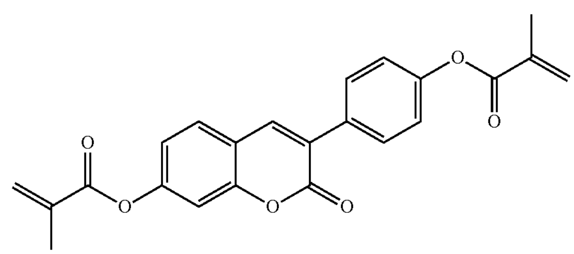 [SMILES: C=C(C)C(=O)Oc1ccc(-c2cc3ccc(OC(=O)C(=C)C)cc3oc2=O)cc1]
RM-55
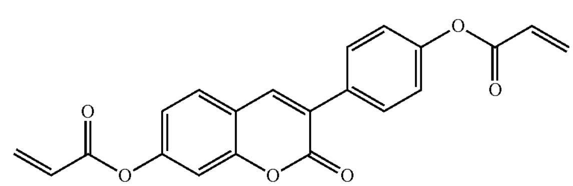 [SMILES: C=CC(=O)Oc1ccc(-c2cc3ccc(OC(=O)C=C)cc3oc2=O)cc1]
RM-56
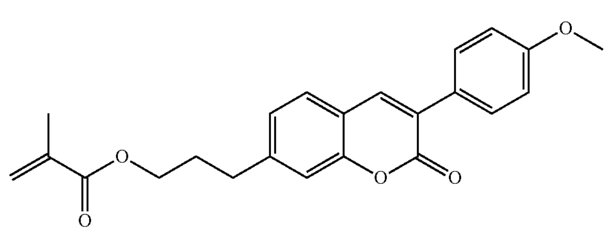 [SMILES: C=C(C)C(=O)OCCCc1ccc2cc(-c3ccc(OC)cc3)c(=O)oc2c1]

TABLE D-continued
RM-57
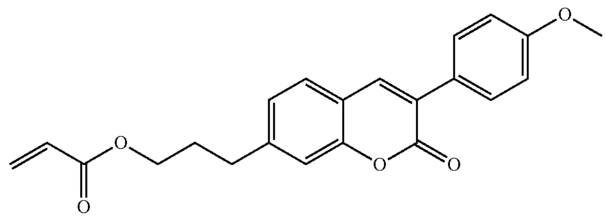 [SMILES: C=CC(=O)OCCCc1ccc2cc(-c3ccc(OC)cc3)c(=O)oc2c1]
RM-58
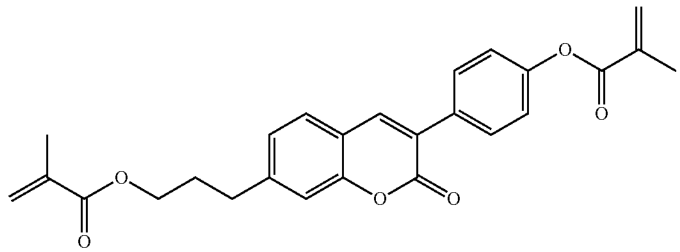 [SMILES: C=C(C)C(=O)OCCCc1ccc2cc(-c3ccc(OC(=O)C(=C)C)cc3)c(=O)oc2c1]
RM-59
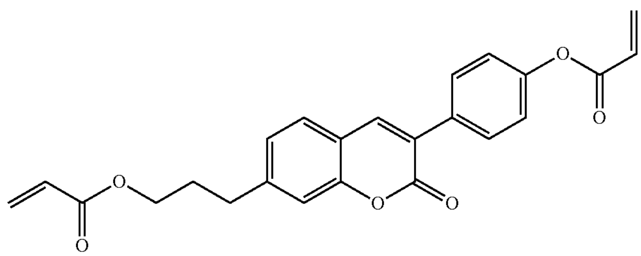 [SMILES: C=CC(=O)OCCCc1ccc2cc(-c3ccc(OC(=O)C=C)cc3)c(=O)oc2c1]
RM-60
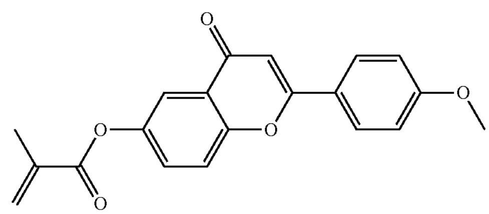 [SMILES: C=C(C)C(=O)Oc1ccc2oc(-c3ccc(OC)cc3)cc(=O)c2c1]
RM-61
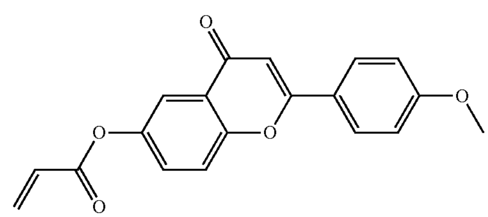 [SMILES: C=CC(=O)Oc1ccc2oc(-c3ccc(OC)cc3)cc(=O)c2c1]
RM-62
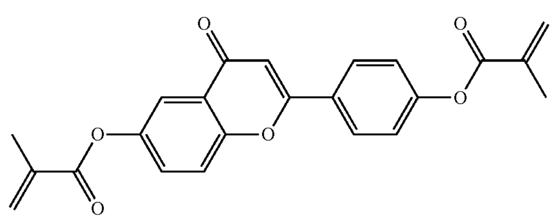 [SMILES: C=C(C)C(=O)Oc1ccc(-c2cc(=O)c3cc(OC(=O)C(=C)C)ccc3o2)cc1]
RM-63
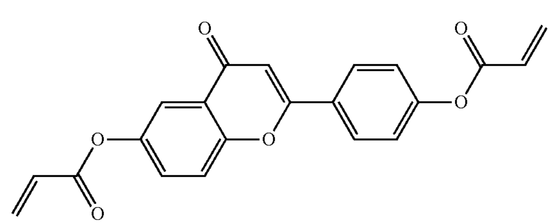 [SMILES: C=CC(=O)Oc1ccc(-c2cc(=O)c3cc(OC(=O)C=C)ccc3o2)cc1]

TABLE D-continued
RM-64
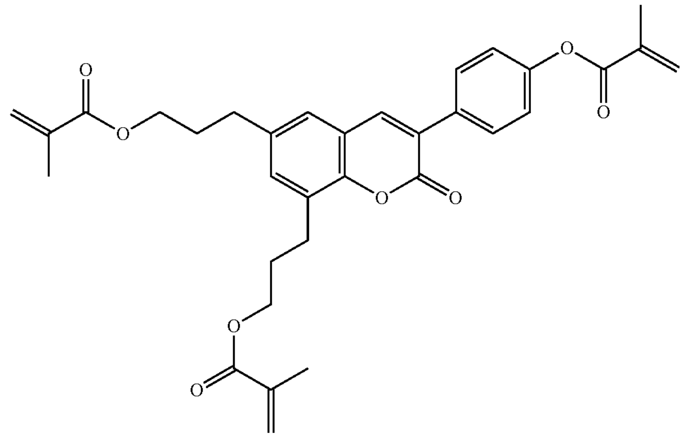 [SMILES: C=C(C)C(=O)OCCCc1cc(CCCOC(=O)C(=C)C)c2oc(=O)c(-c3ccc(OC(=O)C(=C)C)cc3)cc2c1]
RM-65
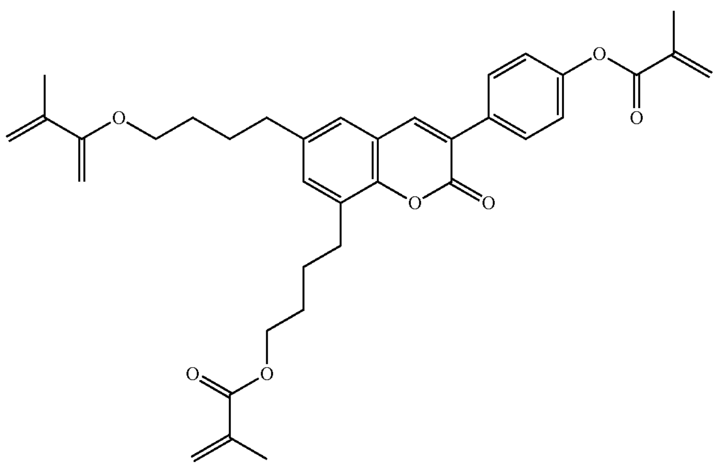 [SMILES: C=C(C)C(=C)OCCCCc1cc(CCCCOC(=O)C(=C)C)c2oc(=O)c(-c3ccc(OC(=O)C(=C)C)cc3)cc2c1]
RM-66
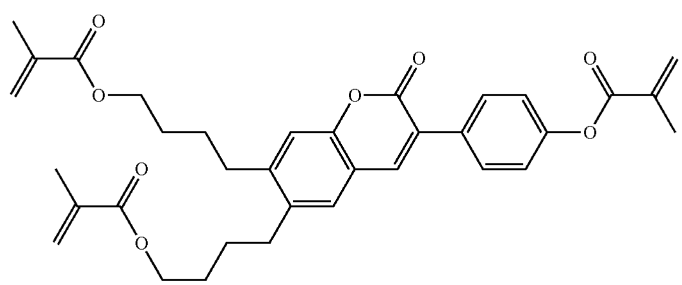 [SMILES: C=C(C)C(=O)OCCCCc1cc2cc(-c3ccc(OC(=O)C(=C)C)cc3)c(=O)oc2cc1CCCCOC(=O)C(=C)C]
RM-67
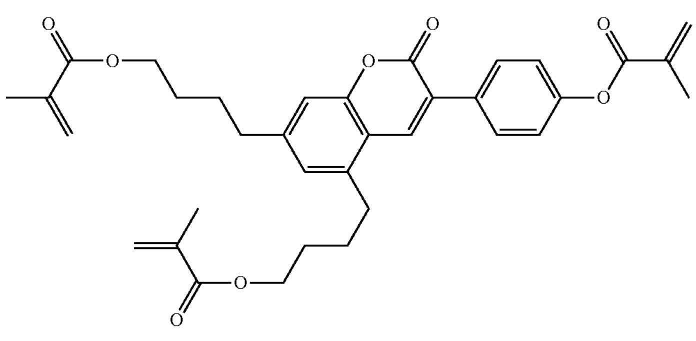 [SMILES: C=C(C)C(=O)OCCCCc1cc(CCCCOC(=O)C(=C)C)c2cc(-c3ccc(OC(=O)C(=C)C)cc3)c(=O)oc2c1]

TABLE D-continued
RM-68
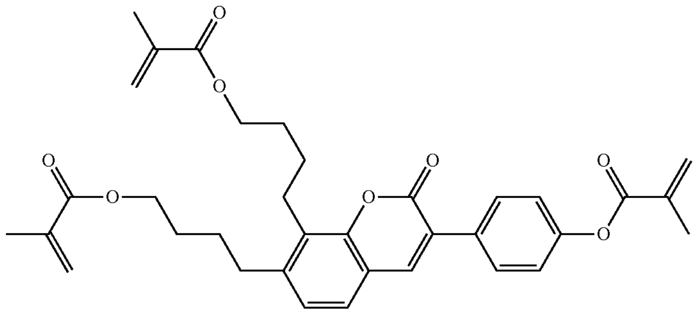 [SMILES: C=C(C)C(=O)OCCCCc1ccc2cc(-c3ccc(OC(=O)C(=C)C)cc3)c(=O)oc2c1CCCCOC(=O)C(=C)C]
RM-69
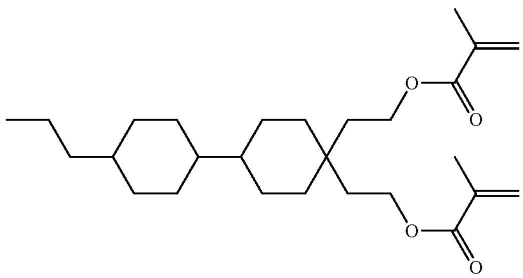 [SMILES: C=C(C)C(=O)OCCC1(CCOC(=O)C(=C)C)CCC(C2CCC(CCC)CC2)CC1]
RM-70
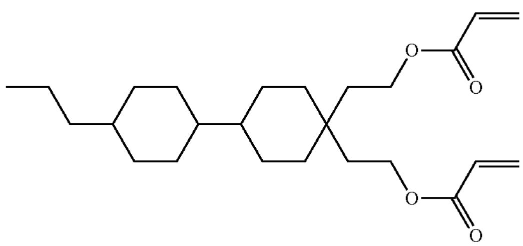 [SMILES: C=CC(=O)OCCC1(CCOC(=O)C=C)CCC(C2CCC(CCC)CC2)CC1]
RM-71
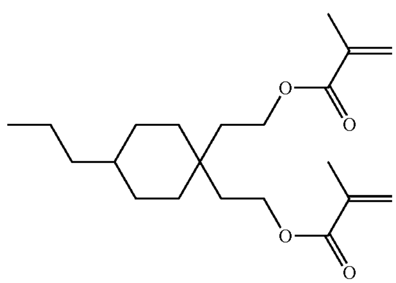 [SMILES: C=C(C)C(=O)OCCC1(CCOC(=O)C(=C)C)CCC(CCC)CC1]
RM-72
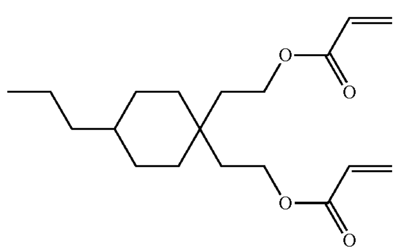 [SMILES: C=CC(=O)OCCC1(CCOC(=O)C=C)CCC(CCC)CC1]
RM-73
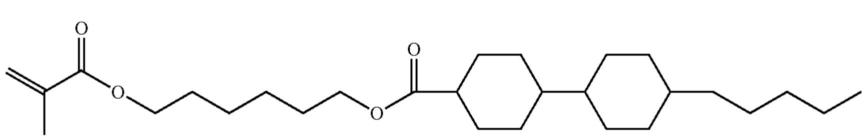 [SMILES: C=C(C)C(=O)OCCCCCCOC(=O)C1CCC(C2CCC(CCCCC)CC2)CC1]
RM-74
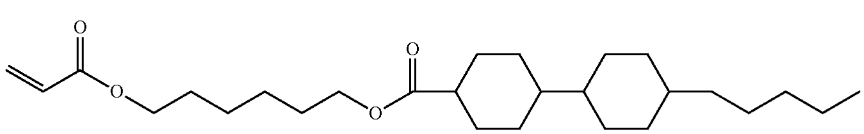 [SMILES: C=CC(=O)OCCCCCCOC(=O)C1CCC(C2CCC(CCCCC)CC2)CC1]

TABLE D-continued
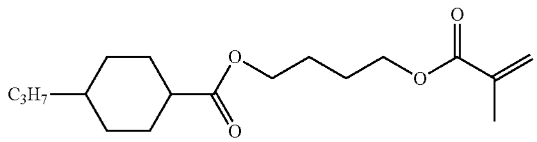
RM-75
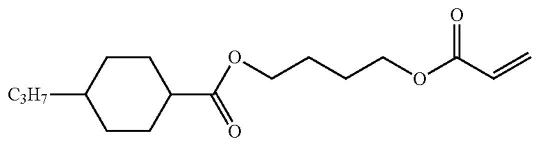
RM-76
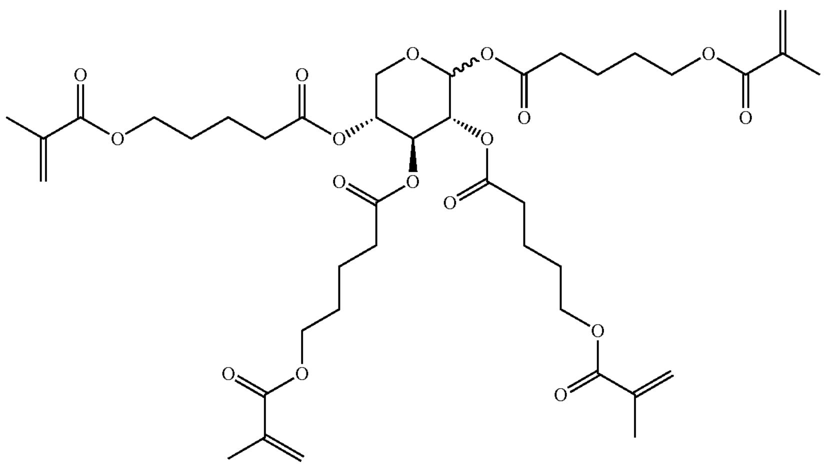 [SMILES: C=C(C)C(=O)OCCCCC(=O)OC1OC[C@@H](OC(=O)CCCCOC(=O)C(=C)C)[C@H](OC(=O)CCCCOC(=O)C(=C)C)[C@H]1OC(=O)CCCCOC(=O)C(=C)C]
RM-77
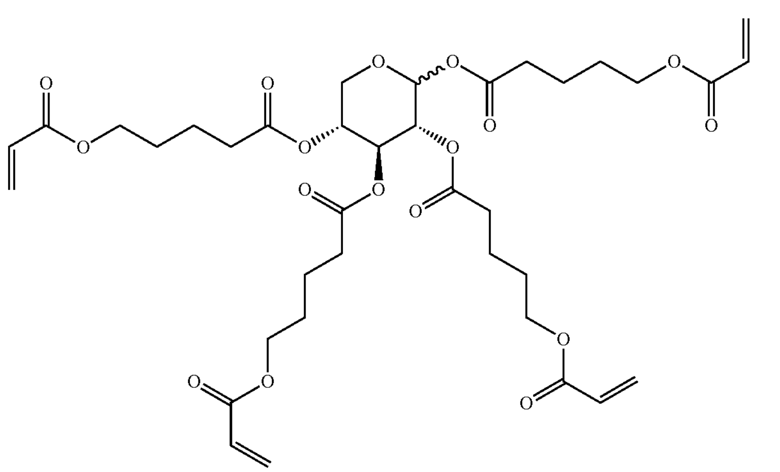 [SMILES: C=CC(=O)OCCCCC(=O)OC1OC[C@@H](OC(=O)CCCCOC(=O)C=C)[C@H](OC(=O)CCCCOC(=O)C=C)[C@H]1OC(=O)CCCCOC(=O)C=C]
RM-78

TABLE D-continued
RM-79
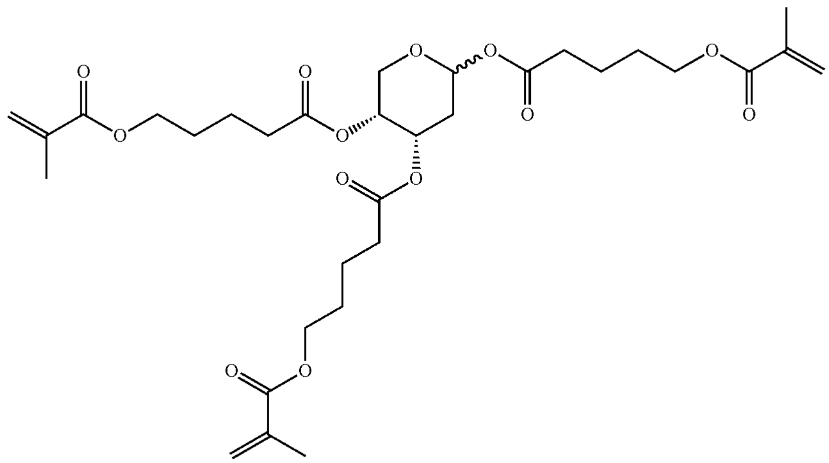 [SMILES: C=C(C)C(=O)OCCCCC(=O)OC1C[C@H](OC(=O)CCCCOC(=O)C(=C)C)[C@H](OC(=O)CCCCOC(=O)C(=C)C)CO1]
RM-80
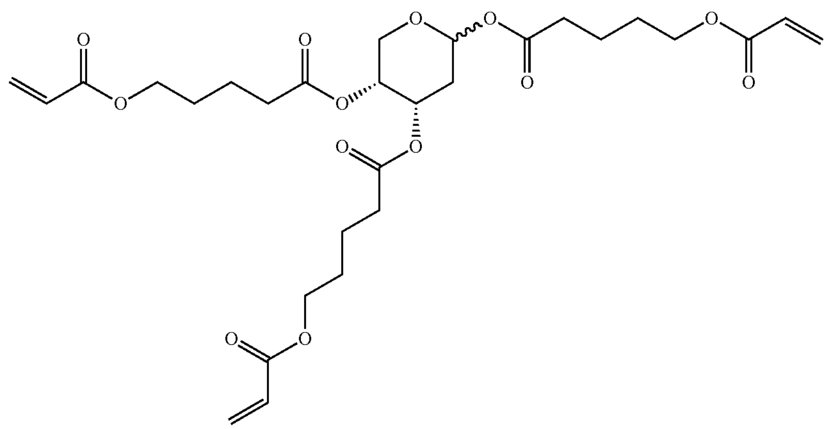 [SMILES: C=CC(=O)OCCCCC(=O)OC1C[C@H](OC(=O)CCCCOC(=O)C=C)[C@H](OC(=O)CCCCOC(=O)C=C)CO1]
RM-81
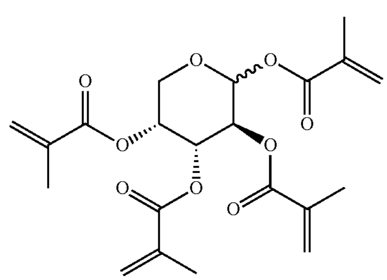 [SMILES: C=C(C)C(=O)OC1OC[C@@H](OC(=O)C(=C)C)[C@@H](OC(=O)C(=C)C)[C@@H]1OC(=O)C(=C)C]
RM-82
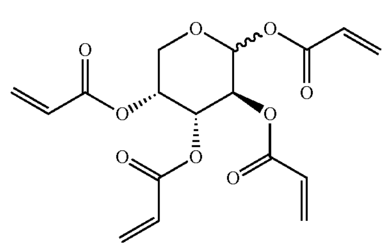 [SMILES: C=CC(=O)OC1OC[C@@H](OC(=O)C=C)[C@@H](OC(=O)C=C)[C@@H]1OC(=O)C=C]

TABLE D-continued
RM-83
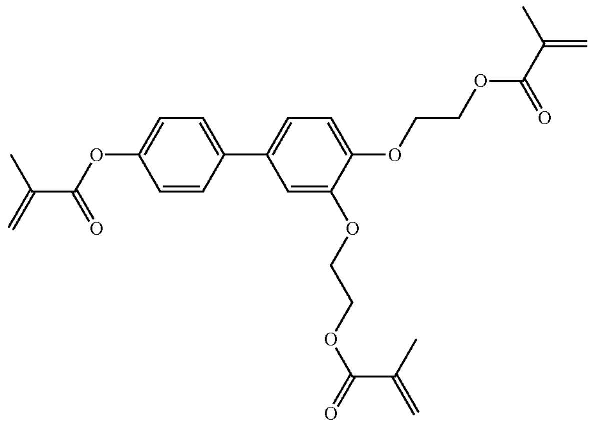 [SMILES: C=C(C)C(=O)OCCOc1ccc(-c2ccc(OC(=O)C(=C)C)cc2)cc1OCCOC(=O)C(=C)C]
RM-84
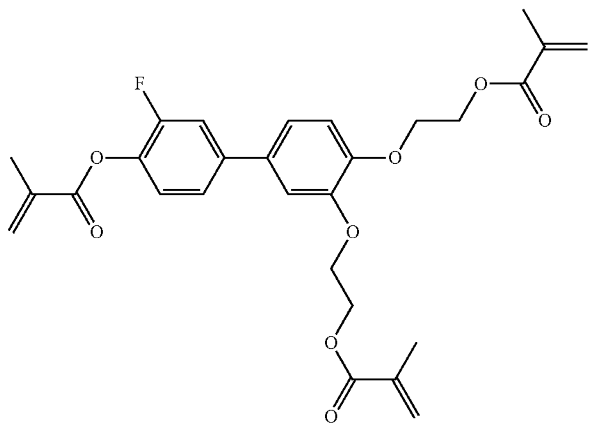 [SMILES: C=C(C)C(=O)OCCOc1ccc(-c2ccc(OC(=O)C(=C)C)c(F)c2)cc1OCCOC(=O)C(=C)C]
RM-85
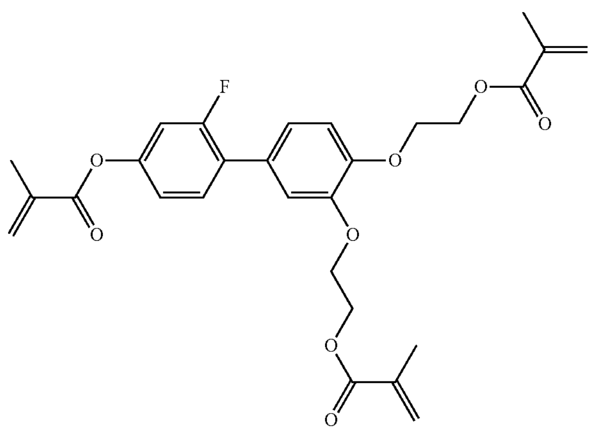 [SMILES: C=C(C)C(=O)OCCOc1ccc(-c2ccc(OC(=O)C(=C)C)cc2F)cc1OCCOC(=O)C(=C)C]

TABLE D-continued
RM-86
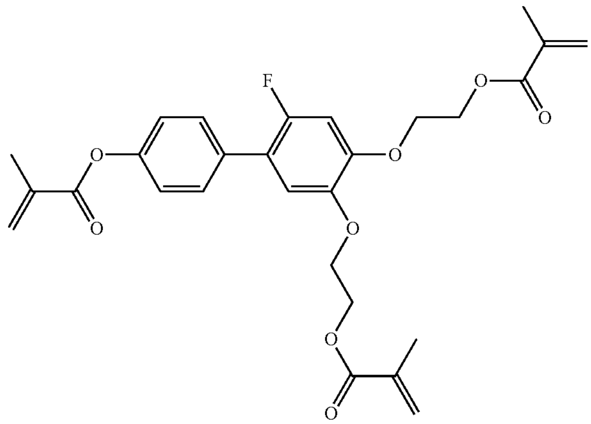 [SMILES: C=C(C)C(=O)OCCOc1cc(F)c(-c2ccc(OC(=O)C(=C)C)cc2)cc1OCCOC(=O)C(=C)C]
RM-87
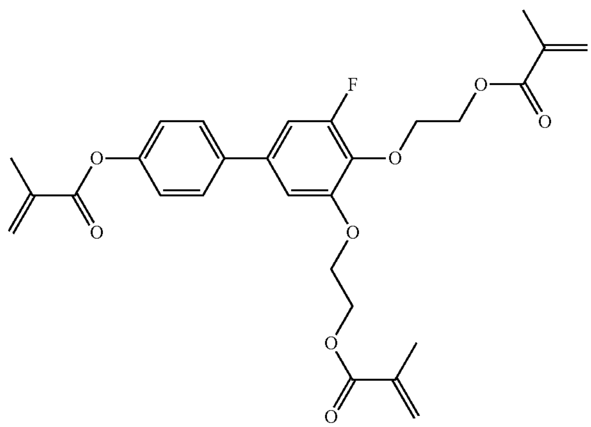 [SMILES: C=C(C)C(=O)OCCOc1cc(-c2ccc(OC(=O)C(=C)C)cc2)cc(F)c1OCCOC(=O)C(=C)C]
RM-88
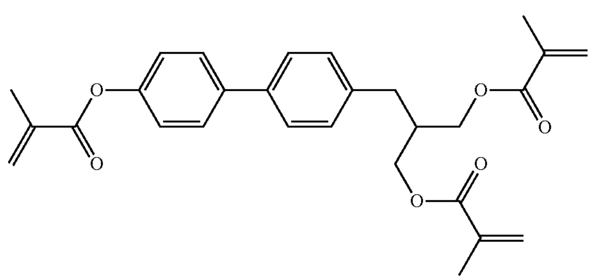 [SMILES: C=C(C)C(=O)OCC(COC(=O)C(=C)C)Cc1ccc(-c2ccc(OC(=O)C(=C)C)cc2)cc1]
RM-89
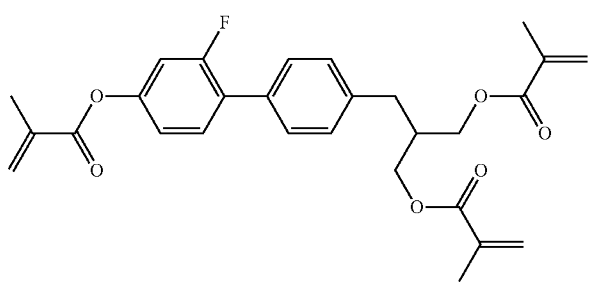 [SMILES: C=C(C)C(=O)OCC(COC(=O)C(=C)C)Cc1ccc(-c2ccc(OC(=O)C(=C)C)cc2F)cc1]

TABLE D-continued
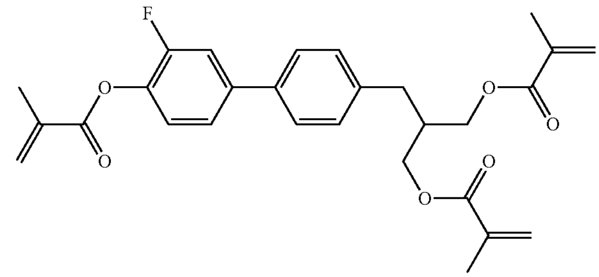 [SMILES: C=C(C)C(=O)OCC(COC(=O)C(=C)C)Cc1ccc(-c2ccc(OC(=O)C(=C)C)c(F)c2)cc1]
RM-90
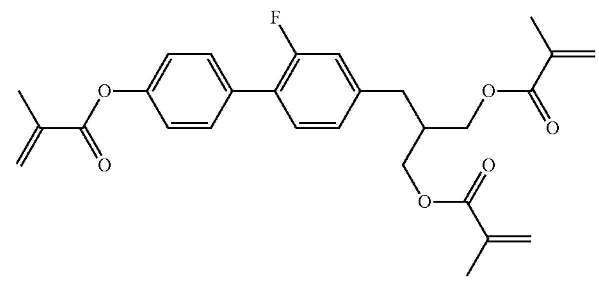 [SMILES: C=C(C)C(=O)OCC(COC(=O)C(=C)C)Cc1ccc(-c2ccc(OC(=O)C(=C)C)cc2)c(F)c1]
RM-91
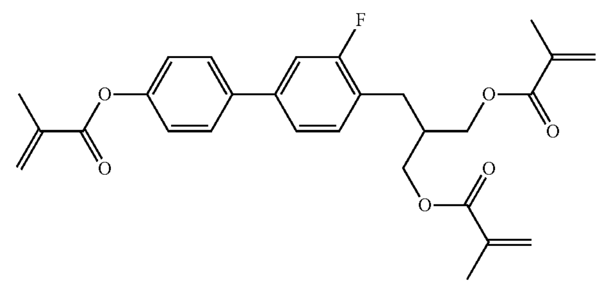 [SMILES: C=C(C)C(=O)OCC(COC(=O)C(=C)C)Cc1ccc(-c2ccc(OC(=O)C(=C)C)cc2)cc1F]
RM-92
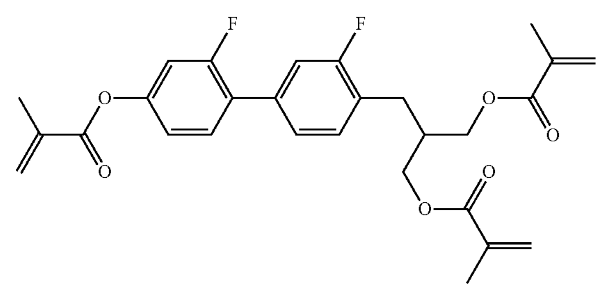 [SMILES: C=C(C)C(=O)OCC(COC(=O)C(=C)C)Cc1ccc(-c2ccc(OC(=O)C(=C)C)cc2F)cc1F]
RM-93
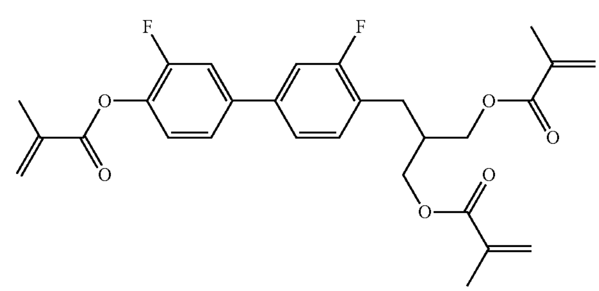 [SMILES: C=C(C)C(=O)OCC(COC(=O)C(=C)C)Cc1ccc(-c2ccc(OC(=O)C(=C)C)c(F)c2)cc1F]
RM-94
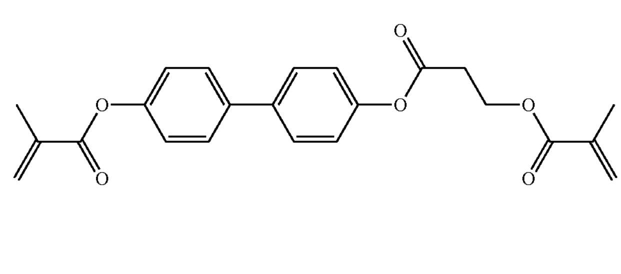 [SMILES: C=C(C)C(=O)OCCC(=O)Oc1ccc(-c2ccc(OC(=O)C(=C)C)cc2)cc1]
RM-95

TABLE D-continued
RM-96
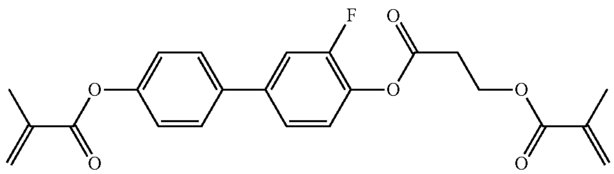 [SMILES: C=C(C)C(=O)OCCC(=O)Oc1ccc(-c2ccc(OC(=O)C(=C)C)cc2)cc1F]
RM-97
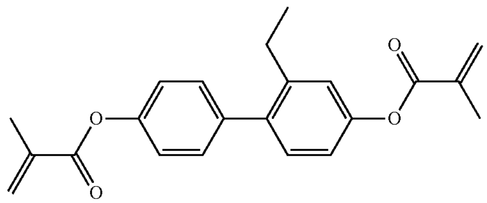 [SMILES: C=C(C)C(=O)Oc1ccc(-c2ccc(OC(=O)C(=C)C)cc2CC)cc1]
RM-98
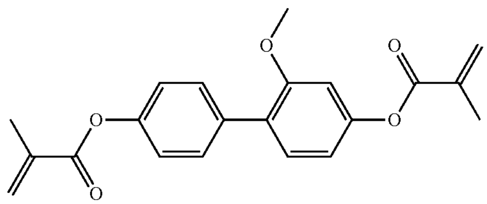 [SMILES: C=C(C)C(=O)Oc1ccc(-c2ccc(OC(=O)C(=C)C)cc2OC)cc1]
RM-99
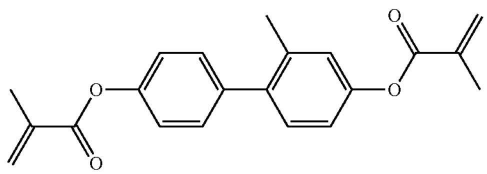
RM-100
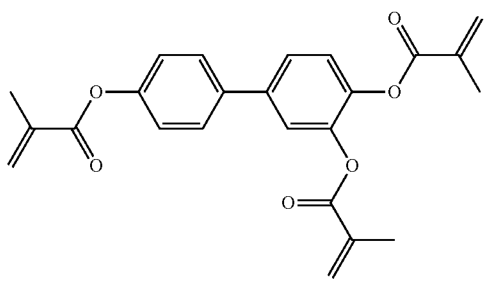 [SMILES: C=C(C)C(=O)Oc1ccc(-c2ccc(OC(=O)C(=C)C)c(OC(=O)C(=C)C)c2)cc1]
RM-101
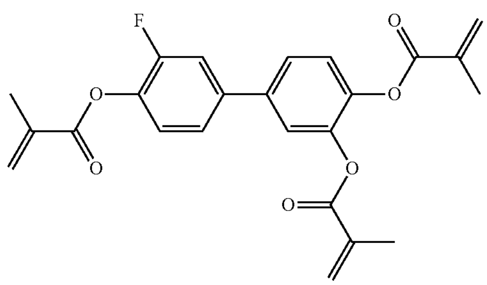 [SMILES: C=C(C)C(=O)Oc1ccc(-c2ccc(OC(=O)C(=C)C)c(OC(=O)C(=C)C)c2)cc1F]
RM-102
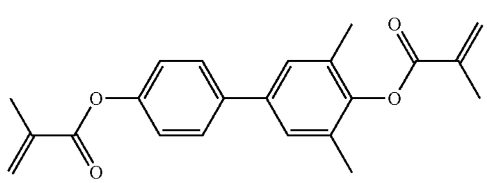 [SMILES: C=C(C)C(=O)Oc1ccc(-c2cc(C)c(OC(=O)C(=C)C)c(C)c2)cc1]

Table D shows example compounds which can preferably be used as reactive mesogenic compounds in the LC media in accordance with the present invention. If the mixtures according to the invention comprise one or more reactive compounds, they are preferably employed in amounts of 0.01-5% by weight. It may also be necessary to add an initiator or a mixture of two or more initiators for the polymerisation. The initiator or initiator mixture is preferably added in amounts of 0.001-2% by weight, based on the mixture. A suitable initiator is, for example, Irgacure (BASF) or Irganox (BASF).

In a preferred embodiment, the mixtures according to the invention comprise one or more polymerisable compounds, preferably selected from the polymerisable compounds of the formulae RM-1 to RM-102. Media of this type are suitable, in particular, for PS-VA, PS-FFS and PS-IPS applications. Of the reactive mesogens shown in Table D, compounds RM-1, RM-2, RM-3, RM-4, RM-5, RM-11, RM-15, RM-17, RM-35, RM-41, RM-44, RM-64, RM-83, RM-95, RM-98 and RM-100 are particularly preferred.

If the medium comprises more than one mesogenic compound, it is preferred to employ two mesogenic compounds. The following mesogenic compounds are preferably employed together:

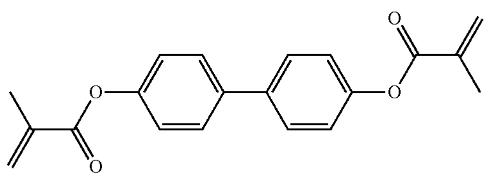

and

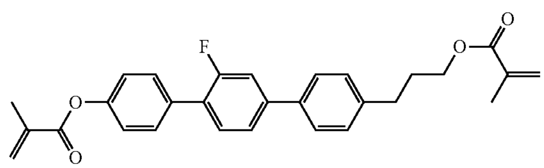

or

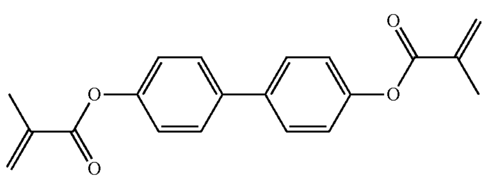

and

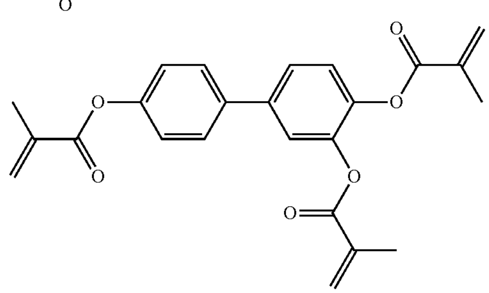

or

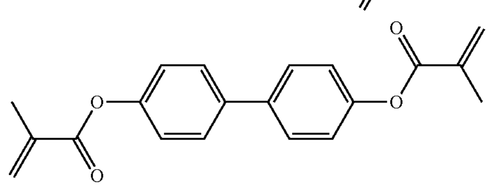

and

-continued

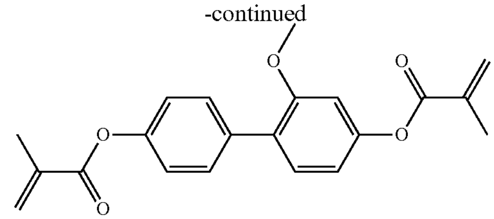

or

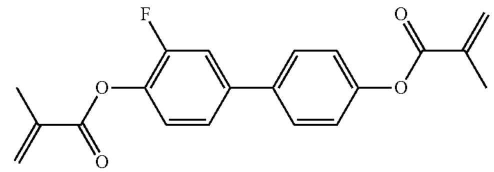

and

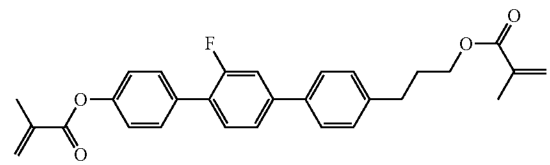

or

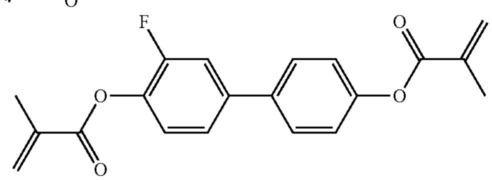

and

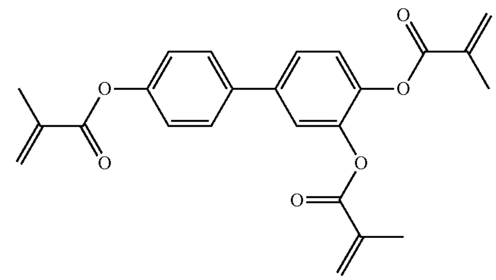

or

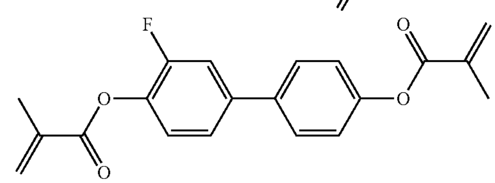

and

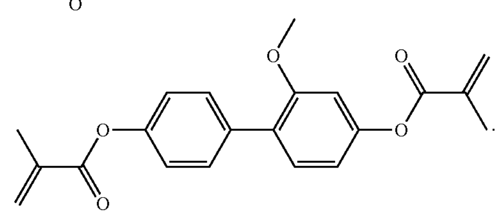

.

WORKING EXAMPLES

The following examples are intended to explain the invention without limiting it. In the examples, m.p. denotes the melting point and C denotes the clearing point of a liquid-crystalline substance in degrees Celsius; boiling temperatures are denoted by m.p. Furthermore:

C denotes crystalline solid state, S denotes smectic phase (the index denotes the phase type), N denotes nematic state, Ch denotes cholesteric phase, I denotes isotropic phase, $T_g$ denotes glass-transition temperature. The number between two symbols indicates the conversion temperature in degrees Celsius an.

The host mixture used for determination of the optical anisotropy Δn of the compounds of the formulae IA to IH is the commercial mixture ZLI-4792 (Merck KGaA). The dielectric anisotropy Δε is determined using commercial mixture ZLI-2857. The physical data of the compound to be investigated are obtained from the change in the dielectric constants of the host mixture after addition of the compound to be investigated and extrapolation to 100% of the compound employed. In general, 10% of the compound to be investigated are dissolved in the host mixture, depending on the solubility.

Unless indicated otherwise, parts or percent data denote parts by weight or percent by weight.

Above and below:

$V_o$ denotes threshold voltage, capacitive [V] at 20° C., $n_e$ denotes extraordinary refractive index at 20° C. and 589 nm, $n_o$ denotes ordinary refractive index at 20° C. and 589 nm, Δn denotes optical anisotropy at 20° C. and 589 nm, $\varepsilon_\perp$ denotes dielectric permittivity perpendicular to the director at 20° C. and 1 kHz, ε|| denotes dielectric permittivity parallel to the director at 20° C. and 1 kHz, Δε denotes dielectric anisotropy at 20° C. and 1 kHz, cl.p., T(N,I) denotes clearing point [° C.], $\gamma_1$ denotes rotational viscosity measured at 20° C. [mPa·s], determined by the rotation method in a magnetic field, $K_1$ denotes elastic constant, "splay" deformation at 20° C. [pN], $K_2$ denotes elastic constant, "twist" deformation at 20° C. [pN], $K_3$ denotes elastic constant, "bend" deformation at 20° C. [pN], LTS denotes low-temperature stability (nematic phase), determined in a bulk sample.

Unless explicitly noted otherwise, all values indicated in the present application for temperatures, such as, for example, the melting point T(C,N), the transition from the smectic (S) to the nematic (N) phase T(S,N) and the clearing point T(N,I), are indicated in degrees Celsius (° C.). M.p. denotes melting point, cl.p.=clearing point. Furthermore, Tg=glass state, C=crystalline state, N=nematic phase, S=smectic phase and I=isotropic phase. The numbers between these symbols represent the transition temperatures.

The term "threshold voltage" for the present invention relates to the capacitive threshold ($V_0$), also called the Freedericksz threshold, unless explicitly indicated otherwise. In the examples, as is generally usual, the optical threshold can also be indicated for 10% relative contrast ($V_{10}$).

The display used for measurement of the capacitive threshold voltage consists of two plane-parallel glass outer plates at a separation of 20 μm, which each have on the insides an electrode layer and an unrubbed polyimide alignment layer on top, which cause a homeotropic edge alignment of the liquid-crystal molecules.

The display or test cell used for measurement of the tilt angle consists of two plane-parallel glass outer plates at a separation of 4 μm, which each have on the insides an electrode layer and a polyimide alignment layer on top, where the two polyimide layers are rubbed antiparallel to one another and cause a homeotropic edge alignment of the liquid-crystal molecules.

The polymerisable compounds are polymerised in the display or test cell by irradiation with UVA light (usually 365 nm) of a defined intensity for a pre-specified time, with a voltage simultaneously being applied to the display (usually 10 V to 30 V alternating current, 1 kHz). In the examples, unless indicated otherwise, a 50 mW/cm² mercury vapour lamp is used, and the intensity is measured using a standard UV meter (make Ushio UNI meter) fitted with a 365 nm band-pass filter.

The tilt angle is determined by a rotational crystal experiment (Autronic-Melchers TBA-105). A low value (i.e. a large deviation from the 90° angle) corresponds to a large tilt here.

The VHR value is measured as follows: 0.3% of a polymerisable monomeric compound are added to the LC host mixture, and the resultant mixture is introduced into TN-VHR test cells (rubbed at 90°, alignment layer TN polyimide, layer thickness d≈6 μm). The HR value is determined after 5 min at 100° C. before and after UV exposure for 2 h (sun test) at 1 V, 60 Hz, 64 μs pulse (measuring instrument: Autronic-Melchers VHRM-105).

In order to investigate the low-temperature stability, also known as "LTS", i.e. the stability of the LC mixture to spontaneous crystallisation-out of individual components at low temperatures, bottles containing 1 g of LC/RM mixture are stored at −10° C., and it is regularly checked whether the mixtures have crystallised out.

The so-called "HTP" denotes the helical twisting power of an optically active or chiral substance in an LC medium (in μm). Unless indicated otherwise, the HTP is measured in the commercially available nematic LC host mixture MLD-6260 (Merck KGaA) at a temperature of 20° C.

Unless explicitly noted otherwise, all concentrations in the present application are indicated in percent by weight and relate to the corresponding mixture as a whole, comprising all solid or liquid-crystalline components, without solvents. All physical properties are determined in accordance with "Merck Liquid Crystals, Physical Properties of Liquid Crystals", Status November 1997, Merck KGaA, Germany, and apply for a temperature of 20° C., unless explicitly indicated otherwise.

The following mixture examples having negative dielectric anisotropy are suitable, in particular, for liquid-crystal displays which have at least one planar alignment layer, such as, for example, IPS and FFS displays, in particular UB-FFS (=ultra-bright FFS), and for VA displays.

MIXTURE EXAMPLES

Example M1

| | | | |
|---|---|---|---|
| BCH-32 | 8.00% | Clearing point [° C.]: | 76 |
| CC-3-V1 | 9.00% | Δn [589 nm, 20° C.]: | 0.1096 |
| CC-3-V2 | 17.00% | $\varepsilon_{\parallel}$ [1 kHz, 20° C.]: | 3.6 |
| CCP-3-1 | 4.50% | $\varepsilon_{\perp}$ [1 kHz, 20° C.]: | 6.8 |
| CCP-V2-1 | 4.50% | Δε [1 kHz, 20° C.]: | −3.3 |
| CCY-3-O1 | 4.00% | $K_1$ [pN, 20° C.]: | 14.9 |
| CCY-3-O2 | 10.50% | $K_3$ [pN, 20° C.]: | 17.1 |
| CLY-3-O2 | 1.00% | $V_0$ [pN, 20° C.]: | 2.42 |
| CPY-3-O2 | 4.50% | $\gamma_1$ [mPa s, 20° C.]: | 111 |
| CY-3-O2 | 15.50% | LTS bulk [−20° C.]: | >1000 h |
| PCH-301 | 3.50% | | |
| PY-3-O2 | 18.00% | | |

Example M2

| | | | |
|---|---|---|---|
| B(S)-2O-O5 | 4.00% | Clearing point [° C.]: | 74.5 |
| B(S)-2O-O4 | 3.00% | Δn [589 nm, 20° C.]: | 0.1098 |
| BCH-32 | 6.00% | $\varepsilon_{\parallel}$ [1 kHz, 20° C.]: | 3.6 |
| CC-3-V1 | 6.00% | $\varepsilon_{\perp}$ [1 kHz, 20° C.]: | 6.7 |
| CC-3-V2 | 22.00% | Δε [1 kHz, 20° C.]: | −3.1 |
| CCP-3-1 | 11.50% | $K_1$ [pN, 20° C.]: | 15.1 |
| CCY-3-O2 | 10.50% | $K_3$ [pN, 20° C.]: | 16.1 |
| CLY-3-O2 | 1.00% | $V_0$ [pN, 20° C.]: | 2.43 |
| CY-3-O2 | 12.50% | $\gamma_1$ [mPa s, 20° C.]: | 96 |
| PCH-3O1 | 8.50% | LTS bulk [−20° C.]: | >1000 h |
| PY-3-O2 | 12.00% | | |
| PYP-2-3 | 3.00% | | |

Example M3

| | | | |
|---|---|---|---|
| CC-3-V1 | 9.00% | Clearing point [° C.]: | 74.5 |
| CC-3-V2 | 10.00% | Δn [589 nm, 20° C.]: | 0.1089 |
| CCP-V2-1 | 5.00% | $\varepsilon_{\parallel}$ [1 kHz, 20° C.]: | 3.5 |
| CCH-3O1 | 3.00% | $\varepsilon_{\perp}$ [1 kHz, 20° C.]: | 6.6 |
| CCH-34 | 8.00% | Δε [1 kHz, 20° C.]: | −3.1 |
| BCH-32 | 3.50% | $K_1$ [pN, 20° C.]: | 14.1 |
| CLY-3-O2 | 10.00% | $K_3$ [pN, 20° C.]: | 16.0 |
| CPY-2-O2 | 3.00% | $V_0$ [pN, 20° C.]: | 2.40 |
| CPY-3-O2 | 9.50% | $\gamma_1$ [mPa s, 20° C.]: | 97 |
| CY-3-O2 | 8.00% | | |
| PY-1-O2 | 6.50% | | |
| PCH-3O1 | 17.50% | | |
| B(S)-2O-O5 | 4.00% | | |
| B(S)-2O-O4 | 3.00% | | |

Example M4

| | | | |
|---|---|---|---|
| B-2O-O5 | 4.00% | Clearing point [° C.]: | 74.5 |
| BCH-32 | 8.00% | Δn [589 nm, 20° C.]: | 0.1096 |
| CC-3-V1 | 9.00% | $\varepsilon_{\parallel}$ [1 kHz, 20° C.]: | 3.6 |
| CC-3-V2 | 17.00% | $\varepsilon_{\perp}$ [1 kHz, 20° C.]: | 6.7 |
| CCP-3-1 | 8.00% | Δε [1 kHz, 20° C.]: | −3.2 |
| CCP-V2-1 | 5.00% | $K_1$ [pN, 20° C.]: | 14.8 |
| CCY-3-O2 | 10.50% | $K_3$ [pN, 20° C.]: | 16.7 |
| CLY-3-O2 | 1.00% | $V_0$ [pN, 20° C.]: | 2.43 |
| CPY-3-O2 | 2.50% | $\gamma_1$ [mPa s, 20° C.]: | 104 |
| CY-3-O2 | 14.00% | LTS bulk [−20° C.]: | >1000 h |
| PCH-301 | 5.50% | | |
| PY-3-O2 | 15.50% | | |

Example M5

| | | | |
|---|---|---|---|
| B(S)-2O-O5 | 4.00% | Clearing point [° C.]: | 74.5 |
| B(S)-2O-O4 | 3.00% | Δn [589 nm, 20° C.]: | 0.1096 |
| BCH-32 | 8.00% | $\varepsilon_{\parallel}$ [1 kHz, 20° C.]: | 3.6 |
| CC-3-V1 | 9.00% | $\varepsilon_{\perp}$ [1 kHz, 20° C.]: | 6.8 |
| CC-3-V2 | 17.00% | Δε [1 kHz, 20° C.]: | −3.2 |
| CCP-3-1 | 10.50% | $K_1$ [pN, 20° C.]: | 14.6 |
| CCP-V2-1 | 5.00% | $K_3$ [pN, 20° C.]: | 16.3 |
| CCY-3-O2 | 8.00% | $V_0$ [pN, 20° C.]: | 2.40 |
| CLY-3-O2 | 1.00% | $\gamma_1$ [mPa s, 20° C.]: | 94 |
| CY-3-O2 | 15.00% | LTS bulk [−20° C.]: | >1000 h |
| PCH-3O1 | 6.00% | | |
| PY-1-O2 | 6.50% | | |
| PY-2-O2 | 7.00% | | |

Example M6

| | | | |
|---|---|---|---|
| CC-3-V1 | 7.00% | Clearing point [° C.]: | 74.5 |
| CC-3-V2 | 17.00% | Δn [589 nm, 20° C.]: | 0.0992 |
| CCH-34 | 4.00% | $\varepsilon_{\parallel}$ [1 kHz, 20° C.]: | 3.5 |
| CCH-35 | 7.00% | $\varepsilon_{\perp}$ [1 kHz, 20° C.]: | 7.1 |
| CCP-3-1 | 6.50% | Δε [1 kHz, 20° C.]: | −3.6 |
| CCY-3-O2 | 11.00% | $K_1$ [pN, 20° C.]: | 15.1 |
| CPY-2-O2 | 3.00% | $K_3$ [pN, 20° C.]: | 16.6 |
| CPY-3-O2 | 11.00% | $V_0$ [pN, 20° C.]: | 2.28 |
| CY-3-O2 | 15.50% | $\gamma_1$ [mPa s, 20° C.]: | 108 |
| CY-3-O4 | 7.00% | LTS bulk [−20° C.]: | >1000 h |
| PY-3-O2 | 11.00% | | |

Example M7

| | | | |
|---|---|---|---|
| CC-3-V1 | 8.00% | Clearing point [° C.]: | 74 |
| CC-3-V2 | 16.50% | Δn [589 nm, 20° C.]: | 0.0999 |
| CCH-34 | 5.00% | $\varepsilon_{\parallel}$ [1 kHz, 20° C.]: | 3.7 |
| CCH-35 | 4.00% | $\varepsilon_{\perp}$ [1 kHz, 20° C.]: | 7.2 |
| CCP-3-1 | 14.00% | Δε [1 kHz, 20° C.]: | −3.5 |
| CCY-3-O1 | 6.50% | $K_1$ [pN, 20° C.]: | 15.7 |
| CCY-3-O2 | 10.00% | $K_3$ [pN, 20° C.]: | 16.2 |
| CPY-3-O2 | 2.00% | $V_0$ [pN, 20° C.]: | 2.27 |
| CY-3-O2 | 10.00% | $\gamma_1$ [mPa s, 20° C.]: | 95 |
| B(S)-2O-O5 | 4.00% | | |
| B(S)-2O-O4 | 3.00% | | |
| PP-1-3 | 3.50% | | |
| Y-4O-O4 | 4.50% | | |
| PY-1-O2 | 7.00% | | |
| PY-2-O2 | 2.00% | | |

Example M8

| | | | |
|---|---|---|---|
| BCH-32 | 8.00% | Clearing point [° C.]: | 75 |
| CC-3-V1 | 9.00% | Δn [589 nm, 20° C.]: | 0.1096 |
| CC-4-V1 | 17.00% | $\varepsilon_{\parallel}$ [1 kHz, 20° C.]: | 3.6 |
| CCP-3-1 | 3.00% | $\varepsilon_{\perp}$ [1 kHz, 20° C.]: | 6.8 |
| CCP-V2-1 | 5.00% | Δε [1 kHz, 20° C.]: | −3.2 |
| CCY-3-O1 | 3.50% | $K_1$ [pN, 20° C.]: | 14.5 |
| CCY-3-O2 | 10.50% | $K_3$ [pN, 20° C.]: | 16.8 |
| CLY-3-O2 | 1.00% | $V_0$ [pN, 20° C.]: | 2.41 |
| CPY-3-O2 | 4.50% | $\gamma_1$ [mPa s, 20° C.]: | 111 |
| CY-3-O2 | 15.50% | LTS bulk [−20° C.]: | >1000 h |
| PCH-3O1 | 5.00% | | |
| PY-3-O2 | 18.00% | | |

Example M9

| | | | |
|---|---|---|---|
| CC-3-V1 | 5.50% | Clearing point [° C.]: | 75 |
| CC-4-V1 | 10.00% | Δn [589 nm, 20° C.]: | 0.1094 |
| CCP-V2-1 | 5.00% | $\varepsilon_{\parallel}$ [1 kHz, 20° C.]: | 3.6 |
| CCH-3O1 | 5.00% | $\varepsilon_{\perp}$ [1 kHz, 20° C.]: | 6.6 |
| CCH-34 | 5.00% | Δε [1 kHz, 20° C.]: | −3.1 |
| CCH-35 | 5.00% | $K_1$ [pN, 20° C.]: | 14.2 |
| BCH-32 | 3.50% | $K_3$ [pN, 20° C.]: | 15.9 |
| CLY-3-O2 | 10.00% | $V_0$ [pN, 20° C.]: | 2.40 |
| CPY-2-O2 | 3.00% | $\gamma_1$ [mPa s, 20° C.]: | 99 |
| CPY-3-O2 | 9.50% | LTS bulk [−20° C.]: | >1000 h |
| CY-3-O2 | 6.00% | | |
| PY-1-O2 | 8.00% | | |
| PCH-301 | 17.50% | | |
| B(S)-2O-O5 | 4.00% | | |
| B(S)-2O-O4 | 3.00% | | |

Example M10

| | | | |
|---|---|---|---|
| B-2O-O5 | 4.00% | Clearing point [° C.]: | 74.5 |
| BCH-32 | 8.00% | Δn [589 nm, 20° C.]: | 0.1093 |
| CC-3-V1 | 9.00% | $\varepsilon_{\parallel}$ [1 kHz, 20° C.]: | 3.6 |
| CC-4-V1 | 17.00% | $\varepsilon_{\perp}$ [1 kHz, 20° C.]: | 6.8 |
| CCP-3-1 | 7.50% | Δε [1 kHz, 20° C.]: | −3.2 |
| CCP-V2-1 | 5.00% | $K_1$ [pN, 20° C.]: | 14.4 |
| CCY-3-O2 | 10.00% | $K_3$ [pN, 20° C.]: | 16.6 |
| CLY-3-O2 | 1.00% | $V_0$ [pN, 20° C.]: | 2.42 |
| CPY-3-O2 | 2.50% | $\gamma_1$ [mPa s, 20° C.]: | 104 |
| CY-3-O2 | 15.00% | | |
| PCH-301 | 6.00% | | |
| PY-3-O2 | 15.00% | | |

Example M11

| | | | |
|---|---|---|---|
| B-2O-O5 | 4.00% | Clearing point [° C.]: | 75.5 |
| BCH-32 | 8.00% | Δn [589 nm, 20° C.]: | 0.1088 |
| CC-3-V1 | 9.00% | $\varepsilon_{\parallel}$ [1 kHz, 20° C.]: | 3.6 |
| CC-4-V1 | 23.00% | $\varepsilon_{\perp}$ [1 kHz, 20° C.]: | 6.8 |
| CCP-3-1 | 6.50% | Δε [1 kHz, 20° C.]: | −3.2 |
| CCP-V2-1 | 5.00% | $K_1$ [pN, 20° C.]: | 15.2 |
| CCY-3-O2 | 8.00% | $K_3$ [pN, 20° C.]: | 16.6 |
| CLY-3-O2 | 1.00% | $V_0$ [pN, 20° C.]: | 2.43 |
| CPY-3-O2 | 3.50% | $\gamma_1$ [mPa s, 20° C.]: | 104 |
| CY-3-O2 | 16.00% | LTS bulk [−20° C.]: | >1000 h |
| PY-3-O2 | 16.00% | | |

Example M12

| | | | |
|---|---|---|---|
| B(S)-2O-O5 | 4.00% | Clearing point [° C.]: | 75.5 |
| B(S)-2O-O4 | 3.00% | Δn [589 nm, 20° C.]: | 0.1100 |
| BCH-32 | 8.00% | $\varepsilon_{\parallel}$ [1 kHz, 20° C.]: | 3.6 |
| CC-3-V1 | 9.00% | $\varepsilon_{\perp}$ [1 kHz, 20° C.]: | 6.7 |
| CC-4-V1 | 23.00% | Δε [1 kHz, 20° C.]: | −3.2 |
| CCP-3-1 | 9.00% | $K_1$ [pN, 20° C.]: | 15.5 |
| CCP-V2-1 | 5.00% | $K_3$ [pN, 20° C.]: | 16.2 |
| CCY-3-O2 | 6.00% | $V_0$ [pN, 20° C.]: | 2.38 |
| CLY-3-O2 | 1.00% | $\gamma_1$ [mPa s, 20° C.]: | 98 |
| CY-3-O2 | 15.50% | LTS bulk [−20° C.]: | >1000 h |
| PY-3-O2 | 14.00% | | |
| PY-1-O4 | 2.50% | | |

Example M13

| | | | |
|---|---|---|---|
| B(S)-2O-O5 | 4.00% | Clearing point [° C.]: | 75 |
| B(S)-2O-O4 | 3.00% | Δn [589 nm, 20° C.]: | 0.1095 |
| BCH-32 | 8.00% | $\varepsilon_{\parallel}$ [1 kHz, 20° C.]: | 3.6 |
| CC-3-V1 | 9.00% | $\varepsilon_{\perp}$ [1 kHz, 20° C.]: | 6.7 |
| CC-4-V1 | 23.00% | Δε [1 kHz, 20° C.]: | −3.1 |
| CCP-3-1 | 10.50% | $K_1$ [pN, 20° C.]: | 14.6 |
| CCP-V2-1 | 5.00% | $K_3$ [pN, 20° C.]: | 15.9 |
| CCY-3-O2 | 5.00% | $V_0$ [pN, 20° C.]: | 2.39 |
| CLY-3-O2 | 1.00% | $\gamma_1$ [mPa s, 20° C.]: | 92 |
| CY-3-O2 | 15.50% | LTS bulk [−20° C.]: | >1000 h |
| PY-1-O2 | 8.00% | | |
| PY-2-O2 | 8.00% | | |

Example M14

| | | | |
|---|---|---|---|
| CC-3-V1 | 5.00% | Clearing point [° C.]: | 109.6 |
| CC-4-V1 | 5.00% | Δn [589 nm, 20° C.]: | 0.0976 |
| CCH-301 | 8.50% | $\varepsilon_{\parallel}$ [1 kHz, 20° C.]: | 3.4 |
| CCH-303 | 5.00% | $\varepsilon_{\perp}$ [1 kHz, 20° C.]: | 6.8 |
| CCH-501 | 3.00% | Δε [1 kHz, 20° C.]: | −3.5 |
| CCP-3-1 | 6.00% | $K_1$ [pN, 20° C.]: | 17.5 |
| CCPC-33 | 2.00% | $K_3$ [pN, 20° C.]: | 20.2 |
| CCY-3-O1 | 5.00% | $V_0$ [pN, 20° C.]: | 2.55 |
| CCY-3-O2 | 9.00% | $\gamma_1$ [mPa s, 20° C.]: | 206 |
| CCY-3-O3 | 7.00% | | |
| CCY-4-O2 | 8.00% | | |
| CCY-5-O2 | 5.00% | | |
| CPY-2-O2 | 6.00% | | |
| CPY-3-O2 | 10.00% | | |
| CY-3-O2 | 5.50% | | |
| PCH-301 | 10.00% | | |

Example M15

| | | | |
|---|---|---|---|
| CC-3-V1 | 7.50% | Clearing point [° C.]: | 74.5 |
| CC-4-V1 | 19.50% | Δn [589 nm, 20° C.]: | 0.0982 |
| CCH-34 | 5.00% | $\varepsilon_{\parallel}$ [1 kHz, 20° C.]: | 3.7 |
| CCH-35 | 4.00% | $\varepsilon_{\perp}$ [1 kHz, 20° C.]: | 7.1 |
| CCP-3-1 | 12.50% | Δε [1 kHz, 20° C.]: | −3.4 |
| CCY-3-O1 | 6.00% | $K_1$ [pN, 20° C.]: | 15.5 |
| CCY-3-O2 | 10.50% | $K_3$ [pN, 20° C.]: | 15.8 |
| CPY-3-O2 | 2.00% | $V_0$ [pN, 20° C.]: | 2.26 |
| CY-3-O2 | 9.00% | $\gamma_1$ [mPa s, 20° C.]: | 94 |
| B(S)-2O-O5 | 4.00% | LTS bulk [−20° C.]: | >1000 h |
| B(S)-2O-O4 | 3.00% | | |
| PP-1-3 | 3.00% | | |
| Y-4O-O4 | 5.00% | | |
| PY-1-O2 | 6.00% | | |
| PY-2-O2 | 3.00% | | |

Example M16

| | | | |
|---|---|---|---|
| B(S)-2O-O5 | 4.00% | Clearing point [° C.]: | 75 |
| B(S)-2O-O4 | 3.00% | Δn [589 nm, 20° C.]: | 0.1094 |
| BCH-32 | 7.50% | $\varepsilon_{\parallel}$ [1 kHz, 20° C.]: | 3.6 |
| CC-3-V1 | 9.00% | $\varepsilon_{\perp}$ [1 kHz, 20° C.]: | 6.7 |
| CC-3-V2 | 11.00% | Δε [1 kHz, 20° C.]: | −3.1 |
| CC-4-V1 | 12.00% | $K_1$ [pN, 20° C.]: | 15.6 |
| CCP-3-1 | 10.00% | $K_3$ [pN, 20° C.]: | 16.1 |
| CCP-V2-1 | 5.00% | $V_0$ [pN, 20° C.]: | 2.40 |
| CCY-3-O2 | 5.50% | $\gamma_1$ [mPa s, 20° C.]: | 94 |
| CLY-3-O2 | 1.00% | LTS bulk [−20° C.]: | >1000 h |
| CY-3-O2 | 15.00% | | |
| PY-3-O2 | 14.00% | | |
| PY-1-O4 | 3.00% | | |

Example M17

| | | | |
|---|---|---|---|
| B(S)-2O-O5 | 4.00% | Clearing point [° C.]: | 74 |
| B(S)-2O-O4 | 3.00% | Δn [589 nm, 20° C.]: | 0.1091 |
| BCH-32 | 8.00% | $\varepsilon_{\parallel}$ [1 kHz, 20° C.]: | 3.5 |
| CC-3-V1 | 7.00% | $\varepsilon_{\perp}$ [1 kHz, 20° C.]: | 6.6 |
| CC-3-V2 | 10.00% | Δε [1 kHz, 20° C.]: | −3.0 |
| CC-4-V1 | 15.00% | $K_1$ [pN, 20° C.]: | 15.3 |
| CCP-3-1 | 10.50% | $K_3$ [pN, 20° C.]: | 15.7 |
| CCP-V2-1 | 5.00% | $V_0$ [pN, 20° C.]: | 2.40 |
| CCY-3-O2 | 4.50% | $\gamma_1$ [mPa s, 20° C.]: | 94 |
| CLY-3-O2 | 1.00% | | |

-continued

| | |
|---|---|
| CY-3-O2 | 15.50% |
| PY-3-O2 | 14.00% |
| PY-1-O4 | 2.50% |

Example M18

| | | | |
|---|---|---|---|
| CC-3-V1 | 5.00% | Clearing point [° C.]: | 75 |
| CC-4-V1 | 23.00% | Δn [589 nm, 20° C.]: | 0.0985 |
| CC-3-V2 | 14.00% | $\varepsilon_{\parallel}$ [1 kHz, 20° C.]: | 3.6 |
| CCY-3-O1 | 7.50% | $\varepsilon_{\perp}$ [1 kHz, 20° C.]: | 7.1 |
| CCY-3-O2 | 11.00% | Δε [1 kHz, 20° C.]: | −3.6 |
| CPY-3-O2 | 9.50% | $K_1$ [pN, 20° C.]: | 14.7 |
| CY-3-O2 | 15.50% | $K_3$ [pN, 20° C.]: | 16.4 |
| PY-3-O2 | 5.50% | $V_0$ [pN, 20° C.]: | 2.27 |
| PY-1-O2 | 9.00% | $\gamma_1$ [mPa s, 20° C.]: | 102 |

Example M19

| | | | |
|---|---|---|---|
| PCH-302 | 8.00% | Clearing point [° C.]: | 76.5 |
| CC-3-V1 | 9.00% | Δn [589 nm, 20° C.]: | 0.1017 |
| CC-3-V2 | 11.00% | $\varepsilon_{\parallel}$ [1 kHz, 20° C.]: | 3.5 |
| CC-4-V1 | 12.00% | $\varepsilon_{\perp}$ [1 kHz, 20° C.]: | 7.0 |
| CCP-V-1 | 2.50% | Δε [1 kHz, 20° C.]: | −3.5 |
| CLY-2-O4 | 4.00% | $K_1$ [pN, 20° C.]: | 15.2 |
| CLY-3-O2 | 6.00% | $K_3$ [pN, 20° C.]: | 16.6 |
| CLY-3-O3 | 5.00% | $V_0$ [pN, 20° C.]: | 2.29 |
| CLY-4-O2 | 4.00% | $\gamma_1$ [mPa s, 20° C.]: | 113 |
| CLY-5-O2 | 4.00% | LTS bulk [−20° C.]: | >1000 h |
| CPY-3-O2 | 7.00% | | |
| CY-3-O2 | 15.00% | | |
| CY-3-O4 | 2.50% | | |
| PY-3-O2 | 10.00% | | |

Example M20

| | | | |
|---|---|---|---|
| CCH-35 | 6.00% | Clearing point [° C.]: | 76 |
| CC-3-V1 | 9.00% | Δn [589 nm, 20° C.]: | 0.1024 |
| CC-3-V2 | 11.00% | $\varepsilon_{\parallel}$ [1 kHz, 20° C.]: | 3.6 |
| CC-4-V1 | 12.00% | $\varepsilon_{\perp}$ [1 kHz, 20° C.]: | 7.3 |
| CCP-V-1 | 3.00% | Δε [1 kHz, 20° C.]: | −3.7 |
| CLY-2-O4 | 4.00% | $K_1$ [pN, 20° C.]: | 15.7 |
| CLY-3-O2 | 6.00% | $K_3$ [pN, 20° C.]: | 16.3 |
| CLY-3-O3 | 5.00% | $V_0$ [pN, 20° C.]: | 2.23 |
| CLY-4-O2 | 4.00% | $\gamma_1$ [mPa s, 20° C.]: | 107 |
| CLY-5-O2 | 4.00% | LTS bulk [−20° C.]: | >1000 h |
| CPY-3-O2 | 4.50% | | |
| CY-3-O2 | 15.00% | | |
| PY-3-O2 | 7.50% | | |
| PY-1-O2 | 9.00% | | |

Example M21

| | | | |
|---|---|---|---|
| PCH-302 | 17.50% | Clearing point [° C.]: | 75.5 |
| CC-3-V1 | 9.00% | Δn [589 nm, 20° C.]: | 0.1018 |
| CC-3-V2 | 11.00% | $\varepsilon_{\parallel}$ [1 kHz, 20° C.]: | 3.5 |
| CC-4-V1 | 12.00% | $\varepsilon_{\perp}$ [1 kHz, 20° C.]: | 7.2 |
| CLY-2-O4 | 4.00% | Δε [1 kHz, 20° C.]: | −3.7 |
| CLY-3-O2 | 6.00% | $K_1$ [pN, 20° C.]: | 15.7 |
| CLY-3-O3 | 5.00% | $K_3$ [pN, 20° C.]: | 16.8 |
| CLY-4-O2 | 4.00% | $V_0$ [pN, 20° C.]: | 2.27 |

-continued

| | | | |
|---|---|---|---|
| CLY-5-O2 | 4.00% | $\gamma_1$ [mPa s, 20° C.]: | 107 |
| CPY-3-O2 | 2.50% | LTS bulk [−20° C.]: | >1000 h |
| CY-3-O2 | 14.00% | | |
| PY-3-O2 | 3.00% | | |
| B(S)-2O-O5 | 4.00% | | |
| B(S)-2O-O4 | 4.00% | | |

Example M22

| | | | |
|---|---|---|---|
| PCH-3O2 | 5.50% | Clearing point [° C.]: | 76 |
| CCH-34 | 8.00% | Δn [589 nm, 20° C.]: | 0.1025 |
| CCH-35 | 7.00% | $\varepsilon_{\parallel}$ [1 kHz, 20° C.]: | 3.5 |
| CC-3-V1 | 5.00% | $\varepsilon_{\perp}$ [1 kHz, 20° C.]: | 7.3 |
| CC-3-V2 | 11.00% | Δε [1 kHz, 20° C.]: | −3.7 |
| CC-4-V1 | 11.50% | $K_1$ [pN, 20° C.]: | 17.0 |
| CLY-2-O4 | 4.00% | $K_3$ [pN, 20° C.]: | 15.4 |
| CLY-3-O2 | 6.00% | $V_0$ [pN, 20° C.]: | 2.15 |
| CLY-3-O3 | 5.00% | $\gamma_1$ [mPa s, 20° C.]: | 98 |
| CLY-4-O2 | 4.00% | | |
| CLY-5-O2 | 4.00% | | |
| CY-3-O2 | 6.50% | | |
| PY-3-O2 | 5.50% | | |
| PY-1-O2 | 9.00% | | |
| B(S)-2O-O5 | 4.00% | | |
| B(S)-2O-O4 | 4.00% | | |

Example M23

| | | | |
|---|---|---|---|
| CCY-3-O1 | 3.00% | Clearing point [° C.]: | 94.5 |
| CCY-3-O2 | 10.50% | Δn [589 nm, 20° C.]: | 0.0999 |
| CLY-2-O4 | 4.00% | $\varepsilon_{\parallel}$ [1 kHz, 20° C.]: | 3.6 |
| CLY-3-O2 | 5.00% | $\varepsilon_{\perp}$ [1 kHz, 20° C.]: | 8.5 |
| CLY-3-O3 | 5.00% | Δε [1 kHz, 20° C.]: | −4.9 |
| CLY-4-O2 | 4.00% | $K_1$ [pN, 20° C.]: | 17.7 |
| CLY-5-O2 | 5.00% | $K_3$ [pN, 20° C.]: | 18.0 |
| CPY-3-O2 | 4.50% | $V_0$ [pN, 20° C.]: | 2.03 |
| CC-3-V | 11.00% | $\gamma_1$ [mPa s, 20° C.]: | 148 |
| CC-3-V2 | 11.00% | | |
| CC-4-V1 | 12.00% | | |
| CY-3-O2 | 15.00% | | |
| CY-3-O4 | 3.00% | | |
| B(S)-2O-O5 | 4.00% | | |
| B(S)-2O-O4 | 3.00% | | |

Example M24

| | | | |
|---|---|---|---|
| CCY-3-O2 | 5.50% | Clearing point [° C.]: | 88.5 |
| CLY-2-O4 | 4.00% | Δn [589 nm, 20° C.]: | 0.1003 |
| CLY-3-O2 | 5.00% | $\varepsilon_{\parallel}$ [1 kHz, 20° C.]: | 3.6 |
| CLY-3-O3 | 5.00% | $\varepsilon_{\perp}$ [1 kHz, 20° C.]: | 8.1 |
| CLY-4-O2 | 4.00% | Δε [1 kHz, 20° C.]: | −4.5 |
| CLY-5-O2 | 5.00% | $K_1$ [pN, 20° C.]: | 16.7 |
| CPY-3-O2 | 8.50% | $K_3$ [pN, 20° C.]: | 16.9 |
| CC-3-V | 14.00% | $V_0$ [pN, 20° C.]: | 2.04 |
| CC-3-V2 | 11.00% | $\gamma_1$ [mPa s, 20° C.]: | 127 |
| CC-4-V1 | 12.00% | | |
| CY-3-O2 | 15.00% | | |
| CY-3-O4 | 4.00% | | |
| B(S)-2O-O5 | 4.00% | | |
| B(S)-2O-O4 | 3.00% | | |

Example M25

| | | | |
|---|---|---|---|
| B(S)-2O-O5 | 4.00% | Clearing point [° C.]: | 73.5 |
| B(S)-2O-O4 | 3.00% | Δn [589 nm, 20° C.]: | 0.1093 |
| BCH--32 | 8.00% | $ε_{\parallel}$ [1 kHz, 20° C.]: | 3.6 |
| CC-3-V1 | 9.00% | $ε_{\perp}$ [1 kHz, 20° C.]: | 6.7 |
| CC-3-V2 | 11.00% | Δε [1 kHz, 20° C.]: | −3.1 |
| CC-4-V1 | 12.00% | $K_1$ [pN, 20° C.]: | 14.8 |
| CCP-3-1 | 11.00% | $K_3$ [pN, 20° C.]: | 15.7 |
| CCP-V2-1 | 5.00% | $V_0$ [pN, 20° C.]: | 2.39 |
| CCY-3-O2 | 4.50% | $γ_1$ [mPa s, 20° C.]: | 88 |
| CLY-3-O2 | 1.00% | LTS bulk [−20° C.]: | >1000 h |
| CY-3-O2 | 15.00% | | |
| PY-1-O2 | 8.00% | | |
| PY-1-O2 | 8.50% | | |

Example M26

| | | | |
|---|---|---|---|
| CCH-34 | 6.00% | Clearing point [° C.]: | 76 |
| CCH-35 | 6.00% | Δn [589 nm, 20° C.]: | 0.1029 |
| CCH-23 | 8.00% | $ε_{\parallel}$ [1 kHz, 20° C.]: | 3.5 |
| CC-3-V1 | 5.00% | $ε_{\perp}$ [1 kHz, 20° C.]: | 7.2 |
| CC-3-V2 | 11.00% | Δε [1 kHz, 20° C.]: | −3.7 |
| CC-4-V1 | 11.00% | $K_1$ [pN, 20° C.]: | 17.3 |
| CLY-2-O4 | 4.00% | $K_3$ [pN, 20° C.]: | 14.8 |
| CLY-3-O2 | 6.00% | $V_0$ [pN, 20° C.]: | 2.12 |
| CLY-3-O3 | 5.00% | $γ_1$ [mPa s, 20° C.]: | 94 |
| CLY-4-O2 | 4.00% | | |
| CLY-5-O2 | 4.00% | | |
| CPY-3-O2 | 1.00% | | |
| CY-3-O2 | 3.00% | | |
| PY-3-O2 | 8.00% | | |
| PY-1-O2 | 10.00% | | |
| B(S)-2O-O5 | 4.00% | | |
| B(S)-2O-O4 | 4.00% | | |

Example M27

| | | | |
|---|---|---|---|
| CC-3-V1 | 4.00% | Clearing point [° C.]: | 74.5 |
| CC-4-V1 | 18.00% | Δn [589 nm, 20° C.]: | 0.0976 |
| CC-3-V2 | 15.00% | $ε_{\parallel}$ [1 kHz, 20° C.]: | 3.7 |
| CCP-3-1 | 12.50% | $ε_{\perp}$ [1 kHz, 20° C.]: | 7.0 |
| CCY-3-O1 | 6.00% | Δε [1 kHz, 20° C.]: | −3.4 |
| CCY-3-O2 | 10.50% | $K_1$ [pN, 20° C.]: | 15.3 |
| CPY-3-O2 | 2.00% | $K_3$ [pN, 20° C.]: | 15.6 |
| CY-3-O2 | 9.50% | $V_0$ [pN, 20° C.]: | 2.27 |
| B(S)-2O-O5 | 4.00% | $γ_1$ [mPa s, 20° C.]: | 91 |
| B(S)-2O-O4 | 3.00% | LTS bulk [−20° C.]: | >1000 h |
| PP-1-3 | 2.50% | | |
| Y-4O-O4 | 5.00% | | |
| PY-1-O2 | 5.00% | | |
| PY-2-O2 | 3.00% | | |

Example M28

| | | | |
|---|---|---|---|
| BCH-32 | 3.00% | Clearing point [° C.]: | 76 |
| CC-3-V1 | 9.00% | Δn [589 nm, 20° C.]: | 0.1023 |
| CC-3-V2 | 11.00% | $ε_{\parallel}$ [1 kHz, 20° C.]: | 3.5 |
| CC-4-V1 | 12.00% | $ε_{\perp}$ [1 kHz, 20° C.]: | 6.7 |
| CCP-3-1 | 9.00% | Δε [1 kHz, 20° C.]: | −3.2 |
| CCY-3-O1 | 5.50% | $K_1$ [pN, 20° C.]: | 14.9 |
| CCY-3-O2 | 10.50% | $K_3$ [pN, 20° C.]: | 17.1 |
| CLY-3-O2 | 1.00% | $V_0$ [pN, 20° C.]: | 2.45 |
| CPY-3-O2 | 4.00% | $γ_1$ [mPa s, 20° C.]: | 105 |
| CY-3-O2 | 15.00% | LTS bulk [−20° C.]: | >1000 h |

-continued

| | |
|---|---|
| PCH-301 | 3.00% |
| PY-3-O2 | 17.00% |

Example M29

| | | | |
|---|---|---|---|
| BCH-32 | 3.00% | Clearing point [° C.]: | 76 |
| CC-3-V1 | 9.00% | Δn [589 nm, 20° C.]: | 0.1103 |
| CC-3-V2 | 11.00% | $ε_{\parallel}$ [1 kHz, 20° C.]: | 3.5 |
| CC-4-V1 | 12.00% | $ε_{\perp}$ [1 kHz, 20° C.]: | 6.8 |
| CCP-3-1 | 7.50% | Δε [1 kHz, 20° C.]: | −3.3 |
| CCY-3-O2 | 7.00% | $K_1$ [pN, 20° C.]: | 14.9 |
| CLY-3-O2 | 1.00% | $K_3$ [pN, 20° C.]: | 17.1 |
| CPY-2-O2 | 4.50% | $V_0$ [pN, 20° C.]: | 2.40 |
| CPY-3-O2 | 11.00% | $γ_1$ [mPa s, 20° C.]: | 110 |
| CY-3-O2 | 14.50% | LTS bulk [−20° C.]: | >1000 h |
| PCH-301 | 3.00% | | |
| PY-3-O2 | 16.50% | | |

Example M30

| | | | |
|---|---|---|---|
| BCH-32 | 3.00% | Clearing point [° C.]: | 75.9 |
| CC-3-V1 | 9.00% | Δn [589 nm, 20° C.]: | 0.1108 |
| CC-3-V2 | 11.00% | $ε_{\parallel}$ [1 kHz, 20° C.]: | 3.6 |
| CC-4-V1 | 12.00% | $ε_{\perp}$ [1 kHz, 20° C.]: | 7.1 |
| CCP-3-1 | 5.00% | Δε [1 kHz, 20° C.]: | −3.5 |
| CCY-3-O2 | 9.50% | $K_1$ [pN, 20° C.]: | 15.0 |
| CLY-3-O2 | 1.00% | $K_3$ [pN, 20° C.]: | 17.1 |
| CPY-2-O2 | 4.50% | $V_0$ [pN, 20° C.]: | 2.34 |
| CPY-3-O2 | 11.00% | $γ_1$ [mPa s, 20° C.]: | 113 |
| CY-3-O2 | 14.50% | LTS bulk [−20° C.]: | >1000 h |
| PCH-301 | 3.00% | | |
| PY-3-O2 | 16.50% | | |

Example M31

| | | | |
|---|---|---|---|
| CCH-34 | 5.00% | Clearing point [° C.]: | 76 |
| CCH-35 | 5.00% | Δn [589 nm, 20° C.]: | 0.1033 |
| CCH-23 | 10.00% | $ε_{\parallel}$ [1 kHz, 20° C.]: | 3.5 |
| CC-3-V1 | 5.00% | $ε_{\perp}$ [1 kHz, 20° C.]: | 7.2 |
| CC-3-V2 | 11.00% | Δε [1 kHz, 20° C.]: | −3.7 |
| CC-4-V1 | 11.00% | $K_1$ [pN, 20° C.]: | 17.1 |
| CLY-2-O4 | 4.00% | $K_3$ [pN, 20° C.]: | 14.7 |
| CLY-3-O2 | 6.00% | $V_0$ [pN, 20° C.]: | 2.11 |
| CLY-3-O3 | 5.00% | $γ_1$ [mPa s, 20° C.]: | 94 |
| CLY-4-O2 | 4.00% | | |
| CLY-5-O2 | 4.00% | | |
| CPY-3-O2 | 1.50% | | |
| CY-3-O2 | 2.50% | | |
| PY-3-O2 | 8.00% | | |
| PY-1-O2 | 10.00% | | |
| B(S)-2O-O5 | 4.00% | | |
| B(S)-2O-O4 | 4.00% | | |

Example M32

| | | | |
|---|---|---|---|
| CCH-34 | 5.00% | Clearing point [° C.]: | 76 |
| CCH-35 | 5.00% | Δn [589 nm, 20° C.]: | 0.1018 |
| CCH-23 | 10.00% | $ε_{\parallel}$ [1 kHz, 20° C.]: | 3.5 |
| CC-3-V1 | 5.00% | $ε_{\perp}$[1 kHz, 20° C.]: | 7.2 |
| CC-3-V2 | 11.00% | Δε [1 kHz, 20° C.]: | −3.7 |

-continued

| | | | |
|---|---|---|---|
| CC-4-V1 | 11.00% | $K_1$ [pN, 20° C.]: | 17.2 |
| CLY-2-O4 | 4.00% | $K_3$ [pN, 20° C.]: | 14.7 |
| CLY-3-O2 | 6.00% | $V_0$ [pN, 20° C.]: | 2.12 |
| CLY-3-O3 | 5.00% | $\gamma_1$ [mPa s, 20° C.]: | 94 |
| CLY-4-O2 | 4.00% | | |
| CLY-5-O2 | 4.00% | | |
| CPY-3-O2 | 1.50% | | |
| CY-3-O2 | 4.00% | | |
| PY-3-O2 | 8.00% | | |
| PY-1-O2 | 8.50% | | |
| B(S)-2O-O5 | 4.00% | | |
| B(S)-2O-O4 | 4.00% | | |

Example M33

| | | | |
|---|---|---|---|
| PCH-302 | 17.50% | Clearing point [° C.]: | 76 |
| CC-3-V1 | 9.00% | Δn [589 nm, 20° C.]: | 0.1022 |
| CC-3-V2 | 11.00% | $\varepsilon_\parallel$ [1 kHz, 20° C.]: | 3.5 |
| CC-4-V1 | 12.00% | $\varepsilon_\perp$ [1 kHz, 20° C.]: | 7.2 |
| CLY-2-O4 | 4.00% | Δε [1 kHz, 20° C.]: | −3.7 |
| CLY-3-O2 | 6.00% | $K_1$ [pN, 20° C.]: | 15.6 |
| CLY-3-O3 | 5.00% | $K_3$ [pN, 20° C.]: | 16.5 |
| CLY-4-O2 | 4.00% | $V_0$ [pN, 20° C.]: | 2.24 |
| CLY-5-O2 | 4.00% | $\gamma_1$ [mPa s, 20° C.]: | 108 |
| CY-3-O2 | 16.00% | LTS bulk [−20° C.]: | >1000 h |
| PGIY-2-O4 | 3.50% | | |
| B(S)-2O-O5 | 4.00% | | |
| B(S)-2O-O4 | 4.00% | | |

Example M34

| | | | |
|---|---|---|---|
| CCP-V-1 | 10.00% | Clearing point [° C.]: | 86 |
| CCY-3-O2 | 8.00% | Δn [589 nm, 20° C.]: | 0.1010 |
| CLY-2-O4 | 5.00% | $\varepsilon_\parallel$ [1 kHz, 20° C.]: | 3.5 |
| CLY-4-O2 | 5.00% | $\varepsilon_\perp$ [1 kHz, 20° C.]: | 7.2 |
| CPY-2-O2 | 11.00% | Δε [1 kHz, 20° C.]: | −3.7 |
| PGIY-2-O4 | 3.00% | $K_1$ [pN, 20° C.]: | 16.2 |
| B-2O-O5 | 4.00% | $K_3$ [pN, 20° C.]: | 15.4 |
| CC-3-V2 | 17.00% | $V_0$ [pN, 20° C.]: | 2.15 |
| CC-3-V1 | 8.00% | $\gamma_1$ [mPa s, 20° C.]: | 130 |
| CC-4-V1 | 8.00% | | |
| CY-3-O4 | 20.00% | | |
| CY-3-O4 | 1.00% | | |

Example M35

| | | | |
|---|---|---|---|
| CCY-3-O2 | 2.00% | Clearing point [° C.]: | 87 |
| CLY-2-O4 | 4.00% | Δn [589 nm, 20° C.]: | 0.1004 |
| CLY-3-O2 | 5.00% | $\varepsilon_\parallel$ [1 kHz, 20° C.]: | 3.6 |
| CLY-3-O3 | 5.00% | $\varepsilon_\perp$ [1 kHz, 20° C.]: | 8.2 |
| CLY-4-O2 | 4.00% | Δε [1 kHz, 20° C.]: | −4.5 |
| CLY-5-O2 | 5.00% | $K_1$ [pN, 20° C.]: | 17.1 |
| CPY-3-O2 | 8.00% | $K_3$ [pN, 20° C.]: | 16.4 |
| CC-3-V2 | 14.00% | $V_0$ [pN, 20° C.]: | 2.01 |
| CC-4-V1 | 23.00% | $\gamma_1$ [mPa s, 20° C.]: | 135 |
| CY-3-O2 | 15.50% | LTS bulk [−20° C.]: | >1000 h |
| CY-3-O4 | 7.50% | | |
| B(S)-2O-O5 | 4.00% | | |
| B(S)-2O-O5 | 3.00% | | |

Example M36

| | | | |
|---|---|---|---|
| CCY-3-O2 | 8.00% | Clearing point [° C.]: | 85 |
| CLY-2-O4 | 5.00% | Δn [589 nm, 20° C.]: | 0.1001 |
| CLY-4-O2 | 5.00% | $\varepsilon_\parallel$ [1 kHz, 20° C.]: | 3.5 |
| CLY-5-O2 | 5.00% | $\varepsilon_\perp$ [1 kHz, 20° C.]: | 7.3 |
| CPY-2-O2 | 11.00% | Δε [1 kHz, 20° C.]: | −3.8 |
| PGIY-2-O4 | 6.00% | $K_1$ [pN, 20° C.]: | 16.7 |
| B-2O-O5 | 4.00% | $K_3$ [pN, 20° C.]: | 15.0 |
| CC-3-V2 | 17.00% | $V_0$ [pN, 20° C.]: | 2.10 |
| CC-3-V1 | 8.00% | $\gamma_1$ [mPa s, 20° C.]: | 127 |
| CC-4-V1 | 6.00% | | |
| CY-3-O4 | 15.00% | | |
| CCH-23 | 10.00% | | |

Example M37

| | | | |
|---|---|---|---|
| CCY-3-O2 | 2.00% | Clearing point [° C.]: | 83.5 |
| CLY-2-O4 | 5.00% | Δn [589 nm, 20° C.]: | 0.1005 |
| CLY-4-O2 | 5.00% | $\varepsilon_\parallel$ [1 kHz, 20° C.]: | 3.5 |
| CLY-5-O2 | 4.50% | $\varepsilon_\perp$ [1 kHz, 20° C.]: | 7.2 |
| CLY-3-O3 | 5.00% | Δε [1 kHz, 20° C.]: | −3.8 |
| PGIY-2-O4 | 6.00% | $K_1$ [pN, 20° C.]: | 16.6 |
| CY-3-O4 | 19.00% | $K_3$ [pN, 20° C.]: | 15.0 |
| CC-3-V2 | 17.00% | $V_0$ [pN, 20° C.]: | 2.11 |
| CC-3-V1 | 8.00% | $\gamma_1$ [mPa s, 20° C.]: | 119 |
| CC-4-V1 | 0.50% | LTS bulk [−20° C.]: | >1000 h |
| CCP-V1 | 10.00% | | |
| CCH-23 | 10.00% | | |
| B(S)-2O-O5 | 4.00% | | |
| B(S)-2O-O4 | 4.00% | | |

Example M38

| | | | |
|---|---|---|---|
| CCY-3-O2 | 7.00% | Clearing point [° C.]: | 84 |
| CLY-4-O2 | 5.00% | Δn [589 nm, 20° C.]: | 0.1011 |
| CLY-5-O2 | 2.50% | $\varepsilon_\parallel$ [1 kHz, 20° C.]: | 3.5 |
| CLY-3-O3 | 2.50% | $\varepsilon_\perp$ [1 kHz, 20° C.]: | 7.1 |
| PGIY-2-O4 | 5.50% | Δε [1 kHz, 20° C.]: | −3.7 |
| CY-3-O4 | 16.00% | $K_1$ [pN, 20° C.]: | 17.2 |
| CC-3-V2 | 17.00% | $K_3$ [pN, 20° C.]: | 15.5 |
| CC-3-V1 | 8.00% | $V_0$ [pN, 20° C.]: | 2.17 |
| CC-4-V1 | 4.50% | $\gamma_1$ [mPa s, 20° C.]: | 112 |
| CCP-V1 | 10.00% | | |
| CCH-23 | 10.00% | | |
| B(S)-2O-O5 | 4.00% | | |
| B(S)-2O-O4 | 4.00% | | |
| B(S)-2O-O6 | 4.00% | | |

Example M39

| | | | |
|---|---|---|---|
| CCY-3-O2 | 5.50% | Clearing point [° C.]: | 84 |
| CLY-4-O2 | 5.00% | Δn [589 nm, 20° C.]: | 0.1018 |
| CLY-5-O2 | 2.50% | $\varepsilon_\parallel$ [1 kHz, 20° C.]: | 3.5 |
| CLY-3-O3 | 2.50% | $\varepsilon_\perp$ [1 kHz, 20° C.]: | 7.4 |
| PGIY-2-O4 | 2.00% | Δε [1 kHz, 20° C.]: | −3.9 |
| CY-3-O4 | 14.50% | $K_1$ [pN, 20° C.]: | 17.4 |
| CC-3-V2 | 17.00% | $K_3$ [pN, 20° C.]: | 15.7 |
| CC-3-V1 | 8.00% | $V_0$ [pN, 20° C.]: | 2.13 |
| CC-4-V1 | 2.00% | $\gamma_1$ [mPa s, 20° C.]: | 111 |
| CCP-V1 | 15.00% | | |
| CCH-23 | 10.00% | | |
| B(S)-2O-O5 | 4.00% | | |
| B(S)-2O-O4 | 4.00% | | |

-continued

| | | | |
|---|---|---|---|
| B(S)-2O-O6 | 4.00% | | |
| B-2O-O5 | 4.00% | | |

Example M40

| | | | |
|---|---|---|---|
| CCY-3-O2 | 6.00% | Clearing point [° C.]: | 84 |
| CLY-4-O2 | 5.00% | Δn [589 nm, 20° C.]: | 0.1014 |
| CLY-2-O4 | 3.50% | $\varepsilon_{\parallel}$ [1 kHz, 20° C.]: | 3.5 |
| CLY-5-O2 | 2.50% | $\varepsilon_{\perp}$ [1 kHz, 20° C.]: | 7.4 |
| CLY-3-O3 | 2.50% | Δε [1 kHz, 20° C.]: | −3.9 |
| PGIY-2-O4 | 5.00% | $K_1$ [pN, 20° C.]: | 17.2 |
| CY-3-O4 | 14.50% | $K_3$ [pN, 20° C.]: | 15.3 |
| CC-3-V2 | 17.00% | $V_0$ [pN, 20° C.]: | 2.11 |
| CC-3-V1 | 8.00% | $\gamma_1$ [mPa s, 20° C.]: | 114 |
| CC-4-V1 | 4.00% | | |
| CCP-V1 | 10.00% | | |
| CCH-23 | 10.00% | | |
| B(S)-2O-O5 | 4.00% | | |
| B(S)-2O-O4 | 4.00% | | |
| B-2O-O5 | 4.00% | | |

Example M41

| | | | |
|---|---|---|---|
| CCY-3-O2 | 7.00% | Clearing point [° C.]: | 84 |
| CLY-4-O2 | 5.00% | Δn [589 nm, 20° C.]: | 0.1020 |
| CLY-3-O3 | 3.00% | $\varepsilon_{\parallel}$ [1 kHz, 20° C.]: | 3.4 |
| PGIY-2-O4 | 5.00% | $\varepsilon_{\perp}$ [1 kHz, 20° C.]: | 7.1 |
| CY-3-O4 | 12.00% | Δε [1 kHz, 20° C.]: | −3.7 |
| CC-3-V2 | 17.00% | $K_1$ [pN, 20° C.]: | 18.2 |
| CC-3-V1 | 8.00% | $K_3$ [pN, 20° C.]: | 15.4 |
| CC-4-V1 | 9.00% | $V_0$ [pN, 20° C.]: | 2.16 |
| CCP-V1 | 8.00% | $\gamma_1$ [mPa s, 20° C.]: | 104 |
| CCH-23 | 10.00% | | |
| B(S)-2O-O5 | 4.00% | | |
| B(S)-2O-O4 | 4.00% | | |
| B(S)-2O-O6 | 4.00% | | |
| B(S)-4O-O5 | 4.00% | | |

Example M42

| | | | |
|---|---|---|---|
| CCY-3-O2 | 11.00% | Clearing point [° C.]: | 93.5 |
| CLY-4-O2 | 5.00% | Δn [589 nm, 20° C.]: | 0.1002 |
| CLY-3-O2 | 9.00% | $\varepsilon_{\parallel}$ [1 kHz, 20° C.]: | 3.5 |
| CLY-5-O2 | 9.00% | $\varepsilon_{\perp}$ [1 kHz, 20° C.]: | 7.9 |
| CLY-3-O3 | 1.00% | Δε [1 kHz, 20° C.]: | −4.4 |
| PGIY-2-O4 | 3.00% | $K_1$ [pN, 20° C.]: | 18.5 |
| CY-3-O4 | 15.00% | $K_3$ [pN, 20° C.]: | 18.4 |
| CC-3-V | 15.00% | $V_0$ [pN, 20° C.]: | 2.17 |
| CC-3-V1 | 7.00% | $\gamma_1$ [mPa s, 20° C.]: | 137 |
| CC-3-V2 | 12.00% | | |
| CC-4-V1 | 5.00% | | |
| B(S)-2O-O5 | 4.00% | | |
| B(S)-2O-O4 | 4.00% | | |

Example M43

| | | | |
|---|---|---|---|
| CCY-3-O2 | 6.00% | Clearing point [° C.]: | 87 |
| CLY-4-O2 | 5.00% | Δn [589 nm, 20° C.]: | 0.0996 |
| CLY-3-O3 | 4.00% | $\varepsilon_{\parallel}$ [1 kHz, 20° C.]: | 3.5 |
| CLY-3-O2 | 5.00% | $\varepsilon_{\perp}$ [1 kHz, 20° C.]: | 7.4 |

-continued

| | | | |
|---|---|---|---|
| CLY-5-O2 | 9.00% | Δε [1 kHz, 20° C.]: | −3.9 |
| PGIY-2-O4 | 6.00% | $K_1$ [pN, 20° C.]: | 16.9 |
| CY-3-O4 | 14.00% | $K_3$ [pN, 20° C.]: | 16.5 |
| CC-3-V | 22.50% | $V_0$ [pN, 20° C.]: | 2.17 |
| CC-3-V1 | 7.00% | $\gamma_1$ [mPa s, 20° C.]: | 113 |
| CC-3-V2 | 10.00% | | |
| CC-4-V1 | 3.50% | | |
| B(S)-2O-O5 | 4.00% | | |
| B(S)-2O-O4 | 4.00% | | |

Example M44

| | | | |
|---|---|---|---|
| CCY-3-O2 | 10.00% | Clearing point [° C.]: | 86 |
| CLY-4-O2 | 5.00% | Δn [589 nm, 20° C.]: | 0.1014 |
| CLY-3-O3 | 4.00% | $\varepsilon_{\parallel}$ [1 kHz, 20° C.]: | 3.5 |
| CLY-3-O2 | 5.00% | $\varepsilon_{\perp}$ [1 kHz, 20° C.]: | 7.4 |
| CLY-5-O2 | 0.50% | Δε [1 kHz, 20° C.]: | −3.9 |
| PGIY-2-O4 | 6.00% | $K_1$ [pN, 20° C.]: | 17.3 |
| CY-3-O4 | 11.00% | $K_3$ [pN, 20° C.]: | 16.2 |
| CC-3-V | 20.50% | $V_0$ [pN, 20° C.]: | 2.15 |
| CC-3-V1 | 7.00% | $\gamma_1$ [mPa s, 20° C.]: | 108 |
| CC-3-V2 | 10.00% | | |
| CC-4-V1 | 9.00% | | |
| B(S)-2O-O5 | 4.00% | | |
| B(S)-2O-O4 | 4.00% | | |
| B(S)-2O-O6 | 4.00% | | |

Example M45

| | | | |
|---|---|---|---|
| CC-3-V2 | 20.00% | Clearing point [° C.]: | 75 |
| CC-4-V1 | 7.50% | Δn [589 nm, 20° C.]: | 0.0997 |
| CCH-34 | 3.00% | $\varepsilon_{\parallel}$ [1 kHz, 20° C.]: | 3.6 |
| CCH-35 | 4.00% | $\varepsilon_{\perp}$[1 kHz, 20° C.]: | 7 |
| CCP-3-1 | 8.50% | Δε [1 kHz, 20° C.]: | −3.5 |
| CCY-3-O2 | 11.50% | $K_1$ [pN, 20° C.]: | 15.1 |
| CPY-3-O2 | 11.00% | $K_3$ [pN, 20° C.]: | 16.5 |
| CY-3-O2 | 15.50% | $V_0$ [pN, 20° C.]: | 2.29 |
| CY-5-O2 | 6.00% | $\gamma_1$ [mPa s, 20° C.]: | 108 |
| PY-3-O2 | 6.00% | | |
| PY-1-O2 | 7.00% | | |

Example M46

| | | | |
|---|---|---|---|
| CC-3-V2 | 20.00% | Clearing point [° C.]: | 74.5 |
| CC-4-V1 | 14.00% | Δn [589 nm, 20° C.]: | 0.0982 |
| CCH-24 | 5.00% | $\varepsilon_{\parallel}$ [1 kHz, 20° C.]: | 3.5 |
| CCP-3-1 | 6.50% | $\varepsilon_{\perp}$[1 kHz, 20° C.]: | 6.7 |
| CCY-3-O1 | 5.50% | Δε [1 kHz, 20° C.]: | −3.2 |
| CCY-3-O2 | 11.00% | $K_1$ [pN, 20° C.]: | 14.6 |
| CPY-3-O2 | 8.00% | $K_3$ [pN, 20° C.]: | 15.5 |
| CY-3-O2 | 13.00% | $V_0$ [pN, 20° C.]: | 2.31 |
| PY-3-O2 | 10.00% | $\gamma_1$ [mPa s, 20° C.]: | 98 |
| PY-1-O2 | 7.00% | | |

Example M47

| | | | |
|---|---|---|---|
| CC-3-V1 | 7.50% | Clearing point [° C.]: | 75 |
| CC-4-V1 | 17.00% | Δn [589 nm, 20° C.]: | 0.0984 |
| CC-3-V2 | 11.00% | $\varepsilon_{\parallel}$ [1 kHz, 20° C.]: | 3.6 |
| CCH-24 | 6.50% | $\varepsilon_{\perp}$ [1 kHz, 20° C.]: | 6.9 |

-continued

| | | | |
|---|---|---|---|
| CCY-3-O1 | 7.50% | Δε [1 kHz, 20° C.]: | −3.4 |
| CCY-3-O2 | 11.00% | $K_1$ [pN, 20° C.]: | 14.1 |
| CPY-3-O2 | 10.00% | $K_3$ [pN, 20° C.]: | 15.3 |
| CCP-3-1 | 2.00% | $V_0$ [pN, 20° C.]: | 2.25 |
| CY-3-O2 | 11.50% | $\gamma_1$ [mPa s, 20° C.]: | 98 |
| PY-1-O2 | 8.00% | | |
| PY-1-O2 | 8.00% | | |

Example M48

| | | | |
|---|---|---|---|
| CC-3-V1 | 7.00% | Clearing point [° C.]: | 74.2 |
| CC-4-V1 | 18.00% | Δn [589 nm, 20° C.]: | 0.1000 |
| CCH-34 | 3.00% | $\varepsilon_\parallel$ [1 kHz, 20° C.]: | 3.5 |
| CCH-35 | 7.00% | $\varepsilon_\perp$ [1 kHz, 20° C.]: | 6.9 |
| CCP-3-1 | 9.00% | Δε [1 kHz, 20° C.]: | −3.4 |
| CCY-3-O2 | 10.00% | $K_1$ [pN, 20° C.]: | 15.1 |
| CPY-3-O2 | 9.50% | $K_3$ [pN, 20° C.]: | 16.5 |
| CY-3-O2 | 15.50% | $V_0$ [pN, 20° C.]: | 2.34 |
| CY-3-O4 | 7.50% | $\gamma_1$ [mPa s, 20° C.]: | 110 |
| PY-3-O2 | 11.50% | LTS bulk [−20° C.]: | >1000 h |
| PGIY-2-O4 | 2.00% | | |

Example M49

| | | | |
|---|---|---|---|
| CC-3-V1 | 7.00% | Clearing point [° C.]: | 74.1 |
| CC-4-V1 | 18.00% | Δn [589 nm, 20° C.]: | 0.0975 |
| CCH-34 | 7.00% | $\varepsilon_\parallel$ [1 kHz, 20° C.]: | 3.6 |
| CCH-35 | 2.00% | $\varepsilon_\perp$ [1 kHz, 20° C.]: | 7.0 |
| CCP-3-1 | 9.00% | Δε [1 kHz, 20° C.]: | −3.4 |
| CCY-3-O1 | 10.00% | $K_1$ [pN, 20° C.]: | 14.2 |
| CPY-3-O2 | 9.50% | $K_3$ [pN, 20° C.]: | 15.3 |
| CY-3-O2 | 15.50% | $V_0$ [pN, 20° C.]: | 2.24 |
| CY-3-O4 | 11.00% | $\gamma_1$ [mPa s, 20° C.]: | 112 |
| PGIY-2-O4 | 4.50% | | |
| PY-3-O2 | 6.50% | | |

Example M50

| | | | |
|---|---|---|---|
| CC-3-V1 | 8.50% | Clearing point [° C.]: | 74 |
| CC-4-V1 | 18.00% | Δn [589 nm, 20° C.]: | 0.0988 |
| CCH-34 | 5.00% | $\varepsilon_\parallel$ [1 kHz, 20° C.]: | 3.5 |
| CCH-35 | 5.00% | $\varepsilon_\perp$ [1 kHz, 20° C.]: | 7.0 |
| CCP-3-1 | 6.50% | Δε [1 kHz, 20° C.]: | −3.4 |
| CCY-3-O2 | 10.00% | $K_1$ [pN, 20° C.]: | 14.8 |
| CPY-3-O2 | 10.00% | $K_3$ [pN, 20° C.]: | 16.1 |
| CY-3-O2 | 15.50% | $V_0$ [pN, 20° C.]: | 2.29 |
| CY-3-O4 | 9.00% | $\gamma_1$ [mPa s, 20° C.]: | 109 |
| PGIY-2-O4 | 4.00% | LTS bulk [−20° C.]: | >1000 h |
| PY-3-O2 | 8.50% | | |

Example M51

| | | | |
|---|---|---|---|
| CC-3-V1 | 8.50% | Clearing point [° C.]: | 74.4 |
| CC-4-V1 | 18.00% | Δn [589 nm, 20° C.]: | 0.0992 |
| CCH-34 | 5.00% | $\varepsilon_\parallel$ [1 kHz, 20° C.]: | 3.5 |
| CCH-35 | 5.00% | $\varepsilon_\perp$ [1 kHz, 20° C.]: | 7.0 |
| CCP-3-1 | 8.50% | Δε [1 kHz, 20° C.]: | −3.4 |
| CCY-3-O2 | 10.00% | $K_1$ [pN, 20° C.]: | 15.1 |
| CPY-3-O2 | 7.00% | $K_3$ [pN, 20° C.]: | 16.1 |
| CY-3-O2 | 15.50% | $V_0$ [pN, 20° C.]: | 2.29 |

-continued

| | | | |
|---|---|---|---|
| CY-3-O4 | 7.50% | $\gamma_1$ [mPa s, 20° C.]: | 109 |
| PGIY-2-O4 | 4.00% | LTS bulk [−20° C.]: | >1000 h |
| PY-3-O2 | 9.00% | | |
| B(S)-2O-O5 | 2.00% | | |

Example M52

| | | | |
|---|---|---|---|
| CC-3-V1 | 8.50% | Clearing point [° C.]: | 74.1 |
| CC-4-V1 | 18.00% | Δn [589 nm, 20° C.]: | 0.0990 |
| CCH-34 | 5.00% | $\varepsilon_\parallel$ [1 kHz, 20° C.]: | 3.5 |
| CCH-35 | 5.00% | $\varepsilon_\perp$ [1 kHz, 20° C.]: | 7.0 |
| CCP-3-1 | 10.50% | Δε [1 kHz, 20° C.]: | −3.4 |
| CCY-3-O2 | 10.00% | $K_1$ [pN, 20° C.]: | 15.1 |
| CPY-3-O2 | 2.50% | $K_3$ [pN, 20° C.]: | 15.7 |
| CY-3-O2 | 15.50% | $V_0$ [pN, 20° C.]: | 2.26 |
| CY-3-O4 | 7.50% | $\gamma_1$ [mPa s, 20° C.]: | 104 |
| PGIY-2-O4 | 5.50% | | |
| PY-3-O2 | 8.00% | | |
| B(S)-2O-O5 | 4.00% | | |

Example M53

| | | | |
|---|---|---|---|
| CC-3-V1 | 5.50% | Clearing point [° C.]: | 74 |
| CC-4-V1 | 22.00% | Δn [589 nm, 20° C.]: | 0.0985 |
| CCH-34 | 4.50% | $\varepsilon_\parallel$ [1 kHz, 20° C.]: | 3.6 |
| CCH-35 | 5.00% | $\varepsilon_\perp$ [1 kHz, 20° C.]: | 7.0 |
| CCP-3-1 | 6.50% | Δε [1 kHz, 20° C.]: | −3.4 |
| CCY-3-O1 | 10.00% | $K_1$ [pN, 20° C.]: | 14.8 |
| CCY-3-O2 | 10.00% | $K_3$ [pN, 20° C.]: | 15.7 |
| CY-3-O2 | 15.50% | $V_0$ [pN, 20° C.]: | 2.27 |
| PGIY-2-O4 | 4.00% | $\gamma_1$ [mPa s, 20° C.]: | 105 |
| PY-3-O2 | 17.00% | | |

Example M54

| | | | |
|---|---|---|---|
| B(S)-2O-O5 | 4.00% | Clearing point [° C.]: | 75 |
| B(S)-2O-O4 | 3.00% | Δn [589 nm, 20° C.]: | 0.1093 |
| BCH-32 | 7.50% | $\varepsilon_\parallel$ [1 kHz, 20° C.]: | 3.6 |
| CC-3-V1 | 9.00% | $\varepsilon_\perp$ [1 kHz, 20° C.]: | 6.8 |
| CC-4-V1 | 23.00% | Δε [1 kHz, 20° C.]: | −3.2 |
| CCP-3-1 | 10.00% | $K_1$ [pN, 20° C.]: | 15.4 |
| CCP-V2-1 | 5.00% | $K_3$ [pN, 20° C.]: | 16.1 |
| CCY-3-O2 | 5.00% | $V_0$ [pN, 20° C.]: | 2.39 |
| CLY-3-O2 | 1.00% | $\gamma_1$ [mPa s, 20° C.]: | 96 |
| CY-3-O2 | 15.50% | LTS bulk [−20° C.]: | >1000 h |
| PY-3-O2 | 14.00% | | |
| PY-1-O4 | 3.00% | | |

Example M55

| | | | |
|---|---|---|---|
| B(S)-2O-O5 | 4.00% | Clearing point [° C.]: | 74 |
| B(S)-2O-O4 | 3.00% | Δn [589 nm, 20° C.]: | 0.1092 |
| BCH-32 | 8.00% | $\varepsilon_\parallel$ [1 kHz, 20° C.]: | 3.6 |
| CC-3-V1 | 9.00% | $\varepsilon_\perp$ [1 kHz, 20° C.]: | 6.6 |
| CC-4-V1 | 23.00% | Δε [1 kHz, 20° C.]: | −3.0 |
| CCP-3-1 | 11.50% | $K_1$ [pN, 20° C.]: | 14.6 |
| CCP-V2-1 | 5.00% | $K_3$ [pN, 20° C.]: | 15.7 |
| CCY-3-O2 | 3.50% | $V_0$ [pN, 20° C.]: | 2.41 |
| CLY-3-O2 | 1.00% | $\gamma_1$ [mPa s, 20° C.]: | 89 |
| CY-3-O2 | 15.50% | LTS bulk [−20° C.]: | >1000 h |

-continued

| | | | |
|---|---|---|---|
| PY-1-O2 | 8.00% | | |
| PY-2-O2 | 8.50% | | |

Example M56

| | | | |
|---|---|---|---|
| B-2O-O5 | 4.00% | Clearing point [° C.]: | 75 |
| BCH-32 | 8.00% | Δn [589 nm, 20° C.]: | 0.1088 |
| CC-3-V1 | 9.00% | $\varepsilon_{\parallel}$ [1 kHz, 20° C.]: | 3.6 |
| CC-4-V1 | 20.00% | $\varepsilon_{\perp}$ [1 kHz, 20° C.]: | 6.8 |
| CCP-3-1 | 7.00% | Δε [1 kHz, 20° C.]: | −3.2 |
| CCP-V2-1 | 5.00% | $K_1$ [pN, 20° C.]: | 14.9 |
| CCY-3-O2 | 10.00% | $K_3$ [pN, 20° C.]: | 16.6 |
| CLY-3-O2 | 1.00% | $V_0$ [pN, 20° C.]: | 2.40 |
| CPY-3-O2 | 2.00% | $\gamma_1$ [mPa s, 20° C.]: | 105 |
| CY-3-O2 | 15.50% | LTS bulk [−20° C.]: | >1000 h |
| PCH-301 | 6.00% | | |
| PY-3-O2 | 16.00% | | |

Example M57

| | | | |
|---|---|---|---|
| PCH-302 | 17.50% | Clearing point [° C.]: | 76 |
| CC-3-V1 | 9.00% | Δn [589 nm, 20° C.]: | 0.1020 |
| CC-4-V1 | 23.00% | $\varepsilon_{\parallel}$ [1 kHz, 20° C.]: | 3.5 |
| CLY-2-O4 | 4.00% | $\varepsilon_{\perp}$ [1 kHz, 20° C.]: | 7.2 |
| CLY-3-O2 | 6.00% | Δε [1 kHz, 20° C.]: | −3.7 |
| CLY-3-O3 | 5.00% | $K_1$ [pN, 20° C.]: | 15.7 |
| CLY-4-O2 | 4.00% | $K_3$ [pN, 20° C.]: | 16.9 |
| CLY-5-O2 | 4.00% | $V_0$ [pN, 20° C.]: | 2.26 |
| CPY-3-O2 | 2.00% | $\gamma_1$ [mPa s, 20° C.]: | 110 |
| CY-3-O2 | 14.00% | LTS bulk [−20° C.]: | >1000 h |
| PY-3-O2 | 3.50% | | |
| B(S)-2O-O5 | 4.00% | | |
| B(S)-2O-O4 | 4.00% | | |

Example M58

| | | | |
|---|---|---|---|
| PCH-302 | 8.00% | Clearing point [° C.]: | 75.5 |
| CCH-23 | 8.00% | Δn [589 nm, 20° C.]: | 0.1017 |
| CC-3-V1 | 9.00% | $\varepsilon_{\parallel}$ [1 kHz, 20° C.]: | 3.5 |
| CC-4-V1 | 23.00% | $\varepsilon_{\perp}$ [1 kHz, 20° C.]: | 7.2 |
| CLY-2-O4 | 4.00% | Δε [1 kHz, 20° C.]: | −3.7 |
| CLY-3-O2 | 6.00% | $K_1$ [pN, 20° C.]: | 15.8 |
| CLY-3-O3 | 5.00% | $K_3$ [pN, 20° C.]: | 15.7 |
| CLY-4-O2 | 4.00% | $V_0$ [pN, 20° C.]: | 2.19 |
| CLY-5-O2 | 4.00% | $\gamma_1$ [mPa s, 20° C.]: | 99 |
| CPY-3-O2 | 2.00% | LTS bulk [−20° C.]: | >1000 h |
| CY-3-O2 | 9.00% | | |
| PY-3-O2 | 10.00% | | |
| B(S)-2O-O5 | 4.00% | | |
| B(S)-2O-O4 | 4.00% | | |

Example M59

| | | | |
|---|---|---|---|
| CC-3-V1 | 7.00% | Clearing point [° C.]: | 74.5 |
| CC-4-V1 | 18.00% | Δn [589 nm, 20° C.]: | 0.0997 |
| CCH-34 | 3.00% | $\varepsilon_{\parallel}$ [1 kHz, 20° C.]: | 3.6 |
| CCH-35 | 6.00% | $\varepsilon_{\perp}$ [1 kHz, 20° C.]: | 7.0 |
| CCP-3-1 | 11.00% | Δε [1 kHz, 20° C.]: | −3.4 |
| CCY-3-O2 | 6.00% | $K_1$ [pN, 20° C.]: | 14.4 |
| CPY-3-O2 | 11.00% | $K_3$ [pN, 20° C.]: | 15.4 |

-continued

| | | | |
|---|---|---|---|
| CPY-2-O2 | 4.00% | $V_0$ [pN, 20° C.]: | 2.25 |
| CY-3-O2 | 15.50% | $\gamma_1$ [mPa s, 20° C.]: | 108 |
| CY-3-O4 | 5.00% | LTS bulk [−20° C.]: | >1000 h |
| PY-3-O2 | 3.50% | | |
| Y-4O-O4 | 5.00% | | |
| PGIY-2-O4 | 5.00% | | |

Example M60

| | | | |
|---|---|---|---|
| B(S)-2O-O5 | 5.00% | Clearing point [° C.]: | 74 |
| B(S)-2O-O4 | 4.00% | Δn [589 nm, 20° C.]: | 0.1092 |
| BCH-32 | 8.00% | $\varepsilon_{\parallel}$ [1 kHz, 20° C.]: | 3.6 |
| CC-3-V1 | 9.00% | $\varepsilon_{\perp}$ [1 kHz, 20° C.]: | 6.6 |
| CC-4-V1 | 22.00% | Δε [1 kHz, 20° C.]: | −3.0 |
| CCP-3-1 | 13.50% | $K_1$ [pN, 20° C.]: | 15.2 |
| CCP-V2-1 | 5.00% | $K_3$ [pN, 20° C.]: | 15.7 |
| CLY-3-O2 | 1.00% | $V_0$ [pN, 20° C.]: | 2.40 |
| CY-3-O2 | 15.50% | $\gamma_1$ [mPa s, 20° C.]: | 93 |
| CY-3-O4 | 3.00% | | |
| PY-3-O2 | 14.00% | | |

Example M61

| | | | |
|---|---|---|---|
| B(S)-2-3 | 10.00% | Clearing point [° C.]: | 74 |
| BCH-32 | 5.50% | Δn [589 nm, 20° C.]: | 0.1085 |
| CC-3-V1 | 9.00% | $\varepsilon_{\parallel}$ [1 kHz, 20° C.]: | 3.6 |
| CC-4-V1 | 22.00% | $\varepsilon_{\perp}$ [1 kHz, 20° C.]: | 6.5 |
| CCP-3-1 | 6.00% | Δε [1 kHz, 20° C.]: | −3.0 |
| CCP-V2-1 | 5.00% | $K_1$ [pN, 20° C.]: | 14.6 |
| CCY-3-O2 | 10.50% | $K_3$ [pN, 20° C.]: | 15.8 |
| CLY-3-O2 | 1.00% | $V_0$ [pN, 20° C.]: | 2.44 |
| CPY-3-O2 | 5.00% | $\gamma_1$ [mPa s, 20° C.]: | 105 |
| CY-3-O2 | 15.00% | LTS bulk [−20° C.]: | >1000 h |
| PY-3-O2 | 11.00% | | |

Example M62

| | | | |
|---|---|---|---|
| B(S)-1-4 | 10.00% | Clearing point [° C.]: | 74.5 |
| BCH-32 | 5.50% | Δn [589 nm, 20° C.]: | 0.1092 |
| CC-3-V1 | 9.00% | $\varepsilon_{\parallel}$ [1 kHz, 20° C.]: | 3.6 |
| CC-4-V1 | 22.00% | $\varepsilon_{\perp}$[1 kHz, 20° C.]: | 6.6 |
| CCP-3-1 | 5.50% | Δε [1 kHz, 20° C.]: | −3.0 |
| CCP-V2-1 | 5.00% | $K_1$ [pN, 20° C.]: | 14.8 |
| CCY-3-O2 | 10.50% | $K_3$ [pN, 20° C.]: | 15.9 |
| CLY-3-O2 | 1.00% | $V_0$ [pN, 20° C.]: | 2.42 |
| CPY-3-O2 | 5.00% | $\gamma_1$ [mPa s, 20° C.]: | 107 |
| CY-3-O2 | 15.00% | LTS bulk [−20° C.]: | >1000 h |
| PY-3-O2 | 11.50% | | |

Example M63

| | | | |
|---|---|---|---|
| B(S)-1-6 | 10.00% | Clearing point [° C.]: | 75.5 |
| BCH-32 | 5.50% | Δn [589 nm, 20° C.]: | 0.1087 |
| CC-3-V1 | 9.00% | $\varepsilon_{\parallel}$ [1 kHz, 20° C.]: | 3.5 |
| CC-4-V1 | 22.00% | $\varepsilon_{\perp}$ [1 kHz, 20° C.]: | 6.5 |
| CCP-3-1 | 5.50% | Δε [1 kHz, 20° C.]: | −3.0 |
| CCP-V2-1 | 5.00% | $K_1$ [pN, 20° C.]: | 15.2 |
| CCY-3-O2 | 10.50% | $K_3$ [pN, 20° C.]: | 16.0 |
| CLY-3-O2 | 1.00% | $V_0$ [pN, 20° C.]: | 2.44 |
| CPY-3-O2 | 5.00% | $\gamma_1$ [mPa s, 20° C.]: | 110 |

-continued

| | | | |
|---|---|---|---|
| CY-3-O2 | 15.00% | LTS bulk [−20° C.]: | >1000 h |
| PY-3-O2 | 11.50% | | |

Example M64

| | | | |
|---|---|---|---|
| CC-3-V1 | 6.00% | Clearing point [° C.]: | 75 |
| CC-4-V1 | 24.00% | Δn [589 nm, 20° C.]: | 0.0981 |
| CCH-34 | 4.00% | $\varepsilon_{\parallel}$ [1 kHz, 20° C.]: | 3.6 |
| CCP-3-1 | 12.00% | $\varepsilon_{\perp}$ [1 kHz, 20° C.]: | 7.0 |
| CCY-3-O2 | 11.00% | Δε [1 kHz, 20° C.]: | −3.3 |
| CPY-3-O2 | 7.50% | $K_1$ [pN, 20° C.]: | 14.5 |
| CY-3-O2 | 15.50% | $K_3$ [pN, 20° C.]: | 15.8 |
| CY-3-O4 | 4.00% | $V_0$ [pN, 20° C.]: | 2.30 |
| PY-3-O2 | 6.00% | $\gamma_1$ [mPa s, 20° C.]: | 105 |
| Y-4O-O4 | 4.50% | | |
| PGIY-2-O4 | 5.50% | | |

Example M65

| | | | |
|---|---|---|---|
| PCH-302 | 11.50% | Clearing point [° C.]: | 75.5 |
| CCH-23 | 5.00% | Δn [589 nm, 20° C.]: | 0.1022 |
| CC-3-V1 | 9.00% | $\varepsilon_{\parallel}$ [1 kHz, 20° C.]: | 3.5 |
| CC-4-V1 | 23.00% | $\varepsilon_{\perp}$ [1 kHz, 20° C.]: | 7.2 |
| CLY-2-O4 | 4.00% | Δε [1 kHz, 20° C.]: | −3.7 |
| CLY-3-O2 | 6.00% | $K_1$ [pN, 20° C.]: | 15.8 |
| CLY-3-O3 | 5.00% | $K_3$ [pN, 20° C.]: | 16.1 |
| CLY-4-O2 | 4.00% | $V_0$ [pN, 20° C.]: | 2.21 |
| CLY-5-O2 | 4.00% | $\gamma_1$ [mPa s, 20° C.]: | 103 |
| CPY-3-O2 | 2.00% | LTS bulk [−20° C.]: | >1000 h |
| CY-3-O2 | 11.00% | | |
| PY-3-O2 | 7.50% | | |
| B(S)-2O-O5 | 4.00% | | |
| B(S)-2O-O4 | 4.00% | | |

Example M66

| | | | |
|---|---|---|---|
| CCY-3-O2 | 5.50% | Clearing point [° C.]: | 89.5 |
| CLY-2-O4 | 4.00% | Δn [589 nm, 20° C.]: | 0.1005 |
| CLY-3-O2 | 5.00% | $\varepsilon_{\parallel}$ [1 kHz, 20° C.]: | 3.6 |
| CLY-3-O3 | 5.00% | $\varepsilon_{\perp}$ [1 kHz, 20° C.]: | 8.1 |
| CLY-4-O2 | 4.00% | Δε [1 kHz, 20° C.]: | −4.5 |
| CLY-5-O2 | 5.00% | $K_1$ [pN, 20° C.]: | 16.7 |
| CPY-3-O2 | 8.50% | $K_3$ [pN, 20° C.]: | 17.0 |
| CC-3-V | 14.00% | $V_0$ [pN, 20° C.]: | 2.05 |
| CC-4-V1 | 23.00% | $\gamma_1$ [mPa s, 20° C.]: | 133 |
| CY-3-O2 | 15.00% | LTS bulk [−20° C.]: | >1000 h |
| CY-3-O4 | 4.00% | | |
| B(S)-2O-O5 | 4.00% | | |
| B(S)-2O-O4 | 3.00% | | |

Example M67

| | | | |
|---|---|---|---|
| CCY-3-O2 | 4.00% | Clearing point [° C.]: | 89.5 |
| CLY-2-O4 | 4.00% | Δn [589 nm, 20° C.]: | 0.0999 |
| CLY-3-O2 | 5.00% | $\varepsilon_{\parallel}$ [1 kHz, 20° C.]: | 3.5 |
| CLY-3-O3 | 5.00% | $\varepsilon_{\perp}$ [1 kHz, 20° C.]: | 8.0 |
| CLY-4-O2 | 4.00% | Δε [1 kHz, 20° C.]: | −4.5 |
| CLY-5-O2 | 5.00% | $K_1$ [pN, 20° C.]: | 17.3 |
| CPY-3-O2 | 11.00% | $K_3$ [pN, 20° C.]: | 16.6 |
| CCH-23 | 14.50% | $V_0$ [pN, 20° C.]: | 2.04 |

-continued

| | | | |
|---|---|---|---|
| CC-4-V1 | 23.00% | $\gamma_1$ [mPa s, 20° C.]: | 139 |
| CY-3-O2 | 14.50% | LTS bulk [−20° C.]: | >1000 h |
| CY-3-O4 | 3.00% | | |
| B(S)-2O-O5 | 4.00% | | |
| B(S)-2O-O4 | 3.00% | | |

Example M68

| | | | |
|---|---|---|---|
| CC-3-V1 | 7.00% | Clearing point [° C.]: | 75 |
| CC-4-V1 | 20.00% | Δn [589 nm, 20° C.]: | 0.0992 |
| CCH-34 | 3.50% | $\varepsilon_{\parallel}$ [1 kHz, 20° C.]: | 3.5 |
| CCH-35 | 7.00% | $\varepsilon_{\perp}$ [1 kHz, 20° C.]: | 7.1 |
| CCP-3-1 | 2.00% | Δε [1 kHz, 20° C.]: | −3.6 |
| CCY-3-O2 | 13.00% | $K_1$ [pN, 20° C.]: | 14.9 |
| CPY-3-O2 | 11.50% | $K_3$ [pN, 20° C.]: | 16.4 |
| CY-3-O2 | 16.00% | $V_0$ [pN, 20° C.]: | 2.27 |
| CY-3-O4 | 4.00% | $\gamma_1$ [mPa s, 20° C.]: | 114 |
| CY-5-O2 | 4.00% | | |
| PY-3-O2 | 8.50% | | |
| PYP-2-3 | 3.50% | | |

Example M69

| | | | |
|---|---|---|---|
| CC-3-V1 | 7.00% | Clearing point [° C.]: | 75 |
| CC-4-V1 | 20.00% | Δn [589 nm, 20° C.]: | 0.0997 |
| CCH-34 | 4.00% | $\varepsilon_{\parallel}$ [1 kHz, 20° C.]: | 3.5 |
| CCH-35 | 7.50% | $\varepsilon_{\perp}$ [1 kHz, 20° C.]: | 7.1 |
| CCP-3-1 | 3.00% | Δε [1 kHz, 20° C.]: | −3.6 |
| CCY-3-O2 | 12.50% | $K_1$ [pN, 20° C.]: | 15.1 |
| CPY-3-O2 | 10.00% | $K_3$ [pN, 20° C.]: | 16.3 |
| CY-3-O2 | 15.00% | $V_0$ [pN, 20° C.]: | 2.26 |
| CY-3-O4 | 3.00% | $\gamma_1$ [mPa s, 20° C.]: | 113 |
| CY-5-O2 | 3.50% | | |
| PY-3-O2 | 10.00% | | |
| PGIY-2-O4 | 4.00% | | |

Example M70

| | | | |
|---|---|---|---|
| CC-3-V1 | 7.00% | Clearing point [° C.]: | 75 |
| CC-4-V1 | 20.00% | Δn [589 nm, 20° C.]: | 0.1001 |
| CCH-34 | 4.00% | $\varepsilon_{\parallel}$ [1 kHz, 20° C.]: | 3.5 |
| CCH-35 | 8.00% | $\varepsilon_{\perp}$ [1 kHz, 20° C.]: | 7.0 |
| CCY-3-O1 | 5.00% | Δε [1 kHz, 20° C.]: | −3.5 |
| CCY-3-O2 | 12.50% | $K_1$ [pN, 20° C.]: | 15.1 |
| CPY-3-O2 | 8.00% | $K_3$ [pN, 20° C.]: | 16.1 |
| CY-3-O2 | 15.50% | $V_0$ [pN, 20° C.]: | 2.26 |
| CY-5-O2 | 4.50% | $\gamma_1$ [mPa s, 20° C.]: | 113 |
| PY-3-O2 | 11.00% | | |
| PYP-2-3 | 4.50% | | |

Example M71

| | | | |
|---|---|---|---|
| CC-3-V1 | 7.00% | Clearing point [° C.]: | 75 |
| CC-4-V1 | 20.00% | Δn [589 nm, 20° C.]: | 0.0991 |
| CCH-34 | 4.00% | $\varepsilon_{\parallel}$ [1 kHz, 20° C.]: | 3.6 |
| CCH-35 | 4.00% | $\varepsilon_{\perp}$ [1 kHz, 20° C.]: | 6.9 |
| CCP-3-1 | 12.50% | Δε [1 kHz, 20° C.]: | −3.3 |
| CCY-3-O2 | 6.00% | $K_1$ [pN, 20° C.]: | 14.9 |
| CY-3-O2 | 12.50% | $K_3$ [pN, 20° C.]: | 15.2 |
| B(S)-2O-O5 | 4.00% | $V_0$ [pN, 20° C.]: | 2.26 |

-continued

| | | | |
|---|---|---|---|
| B(S)-2O-O4 | 3.00% | $\gamma_1$ [mPa s, 20° C.]: | 91 |
| PP-1-3 | 4.00% | LTS bulk [−20° C.]: | >1000 h |
| Y-4O-O4 | 5.00% | | |
| PY-V2-O2 | 4.00% | | |
| CCY-V-O2 | 6.00% | | |
| CPY-V-O2 | 3.00% | | |
| CPY-V-O4 | 4.00% | | |

Example M72

| | | | |
|---|---|---|---|
| CC-3-V1 | 7.50% | Clearing point [° C.]: | 75 |
| CC-4-V1 | 20.00% | $\Delta n$ [589 nm, 20° C.]: | 0.0989 |
| CCH-34 | 4.00% | $\varepsilon_{\parallel}$ [1 kHz, 20° C.]: | 3.5 |
| CCH-35 | 7.50% | $\varepsilon_{\perp}$ [1 kHz, 20° C.]: | 7.1 |
| CCP-3-1 | 2.50% | $\Delta\varepsilon$ [1 kHz, 20° C.]: | −3.6 |
| CCY-3-O2 | 12.50% | $K_1$ [pN, 20° C.]: | 15.2 |
| CPY-3-O2 | 12.50% | $K_3$ [pN, 20° C.]: | 16.8 |
| CY-3-O2 | 15.50% | $V_0$ [pN, 20° C.]: | 2.29 |
| CY-3-O4 | 2.50% | $\gamma_1$ [mPa s, 20° C.]: | 112 |
| CY-5-O2 | 2.50% | | |
| PY-3-O2 | 12.00% | | |
| PGIY-2-O4 | 1.00% | | |

Example M73

| | | | |
|---|---|---|---|
| CC-3-V1 | 7.50% | Clearing point [° C.]: | 75 |
| CC-4-V1 | 20.00% | $\Delta n$ [589 nm, 20° C.]: | 0.0997 |
| CCH-34 | 3.00% | $\varepsilon_{\parallel}$ [1 kHz, 20° C.]: | 3.5 |
| CCH-35 | 7.00% | $\varepsilon_{\perp}$ [1 kHz, 20° C.]: | 7.1 |
| CCP-3-1 | 3.50% | $\Delta\varepsilon$ [1 kHz, 20° C.]: | −3.6 |
| CCY-3-O2 | 13.00% | $K_1$ [pN, 20° C.]: | 15.2 |
| CPY-3-O2 | 12.00% | $K_3$ [pN, 20° C.]: | 16.9 |
| CY-3-O2 | 15.50% | $V_0$ [pN, 20° C.]: | 2.30 |
| CY-3-O4 | 5.00% | $\gamma_1$ [mPa s, 20° C.]: | 114 |
| CY-5-O2 | 2.50% | | |
| PY-3-O2 | 12.50% | | |
| PYP-2-3 | 1.00% | | |

Example M74

| | | | |
|---|---|---|---|
| CC-3-V1 | 7.50% | Clearing point [° C.]: | 75.5 |
| CC-4-V1 | 20.00% | $\Delta n$ [589 nm, 20° C.]: | 0.0990 |
| CCH-34 | 4.50% | $\varepsilon_{\parallel}$ [1 kHz, 20° C.]: | 3.5 |
| CCH-35 | 9.00% | $\varepsilon_{\perp}$ [1 kHz, 20° C.]: | 7.0 |
| CCY-3-O1 | 2.00% | $\Delta\varepsilon$ [1 kHz, 20° C.]: | −3.6 |
| CCY-3-O2 | 12.50% | $K_1$ [pN, 20° C.]: | 15.5 |
| CPY-3-O2 | 12.50% | $K_3$ [pN, 20° C.]: | 16.7 |
| CY-3-O2 | 15.50% | $V_0$ [pN, 20° C.]: | 2.30 |
| CY-5-O2 | 2.50% | $\gamma_1$ [mPa s, 20° C.]: | 112 |
| PY-3-O2 | 13.00% | | |
| PYP-2-3 | 1.00% | | |

Example M75

| | | | |
|---|---|---|---|
| CCY-3-O2 | 11.00% | Clearing point [° C.]: | 88 |
| CLY-4-O2 | 5.00% | $\Delta n$ [589 nm, 20° C.]: | 0.1015 |
| CLY-3-O3 | 4.00% | $\varepsilon_{\parallel}$ [1 kHz, 20° C.]: | 3.5 |
| CLY-3-O2 | 5.00% | $\varepsilon_{\perp}$ [1 kHz, 20° C.]: | 7.4 |
| CLY-5-O2 | 2.00% | $\Delta\varepsilon$ [1 kHz, 20° C.]: | −3.9 |
| PGIY-2-O4 | 6.00% | $K_1$ [pN, 20° C.]: | 17.1 |

-continued

| | | | |
|---|---|---|---|
| CY-3-O4 | 8.50% | $K_3$ [pN, 20° C.]: | 16.8 |
| CC-3-V | 28.50% | $V_0$ [pN, 20° C.]: | 2.19 |
| CC-3-V1 | 7.00% | $\gamma_1$ [mPa s, 20° C.]: | 107 |
| CC-4-V1 | 11.00% | | |
| B(S)-2O-O5 | 4.00% | | |
| B(S)-2O-O4 | 4.00% | | |
| B(S)-2O-O6 | 4.00% | | |

Example M76

| | | | |
|---|---|---|---|
| CC-3-V1 | 5.50% | Clearing point [° C.]: | 74.3 |
| CC-4-V1 | 22.00% | $\Delta n$ [589 nm, 20° C.]: | 0.0986 |
| CCH-34 | 6.00% | $\varepsilon_{\parallel}$ [1 kHz, 20° C.]: | 3.6 |
| CCH-35 | 3.50% | $\varepsilon_{\perp}$ [1 kHz, 20° C.]: | 7.0 |
| CCP-3-1 | 6.50% | $\Delta\varepsilon$ [1 kHz, 20° C.]: | −3.4 |
| CCY-3-O1 | 9.00% | $K_1$ [pN, 20° C.]: | 14.9 |
| CCY-3-O2 | 10.00% | $K_3$ [pN, 20° C.]: | 15.8 |
| CPY-3-O2 | 2.00% | $V_0$ [pN, 20° C.]: | 2.27 |
| CY-3-O2 | 15.50% | $\gamma_1$ [mPa s, 20° C.]: | 107 |
| PGIY-2-O4 | 3.00% | | |
| PY-1-O4 | 2.00% | | |
| PY-3-O2 | 15.00% | | |

Example M77

| | | | |
|---|---|---|---|
| CC-3-V1 | 5.50% | Clearing point [° C.]: | 74.1 |
| CC-4-V1 | 22.00% | $\Delta n$ [589 nm, 20° C.]: | 0.0984 |
| CCH-34 | 5.00% | $\varepsilon_{\parallel}$ [1 kHz, 20° C.]: | 3.5 |
| CCH-35 | 5.00% | $\varepsilon_{\perp}$ [1 kHz, 20° C.]: | 6.9 |
| CCP-3-1 | 6.50% | $\Delta\varepsilon$ [1 kHz, 20° C.]: | −3.4 |
| CCY-3-O1 | 5.00% | $K_1$ [pN, 20° C.]: | 14.8 |
| CCY-3-O2 | 10.00% | $K_3$ [pN, 20° C.]: | 15.7 |
| CPY-2-O2 | 3.50% | $V_0$ [pN, 20° C.]: | 2.29 |
| CPY-3-O2 | 3.00% | $\gamma_1$ [mPa s, 20° C.]: | 105 |
| CY-3-O2 | 15.50% | LTS bulk [−20° C.]: | >1000 h |
| CY-5-O2 | 2.00% | | |
| PGIY-2-O4 | 2.00% | | |
| PY-3-O2 | 15.00% | | |

Example M78

| | | | |
|---|---|---|---|
| CC-3-V1 | 5.00% | Clearing point [° C.]: | 73.2 |
| CC-4-V1 | 22.00% | $\Delta n$ [589 nm, 20° C.]: | 0.1003 |
| CCH-34 | 5.00% | $\varepsilon_{\parallel}$ [1 kHz, 20° C.]: | 3.5 |
| CCH-35 | 4.50% | $\varepsilon_{\perp}$[1 kHz, 20° C.]: | 7.1 |
| CCP-3-1 | 6.50% | $\Delta\varepsilon$ [1 kHz, 20° C.]: | −3.5 |
| CCY-3-O1 | 5.00% | $K_1$ [pN, 20° C.]: | 14.6 |
| CCY-3-O2 | 10.00% | $K_3$ [pN, 20° C.]: | 16.0 |
| CPY-2-O2 | 2.50% | $V_0$ [pN, 20° C.]: | 2.26 |
| CPY-3-O2 | 2.50% | $\gamma_1$ [mPa s, 20° C.]: | 107 |
| CY-3-O2 | 15.50% | | |
| CY-5-O2 | 3.50% | | |
| PGIY-2-O4 | 4.00% | | |
| PY-1-O2 | 13.50% | | |

Example M79

| | | | |
|---|---|---|---|
| CC-3-V1 | 5.50% | Clearing point [° C.]: | 74.7 |
| CC-4-V1 | 22.00% | $\Delta n$ [589 nm, 20° C.]: | 0.0990 |
| CCH-34 | 4.00% | $\varepsilon_{\parallel}$ [1 kHz, 20° C.]: | 3.6 |

-continued

| | | | |
|---|---|---|---|
| CCH-35 | 5.50% | $\varepsilon_\perp$ [1 kHz, 20° C.]: | 7.1 |
| CCP-3-1 | 7.00% | Δε [1 kHz, 20° C.]: | −3.5 |
| CCY-3-O1 | 7.50% | $K_1$ [pN, 20° C.]: | 14.9 |
| CCY-3-O2 | 10.00% | $K_3$ [pN, 20° C.]: | 16.3 |
| CPY-3-O2 | 2.00% | $V_0$ [pN, 20° C.]: | 2.29 |
| CY-3-O2 | 15.50% | $\gamma_1$ [mPa s, 20° C.]: | 108 |
| CY-5-O2 | 3.00% | | |
| PGIY-2-O4 | 4.00% | | |
| PY-1-O2 | 14.00% | | |

Example M80

| | | | |
|---|---|---|---|
| CC-3-V1 | 5.50% | Clearing point [° C.]: | 74.3 |
| CC-4-V1 | 22.00% | Δn [589 nm, 20° C.]: | 0.0992 |
| CCH-34 | 4.00% | $\varepsilon_\parallel$ [1 kHz, 20° C.]: | 3.6 |
| CCH-35 | 5.50% | $\varepsilon_\perp$ [1 kHz, 20° C.]: | 7.1 |
| CCP-3-1 | 7.00% | Δε [1 kHz, 20° C.]: | −3.5 |
| CCY-3-O1 | 7.50% | $K_1$ [pN, 20° C.]: | 14.8 |
| CCY-3-O2 | 10.00% | $K_3$ [pN, 20° C.]: | 16.2 |
| CPY-3-O2 | 1.00% | $V_0$ [pN, 20° C.]: | 2.28 |
| CY-3-O2 | 15.50% | $\gamma_1$ [mPa s, 20° C.]: | 106 |
| CY-5-O2 | 3.50% | | |
| PGIY-2-O4 | 5.00% | | |
| PY-1-O2 | 13.50% | | |

Example M81

| | | | |
|---|---|---|---|
| CC-4-V1 | 23.00% | Clearing point [° C.]: | 74.7 |
| CC-3-V1 | 7.00% | Δn [589 nm, 20° C.]: | 0.0940 |
| CCH-34 | 5.00% | $\varepsilon_\parallel$ [1 kHz, 20° C.]: | 3.3 |
| CCH-35 | 4.00% | $\varepsilon_\perp$ [1 kHz, 20° C.]: | 6.3 |
| CLY-3-O2 | 5.00% | Δε [1 kHz, 20° C.]: | −2.9 |
| CLY-3-O3 | 6.00% | $K_1$ [pN, 20° C.]: | 14.5 |
| CPY-2-O2 | 8.00% | $K_3$ [pN, 20° C.]: | 15.4 |
| CPY-3-O2 | 8.50% | $V_0$ [pN, 20° C.]: | 2.43 |
| CY-3-O2 | 15.50% | $\gamma_1$ [mPa s, 20° C.]: | 99 |
| CY-3-O4 | 7.00% | LTS bulk [−20° C.]: | >1000 h |
| PCH-302 | 10.00% | | |
| PYP-2-3 | 1.00% | | |

Example M82

| | | | |
|---|---|---|---|
| CC-4-V1 | 23.00% | Clearing point [° C.]: | 75.2 |
| CC-3-V1 | 7.00% | Δn [589 nm, 20° C.]: | 0.0948 |
| CCH-34 | 5.00% | $\varepsilon_\parallel$ [1 kHz, 20° C.]: | 3.4 |
| CCH-35 | 4.50% | $\varepsilon_\perp$ [1 kHz, 20° C.]: | 6.3 |
| CCY-3-O1 | 8.00% | Δε [1 kHz, 20° C.]: | −2.9 |
| CCY-3-O2 | 2.00% | $K_1$ [pN, 20° C.]: | 14.2 |
| CPY-2-O2 | 6.00% | $K_3$ [pN, 20° C.]: | 15.4 |
| CPY-3-O2 | 11.00% | $V_0$ [pN, 20° C.]: | 2.42 |
| CY-3-O2 | 16.00% | $\gamma_1$ [mPa s, 20° C.]: | 101 |
| CY-3-O4 | 7.00% | LTS bulk [−20° C.]: | >1000 h |
| PCH-302 | 7.50% | | |
| PYP-2-3 | 3.00% | | |

Example M83

| | | | |
|---|---|---|---|
| CC-3-V1 | 7.00% | Clearing point [° C.]: | 75.5 |
| CC-4-V1 | 20.00% | Δn [589 nm, 20° C.]: | 0.0991 |
| CCH-34 | 3.00% | $\varepsilon_\parallel$ [1 kHz, 20° C.]: | 3.5 |

-continued

| | | | |
|---|---|---|---|
| CCH-24 | 5.00% | $\varepsilon_\perp$ [1 kHz, 20° C.]: | 7.0 |
| CCP-3-1 | 7.50% | Δε [1 kHz, 20° C.]: | −3.5 |
| CCY-3-O2 | 12.50% | $K_1$ [pN, 20° C.]: | 14.9 |
| CPY-3-O2 | 12.50% | $K_3$ [pN, 20° C.]: | 16.5 |
| CY-3-O2 | 15.50% | $V_0$ [pN, 20° C.]: | 2.30 |
| CY-3-O4 | 4.50% | $\gamma_1$ [mPa s, 20° C.]: | 112 |
| PY-3-O2 | 12.50% | LTS bulk [−20° C.]: | >1000 h |

Example M84

| | | | |
|---|---|---|---|
| CC-3-V1 | 8.00% | Clearing point [° C.]: | 86.9 |
| CC-4-V1 | 8.00% | Δn [589 nm, 20° C.]: | 0.1050 |
| CCH-34 | 16.00% | $\varepsilon_\parallel$ [1 kHz, 20° C.]: | 3.6 |
| CCY-3-O2 | 5.00% | $\varepsilon_\perp$ [1 kHz, 20° C.]: | 8.0 |
| CCY-3-O3 | 5.00% | Δε [1 kHz, 20° C.]: | −4.4 |
| CCY-4-O2 | 8.00% | $K_1$ [pN, 20° C.]: | 16.8 |
| CLY-3-O2 | 8.00% | $K_3$ [pN, 20° C.]: | 17.2 |
| CPY-2-O2 | 8.00% | $V_0$ [pN, 20° C.]: | 2.09 |
| CPY-3-O2 | 7.00% | $\gamma_1$ [mPa s, 20° C.]: | 146 |
| CY-3-O2 | 15.00% | | |
| PY-3-O2 | 12.00% | | |

Example M85

| | | | |
|---|---|---|---|
| CC-3-V1 | 1.00% | Clearing point [° C.]: | 74.5 |
| CC-4-V1 | 23.00% | Δn [589 nm, 20° C.]: | 0.0996 |
| CCH-34 | 5.00% | $\varepsilon_\parallel$ [1 kHz, 20° C.]: | 3.6 |
| CCH-35 | 5.00% | $\varepsilon_\perp$ [1 kHz, 20° C.]: | 7.0 |
| CCP-3-1 | 9.00% | Δε [1 kHz, 20° C.]: | −3.5 |
| CCY-3-O2 | 12.00% | $K_1$ [pN, 20° C.]: | 15.1 |
| CPY-3-O2 | 10.00% | $K_3$ [pN, 20° C.]: | 16.4 |
| CY-3-O2 | 15.50% | $V_0$ [pN, 20° C.]: | 2.30 |
| CY-3-O4 | 4.00% | $\gamma_1$ [mPa s, 20° C.]: | 111 |
| PY-3-O2 | 15.50% | | |

Example M86

| | | | |
|---|---|---|---|
| CY-3-O2 | 14.00% | Clearing point [° C.]: | 86.8 |
| CY-3-O4 | 2.00% | Δn [589 nm, 20° C.]: | 0.1029 |
| CY-5-O2 | 12.00% | $\varepsilon_\parallel$ [1 kHz, 20° C.]: | 3.7 |
| CCY-3-O1 | 5.00% | $\varepsilon_\perp$ [1 kHz, 20° C.]: | 8.0 |
| CCY-3-O2 | 9.00% | Δε [1 kHz, 20° C.]: | −4.3 |
| CCY-4-O2 | 8.00% | $K_1$ [pN, 20° C.]: | 15.6 |
| CPY-2-O2 | 8.00% | $K_3$ [pN, 20° C.]: | 16.6 |
| CPY-3-O2 | 8.00% | $V_0$ [pN, 20° C.]: | 2.07 |
| PYP-2-3 | 5.00% | $\gamma_1$ [mPa s, 20° C.]: | 153 |
| CC-3-V1 | 7.00% | | |
| CCH-34 | 10.00% | | |
| CC-4-V1 | 12.00% | | |

Example M87

| | | | |
|---|---|---|---|
| CY-3-O2 | 12.00% | Clearing point [° C.]: | 86.6 |
| CY-3-O4 | 2.00% | Δn [589 nm, 20° C.]: | 0.1043 |
| CY-5-O2 | 12.00% | $\varepsilon_\parallel$ [1 kHz, 20° C.]: | 3.7 |
| CCY-3-O1 | 5.00% | $\varepsilon_\perp$ [1 kHz, 20° C.]: | 8.0 |
| CCY-3-O2 | 9.00% | Δε [1 kHz, 20° C.]: | −4.3 |
| CCY-4-O2 | 8.00% | $K_1$ [pN, 20° C.]: | 16.3 |
| CPY-2-O2 | 2.00% | $K_3$ [pN, 20° C.]: | 16.2 |
| CPY-3-O2 | 6.00% | $V_0$ [pN, 20° C.]: | 2.05 |

| | | | |
|---|---|---|---|
| PYP-2-3 | 5.00% | $\gamma_1$ [mPa s, 20° C.]: | 145 |
| CC-3-V1 | 7.00% | | |
| BCH-32 | 4.00% | | |
| CCH-34 | 13.00% | | |
| CC-4-V1 | 10.00% | | |
| B(S)-2O-O5 | 5.00% | | |

Example M88

| | | | |
|---|---|---|---|
| BCH-32 | 7.00% | Clearing point [° C.]: | 86.4 |
| CC-3-V1 | 7.00% | Δn [589 nm, 20° C.]: | 0.1098 |
| CC-4-V1 | 9.00% | $\varepsilon_{\parallel}$ [1 kHz, 20° C.]: | 3.7 |
| CCH-34 | 14.00% | $\varepsilon_{\perp}$ [1 kHz, 20° C.]: | 8.0 |
| CCY-3-O2 | 5.00% | Δε [1 kHz, 20° C.]: | −4.3 |
| CCY-3-O3 | 5.00% | $K_1$ [pN, 20° C.]: | 17.0 |
| CCY-4-O2 | 8.00% | $K_3$ [pN, 20° C.]: | 16.3 |
| CLY-3-O2 | 8.00% | $V_0$ [pN, 20° C.]: | 2.05 |
| CPY-2-O2 | 6.00% | $\gamma_1$ [mPa s, 20° C.]: | 139 |
| CY-3-O2 | 14.00% | | |
| PY-3-O2 | 12.00% | | |
| B(S)-2O-O5 | 5.00% | | |

Example M89

| | | | |
|---|---|---|---|
| CC-3-V1 | 7.00% | Clearing point [° C.]: | 75 |
| CC-4-V1 | 23.00% | Δn [589 nm, 20° C.]: | 0.1003 |
| CCH-34 | 3.00% | $\varepsilon_{\parallel}$ [1 kHz, 20° C.]: | 3.6 |
| CCH-35 | 7.00% | $\varepsilon_{\perp}$ [1 kHz, 20° C.]: | 7.1 |
| CCP-3-1 | 2.50% | Δε [1 kHz, 20° C.]: | −3.5 |
| CCY-3-O1 | 6.00% | $K_1$ [pN, 20° C.]: | 15.3 |
| CCY-3-O2 | 10.00% | $K_3$ [pN, 20° C.]: | 16.8 |
| CPY-3-O2 | 10.00% | $V_0$ [pN, 20° C.]: | 2.31 |
| CY-3-O2 | 14.50% | $\gamma_1$ [mPa s, 20° C.]: | 105 |
| PY-3-O2 | 10.00% | LTS bulk [−20° C.]: | >1000 h |
| PY-1-O2 | 7.00% | LTS bulk [−25° C.]: | >1000 h |

Example M90

| | | | |
|---|---|---|---|
| CC-3-V1 | 7.00% | Clearing point [° C.]: | 75 |
| CC-4-V1 | 20.00% | Δn [589 nm, 20° C.]: | 0.0998 |
| CCH-34 | 3.00% | $\varepsilon_{\parallel}$ [1 kHz, 20° C.]: | 3.5 |
| CCH-35 | 7.00% | $\varepsilon_{\perp}$ [1 kHz, 20° C.]: | 7.1 |
| CCP-3-1 | 4.50% | Δε [1 kHz, 20° C.]: | −3.6 |
| CCY-3-O2 | 12.50% | $K_1$ [pN, 20° C.]: | 15.2 |
| CPY-3-O2 | 12.50% | $K_3$ [pN, 20° C.]: | 17.0 |
| CY-3-O2 | 15.50% | $V_0$ [pN, 20° C.]: | 2.30 |
| CY-3-O4 | 4.50% | $\gamma_1$ [mPa s, 20° C.]: | 113 |
| PY-3-O2 | 13.50% | | |

Example M91

| | | | |
|---|---|---|---|
| CC-3-V1 | 7.50% | Clearing point [° C.]: | 75.5 |
| CC-4-V1 | 23.00% | Δn [589 nm, 20° C.]: | 0.0993 |
| CCH-25 | 7.50% | $\varepsilon_{\parallel}$ [1 kHz, 20° C.]: | 3.6 |
| CCP-3-1 | 4.40% | $\varepsilon_{\perp}$[1 kHz, 20° C.]: | 7.1 |
| CCY-3-O1 | 7.50% | Δε [1 kHz, 20° C.]: | −3.5 |
| CCY-3-O2 | 12.00% | $K_1$ [pN, 20° C.]: | 14.6 |
| CPY-3-O2 | 8.00% | $K_3$ [pN, 20° C.]: | 16.2 |
| CY-3-O2 | 13.00% | $V_0$ [pN, 20° C.]: | 2.26 |
| PY-1-O2 | 9.00% | $\gamma_1$ [mPa s, 20° C.]: | 107 |

| | | | |
|---|---|---|---|
| PY-2-O2 | 8.00% | LTS bulk [−20° C.]: | >1000 h |
| | | LTS bulk [−25° C.]: | >1000 h |

Example M92

| | | | |
|---|---|---|---|
| CC-3-V1 | 7.50% | Clearing point [° C.]: | 74 |
| CC-4-V1 | 11.00% | Δn [589 nm, 20° C.]: | 0.0987 |
| CCH-301 | 10.00% | $\varepsilon_{\parallel}$ [1 kHz, 20° C.]: | 3.6 |
| CCH-25 | 6.00% | $\varepsilon_{\perp}$ [1 kHz, 20° C.]: | 6.9 |
| CCH-24 | 6.00% | Δε [1 kHz, 20° C.]: | −3.3 |
| CCP-V2-1 | 6.00% | $K_1$ [pN, 20° C.]: | 13.9 |
| CCY-3-O1 | 7.00% | $K_3$ [pN, 20° C.]: | 15.1 |
| CCY-3-O2 | 11.00% | $V_0$ [pN, 20° C.]: | 2.28 |
| CPY-3-O2 | 12.00% | $\gamma_1$ [mPa s, 20° C.]: | 102 |
| CY-3-O2 | 6.00% | LTS bulk [−20° C.]: | >1000 h |
| PY-1-O2 | 9.50% | | |
| PY-2-O2 | 8.00% | | |

Example M93

| | | | |
|---|---|---|---|
| CC-3-V1 | 7.50% | Clearing point [° C.]: | 75 |
| CC-4-V1 | 23.00% | Δn [589 nm, 20° C.]: | 0.0987 |
| CCH-24 | 5.00% | $\varepsilon_{\parallel}$ [1 kHz, 20° C.]: | 3.6 |
| CCH-25 | 5.00% | $\varepsilon_{\perp}$ [1 kHz, 20° C.]: | 6.9 |
| CCP-3-1 | 3.00% | Δε [1 kHz, 20° C.]: | −3.4 |
| CCY-3-O1 | 7.50% | $K_1$ [pN, 20° C.]: | 14.5 |
| CCY-3-O2 | 11.50% | $K_3$ [pN, 20° C.]: | 15.6 |
| CPY-3-O2 | 9.50% | $V_0$ [pN, 20° C.]: | 2.27 |
| CY-3-O2 | 11.00% | $\gamma_1$ [mPa s, 20° C.]: | 103 |
| PY-3-O2 | 4.00% | LTS bulk [−20° C.]: | >1000 h |
| PY-1-O2 | 7.00% | | |
| PY-2-O2 | 6.00% | | |

Example M94

| | | | |
|---|---|---|---|
| CC-3-V1 | 7.50% | Clearing point [° C.]: | 76.5 |
| CC-4-V1 | 23.00% | Δn [589 nm, 20° C.]: | 0.0993 |
| CCH-24 | 7.50% | $\varepsilon_{\parallel}$ [1 kHz, 20° C.]: | 3.6 |
| CCP-3-1 | 4.50% | $\varepsilon_{\perp}$ [1 kHz, 20° C.]: | 7.1 |
| CCY-3-O1 | 7.50% | Δε [1 kHz, 20° C.]: | −3.5 |
| CCY-3-O2 | 12.00% | $K_1$ [pN, 20° C.]: | 14.4 |
| CPY-3-O2 | 9.50% | $K_3$ [pN, 20° C.]: | 15.9 |
| CY-3-O2 | 12.50% | $V_0$ [pN, 20° C.]: | 2.26 |
| PY-3-O2 | 2.00% | $\gamma_1$ [mPa s, 20° C.]: | 108 |
| PY-1-O2 | 7.00% | LTS bulk [−20° C.]: | >1000 h |
| PY-2-O2 | 7.00% | | |

Example M95

| | | | |
|---|---|---|---|
| CC-3-V1 | 7.50% | Clearing point [° C.]: | 73.5 |
| CC-4-V1 | 20.50% | Δn [589 nm, 20° C.]: | 0.0989 |
| CCH-24 | 9.00% | $\varepsilon_{\parallel}$ [1 kHz, 20° C.]: | 3.6 |
| CCP-3-1 | 10.50% | $\varepsilon_{\perp}$ [1 kHz, 20° C.]: | 6.9 |
| CCY-3-O1 | 7.00% | Δε [1 kHz, 20° C.]: | −3.3 |
| CCY-3-O2 | 11.50% | $K_1$ [pN, 20° C.]: | 14.9 |
| CY-3-O2 | 12.00% | $K_3$ [pN, 20° C.]: | 15.3 |
| B(S)-2O-O5 | 4.00% | $V_0$ [pN, 20° C.]: | 2.27 |
| B(S)-2O-O4 | 3.00% | $\gamma_1$ [mPa s, 20° C.]: | 94 |
| PP-1-3 | 3.50% | LTS bulk [−20° C.]: | >1000 h |

-continued

| | | | |
|---|---|---|---|
| PY-1-O2 | 8.00% | LTS bulk [−25° C.]: | >1000 h |
| PY-2-O2 | 3.50% | | |

Example M96

| | | | |
|---|---|---|---|
| CC-3-V1 | 7.50% | Clearing point [° C.]: | 75 |
| CC-4-V1 | 11.00% | Δn [589 nm, 20° C.]: | 0.0986 |
| CCH-301 | 10.00% | $ε_{\|}$ [1 kHz, 20° C.]: | 3.6 |
| CCH-24 | 6.00% | $ε_{⊥}$ [1 kHz, 20° C.]: | 7.0 |
| CCH-34 | 6.00% | Δε [1 kHz, 20° C.]: | −3.4 |
| CCP-V2-1 | 5.00% | $K_1$ [pN, 20° C.]: | 14.0 |
| CCY-3-O1 | 7.00% | $K_3$ [pN, 20° C.]: | 15.2 |
| CCY-3-O2 | 11.50% | $V_0$ [pN, 20° C.]: | 2.25 |
| CPY-3-O2 | 12.00% | $γ_1$ [mPa s, 20° C.]: | 103 |
| CY-3-O2 | 6.50% | LTS bulk [−20° C.]: | >1000 h |
| PY-1-O2 | 9.50% | | |
| PY-2-O2 | 8.00% | | |

Example M97

| | | | |
|---|---|---|---|
| CC-3-V1 | 7.50% | Clearing point [° C.]: | 75 |
| CC-4-V1 | 11.00% | Δn [589 nm, 20° C.]: | 0.0980 |
| CCH-301 | 10.00% | $ε_{\|}$ [1 kHz, 20° C.]: | 3.6 |
| CCH-34 | 6.00% | $ε_{⊥}$ [1 kHz, 20° C.]: | 7.1 |
| CCH-35 | 6.00% | Δε [1 kHz, 20° C.]: | −3.5 |
| CCP-V2-1 | 3.00% | $K_1$ [pN, 20° C.]: | 14.7 |
| CCY-3-O1 | 7.00% | $K_3$ [pN, 20° C.]: | 16.2 |
| CCY-3-O2 | 11.00% | $V_0$ [pN, 20° C.]: | 2.28 |
| CPY-3-O2 | 11.50% | $γ_1$ [mPa s, 20° C.]: | 108 |
| CY-3-O2 | 11.00% | LTS bulk [−20° C.]: | >1000 h |
| PY-3-O2 | 16.00% | | |

Example M98

| | | | |
|---|---|---|---|
| CC-3-V1 | 7.50% | Clearing point [° C.]: | 75 |
| CC-4-V1 | 11.00% | Δn [589 nm, 20° C.]: | 0.0978 |
| CCH-301 | 10.00% | $ε_{\|}$ [1 kHz, 20° C.]: | 3.6 |
| CCH-34 | 6.00% | $ε_{⊥}$ [1 kHz, 20° C.]: | 7.1 |
| CCH-35 | 6.00% | Δε [1 kHz, 20° C.]: | −3.5 |
| CCP-3-1 | 3.00% | $K_1$ [pN, 20° C.]: | 14.8 |
| CCY-3-O1 | 7.00% | $K_3$ [pN, 20° C.]: | 16.3 |
| CCY-3-O2 | 11.00% | $V_0$ [pN, 20° C.]: | 2.28 |
| CPY-3-O2 | 11.50% | $γ_1$ [mPa s, 20° C.]: | 108 |
| CY-3-O2 | 11.00% | LTS bulk [−20° C.]: | >1000 h |
| PY-3-O2 | 16.00% | LTS bulk [−25° C.]: | >1000 h |

Example M99

| | | | |
|---|---|---|---|
| CC-3-V1 | 7.50% | Clearing point [° C.]: | 74 |
| CC-4-V1 | 11.00% | Δn [589 nm, 20° C.]: | 0.0981 |
| CCH-301 | 16.00% | $ε_{\|}$ [1 kHz, 20° C.]: | 3.7 |
| CCH-24 | 6.00% | $ε_{⊥}$ [1 kHz, 20° C.]: | 6.9 |
| CCP-3-1 | 7.00% | Δε [1 kHz, 20° C.]: | −3.3 |
| CCY-3-O1 | 7.00% | $K_1$ [pN, 20° C.]: | 13.7 |
| CCY-3-O2 | 11.00% | $K_3$ [pN, 20° C.]: | 15.5 |
| CPY-3-O2 | 12.00% | $V_0$ [pN, 20° C.]: | 2.30 |
| CY-3-O2 | 5.50% | $γ_1$ [mPa s, 20° C.]: | 103 |
| PY-1-O2 | 9.00% | LTS bulk [−20° C.]: | >1000 h |
| PY-2-O2 | 8.00% | | |

Example M100

| | | | |
|---|---|---|---|
| CC-3-V1 | 7.50% | Clearing point [° C.]: | 74.5 |
| CC-4-V1 | 11.00% | Δn [589 nm, 20° C.]: | 0.0997 |
| CCH-301 | 16.00% | $ε_{\|}$ [1 kHz, 20° C.]: | 3.7 |
| CCH-25 | 6.00% | $ε_{⊥}$ [1 kHz, 20° C.]: | 7.1 |
| CCP-V2-1 | 6.00% | Δε [1 kHz, 20° C.]: | −3.4 |
| CCY-3-O1 | 7.00% | $K_1$ [pN, 20° C.]: | 13.9 |
| CCY-3-O2 | 11.50% | $K_3$ [pN, 20° C.]: | 15.7 |
| CPY-3-O2 | 12.00% | $V_0$ [pN, 20° C.]: | 2.28 |
| CY-3-O2 | 5.50% | $γ_1$ [mPa s, 20° C.]: | 106 |
| PY-1-O2 | 9.50% | LTS bulk [−20° C.]: | >1000 h |
| PY-2-O2 | 8.00% | | |

Example M101

| | | | |
|---|---|---|---|
| CC-3-V1 | 7.50% | Clearing point [° C.]: | 75.5 |
| CC-4-V1 | 11.00% | Δn [589 nm, 20° C.]: | 0.0996 |
| CCH-301 | 10.00% | $ε_{\|}$ [1 kHz, 20° C.]: | 3.7 |
| CCH-34 | 6.00% | $ε_{⊥}$ [1 kHz, 20° C.]: | 7.2 |
| CCH-35 | 6.00% | Δε [1 kHz, 20° C.]: | −3.5 |
| CCP-V2-1 | 3.50% | $K_1$ [pN, 20° C.]: | 14.4 |
| CCY-3-O1 | 7.00% | $K_3$ [pN, 20° C.]: | 16.0 |
| CCY-3-O2 | 11.00% | $V_0$ [pN, 20° C.]: | 2.26 |
| CPY-3-O2 | 12.00% | $γ_1$ [mPa s, 20° C.]: | 105 |
| CY-3-O2 | 8.50% | | |
| PY-1-O2 | 9.00% | | |
| PY-2-O2 | 8.50% | | |

Example M102

| | | | |
|---|---|---|---|
| CCP-V-1 | 12.00% | Clearing point [° C.]: | 74 |
| CCP-V2-1 | 6.00% | Δn [589 nm, 20° C.]: | 0.1039 |
| CCY-4-O2 | 12.00% | $ε_{\|}$ [1 kHz, 20° C.]: | 3.6 |
| CPY-2-O2 | 9.50% | $ε_{⊥}$ [1 kHz, 20° C.]: | 6.5 |
| B(S)-2O-O4 | 0.50% | Δε [1 kHz, 20° C.]: | −2.9 |
| CC-3-V1 | 11.00% | $K_1$ [pN, 20° C.]: | 13.2 |
| CC-4-V1 | 3.00% | $K_3$ [pN, 20° C.]: | 14.9 |
| CCH-24 | 4.00% | $V_0$ [pN, 20° C.]: | 2.39 |
| CCH-35 | 6.50% | $γ_1$ [mPa s, 20° C.]: | 98 |
| CY-3-O2 | 10.00% | LTS bulk [−20° C.]: | >1000 h |
| PCH-301 | 9.00% | LTS bulk [−25° C.]: | >1000 h |
| PY-1-O2 | 10.00% | | |
| PY-2-O2 | 6.50% | | |

Example M103

| | | | |
|---|---|---|---|
| BCH-32 | 8.00% | Clearing point [° C.]: | 75.5 |
| CCH-23 | 15.00% | Δn [589 nm, 20° C.]: | 0.1166 |
| CC-4-V1 | 12.50% | $ε_{\|}$ [1 kHz, 20° C.]: | 3.6 |
| CCP-3-1 | 4.00% | $ε_{⊥}$ [1 kHz, 20° C.]: | 6.6 |
| CCY-4-O2 | 6.00% | Δε [1 kHz, 20° C.]: | −3.1 |
| CPY-2-O2 | 10.00% | $K_1$ [pN, 20° C.]: | 13.5 |
| CPY-3-O2 | 10.00% | $K_3$ [pN, 20° C.]: | 14.5 |
| CY-3-O2 | 13.00% | $V_0$ [pN, 20° C.]: | 2.30 |
| PCH-301 | 5.50% | $γ_1$ [mPa s, 20° C.]: | 111 |
| PY-1-O2 | 9.00% | LTS bulk [−20° C.]: | >1000 h |
| PP-1-2V1 | 2.50% | LTS bulk [−25° C.]: | >1000 h |
| PGIY-2-O4 | 4.50% | | |

Example M104

| | | | |
|---|---|---|---|
| B-2O-O5 | 4.00% | Clearing point [° C.]: | 74 |
| BCH-32 | 8.00% | Δn [589 nm, 20° C.]: | 0.1090 |
| CC-3-V1 | 9.00% | $\varepsilon_{\parallel}$ [1 kHz, 20° C.]: | 3.7 |
| CC-4-V1 | 20.00% | $\varepsilon_{\perp}$ [1 kHz, 20° C.]: | 6.8 |
| CCP-3-1 | 7.50% | Δε [1 kHz, 20° C.]: | −3.1 |
| CCP-V2-1 | 5.00% | $K_1$ [pN, 20° C.]: | 14.1 |
| CCY-3-O2 | 9.00% | $K_3$ [pN, 20° C.]: | 16.2 |
| CLY-3-O2 | 1.00% | $V_0$ [pN, 20° C.]: | 2.40 |
| CPY-3-O | 3.00% | $\gamma_1$ [mPa s, 20° C.]: | 100 |
| CY-3-O2 | 14.50% | LTS bulk [−20° C.]: | >1000 h |
| PCH-301 | 3.50% | LTS bulk [−25° C.]: | >1000 h |
| PY-1-O2 | 8.00% | | |
| PY-2-O2 | 7.50% | | |

Example M105

| | | | |
|---|---|---|---|
| BCH-32 | 8.00% | Clearing point [° C.]: | 75 |
| CC-3-V1 | 9.00% | Δn [589 nm, 20° C.]: | 0.1097 |
| CC-4-V1 | 17.00% | $\varepsilon_{\parallel}$ [1 kHz, 20° C.]: | 3.6 |
| CCP-3-1 | 3.00% | $\varepsilon_{\perp}$ [1 kHz, 20° C.]: | 6.8 |
| CCP-V2-1 | 5.00% | Δε [1 kHz, 20° C.]: | −3.2 |
| CCY-3-O1 | 3.50% | $K_1$ [pN, 20° C.]: | 13.9 |
| CCY-3-O2 | 10.50% | $K_3$ [pN, 20° C.]: | 16.5 |
| CLY-3-O2 | 1.00% | $V_0$ [pN, 20° C.]: | 2.40 |
| CPY-3-O2 | 5.50% | $\gamma_1$ [mPa s, 20° C.]: | 107 |
| CY-3-O2 | 14.50% | LTS bulk [−20° C.]: | >1000 h |
| PCH-301 | 6.00% | LTS bulk [−25° C.]: | >1000 h |
| PY-1-O2 | 8.50% | | |
| PY-2-O2 | 8.50% | | |

Example M106

| | | | |
|---|---|---|---|
| BCH-32 | 5.00% | Clearing point [° C.]: | 75 |
| CC-3-V1 | 6.00% | Δn [589 nm, 20° C.]: | 0.1064 |
| CC-4-V1 | 17.50% | $\varepsilon_{\parallel}$ [1 kHz, 20° C.]: | 3.6 |
| CCP-3-1 | 8.00% | $\varepsilon_{\perp}$ [1 kHz, 20° C.]: | 6.9 |
| CCP-3-3 | 3.00% | Δε [1 kHz, 20° C.]: | −3.3 |
| CCY-3-1 | 2.00% | $K_1$ [pN, 20° C.]: | 14.3 |
| CCY-3-O2 | 10.50% | $K_3$ [pN, 20° C.]: | 16.6 |
| CCY-4-O2 | 5.00% | $V_0$ [pN, 20° C.]: | 2.36 |
| CPY-3-O2 | 3.50% | $\gamma_1$ [mPa s, 20° C.]: | 117 |
| CY-3-O2 | 15.50% | LTS bulk [−20° C.]: | >1000 h |
| PCH-301 | 5.50% | LTS bulk [−25° C.]: | >1000 h |
| PY-1-O4 | 6.00% | | |
| PY-3-O2 | 12.50% | | |

Example M107

| | | | |
|---|---|---|---|
| BCH-32 | 5.00% | Clearing point [° C.]: | 75 |
| CC-3-V1 | 6.00% | Δn [589 nm, 20° C.]: | 0.1066 |
| CC-4-V1 | 18.00% | $\varepsilon_{\parallel}$ [1 kHz, 20° C.]: | 3.7 |
| CCP-3-1 | 8.00% | $\varepsilon_{\perp}$ [1 kHz, 20° C.]: | 7.0 |
| CCP-3-3 | 3.00% | Δε [1 kHz, 20° C.]: | −3.3 |
| CCY-3-1 | 2.00% | $K_1$ [pN, 20° C.]: | 13.9 |
| CCY-3-O2 | 10.50% | $K_3$ [pN, 20° C.]: | 16.5 |
| CCY-4-O2 | 5.00% | $V_0$ [pN, 20° C.]: | 2.35 |
| CPY-3-O2 | 4.00% | $\gamma_1$ [mPa s, 20° C.]: | 112 |
| CY-3-O2 | 15.50% | LTS bulk [−20° C.]: | >1000 h |
| PCH-301 | 5.50% | LTS bulk [−25° C.]: | >1000 h |
| PY-1-O2 | 9.00% | | |
| PY-2-O2 | 8.50% | | |

Example M108

| | | | |
|---|---|---|---|
| CCP-V-1 | 12.00% | Clearing point [° C.]: | 75 |
| CCY-4-O2 | 6.00% | Δn [589 nm, 20° C.]: | 0.1042 |
| CPY-2-O2 | 11.50% | $\varepsilon_{\parallel}$ [1 kHz, 20° C.]: | 3.5 |
| CPY-3-O2 | 6.50% | $\varepsilon_{\perp}$ [1 kHz, 20° C.]: | 6.5 |
| CC-3-V1 | 11.00% | Δε [1 kHz, 20° C.]: | −2.9 |
| CC-4-V1 | 15.00% | $K_1$ [pN, 20° C.]: | 13.3 |
| CCH-34 | 5.50% | $K_3$ [pN, 20° C.]: | 15.4 |
| CY-3-O2 | 14.50% | $V_0$ [pN, 20° C.]: | 2.41 |
| PCH-301 | 7.00% | $\gamma_1$ [mPa s, 20° C.]: | 97 |
| PY-1-O2 | 10.00% | LTS bulk [−20° C.]: | >1000 h |
| PY-2-O2 | 1.00% | | |

Example M109

| | | | |
|---|---|---|---|
| B-2O-O5 | 4.00% | Clearing point [° C.]: | 74.5 |
| BCH-32 | 7.00% | Δn [589 nm, 20° C.]: | 0.1088 |
| CC-3-V1 | 8.00% | $\varepsilon_{\parallel}$ [1 kHz, 20° C.]: | 3.6 |
| CC-4-V1 | 14.00% | $\varepsilon_{\perp}$ [1 kHz, 20° C.]: | 6.9 |
| CC-1V-V2 | 14.00% | Δε [1 kHz, 20° C.]: | −3.3 |
| CCP-3-1 | 8.00% | $K_1$ [pN, 20° C.]: | 14.7 |
| CCY-3-O2 | 11.00% | $K_3$ [pN, 20° C.]: | 16.9 |
| CLY-3-O2 | 1.00% | $V_0$ [pN, 20° C.]: | 2.41 |
| CPY-3-O2 | 3.00% | $\gamma_1$ [mPa s, 20° C.]: | 99 |
| CY-3-O2 | 14.50% | LTS bulk [−20° C.]: | >1000 h |
| PY-1-O2 | 8.00% | LTS bulk [−25° C.]: | >1000 h |
| PY-2-O2 | 7.50% | | |

Example M110

| | | | |
|---|---|---|---|
| B-2O-O5 | 4.00% | Clearing point [° C.]: | 75 |
| BCH-32 | 8.00% | Δn [589 nm, 20° C.]: | 0.1080 |
| CC-3-V1 | 8.00% | $\varepsilon_{\parallel}$ [1 kHz, 20° C.]: | 3.6 |
| CC-4-V1 | 15.00% | $\varepsilon_{\perp}$ [1 kHz, 20° C.]: | 6.5 |
| CC-2V-V2 | 15.00% | Δε [1 kHz, 20° C.]: | −2.9 |
| CCP-3-1 | 8.00% | $K_1$ [pN, 20° C.]: | 14.4 |
| CCY-3-O2 | 9.00% | $K_3$ [pN, 20° C.]: | 15.2 |
| CLY-3-O2 | 1.00% | $V_0$ [pN, 20° C.]: | 2.41 |
| CPY-3-O2 | 4.00% | $\gamma_1$ [mPa s, 20° C.]: | 92 |
| CY-3-O2 | 12.00% | LTS bulk [−20° C.]: | >1000 h |
| PY-1-O2 | 8.00% | | |
| PY-2-O2 | 8.00% | | |

Example M111

| | | | |
|---|---|---|---|
| BCH-32 | 4.00% | Clearing point [° C.]: | 76 |
| CC-3-V1 | 7.00% | Δn [589 nm, 20° C.]: | 0.1090 |
| CC-4-V1 | 14.00% | $\varepsilon_{\parallel}$ [1 kHz, 20° C.]: | 3.6 |
| CC-1V-V2 | 14.00% | $\varepsilon_{\perp}$ [1 kHz, 20° C.]: | 6.9 |
| CCP-3-1 | 7.50% | Δε [1 kHz, 20° C.]: | −3.3 |
| CCY-3-O1 | 1.50% | $K_1$ [pN, 20° C.]: | 14.6 |
| CCY-3-O2 | 10.50% | $K_3$ [pN, 20° C.]: | 17.6 |
| CLY-3-O2 | 1.00% | $V_0$ [pN, 20° C.]: | 2.44 |
| CPY-3-O2 | 7.50% | $\gamma_1$ [mPa s, 20° C.]: | 104 |
| CY-3-O2 | 14.50% | LTS bulk [−20° C.]: | >1000 h |
| PY-1-O2 | 9.50% | LTS bulk [−25° C.]: | >1000 h |
| PY-2-O2 | 9.00% | | |

Example M112

| | | | |
|---|---|---|---|
| BCH-32 | 5.50% | Clearing point [° C.]: | 75.5 |
| CC-3-V1 | 7.00% | Δn [589 nm, 20° C.]: | 0.1086 |
| CC-4-V1 | 14.00% | $\varepsilon_{\parallel}$ [1 kHz, 20° C.]: | 3.6 |
| CC-2V-V2 | 14.00% | $\varepsilon_{\perp}$ [1 kHz, 20° C.]: | 6.5 |
| CCP-3-1 | 9.00% | Δε [1 kHz, 20° C.]: | −3.0 |
| CCY-3-O2 | 8.00% | $K_1$ [pN, 20° C.]: | 14.3 |
| CLY-3-O2 | 1.00% | $K_3$ [pN, 20° C.]: | 15.8 |
| CPY-3-O2 | 9.00% | $V_0$ [pN, 20° C.]: | 2.43 |
| CY-3-O2 | 14.50% | $\gamma_1$ [mPa s, 20° C.]: | 97 |
| PY-1-O2 | 9.00% | LTS bulk [−20° C.]: | >1000 h |
| PY-2-O2 | 9.00% | LTS bulk [−25° C.]: | >1000 h |

Example M113

| | | | |
|---|---|---|---|
| CCP-V-1 | 12.00% | Clearing point [° C.]: | 74 |
| CCY-4-O2 | 9.00% | Δn [589 nm, 20° C.]: | 0.1035 |
| CPY-2-O2 | 12.00% | $\varepsilon_{\parallel}$ [1 kHz, 20° C.]: | 3.5 |
| CPY-3-O2 | 3.00% | $\varepsilon_{\perp}$ [1 kHz, 20° C.]: | 6.4 |
| CC-3-V1 | 11.00% | Δε [1 kHz, 20° C.]: | −2.9 |
| CC-4-V1 | 15.00% | $K_1$ [pN, 20° C.]: | 13.0 |
| CCH-34 | 4.50% | $K_3$ [pN, 20° C.]: | 14.9 |
| CY-3-O2 | 12.00% | $V_0$ [pN, 20° C.]: | 2.40 |
| PCH-301 | 8.50% | $\gamma_1$ [mPa s, 20° C.]: | 95 |
| PY-1-O2 | 10.00% | LTS bulk [−20° C.]: | >1000 h |
| PY-2-O2 | 3.00% | | |

Example M114

| | | | |
|---|---|---|---|
| BCH-32 | 5.50% | Clearing point [° C.]: | 75 |
| CCP-V2-1 | 1.50% | Δn [589 nm, 20° C.]: | 0.1080 |
| CCY-3-O2 | 11.00% | $\varepsilon_{\parallel}$ [1 kHz, 20° C.]: | 3.5 |
| CLY-3-O2 | 1.00% | $\varepsilon_{\perp}$ [1 kHz, 20° C.]: | 6.8 |
| CPY-3-O2 | 12.00% | Δε [1 kHz, 20° C.]: | −3.3 |
| CC-3-V1 | 11.00% | $K_1$ [pN, 20° C.]: | 15.1 |
| CCH-34 | 8.00% | $K_3$ [pN, 20° C.]: | 16.7 |
| CCH-35 | 5.00% | $V_0$ [pN, 20° C.]: | 2.37 |
| CY-3-O2 | 13.50% | $\gamma_1$ [mPa s, 20° C.]: | 109 |
| PCH-301 | 2.50% | LTS bulk [−20° C.]: | >1000 h |
| PY-3-O2 | 18.00% | | |
| CC-4-V1 | 11.00% | | |

Example M115

| | | | |
|---|---|---|---|
| BCH-32 | 4.00% | Clearing point [° C.]: | 74.50 |
| CC-3-V1 | 7.00% | Δn [589 nm, 20° C.]: | 0.1089 |
| CC-4-V1 | 14.00% | $\varepsilon_{\parallel}$ [1 kHz, 20° C.]: | 3.6 |
| CC-1V-V2 | 14.00% | $\varepsilon_{\perp}$ [1 kHz, 20° C.]: | 6.9 |
| CCP-3-1 | 7.00% | Δε [1 kHz, 20° C.]: | −3.3 |
| CCY-3-O1 | 2.00% | $K_1$ [pN, 20° C.]: | 14.3 |
| CCY-3-O2 | 10.50% | $K_3$ [pN, 20° C.]: | 17.3 |
| CLY-3-O2 | 1.00% | $V_0$ [pN, 20° C.]: | 2.41 |
| CPY-3-O2 | 7.00% | $\gamma_1$ [mPa s, 20° C.]: | 103 |
| CY-3-O2 | 14.50% | LTS bulk [−20° C.]: | >1000 h |
| PY-1-O2 | 9.50% | LTS bulk [−25° C.]: | >1000 h |
| PY-2-O2 | 9.50% | | |

Example M116

| | | | |
|---|---|---|---|
| BCH-32 | 5.50% | Clearing point [° C.]: | 74.50 |
| CC-3-V1 | 7.00% | Δn [589 nm, 20° C.]: | 0.1087 |
| CC-4-V1 | 14.00% | $\varepsilon_{\parallel}$ [1 kHz, 20° C.]: | 3.6 |
| CC-2V-V2 | 14.00% | $\varepsilon_{\perp}$ [1 kHz, 20° C.]: | 6.6 |
| CCP-3-1 | 8.50% | Δε [1 kHz, 20° C.]: | −3.0 |
| CCY-3-O1 | 8.50% | $K_1$ [pN, 20° C.]: | 14.1 |
| CLY-3-O2 | 1.00% | $K_3$ [pN, 20° C.]: | 15.7 |
| CPY-3-O2 | 8.50% | $V_0$ [pN, 20° C.]: | 2.41 |
| CY-3-O2 | 14.50% | $\gamma_1$ [mPa s, 20° C.]: | 97 |
| PY-1-O2 | 9.50% | LTS bulk [−20° C.]: | >1000 h |
| PY-2-O2 | 9.00% | LTS bulk [−25° C.]: | >1000 h |

Example M117

| | | | |
|---|---|---|---|
| CCP-3-1 | 1.00% | Clearing point [° C.]: | 89 |
| CCP-V-1 | 10.00% | Δn [589 nm, 20° C.]: | 0.1031 |
| CCY-3-O2 | 5.00% | $\varepsilon_{\parallel}$ [1 kHz, 20° C.]: | 3.7 |
| CLY-2-O4 | 2.00% | $\varepsilon_{\perp}$ [1 kHz, 20° C.]: | 8.0 |
| CLY-3-O2 | 8.00% | Δε [1 kHz, 20° C.]: | −4.3 |
| CLY-3-O3 | 5.00% | $K_1$ [pN, 20° C.]: | 19.7 |
| CLY-4-O2 | 5.00% | $K_3$ [pN, 20° C.]: | 16.5 |
| CPY-3-O2 | 0.50% | $V_0$ [pN, 20° C.]: | 2.07 |
| PGIY-2-O4 | 3.50% | $\gamma_1$ [mPa s, 20° C.]: | 114 |
| B(S)-2O-O4 | 4.00% | | |
| B(S)-2O-O5 | 5.00% | | |
| B(S)-2O-O6 | 3.00% | | |
| CC-3-V1 | 8.00% | | |
| CC-4-V1 | 20.00% | | |
| CCH-34 | 5.00% | | |
| CCH-35 | 5.00% | | |
| Y-4O-O4 | 10.00% | | |

Example M118

| | | | |
|---|---|---|---|
| CCY-2-1 | 5.00% | Clearing point [° C.]: | 88 |
| CCY-3-1 | 10.00% | Δn [589 nm, 20° C.]: | 0.1035 |
| CCY-3-O2 | 4.00% | $\varepsilon_{\parallel}$ [1 kHz, 20° C.]: | 3.7 |
| CLY-2-O4 | 2.00% | $\varepsilon_{\perp}$ [1 kHz, 20° C.]: | 7.9 |
| CLY-3-O2 | 8.00% | Δε [1 kHz, 20° C.]: | −4.2 |
| CLY-3-O3 | 5.00% | $K_1$ [pN, 20° C.]: | 20.2 |
| CLY-4-O2 | 2.00% | $K_3$ [pN, 20° C.]: | 16.7 |
| PYP-2-3 | 5.00% | $V_0$ [pN, 20° C.]: | 2.10 |
| B(S)-2O-O4 | 4.00% | $\gamma_1$ [mPa s, 20° C.]: | 121 |
| B(S)-2O-O5 | 5.00% | | |
| B(S)-2O-O6 | 3.00% | | |
| CC-3-V1 | 8.00% | | |
| CC-4-V1 | 21.00% | | |
| CCH-34 | 5.00% | | |
| CCH-35 | 5.00% | | |
| Y-4O-O4 | 8.00% | | |

Example M119

| | | | |
|---|---|---|---|
| CCP-3-1 | 8.50% | Clearing point [° C.]: | 111.5 |
| CCP-V-1 | 10.00% | Δn [589 nm, 20° C.]: | 0.1024 |
| CCY-3-1 | 5.00% | $\varepsilon_{\parallel}$ [1 kHz, 20° C.]: | 3.7 |
| CCY-3-O1 | 5.00% | $\varepsilon_{\perp}$ [1 kHz, 20° C.]: | 8.4 |
| CCY-3-O2 | 10.00% | Δε [1 kHz, 20° C.]: | −4.7 |
| CCY-3-O3 | 10.00% | $K_1$ [pN, 20° C.]: | 22.0 |
| CCY-5-O2 | 8.00% | $K_3$ [pN, 20° C.]: | 20.0 |
| CLY-3-O3 | 1.00% | $V_0$ [pN, 20° C.]: | 2.17 |
| B(S)-2O-O4 | 4.00% | $\gamma_1$ [mPa s, 20° C.]: | 190 |
| B(S)-2O-O5 | 5.00% | | |

-continued

| | |
|---|---|
| B(S)-2O-O6 | 3.00% |
| CCH-34 | 5.00% |
| CC-4-V1 | 18.00% |
| Y-4O-O4 | 7.50% |

Example M120

| | | | |
|---|---|---|---|
| CCP-V-1 | 10.00% | Clearing point [° C.]: | 11.5 |
| CCY-3-1 | 7.00% | Δn [589 nm, 20° C.]: | 0.1018 |
| CCY-3-O1 | 7.00% | $\varepsilon_{\parallel}$ [1 kHz, 20° C.]: | 3.7 |
| CCY-3-O2 | 9.00% | $\varepsilon_{\perp}$ [1 kHz, 20° C.]: | 8.6 |
| CCY-3-O3 | 9.00% | Δε [1 kHz, 20° C.]: | −5.0 |
| CCY-5-O2 | 8.00% | $K_1$ [pN, 20° C.]: | 22.2 |
| CLY-3-O3 | 5.00% | $K_3$ [pN, 20° C.]: | 19.7 |
| B(S)-2O-O4 | 4.00% | $V_0$ [pN, 20° C.]: | 2.11 |
| B(S)-2O-O5 | 5.00% | $\gamma_1$ [mPa s, 20° C.]: | 192 |
| B(S)-2O-O6 | 3.00% | | |
| CCH-34 | 5.00% | | |
| CC-4-V1 | 22.00% | | |
| Y-4O-O4 | 6.00% | | |

Example M121

| | | | |
|---|---|---|---|
| CCP-3-1 | 10.00% | Clearing point [° C.]: | 85 |
| CCP-V-1 | 10.00% | Δn [589 nm, 20° C.]: | 0.1033 |
| CCY-3-O1 | 5.00% | $\varepsilon_{\parallel}$ [1 kHz, 20° C.]: | 3.9 |
| CCY-3-O2 | 5.00% | $\varepsilon_{\perp}$ [1 kHz, 20° C.]: | 8.2 |
| CLY-2-O4 | 2.00% | Δε [1 kHz, 20° C.]: | −4.3 |
| CLY-5-O2 | 1.50% | $K_1$ [pN, 20° C.]: | 16.6 |
| CPY-3-O2 | 7.50% | $K_3$ [pN, 20° C.]: | 16.7 |
| B(S)-2O-O4 | 4.00% | $V_0$ [pN, 20° C.]: | 2.07 |
| B(S)-2O-O5 | 5.00% | $\gamma_1$ [mPa s, 20° C.]: | 119 |
| B(S)-2O-O6 | 3.00% | | |
| CC-3-V1 | 7.00% | | |
| CC-4-V1 | 18.00% | | |
| CCH-34 | 3.50% | | |
| CY-3-O2 | 10.00% | | |
| Y-4O-O4 | 8.50% | | |

Example M122

| | | | |
|---|---|---|---|
| CCP-V-1 | 8.50% | Clearing point [° C.]: | 85 |
| CCY-2-1 | 5.00% | Δn [589 nm, 20° C.]: | 0.1030 |
| CCY-3-1 | 5.00% | $\varepsilon_{\parallel}$ [1 kHz, 20° C.]: | 3.9 |
| CCY-3-O1 | 4.50% | $\varepsilon_{\perp}$ [1 kHz, 20° C.]: | 8.2 |
| CLY-3-O2 | 9.00% | Δε [1 kHz, 20° C.]: | −4.4 |
| CLY-2-O4 | 9.00% | $K_1$ [pN, 20° C.]: | 18.1 |
| PYP-2-3 | 5.00% | $K_3$ [pN, 20° C.]: | 15.2 |
| B(S)-2O-O4 | 4.00% | $V_0$ [pN, 20° C.]: | 1.97 |
| B(S)-2O-O5 | 5.00% | $\gamma_1$ [mPa s, 20° C.]: | 121 |
| B(S)-2O-O6 | 3.00% | | |
| CC-3-V1 | 7.00% | | |
| CC-4-V1 | 15.00% | | |
| CCH-34 | 5.00% | | |
| CCH-35 | 5.00% | | |
| Y-4O-O4 | 10.00% | | |

Example M123

| | | | |
|---|---|---|---|
| BCH-32 | 5.50% | Clearing point [° C.]: | 74.5 |
| CC-3-V1 | 7.00% | Δn [589 nm, 20° C.]: | 0.1087 |
| CC-4-V1 | 14.00% | $\varepsilon_{\parallel}$ [1 kHz, 20° C.]: | 3.5 |
| CC-2V-V2 | 14.00% | $\varepsilon_{\perp}$[1 kHz, 20° C.]: | 6.6 |
| CCP-3-1 | 7.50% | Δε [1 kHz, 20° C.]: | −3.0 |
| CCY-3-O2 | 8.50% | $K_1$ [pN, 20° C.]: | 14.8 |
| CLY-3-O2 | 1.00% | $K_3$ [pN, 20° C.]: | 16.1 |
| CPY-3-O2 | 8.50% | $V_0$ [pN, 20° C.]: | 2.43 |
| CY-3-O2 | 15.50% | $\gamma_1$ [mPa s, 20° C.]: | 102 |
| PY-3-O2 | 18.50% | | |

Example M124

| | | | |
|---|---|---|---|
| BCH-32 | 5.50% | Clearing point [° C.]: | 74.5 |
| CC-3-V1 | 7.00% | Δn [589 nm, 20° C.]: | 0.1091 |
| CC-4-V1 | 14.00% | $\varepsilon_{\parallel}$ [1 kHz, 20° C.]: | 3.7 |
| CC-2V-V2 | 14.00% | $\varepsilon_{\perp}$ [1 kHz, 20° C.]: | 7.0 |
| CCP-3-1 | 5.00% | Δε [1 kHz, 20° C.]: | −3.3 |
| CCY-3-O2 | 12.00% | $K_1$ [pN, 20° C.]: | 14.2 |
| CLY-3-O2 | 1.00% | $K_3$ [pN, 20° C.]: | 15.8 |
| CPY-3-O2 | 8.50% | $V_0$ [pN, 20° C.]: | 2.31 |
| CY-3-O2 | 14.50% | $\gamma_1$ [mPa s, 20° C.]: | 100 |
| PY-1-O2 | 9.50% | | |
| PY-2-O2 | 9.00% | | |

Example M125

| | | | |
|---|---|---|---|
| BCH-32 | 2.00% | Clearing point [° C.]: | 75 |
| CC-3-V1 | 7.00% | Δn [589 nm, 20° C.]: | 0.1095 |
| CC-4-V1 | 14.00% | $\varepsilon_{\parallel}$ [1 kHz, 20° C.]: | 3.7 |
| CC-2V-V2 | 14.00% | $\varepsilon_{\perp}$ [1 kHz, 20° C.]: | 7.3 |
| CCP-3-1 | 5.00% | Δε [1 kHz, 20° C.]: | −3.6 |
| CCY-3-O2 | 12.00% | $K_1$ [pN, 20° C.]: | 14.3 |
| CLY-3-O2 | 1.00% | $K_3$ [pN, 20° C.]: | 16.3 |
| CPY-3-O2 | 12.00% | $V_0$ [pN, 20° C.]: | 2.24 |
| CY-3-O2 | 14.50% | $\gamma_1$ [mPa s, 20° C.]: | 107 |
| PY-1-O2 | 9.50% | | |
| PY-2-O2 | 9.00% | | |

Example M126

| | | | |
|---|---|---|---|
| BCH-32 | 1.00% | Clearing point [° C.]: | 74.50 |
| CCP-V2-1 | 3.00% | Δn [589 nm, 20° C.]: | 0.1076 |
| CCY-3-O2 | 11.50% | $\varepsilon_{\parallel}$ [1 kHz, 20° C.]: | 3.6 |
| CLY-3-O2 | 1.00% | $\varepsilon_{\perp}$[1 kHz, 20° C.]: | 6.9 |
| CPY-3-O2 | 12.00% | Δε [1 kHz, 20° C.]: | −3.3 |
| CC-3-V1 | 11.00% | $K_1$ [pN, 20° C.]: | 15.7 |
| CCH-34 | 8.00% | $K_3$ [pN, 20° C.]: | 16.7 |
| CCH-35 | 5.00% | $V_0$ [pN, 20° C.]: | 2.36 |
| CY-3-O2 | 6.50% | $\gamma_1$ [mPa s, 20° C.]: | 102 |
| PY-3-O2 | 9.50% | | |
| PY-1-O2 | 9.00% | | |
| PY-2-O2 | 7.00% | | |
| CC-4-V1 | 17.00% | | |

Example M127

| | | | |
|---|---|---|---|
| BCH-32 | 2.50% | Clearing point [° C.]: | 73.40 |
| CCP-V2-1 | 4.00% | Δn [589 nm, 20° C.]: | 0.1063 |
| CCY-3-O2 | 11.50% | $\varepsilon_{\parallel}$ [1 kHz, 20° C.]: | 3.5 |
| CLY-3-O2 | 1.00% | $\varepsilon_{\perp}$ [1 kHz, 20° C.]: | 6.7 |
| CPY-3-O2 | 12.00% | Δε [1 kHz, 20° C.]: | −3.2 |
| CC-3-V1 | 11.00% | $K_1$ [pN, 20° C.]: | 14.8 |
| CCH-24 | 8.00% | $K_3$ [pN, 20° C.]: | 15.9 |
| CCH-35 | 4.00% | $V_0$ [pN, 20° C.]: | 2.36 |
| CY-3-O2 | 6.50% | $\gamma_1$ [mPa s, 20° C.]: | 102 |
| PY-3-O2 | 8.00% | | |
| PY-1-O2 | 7.50% | | |
| PY-2-O2 | 7.00% | | |
| CC-4-V1 | 17.00% | | |

Example M128

| | | | |
|---|---|---|---|
| CCP-3-1 | 5.00% | Clearing point [° C.]: | 87 |
| CCP-V-1 | 6.00% | Δn [589 nm, 20° C.]: | 0.1022 |
| CLY-2-O4 | 2.00% | $\varepsilon_{\parallel}$ [1 kHz, 20° C.]: | 3.7 |
| CLY-3-O2 | 8.00% | $\varepsilon_{\perp}$[1 kHz, 20° C.]: | 8.0 |
| CLY-3-O3 | 5.00% | Δε [1 kHz, 20° C.]: | −4.3 |
| CLY-4-O2 | 5.00% | $K_1$ [pN, 20° C.]: | 18.6 |
| CLY-5-O2 | 3.00% | $K_3$ [pN, 20° C.]: | 16.4 |
| CPY-3-O2 | 6.50% | $V_0$ [pN, 20° C.]: | 2.06 |
| B(S)-2O-O4 | 4.00% | $\gamma_1$ [mPa s, 20° C.]: | 111 |
| B(S)-2O-O5 | 5.00% | | |
| B(S)-2O-O6 | 3.00% | | |
| CC-3-V1 | 8.00% | | |
| CC-4-V1 | 20.00% | | |
| CCH-23 | 9.50% | | |
| Y-4O-O4 | 10.00% | | |

Example M129

| | | | |
|---|---|---|---|
| CCP-3-1 | 7.00% | Clearing point [° C.]: | 84 |
| CCP-V-1 | 4.00% | Δn [589 nm, 20° C.]: | 0.1016 |
| CLY-2-O4 | 2.00% | $\varepsilon_{\parallel}$ [1 kHz, 20° C.]: | 3.8 |
| CLY-3-O2 | 8.00% | $\varepsilon_{\perp}$ [1 kHz, 20° C.]: | 8.0 |
| CLY-3-O3 | 5.00% | Δε [1 kHz, 20° C.]: | −4.3 |
| CLY-4-O2 | 5.00% | $K_1$ [pN, 20° C.]: | 18.0 |
| CLY-5-O2 | 3.00% | $K_3$ [pN, 20° C.]: | 16.5 |
| CPY-3-O2 | 6.50% | $V_0$ [pN, 20° C.]: | 2.08 |
| B(S)-2O-O4 | 4.00% | $\gamma_1$ [mPa s, 20° C.]: | 109 |
| B(S)-2O-O5 | 5.00% | | |
| B(S)-2O-O6 | 3.00% | | |
| CC-3-V1 | 8.00% | | |
| CC-4-V1 | 20.00% | | |
| CCH-13 | 9.50% | | |
| Y-4O-O4 | 10.00% | | |

Example M130

| | | | |
|---|---|---|---|
| BCH-32 | 6.50% | Clearing point [° C.]: | 74.50 |
| CCP-3-1 | 2.00% | Δn [589 nm, 20° C.]: | 0.1080 |
| CCY-3-O2 | 11.00% | $\varepsilon_{\parallel}$ [1 kHz, 20° C.]: | 3.6 |
| CCY-4-O2 | 2.00% | $\varepsilon_{\perp}$[1 kHz, 20° C.]: | 7.1 |
| CPY-3-O2 | 12.00% | Δε [1 kHz, 20° C.]: | −3.5 |
| CCH-34 | 6.00% | $K_1$ [pN, 20° C.]: | 14.6 |
| CCH-35 | 4.50% | $K_3$ [pN, 20° C.]: | 15.7 |
| CC-4-V1 | 19.00% | $V_0$ [pN, 20° C.]: | 2.25 |
| CY-3-O2 | 15.00% | $\gamma_1$ [mPa s, 20° C.]: | 115 |

-continued

| | | | |
|---|---|---|---|
| CY-5-O2 | 1.00% | | |
| PCH-301 | 5.00% | | |
| PY-3-O2 | 16.00% | | |

Example M131

| | | | |
|---|---|---|---|
| CCP-V-1 | 10.50% | Clearing point [° C.]: | 86.5 |
| CLY-2-O4 | 3.00% | Δn [589 nm, 20° C.]: | 0.1019 |
| CLY-3-O2 | 8.00% | $\varepsilon_{\parallel}$ [1 kHz, 20° C.]: | 3.7 |
| CLY-3-O3 | 5.00% | $\varepsilon_{\perp}$ [1 kHz, 20° C.]: | 7.9 |
| CLY-4-O2 | 5.00% | Δε [1 kHz, 20° C.]: | −4.2 |
| CLY-5-O2 | 4.50% | $K_1$ [pN, 20° C.]: | 17.8 |
| B(S)-2O-O4 | 4.00% | $K_3$ [pN, 20° C.]: | 17.1 |
| B(S)-2O-O5 | 4.00% | $V_0$ [pN, 20° C.]: | 2.14 |
| B(S)-2O-O6 | 3.00% | $\gamma_1$ [mPa s, 20° C.]: | 106 |
| CC-3-V1 | 8.00% | | |
| CC-4-V1 | 16.00% | | |
| CC-1V-V2 | 15.00% | | |
| CY-3-O2 | 5.00% | | |
| Y-4O-O4 | 9.00% | | |

Example M132

| | | | |
|---|---|---|---|
| CCP-V-1 | 8.50% | Clearing point [° C.]: | 90 |
| CCY-3-O2 | 5.00% | Δn [589 nm, 20° C.]: | 0.1013 |
| CLY-2-O4 | 3.50% | $\varepsilon_{\parallel}$ [1 kHz, 20° C.]: | 3.7 |
| CLY-3-O2 | 8.00% | $\varepsilon_{\perp}$[1 kHz, 20° C.]: | 8.2 |
| CLY-3-O3 | 5.00% | Δε [1 kHz, 20° C.]: | −4.4 |
| CLY-4-O2 | 5.00% | $K_1$ [pN, 20° C.]: | 18.8 |
| CLY-5-O2 | 5.00% | $K_3$ [pN, 20° C.]: | 16.6 |
| B(S)-2O-O4 | 3.00% | $V_0$ [pN, 20° C.]: | 2.04 |
| B(S)-2O-O5 | 4.00% | $\gamma_1$ [mPa s, 20° C.]: | 115 |
| B(S)-2O-O6 | 3.00% | | |
| CC-3-V1 | 8.00% | | |
| CC-4-V1 | 15.00% | | |
| CC-2V-V2 | 14.00% | | |
| CY-3-O2 | 4.00% | | |
| Y-4O-O4 | 9.00% | | |

Example M133

| | | | |
|---|---|---|---|
| BCH-32 | 4.50% | Clearing point [° C.]: | 74 |
| CCP-V2-1 | 1.50% | Δn [589 nm, 20° C.]: | 0.1068 |
| CCY-3-O2 | 11.00% | $\varepsilon_{\parallel}$ [1 kHz, 20° C.]: | 3.5 |
| CLY-3-O2 | 1.00% | $\varepsilon_{\perp}$ [1 kHz, 20° C.]: | 6.8 |
| CPY-3-O2 | 12.00% | Δε [1 kHz, 20° C.]: | −3.2 |
| CC-3-V1 | 11.00% | $K_1$ [pN, 20° C.]: | 15.2 |
| CY-3-O2 | 9.00% | $K_3$ [pN, 20° C.]: | 16.3 |
| PY-3-O2 | 7.00% | $V_0$ [pN, 20° C.]: | 2.37 |
| PY-1-O2 | 8.00% | $\gamma_1$ [mPa s, 20° C.]: | 103 |
| PY-2-O2 | 6.00% | | |
| CC-4-V1 | 17.00% | | |
| CCH-25 | 8.00% | | |
| CCH-35 | 4.00% | | |

Example M134

| | | | |
|---|---|---|---|
| CLP-V-1 | 9.00% | Clearing point [° C.]: | 84 |
| CCP-V-1 | 2.00% | Δn [589 nm, 20° C.]: | 0.1050 |
| CLY-2-O4 | 2.00% | $\varepsilon_{\parallel}$ [1 kHz, 20° C.]: | 3.7 |

-continued

| | | | |
|---|---|---|---|
| CLY-3-O2 | 8.00% | $\varepsilon_\perp$[1 kHz, 20° C.]: | 8.0 |
| CLY-3-O3 | 5.00% | Δε [1 kHz, 20° C.]: | −4.2 |
| CLY-4-O2 | 5.00% | $K_1$ [pN, 20° C.]: | 18.7 |
| CLY-5-O2 | 3.00% | $K_3$ [pN, 20° C.]: | 16.3 |
| CPY-3-O2 | 6.00% | $V_0$ [pN, 20° C.]: | 2.07 |
| B(S)-2O-O4 | 4.00% | | |
| B(S)-2O-O5 | 5.00% | | |
| B(S)-2O-O6 | 3.00% | | |
| CC-3-V1 | 8.50% | | |
| CC-4-V1 | 20.00% | | |
| CCH-13 | 9.50% | | |
| Y-4O-O4 | 10.00% | | |

Example M135

| | | | |
|---|---|---|---|
| CLP-1V-1 | 7.00% | Clearing point [° C.]: | 85 |
| CCP-V-1 | 2.00% | $\varepsilon_\parallel$ [1 kHz, 20° C.]: | 3.7 |
| CLY-2-O4 | 2.50% | $\varepsilon_\perp$ [1 kHz, 20° C.]: | 8.0 |
| CLY-3-O2 | 8.00% | Δε [1 kHz, 20° C.]: | −4.3 |
| CLY-3-O3 | 5.00% | $K_1$ [pN, 20° C.]: | 18.9 |
| CLY-4-O2 | 5.00% | $K_3$ [pN, 20° C.]: | 17.5 |
| CLY-5-O2 | 3.00% | $V_0$ [pN, 20° C.]: | 2.13 |
| CPY-3-O2 | 6.00% | | |
| B(S)-2O-O4 | 4.00% | | |
| B(S)-2O-O5 | 5.00% | | |
| B(S)-2O-O6 | 3.00% | | |
| CC-3-V1 | 10.00% | | |
| CC-4-V1 | 20.00% | | |
| CCH-13 | 9.50% | | |
| Y-4O-O4 | 10.00% | | |

Example M136

| | | | |
|---|---|---|---|
| CC-3-V1 | 7.50% | Clearing point [° C.]: | 74.5 |
| CC-4-V1 | 11.00% | Δn [589 nm, 20° C.]: | 0.0982 |
| CCH-301 | 16.00% | $\varepsilon_\parallel$ [1 kHz, 20° C.]: | 3.7 |
| CCH-24 | 6.00% | $\varepsilon_\perp$[1 kHz, 20° C.]: | 6.9 |
| CCP-V2-1 | 7.00% | Δε [1 kHz, 20° C.]: | −3.3 |
| CCY-3-O1 | 7.00% | $K_1$ [pN, 20° C.]: | 13.6 |
| CCY-3-O2 | 11.00% | $K_3$ [pN, 20° C.]: | 15.3 |
| CPY-3-O2 | 12.00% | $V_0$ [pN, 20° C.]: | 2.29 |
| CY-3-O2 | 5.50% | $\gamma_1$ [mPa s, 20° C.]: | 102 |
| PY-1-O2 | 9.00% | LTS bulk [−20° C.]: | >1000 h |
| PY-2-O2 | 8.00% | | |

Example M137

| | | | |
|---|---|---|---|
| CC-3-V1 | 7.00% | Clearing point [° C.]: | 74 |
| CC-4-V1 | 17.00% | Δn [589 nm, 20° C.]: | 0.0979 |
| CCH-301 | 12.00% | $\varepsilon_\parallel$ [1 kHz, 20° C.]: | 3.6 |
| CCH-24 | 6.00% | $\varepsilon_\perp$ [1 kHz, 20° C.]: | 6.7 |
| CCP-V2-1 | 7.00% | Δε [1 kHz, 20° C.]: | −3.1 |
| CCY-3-O1 | 8.00% | $K_1$ [pN, 20° C.]: | 14.0 |
| CCY-3-O2 | 12.00% | $K_3$ [pN, 20° C.]: | 15.3 |
| CPY-3-O2 | 7.50% | $V_0$ [pN, 20° C.]: | 2.35 |
| CY-3-O2 | 2.50% | $\gamma_1$ [mPa s, 20° C.]: | 97 |
| PY-3-O2 | 5.00% | LTS bulk [−20° C.]: | >1000 h |
| PY-1-O2 | 9.00% | LTS bulk [−30° C.]: | >1000 h |
| PY-2-O2 | 7.00% | | |

Example M138

| | | | |
|---|---|---|---|
| CC-3-V1 | 7.50% | Clearing point [° C.]: | 73.5 |
| CC-4-V1 | 23.00% | Δn [589 nm, 20° C.]: | 0.0982 |
| CCH-24 | 7.50% | $\varepsilon_\parallel$ [1 kHz, 20° C.]: | 3.6 |
| CCP-3-1 | 6.00% | $\varepsilon_\perp$[1 kHz, 20° C.]: | 6.9 |
| CCY-3-O1 | 7.50% | Δε [1 kHz, 20° C.]: | −3.4 |
| CCY-3-O2 | 11.50% | $K_1$ [pN, 20° C.]: | 14.3 |
| CPY-3-O2 | 7.50% | $K_3$ [pN, 20° C.]: | 15.7 |
| CY-3-O2 | 12.50% | $V_0$ [pN, 20° C.]: | 2.28 |
| PY-3-O2 | 3.00% | $\gamma_1$ [mPa s, 20° C.]: | 103 |
| PY-1-O2 | 7.00% | LTS bulk [−20° C.]: | >1000 h |
| PY-2-O2 | 7.00% | LTS bulk [−25° C.]: | >1000 h |

Example M139

| | | | |
|---|---|---|---|
| BCH-32 | 8.00% | Clearing point [° C.]: | 75 |
| CCH-23 | 14.00% | Δn [589 nm, 20° C.]: | 0.1158 |
| CC-4-V1 | 16.00% | $\varepsilon_\parallel$ [1 kHz, 20° C.]: | 3.6 |
| CCP-3-1 | 5.00% | $\varepsilon_\perp$ [1 kHz, 20° C.]: | 6.6 |
| CPY-2-O2 | 12.00% | Δε [1 kHz, 20° C.]: | −3.0 |
| CPY-3-O2 | 12.00% | $K_1$ [pN, 20° C.]: | 13.4 |
| CY-3-O2 | 14.00% | $K_3$ [pN, 20° C.]: | 14.4 |
| PCH-301 | 5.50% | $V_0$ [pN, 20° C.]: | 2.31 |
| PY-1-O2 | 9.00% | $\gamma_1$ [mPa s, 20° C.]: | 107 |
| PGIY-2-O4 | 4.50% | LTS bulk [−20° C.]: | >1000 h |

Example M140

| | | | |
|---|---|---|---|
| BCH-32 | 8.00% | Clearing point [° C.]: | 75 |
| CCH-23 | 16.50% | Δn [589 nm, 20° C.]: | 0.1161 |
| CC-4-V1 | 12.50% | $\varepsilon_\parallel$ [1 kHz, 20° C.]: | 3.6 |
| CCP-3-1 | 5.50% | $\varepsilon_\perp$[1 kHz, 20° C.]: | 6.6 |
| CLY-3-O2 | 2.00% | Δε [1 kHz, 20° C.]: | −3.0 |
| CPY-2-O2 | 11.00% | $K_1$ [pN, 20° C.]: | 13.4 |
| CPY-3-O2 | 11.00% | $K_3$ [pN, 20° C.]: | 14.4 |
| CY-3-O2 | 13.00% | $V_0$ [pN, 20° C.]: | 2.30 |
| PCH-301 | 6.00% | $\gamma_1$ [mPa s, 20° C.]: | 107 |
| PY-1-O2 | 9.50% | LTS bulk [−20° C.]: | >1000 h |
| PGIY-2-O4 | 5.00% | | |

Example M141

| | | | |
|---|---|---|---|
| CC-3-V1 | 7.50% | Clearing point [° C.]: | 75.5 |
| CC-4-V1 | 19.00% | Δn [589 nm, 20° C.]: | 0.0983 |
| CCH-24 | 8.00% | $\varepsilon_\parallel$ [1 kHz, 20° C.]: | 3.5 |
| CCH-25 | 7.00% | $\varepsilon_\perp$[1 kHz, 20° C.]: | 6.7 |
| CCP-V2-1 | 4.00% | Δε [1 kHz, 20° C.]: | −3.2 |
| CCY-3-O1 | 7.50% | $K_1$ [pN, 20° C.]: | 14.6 |
| CCY-3-O2 | 11.00% | $K_3$ [pN, 20° C.]: | 15.1 |
| CPY-3-O2 | 10.00% | $V_0$ [pN, 20° C.]: | 2.30 |
| CY-3-O2 | 8.00% | $\gamma_1$ [mPa s, 20° C.]: | 98 |
| PY-3-O2 | 4.00% | | |
| PY-1-O2 | 7.00% | | |
| PY-2-O2 | 7.00% | | |

Example M142

| | | | |
|---|---|---|---|
| CC-3-V1 | 7.50% | Clearing point [° C.]: | 75 |
| CC-4-V1 | 23.00% | Δn [589 nm, 20° C.]: | 0.0981 |

-continued

| | | | |
|---|---|---|---|
| CCH-24 | 10.00% | $\varepsilon_{\parallel}$ [1 kHz, 20° C.]: | 3.5 |
| CCP-3-1 | 4.00% | $\varepsilon_{\perp}$ [1 kHz, 20° C.]: | 6.8 |
| CCY-3-O1 | 7.50% | $\Delta\varepsilon$ [1 kHz, 20° C.]: | −3.3 |
| CCY-3-O2 | 11.50% | $K_1$ [pN, 20° C.]: | 14.4 |
| CPY-3-O2 | 9.00% | $K_3$ [pN, 20° C.]: | 15.4 |
| CY-3-O2 | 10.50% | $V_0$ [pN, 20° C.]: | 2.29 |
| PY-3-O2 | 4.00% | $\gamma_1$ [mPa s, 20° C.]: | 100 |
| PY-1-O2 | 7.00% | LTS bulk [−20° C.]: | >1000 h |
| PY-2-O2 | 6.00% | | |

Example M143

| | | | |
|---|---|---|---|
| CC-3-V1 | 7.50% | Clearing point [° C.]: | 74 |
| CC-4-V1 | 20.50% | $\Delta n$ [589 nm, 20° C.]: | 0.0977 |
| CCH-24 | 9.00% | $\varepsilon_{\parallel}$ [1 kHz, 20° C.]: | 3.5 |
| CCP-3-1 | 11.50% | $\varepsilon_{\perp}$[1 kHz, 20° C.]: | 6.7 |
| CCY-3-O1 | 6.50% | $\Delta\varepsilon$ [1 kHz, 20° C.]: | −3.2 |
| CCY-3-O2 | 11.00% | $K_1$ [pN, 20° C.]: | 14.9 |
| CY-3-O2 | 13.50% | $K_3$ [pN, 20° C.]: | 15.3 |
| B(S)-2O-O5 | 4.00% | $V_0$ [pN, 20° C.]: | 2.32 |
| B(S)-2O-O4 | 3.00% | $\gamma_1$ [mPa s, 20° C.]: | 92 |
| PP-1-3 | 4.00% | LTS bulk [−20° C.]: | >1000 h |
| PY-1-O2 | 6.50% | | |
| PY-2-O2 | 3.00% | | |

Example M144

| | | | |
|---|---|---|---|
| CC-3-V1 | 7.50% | Clearing point [° C.]: | 74.5 |
| CC-4-V1 | 21.00% | $\Delta n$ [589 nm, 20° C.]: | 0.0971 |
| CCH-24 | 6.50% | $\varepsilon_{\parallel}$ [1 kHz, 20° C.]: | 3.7 |
| CCP-3-1 | 7.50% | $\varepsilon_{\perp}$ [1 kHz, 20° C.]: | 6.6 |
| CCY-3-O1 | 7.50% | $\Delta\varepsilon$ [1 kHz, 20° C.]: | −3.0 |
| CCY-3-O2 | 12.00% | $K_1$ [pN, 20° C.]: | 13.5 |
| CPY-3-O2 | 11.50% | $K_3$ [pN, 20° C.]: | 14.4 |
| CY-3-S2 | 16.00% | $V_0$ [pN, 20° C.]: | 2.31 |
| PY-1-O2 | 6.50% | $\gamma_1$ [mPa s, 20° C.]: | 109 |
| PY-2-O2 | 4.00% | LTS bulk [−20° C.]: | >1000 h |

Example M145

| | | | |
|---|---|---|---|
| B(S)-2O-O4 | 4.00% | Clearing point [° C.]: | 74.3 |
| CC-3-V1 | 6.00% | $\Delta n$ [589 nm, 20° C.]: | 0.1020 |
| CC-4-V1 | 18.00% | $\varepsilon_{\parallel}$ [1 kHz, 20° C.]: | 3.6 |
| CCH-34 | 7.00% | $\varepsilon_{\perp}$ [1 kHz, 20° C.]: | 6.9 |
| CCH-35 | 8.50% | $\Delta\varepsilon$ [1 kHz, 20° C.]: | −3.3 |
| CCY-3-O2 | 10.50% | $K_1$ [pN, 20° C.]: | 14.4 |
| CCY-4-O2 | 5.50% | $K_3$ [pN, 20° C.]: | 15.6 |
| CLY-3-O2 | 1.00% | $V_0$ [pN, 20° C.]: | 2.27 |
| CPY-3-O2 | 9.50% | $\gamma_1$ [mPa s, 20° C.]: | 101 |
| CY-3-O2 | 5.50% | | |
| PCH-301 | 8.50% | | |
| PY-1-O2 | 8.00% | | |
| PY-2-O2 | 8.00% | | |

Example M146

For the preparation of a PS (polymer stabilised) mixture, for example for PS-VA, PS-IPS or PS-FFS displays, the mixture according to Example M145 is mixed with 0.35% of the polymerisable compound of the formula

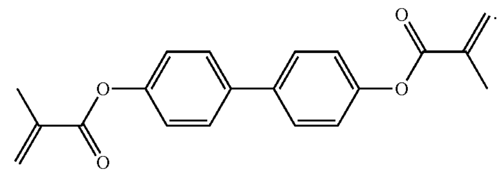

Example M147

For the preparation of a PS (polymer stabilised) mixture, for example for PS-VA, PS-IPS or PS-FFS displays, the mixture according to Example M1 is mixed with 0.25% of the polymerisable compound of the formula

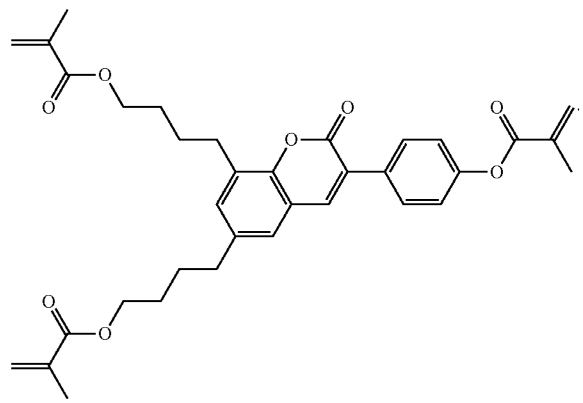 [SMILES: C=C(C)C(=O)OCCCCc1cc(CCCCOC(=O)C(=C)C)c2oc(=O)c(-c3ccc(OC(=O)C(=C)C)cc3)cc2c1]

Example M148

For the preparation of a PS (polymer stabilised) mixture, for example for PS-VA, PS-IPS or PS-FFS displays, the mixture according to Example M2 is mixed with 0.2% of the polymerisable compound of the formula

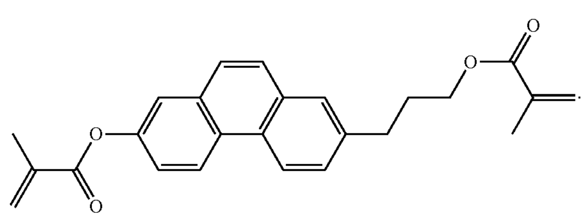 [SMILES: C=C(C)C(=O)OCCCc1ccc2c(ccc3cc(OC(=O)C(=C)C)ccc32)c1]

Example M149

For the preparation of a PS (polymer stabilised) mixture, for example for PS-VA, PS-IPS or PS-FFS displays, the mixture according to Example M5 is mixed with 0.25% of the polymerisable compound of the formula

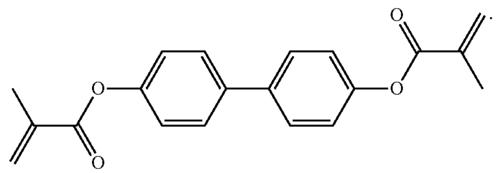

Example M150

For the preparation of a PS (polymer stabilised) mixture, for example for PS-VA, PS-IPS or PS-FFS displays, the mixture according to Example M11 is mixed with 0.25% of the polymerisable compound of the formula

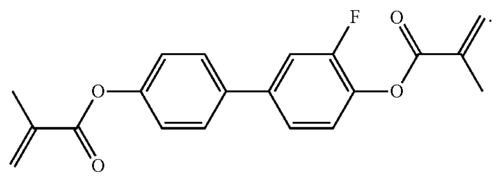

Example M151

For the preparation of a PS (polymer stabilised) mixture, for example for PS-VA, PS-IPS or PS-FFS displays, the mixture according to Example M17 is mixed with 0.25% of the polymerisable compound of the formula

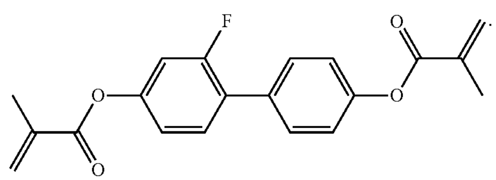 [SMILES: C=C(C)C(=O)Oc1ccc(-c2ccc(OC(=O)C(=C)C)cc2F)cc1]

Example M152

For the preparation of a PS (polymer stabilised) mixture, for example for PS-VA, PS-IPS or PS-FFS displays, the mixture according to Example M18 is mixed with 0.2% of the polymerisable compound of the formula

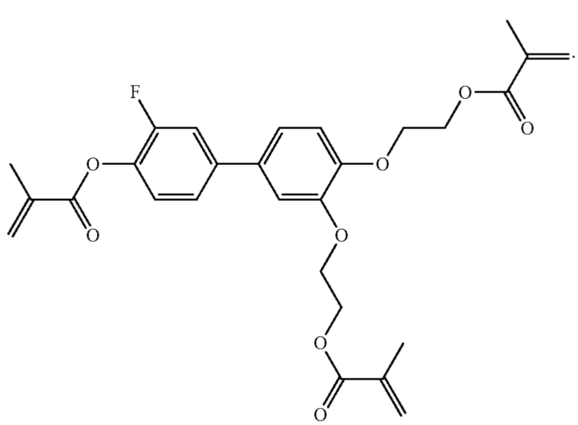 [SMILES: C=C(C)C(=O)OCCOc1ccc(-c2ccc(OC(=O)C(=C)C)c(F)c2)cc1OCCOC(=O)C(=C)C]

Example M153

For the preparation of a PS (polymer stabilised) mixture, for example for PS-VA, PS-IPS or PS-FFS displays, the mixture according to Example M19 is mixed with 0.2% of the polymerisable compound of the formula

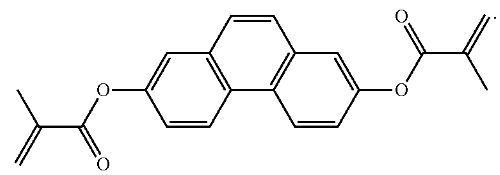 [SMILES: C=C(C)C(=O)Oc1ccc2c(ccc3cc(OC(=O)C(=C)C)ccc32)c1]

Example M154

For the preparation of a PS (polymer stabilised) mixture, for example for PS-VA, PS-IPS or PS-FFS displays, the mixture according to Example M20 is mixed with 0.25% of the polymerisable compound of the formula

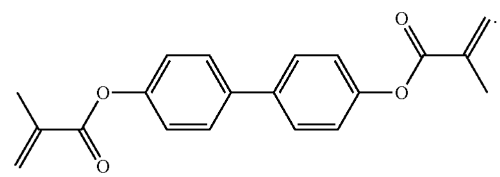

Example M155

For the preparation of a PS (polymer stabilised) mixture, for example for PS-VA, PS-IPS or PS-FFS displays, the mixture according to Example M21 is mixed with 0.3% of the polymerisable compound of the formula

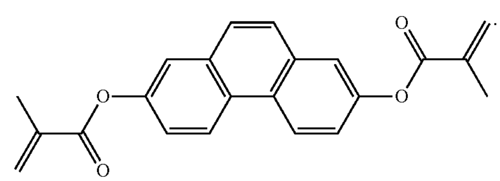 [SMILES: C=C(C)C(=O)Oc1ccc2c(ccc3cc(OC(=O)C(=C)C)ccc32)c1]

Example M156

For the preparation of a PS (polymer stabilised) mixture, for example for PS-VA, PS-IPS or PS-FFS displays, the mixture according to Example M21 is mixed with 0.3% of the polymerisable compound of the formula

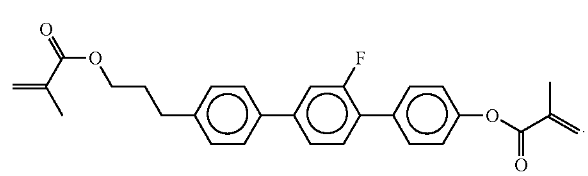

Example M157

For the preparation of a PS (polymer stabilised) mixture, for example for PS-VA, PS-IPS or PS-FFS displays, the mixture according to Example M22 is mixed with 0.25% of the polymerisable compound of the formula

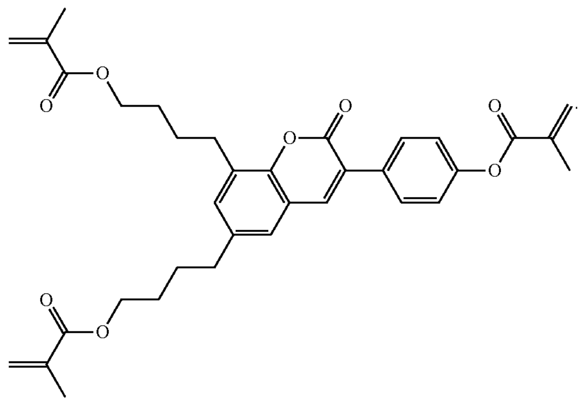 [SMILES: C=C(C)C(=O)OCCCCc1cc(CCCCOC(=O)C(=C)C)c2oc(=O)c(-c3ccc(OC(=O)C(=C)C)cc3)cc2c1]

Example M158

For the preparation of a PS (polymer stabilised) mixture, for example for PS-VA, PS-IPS or PS-FFS displays, the mixture according to Example M22 is mixed with 0.3% of the polymerisable compound of the formula

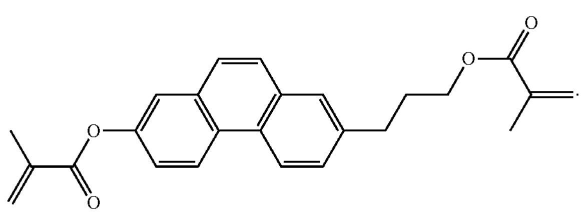 [SMILES: C=C(C)C(=O)OCCCc1ccc2c(ccc3cc(OC(=O)C(=C)C)ccc32)c1]

Example M159

For the preparation of a PS (polymer stabilised) mixture, for example for PS-VA, PS-IPS or PS-FFS displays, the mixture according to Example M22 is mixed with 0.3% of the polymerisable compound of the formula

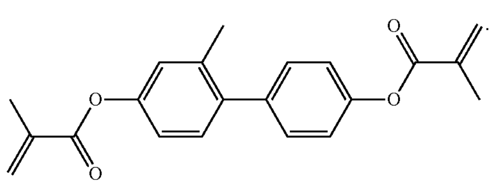

Example M160

For the preparation of a PS (polymer stabilised) mixture, for example for PS-VA, PS-IPS or PS-FFS displays, the mixture according to Example M23 is mixed with 0.25% of the polymerisable compound of the formula

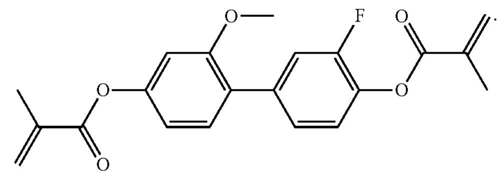 [SMILES: C=C(C)C(=O)Oc1ccc(-c2ccc(OC(=O)C(=C)C)c(F)c2)c(OC)c1]

Example M161

For the preparation of a PS (polymer stabilised) mixture, for example for PS-VA, PS-IPS or PS-FFS displays, the mixture according to Example M25 is mixed with 0.3% of the polymerisable compound of the formula

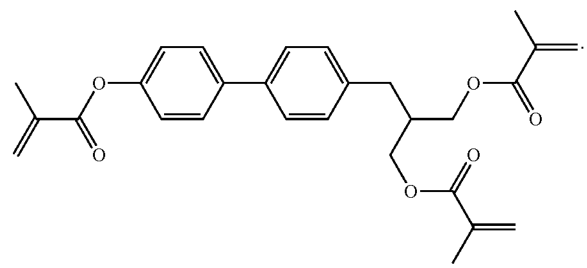 [SMILES: C=C(C)C(=O)OCC(COC(=O)C(=C)C)Cc1ccc(-c2ccc(OC(=O)C(=C)C)cc2)cc1]

Example M162

For the preparation of a PS (polymer stabilised) mixture, for example for PS-VA, PS-IPS or PS-FFS displays, the mixture according to Example M30 is mixed with 0.25% of the polymerisable compound of the formula

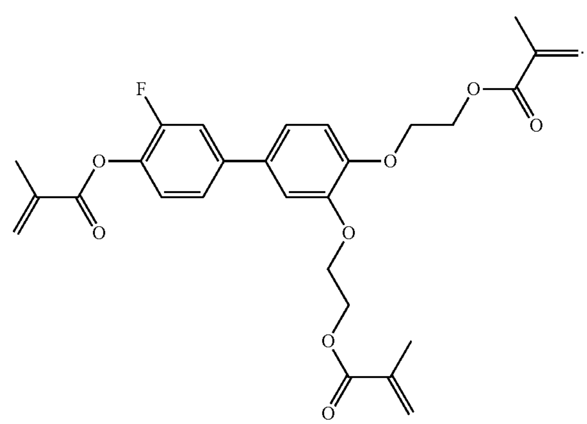 [SMILES: C=C(C)C(=O)OCCOc1ccc(-c2ccc(OC(=O)C(=C)C)c(F)c2)cc1OCCOC(=O)C(=C)C]

Example M163

For the preparation of a PS (polymer stabilised) mixture, for example for PS-VA, PS-IPS or PS-FFS displays, the mixture according to Example M31 is mixed with 0.2% of the polymerisable compound of the formula

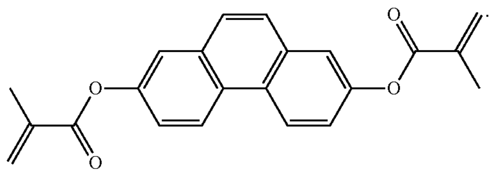 [SMILES: C=C(C)C(=O)Oc1ccc2c(ccc3cc(OC(=O)C(=C)C)ccc32)c1]

Example M164

For the preparation of a PS (polymer stabilised) mixture, for example for PS-VA, PS-IPS or PS-FFS displays, the mixture according to Example M32 is mixed with 0.3% of the polymerisable compound of the formula

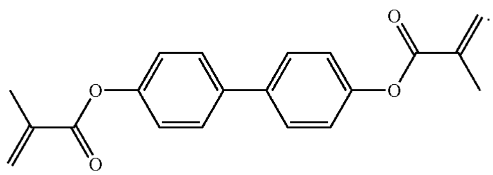 [SMILES: C=C(C)C(=O)Oc1ccc(-c2ccc(OC(=O)C(=C)C)cc2)cc1]

Example M165

For the preparation of a PS (polymer stabilised) mixture, for example for PS-VA, PS-IPS or PS-FFS displays, the mixture according to Example M36 is mixed with 0.3% of the polymerisable compound of the formula

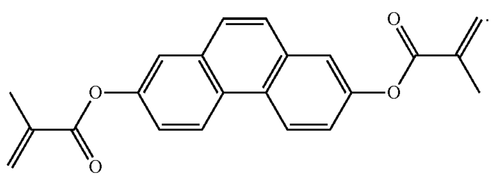 [SMILES: C=C(C)C(=O)Oc1ccc2c(ccc3cc(OC(=O)C(=C)C)ccc32)c1]

Example M166

For the preparation of a PS (polymer stabilised) mixture, for example for PS-VA, PS-IPS or PS-FFS displays, the mixture according to Example M37 is mixed with 0.3% of the polymerisable compound of the formula

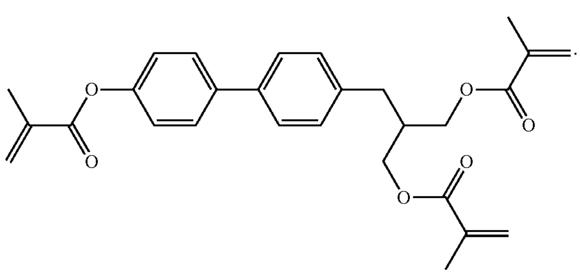 [SMILES: C=C(C)C(=O)OCC(COC(=O)C(=C)C)Cc1ccc(-c2ccc(OC(=O)C(=C)C)cc2)cc1]

Example M167

For the preparation of a PS (polymer stabilised) mixture, for example for PS-VA, PS-IPS or PS-FFS displays, the mixture according to Example M37 is mixed with 0.3% of the polymerisable compound of the formula

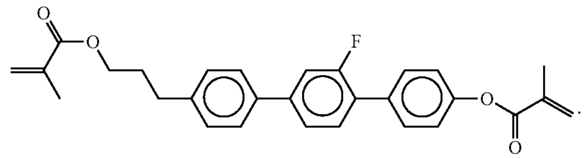

Example M168

For the preparation of a PS (polymer stabilised) mixture, for example for PS-VA, PS-IPS or PS-FFS displays, the mixture according to Example M40 is mixed with 0.3% of the polymerisable compound of the formula

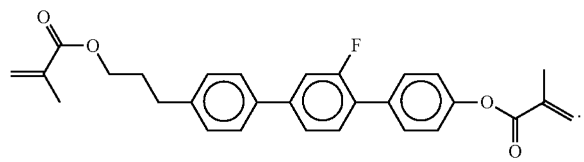

Example M169

For the preparation of a PS (polymer stabilised) mixture, for example for PS-VA, PS-IPS or PS-FFS displays, the mixture according to Example M41 is mixed with 0.25% of the polymerisable compound of the formula

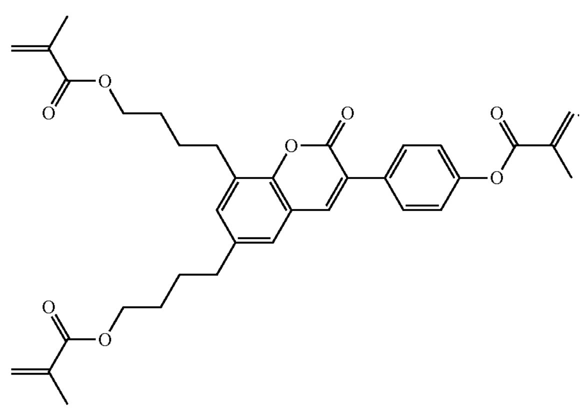 [SMILES: C=C(C)C(=O)OCCCCc1cc(CCCCOC(=O)C(=C)C)c2oc(=O)c(-c3ccc(OC(=O)C(=C)C)cc3)cc2c1]

Example M170

For the preparation of a PS (polymer stabilised) mixture, for example for PS-VA, PS-IPS or PS-FFS displays, the mixture according to Example M44 is mixed with 0.25% of the polymerisable compound of the formula

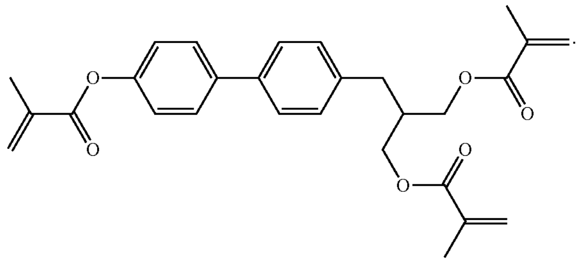 [SMILES: C=C(C)C(=O)OCC(COC(=O)C(=C)C)Cc1ccc(-c2ccc(OC(=O)C(=C)C)cc2)cc1]

Example M171

For the preparation of a PS (polymer stabilised) mixture, for example for PS-VA, PS-IPS or PS-FFS displays, the mixture according to Example M44 is mixed with 0.3% of the polymerisable compound of the formula

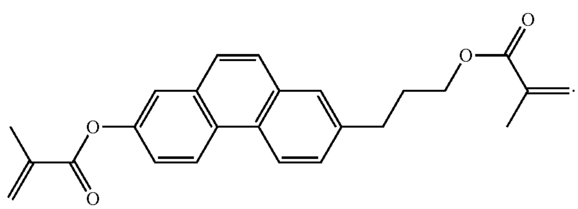 [SMILES: C=C(C)C(=O)OCCCc1ccc2c(ccc3cc(OC(=O)C(=C)C)ccc32)c1]

Example M172

For the preparation of a PS (polymer stabilised) mixture, for example for PS-VA, PS-IPS or PS-FFS displays, the mixture according to Example M52 is mixed with 0.3% of the polymerisable compound of the formula

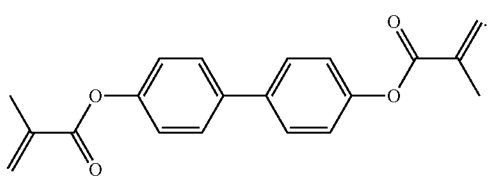

Example M173

For the preparation of a PS (polymer stabilised) mixture, for example for PS-VA, PS-IPS or PS-FFS displays, the mixture according to Example M52 is mixed with 0.3% of the polymerisable compound of the formula

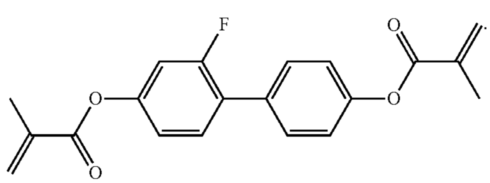

Example M174

For the preparation of a PS (polymer stabilised) mixture, for example for PS-VA, PS-IPS or PS-FFS displays, the mixture according to Example M52 is mixed with 0.3% of the polymerisable compound of the formula

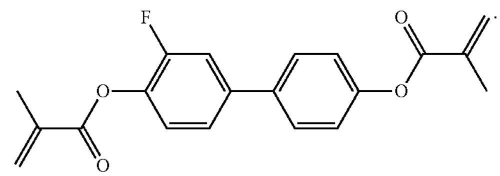 [SMILES: C=C(C)C(=O)Oc1ccc(-c2ccc(OC(=O)C(=C)C)c(F)c2)cc1]

Example M175

For the preparation of a PS (polymer stabilised) mixture, for example for PS-VA, PS-IPS or PS-FFS displays, the mixture according to Example M52 is mixed with 0.3% of the polymerisable compound of the formula

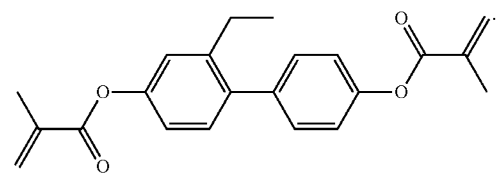

Example M176

For the preparation of a PS (polymer stabilised) mixture, for example for PS-VA, PS-IPS or PS-FFS displays, the mixture according to Example M52 is mixed with 0.3% of the polymerisable compound of the formula

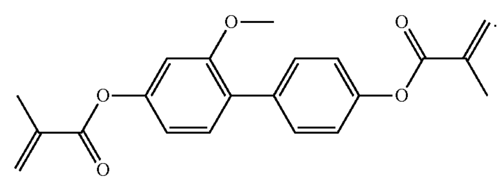 [SMILES: C=C(C)C(=O)Oc1ccc(-c2ccc(OC(=O)C(=C)C)cc2OC)cc1]

Example M177

For the preparation of a PS (polymer stabilised) mixture, for example for PS-VA, PS-IPS or PS-FFS displays, the mixture according to Example M52 is mixed with 0.3% of the polymerisable compound of the formula

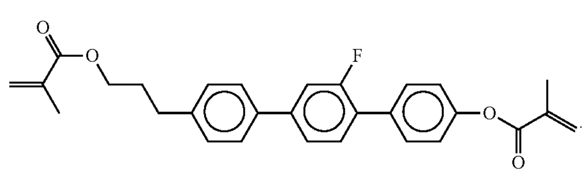

Example M178

For the preparation of a PS (polymer stabilised) mixture, for example for PS-VA, PS-IPS or PS-FFS displays, the mixture according to Example M55 is mixed with 0.25% of the polymerisable compound of the formula

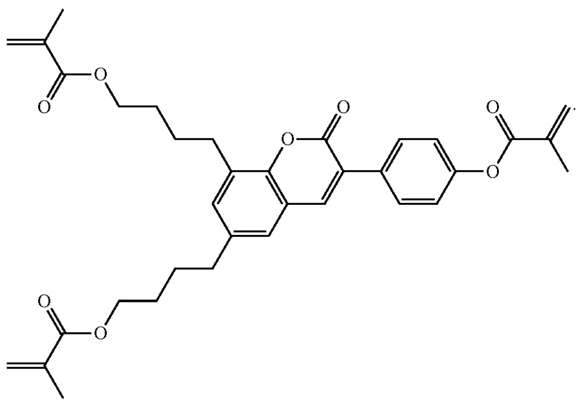 [SMILES: C=C(C)C(=O)OCCCCc1cc(CCCCOC(=O)C(=C)C)c2oc(=O)c(-c3ccc(OC(=O)C(=C)C)cc3)cc2c1]

Example M179

For the preparation of a PS (polymer stabilised) mixture, for example for PS-VA, PS-IPS or PS-FFS displays, the mixture according to Example M58 is mixed with 0.2% of the polymerisable compound of the formula

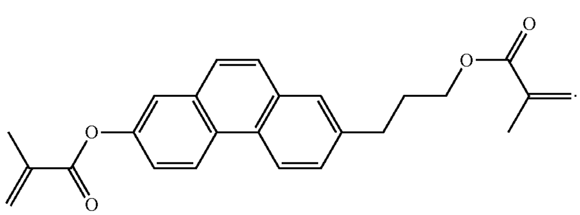 [SMILES: C=C(C)C(=O)OCCCc1ccc2c(ccc3cc(OC(=O)C(=C)C)ccc32)c1]

Example M180

For the preparation of a PS (polymer stabilised) mixture, for example for PS-VA, PS-IPS or PS-FFS displays, the mixture according to Example M89 is mixed with 0.25% of the polymerisable compound of the formula

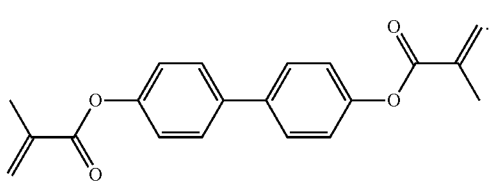

Example M181

For the preparation of a PS (polymer stabilised) mixture, for example for PS-VA, PS-IPS or PS-FFS displays, the mixture according to Example M90 is mixed with 0.25% of the polymerisable compound of the formula

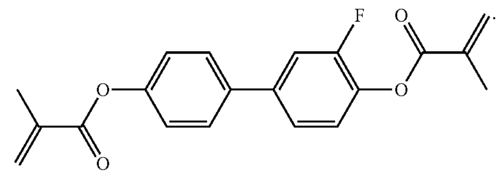 [SMILES: C=C(C)C(=O)Oc1ccc(-c2ccc(OC(=O)C(=C)C)c(F)c2)cc1]

Example M182

For the preparation of a PS (polymer stabilised) mixture, for example for PS-VA, PS-IPS or PS-FFS displays, the mixture according to Example M91 is mixed with 0.25% of the polymerisable compound of the formula

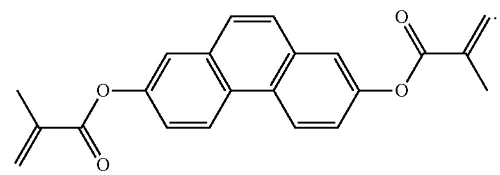 [SMILES: C=C(C)C(=O)Oc1ccc2c(ccc3cc(OC(=O)C(=C)C)ccc32)c1]

Example M183

For the preparation of a PS (polymer stabilised) mixture, for example for PS-VA, PS-IPS or PS-FFS displays, the mixture according to Example M92 is mixed with 0.25% of the polymerisable compound of the formula

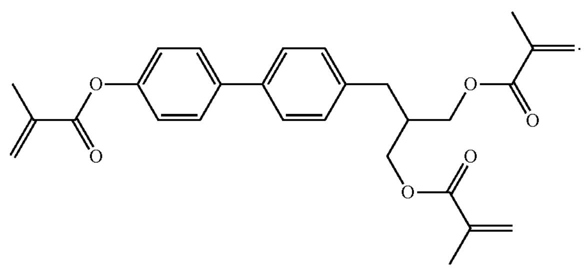 [SMILES: C=C(C)C(=O)OCC(COC(=O)C(=C)C)Cc1ccc(-c2ccc(OC(=O)C(=C)C)cc2)cc1]

Example M184

For the preparation of a PS (polymer stabilised) mixture, for example for PS-VA, PS-IPS or PS-FFS displays, the mixture according to Example M92 is mixed with 0.3% of the polymerisable compound of the formula

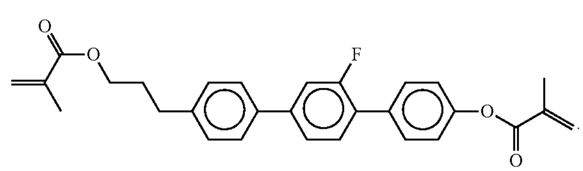

Example M185

For the preparation of a PS (polymer stabilised) mixture, for example for PS-VA, PS-IPS or PS-FFS displays, the mixture according to Example M95 is mixed with 0.25% of the polymerisable compound of the formula

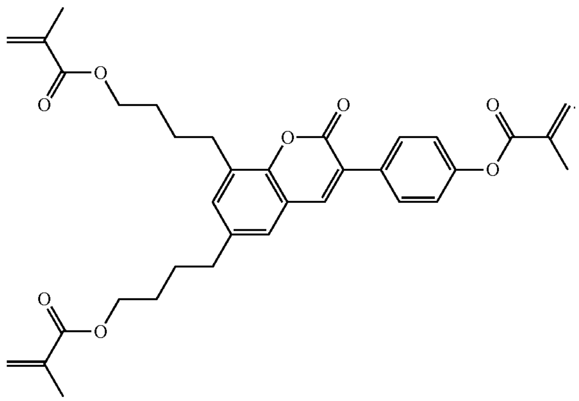 [SMILES: C=C(C)C(=O)OCCCCc1cc(CCCCOC(=O)C(=C)C)c2oc(=O)c(-c3ccc(OC(=O)C(=C)C)cc3)cc2c1]

Example M186

For the preparation of a PS (polymer stabilised) mixture, for example for PS-VA, PS-IPS or PS-FFS displays, the mixture according to Example M96 is mixed with 0.3% of the polymerisable compound of the formula

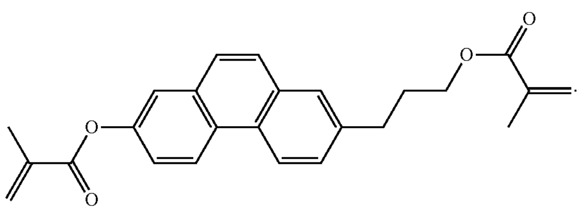 [SMILES: C=C(C)C(=O)OCCCc1ccc2c(ccc3cc(OC(=O)C(=C)C)ccc32)c1]

Example M187

For the preparation of a PS (polymer stabilised) mixture, for example for PS-VA, PS-IPS or PS-FFS displays, the mixture according to Example M97 is mixed with 0.25% of the polymerisable compound of the formula

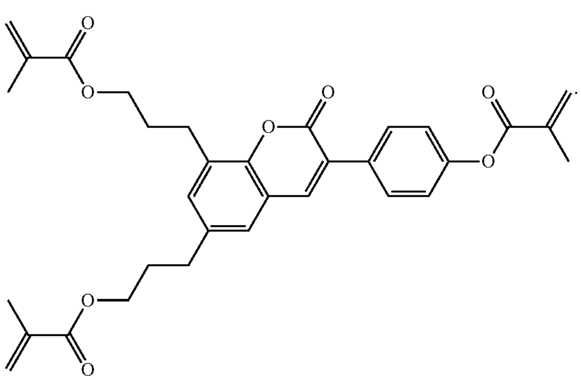 [SMILES: C=C(C)C(=O)OCCCc1cc(CCCOC(=O)C(=C)C)c2oc(=O)c(-c3ccc(OC(=O)C(=C)C)cc3)cc2c1]

Example M188

For the preparation of a PS (polymer stabilised) mixture, for example for PS-VA, PS-IPS or PS-FFS displays, the mixture according to Example M98 is mixed with 0.3% of the polymerisable compound of the formula

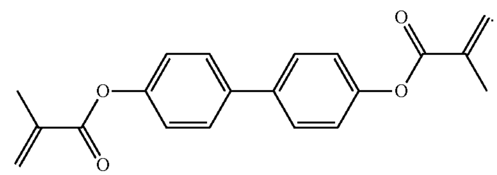

Example M189

For the preparation of a PS (polymer stabilised) mixture, for example for PS-VA, PS-IPS or PS-FFS displays, the mixture according to Example M99 is mixed with 0.25% of the polymerisable compound of the formula

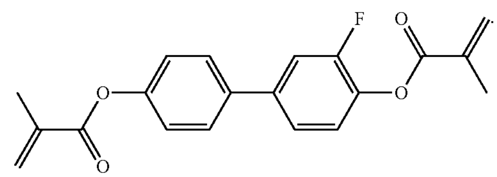

Example M190

For the preparation of a PS (polymer stabilised) mixture, for example for PS-VA, PS-IPS or PS-FFS displays, the mixture according to Example M99 is mixed with 0.25% of the polymerisable compound of the formula

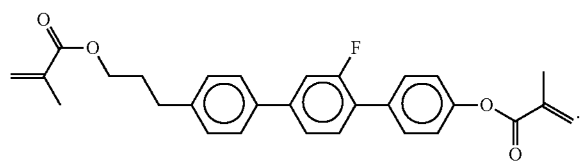

Example M191

For the preparation of a PS (polymer stabilised) mixture, for example for PS-VA, PS-IPS or PS-FFS displays, the mixture according to Example M100 is mixed with 0.25% of the polymerisable compound of the formula

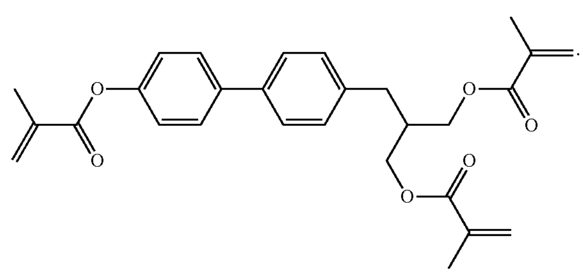 [SMILES: C=C(C)C(=O)OCC(COC(=O)C(=C)C)Cc1ccc(-c2ccc(OC(=O)C(=C)C)cc2)cc1]

Example M192

For the preparation of a PS (polymer stabilised) mixture, for example for PS-VA, PS-IPS or PS-FFS displays, the mixture according to Example M100 is mixed with 0.25% of the polymerisable compound of the formula

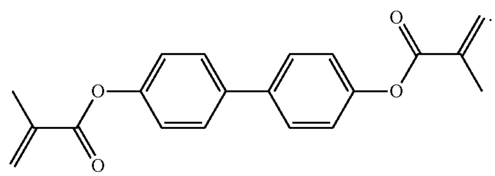

Example M193

For the preparation of a PS (polymer stabilised) mixture, for example for PS-VA, PS-IPS or PS-FFS displays, the mixture according to Example M101 is mixed with 0.25% of the polymerisable compound of the formula

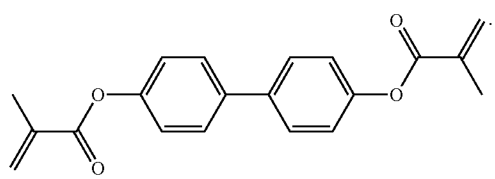 [SMILES: C=C(C)C(=O)Oc1ccc(-c2ccc(OC(=O)C(=C)C)cc2)cc1]

Example M194

For the preparation of a PS (polymer stabilised) mixture, for example for PS-VA, PS-IPS or PS-FFS displays, the mixture according to Example M102 is mixed with 0.25% of the polymerisable compound of the formula

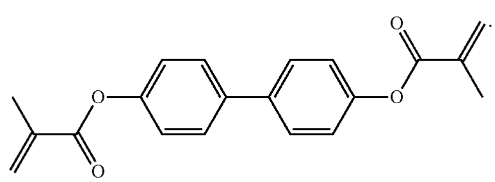 [SMILES: C=C(C)C(=O)Oc1ccc(-c2ccc(OC(=O)C(=C)C)cc2)cc1]

Example M195

For the preparation of a PS (polymer stabilised) mixture, for example for PS-VA, PS-IPS or PS-FFS displays, the mixture according to Example M103 is mixed with 0.3% of the polymerisable compound of the formula

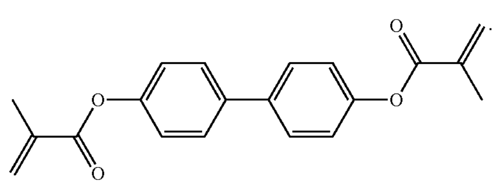

Example M196

For the preparation of a PS (polymer stabilised) mixture, for example for PS-VA, PS-IPS or PS-FFS displays, the mixture according to Example M104 is mixed with 0.3% of the polymerisable compound of the formula

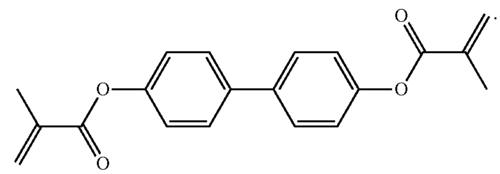 [SMILES: C=C(C)C(=O)Oc1ccc(-c2ccc(OC(=O)C(=C)C)cc2)cc1]

Example M197

For the preparation of a PS (polymer stabilised) mixture, for example for PS-VA, PS-IPS or PS-FFS displays, the mixture according to Example M105 is mixed with 0.3% of the polymerisable compound of the formula

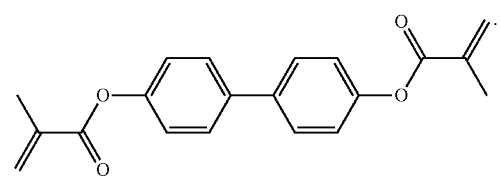 [SMILES: C=C(C)C(=O)Oc1ccc(-c2ccc(OC(=O)C(=C)C)cc2)cc1]

Example M198

For the preparation of a PS (polymer stabilised) mixture, for example for PS-VA, PS-IPS or PS-FFS displays, the mixture according to Example M105 is mixed with 0.3% of the polymerisable compound of the formula

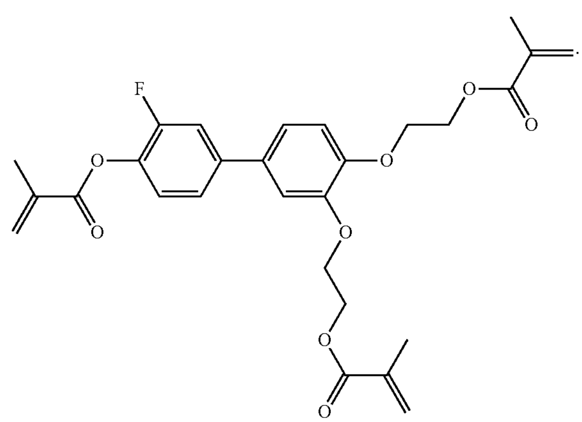 [SMILES: C=C(C)C(=O)OCCOc1ccc(-c2ccc(OC(=O)C(=C)C)c(F)c2)cc1OCCOC(=O)C(=C)C]

Example M199

For the preparation of a PS (polymer stabilised) mixture, for example for PS-VA, PS-IPS or PS-FFS displays, the mixture according to Example M106 is mixed with 0.3% of the polymerisable compound of the formula

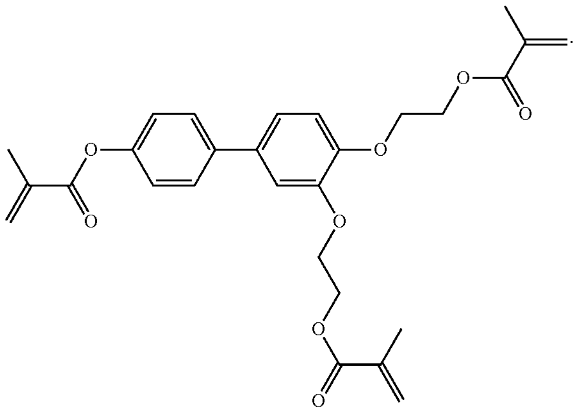 [SMILES: C=C(C)C(=O)OCCOc1ccc(-c2ccc(OC(=O)C(=C)C)cc2)cc1OCCOC(=O)C(=C)C]

Example M200

For the preparation of a PS (polymer stabilised) mixture, for example for PS-VA, PS-IPS or PS-FFS displays, the mixture according to Example M107 is mixed with 0.25% of the polymerisable compound of the formula

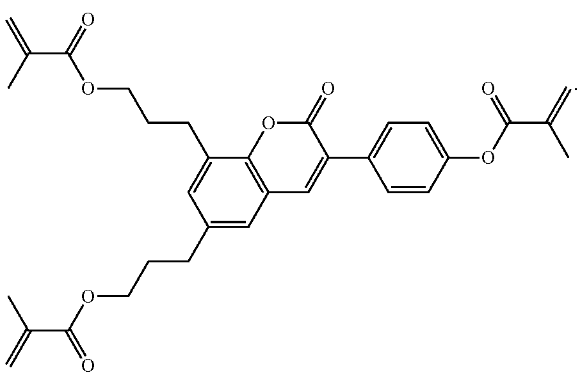 [SMILES: C=C(C)C(=O)OCCCc1cc(CCCOC(=O)C(=C)C)c2oc(=O)c(-c3ccc(OC(=O)C(=C)C)cc3)cc2c1]

Example M201

For the preparation of a PS (polymer stabilised) mixture, for example for PS-VA, PS-IPS or PS-FFS displays, the mixture according to Example M108 is mixed with 0.25% of the polymerisable compound of the formula

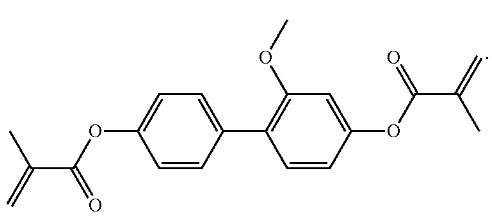 [SMILES: C=C(C)C(=O)Oc1ccc(-c2ccc(OC(=O)C(=C)C)cc2OC)cc1]

Example M202

For the preparation of a PS (polymer stabilised) mixture, for example for PS-VA, PS-IPS or PS-FFS displays, the mixture according to Example M109 is mixed with 0.25% of the polymerisable compound of the formula

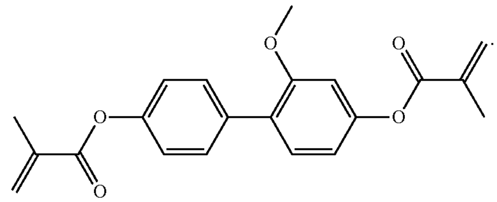 [SMILES: C=C(C)C(=O)Oc1ccc(-c2ccc(OC(=O)C(=C)C)cc2OC)cc1]

Examples M1-M202 may additionally also comprise one of the two stabilisers selected from Table C.

The PS-VA mixtures according to the invention comprising a polymerisable compound (reactive mesogen) exhibit higher polymerisation rates, a stable tilt angle and very short response times.

Example M203

| | | | |
|---|---|---|---|
| CC-3-V1 | 7.00% | Clearing point [° C.]: | 75 |
| CC-4-V1 | 21.00% | Δn [589 nm, 20° C.]: | 0.0991 |
| CCH-34 | 4.00% | $\varepsilon_{\parallel}$ [1 kHz, 20° C.]: | 3.5 |
| CCH-35 | 4.00% | $\varepsilon_{\perp}$ [1 kHz, 20° C.]: | 8.9 |
| CCP-3-1 | 12.50% | Δε [1 kHz, 20° C.]: | −3.3 |
| CCY-3-O2 | 8.00% | $K_1$ [pN, 20° C.]: | 14.9 |
| CY-3-O2 | 12.50% | $K_3$ [pN, 20° C.]: | 15.2 |
| B(S)-2O-O5 | 4.00% | $V_0$ [pN, 20° C.]: | 2.26 |
| B(S)-2O-O4 | 3.00% | $\gamma_1$ [mPa s, 20° C.]: | 91 |
| PP-1-3 | 4.00% | LTS bulk [−20° C.]: | >1000 h |
| Y-4O-O4 | 5.00% | | |
| PY-V2-O2 | 4.00% | | |
| CCY-V-O2 | 8.00% | | |
| CPY-V-O2 | 3.00% | | |
| CPY-V-O4 | 4.00% | | |

Example M204

| | | | |
|---|---|---|---|
| CC-4-V1 | 25.00% | Clearing point [° C.]: | 80.5 |
| PY-V2-O2 | 10.00% | Δn [589 nm, 20° C.]: | 0.1087 |
| CCY-V-O2 | 8.00% | Δε [1 kHz, 20° C.]: | −6.3 |
| CPY-V-O2 | 4.00% | $K_1$ [pN, 20° C.]: | 12.4 |
| CPY-V-O4 | 8.00% | $K_3$ [pN, 20° C.]: | 16.7 |
| CY-V-O2 | 16.00% | $V_0$ [pN, 20° C.]: | 1.66 |
| COY-3-O2 | 2.50% | $\gamma_1$ [mPa s, 20° C.]: | 166 |
| CCOY-2-O2 | 4.00% | | |
| CCOY-3-O2 | 4.50% | | |
| CCOY-V-O2 | 7.00% | | |
| CCOY-V-O3 | 11.00% | | |

Example M205

| | | | |
|---|---|---|---|
| CC-4-V1 | 25.00% | Clearing point [° C.]: | 87 |
| CC-3-V1 | 9.00% | Δn [589 nm, 20° C.]: | 0.1034 |
| PY-3-O2 | 7.00% | Δε [1 kHz, 20° C.]: | −4.5 |
| CEY-3-O2 | 15.00% | $K_1$ [pN, 20° C.]: | 17.4 |
| CCP-3-1 | 2.00% | $K_3$ [pN, 20° C.]: | 19.2 |
| CAIY-3-O2 | 7.00% | $V_0$ [pN, 20° C.]: | 2.21 |
| APY-3-O2 | 8.00% | $\gamma_1$ [mPa s, 20° C.]: | 178 |
| CCOY-2-O2 | 8.00% | | |
| CCOY-3-O2 | 14.00% | | |
| PGP-2-5 | 5.00% | | |

Example M206

| | | | |
|---|---|---|---|
| B(S)-2O-O4 | 4.00% | Clearing point [° C.]: | 74.5 |
| B(S)-2O-O5 | 5.00% | Δn [589 nm, 20° C.]: | 0.1341 |
| B(S)-2O-O6 | 2.50% | $\varepsilon_{\parallel}$ [1 kHz, 20° C.]: | 3.6 |
| CC-3-V1 | 6.00% | $\varepsilon_{\perp}$ [1 kHz, 20° C.]: | 6.6 |
| CC-4-V1 | 22.00% | Δε [1 kHz, 20° C.]: | −3.0 |
| CCH-35 | 4.00% | $K_1$ [pN, 20° C.]: | 16.5 |
| PP-1-2V1 | 2.50% | $K_3$ [pN, 20° C.]: | 16.1 |
| PP-1-3 | 7.00% | $V_0$ [pN, 20° C.]: | 2.43 |
| PY-1-O2 | 9.00% | $\gamma_1$ [mPa s, 20° C.]: | 99 |
| PY-2-O2 | 8.50% | LTS bulk [−20° C.]: | >1000 h |
| BCH-32 | 5.00% | LTS bulk [−25° C.]: | >1000 h |
| CCP-3-1 | 11.00% | | |
| CPY-3-O2 | 10.50% | | |
| PGIY-2-O4 | 3.00% | | |

Example M207

| | | | |
|---|---|---|---|
| B(S)-2O-O4 | 4.00% | Clearing point [° C.]: | 74.5 |
| B(S)-2O-O5 | 5.00% | Δn [589 nm, 20° C.]: | 0.1032 |
| B(S)-2O-O6 | 2.50% | Δε [1 kHz, 20° C.]: | −3.2 |
| CC-3-V1 | 8.00% | $K_1$ [pN, 20° C.]: | 16.7 |
| CC-4-V1 | 22.00% | $K_3$ [pN, 20° C.]: | 15.8 |
| CCH-35 | 5.00% | $V_0$ [pN, 20° C.]: | 2.33 |
| PP-1-2V1 | 7.50% | $\gamma_1$ [mPa s, 20° C.]: | 99 |
| PY-1-O2 | 8.00% | | |
| PY-2-O2 | 6.00% | | |
| BCH-32 | 5.00% | | |
| CCP-3-1 | 7.00% | | |
| PGIY-2-O4 | 4.00% | | |
| PY-V2-O2 | 5.00% | | |
| CCY-V-O2 | 4.00% | | |
| CPY-V-O2 | 3.00% | | |
| CPY-V-O4 | 4.00% | | |

Example M208

| | | | |
|---|---|---|---|
| CC-3-V1 | 7.00% | Clearing point [° C.]: | 75 |
| CCH-34 | 3.00% | Δn [589 nm, 20° C.]: | 0.0998 |
| CCH-35 | 7.00% | Δε [1 kHz, 20° C.]: | −3.6 |
| CC-4-V1 | 20.00% | $K_1$ [pN, 20° C.]: | 15.2 |
| CCP-3-1 | 4.50% | $K_3$ [pN, 20° C.]: | 17 |
| CCY-3-O2 | 12.50% | $V_0$ [V, 20° C.]: | 2.3 |
| CPY-3-O2 | 12.50% | $\gamma_1$ [mPa s, 20° C.]: | 113 |
| CY-3-O2 | 15.50% | | |
| CY-3-O4 | 4.50% | | |
| PY-3-O2 | 13.50% | | |

Example M209

| | | | |
|---|---|---|---|
| CC-3-V1 | 7.00% | Clearing point [° C.]: | 76 |
| CCH-34 | 3.00% | Δn [589 nm, 20° C.]: | 0.1002 |
| CCH-35 | 7.00% | Δε [1 kHz, 20° C.]: | −3.6 |
| CC-4-V1 | 20.00% | $K_1$ [pN, 20° C.]: | 15.6 |
| CCP-3-1 | 4.50% | $K_3$ [pN, 20° C.]: | 17.1 |
| CCY-3-O2 | 12.50% | $V_0$ [V, 20° C.]: | 2.32 |
| CPY-3-O2 | 12.50% | $\gamma_1$ [mPa s, 20° C.]: | 111 |
| CY-3-O2 | 15.50% | | |
| CY-3-O4 | 4.50% | | |
| PY-3-O2 | 5.50% | | |
| PY-V2-O2 | 8.00% | | |

Example M210

| | | | |
|---|---|---|---|
| CC-3-V1 | 7.00% | Clearing point [° C.]: | 73 |
| CCH-34 | 3.00% | Δn [589 nm, 20° C.]: | 0.0987 |
| CCH-35 | 7.00% | Δε [1 kHz, 20° C.]: | −3.6 |
| CC-4-V1 | 20.00% | $K_1$ [pN, 20° C.]: | 14.9 |
| CCP-3-1 | 4.50% | $K_3$ [pN, 20° C.]: | 16.2 |
| CCY-3-O2 | 3.50% | $V_0$ [V, 20° C.]: | 2.28 |
| CPY-3-O2 | 12.50% | $\gamma_1$ [mPa s, 20° C.]: | 110 |
| CY-3-O2 | 15.50% | | |
| CY-3-O4 | 4.50% | | |
| PY-3-O2 | 13.50% | | |
| CCY-V-O2 | 9.00% | | |

Example M211

| | | | |
|---|---|---|---|
| CC-3-V1 | 7.00% | Clearing point [° C.]: | 72.5 |
| CCH-34 | 3.00% | Δn [589 nm, 20° C.]: | 0.0999 |
| CCH-35 | 7.00% | Δε [1 kHz, 20° C.]: | −3.6 |
| CC-4-V1 | 20.00% | $K_1$ [pN, 20° C.]: | 14.4 |
| CCP-3-1 | 4.50% | $K_3$ [pN, 20° C.]: | 15.7 |
| CCY-3-O2 | 12.50% | $V_0$ [V, 20° C.]: | 2.23 |
| CY-3-O2 | 15.50% | $\gamma_1$ [mPa s, 20° C.]: | 108 |
| CY-3-O4 | 4.50% | | |
| PY-3-O2 | 13.50% | | |
| CPY-V-O2 | 8.00% | | |
| CPY-V-O4 | 4.50% | | |

Example M212

| | | | |
|---|---|---|---|
| CC-3-V1 | 7.00% | Clearing point [° C.]: | 72 |
| CCH-34 | 3.00% | Δn [589 nm, 20° C.]: | 0.0998 |
| CCH-35 | 7.00% | Δε [1 kHz, 20° C.]: | −3.6 |
| CC-4-V1 | 20.00% | $K_1$ [pN, 20° C.]: | 14.4 |
| CCP-3-1 | 4.50% | $K_3$ [pN, 20° C.]: | 16 |
| CPY-3-O2 | 6.00% | $V_0$ [V, 20° C.]: | 2.18 |
| CY-3-O2 | 15.50% | $\gamma_1$ [mPa s, 20° C.]: | 115 |
| CY-3-O4 | 4.50% | | |
| PY-3-O2 | 5.50% | | |
| PY-V2-O2 | 8.00% | | |
| CCY-V-O2 | 9.00% | | |
| CAIY-3-O2 | 5.00% | | |
| APY-3-O2 | 5.00% | | |

Example M213

| | | | |
|---|---|---|---|
| CC-3-V1 | 7.00% | Clearing point [° C.]: | 73.5 |
| CCH-34 | 3.00% | Δn [589 nm, 20° C.]: | 0.1009 |
| CCH-35 | 7.00% | Δε [1 kHz, 20° C.]: | −3.6 |
| CC-4-V1 | 20.00% | $K_1$ [pN, 20° C.]: | 14.7 |
| CCP-3-1 | 4.50% | $K_3$ [pN, 20° C.]: | 16.6 |
| CCY-3-O2 | 9.00% | $V_0$ [V, 20° C.]: | 2.21 |
| CPY-3-O2 | 6.00% | $\gamma_1$ [mPa s, 20° C.]: | 118 |
| CY-3-O2 | 15.50% | | |
| CY-3-O4 | 4.50% | | |
| PY-3-O2 | 5.50% | | |
| PY-V2-O2 | 8.00% | | |
| CAIY-3-O2 | 5.00% | | |
| APY-3-O2 | 5.00% | | |

Example M214

| | | | |
|---|---|---|---|
| CC-3-V1 | 7.00% | Clearing point [° C.]: | 70.5 |
| CCH-34 | 3.00% | Δn [589 nm, 20° C.]: | 0.0991 |
| CCH-35 | 7.00% | Δε [1 kHz, 20° C.]: | −3.6 |
| CC-4-V1 | 20.00% | $K_1$ [pN, 20° C.]: | 14 |
| CCP-3-1 | 4.50% | $K_3$ [pN, 20° C.]: | 15.9 |
| CPY-3-O2 | 6.00% | $V_0$ [V, 20° C.]: | 2.17 |
| CY-3-O2 | 15.50% | $\gamma_1$ [mPa s, 20° C.]: | 117 |
| CY-3-O4 | 4.50% | | |
| PY-3-O2 | 13.50% | | |
| CCY-V-O2 | 9.00% | | |
| CAIY-3-O2 | 5.00% | | |
| APY-3-O2 | 5.00% | | |

Example M215

| | | | |
|---|---|---|---|
| CCP-3-1 | 5.00% | Clearing point [° C.]: | 84.5 |
| CCP-V-1 | 3.00% | Δn [589 nm, 20° C.]: | 0.1008 |
| CCP-V2-1 | 5.00% | $\varepsilon_{\parallel}$ [1 kHz, 20° C.]: | 3.7 |
| CCY-3-O2 | 8.00% | $\varepsilon_{\perp}$ [1 kHz, 20° C.]: | 7.6 |
| CLY-3-O2 | 7.00% | Δε [1 kHz, 20° C.]: | −3.9 |
| CLY-4-O2 | 4.50% | $K_1$ [pN, 20° C.]: | 18.3 |
| CLY-5-O2 | 4.00% | $K_3$ [pN, 20° C.]: | 16.7 |
| B(S)-2O-O4 | 4.50% | $V_0$ [V, 20° C.]: | 2.18 |
| B(S)-2O-O5 | 5.00% | $\gamma_1$ [mPa s, 20° C.]: | 117 |
| B-2O-O5 | 2.00% | | |
| CC-4-V1 | 20.00% | | |
| CCH-23 | 9.20% | | |
| CCH-35 | 4.00% | | |
| CY-3-O2 | 10.50% | | |
| PP-1-3 | 4.00% | | |
| Y-4O-O4 | 4.00% | | |
| CCQU-3-F | 0.30% | | |

Example M216

| | | | |
|---|---|---|---|
| CCP-3-1 | 5.50% | Clearing point [° C.]: | 89 |
| CCP-V-1 | 11.00% | Δn [589 nm, 20° C.]: | 0.1030 |
| CLY-2-O4 | 2.00% | $\varepsilon_{\parallel}$ [1 kHz, 20° C.]: | 3.7 |
| CLY-3-O2 | 6.00% | $\varepsilon_{\perp}$ [1 kHz, 20° C.]: | 7.6 |
| CLY-3-O3 | 4.00% | Δε [1 kHz, 20° C.]: | −4.0 |
| CLY-4-O2 | 5.00% | $K_1$ [pN, 20° C.]: | 18.5 |
| CLY-5-O2 | 3.00% | $K_3$ [pN, 20° C.]: | 16.5 |
| CPY-3-O2 | 6.00% | $V_0$ [V, 20° C.]: | 2.17 |
| B(S)-2O-O4 | 4.00% | $\gamma_1$ [mPa s, 20° C.]: | 110 |
| B(S)-2O-O5 | 5.00% | | |
| B(S)-2O-O6 | 3.00% | | |
| CC-3-V1 | 9.00% | | |
| CC-4-V1 | 19.00% | | |
| CCH-23 | 7.50% | | |
| Y-4O-O4 | 10.00% | | |

Example M217

| | | | |
|---|---|---|---|
| CCP-3-1 | 9.50% | Clearing point [° C.]: | 101 |
| CCP-V-1 | 12.00% | Δn [589 nm, 20° C.]: | 0.1109 |
| CLY-3-O2 | 8.00% | $\varepsilon_{\parallel}$ [1 kHz, 20° C.]: | 3.7 |
| CLY-4-O2 | 8.00% | $\varepsilon_{\perp}$ [1 kHz, 20° C.]: | 8.0 |
| CLY-5-O2 | 6.00% | Δε [1 kHz, 20° C.]: | −4.3 |
| CPY-3-O2 | 6.50% | $K_1$ [pN, 20° C.]: | 21.0 |
| B(S)-2O-O4 | 4.00% | $K_3$ [pN, 20° C.]: | 19.4 |
| B(S)-2O-O5 | 5.00% | $V_0$ [V, 20° C.]: | 2.23 |
| B(S)-2O-O6 | 3.00% | $\gamma_1$ [mPa s, 20° C.]: | 142 |
| CC-3-V1 | 8.00% | | |
| CC-4-V1 | 20.00% | | |
| Y-4O-O4 | 10.00% | | |

Example M218

| | | | |
|---|---|---|---|
| CLP-V-1 | 5.00% | Clearing point [° C.]: | 86.5 |
| CCP-V-1 | 5.00% | Δn [589 nm, 20° C.]: | 0.1045 |
| CLY-3-O2 | 8.00% | $\varepsilon_{\parallel}$ [1 kHz, 20° C.]: | 3.8 |
| CLY-4-O2 | 8.00% | $\varepsilon_{\perp}$ [1 kHz, 20° C.]: | 7.9 |
| CLY-5-O2 | 6.50% | Δε [1 kHz, 20° C.]: | −4.2 |
| CPY-3-O2 | 6.00% | $K_1$ [pN, 20° C.]: | 18.1 |
| B(S)-2O-O4 | 4.00% | $K_3$ [pN, 20° C.]: | 16.5 |
| B(S)-2O-O5 | 5.00% | $V_0$ [V, 20° C.]: | 2.10 |
| B(S)-2O-O6 | 3.00% | $\gamma_1$ [mPa s, 20° C.]: | 108 |
| CC-3-V1 | 8.00% | | |
| CC-4-V1 | 20.00% | | |
| CC-3-V | 11.50% | | |
| Y-4O-O4 | 10.00% | | |

Example M219

| | | | |
|---|---|---|---|
| CLP-1V-1 | 4.00% | Clearing point [° C.]: | 88 |
| CCP-V-1 | 5.00% | Δn [589 nm, 20° C.]: | 0.1055 |
| CLY-3-O2 | 8.00% | $\varepsilon_{\parallel}$ [1 kHz, 20° C.]: | 3.7 |
| CLY-4-O2 | 8.00% | $\varepsilon_{\perp}$ [1 kHz, 20° C.]: | 8.0 |
| CLY-5-O2 | 7.00% | Δε [1 kHz, 20° C.]: | −4.2 |
| CPY-3-O2 | 6.50% | $K_1$ [pN, 20° C.]: | 18.3 |
| B(S)-2O-O4 | 4.00% | $K_3$ [pN, 20° C.]: | 17.3 |
| B(S)-2O-O5 | 5.00% | $V_0$ [V, 20° C.]: | 2.13 |
| B(S)-2O-O6 | 3.00% | $\gamma_1$ [mPa s, 20° C.]: | 112 |
| CC-3-V1 | 8.00% | | |
| CC-4-V1 | 20.00% | | |
| CC-3-V | 11.50% | | |
| Y-4O-O4 | 10.00% | | |

Example M220

| | | | |
|---|---|---|---|
| CVCP-V-O1 | 4.00% | Clearing point [° C.]: | 87.5 |
| CCP-V-1 | 5.00% | Δn [589 nm, 20° C.]: | 0.1033 |
| CLY-3-O2 | 8.00% | $\varepsilon_{\parallel}$ [1 kHz, 20° C.]: | 3.8 |
| CLY-4-O2 | 8.00% | $\varepsilon_{\perp}$ [1 kHz, 20° C.]: | 8.0 |
| CLY-5-O2 | 7.00% | Δε [1 kHz, 20° C.]: | −4.2 |
| CPY-3-O2 | 6.50% | $K_1$ [pN, 20° C.]: | 17.3 |
| B(S)-2O-O4 | 4.00% | $K_3$ [pN, 20° C.]: | 16.5 |
| B(S)-2O-O5 | 5.00% | $V_0$ [V, 20° C.]: | 2.08 |
| B(S)-2O-O6 | 3.00% | $\gamma_1$ [mPa s, 20° C.]: | 110 |
| CC-3-V1 | 8.00% | | |
| CC-4-V1 | 20.00% | | |
| CC-3-V | 11.50% | | |
| Y-4O-O4 | 10.00% | | |

Example M221

| | | | |
|---|---|---|---|
| B(S)-2O-O5 | 4.00% | Clearing point [° C.]: | 74.3 |
| CC-3-V1 | 6.00% | Δn [589 nm, 20° C.]: | 0.1021 |
| CC-4-V1 | 14.00% | $\varepsilon_{\parallel}$ [1 kHz, 20° C.]: | 3.5 |
| CCH-34 | 9.00% | $\varepsilon_{\perp}$ [1 kHz, 20° C.]: | 6.7 |
| CCP-3-1 | 8.00% | Δε [1 kHz, 20° C.]: | −3.1 |
| CCY-3-O2 | 9.00% | $K_1$ [pN, 20° C.]: | 13.2 |
| CCY-4-O2 | 2.50% | $K_3$ [pN, 20° C.]: | 16.5 |

-continued

| | | | |
|---|---|---|---|
| CLY-3-O2 | 1.00% | $V_0$ [V, 20° C.]: | 2.41 |
| CPY-3-O2 | 10.50% | $\gamma_1$ [mPa s, 20° C.]: | 104 |
| CY-3-O2 | 11.50% | | |
| PCH-301 | 15.00% | | |
| PY-1-O2 | 8.50% | | |
| PY-2-O2 | 1.00% | | |

Example M222

For the preparation of a PS (polymer stabilised) mixture, for example for PS-VA, PS-IPS or PS-FFS displays, the mixture according to Example M221 is mixed with 0.35% of the polymerisable compound of the formula

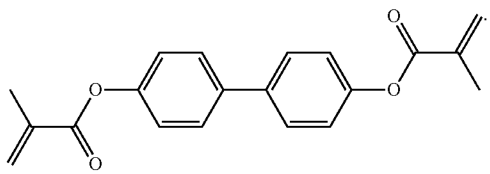

Example M223

For the preparation of a PS (polymer stabilised) mixture, for example for PS-VA, PS-IPS or PS-FFS displays, the mixture according to Example M221 is mixed with 0.3% of the polymerisable compound of the formula

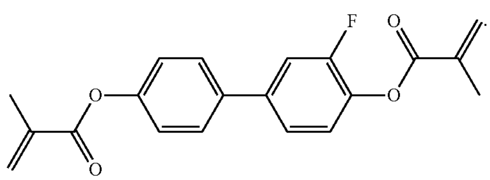 [SMILES: C=C(C)C(=O)Oc1ccc(-c2ccc(OC(=O)C(=C)C)c(F)c2)cc1]

Example M224

For the preparation of a PS (polymer stabilised) mixture, for example for PS-VA, PS-IPS or PS-FFS displays, the mixture according to Example M221 is mixed with 0.3% of the polymerisable compound of the formula

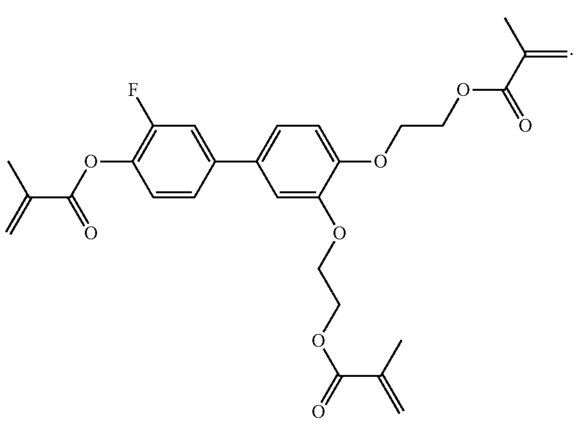 [SMILES: C=C(C)C(=O)OCCOc1ccc(-c2ccc(OC(=O)C(=C)C)c(F)c2)cc1OCCOC(=O)C(=C)C]

Example M225

For the preparation of a PS (polymer stabilised) mixture, for example for PS-VA, PS-IPS or PS-FFS displays, the mixture according to Example M221 is mixed with 0.3% of the polymerisable compound of the formula

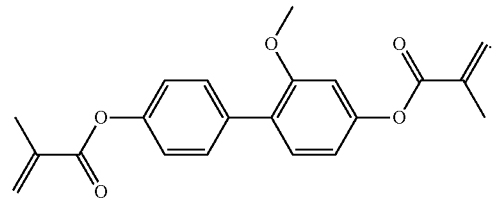 [SMILES: C=C(C)C(=O)Oc1ccc(-c2ccc(OC(=O)C(=C)C)cc2OC)cc1]

Example M226

| | | | |
|---|---|---|---|
| B(S)-2O-O5 | 4.00% | Clearing point [° C.]: | 74.3 |
| CC-3-V1 | 6.00% | Δn [589 nm, 20° C.]: | 0.1019 |
| CC-4-V1 | 14.00% | $\varepsilon_{\parallel}$ [1 kHz, 20° C.]: | 3.5 |
| CCH-34 | 9.00% | $\varepsilon_{\perp}$ [1 kHz, 20° C.]: | 6.7 |
| CCP-3-1 | 8.00% | Δε [1 kHz, 20° C.]: | −3.2 |
| CCY-3-O1 | 2.50% | $K_1$ [pN, 20° C.]: | 13.4 |
| CCY-3-O2 | 10.00% | $K_3$ [pN, 20° C.]: | 16.7 |
| CPY-3-O2 | 10.50% | $V_0$ [V, 20° C.]: | 2.35 |
| CY-3-O2 | 11.50% | $\gamma_1$ [mPa s, 20° C.]: | 105 |
| PCH-301 | 15.00% | | |
| PY-1-O2 | 9.50% | | |

Example M227

For the preparation of a PS (polymer stabilised) mixture, for example for PS-VA, PS-IPS or PS-FFS displays, the mixture according to Example M226 is mixed with 0.35% of the polymerisable compound of the formula

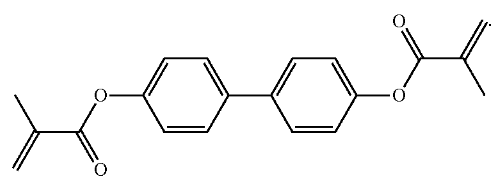

Example M228

For the preparation of a PS (polymer stabilised) mixture, for example for PS-VA, PS-IPS or PS-FFS displays, the mixture according to Example M226 is mixed with 0.3% of the polymerisable compound of the formula

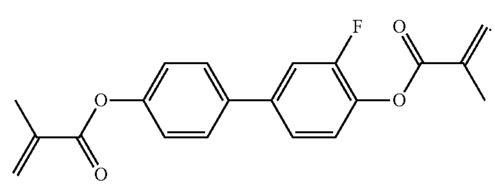

Example M229

For the preparation of a PS (polymer stabilised) mixture, for example for PS-VA, PS-IPS or PS-FFS displays, the mixture according to Example M226 is mixed with 0.3% of the polymerisable compound of the formula

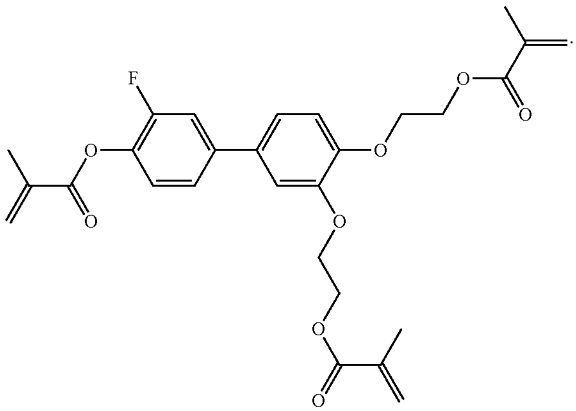 [SMILES: C=C(C)C(=O)OCCOc1ccc(-c2ccc(OC(=O)C(=C)C)c(F)c2)cc1OCCOC(=O)C(=C)C]

Example M230

For the preparation of a PS (polymer stabilised) mixture, for example for PS-VA, PS-IPS or PS-FFS displays, the mixture according to Example M226 is mixed with 0.3% of the polymerisable compound of the formula

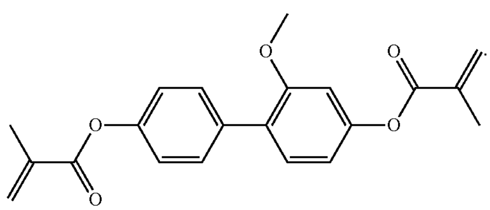 [SMILES: C=C(C)C(=O)Oc1ccc(-c2ccc(OC(=O)C(=C)C)cc2OC)cc1]

Example M231

| | | | |
|---|---|---|---|
| BCH-32 | 8.00% | Clearing point [° C.]: | 74.7 |
| CC-3-V1 | 8.00% | Δn [589 nm, 20° C.]: | 0.1120 |
| CC-4-V1 | 16.00% | $\varepsilon_{\parallel}$ [1 kHz, 20° C.]: | 3.5 |
| CCH-34 | 8.00% | $\varepsilon_{\perp}$ [1 kHz, 20° C.]: | 6.7 |
| CCH-35 | 5.50% | Δε [1 kHz, 20° C.]: | −3.2 |
| CCY-3-O2 | 6.00% | $K_1$ [pN, 20° C.]: | 15.1 |
| CPY-2-O2 | 9.00% | $K_3$ [pN, 20° C.]: | 15.3 |
| CPY-3-O2 | 9.00% | $V_0$ [V, 20° C.]: | 2.31 |
| CY-3-O2 | 12.00% | $\gamma_1$ [mPa s, 20° C.]: | 108 |
| PY-1-O2 | 3.50% | LTS bulk [h, −20° C.]: | >1000 h |
| PY-3-O2 | 15.00% | | |

Example M232

| | | | |
|---|---|---|---|
| BCH-32 | 2.50% | Clearing point [° C.]: | 74.1 |
| CC-3-V1 | 8.00% | $\varepsilon_{\parallel}$ [1 kHz, 20° C.]: | 3.5 |
| CC-4-V1 | 12.00% | $\varepsilon_{\perp}$ [1 kHz, 20° C.]: | 6.7 |
| CCH-34 | 8.00% | Δε [1 kHz, 20° C.]: | −3.2 |

-continued

| | | | |
|---|---|---|---|
| CCH-35 | 5.00% | $K_1$ [pN, 20° C.]: | 15.0 |
| CCY-3-O2 | 11.50% | $K_3$ [pN, 20° C.]: | 15.3 |
| CPY-2-O2 | 11.00% | $V_0$ [V, 20° C.]: | 2.31 |
| CPY-3-O2 | 10.50% | $\gamma_1$ [mPa s, 20° C.]: | 114 |
| CY-3-O2 | 12.00% | LTS bulk [h, −20° C.]: | >1000 h |
| PP-1-4 | 8.50% | | |
| PY-3-O2 | 11.00% | | |

Example M233

| | | | |
|---|---|---|---|
| BCH-32 | 5.50% | Clearing point [° C.]: | 74.1 |
| CC-3-V1 | 8.00% | $\varepsilon_{\parallel}$ [1 kHz, 20° C.]: | 3.7 |
| CC-4-V1 | 16.00% | $\varepsilon_{\perp}$ [1 kHz, 20° C.]: | 7.6 |
| CCH-34 | 8.50% | Δε [1 kHz, 20° C.]: | −3.9 |
| CCY-3-O2 | 12.00% | $K_1$ [pN, 20° C.]: | 14.9 |
| CPY-2-O2 | 6.00% | $K_3$ [pN, 20° C.]: | 16.1 |
| CPY-3-O2 | 10.00% | $V_0$ [V, 20° C.]: | 2.15 |
| CY-3-O2 | 15.50% | $\gamma_1$ [mPa s, 20° C.]: | 120 |
| PY-1-O2 | 4.00% | LTS bulk [h, −20° C.]: | >1000 h |
| PY-3-O2 | 14.50% | | |

Example M234

| | | | |
|---|---|---|---|
| BCH-32 | 5.00% | Clearing point [° C.]: | 74.1 |
| CC-3-V1 | 8.00% | $\varepsilon_{\parallel}$ [1 kHz, 20° C.]: | 3.8 |
| CC-4-V1 | 16.00% | $\varepsilon_{\perp}$ [1 kHz, 20° C.]: | 8.0 |
| CCH-34 | 4.50% | Δε [1 kHz, 20° C.]: | −4.2 |
| CCY-3-O2 | 12.00% | $K_1$ [pN, 20° C.]: | 14.2 |
| CPY-2-O2 | 10.00% | $K_3$ [pN, 20° C.]: | 15.7 |
| CPY-3-O2 | 9.00% | $V_0$ [V, 20° C.]: | 2.03 |
| CY-3-O2 | 15.50% | $\gamma_1$ [mPa s, 20° C.]: | 133 |
| CY-3-O4 | 6.50% | LTS bulk [h, −20° C.]: | >1000 h |
| PY-3-O2 | 13.50% | | |

Example M235

For the preparation of a PS (polymer stabilised) mixture, for example for PS-VA, PS-IPS or PS-FFS displays, the mixture according to Example M234 is mixed with 0.3% of the polymerisable compound of the formula

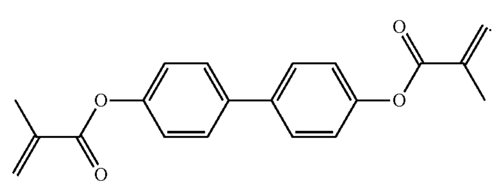

Example M236

For the preparation of a PS (polymer stabilised) mixture, for example for PS-VA, PS-IPS or PS-FFS displays, the mixture according to Example M234 is mixed with 0.3% of the polymerisable compound of the formula

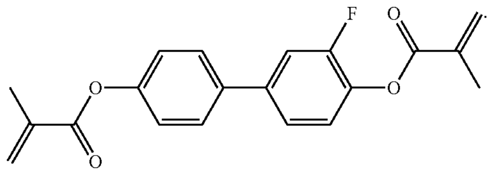

Example M237

| | | | |
|---|---|---|---|
| BCH-32 | 6.00% | Clearing point [° C.]: | 73.6 |
| CC-3-V1 | 4.00% | $\varepsilon_{\parallel}$ [1 kHz, 20° C.]: | 3.8 |
| CC-4-V1 | 16.00% | $\varepsilon_{\perp}$ [1 kHz, 20° C.]: | 8.0 |
| CCH-34 | 9.00% | $\Delta\varepsilon$ [1 kHz, 20° C.]: | −4.1 |
| CCY-3-O1 | 5.00% | $K_1$ [pN, 20° C.]: | 14.3 |
| CCY-3-O2 | 11.00% | $K_3$ [pN, 20° C.]: | 15.5 |
| CPY-3-O2 | 10.00% | $V_0$ [V, 20° C.]: | 2.04 |
| CY-3-O2 | 14.00% | $\gamma_1$ [mPa s, 20° C.]: | 121 |
| PY-1-O2 | 5.00% | LTS bulk [h, −20° C.]: | >1000 h |
| PY-3-O2 | 12.00% | | |
| PCH-301 | 4.00% | | |
| B(S)-2O-O5 | 4.00% | | |

Example M238

| | | | |
|---|---|---|---|
| BCH-32 | 4.50% | Clearing point [° C.]: | 74.1 |
| CCP-3-1 | 4.00% | $\varepsilon_{\parallel}$ [1 kHz, 20° C.]: | 3.8 |
| CCY-3-O1 | 9.00% | $\varepsilon_{\perp}$ [1 kHz, 20° C.]: | 7.7 |
| CCY-3-O2 | 5.00% | $\Delta\varepsilon$ [1 kHz, 20° C.]: | −3.9 |
| CPY-3-O2 | 11.00% | $K_1$ [pN, 20° C.]: | 14.0 |
| B(S)-2O-O4 | 4.00% | $K_3$ [pN, 20° C.]: | 15.8 |
| CC-3-V1 | 3.00% | $V_0$ [V, 20° C.]: | 2.11 |
| CC-4-V1 | 17.00% | $\gamma_1$ [mPa s, 20° C.]: | 121 |
| CCH-34 | 6.00% | LTS bulk [h, −20° C.]: | >1000 h |
| CY-3-O2 | 13.50% | | |
| PCH-301 | 7.50% | | |
| PY-1-O2 | 5.50% | | |
| PY-3-O2 | 10.00% | | |

Example M239

For the preparation of a PS (polymer stabilised) mixture, for example for PS-VA, PS-IPS or PS-FFS displays, the mixture according to Example M238 is mixed with 0.3% of the polymerisable compound of the formula

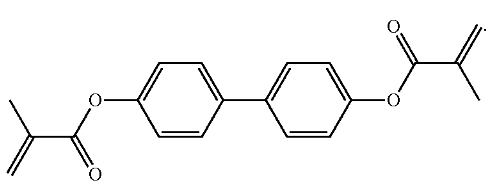

Example M240

| | | | |
|---|---|---|---|
| CCY-3-O2 | 11.00% | Clearing point [° C.]: | 75 |
| CPY-2-O2 | 11.00% | $\Delta n$ [589 nm, 20° C.]: | 0.1108 |
| CPY-3-O2 | 8.50% | $\varepsilon_{\parallel}$ [1 kHz, 20° C.]: | 3.8 |
| B-2O-O5 | 4.00% | $\varepsilon_{\perp}$[1 kHz, 20° C.]: | 7.9 |
| CC-3-V1 | 8.00% | $\Delta\varepsilon$ [1 kHz, 20° C.]: | −4.1 |
| CC-4-V1 | 17.00% | $K_1$ [pN, 20° C.]: | 15.4 |
| CCH-34 | 8.00% | $K_3$ [pN, 20° C.]: | 15.9 |
| CCH-35 | 6.00% | $V_0$ [V, 20° C.]: | 2.05 |
| CY-3-O2 | 8.50% | $\gamma_1$ [mPa s, 20° C.]: | 119 |
| PY-1-O2 | 6.00% | | |
| PY-3-O2 | 12.00% | | |

Example M241

For the preparation of a PS (polymer stabilised) mixture, for example for PS-VA, PS-IPS or PS-FFS displays, the mixture according to Example M240 is mixed with 0.3% of the polymerisable compound of the formula

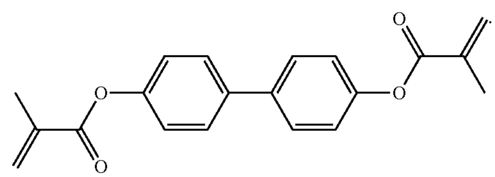

Example M242

| | | | |
|---|---|---|---|
| CC-3-V1 | 12.00% | Clearing point [° C.]: | 75.2 |
| CC-4-V1 | 5.50% | $\Delta n$ [589 nm, 20° C.]: | 0.0810 |
| CCH-301 | 9.50% | $\varepsilon_{\parallel}$ [1 kHz, 20° C.]: | 3.4 |
| CCH-303 | 6.00% | $\varepsilon_{\perp}$ [1 kHz, 20° C.]: | 6.2 |
| CCH-34 | 5.00% | $\Delta\varepsilon$ [1 kHz, 20° C.]: | −2.9 |
| CCH-35 | 6.50% | $K_1$ [pN, 20° C.]: | 14.3 |
| CCY-3-1 | 3.00% | $K_3$ [pN, 20° C.]: | 15.7 |
| CCY-3-O1 | 7.50% | $V_0$ [V, 20° C.]: | 2.47 |
| CCY-3-O2 | 12.00% | $\gamma_1$ [mPa s, 20° C.]: | 105 |
| CPY-2-O2 | 4.50% | | |
| CPY-3-O2 | 4.50% | | |
| CY-3-O2 | 9.50% | | |
| CY-3-O4 | 8.50% | | |
| PCH-302 | 5.00% | | |
| PY-3-O2 | 1.00% | | |

Example 243

| | | | |
|---|---|---|---|
| CC-3-V1 | 8.00% | Clearing point [° C.]: | 75 |
| CC-4-V1 | 20.00% | $\varepsilon_{\parallel}$ [1 kHz, 20° C.]: | 0.1028 |
| CCH-34 | 7.00% | $\varepsilon_{\perp}$ [1 kHz, 20° C.]: | 3.5 |
| CCH-35 | 7.00% | $\Delta\varepsilon$ [1 kHz, 20° C.]: | 7.0 |
| CCY-3-O2 | 10.00% | $K_1$ [pN, 20° C.]: | −3.5 |
| CPY-2-O2 | 8.00% | $K_3$ [pN, 20° C.]: | 14.9 |
| CPY-3-O2 | 11.00% | $V_0$ [V, 20° C.]: | 16.1 |
| CY-3-O2 | 14.00% | $\gamma_1$ [mPa s, 20° C.]: | 2.28 |
| PY-3-O2 | 15.00% | $\varepsilon_{\parallel}$ [1 kHz, 20° C.]: | 112 |
| | | LTS bulk [h, −20° C.]: | >1000 h |

Example 244

| | | | |
|---|---|---|---|
| B(S)-2O-O4 | 2.00% | Clearing point [° C.]: | 75.2 |
| CC-3-V1 | 9.00% | $\Delta n$ [589 nm, 20° C.]: | 0.1025 |

-continued

| | | | |
|---|---|---|---|
| CC-4-V1 | 20.00% | $\varepsilon_{\parallel}$ [1 kHz, 20° C.]: | 3.5 |
| CCH-34 | 7.00% | $\varepsilon_{\perp}$ [1 kHz, 20° C.]: | 6.9 |
| CCH-35 | 5.00% | Δε [1 kHz, 20° C.]: | −3.4 |
| CCP-V2-1 | 3.50% | $K_1$ [pN, 20° C.]: | 14.8 |
| CCY-3-O2 | 4.00% | $K_3$ [pN, 20° C.]: | 15.6 |
| CPY-2-O2 | 10.00% | $V_0$ [V, 20° C.]: | 2.26 |
| CPY-3-O2 | 11.00% | $\gamma_1$ [mPa s, 20° C.]: | 108 |
| CY-3-O2 | 15.00% | LTS bulk [h, −20° C.]: | >1000 h |
| CY-5-O2 | 3.50% | | |
| PY-3-O2 | 10.00% | | |

Example 245

| | | | |
|---|---|---|---|
| CY-3-O2 | 20.00% | Clearing point [° C.]: | 75 |
| CY-5-O2 | 9.00% | Δn [589 nm, 20° C.]: | 0.0827 |
| CCY-3-O2 | 5.00% | $\varepsilon_{\parallel}$ [1 kHz, 20° C.]: | 3.6 |
| CCY-3-O3 | 8.00% | $\varepsilon_{\perp}$ [1 kHz, 20° C.]: | 7.3 |
| CCY-4-O2 | 10.00% | Δε [1 kHz, 20° C.]: | −3.7 |
| CPY-2-O2 | 10.00% | $K_1$ [pN, 20° C.]: | 13.8 |
| CC-5-V | 20.00% | $K_3$ [pN, 20° C.]: | 14.2 |
| CC-3-V1 | 5.00% | $V_0$ [V, 20° C.]: | 2.08 |
| CCH-35 | 5.00% | $\gamma_1$ [mPa s, 20° C.]: | 110 |
| CC-4-V1 | 8.00% | | |

Example 246

| | | | |
|---|---|---|---|
| CLP-V-1 | 5.00% | Clearing point [° C.]: | 87 |
| CCP-V-1 | 6.00% | Δn [589 nm, 20° C.]: | 0.1045 |
| CLY-2-O4 | 2.00% | $\varepsilon_{\parallel}$ [1 kHz, 20° C.]: | 3.8 |
| CLY-3-O2 | 8.00% | $\varepsilon_{\perp}$ [1 kHz, 20° C.]: | 8.1 |
| CLY-3-O3 | 5.00% | Δε [1 kHz, 20° C.]: | −4.3 |
| CLY-4-O2 | 5.00% | $K_1$ [pN, 20° C.]: | 18.9 |
| CLY-5-O2 | 3.00% | $K_3$ [pN, 20° C.]: | 16.1 |
| CPY-3-O2 | 6.50% | $V_0$ [V, 20° C.]: | 2.04 |
| B(S)-2O-O4 | 4.00% | $\gamma_1$ [mPa s, 20° C.]: | 116 |
| B(S)-2O-O5 | 5.00% | | |
| B(S)-2O-O6 | 3.00% | | |
| CC-3-V1 | 8.00% | | |
| CC-4-V1 | 20.00% | | |
| CCH-23 | 9.50% | | |
| Y-4O-O4 | 10.00% | | |

Example M247

| | | | |
|---|---|---|---|
| CLP-1V-1 | 5.00% | Clearing point [° C.]: | 88.5 |
| CCP-V-1 | 6.00% | Δn [589 nm, 20° C.]: | 0.1049 |
| CLY-2-O4 | 2.00% | $\varepsilon_{\parallel}$ [1 kHz, 20° C.]: | 3.7 |
| CLY-3-O2 | 8.00% | $\varepsilon_{\perp}$ [1 kHz, 20° C.]: | 8.1 |
| CLY-3-O3 | 5.00% | Δε [1 kHz, 20° C.]: | −4.3 |
| CLY-4-O2 | 5.00% | $K_1$ [pN, 20° C.]: | 19.2 |
| CLY-5-O2 | 3.00% | $K_3$ [pN, 20° C.]: | 17.0 |
| CPY-3-O2 | 6.50% | $V_0$ [V, 20° C.]: | 2.09 |
| B(S)-2O-O4 | 4.00% | $\gamma_1$ [mPa s, 20° C.]: | 121 |
| B(S)-2O-O5 | 5.00% | | |
| B(S)-2O-O6 | 3.00% | | |
| CC-3-V1 | 8.00% | | |
| CC-4-V1 | 20.00% | | |
| CCH-23 | 9.50% | | |
| Y-4O-O4 | 10.00% | | |

Example M248

| | | | |
|---|---|---|---|
| B(S)-2O-O4 | 4.00% | Clearing point [° C.]: | 74.5 |
| B(S)-2O-O5 | 5.00% | Δn [589 nm, 20° C.]: | 0.1358 |
| CC-3-V | 20.00% | $\varepsilon_{\parallel}$ [1 kHz, 20° C.]: | 3.6 |
| CC-3-V1 | 7.00% | $\varepsilon_{\perp}$ [1 kHz, 20° C.]: | 6.8 |
| CC-4-V1 | 8.50% | Δε [1 kHz, 20° C.]: | −3.1 |
| PP-1-2V1 | 4.50% | $K_1$ [pN, 20° C.]: | 15.5 |
| PY-1-O2 | 10.00% | $K_3$ [pN, 20° C.]: | 16.0 |
| PY-3-O2 | 6.50% | $V_0$ [V, 20° C.]: | 2.38 |
| CCP-3-1 | 10.00% | $\gamma_1$ [mPa s, 20° C.]: | 94 |
| CPY-3-O2 | 11.50% | LTS bulk [h, −20° C.]: | >1000 h |
| PGIY-2-O4 | 5.00% | LTS bulk [h, −25° C.]: | >1000 h |
| PYP-2-3 | 8.00% | | |

Example M249

| | | | |
|---|---|---|---|
| B(S)-2O-O4 | 4.00% | Clearing point [° C.]: | 74 |
| B(S)-2O-O5 | 5.00% | Δn [589 nm, 20° C.]: | 0.1368 |
| CC-3-V | 25.00% | $\varepsilon_{\parallel}$ [1 kHz, 20° C.]: | 3.7 |
| CC-3-V1 | 7.00% | $\varepsilon_{\perp}$ [1 kHz, 20° C.]: | 6.8 |
| CC-4-V1 | 1.50% | Δε [1 kHz, 20° C.]: | −3.2 |
| PP-1-2V1 | 7.00% | $K_1$ [pN, 20° C.]: | 15.6 |
| PY-1-O2 | 10.00% | $K_3$ [pN, 20° C.]: | 16.0 |
| PY-3-O2 | 4.50% | $V_0$ [V, 20° C.]: | 2.38 |
| CCP-3-1 | 10.50% | $\gamma_1$ [mPa s, 20° C.]: | 93 |
| CPY-2-O2 | 4.50% | LTS bulk [h, −20° C.]: | >1000 h |
| CPY-3-O2 | 10.00% | LTS bulk [h, −25° C.]: | >1000 h |
| PGIY-2-O4 | 6.00% | | |
| PYP-2-3 | 5.00% | | |

Example M250

| | | | |
|---|---|---|---|
| B(S)-2O-O4 | 4.00% | Clearing point [° C.]: | 74 |
| B(S)-2O-O5 | 5.00% | Δn [589 nm, 20° C.]: | 0.1347 |
| CC-3-V | 21.50% | $\varepsilon_{\parallel}$ [1 kHz, 20° C.]: | 3.6 |
| CC-4-V1 | 10.00% | $\varepsilon_{\perp}$ [1 kHz, 20° C.]: | 6.7 |
| CCP-3-1 | 13.00% | Δε [1 kHz, 20° C.]: | −3.1 |
| CPY-3-O2 | 10.50% | $K_1$ [pN, 20° C.]: | 15.4 |
| CPY-2-O2 | 4.00% | $K_3$ [pN, 20° C.]: | 15.7 |
| PP-1-2V1 | 6.00% | $V_0$ [V, 20° C.]: | 2.38 |
| PY-1-O2 | 8.00% | $\gamma_1$ [mPa s, 20° C.]: | 93 |
| PY-3-O2 | 10.00% | LTS bulk [h, −20° C.]: | >1000 h |
| PYP-2-3 | 8.00% | | |

Example M251

| | | | |
|---|---|---|---|
| B(S)-2O-O4 | 4.00% | Clearing point [° C.]: | 73.5 |
| B(S)-2O-O5 | 5.00% | Δn [589 nm, 20° C.]: | 0.1334 |
| CC-4-V1 | 30.00% | $\varepsilon_{\parallel}$ [1 kHz, 20° C.]: | 3.6 |
| CCH-35 | 4.00% | $\varepsilon_{\perp}$ [1 kHz, 20° C.]: | 6.7 |
| CCP-3-1 | 13.00% | Δε [1 kHz, 20° C.]: | −3.0 |
| CPY-3-O2 | 7.00% | $K_1$ [pN, 20° C.]: | 15.5 |
| PP-1-2V1 | 3.00% | $K_3$ [pN, 20° C.]: | 14.9 |
| PY-1-O2 | 8.00% | $V_0$ [V, 20° C.]: | 2.34 |
| PY-2-O2 | 7.00% | $\gamma_1$ [mPa s, 20° C.]: | 99 |
| PY-3-O2 | 8.00% | LTS bulk [h, −20° C.]: | >1000 h |
| PYP-2-3 | 7.00% | | |
| PYP-2-4 | 4.00% | | |

Example M252

| | | | |
|---|---|---|---|
| CC-3-V1 | 8.00% | Clearing point [° C.]: | 72 |
| CC-4-V1 | 21.00% | Δn [589 nm, 20° C.]: | 0.1329 |
| CCH-35 | 6.00% | $ε_{\parallel}$ [1 kHz, 20° C.]: | 3.6 |
| CCP-3-1 | 8.00% | $ε_{\perp}$ [1 kHz, 20° C.]: | 6.5 |
| CCY-3-O2 | 8.00% | Δε [1 kHz, 20° C.]: | −2.9 |
| B(S)-2O-O5 | 5.00% | $K_1$ [pN, 20° C.]: | 15.3 |
| B(S)-2O-O4 | 4.00% | $K_3$ [pN, 20° C.]: | 14.5 |
| PP-1-3 | 5.00% | $V_0$ [V, 20° C.]: | 2.37 |
| PY-1-O2 | 10.00% | $γ_1$ [mPa s, 20° C.]: | 95 |
| PY-2-O2 | 8.00% | | |
| PYP-2-3 | 11.00% | | |
| PYP-2-4 | 6.00% | | |

Example M253

| | | | |
|---|---|---|---|
| BCH-32 | 8.00% | Clearing point [° C.]: | 73 |
| CCH-23 | 15.00% | Δn [589 nm, 20° C.]: | 0.1342 |
| CC-4-V1 | 12.50% | $ε_{\parallel}$ [1 kHz, 20° C.]: | 3.6 |
| CCP-3-1 | 12.00% | $ε_{\perp}$ [1 kHz, 20° C.]: | 6.5 |
| CPY-3-O2 | 9.50% | Δε [1 kHz, 20° C.]: | −2.9 |
| PCH-301 | 2.50% | $K_1$ [pN, 20° C.]: | 15.0 |
| PY-1-O2 | 10.00% | $K_3$ [pN, 20° C.]: | 15.0 |
| PY-2-O2 | 8.00% | $V_0$ [V, 20° C.]: | 2.41 |
| PP-1-2V1 | 7.50% | $γ_1$ [mPa s, 20° C.]: | 97 |
| PGIY-2-O4 | 6.00% | LTS bulk [h, −25° C.]: | >1000 h |
| B(S)-2O-O5 | 5.00% | | |
| B(S)-2O-O4 | 4.00% | | |

Example M254

| | | | |
|---|---|---|---|
| B(S)-2O-O4 | 4.00% | Clearing point [° C.]: | 74 |
| B(S)-2O-O5 | 5.00% | Δn [589 nm, 20° C.]: | 0.1278 |
| B(S)-2O-O6 | 2.00% | $ε_{\parallel}$ [1 kHz, 20° C.]: | 3.6 |
| CC-4-V1 | 18.00% | $ε_{\perp}$ [1 kHz, 20° C.]: | 6.7 |
| CCH-35 | 6.00% | Δε [1 kHz, 20° C.]: | −3.1 |
| PP-1-3 | 8.00% | $K_1$ [pN, 20° C.]: | 16.5 |
| PP-1-4 | 4.50% | $K_3$ [pN, 20° C.]: | 15.8 |
| PY-1-O2 | 10.00% | $V_0$ [V, 20° C.]: | 2.38 |
| PY-2-O2 | 8.00% | $γ_1$ [mPa s, 20° C.]: | 105 |
| CCP-3-1 | 13.00% | LTS bulk [h, −20° C.]: | >1000 h |
| CCP-3-3 | 7.50% | | |
| CCY-3-O2 | 10.00% | | |
| PGIY-2-O4 | 4.00% | | |

Example M255

| | | | |
|---|---|---|---|
| B(S)-2O-O4 | 4.00% | Clearing point [° C.]: | 73 |
| B(S)-2O-O5 | 5.00% | Δn [589 nm, 20° C.]: | 0.1348 |
| B(S)-2O-O6 | 2.00% | $ε_{\parallel}$ [1 kHz, 20° C.]: | 3.5 |
| CC-4-V1 | 18.00% | $ε_{\perp}$ [1 kHz, 20° C.]: | 6.6 |
| CCH-35 | 6.00% | Δε [1 kHz, 20° C.]: | −3.0 |
| PP-1-3 | 8.00% | $K_1$ [pN, 20° C.]: | 16.2 |
| PP-1-4 | 4.50% | $K_3$ [pN, 20° C.]: | 15.5 |
| PY-1-O2 | 10.00% | $V_0$ [V, 20° C.]: | 2.38 |
| PY-2-O2 | 8.00% | $γ_1$ [mPa s, 20° C.]: | 105 |
| CCP-3-1 | 13.00% | LTS bulk [h, −25° C.]: | >1000 h |
| CCP-3-3 | 7.50% | | |
| CPY-3-O2 | 10.00% | | |
| PGIY-2-O4 | 4.00% | | |

Example M256

For the preparation of a PS (polymer stabilised) mixture, for example for PS-VA, PS-IPS or PS-FFS displays, the mixture according to Example M255 is mixed with 0.3% of the polymerisable compound of the formula

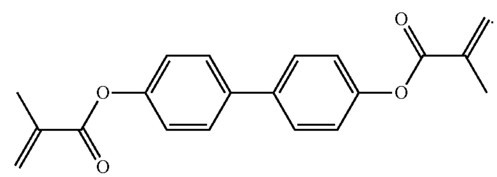 [SMILES: C=C(C)C(=O)Oc1ccc(-c2ccc(OC(=O)C(=C)C)cc2)cc1]

Example M257

For the preparation of a PS (polymer stabilised) mixture, for example for PS-VA, PS-IPS or PS-FFS displays, the mixture according to Example M255 is mixed with 0.3% of the polymerisable compound of the formula

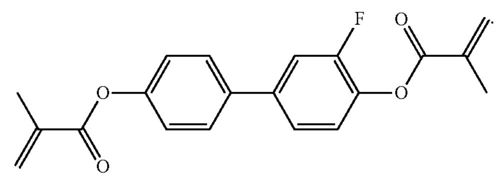

Example M258

For the preparation of a PS (polymer stabilised) mixture, for example for PS-VA, PS-IPS or PS-FFS displays, the mixture according to Example M255 is mixed with 0.3% of the polymerisable compound of the formula

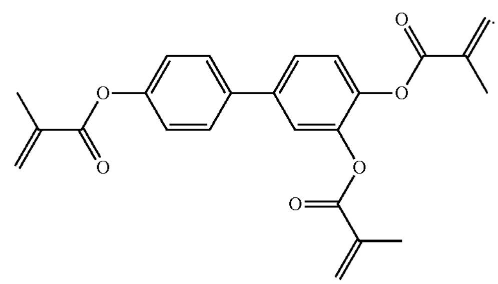 [SMILES: C=C(C)C(=O)Oc1ccc(-c2ccc(OC(=O)C(=C)C)c(OC(=O)C(=C)C)c2)cc1]

Example M259

| | | | |
|---|---|---|---|
| B(S)-2O-O4 | 4.00% | Clearing point [° C.]: | 72.5 |
| B(S)-2O-O5 | 4.50% | Δn [589 nm, 20° C.]: | 0.1340 |
| B(S)-2O-O6 | 2.00% | $ε_{\parallel}$ [1 kHz, 20° C.]: | 3.7 |
| CC-4-V1 | 20.00% | $ε_{\perp}$ [1 kHz, 20° C.]: | 6.8 |
| CCH-35 | 5.50% | Δε [1 kHz, 20° C.]: | −3.1 |
| PP-1-3 | 8.00% | $K_1$ [pN, 20° C.]: | 15.7 |
| PY-1-O2 | 10.00% | $K_3$ [pN, 20° C.]: | 15.0 |
| PY-2-O2 | 11.00% | $V_0$ [V, 20° C.]: | 2.33 |
| CCP-3-1 | 11.00% | $γ_1$ [mPa s, 20° C.]: | 104 |
| CCP-3-3 | 10.00% | | |
| CPY-3-O2 | 5.50% | | |
| PGIY-2-O4 | 4.50% | | |
| PYP-2-3 | 4.00% | | |

Example M260

| | | | |
|---|---|---|---|
| B(S)-2O-O4 | 4.00% | Clearing point [° C.]: | 75 |
| B(S)-2O-O5 | 5.00% | Δn [589 nm, 20° C.]: | 0.1340 |
| B(S)-2O-O6 | 2.50% | $\varepsilon_{\parallel}$ [1 kHz, 20° C.]: | 3.6 |
| CC-3-V | 10.00% | $\varepsilon_{\perp}$ [1 kHz, 20° C.]: | 6.6 |
| CC-3-V1 | 7.00% | Δε [1 kHz, 20° C.]: | −3.0 |
| CC-4-V1 | 18.00% | $K_1$ [pN, 20° C.]: | 15.8 |
| PP-1-2V1 | 6.00% | $K_3$ [pN, 20° C.]: | 15.8 |
| PY-1-O2 | 9.00% | $V_0$ [V, 20° C.]: | 2.42 |
| PY-2-O2 | 9.00% | $\gamma_1$ [mPa s, 20° C.]: | 91 |
| BCH-32 | 7.00% | | |
| CCP-3-1 | 7.50% | | |
| CPY-3-O2 | 11.00% | | |
| PYP-2-3 | 4.00% | | |

Example M261

| | | | |
|---|---|---|---|
| B(S)-2O-O4 | 4.00% | Clearing point [° C.]: | 74.5 |
| B(S)-2O-O5 | 5.00% | Δn [589 nm, 20° C.]: | 0.1343 |
| B(S)-2O-O6 | 2.50% | $\varepsilon_{\parallel}$ [1 kHz, 20° C.]: | 3.6 |
| CC-3-V1 | 7.00% | $\varepsilon_{\perp}$ [1 kHz, 20° C.]: | 6.7 |
| CC-4-V1 | 7.50% | Δε [1 kHz, 20° C.]: | −3.1 |
| CCH-23 | 16.50% | $K_1$ [pN, 20° C.]: | 15.9 |
| PP-1-2V1 | 7.00% | $K_3$ [pN, 20° C.]: | 15.7 |
| PY-1-O2 | 9.00% | $V_0$ [V, 20° C.]: | 2.38 |
| PY-2-O2 | 8.00% | $\gamma_1$ [mPa s, 20° C.]: | 98 |
| BCH-32 | 7.00% | | |
| CCP-3-1 | 10.50% | | |
| CPY-3-O2 | 11.00% | | |
| PGIY-2-O4 | 3.00% | | |
| PYP-2-3 | 2.00% | | |

Example M262

| | | | |
|---|---|---|---|
| B(S)-2O-O4 | 4.00% | Clearing point [° C.]: | 73.5 |
| B(S)-2O-O5 | 4.00% | Δn [589 nm, 20° C.]: | 0.1338 |
| B(S)-2O-O6 | 2.50% | $\varepsilon_{\parallel}$ [1 kHz, 20° C.]: | 3.6 |
| CC-3-V | 12.50% | $\varepsilon_{\perp}$ [1 kHz, 20° C.]: | 6.8 |
| CC-4-V1 | 19.00% | Δε [1 kHz, 20° C.]: | −3.2 |
| CCP-3-1 | 13.50% | $K_1$ [pN, 20° C.]: | 16.1 |
| CPY-2-O2 | 5.00% | $K_3$ [pN, 20° C.]: | 16.1 |
| CPY-3-O2 | 8.50% | $V_0$ [V, 20° C.]: | 2.38 |
| PP-1-2V1 | 8.00% | $\gamma_1$ [mPa s, 20° C.]: | 96 |
| PY-1-O2 | 9.00% | | |
| PY-3-O2 | 10.00% | | |
| PYP-2-3 | 4.00% | | |

Example M263

| | | | |
|---|---|---|---|
| B(S)-2O-O4 | 3.50% | Clearing point [° C.]: | 74 |
| B(S)-2O-O5 | 4.00% | Δn [589 nm, 20° C.]: | 0.1356 |
| B(S)-2O-O6 | 3.00% | $\varepsilon_{\parallel}$ [1 kHz, 20° C.]: | 3.6 |
| BCH-32 | 8.00% | $\varepsilon_{\perp}$ [1 kHz, 20° C.]: | 6.6 |
| CC-4-V1 | 12.00% | Δε [1 kHz, 20° C.]: | −3.0 |
| CCH-23 | 14.00% | $K_1$ [pN, 20° C.]: | 15.3 |
| CCP-3-1 | 14.00% | $K_3$ [pN, 20° C.]: | 15.0 |
| CPY-3-O2 | 7.50% | $V_0$ [V, 20° C.]: | 2.38 |
| PCH-301 | 3.00% | $\gamma_1$ [mPa s, 20° C.]: | 99 |
| PGIY-2-O4 | 6.00% | LTS bulk [h, −20° C.]: | >1000 h |
| PP-1-2V1 | 7.00% | | |
| PY-1-O2 | 9.50% | | |
| PY-2-O2 | 8.50% | | |

Example M264

| | | | |
|---|---|---|---|
| B(S)-2O-O4 | 3.00% | Clearing point [° C.]: | 74.5 |
| B(S)-2O-O5 | 3.00% | Δn [589 nm, 20° C.]: | 0.1341 |
| CC-3-V | 13.00% | $\varepsilon_{\parallel}$ [1 kHz, 20° C.]: | 3.6 |
| CC-3-V1 | 8.00% | $\varepsilon_{\perp}$ [1 kHz, 20° C.]: | 6.7 |
| CC-4-V1 | 18.00% | Δε [1 kHz, 20° C.]: | −3.1 |
| PP-1-2V1 | 8.00% | $K_1$ [pN, 20° C.]: | 15.6 |
| PY-1-O2 | 10.00% | $K_3$ [pN, 20° C.]: | 16.0 |
| PY-3-O2 | 5.00% | $V_0$ [V, 20° C.]: | 2.39 |
| CCP-3-1 | 3.00% | $\gamma_1$ [mPa s, 20° C.]: | 99 |
| CPY-2-O2 | 9.00% | | |
| CPY-3-O2 | 12.00% | | |
| PGIY-2-O4 | 6.50% | | |
| PYP-2-3 | 1.50% | | |

Example M265

| | | | |
|---|---|---|---|
| B(S)-2O-O4 | 3.00% | Clearing point [° C.]: | 74.5 |
| B(S)-2O-O5 | 4.00% | Δn [589 nm, 20° C.]: | 0.1331 |
| CC-3-V | 10.00% | $\varepsilon_{\parallel}$ [1 kHz, 20° C.]: | 3.6 |
| CC-3-V1 | 8.00% | $\varepsilon_{\perp}$ [1 kHz, 20° C.]: | 6.7 |
| CC-4-V1 | 22.00% | Δε [1 kHz, 20° C.]: | −3.1 |
| PP-1-2V1 | 8.00% | $K_1$ [pN, 20° C.]: | 15.8 |
| PY-1-O2 | 10.00% | $K_3$ [pN, 20° C.]: | 16.0 |
| PY-3-O2 | 5.00% | $V_0$ [V, 20° C.]: | 2.40 |
| CCP-3-1 | 3.00% | $\gamma_1$ [mPa s, 20° C.]: | 98 |
| CPY-2-O2 | 6.00% | | |
| CPY-3-O2 | 12.00% | | |
| PGIY-2-O4 | 7.00% | | |
| PYP-2-3 | 2.00% | | |

Example M266

| | | | |
|---|---|---|---|
| CC-3-V1 | 7.00% | Clearing point [° C.]: | 74 |
| CCH-35 | 4.00% | Δn [589 nm, 20° C.]: | 0.1334 |
| CC-4-V1 | 19.00% | $\varepsilon_{\parallel}$ [1 kHz, 20° C.]: | 3.7 |
| CCP-3-1 | 5.00% | $\varepsilon_{\perp}$ [1 kHz, 20° C.]: | 6.7 |
| CCY-3-O1 | 6.50% | Δε [1 kHz, 20° C.]: | −3.0 |
| CCY-3-O2 | 11.00% | $K_1$ [pN, 20° C.]: | 16.1 |
| CY-3-O2 | 1.00% | $K_3$ [pN, 20° C.]: | 16.1 |
| PP-1-2V1 | 10.00% | $V_0$ [V, 20° C.]: | 2.47 |
| PY-1-O2 | 8.00% | $\gamma_1$ [mPa s, 20° C.]: | 112 |
| PY-3-O2 | 7.00% | LTS bulk [h, −20° C.]: | >1000 h |
| PY-2-O2 | 7.00% | | |
| PYP-2-3 | 6.00% | | |
| PGIY-2-O4 | 8.50% | | |

Example M267

| | | | |
|---|---|---|---|
| CC-4-V1 | 14.00% | Clearing point [° C.]: | 73.5 |
| CC-3-V | 10.00% | Δn [589 nm, 20° C.]: | 0.1337 |
| CCP-3-1 | 12.00% | $\varepsilon_{\parallel}$ [1 kHz, 20° C.]: | 3.6 |
| CCY-3-O1 | 5.00% | $\varepsilon_{\perp}$ [1 kHz, 20° C.]: | 6.5 |
| CCY-3-O2 | 11.00% | Δε [1 kHz, 20° C.]: | −2.9 |
| CY-3-O2 | 2.50% | $K_1$ [pN, 20° C.]: | 15.1 |
| PP-1-2V1 | 10.00% | $K_3$ [pN, 20° C.]: | 16.3 |
| PY-1-O2 | 7.50% | $V_0$ [V, 20° C.]: | 2.50 |
| PY-3-O2 | 7.00% | $\gamma_1$ [mPa s, 20° C.]: | 107 |
| PY-2-O2 | 7.00% | LTS bulk [h, −20° C.]: | >1000 h |
| PYP-2-3 | 8.00% | | |
| PGIY-2-O4 | 6.00% | | |

Example M268

| | | | |
|---|---|---|---|
| CC-3-V1 | 7.00% | Clearing point [° C.]: | 73 |
| CC-4-V1 | 22.00% | Δn [589 nm, 20° C.]: | 0.1342 |
| CCP-3-1 | 14.00% | $\varepsilon_{\parallel}$ [1 kHz, 20° C.]: | 3.6 |
| CCY-3-O2 | 4.00% | $\varepsilon_{\perp}$ [1 kHz, 20° C.]: | 6.6 |
| CY-3-O2 | 8.50% | Δε [1 kHz, 20° C.]: | −3.1 |
| PP-1-2V1 | 8.00% | $K_1$ [pN, 20° C.]: | 15.8 |
| PY-1-O2 | 8.00% | $K_3$ [pN, 20° C.]: | 16.5 |
| PY-3-O2 | 7.00% | $V_0$ [V, 20° C.]: | 2.46 |
| PYP-2-3 | 8.00% | $\gamma_1$ [mPa s, 20° C.]: | 102 |
| PGIY-2-O4 | 6.50% | LTS bulk [h, −20° C.]: | >1000 h |
| B(S)-2O-O4 | 3.00% | | |
| B(S)-2O-O5 | 4.00% | | |

Example M269

| | | | |
|---|---|---|---|
| CY-3-O4 | 17.50% | Clearing point [° C.]: | 86.5 |
| CLY-2-O4 | 4.00% | Δn [589 nm, 20° C.]: | 0.1087 |
| CLY-3-O2 | 6.00% | $\varepsilon_{\parallel}$ [1 kHz, 20° C.]: | 3.5 |
| CLY-3-O3 | 5.00% | $\varepsilon_{\perp}$ [1 kHz, 20° C.]: | 7.7 |
| CLY-4-O2 | 4.00% | Δε [1 kHz, 20° C.]: | −4.2 |
| CLY-5-O2 | 4.00% | $K_1$ [pN, 20° C.]: | 17.2 |
| CPY-3-O2 | 8.00% | $K_3$ [pN, 20° C.]: | 16.1 |
| PYP-2-3 | 6.50% | $V_0$ [V, 20° C.]: | 2.07 |
| B(S)-2O-O5 | 4.00% | $\gamma_1$ [mPa s, 20° C.]: | 136 |
| B(S)-2O-O4 | 4.00% | LTS bulk [h, −20° C.]: | >1000 h |
| CC-4-V1 | 19.00% | LTS bulk [h, −25° C.]: | >1000 h |
| CC-3-V1 | 8.00% | LTS bulk [h, −30° C.]: | >1000 h |
| CCH-23 | 10.00% | | |

Example M270

For the preparation of a PS (polymer stabilised) mixture, for example for PS-VA, PS-IPS or PS-FFS displays, the mixture according to Example M269 is mixed with 0.3% of the polymerisable compound of the formula

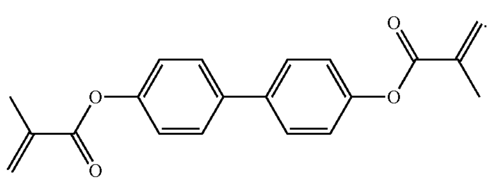 [SMILES: C=C(C)C(=O)Oc1ccc(-c2ccc(OC(=O)C(=C)C)cc2)cc1]

Example M271

For the preparation of a PS (polymer stabilised) mixture, for example for PS-VA, PS-IPS or PS-FFS displays, the mixture according to Example M269 is mixed with 0.3% of the polymerisable compound of the formula

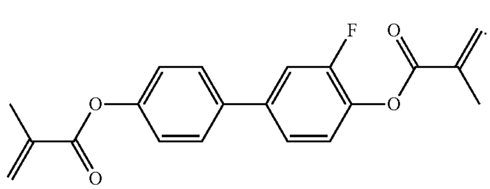

Example M272

For the preparation of a PS (polymer stabilised) mixture, for example for PS-VA, PS-IPS or PS-FFS displays, the mixture according to Example M269 is mixed with 0.3% of the polymerisable compound of the formula

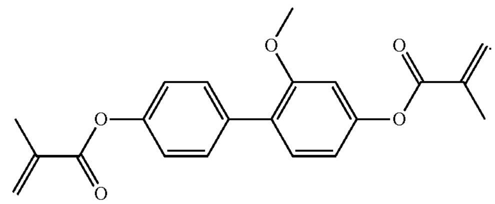 [SMILES: C=C(C)C(=O)Oc1ccc(-c2ccc(OC(=O)C(=C)C)cc2OC)cc1]

Example M273

| | | | |
|---|---|---|---|
| CCH-23 | 16.50% | Clearing point [° C.]: | 76 |
| CC-3-V1 | 8.00% | Δn [589 nm, 20° C.]: | 0.1026 |
| CC-4-V1 | 22.00% | $\varepsilon_{\parallel}$ [1 kHz, 20° C.]: | 3.5 |
| CLY-2-O4 | 4.00% | $\varepsilon_{\perp}$[1 kHz, 20° C.]: | 7.3 |
| CLY-3-O2 | 6.00% | Δε [1 kHz, 20° C.]: | −3.7 |
| CLY-3-O3 | 5.00% | $K_1$ [pN, 20° C.]: | 16.3 |
| CLY-4-O2 | 4.00% | $K_3$ [pN, 20° C.]: | 15.1 |
| CLY-5-O2 | 4.00% | $V_0$ [V, 20° C.]: | 2.12 |
| CPY-3-O2 | 3.00% | $\gamma_1$ [mPa s, 20° C.]: | 95 |
| CY-3-O2 | 4.50% | LTS bulk [h, −20° C.]: | >1000 h |
| PY-3-O2 | 6.00% | | |
| PY-1-O2 | 9.00% | | |
| B(S)-2O-O5 | 4.00% | | |
| B(S)-2O-O4 | 4.00% | | |

Example M274

For the preparation of a PS (polymer stabilised) mixture, for example for PS-VA, PS-IPS or PS-FFS displays, the mixture according to Example M273 is mixed with 0.3% of the polymerisable compound of the formula

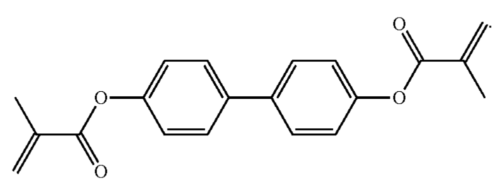

Example M395

For the preparation of a PS (polymer stabilised) mixture, for example for PS-VA, PS-IPS or PS-FFS displays, the mixture according to Example M273 is mixed with 0.25% of the polymerisable compound of the formula

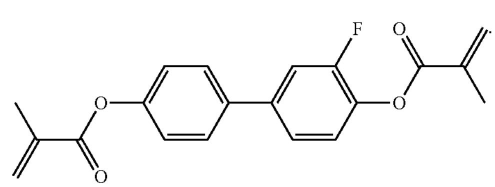

Example M276

| | | | |
|---|---|---|---|
| CVCP-V-O1 | 4.00% | Clearing point [° C.]: | 89 |
| CCP-V-1 | 6.50% | Δn [589 nm, 20° C.]: | 0.1043 |
| CLY-3-O2 | 8.00% | $\varepsilon_{\parallel}$ [1 kHz, 20° C.]: | 3.8 |
| CLY-4-O2 | 8.00% | $\varepsilon_{\perp}$ [1 kHz, 20° C.]: | 8.0 |
| CLY-5-O2 | 7.00% | Δε [1 kHz, 20° C.]: | −4.3 |
| CPY-3-O2 | 6.50% | $K_1$ [pN, 20° C.]: | 17.5 |
| B(S)-2O-O4 | 4.00% | $K_3$ [pN, 20° C.]: | 16.8 |
| B(S)-2O-O5 | 5.00% | $V_0$ [V, 20° C.]: | 2.10 |
| B(S)-2O-O6 | 3.00% | $\gamma_1$ [mPa s, 20° C.]: | 112 |
| CC-3-V1 | 8.00% | | |
| CC-4-V1 | 20.00% | | |
| CC-3-V | 10.00% | | |
| Y-4O-O4 | 10.00% | | |

Example M277

| | | | |
|---|---|---|---|
| CCP-3-1 | 3.00% | Clearing point [° C.]: | 88.5 |
| CCP-V-1 | 2.50% | Δn [589 nm, 20° C.]: | 0.1061 |
| CLY-3-O2 | 8.00% | $\varepsilon_{\parallel}$ [1 kHz, 20° C.]: | 4.3 |
| CLY-4-O2 | 8.00% | $\varepsilon_{\perp}$ [1 kHz, 20° C.]: | 8.4 |
| CLY-5-O2 | 7.00% | Δε [1 kHz, 20° C.]: | −4.1 |
| CPY-3-O2 | 6.50% | $K_1$ [pN, 20° C.]: | 17.4 |
| B(S)-2O-O4 | 4.00% | $K_3$ [pN, 20° C.]: | 15.9 |
| B(S)-2O-O5 | 6.00% | $V_0$ [V, 20° C.]: | 2.08 |
| B(S)-2O-O6 | 3.00% | $\gamma_1$ [mPa s, 20° C.]: | 115 |
| CC-3-V1 | 8.00% | | |
| CC-4-V1 | 20.00% | | |
| CC-3-V | 6.00% | | |
| Y-4O-O4 | 10.00% | | |
| CCG-V-F | 8.00% | | |

Example M278

| | | | |
|---|---|---|---|
| CCH-23 | 9.50% | Clearing point [° C.]: | 75 |
| CC-3-V1 | 8.00% | Δn [589 nm, 20° C.]: | 0.1029 |
| CC-4-V1 | 20.00% | $\varepsilon_{\parallel}$ [1 kHz, 20° C.]: | 3.6 |
| CCP-V-1 | 3.50% | $\varepsilon_{\perp}$ [1 kHz, 20° C.]: | 7.2 |
| CLY-2-O4 | 4.00% | Δε [1 kHz, 20° C.]: | −3.7 |
| CLY-3-O2 | 6.00% | $K_1$ [pN, 20° C.]: | 15.2 |
| CLY-3-O3 | 5.00% | $K_3$ [pN, 20° C.]: | 15.8 |
| CLY-4-O2 | 4.00% | $V_0$ [V, 20° C.]: | 2.20 |
| CLY-5-O2 | 4.00% | $\gamma_1$ [mPa s, 20° C.]: | 107 |
| CPY-3-O2 | 6.50% | LTS bulk [h, −20° C.]: | >1000 h |
| CY-3-O2 | 12.50% | LTS bulk [h, −25° C.]: | >1000 h |
| PY-3-O2 | 8.00% | LTS bulk [h, −30° C.]: | >1000 h |
| PY-1-O2 | 9.00% | | |

Example M279

| | | | |
|---|---|---|---|
| CLP-1V-1 | 5.50% | Clearing point [° C.]: | 87 |
| CCP-V-1 | 7.50% | Δn [589 nm, 20° C.]: | 0.1085 |
| CLY-3-O2 | 7.00% | $\varepsilon_{\parallel}$ [1 kHz, 20° C.]: | 3.8 |
| CLY-4-O2 | 8.00% | $\varepsilon_{\perp}$ [1 kHz, 20° C.]: | 7.9 |
| CLY-5-O2 | 4.00% | Δε [1 kHz, 20° C.]: | −4.1 |
| CPY-3-O2 | 6.00% | $K_1$ [pN, 20° C.]: | 18.0 |
| B(S)-2O-O4 | 4.50% | $K_3$ [pN, 20° C.]: | 17.7 |
| B(S)-2O-O5 | 5.00% | $V_0$ [V, 20° C.]: | 2.20 |
| B(S)-2O-O6 | 3.00% | $\gamma_1$ [mPa s, 20° C.]: | 110 |
| CC-3-V1 | 8.50% | LTS bulk [h, −20° C.]: | >1000 h |
| CC-4-V1 | 20.00% | | |
| CC-V-V1 | 10.00% | | |
| Y-4O-O4 | 11.00% | | |

Example M280

| | | | |
|---|---|---|---|
| CCP-3-1 | 3.50% | Clearing point [° C.]: | 89.5 |
| CCP-V-1 | 8.50% | Δn [589 nm, 20° C.]: | 0.1061 |
| CLY-3-O2 | 8.00% | $\varepsilon_{\parallel}$ [1 kHz, 20° C.]: | 3.7 |
| CLY-4-O2 | 8.00% | $\varepsilon_{\perp}$ [1 kHz, 20° C.]: | 7.9 |
| CLY-5-O2 | 6.00% | Δε [1 kHz, 20° C.]: | −4.2 |
| CPY-3-O2 | 6.50% | $K_1$ [pN, 20° C.]: | 18.2 |
| B(S)-2O-O4 | 4.00% | $K_3$ [pN, 20° C.]: | 17.8 |
| B(S)-2O-O5 | 5.00% | $V_0$ [V, 20° C.]: | 2.18 |
| B(S)-2O-O6 | 3.00% | $\gamma_1$ [mPa s, 20° C.]: | 114 |
| CC-1V-V1 | 8.00% | LTS bulk [h, −20° C.]: | >1000 h |
| CC-4-V1 | 20.00% | | |
| CC-3-V | 9.50% | | |
| Y-4O-O4 | 10.00% | | |

Example M281

| | | | |
|---|---|---|---|
| B(S)-2O-O5 | 4.00% | Clearing point [° C.]: | 73 |
| B(S)-2O-O4 | 4.00% | Δn [589 nm, 20° C.]: | 0.1086 |
| CC-3-V1 | 7.00% | $\varepsilon_{\parallel}$ [1 kHz, 20° C.]: | 3.5 |
| CC-4-V1 | 22.00% | $\varepsilon_{\perp}$ [1 kHz, 20° C.]: | 6.5 |
| CCH-34 | 4.50% | Δε [1 kHz, 20° C.]: | −3.0 |
| CCH-35 | 4.00% | $K_1$ [pN, 20° C.]: | 16.0 |
| PP-1-2V1 | 5.00% | $K_3$ [pN, 20° C.]: | 16.4 |
| CY-3-O2 | 7.50% | $V_0$ [V, 20° C.]: | 2.47 |
| PY-1-O2 | 8.00% | $\gamma_1$ [mPa s, 20° C.]: | 89 |
| PY-2-O2 | 8.00% | | |
| PY-3-O2 | 2.00% | | |
| CCP-31 | 14.00% | | |
| CCY-3-O2 | 10.00% | | |

Example M282

| | | | |
|---|---|---|---|
| CLP-1V-1 | 3.50% | Clearing point [° C.]: | 91.5 |
| CCP-V-1 | 8.50% | Δn [589 nm, 20° C.]: | 0.1084 |
| CLY-3-O2 | 8.00% | $\varepsilon_{\parallel}$ [1 kHz, 20° C.]: | 3.7 |
| CLY-4-O2 | 8.00% | $\varepsilon_{\perp}$ [1 kHz, 20° C.]: | 7.7 |
| CLY-5-O2 | 6.00% | Δε [1 kHz, 20° C.]: | −4.0 |
| CPY-3-O2 | 6.00% | $K_1$ [pN, 20° C.]: | 18.2 |
| B(S)-2O-O4 | 3.50% | $K_3$ [pN, 20° C.]: | 18.9 |
| B(S)-2O-O5 | 4.50% | $V_0$ [V, 20° C.]: | 2.30 |
| B(S)-2O-O6 | 3.00% | $\gamma_1$ [mPa s, 20° C.]: | 115 |
| CC-1V-V1 | 8.00% | LTS bulk [h, −20° C.]: | >1000 h |
| CC-4-V1 | 20.00% | | |
| CC-V-V1 | 11.00% | | |
| Y-4O-O4 | 10.00 | | |

Example M283

| | | | |
|---|---|---|---|
| CC-3-V1 | 7.00% | Clearing point [° C.]: | 74 |
| CC-4-V1 | 22.00% | Δn [589 nm, 20° C.]: | 0.1351 |
| CCP-3-1 | 14.00% | $\varepsilon_{\parallel}$ [1 kHz, 20° C.]: | 3.6 |
| CCY-3-O2 | 5.00% | $\varepsilon_{\perp}$ [1 kHz, 20° C.]: | 6.7 |
| CY-3-O2 | 6.00% | Δε [1 kHz, 20° C.]: | −3.1 |
| PP-1-2V1 | 10.00% | $K_1$ [pN, 20° C.]: | 16.4 |
| PY-1-O2 | 9.00% | $K_3$ [pN, 20° C.]: | 16.9 |
| PY-3-O2 | 8.00% | $V_0$ [V, 20° C.]: | 2.47 |
| PGIY-2-O4 | 14.00% | $\gamma_1$ [mPa s, 20° C.]: | 107 |
| B(S)-2O-O4 | 2.00% | LTS bulk [h, −20° C.]: | >1000 h |
| B(S)-2O-O5 | 3.00% | | |

Example M284

| | | | |
|---|---|---|---|
| CCH-34 | 6.00% | Clearing point [° C.]: | 74.5 |
| CCH-35 | 4.50% | Δn [589 nm, 20° C.]: | 0.1126 |
| CC-4-V1 | 17.00% | $\varepsilon_{\parallel}$ [1 kHz, 20° C.]: | 3.6 |
| CCY-3-O1 | 3.00% | $\varepsilon_{\perp}$ [1 kHz, 20° C.]: | 6.9 |
| CCY-3-O2 | 8.00% | Δε [1 kHz, 20° C.]: | −3.3 |
| CPY-2-O2 | 10.00% | $K_1$ [pN, 20° C.]: | 14.8 |
| CPY-3-O2 | 11.00% | $K_3$ [pN, 20° C.]: | 15.8 |
| CY-3-O2 | 15.50% | $V_0$ [V, 20° C.]: | 2.30 |
| CY-3-O4 | 4.50% | $\gamma_1$ [mPa s, 20° C.]: | 119 |
| PCH-301 | 8.00% | LTS bulk [h, −20° C.]: | >1000 h |
| PGIY-2-O4 | 4.00% | LTS bulk [h, −25° C.]: | >1000 h |
| PP-1-2V1 | 8.50% | | |

Example M285

| | | | |
|---|---|---|---|
| BCH-32 | 2.50% | Clearing point [° C.]: | 73.5 |
| CCP-V2-1 | 4.00% | Δn [589 nm, 20° C.]: | 0.1035 |
| CCY-3-O2 | 11.50% | $\varepsilon_{\parallel}$ [1 kHz, 20° C.]: | 3.5 |
| CLY-3-O2 | 1.00% | $\varepsilon_{\perp}$ [1 kHz, 20° C.]: | 6.8 |
| CPY-3-O2 | 5.00% | Δε [1 kHz, 20° C.]: | −3.3 |
| CC-3-V1 | 11.00% | $K_1$ [pN, 20° C.]: | 15.4 |
| CCH-24 | 8.00% | $K_3$ [pN, 20° C.]: | 15.2 |
| CCH-35 | 4.00% | $V_0$ [V, 20° C.]: | 2.28 |
| CY-3-O2 | 6.50% | $\gamma_1$ [mPa s, 20° C.]: | 90 |
| PY-3-O2 | 6.00% | | |
| PY-1-O2 | 7.50% | | |
| PY-2-O2 | 4.00% | | |
| CC-4-V1 | 22.00% | | |
| B(S)-2O-O4 | 3.00% | | |
| B(S)-2O-O5 | 4.00% | | |

Example 289

| | | | |
|---|---|---|---|
| CCH-301 | 3.50% | Clearing point [° C.]: | 74 |
| CCH-34 | 6.00% | Δn [589 nm, 20° C.]: | 0.1119 |
| CCH-35 | 4.00% | $\varepsilon_{\parallel}$ [1 kHz, 20° C.]: | 3.5 |
| CC-4-V1 | 17.00% | $\varepsilon_{\perp}$ [1 kHz, 20° C.]: | 6.8 |
| CCY-3-O1 | 6.00% | Δε [1 kHz, 20° C.]: | −3.3 |
| CCY-3-O2 | 4.50% | $K_1$ [pN, 20° C.]: | 14.3 |
| CPY-2-O2 | 10.00% | $K_3$ [pN, 20° C.]: | 15.3 |
| CPY-3-O2 | 12.00% | $V_0$ [V, 20° C.]: | 2.28 |
| CY-3-O2 | 15.00% | $\gamma_1$ [mPa s, 20° C.]: | 118 |
| CY-3-O4 | 7.00% | LTS bulk [h, −20° C.]: | >1000 h |
| PCH-301 | 2.00% | | |
| PP-1-2V1 | 9.00% | | |
| PYP-2-3 | 4.00% | | |

Example M287

| | | | |
|---|---|---|---|
| CCH-34 | 7.00% | Clearing point [° C.]: | 74.5 |
| CCH-35 | 6.00% | Δn [589 nm, 20° C.]: | 0.1124 |
| CC-4-V1 | 17.50% | $\varepsilon_{\parallel}$ [1 kHz, 20° C.]: | 3.5 |
| CCY-3-O1 | 7.00% | $\varepsilon_{\perp}$ [1 kHz, 20° C.]: | 6.9 |
| CCY-3-O2 | 2.50% | Δε [1 kHz, 20° C.]: | −3.3 |
| CPY-2-O2 | 10.00% | $K_1$ [pN, 20° C.]: | 14.7 |
| CPY-3-O2 | 11.50% | $K_3$ [pN, 20° C.]: | 15.4 |
| CY-3-O2 | 15.50% | $V_0$ [V, 20° C.]: | 2.27 |
| CY-3-O4 | 7.00% | $\gamma_1$ [mPa s, 20° C.]: | 118 |
| PCH-301 | 2.00% | LTS bulk [h, −20° C.]: | >1000 h |
| PGIY-2-O4 | 4.00% | | |
| PP-1-2V1 | 10.00% | | |

Example M288

| | | | |
|---|---|---|---|
| CLY-3-O2 | 9.00% | Clearing point [° C.]: | 74.5 |
| CLY-3-O3 | 12.00% | Δn [589 nm, 20° C.]: | 0.0939 |
| B(S)-2O-O4 | 4.00% | $\varepsilon_{\parallel}$ [1 kHz, 20° C.]: | 3.5 |
| B(S)-2O-O5 | 5.00% | $\varepsilon_{\perp}$ [1 kHz, 20° C.]: | 6.8 |
| CC-3-V | 19.00% | Δε [1 kHz, 20° C.]: | −3.4 |
| CC-3-V1 | 15.00% | $K_1$ [pN, 20° C.]: | 15.3 |
| CY-3-O2 | 12.00% | $K_3$ [pN, 20° C.]: | 15.7 |
| PY-3-O2 | 7.00% | $V_0$ [V, 20° C.]: | 2.27 |
| CC-4-V1 | 17.00% | $\gamma_1$ [mPa s, 20° C.]: | 82 |

Example M289

| | | | |
|---|---|---|---|
| B(S)-2O-O4 | 3.00% | Clearing point [° C.]: | 75 |
| B(S)-2O-O5 | 3.00% | Δn [589 nm, 20° C.]: | 0.1088 |
| CC-3-V1 | 7.50% | $\varepsilon_{\parallel}$ [1 kHz, 20° C.]: | 3.5 |
| CC-4-V1 | 19.50% | $\varepsilon_{\perp}$ [1 kHz, 20° C.]: | 6.7 |
| CCH-301 | 8.00% | Δε [1 kHz, 20° C.]: | −3.2 |
| CCH-34 | 3.00% | $K_1$ [pN, 20° C.]: | 15.0 |
| CY-3-O2 | 13.00% | $K_3$ [pN, 20° C.]: | 15.9 |
| CY-3-O4 | 3.00% | $V_0$ [V, 20° C.]: | 2.34 |
| PCH-53 | 3.00% | $\gamma_1$ [mPa s, 20° C.]: | 106 |
| PP-1-2V1 | 6.00% | LTS bulk [h, −20° C.]: | >1000 h |
| BCH-32 | 2.00% | LTS bulk [h, −25° C.]: | >1000 h |
| CCY-3-O2 | 10.50% | | |
| CPY-2-O2 | 5.50% | | |
| CPY-3-O2 | 10.00% | | |
| PYP-2-3 | 3.00% | | |

Example M290

| | | | |
|---|---|---|---|
| B(S)-2O-O4 | 4.00% | Clearing point [° C.]: | 75 |
| B(S)-2O-O5 | 4.00% | Δn [589 nm, 20° C.]: | 0.1086 |
| CC-3-V1 | 9.00% | $\varepsilon_{\parallel}$ [1 kHz, 20° C.]: | 3.5 |
| CC-4-V1 | 22.00% | $\varepsilon_{\perp}$ [1 kHz, 20° C.]: | 6.7 |
| CCH-301 | 10.00% | Δε [1 kHz, 20° C.]: | −3.2 |
| CCH-34 | 2.00% | $K_1$ [pN, 20° C.]: | 15.5 |
| CY-3-O2 | 15.00% | $K_3$ [pN, 20° C.]: | 16.8 |
| PP-1-2V1 | 8.00% | $V_0$ [V, 20° C.]: | 2.42 |
| CCP-3-1 | 1.00% | $\gamma_1$ [mPa s, 20° C.]: | 98 |
| CCY-3-O2 | 10.00% | LTS bulk [h, −20° C.]: | >1000 h |
| CPY-3-O2 | 12.00% | | |
| PYP-2-3 | 3.00% | | |

Example M291

| | | | |
|---|---|---|---|
| B(S)-2O-O4 | 4.00% | Clearing point [° C.]: | 74.5 |
| B(S)-2O-O5 | 4.00% | Δn [589 nm, 20° C.]: | 0.1086 |
| B(S)-2O-O6 | 3.00% | $\varepsilon_{\parallel}$ [1 kHz, 20° C.]: | 3.4 |
| CC-3-V1 | 9.00% | $\varepsilon_{\perp}$ [1 kHz, 20° C.]: | 6.6 |
| CC-4-V1 | 22.00% | Δε [1 kHz, 20° C.]: | −3.2 |
| CCH-301 | 6.00% | $K_1$ [pN, 20° C.]: | 16.0 |
| CCH-34 | 7.00% | $K_3$ [pN, 20° C.]: | 16.5 |
| CY-3-O2 | 15.00% | $V_0$ [V, 20° C.]: | 2.40 |
| PP-1-2V1 | 8.00% | $\gamma_1$ [mPa s, 20° C.]: | 93 |
| CCP-3-1 | 2.50% | | |
| CCY-3-O2 | 6.00% | | |
| CPY-3-O2 | 12.00% | | |
| PYP-2-3 | 1.50% | | |

Example M292

| | | | |
|---|---|---|---|
| CCP-3-1 | 6.50% | Clearing point [° C.]: | 101 |
| CCP-V-1 | 16.00% | Δn [589 nm, 20° C.]: | 0.1026 |
| CCY-3-O2 | 6.50% | $\varepsilon_{\parallel}$ [1 kHz, 20° C.]: | 3.6 |
| CLY-3-O2 | 6.00% | $\varepsilon_{\perp}$ [1 kHz, 20° C.]: | 7.6 |
| CLY-4-O2 | 7.00% | Δε [1 kHz, 20° C.]: | −4.0 |
| CLY-5-O2 | 6.00% | $K_1$ [pN, 20° C.]: | 20.4 |
| B(S)-2O-O4 | 3.70% | $K_3$ [pN, 20° C.]: | 19.3 |
| B(S)-2O-O5 | 4.00% | $V_0$ [V, 20° C.]: | 2.32 |
| B(S)-2O-O6 | 3.00% | $\gamma_1$ [mPa s, 20° C.]: | 146 |
| CC-3-V1 | 2.00% | | |
| CC-4-V1 | 14.00% | | |
| CCH-23 | 3.00% | | |
| CCH-35 | 8.00% | | |
| CY-3-O2 | 9.00% | | |
| Y-4O-O4 | 5.00% | | |
| CCQU-3-F | 0.30% | | |

Example M293

| | | | |
|---|---|---|---|
| CCP-3-1 | 4.00% | Clearing point [° C.]: | 92.5 |
| CCP-V-1 | 13.50% | Δn [589 nm, 20° C.]: | 0.1049 |
| CLY-2-O4 | 4.00% | $\varepsilon_{\parallel}$ [1 kHz, 20° C.]: | 3.7 |
| CLY-3-O2 | 6.00% | $\varepsilon_{\perp}$ [1 kHz, 20° C.]: | 7.7 |
| CLY-3-O3 | 4.00% | Δε [1 kHz, 20° C.]: | −4.1 |
| CLY-4-O2 | 5.00% | $K_1$ [pN, 20° C.]: | 19.1 |
| CLY-5-O2 | 4.50% | $K_3$ [pN, 20° C.]: | 17.0 |
| CPY-3-O2 | 5.00% | $V_0$ [V, 20° C.]: | 2.16 |
| B(S)-2O-O4 | 4.00% | $\gamma_1$ [mPa s, 20° C.]: | 123 |
| B(S)-2O-O5 | 5.00% | | |
| B(S)-2O-O6 | 3.00% | | |
| CC-3-V1 | 8.00% | | |
| CC-4-V1 | 15.00% | | |
| CCH-23 | 9.70% | | |
| Y-4O-O4 | 9.00% | | |
| CCQU-3-F | 0.30% | | |

Example M294

| | | | |
|---|---|---|---|
| CC-3-V1 | 9.00% | Clearing point [° C.]: | 76.5 |
| CC-4-V1 | 2.00% | Δn [589 nm, 20° C.]: | 0.1047 |
| CCH-34 | 7.00% | $\varepsilon_{\parallel}$ [1 kHz, 20° C.]: | 3.5 |
| CP-V2-1 | 19.00% | $\varepsilon_{\perp}$ [1 kHz, 20° C.]: | 6.5 |
| CY-3-O2 | 6.00% | Δε [1 kHz, 20° C.]: | −3.1 |
| PY-3-O2 | 11.50% | $K_1$ [pN, 20° C.]: | 14.0 |
| CCP-V2-1 | 9.00% | $K_3$ [pN, 20° C.]: | 17.0 |
| CCY-3-O1 | 11.00% | $V_0$ [V, 20° C.]: | 2.48 |
| CCY-3-O2 | 11.00% | $\gamma_1$ [mPa s, 20° C.]: | 107 |
| CCY-3-O3 | 2.50% | LTS bulk [h, −20° C.]: | >1000 h |
| CPY-3-O2 | 12.00% | | |

Example M295

| | | | |
|---|---|---|---|
| CC-3-V1 | 9.00% | Clearing point [° C.]: | 73.5 |
| CC-4-V1 | 10.50% | Δn [589 nm, 20° C.]: | 0.1091 |
| CCH-301 | 8.00% | $\varepsilon_{\parallel}$ [1 kHz, 20° C.]: | 3.7 |
| CY-3-O2 | 15.00% | $\varepsilon_{\perp}$ [1 kHz, 20° C.]: | 6.7 |
| PY-2-O2 | 11.00% | Δε [1 kHz, 20° C.]: | −3.1 |
| PY-3-O2 | 8.00% | $K_1$ [pN, 20° C.]: | 13.9 |
| CCP-3-1 | 9.50% | $K_3$ [pN, 20° C.]: | 16.4 |
| CCP-V2-1 | 12.00% | $V_0$ [V, 20° C.]: | 2.43 |
| CCY-3-O2 | 3.50% | $\gamma_1$ [mPa s, 20° C.]: | 104 |
| CPY-3-O2 | 12.00% | | |
| PYP-2-3 | 1.50% | | |

Example M296

| | | | |
|---|---|---|---|
| BCH-32 | 4.00% | Clearing point [° C.]: | 74.5 |
| CCP-V2-1 | 4.00% | Δn [589 nm, 20° C.]: | 0.1032 |
| CCY-3-O2 | 11.50% | $\varepsilon_{\parallel}$ [1 kHz, 20° C.]: | 3.5 |
| CLY-3-O2 | 1.00% | $\varepsilon_{\perp}$ [1 kHz, 20° C.]: | 6.5 |
| CPY-3-O2 | 8.00% | Δε [1 kHz, 20° C.]: | −3.0 |
| CC-3-V1 | 11.00% | $K_1$ [pN, 20° C.]: | 15.2 |
| CCH-24 | 8.00% | $K_3$ [pN, 20° C.]: | 15.2 |
| CCH-35 | 5.00% | $V_0$ [V, 20° C.]: | 2.37 |
| CY-3-O2 | 6.00% | $\gamma_1$ [mPa s, 20° C.]: | 90 |
| PY-3-O2 | 5.00% | | |
| PY-1-O2 | 4.50% | | |
| PY-2-O2 | 8.00% | | |
| CC-4-V1 | 20.00% | | |
| B-2O-O5 | 4.00% | | |

Example M297

| | | | |
|---|---|---|---|
| B-2O-O5 | 4.00% | Clearing point [° C.]: | 75 |
| BCH-32 | 7.00% | Δn [589 nm, 20° C.]: | 0.1019 |
| CC-3-V1 | 9.00% | $\varepsilon_{\parallel}$ [1 kHz, 20° C.]: | 3.5 |
| CCH-301 | 6.00% | $\varepsilon_{\perp}$ [1 kHz, 20° C.]: | 6.5 |
| CCH-34 | 6.00% | Δε [1 kHz, 20° C.]: | −2.9 |
| CCP-V2-1 | 3.00% | $K_1$ [pN, 20° C.]: | 14.9 |
| CCY-3-O2 | 11.00% | $K_3$ [pN, 20° C.]: | 14.8 |
| CLY-3-O2 | 6.00% | $V_0$ [V, 20° C.]: | 2.37 |
| CPY-3-O2 | 4.00% | $\gamma_1$ [mPa s, 20° C.]: | 91 |
| CY-3-O2 | 4.00% | LTS bulk [h, −20° C.]: | >1000 h |
| PY-1-O2 | 9.00% | | |
| PY-2-O2 | 8.00% | | |
| CC-4-V1 | 17.00% | | |
| CCH-24 | 6.00% | | |

Example M298

| | | | |
|---|---|---|---|
| B(S)-2O-O4 | 2.00% | Clearing point [° C.]: | 75 |
| B(S)-2O-O5 | 2.00% | Δn [589 nm, 20° C.]: | 0.1024 |
| CC-3-V1 | 8.00% | $\varepsilon_{\parallel}$ [1 kHz, 20° C.]: | 3.5 |
| CC-4-V1 | 18.50% | $\varepsilon_{\perp}$ [1 kHz, 20° C.]: | 6.7 |
| CCH-301 | 12.50% | Δε [1 kHz, 20° C.]: | −3.2 |
| CY-3-O2 | 15.00% | $K_1$ [pN, 20° C.]: | 14.3 |
| PCH-302 | 8.00% | $K_3$ [pN, 20° C.]: | 16.2 |
| PP-1-2V1 | 2.50% | $V_0$ [V, 20° C.]: | 2.39 |
| BCH-32 | 2.50% | $\gamma_1$ [mPa s, 20° C.]: | 105 |
| CCY-3-O2 | 7.50% | LTS bulk [h, −25° C.]: | >1000 h |
| CLY-3-O2 | 1.00% | | |
| CPY-2-O2 | 8.50% | | |
| CPY-3-O2 | 12.00% | | |

Example M299

| | | | |
|---|---|---|---|
| B(S)-2O-O4 | 2.00% | Clearing point [° C.]: | 75 |
| B(S)-2O-O5 | 2.00% | Δn [589 nm, 20° C.]: | 0.1018 |
| CC-3-V1 | 8.00% | $\varepsilon_{\parallel}$ [1 kHz, 20° C.]: | 3.4 |
| CC-4-V1 | 22.00% | $\varepsilon_{\perp}$ [1 kHz, 20° C.]: | 6.4 |
| CCH-301 | 9.00% | Δε [1 kHz, 20° C.]: | −3.0 |
| CY-3-O2 | 15.00% | $K_1$ [pN, 20° C.]: | 13.9 |
| PCH-302 | 10.50% | $K_3$ [pN, 20° C.]: | 15.7 |

-continued

| | | | |
|---|---|---|---|
| PP-1-2V1 | 1.50% | $V_0$ [V, 20° C.]: | 2.40 |
| CCP-31 | 1.00% | $\gamma_1$ [mPa s, 20° C.]: | 104 |
| CCY-3-O2 | 5.00% | | |
| CLY-3-O2 | 1.00% | | |
| CPY-2-O2 | 11.00% | | |
| CPY-3-O2 | 12.00% | | |

Example M300

For the preparation of a PS (polymer stabilised) mixture, for example for PS-VA, PS-IPS or PS-FFS displays, the mixture according to Example M299 is mixed with 0.3% of the polymerisable compound of the formula

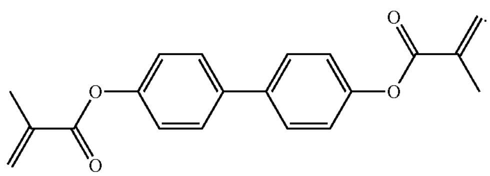

Example M301

For the preparation of a PS (polymer stabilised) mixture, for example for PS-VA, PS-IPS or PS-FFS displays, the mixture according to Example M299 is mixed with 0.25% of the polymerisable compound of the formula

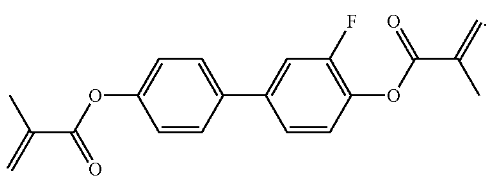

Example M302

| | | | |
|---|---|---|---|
| CC-3-V1 | 8.00% | Clearing point [° C.]: | 72.5 |
| B(S)-2O-O4 | 0.75% | $\Delta n$ [589 nm, 20° C.]: | 0.1026 |
| CC-4-V1 | 18.00% | $\varepsilon_{\parallel}$ [1 kHz, 20° C.]: | 3.4 |
| CCH-24 | 8.00% | $\varepsilon_{\perp}$ [1 kHz, 20° C.]: | 6.5 |
| CCH-301 | 4.00% | $\Delta\varepsilon$ [1 kHz, 20° C.]: | −3.1 |
| CCY-3-O2 | 11.50% | $K_1$ [pN, 20° C.]: | 14.3 |
| CPY-3-O2 | 8.75% | $K_3$ [pN, 20° C.]: | 15.1 |
| CPY-2-O4 | 6.00% | $V_0$ [V, 20° C.]: | 2.34 |
| CPY-2-O2 | 7.00% | $\gamma_1$ [mPa s, 20° C.]: | 104 |
| CY-3-O2 | 15.00% | LTS bulk [h, −20° C.]: | >1000 h |
| CY-3-O4 | 4.50% | | |
| PP-1-2V1 | 8.50% | | |

Example M303

| | | | |
|---|---|---|---|
| B(S)-2O-O5 | 0.25% | Clearing point [° C.]: | 74 |
| CC-3-V1 | 8.00% | $\Delta n$ [589 nm, 20° C.]: | 0.1039 |
| CC-4-V1 | 26.00% | $\varepsilon_{\parallel}$ [1 kHz, 20° C.]: | 3.5 |
| CCH-24 | 2.00% | $\varepsilon_{\perp}$ [1 kHz, 20° C.]: | 6.5 |

-continued

| | | | |
|---|---|---|---|
| CCH-301 | 4.00% | $\Delta\varepsilon$ [1 kHz, 20° C.]: | −3.0 |
| CCY-3-O1 | 7.50% | $K_1$ [pN, 20° C.]: | 14.0 |
| CPY-3-O2 | 12.50% | $K_3$ [pN, 20° C.]: | 15.1 |
| CPY-2-O2 | 9.50% | $V_0$ [V, 20° C.]: | 2.36 |
| CY-3-O2 | 15.00% | $\gamma_1$ [mPa s, 20° C.]: | 103 |
| CY-3-O4 | 7.00% | | |
| PYP-2-3 | 3.00% | | |
| PP-1-2V1 | 5.25% | | |

Example M304

| | | | |
|---|---|---|---|
| B(S)-2O-O5 | 0.25% | Clearing point [° C.]: | 73.5 |
| CCP-3-1 | 13.00% | $\Delta n$ [589 nm, 20° C.]: | 0.1023 |
| CC-3-V1 | 8.00% | $\varepsilon_{\parallel}$ [1 kHz, 20° C.]: | 3.8 |
| CC-4-V1 | 9.00% | $\varepsilon_{\perp}$ [1 kHz, 20° C.]: | 6.7 |
| CCY-3-O1 | 6.00% | $\Delta\varepsilon$ [1 kHz, 20° C.]: | −2.9 |
| CCY-3-O2 | 7.00% | $K_1$ [pN, 20° C.]: | 13.6 |
| CPY-3-O2 | 12.00% | $K_3$ [pN, 20° C.]: | 15.5 |
| CPY-2-O2 | 2.00% | $V_0$ [V, 20° C.]: | 2.42 |
| PCH-302 | 6.50% | $\gamma_1$ [mPa s, 20° C.]: | 100 |
| PY-1-O2 | 6.00% | LTS bulk [h, −20° C.]: | >1000 h |
| CCH-301 | 15.00% | LTS bulk [h, −25° C.]: | >1000 h |
| PYP-2-3 | 6.25% | | |
| Y-4O-O4 | 9.00% | | |

Example M305

| | | | |
|---|---|---|---|
| B(S)-2O-O5 | 0.25% | Clearing point [° C.]: | 72.5 |
| CCP-3-1 | 16.00% | $\Delta n$ [589 nm, 20° C.]: | 0.1036 |
| CC-3-V | 5.00% | $\varepsilon_{\parallel}$ [1 kHz, 20° C.]: | 3.8 |
| CC-3-V1 | 7.00% | $\varepsilon_{\perp}$ [1 kHz, 20° C.]: | 6.9 |
| CC-4-V1 | 9.00% | $\Delta\varepsilon$ [1 kHz, 20° C.]: | −3.1 |
| CCY-3-O1 | 4.00% | $K_1$ [pN, 20° C.]: | 13.5 |
| CCY-3-O2 | 6.00% | $K_3$ [pN, 20° C.]: | 15.1 |
| CLY-3-O2 | 4.50% | $V_0$ [V, 20° C.]: | 2.33 |
| CPY-3-O2 | 5.00% | $\gamma_1$ [mPa s, 20° C.]: | 96 |
| CPY-2-O2 | 2.00% | LTS bulk [h, −20° C.]: | >1000 h |
| CY-3-O2 | 7.50% | | |
| PY-1-O2 | 4.75% | | |
| PYP-2-3 | 10.00% | | |
| CCH-301 | 10.00% | | |
| Y-4O-O4 | 9.00% | | |

Example M306

For the preparation of a PS (polymer stabilised) mixture, for example for PS-VA, PS-IPS or PS-FFS displays, the mixture according to Example M305 is mixed with 0.25% of the polymerisable compound of the formula

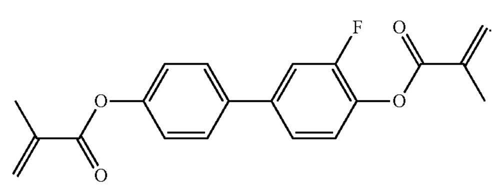

Example M307

For the preparation of a PS (polymer stabilised) mixture, for example for PS-VA, PS-IPS or PS-FFS displays, the mixture according to Example M305 is mixed with 0.25% of the polymerisable compound of the formula

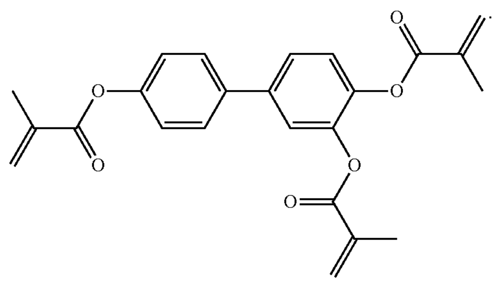 [SMILES: C=C(C)C(=O)Oc1ccc(-c2ccc(OC(=O)C(=C)C)c(OC(=O)C(=C)C)c2)cc1]

Example M308

| | | | |
|---|---|---|---|
| Y-3-O1 | 6.00% | Clearing point [° C.]: | 75 |
| B(S)-2O-O5 | 4.00% | Δn [589 nm, 20° C.]: | 0.0890 |
| CC-3-V1 | 8.00% | $\varepsilon_{\parallel}$ [1 kHz, 20° C.]: | 3.8 |
| CC-4-V1 | 22.00% | $\varepsilon_{\perp}$ [1 kHz, 20° C.]: | 6.8 |
| CCH-35 | 6.00% | Δε [1 kHz, 20° C.]: | −3.1 |
| CCP-3-1 | 14.00% | $K_1$ [pN, 20° C.]: | 14.6 |
| CCY-3-O2 | 11.00% | $K_3$ [pN, 20° C.]: | 15.8 |
| CCY-5-O2 | 9.00% | $V_0$ [V, 20° C.]: | 2.40 |
| CY-3-O2 | 12.00% | $\gamma_1$ [mPa s, 20° C.]: | 92 |
| PY-1-O2 | 8.00% | | |

Example M309

| | | | |
|---|---|---|---|
| B(S)-2O-O5 | 4.00% | Clearing point [° C.]: | 75 |
| CC-3-V1 | 8.00% | Δn [589 nm, 20° C.]: | 0.0893 |
| CC-4-V1 | 22.00% | $\varepsilon_{\parallel}$ [1 kHz, 20° C.]: | 3.6 |
| CCH-301 | 1.50% | $\varepsilon_{\perp}$ [1 kHz, 20° C.]: | 6.7 |
| CCH-34 | 6.00% | Δε [1 kHz, 20° C.]: | −3.1 |
| CCH-35 | 6.00% | $K_1$ [pN, 20° C.]: | 15.1 |
| PCH-301 | 4.00% | $K_3$ [pN, 20° C.]: | 16.4 |
| CCP-3-1 | 2.50% | $V_0$ [V, 20° C.]: | 2.39 |
| CCY-3-O2 | 11.00% | $\gamma_1$ [mPa s, 20° C.]: | 91 |
| CCY-5-O2 | 10.00% | | |
| CY-3-O2 | 15.00% | | |
| PY-1-O2 | 10.00% | | |

Example M310

| | | | |
|---|---|---|---|
| Y-3-O1 | 7.00% | Clearing point [° C.]: | 74 |
| B-2O-O5 | 3.50% | Δn [589 nm, 20° C.]: | 0.1055 |
| CC-3-V1 | 8.00% | $\varepsilon_{\parallel}$ [1 kHz, 20° C.]: | 4.0 |
| CC-4-V1 | 22.00% | $\varepsilon_{\perp}$ [1 kHz, 20° C.]: | 7.0 |
| CCP-3-1 | 16.00% | Δε [1 kHz, 20° C.]: | −3.0 |
| CCP-V2-1 | 5.00% | $K_1$ [pN, 20° C.]: | 13.8 |
| CCY-3-O2 | 8.50% | $K_3$ [pN, 20° C.]: | 15.2 |
| CLY-3-O2 | 1.00% | $V_0$ [V, 20° C.]: | 2.38 |
| CPY-3-O2 | 12.00% | $\gamma_1$ [mPa s, 20° C.]: | 91 |
| PY-1-O2 | 7.00% | | |
| PY-2-O2 | 10.00% | | |

Example M311

| | | | |
|---|---|---|---|
| CCP-3-1 | 5.00% | Clearing point [° C.]: | 92 |
| CCP-V-1 | 6.50% | Δn [589 nm, 20° C.]: | 0.1028 |
| CCP-V2-1 | 2.50% | $\varepsilon_{\parallel}$ [1 kHz, 20° C.]: | 3.6 |
| CCY-3-O2 | 6.00% | $\varepsilon_{\perp}$ [1 kHz, 20° C.]: | 7.7 |
| CLY-2-O4 | 5.00% | Δε [1 kHz, 20° C.]: | −4.1 |
| CLY-3-O2 | 5.00% | $K_1$ [pN, 20° C.]: | 19.1 |
| CLY-4-O2 | 5.00% | $K_3$ [pN, 20° C.]: | 17.2 |
| CLY-5-O2 | 4.50% | $V_0$ [V, 20° C.]: | 2.18 |
| PGIY-2-O4 | 3.00% | $\gamma_1$ [mPa s, 20° C.]: | 124 |
| B(S)-2O-O4 | 4.00% | | |
| B(S)-2O-O5 | 4.00% | | |
| B(S)-2O-O6 | 4.00% | | |
| CC-4-V1 | 15.20% | | |
| CC-3-V1 | 8.00% | | |
| CCH-23 | 12.00% | | |
| CY-3-O2 | 4.00% | | |
| Y-4O-O4 | 6.00% | | |
| CCQU-3-F | 0.30% | | |

Example M312

| | | | |
|---|---|---|---|
| Y-3-O1 | 7.50% | Clearing point [° C.]: | 74.5 |
| CC-3-V1 | 8.00% | Δn [589 nm, 20° C.]: | 0.1078 |
| CC-4-V1 | 21.50% | $\varepsilon_{\parallel}$ [1 kHz, 20° C.]: | 4.0 |
| PP-1-2V1 | 2.00% | $\varepsilon_{\perp}$ [1 kHz, 20° C.]: | 7.1 |
| CCP-3-1 | 14.00% | Δε [1 kHz, 20° C.]: | −3.1 |
| CCY-3-O1 | 2.50% | $K_1$ [pN, 20° C.]: | 13.9 |
| CCY-3-O2 | 11.00% | $K_3$ [pN, 20° C.]: | 15.6 |
| CLY-3-O2 | 1.00% | $V_0$ [V, 20° C.]: | 2.36 |
| CPY-2-O2 | 4.00% | $\gamma_1$ [mPa s, 20° C.]: | 98 |
| CPY-3-O2 | 12.00% | LTS bulk [h, −20° C.]: | >1000 h |
| PY-1-O2 | 10.00% | | |
| PY-2-O2 | 6.50% | | |

Example M313

For the preparation of a PS (polymer stabilised) mixture, for example for PS-VA, PS-IPS or PS-FFS displays, the mixture according to Example M312 is mixed with 0.3% of the polymerisable compound of the formula

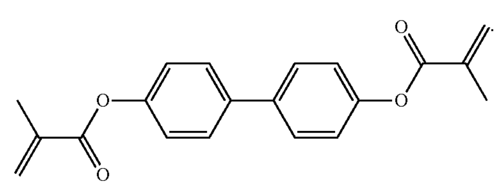 [SMILES: C=C(C)C(=O)Oc1ccc(-c2ccc(OC(=O)C(=C)C)cc2)cc1]

Example M314

For the preparation of a PS (polymer stabilised) mixture, for example for PS-VA, PS-IPS or PS-FFS displays, the mixture according to Example M312 is mixed with 0.3% of the polymerisable compound of the formula

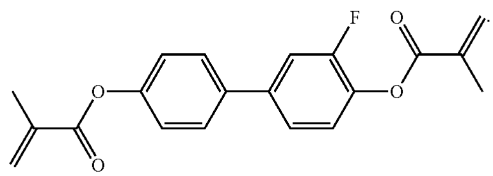

Example M315

| | | | |
|---|---|---|---|
| CCP-3-1 | 5.00% | Clearing point [° C.]: | 91 |
| CCP-V-1 | 4.00% | Δn [589 nm, 20° C.]: | 0.1028 |
| CCP-V2-1 | 4.00% | $\varepsilon_{\parallel}$ [1 kHz, 20° C.]: | 3.8 |
| CCY-3-O2 | 5.00% | $\varepsilon_{\perp}$ [1 kHz, 20° C.]: | 7.7 |
| CLY-2-O4 | 4.00% | Δε [1 kHz, 20° C.]: | −3.9 |
| CLY-3-O2 | 5.00% | $K_1$ [pN, 20° C.]: | 19.4 |
| CLY-4-O2 | 5.00% | $K_3$ [pN, 20° C.]: | 16.9 |
| CLY-5-O2 | 4.50% | $V_0$ [V, 20° C.]: | 2.18 |
| PGIY-2-O4 | 2.00% | $\gamma_1$ [mPa s, 20° C.]: | 114 |
| B(S)-2O-O4 | 3.50% | | |
| B(S)-2O-O5 | 4.00% | | |
| B(S)-2O-O6 | 4.00% | | |
| CC-2V-V2 | 15.20% | | |
| CC-3-V1 | 8.00% | | |
| CC-4-V1 | 14.00% | | |
| CY-3-O2 | 4.50% | | |
| Y-4O-O4 | 8.00% | | |
| CCQU-3-F | 0.30% | | |

Example M316

| | | | |
|---|---|---|---|
| CC-3-V1 | 5.00% | Clearing point [° C.]: | 72 |
| CC-4-V1 | 15.50% | Δn [589 nm, 20° C.]: | 0.0996 |
| CCY-3-O1 | 11.00% | $\varepsilon_{\parallel}$ [1 kHz, 20° C.]: | 3.5 |
| CCY-3-O2 | 9.00% | $\varepsilon_{\perp}$ [1 kHz, 20° C.]: | 6.4 |
| CLY-3-O2 | 1.00% | Δε [1 kHz, 20° C.]: | −3.0 |
| CPY-2-O2 | 12.00% | $K_1$ [pN, 20° C.]: | 13.5 |
| CPY-3-O2 | 7.00% | $K_3$ [pN, 20° C.]: | 15.2 |
| CY-3-O2 | 1.50% | $V_0$ [V, 20° C.]: | 2.39 |
| PY-1-O2 | 3.00% | $\gamma_1$ [mPa s, 20° C.]: | 89 |
| PY-2-O2 | 10.00% | | |

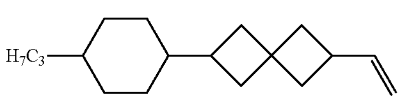

25.00%

Example M317

| | | | |
|---|---|---|---|
| Y-3-O1 | 6.50% | Clearing point [° C.]: | 74.5 |
| CC-3-V1 | 8.00% | Δn [589 nm, 20° C.]: | 0.0895 |
| CC-4-V1 | 22.00% | $\varepsilon_{\parallel}$ [1 kHz, 20° C.]: | 3.8 |
| CCH-35 | 5.50% | $\varepsilon_{\perp}$ [1 kHz, 20° C.]: | 7.0 |
| CCP-3-1 | 9.00% | Δε [1 kHz, 20° C.]: | −3.2 |
| CCY-3-O2 | 11.00% | $K_1$ [pN, 20° C.]: | 14.1 |
| CCY-5-O2 | 11.00% | $K_3$ [pN, 20° C.]: | 15.8 |
| CPY-3-O2 | 6.00% | $V_0$ [V, 20° C.]: | 2.37 |
| CY-3-O2 | 13.00% | $\gamma_1$ [mPa s, 20° C.]: | 97 |
| PY-1-O2 | 8.00% | LTS bulk [h, −20° C.]: | >1000 h |

Example M318

| | | | |
|---|---|---|---|
| BCH-32 | 5.00% | Clearing point [° C.]: | 74.5 |
| CCP-V2-1 | 7.00% | Δn [589 nm, 20° C.]: | 0.1068 |
| CCY-3-O2 | 9.00% | $\varepsilon_{\parallel}$ [1 kHz, 20° C.]: | 3.6 |
| CLY-3-O2 | 1.00% | $\varepsilon_{\perp}$ [1 kHz, 20° C.]: | 6.7 |
| CPY-3-O2 | 2.50% | Δε [1 kHz, 20° C.]: | −3.2 |
| CC-3-V1 | 11.00% | $K_1$ [pN, 20° C.]: | 15.8 |
| CCH-34 | 6.00% | $K_3$ [pN, 20° C.]: | 15.6 |
| CCH-35 | 5.00% | $V_0$ [V, 20° C.]: | 2.34 |
| CY-3-O2 | 8.00% | $\gamma_1$ [mPa s, 20° C.]: | 89 |
| PY-3-O2 | 3.00% | LTS bulk [h, −20° C.]: | >1000 h |
| PY-1-O2 | 9.00% | | |
| PY-2-O2 | 7.00% | | |
| CC-4-V1 | 19.50% | | |
| B(S)-2O-O4 | 3.00% | | |
| B(S)-2O-O5 | 4.00% | | |

Example M319

| | | | |
|---|---|---|---|
| Y-4O-O4 | 6.50% | Clearing point [° C.]: | 74 |
| CC-3-V1 | 8.00% | Δn [589 nm, 20° C.]: | 0.0906 |
| CC-4-V1 | 22.00% | $\varepsilon_{\parallel}$ [1 kHz, 20° C.]: | 3.7 |
| CCH-301 | 7.00% | $\varepsilon_{\perp}$ [1 kHz, 20° C.]: | 6.9 |
| CCP-3-1 | 13.00% | Δε [1 kHz, 20° C.]: | −3.2 |
| CCY-3-O1 | 6.50% | $K_1$ [pN, 20° C.]: | 14.2 |
| CCY-3-O2 | 11.00% | $K_3$ [pN, 20° C.]: | 16.3 |
| CPY-3-O2 | 6.50% | $V_0$ [V, 20° C.]: | 2.39 |
| CY-3-O2 | 11.50% | $\gamma_1$ [mPa s, 20° C.]: | 97 |
| PY-1-O2 | 8.00% | LTS bulk [h, −20° C.]: | >1000 h |

Example M320

| | | | |
|---|---|---|---|
| Y-1-O2 | 7.00% | Clearing point [° C.]: | 72.5 |
| CC-3-V1 | 8.00% | Δn [589 nm, 20° C.]: | 0.0911 |
| CC-4-V1 | 20.00% | $\varepsilon_{\parallel}$ [1 kHz, 20° C.]: | 4.0 |
| CCH-34 | 4.00% | $\varepsilon_{\perp}$ [1 kHz, 20° C.]: | 7.2 |
| CCH-35 | 4.00% | Δε [1 kHz, 20° C.]: | −3.2 |
| CY-3-O2 | 6.50% | $K_1$ [pN, 20° C.]: | 14.4 |
| PY-1-O2 | 8.00% | $K_3$ [pN, 20° C.]: | 15.6 |
| PY-3-O2 | 6.00% | $V_0$ [V, 20° C.]: | 2.33 |
| CCP-3-1 | 8.00% | $\gamma_1$ [mPa s, 20° C.]: | 91 |
| CCY-3-O1 | 4.50% | | |
| CCY-3-O2 | 11.00% | | |
| CCY-5-O2 | 11.00% | | |
| CPY-3-O2 | 2.00% | | |

Example M321

| | | | |
|---|---|---|---|
| Y-3-O1 | 6.00% | Clearing point [° C.]: | 74.5 |
| CC-3-V1 | 8.00% | Δn [589 nm, 20° C.]: | 0.1018 |
| CC-4-V1 | 22.00% | $\varepsilon_{\parallel}$ [1 kHz, 20° C.]: | 3.9 |
| CCH-34 | 4.00% | $\varepsilon_{\perp}$ [1 kHz, 20° C.]: | 7.0 |
| CCH-35 | 4.00% | Δε [1 kHz, 20° C.]: | −3.1 |
| CY-3-O2 | 1.50% | $K_1$ [pN, 20° C.]: | 13.9 |
| PY-1-O2 | 8.00% | $K_3$ [pN, 20° C.]: | 14.7 |
| PY-2-O2 | 8.00% | $V_0$ [V, 20° C.]: | 2.30 |
| CCP-3-1 | 7.00% | $Y_1$ [mPa s, 20° C.]: | 94 |
| CCY-3-O2 | 11.00% | | |
| CCY-3-O3 | 2.50% | | |
| CLY-3-O2 | 1.00% | | |
| CPY-2-O2 | 5.00% | | |
| CPY-3-O2 | 12.00% | | |

Example M322

| | | | |
|---|---|---|---|
| Y-3-O5 | 6.00% | Clearing point [° C.]: | 75.5 |
| CC-3-V1 | 8.00% | Δn [589 nm, 20° C.]: | 0.1022 |
| CC-4-V1 | 22.00% | $\varepsilon_{\parallel}$ [1 kHz, 20° C.]: | 3.7 |
| CCH-34 | 4.00% | $\varepsilon_{\perp}$ [1 kHz, 20° C.]: | 6.8 |
| CCH-35 | 4.00% | Δε [1 kHz, 20° C.]: | −3.1 |
| CY-3-O2 | 1.50% | $K_1$ [pN, 20° C.]: | 14.5 |
| PY-1-O2 | 8.00% | $K_3$ [pN, 20° C.]: | 15.3 |
| PY-2-O2 | 8.00% | $V_0$ [V, 20° C.]: | 2.33 |
| CCP-3-1 | 7.00% | $\gamma_1$ [mPa s, 20° C.]: | 101 |
| CCY-3-O2 | 11.00% | | |
| CCY-3-O3 | 2.50% | | |
| CLY-3-O2 | 1.00% | | |
| CPY-2-O2 | 5.00% | | |
| CPY-3-O2 | 12.00% | | |

Example M323

| | | | |
|---|---|---|---|
| Y-4-O4 | 6.00% | Clearing point [° C.]: | 75.5 |
| CC-3-V1 | 8.00% | Δn [589 nm, 20° C.]: | 0.1025 |
| CC-4-V1 | 22.00% | $\varepsilon_{\parallel}$ [1 kHz, 20° C.]: | 3.6 |
| CCH-34 | 4.00% | $\varepsilon_{\perp}$ [1 kHz, 20° C.]: | 6.8 |
| CCH-35 | 4.00% | Δε [1 kHz, 20° C.]: | −3.1 |
| CY-3-O2 | 1.50% | $K_1$ [pN, 20° C.]: | 14.5 |
| PY-1-O2 | 8.00% | $K_3$ [pN, 20° C.]: | 15.3 |
| PY-2-O2 | 8.00% | $V_0$ [V, 20° C.]: | 2.33 |
| CCP-3-1 | 7.00% | $\gamma_1$ [mPa s, 20° C.]: | 101 |
| CCY-3-O2 | 11.00% | | |
| CCY-3-O3 | 2.50% | | |
| CLY-3-O2 | 1.00% | | |
| CPY-2-O2 | 5.00% | | |
| CPY-3-O2 | 12.00% | | |

Example M324

| | | | |
|---|---|---|---|
| Y-5-O3 | 6.00% | Clearing point [° C.]: | 76 |
| CC-3-V1 | 8.00% | Δn [589 nm, 20° C.]: | 0.1026 |
| CC-4-V1 | 22.00% | $\varepsilon_{\parallel}$ [1 kHz, 20° C.]: | 3.6 |
| CCH-34 | 4.00% | $\varepsilon_{\perp}$ [1 kHz, 20° C.]: | 6.8 |
| CCH-35 | 4.00% | Δε [1 kHz, 20° C.]: | −3.1 |
| CY-3-O2 | 1.50% | $K_1$ [pN, 20° C.]: | 14.7 |
| PY-1-O2 | 8.00% | $K_3$ [pN, 20° C.]: | 15.5 |
| PY-2-O2 | 8.00% | $V_0$ [V, 20° C.]: | 2.35 |
| CCP-3-1 | 7.00% | $\gamma_1$ [mPa s, 20° C.]: | 102 |
| CCY-3-O2 | 11.00% | | |
| CCY-3-O3 | 2.50% | | |
| CLY-3-O2 | 1.00% | | |
| CPY-2-O2 | 5.00% | | |
| CPY-3-O2 | 12.00% | | |

Example M325

| | | | |
|---|---|---|---|
| Y-3-O5 | 5.00% | Clearing point [° C.]: | 75 |
| CC-3-V1 | 8.50% | Δn [589 nm, 20° C.]: | 0.0900 |
| CC-4-V1 | 22.00% | $\varepsilon_{\parallel}$ [1 kHz, 20° C.]: | 3.6 |
| CCH-301 | 2.00% | $\varepsilon_{\perp}$ [1 kHz, 20° C.]: | 6.8 |
| CCH-34 | 5.00% | Δε [1 kHz, 20° C.]: | −3.2 |
| CCH-35 | 5.00% | $K_1$ [pN, 20° C.]: | 14.3 |
| CY-3-O2 | 13.00% | $K_3$ [pN, 20° C.]: | 15.4 |
| PY-1-O2 | 5.00% | $V_0$ [V, 20° C.]: | 2.33 |
| CCP-3-1 | 2.00% | $\gamma_1$ [mPa s, 20° C.]: | 100 |
| CCY-3-O1 | 8.00% | | |
| CCY-3-O2 | 10.00% | | |
| CPY-2-O2 | 2.50% | | |
| CPY-3-O2 | 12.00% | | |

Example M326

| | | | |
|---|---|---|---|
| Y-3-O5 | 4.00% | Clearing point [° C.]: | 74 |
| CC-3-V1 | 8.00% | Δn [589 nm, 20° C.]: | 0.1000 |
| CC-4-V1 | 21.00% | $\varepsilon_{\parallel}$ [1 kHz, 20° C.]: | 3.5 |
| CCH-24 | 10.00% | $\varepsilon_{\perp}$ [1 kHz, 20° C.]: | 6.6 |
| CCY-3-O1 | 2.00% | Δε [1 kHz, 20° C.]: | −3.1 |
| CCY-3-O2 | 10.00% | $K_1$ [pN, 20° C.]: | 13.9 |
| CPY-2-O2 | 12.00% | $K_3$ [pN, 20° C.]: | 14.3 |
| CPY-3-O2 | 12.00% | $V_0$ [V, 20° C.]: | 2.27 |
| CY-3-O2 | 14.50% | $\gamma_1$ [mPa s, 20° C.]: | 102 |
| PP-1-2V1 | 4.00% | | |
| PYP-2-3 | 2.50% | | |

Example M327

| | | | |
|---|---|---|---|
| CC-4-V1 | 22.00% | Clearing point [° C.]: | 74.5 |
| CC-3-V1 | 9.00% | Δn [589 nm, 20° C.]: | 0.1088 |
| CCH-34 | 8.00% | $\varepsilon_{\parallel}$ [1 kHz, 20° C.]: | 3.5 |
| CY-3-O2 | 15.00% | $\varepsilon_{\perp}$ [1 kHz, 20° C.]: | 6.5 |
| CY-5-O2 | 13.00% | Δε [1 kHz, 20° C.]: | −3.0 |
| CCY-3-O2 | 4.00% | $K_1$ [pN, 20° C.]: | 14.1 |
| CPY-2-O2 | 5.00% | $K_3$ [pN, 20° C.]: | 14.8 |
| CPY-3-O2 | 11.00% | $V_0$ [V, 20° C.]: | 2.35 |
| PYP-2-3 | 12.50% | $\gamma_1$ [mPa s, 20° C.]: | 109 |
| PPGU-3-F | 0.50% | LTS bulk [h, −20° C.]: | >1000 h |

Example M328

| | | | |
|---|---|---|---|
| CC-3-V1 | 9.00% | Clearing point [° C.]: | 74.5 |
| CC-4-V1 | 22.00% | Δn [589 nm, 20° C.]: | 0.1087 |
| CCH-34 | 6.50% | $\varepsilon_{\parallel}$ [1 kHz, 20° C.]: | 3.4 |
| CY-3-O2 | 15.00% | $\varepsilon_{\perp}$ [1 kHz, 20° C.]: | 6.4 |
| CY-5-O2 | 9.00% | Δε [1 kHz, 20° C.]: | −3.0 |
| PP-1-2V1 | 8.00% | $K_1$ [pN, 20° C.]: | 15.0 |
| CCY-3-O2 | 4.50% | $K_3$ [pN, 20° C.]: | 16.0 |
| CPY-2-O2 | 12.00% | $V_0$ [V, 20° C.]: | 2.44 |
| CPY-3-O2 | 12.00% | $\gamma_1$ [mPa s, 20° C.]: | 106 |
| PYP-2-3 | 2.00% | | |

Example M329

| | | | |
|---|---|---|---|
| BCH-32 | 8.00% | Clearing point [° C.]: | 74 |
| CC-3-V1 | 9.00% | Δn [589 nm, 20° C.]: | 0.1082 |
| CC-4-V1 | 20.00% | $\varepsilon_{\parallel}$ [1 kHz, 20° C.]: | 3.6 |
| CCP-3-1 | 7.00% | $\varepsilon_{\perp}$ [1 kHz, 20° C.]: | 6.7 |
| CCP-V2-1 | 5.00% | Δε [1 kHz, 20° C.]: | −3.1 |
| CCY-3-O2 | 9.00% | $K_1$ [pN, 20° C.]: | 14.1 |
| CLY-3-O2 | 1.00% | $K_3$ [pN, 20° C.]: | 15.8 |
| CPY-3-O2 | 2.50% | $V_0$ [V, 20° C.]: | 2.38 |
| CY-3-O2 | 14.00% | $\gamma_1$ [mPa s, 20° C.]: | 100 |
| PCH-301 | 3.50% | LTS bulk [h, −20° C.]: | >1000 h |
| PY-1-O2 | 8.50% | LTS bulk [h, −25° C.]: | >1000 h |
| PY-2-O2 | 8.50% | | |

-continued

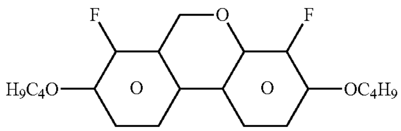

4.00%

Example M330

| | | | |
|---|---|---|---|
| B(S)-2O-O4 | 3.00% | Clearing point [° C.]: | 74.5 |
| B(S)-2O-O5 | 4.00% | Δn [589 nm, 20° C.]: | 0.1040 |
| BCH-32 | 4.50% | $\varepsilon_{\parallel}$ [1 kHz, 20° C.]: | 3.4 |
| CC-3-V1 | 10.50% | $\varepsilon_{\perp}$ [1 kHz, 20° C.]: | 6.1 |
| CC-4-V1 | 19.00% | Δε [1 kHz, 20° C.]: | −2.7 |
| CCH-34 | 5.50% | $K_1$ [pN, 20° C.]: | 13.9 |
| CCH-35 | 3.00% | $K_3$ [pN, 20° C.]: | 15.3 |
| CCY-3-O2 | 4.50% | $V_0$ [V, 20° C.]: | 2.51 |
| CPY-3-O2 | 12.00% | $\gamma_1$ [mPa s, 20° C.]: | 91 |
| CY-3-O2 | 13.50% | LTS bulk [h, −20° C.]: | >1000 h |
| PCH-301 | 13.50% | | |
| PYP-2-3 | 1.50% | | |
| PGIY-2-O4 | 3.50% | | |
| CCH-301 | 2.00% | | |

Example M331

| | | | |
|---|---|---|---|
| CC-3-V1 | 9.00% | Clearing point [° C.]: | 74 |
| CC-4-V1 | 22.00% | Δn [589 nm, 20° C.]: | 0.1085 |
| CCH-34 | 6.00% | $\varepsilon_{\parallel}$ [1 kHz, 20° C.]: | 3.4 |
| CCH-35 | 4.00% | $\varepsilon_{\perp}$ [1 kHz, 20° C.]: | 6.4 |
| CY-3-O2 | 15.00% | Δε [1 kHz, 20° C.]: | −3.0 |
| CY-5-O2 | 8.50% | $K_1$ [pN, 20° C.]: | 14.9 |
| PP-1-2V1 | 5.50% | $K_3$ [pN, 20° C.]: | 15.1 |
| CPY-2-O2 | 12.00% | $V_0$ [V, 20° C.]: | 2.37 |
| CPY-3-O2 | 12.00% | $\gamma_1$ [mPa s, 20° C.]: | 104 |
| PGIY-2-O4 | 6.00% | | |

Example M332

| | | | |
|---|---|---|---|
| CC-3-V1 | 9.00% | Clearing point [° C.]: | 74 |
| CC-4-V1 | 22.00% | Δn [589 nm, 20° C.]: | 0.1085 |
| CCH-24 | 10.00% | $\varepsilon_{\parallel}$ [1 kHz, 20° C.]: | 3.4 |
| CY-3-O2 | 15.00% | $\varepsilon_{\perp}$ [1 kHz, 20° C.]: | 6.4 |
| CY-5-O2 | 5.50% | Δε [1 kHz, 20° C.]: | −3.0 |
| PP-1-2V1 | 5.00% | $K_1$ [pN, 20° C.]: | 14.1 |
| CCY-3-O2 | 2.50% | $K_3$ [pN, 20° C.]: | 14.3 |
| CPY-2-O2 | 12.00% | $V_0$ [V, 20° C.]: | 2.32 |
| CPY-3-O2 | 12.00% | $\gamma_1$ [mPa s, 20° C.]: | 103 |
| PGIY-2-O4 | 6.00% | | |
| PYP-2-3 | 1.00% | | |

Example M333

| | | | |
|---|---|---|---|
| CC-3-V1 | 9.00% | Clearing point [° C.]: | 74.5 |
| CC-4-V1 | 22.00% | Δn [589 nm, 20° C.]: | 0.1091 |
| CCH-301 | 7.50% | $\varepsilon_{\parallel}$ [1 kHz, 20° C.]: | 3.5 |
| CY-3-O2 | 14.00% | $\varepsilon_{\perp}$ [1 kHz, 20° C.]: | 6.6 |
| CY-3-O4 | 4.00% | Δε [1 kHz, 20° C.]: | −3.2 |
| PP-1-2V1 | 8.00% | $K_1$ [pN, 20° C.]: | 15.6 |

-continued

| | | | |
|---|---|---|---|
| CCP-3-1 | 5.00% | $K_3$ [pN, 20° C.]: | 16.7 |
| CCY-3-O2 | 7.50% | $V_0$ [V, 20° C.]: | 2.43 |
| CPY-3-O2 | 12.00% | $\gamma_1$ [mPa s, 20° C.]: | 107 |
| PYP-2-3 | 3.00% | LTS bulk [h, −20° C.]: | >1000 h |

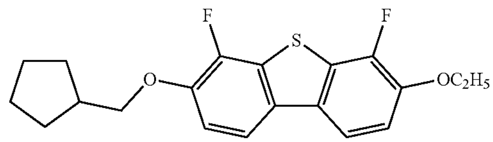

8.00%

Example M334

For the preparation of a PS (polymer stabilised) mixture, for example for PS-VA, PS-IPS or PS-FFS displays, the mixture according to Example M333 is mixed with 0.3% of the polymerisable compound of the formula

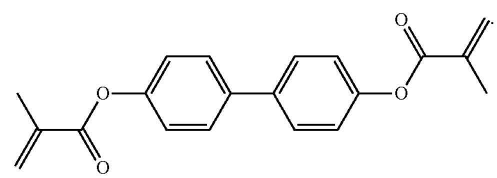

Example M335

| | | | |
|---|---|---|---|
| CC-3-V1 | 9.00% | Clearing point [° C.]: | 75 |
| CC-4-V1 | 20.50% | Δn [589 nm, 20° C.]: | 0.1094 |
| CP-2V-1 | 7.00% | $\varepsilon_{\parallel}$ [1 kHz, 20° C.]: | 3.5 |
| CY-3-O2 | 13.00% | $\varepsilon_{\perp}$ [1 kHz, 20° C.]: | 6.7 |
| PY-2-O2 | 10.00% | Δε [1 kHz, 20° C.]: | −3.1 |
| PY-3-O2 | 3.50% | $K_1$ [pN, 20° C.]: | 14.2 |
| CCP-3-1 | 8.50% | $K_3$ [pN, 20° C.]: | 16.5 |
| CCY-3-O2 | 11.00% | $V_0$ [V, 20° C.]: | 2.43 |
| CPY-2-O2 | 2.50% | $\gamma_1$ [mPa s, 20° C.]: | 107 |
| CPY-3-O2 | 12.00% | LTS bulk [h, −25° C.]: | >1000 h |
| PYP-2-3 | 3.00% | | |

Example M336

| | | | |
|---|---|---|---|
| BCH-32 | 2.00% | Clearing point [° C.]: | 75 |
| CC-3-V1 | 8.00% | Δn [589 nm, 20° C.]: | 0.1032 |
| CC-4-V1 | 27.00% | $\varepsilon_{\parallel}$ [1 kHz, 20° C.]: | 3.4 |
| CCH-24 | 8.00% | $\varepsilon_{\perp}$ [1 kHz, 20° C.]: | 6.0 |
| CCY-3-O2 | 6.50% | Δε [1 kHz, 20° C.]: | −2.7 |
| CPY-3-O2 | 11.00% | $K_1$ [pN, 20° C.]: | 13.9 |
| CY-3-O2 | 15.50% | $K_3$ [pN, 20° C.]: | 14.1 |
| CY-3-O4 | 4.50% | $V_0$ [V, 20° C.]: | 2.44 |
| PYP-2-3 | 6.00% | $\gamma_1$ [mPa s, 20° C.]: | 96 |
| PGIY-2-O4 | 8.00% | LTS bulk [h, −20° C.]: | >1000 h |
| CCH-301 | 3.50% | LTS bulk [h, −25° C.]: | >1000 h |

Example M337

For the preparation of a PS (polymer stabilised) mixture, for example for PS-VA, PS-IPS or PS-FFS displays, the mixture according to Example M336 is mixed with 0.3% of the polymerisable compound of the formula

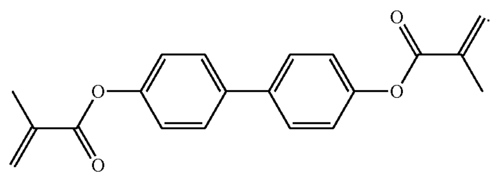 [SMILES: C=C(C)C(=O)Oc1ccc(-c2ccc(OC(=O)C(=C)C)cc2)cc1]

Example M338

| | | | |
|---|---|---|---|
| CC-3-V1 | 9.00% | Clearing point [° C.]: | 74 |
| CC-4-V1 | 22.00% | Δn [589 nm, 20° C.]: | 0.1096 |
| CCH-301 | 4.00% | $\varepsilon_{\parallel}$ [1 kHz, 20° C.]: | 3.5 |
| PP-1-2V1 | 4.50% | $\varepsilon_{\perp}$ [1 kHz, 20° C.]: | 6.7 |
| CY-3-O2 | 15.00% | Δε [1 kHz, 20° C.]: | −3.2 |
| PY-2-O2 | 10.00% | $K_1$ [pN, 20° C.]: | 14.5 |
| PY-3-O2 | 3.00% | $K_3$ [pN, 20° C.]: | 16.6 |
| BCH-32 | 3.50% | $V_0$ [V, 20° C.]: | 2.42 |
| CCP-3-1 | 4.00% | $\gamma_1$ [mPa s, 20° C.]: | 104 |
| CCY-3-O2 | 11.00% | LTS bulk [h, −25° C.]: | >1000 h |
| CPY-2-O2 | 2.00% | | |
| CPY-3-O2 | 12.00% | | |

Example M339

| | | | |
|---|---|---|---|
| CC-3-V1 | 8.00% | Clearing point [° C.]: | 75.5 |
| CC-4-V1 | 22.00% | Δn [589 nm, 20° C.]: | 0.1344 |
| CCP-3-1 | 15.00% | $\varepsilon_{\parallel}$ [1 kHz, 20° C.]: | 3.6 |
| CCY-3-O2 | 4.00% | $\varepsilon_{\perp}$ [1 kHz, 20° C.]: | 6.8 |
| CY-3-O2 | 6.00% | Δε [1 kHz, 20° C.]: | −3.2 |
| PP-1-2V1 | 7.00% | $K_1$ [pN, 20° C.]: | 16.9 |
| PY-1-O2 | 9.00% | $K_3$ [pN, 20° C.]: | 18.0 |
| PY-3-O2 | 10.00% | $V_0$ [V, 20° C.]: | 2.51 |
| PGIY-3-O4 | 14.00% | $\gamma_1$ [mPa s, 20° C.]: | 116 |
| B(S)-2O-O4 | 2.00% | LTS bulk [h, −25° C.]: | >1000 h |
| B(S)-2O-O5 | 3.00% | | |

Example M340

For the preparation of a PS (polymer stabilised) mixture, for example for PS-VA, PS-IPS or PS-FFS displays, the mixture according to Example M339 is mixed with 0.25% of the polymerisable compound of the formula

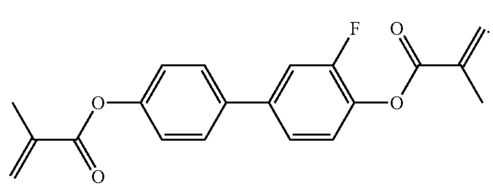

Example M341

For the preparation of a PS (polymer stabilised) mixture, for example for PS-VA, PS-IPS or PS-FFS displays, the mixture according to Example M339 is mixed with 0.25% of the polymerisable compound of the formula

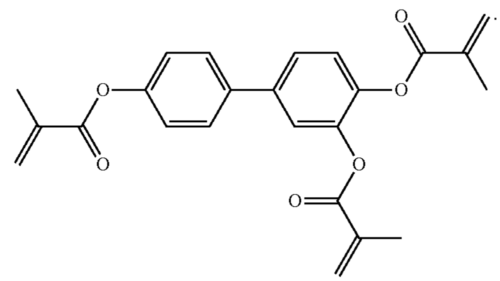 [SMILES: C=C(C)C(=O)Oc1ccc(-c2ccc(OC(=O)C(=C)C)c(OC(=O)C(=C)C)c2)cc1]

Example M342

For the preparation of a PS (polymer stabilised) mixture, for example for PS-VA, PS-IPS or PS-FFS displays, the mixture according to Example M339 is mixed with 0.3% of the polymerisable compound of the formula

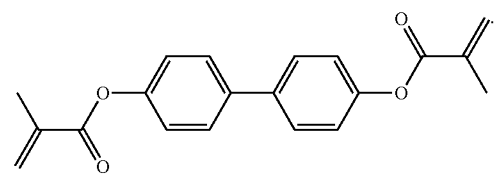

Example M343

| | | | |
|---|---|---|---|
| CC-3-V1 | 9.00% | Clearing point [° C.]: | 74.5 |
| CC-4-V1 | 22.00% | Δn [589 nm, 20° C.]: | 0.1022 |
| CCH-301 | 5.00% | $\varepsilon_{\parallel}$ [1 kHz, 20° C.]: | 3.6 |
| CCP-3-1 | 13.00% | $\varepsilon_{\perp}$ [1 kHz, 20° C.]: | 6.7 |
| CCY-3-O2 | 6.50% | Δε [1 kHz, 20° C.]: | −3.1 |
| CLY-3-O2 | 1.00% | $K_1$ [pN, 20° C.]: | 14.2 |
| CPY-2-O2 | 6.00% | $K_3$ [pN, 20° C.]: | 16.2 |
| CPY-3-O2 | 7.00% | $V_0$ [V, 20° C.]: | 2.41 |
| CY-3-O2 | 15.00% | $\gamma_1$ [mPa s, 20° C.]: | 98 |
| PY-1-O2 | 5.50% | LTS bulk [h, −20° C.]: | >1000 h |
| PY-2-O2 | 10.00% | | |

Example M344

| | | | |
|---|---|---|---|
| B(S)-2O-O5 | 1.50% | Clearing point [° C.]: | 74.5 |
| CC-3-V1 | 9.00% | Δn [589 nm, 20° C.]: | 0.1025 |
| CC-4-V1 | 20.00% | $\varepsilon_{\parallel}$ [1 kHz, 20° C.]: | 3.6 |
| CCH-301 | 8.00% | $\varepsilon_{\perp}$ [1 kHz, 20° C.]: | 6.7 |
| CCP-3-1 | 3.50% | Δε [1 kHz, 20° C.]: | −3.1 |
| CCP-V2-1 | 10.00% | $K_1$ [pN, 20° C.]: | 14.0 |
| CCY-3-O2 | 4.50% | $K_3$ [pN, 20° C.]: | 16.0 |
| CLY-3-O2 | 1.00% | $V_0$ [V, 20° C.]: | 2.40 |
| CPY-2-O2 | 2.00% | $\gamma_1$ [mPa s, 20° C.]: | 97 |
| CPY-3-O2 | 12.00% | LTS bulk [h, −20° C.]: | >1000 h |
| CY-3-O2 | 15.00% | | |
| PY-1-O2 | 3.50% | | |
| PY-2-O2 | 10.00% | | |

Example M345

For the preparation of a PS (polymer stabilised) mixture, for example for PS-VA, PS-IPS or PS-FFS displays, the mixture according to Example M344 is mixed with 0.3% of the polymerisable compound of the formula

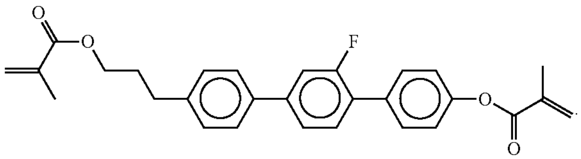

Example M346

For the preparation of a PS (polymer stabilised) mixture, for example for PS-VA, PS-IPS or PS-FFS displays, the mixture according to Example M344 is mixed with 0.3% of the polymerisable compound of the formula

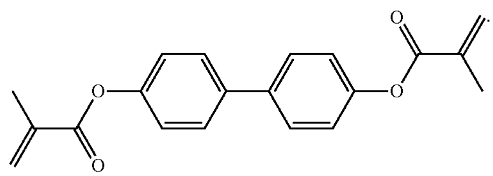

Example M347

| | | | |
|---|---|---|---|
| B(S)-2O-O5 | 1.00% | Clearing point [° C.]: | 73.5 |
| CC-3-V1 | 9.00% | $\Delta n$ [589 nm, 20° C.]: | 0.1024 |
| CC-4-V1 | 22.00% | $\varepsilon_{\parallel}$ [1 kHz, 20° C.]: | 3.5 |
| CCP-3-1 | 1.00% | $\varepsilon_{\perp}$ [1 kHz, 20° C.]: | 6.6 |
| CCP-V2-1 | 10.00% | $\Delta\varepsilon$ [1 kHz, 20° C.]: | −3.1 |
| CCY-3-O2 | 9.50% | $K_1$ [pN, 20° C.]: | 13.8 |
| CLY-3-O2 | 1.00% | $K_3$ [pN, 20° C.]: | 15.9 |
| CPY-2-O2 | 11.00% | $V_0$ [V, 20° C.]: | 2.39 |
| CY-3-O2 | 15.00% | $\gamma_1$ [mPa s, 20° C.]: | 99 |
| PCH-302 | 8.00% | LTS bulk [h, −20° C.]: | >1000 h |
| PY-1-O2 | 2.50% | | |
| PY-2-O2 | 10.00% | | |

Example M348

| | | | |
|---|---|---|---|
| CC-3-V1 | 7.50% | Clearing point [° C.]: | 75 |
| CC-4-V1 | 15.00% | $\Delta n$ [589 nm, 20° C.]: | 0.1086 |
| CC-2V-V2 | 15.00% | $\varepsilon_{\parallel}$ [1 kHz, 20° C.]: | 3.4 |
| CY-3-O2 | 15.00% | $\varepsilon_{\perp}$ [1 kHz, 20° C.]: | 6.5 |
| CY-5-O2 | 10.00% | $\Delta\varepsilon$ [1 kHz, 20° C.]: | −3.0 |
| PP-1-2V1 | 7.00% | $K_1$ [pN, 20° C.]: | 14.7 |
| CCY-3-O2 | 7.50% | $K_3$ [pN, 20° C.]: | 15.6 |
| CPY-2-O2 | 10.00% | $V_0$ [V, 20° C.]: | 2.40 |
| CPY-3-O2 | 10.00% | $\gamma_1$ [mPa s, 20° C.]: | 104 |
| PYP-2-3 | 3.00% | | |

Example M349

| | | | |
|---|---|---|---|
| CC-3-V1 | 8.00% | Clearing point [° C.]: | 75 |
| CC-4-V1 | 20.00% | $\Delta n$ [589 nm, 20° C.]: | 0.0811 |
| CCH-301 | 10.00% | $\varepsilon_{\parallel}$ [1 kHz, 20° C.]: | 3.4 |

-continued

| | | | |
|---|---|---|---|
| CCH-34 | 5.00% | $\varepsilon_{\perp}$ [1 kHz, 20° C.]: | 6.4 |
| CCP-3-1 | 1.50% | $\Delta\varepsilon$ [1 kHz, 20° C.]: | −3.0 |
| CCY-3-O1 | 9.00% | $K_1$ [pN, 20° C.]: | 13.9 |
| CCY-3-O2 | 11.00% | $K_3$ [pN, 20° C.]: | 15.8 |
| CCY-4-O2 | 3.00% | $V_0$ [V, 20° C.]: | 2.43 |
| CPY-2-O2 | 1.50% | $\gamma_1$ [mPa s, 20° C.]: | 96 |
| CPY-3-O2 | 4.00% | LTS bulk [h, −20° C.]: | >1000 h |
| CY-3-O2 | 15.00% | | |
| CY-3-O4 | 6.00% | | |
| PCH-302 | 5.00% | | |
| PY-3-O2 | 1.00% | | |

Example M350

| | | | |
|---|---|---|---|
| B-2O-O5 | 4.00% | Clearing point [° C.]: | 74.5 |
| CGS-3-2 | 8.00% | $\Delta n$ [589 nm, 20° C.]: | 0.1086 |
| CC-3-V1 | 9.00% | $\varepsilon_{\parallel}$ [1 kHz, 20° C.]: | 3.7 |
| CC-4-V1 | 20.00% | $\varepsilon_{\perp}$ [1 kHz, 20° C.]: | 6.9 |
| CCP-3-1 | 9.50% | $\Delta\varepsilon$ [1 kHz, 20° C.]: | −3.2 |
| CCP-V2-1 | 5.00% | $K_1$ [pN, 20° C.]: | 14.6 |
| CCY-3-O2 | 9.00% | $K_3$ [pN, 20° C.]: | 16.6 |
| CLY-3-O2 | 1.00% | $V_0$ [V, 20° C.]: | 2.40 |
| CPY-3-O2 | 3.00% | $\gamma_1$ [mPa s, 20° C.]: | 104 |
| CY-3-O2 | 15.00% | LTS bulk [h, −20° C.]: | >1000 h |
| PCH-301 | 2.00% | LTS bulk [h, −25° C.]: | >1000 h |
| PY-1-O2 | 8.00% | | |
| PY-2-O2 | 6.50% | | |

Example M351

| | | | |
|---|---|---|---|
| B(S)-2O-O5 | 4.00% | Clearing point [° C.]: | 74 |
| CC-3-V1 | 6.00% | $\Delta n$ [589 nm, 20° C.]: | 0.0900 |
| CC-4-V1 | 10.00% | $\varepsilon_{\parallel}$ [1 kHz, 20° C.]: | 3.6 |
| CCH-301 | 15.00% | $\varepsilon_{\perp}$ [1 kHz, 20° C.]: | 6.8 |
| CCP-3-1 | 13.00% | $\Delta\varepsilon$ [1 kHz, 20° C.]: | −3.2 |
| CCY-3-O2 | 11.00% | $K_1$ [pN, 20° C.]: | 14.1 |
| CCY-5-O2 | 9.00% | $K_3$ [pN, 20° C.]: | 16.5 |
| CY-3-O2 | 15.00% | $V_0$ [V, 20° C.]: | 2.40 |
| PCH-302 | 7.00% | $\gamma_1$ [mPa s, 20° C.]: | 104 |
| PY-2-O2 | 8.00% | LTS bulk [h, −20° C.]: | >1000 h |
| CCH-35 | 2.00% | | |

Example M352

| | | | |
|---|---|---|---|
| CC-3-V1 | 8.00% | Clearing point [° C.]: | 74 |
| CC-4-V1 | 13.00% | $\Delta n$ [589 nm, 20° C.]: | 0.0904 |
| CCH-301 | 15.00% | $\varepsilon_{\parallel}$ [1 kHz, 20° C.]: | 3.6 |
| CCP-3-1 | 13.00% | $\varepsilon_{\perp}$ [1 kHz, 20° C.]: | 6.8 |
| CCY-3-O1 | 3.00% | $\Delta\varepsilon$ [1 kHz, 20° C.]: | −3.2 |
| CCY-3-O2 | 11.00% | $K_1$ [pN, 20° C.]: | 14.0 |
| CCY-5-O2 | 8.00% | $K_3$ [pN, 20° C.]: | 16.7 |
| CY-3-O2 | 15.00% | $V_0$ [V, 20° C.]: | 2.41 |
| PY-1-O2 | 8.00% | $\gamma_1$ [mPa s, 20° C.]: | 103 |
| PY-2-O2 | 6.00% | LTS bulk [h, −20° C.]: | >1000 h |

Example M353

| | | | |
|---|---|---|---|
| B(S)-2O-O5 | 1.50% | Clearing point [° C.]: | 75 |
| CC-3-V1 | 9.00% | $\Delta n$ [589 nm, 20° C.]: | 0.1019 |
| CC-4-V1 | 20.00% | $\varepsilon_{\parallel}$ [1 kHz, 20° C.]: | 3.6 |

-continued

| | | | |
|---|---|---|---|
| CCH-301 | 8.00% | $\varepsilon_\perp$ [1 kHz, 20° C.]: | 6.7 |
| CCP-3-1 | 11.50% | Δε [1 kHz, 20° C.]: | −3.1 |
| CCP-3-3 | 2.00% | $K_1$ [pN, 20° C.]: | 14.3 |
| CCY-3-O2 | 4.50% | $K_3$ [pN, 20° C.]: | 16.2 |
| CLY-3-O2 | 1.00% | $V_0$ [V, 20° C.]: | 2.41 |
| CPY-2-O2 | 2.00% | $\gamma_1$ [mPa s, 20° C.]: | 97 |
| CPY-3-O2 | 12.00% | LTS bulk [h, −20° C.]: | >1000 h |
| CY-3-O2 | 15.00% | LTS bulk [h, −25° C.]: | >1000 h |
| PY-1-O2 | 3.50% | | |
| PY-2-O2 | 10.00% | | |

Example M354

| | | | |
|---|---|---|---|
| B(S)-2O-O5 | 4.00% | Clearing point [° C.]: | 74 |
| CC-3-V1 | 8.00% | Δn [589 nm, 20° C.]: | 0.1019 |
| CC-4-V1 | 16.00% | $\varepsilon_\parallel$ [1 kHz, 20° C.]: | 3.6 |
| CCH-301 | 9.00% | $\varepsilon_\perp$ [1 kHz, 20° C.]: | 6.6 |
| CCP-3-1 | 13.00% | Δε [1 kHz, 20° C.]: | −3.1 |
| CCY-3-O2 | 11.00% | $K_1$ [pN, 20° C.]: | 14.2 |
| CLY-3-O2 | 1.00% | $K_3$ [pN, 20° C.]: | 15.9 |
| CPY-2-O2 | 8.00% | $V_0$ [V, 20° C.]: | 2.40 |
| CY-3-O2 | 8.50% | $\gamma_1$ [mPa s, 20° C.]: | 99 |
| PCH-302 | 8.00% | LTS bulk [h, −20° C.]: | >1000 h |
| PY-1-O2 | 3.50% | LTS bulk [h, −25° C.]: | >1000 h |
| PY-2-O2 | 10.00% | | |

Example M355

| | | | |
|---|---|---|---|
| B(S)-2O-O5 | 4.00% | Clearing point [° C.]: | 74 |
| CC-3-V1 | 8.00% | Δn [589 nm, 20° C.]: | 0.1028 |
| CC-4-V1 | 17.50% | $\varepsilon_\parallel$ [1 kHz, 20° C.]: | 3.6 |
| CCH-301 | 15.00% | $\varepsilon_\perp$ [1 kHz, 20° C.]: | 6.7 |
| CCP-3-1 | 13.00% | Δε [1 kHz, 20° C.]: | −3.1 |
| CCY-3-O2 | 4.00% | $K_1$ [pN, 20° C.]: | 14.2 |
| CLY-3-O2 | 1.00% | $K_3$ [pN, 20° C.]: | 15.6 |
| CPY-2-O2 | 2.50% | $V_0$ [V, 20° C.]: | 2.37 |
| CPY-3-O2 | 12.00% | $\gamma_1$ [mPa s, 20° C.]: | 96 |
| CY-3-O2 | 9.00% | LTS bulk [h, −20° C.]: | >1000 h |
| PY-1-O2 | 4.00% | LTS bulk [h, −25° C.]: | >1000 h |
| PY-2-O2 | 10.00% | | |

Example M356

| | | | |
|---|---|---|---|
| B(S)-2O-O5 | 1.50% | Clearing point [° C.]: | 74.5 |
| CC-3-V1 | 8.00% | Δn [589 nm, 20° C.]: | 0.0901 |
| CC-4-V1 | 20.00% | $\varepsilon_\parallel$ [1 kHz, 20° C.]: | 3.5 |
| CCH-301 | 7.00% | $\varepsilon_\perp$ [1 kHz, 20° C.]: | 6.7 |
| CCH-24 | 3.50% | Δε [1 kHz, 20° C.]: | −3.2 |
| CCP-3-1 | 5.50% | $K_1$ [pN, 20° C.]: | 14.2 |
| CCY-3-O1 | 8.00% | $K_3$ [pN, 20° C.]: | 16.3 |
| CCY-3-O2 | 11.00% | $V_0$ [V, 20° C.]: | 2.38 |
| CCY-5-O2 | 4.50% | $\gamma_1$ [mPa s, 20° C.]: | 100 |
| CPY-2-O2 | 1.50% | LTS bulk [h, −20° C.]: | >1000 h |
| CY-3-O2 | 14.50% | LTS bulk [h, −30° C.]: | >1000 h |
| PCH-302 | 5.00% | | |
| PY-1-O2 | 10.00% | | |

Example M357

| | | | |
|---|---|---|---|
| B(S)-2O-O5 | 1.00% | Clearing point [° C.]: | 75 |
| CC-3-V1 | 8.00% | Δn [589 nm, 20° C.]: | 0.0909 |
| CC-4-V1 | 19.00% | $\varepsilon_\parallel$ [1 kHz, 20° C.]: | 3.7 |
| CCH-301 | 7.50% | $\varepsilon_\perp$ [1 kHz, 20° C.]: | 6.9 |
| CCP-3-1 | 16.00% | Δε [1 kHz, 20° C.]: | −3.2 |
| CCY-3-O1 | 6.00% | $K_1$ [pN, 20° C.]: | 14.1 |
| CCY-3-O2 | 5.00% | $K_3$ [pN, 20° C.]: | 15.9 |
| CCY-5-O2 | 4.00% | $V_0$ [V, 20° C.]: | 2.36 |
| CPY-2-O2 | 7.00% | $\gamma_1$ [mPa s, 20° C.]: | 98 |
| CY-3-O2 | 15.50% | LTS bulk [h, −20° C.]: | >1000 h |
| Y-4O-O4 | 5.00% | | |
| PY-1-O2 | 6.00% | | |

Example M358

| | | | |
|---|---|---|---|
| B(S)-2O-O5 | 5.00% | Clearing point [° C.]: | 74.5 |
| BCH-32 | 1.50% | Δn [589 nm, 20° C.]: | 0.1044 |
| CC-3-V1 | 8.00% | $\varepsilon_\parallel$ [1 kHz, 20° C.]: | 3.5 |
| CC-4-V1 | 19.00% | $\varepsilon_\perp$ [1 kHz, 20° C.]: | 6.6 |
| CCY-3-O2 | 11.00% | Δε [1 kHz, 20° C.]: | −3.1 |
| CPY-3-O2 | 11.00% | $K_1$ [pN, 20° C.]: | 13.8 |
| CY-3-O2 | 15.50% | $K_3$ [pN, 20° C.]: | 15.6 |
| PCH-302 | 6.50% | $V_0$ [V, 20° C.]: | 2.37 |
| PYP-2-3 | 8.50% | $\gamma_1$ [mPa s, 20° C.]: | 103 |
| CCH-301 | 14.00% | LTS bulk [h, −20° C.]: | >1000 h |

Example M359

| | | | |
|---|---|---|---|
| B(S)-2O-O4 | 3.00% | Clearing point [° C.]: | 73.5 |
| CC-3-V1 | 8.00% | Δn [589 nm, 20° C.]: | 0.1031 |
| CC-4-V1 | 20.00% | $\varepsilon_\parallel$ [1 kHz, 20° C.]: | 3.5 |
| CCH-301 | 14.00% | $\varepsilon_\perp$ [1 kHz, 20° C.]: | 6.6 |
| CCY-3-O2 | 11.00% | Δε [1 kHz, 20° C.]: | −3.1 |
| CCP-3-1 | 2.00% | $K_1$ [pN, 20° C.]: | 14.0 |
| CPY-3-O2 | 11.50% | $K_3$ [pN, 20° C.]: | 15.7 |
| CY-3-O2 | 15.00% | $V_0$ [V, 20° C.]: | 2.38 |
| CY-3-O4 | 4.50% | $\gamma_1$ [mPa s, 20° C.]: | 102 |
| PP-1-2V1 | 3.00% | LTS bulk [h, −20° C.]: | >1000 h |
| PYP-2-3 | 8.00% | LTS bulk [h, −30° C.]: | >1000 h |

Example M360

| | | | |
|---|---|---|---|
| B(S)-2O-O5 | 4.00% | Clearing point [° C.]: | 74 |
| CC-3-V1 | 8.00% | Δn [589 nm, 20° C.]: | 0.1039 |
| CC-4-V1 | 22.00% | $\varepsilon_\parallel$ [1 kHz, 20° C.]: | 3.4 |
| CCH-24 | 8.00% | $\varepsilon_\perp$ [1 kHz, 20° C.]: | 6.5 |
| CCH-25 | 5.00% | Δε [1 kHz, 20° C.]: | −3.1 |
| CCY-3-O2 | 8.50% | $K_1$ [pN, 20° C.]: | 14.2 |
| CPY-3-O2 | 12.00% | $K_3$ [pN, 20° C.]: | 14.2 |
| CY-3-O2 | 15.00% | $V_0$ [V, 20° C.]: | 2.26 |
| CY-3-O4 | 6.50% | $\gamma_1$ [mPa s, 20° C.]: | 98 |
| PYP-2-3 | 11.00% | LTS bulk [h, −20° C.]: | >1000 h |

Example M361

| | | | |
|---|---|---|---|
| B(S)-2O-O4 | 5.00% | Clearing point [° C.]: | 74 |
| B(S)-2O-O5 | 5.00% | Δn [589 nm, 20° C.]: | 0.1348 |
| CC-3-V1 | 8.00% | $\varepsilon_{\parallel}$ [1 kHz, 20° C.]: | 3.5 |
| CC-4-V1 | 22.00% | $\varepsilon_{\perp}$ [1 kHz, 20° C.]: | 6.6 |
| CCP-3-1 | 7.00% | Δε [1 kHz, 20° C.]: | −3.1 |
| CCY-3-O2 | 8.00% | $K_1$ [pN, 20° C.]: | 17.1 |
| CCY-5-O2 | 4.00% | $K_3$ [pN, 20° C.]: | 17.9 |
| CY-3-O2 | 7.50% | $V_0$ [V, 20° C.]: | 2.55 |
| PP-1-2V1 | 14.00% | $\gamma_1$ [mPa s, 20° C.]: | 104 |
| PY-1-O2 | 9.50% | LTS bulk [h, −20° C.]: | >1000 h |
| PYP-2-3 | 10.00% | | |

Example M362

| | | | |
|---|---|---|---|
| CC-3-V1 | 9.00% | Clearing point [° C.]: | 74.5 |
| CC-4-V1 | 6.00% | Δn [589 nm, 20° C.]: | 0.0805 |
| CCH-301 | 10.00% | $\varepsilon_{\parallel}$ [1 kHz, 20° C.]: | 3.4 |
| CCH-303 | 7.00% | $\varepsilon_{\perp}$ [1 kHz, 20° C.]: | 6.4 |
| CCH-34 | 5.00% | Δε [1 kHz, 20° C.]: | −3.0 |
| CCH-35 | 5.5% | $K_1$ [pN, 20° C.]: | 14.0 |
| CCY-3-1 | 4.00% | $K_3$ [pN, 20° C.]: | 15.8 |
| CCY-3-O1 | 7.00% | $V_0$ [V, 20° C.]: | 2.43 |
| CCY-3-O2 | 15.00% | $\gamma_1$ [mPa s, 20° C.]: | 99 |
| CPY-2-O2 | 4.50% | LTS bulk [h, −20° C.]: | >1000 h |
| CPY-3-O2 | 2.50% | | |
| CY-3-O2 | 15.50% | | |
| CY-3-O4 | 1.50% | | |
| PCH-301 | 6.50% | | |
| PY-3-O2 | 1.00% | | |

Example M363

For the preparation of a PS (polymer stabilised) mixture, for example for PS-VA, PS-IPS or PS-FFS displays, the mixture according to Example M362 is mixed with 0.3% of the polymerisable compound of the formula

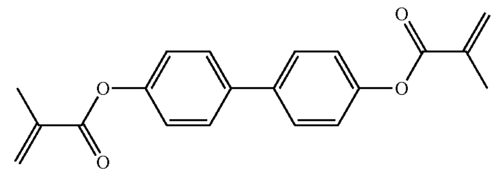 [SMILES: C=C(C)C(=O)Oc1ccc(-c2ccc(OC(=O)C(=C)C)cc2)cc1]

and 0.001% of Irganox 1076.

Example M364

Zur Herstellung einer SA-VA (self-alignment-VA)-Mischung, the mixture according to Example M362 is mixed with 0.3% of the polymerisable compound of the formula

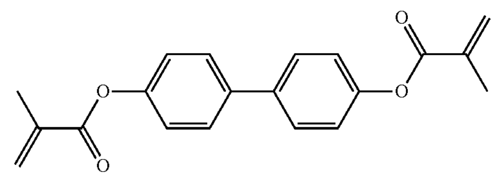 [SMILES: C=C(C)C(=O)Oc1ccc(-c2ccc(OC(=O)C(=C)C)cc2)cc1]

0.001% of Irganox 1076 and
0.6% of the compound of the formula

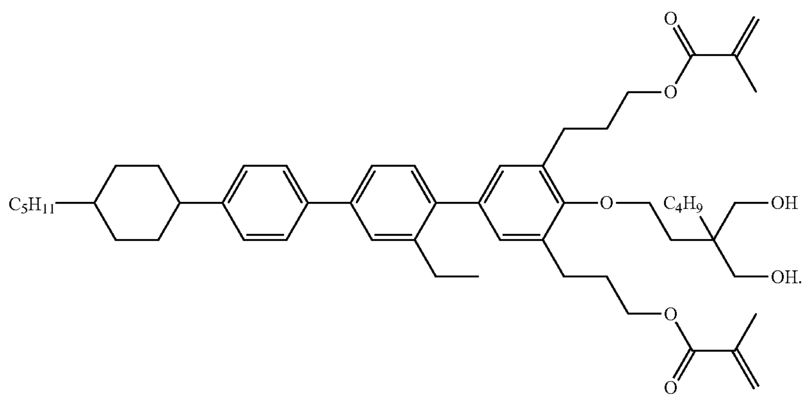

Example M365

| | | | |
|---|---|---|---|
| B(S)-2O-O5 | 4.00% | Clearing point [° C.]: | 74.5 |
| CC-3-V1 | 4.00% | Δn [589 nm, 20° C.]: | 0.0905 |
| CC-4-V1 | 12.00% | $\varepsilon_{\parallel}$ [1 kHz, 20° C.]: | 3.5 |
| CCH-301 | 5.00% | $\varepsilon_{\perp}$ [1 kHz, 20° C.]: | 6.7 |
| CCH-34 | 9.00% | Δε [1 kHz, 20° C.]: | −3.2 |
| CCH-35 | 8.00% | $K_1$ [pN, 20° C.]: | 14.9 |
| CCP-3-1 | 8.00% | $K_3$ [pN, 20° C.]: | 16.2 |
| CCY-3-O2 | 11.00% | $V_0$ [V, 20° C.]: | 2.37 |
| CCY-5-O2 | 8.50% | $\gamma_1$ [mPa s, 20° C.]: | 96 |
| CY-3-O2 | 15.00% | LTS bulk [h, −20° C.]: | >1000 h |
| PCH-301 | 5.00% | LTS bulk [h, −25° C.]: | >1000 h |
| PY-1-O2 | 10.50% | | |

Example M366

For the preparation of a PS (polymer stabilised) mixture, for example for PS-VA, PS-IPS or PS-FFS displays, the mixture according to Example M365 is mixed with 0.25% of the polymerisable compound of the formula

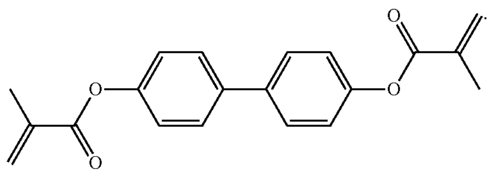

Example M367

For the preparation of a PS (polymer stabilised) mixture, for example for PS-VA, PS-IPS or PS-FFS displays, the mixture according to Example M365 is mixed with 0.25% of the polymerisable compound of the formula

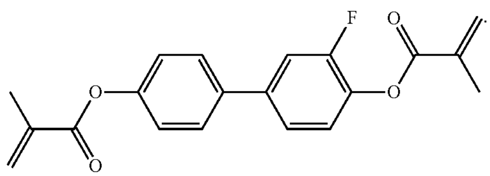

Example M368

| | | | |
|---|---|---|---|
| B(S)-2O-O4 | 2.00% | Clearing point [° C.]: | 75.1 |
| B(S)-2O-O5 | 3.00% | Δn [589 nm, 20° C.]: | 0.1037 |
| BCH-32 | 4.50% | $\varepsilon_{\parallel}$ [1 kHz, 20° C.]: | 3.4 |
| CC-3-V1 | 7.00% | $\varepsilon_{\perp}$ [1 kHz, 20° C.]: | 6.3 |
| CC-4-V1 | 16.00% | Δε [1 kHz, 20° C.]: | −3.0 |
| CCH-301 | 0.50% | $K_1$ [pN, 20° C.]: | 15.4 |
| CCH-303 | 2.00% | $K_3$ [pN, 20° C.]: | 15.9 |
| CCH-34 | 5.00% | $V_0$ [V, 20° C.]: | 2.44 |
| CCH-35 | 7.00% | | |
| CCY-3-O2 | 6.50% | | |
| CPY-2-O2 | 6.00% | | |
| CPY-3-O2 | 10.00% | | |
| CY-3-O2 | 15.00% | | |
| CY-3-O4 | 4.50% | | |
| PCH-302 | 6.50% | | |
| PP-1-2V1 | 4.50% | | |

Example M369

For the preparation of a PS (polymer stabilised) mixture, for example for PS-VA, PS-IPS or PS-FFS displays, the mixture according to Example M368 is mixed with 0.3% of the polymerisable compound of the formula

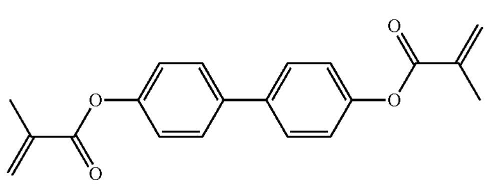 [SMILES: C=C(C)C(=O)Oc1ccc(-c2ccc(OC(=O)C(=C)C)cc2)cc1]

and 0.001% of Irganox 1076.

Example M370

| | | | |
|---|---|---|---|
| B(S)-2O-O4 | 5.00% | Clearing point [° C.]: | 74 |
| B(S)-2O-O5 | 5.00% | Δn [589 nm, 20° C.]: | 0.1353 |
| CC-3-V1 | 8.00% | $\varepsilon_{\parallel}$ [1 kHz, 20° C.]: | 3.6 |
| CC-4-V1 | 22.50% | $\varepsilon_{\perp}$ [1 kHz, 20° C.]: | 7.0 |
| CCP-3-1 | 7.50% | Δε [1 kHz, 20° C.]: | −3.4 |
| CCY-3-O2 | 8.00% | $K_1$ [pN, 20° C.]: | 16.9 |
| CCY-5-O2 | 4.00% | $K_3$ [pN, 20° C.]: | 17.7 |
| CY-3-O2 | 4.50% | $V_0$ [V, 20° C.]: | 2.42 |
| PP-1-2V1 | 10.50% | $\gamma_1$ [mPa s, 20° C.]: | 110 |
| PY-1-O2 | 15.00% | | |
| PYP-2-3 | 10.00% | | |

Example M371

For the preparation of a PS (polymer stabilised) mixture, for example for PS-VA, PS-IPS or PS-FFS displays, the mixture according to Example M370 is mixed with 0.3% of the polymerisable compound of the formula

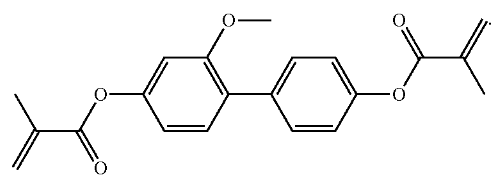 [SMILES: C=C(C)C(=O)Oc1ccc(-c2ccc(OC(=O)C(=C)C)cc2OC)cc1]

Example M372

| | | | |
|---|---|---|---|
| B(S)-2O-O4 | 3.50% | Clearing point [° C.]: | 74.5 |
| B(S)-2O-O5 | 4.50% | Δn [589 nm, 20° C.]: | 0.1031 |
| BCH-32 | 4.00% | $\varepsilon_{\parallel}$ [1 kHz, 20° C.]: | 3.4 |
| CC-3-V1 | 5.00% | $\varepsilon_{\perp}$ [1 kHz, 20° C.]: | 6.4 |
| CC-4-V1 | 16.50% | Δε [1 kHz, 20° C.]: | −3.0 |
| CCH-301 | 12.50% | $K_1$ [pN, 20° C.]: | 15.4 |
| CCH-303 | 1.50% | $K_3$ [pN, 20° C.]: | 15.8 |
| CCH-34 | 4.00% | $V_0$ [V, 20° C.]: | 2.45 |
| CCH-35 | 5.00% | $\gamma_1$ [mPa s, 20° C.]: | 97 |
| CCY-3-O2 | 10.00% | | |
| CPY-3-O2 | 11.50% | | |
| CY-3-O2 | 14.00% | | |
| PP-1-2V1 | 8.00% | | |

Example M373

For the preparation of a PS (polymer stabilised) mixture, for example for PS-VA, PS-IPS or PS-FFS displays, the mixture according to Example M372 is mixed with 0.3% of the polymerisable compound of the formula

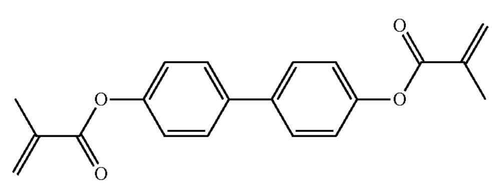

and 0.001% of Irganox 1076.

Example M374

| | | | |
|---|---|---|---|
| CC-3-V1 | 8.50% | Clearing point [° C.]: | 74 |
| CC-4-V1 | 14.00% | Δn [589 nm, 20° C.]: | 0.1088 |
| CCH-23 | 9.50% | $\varepsilon_{\parallel}$ [1 kHz, 20° C.]: | 3.4 |
| CCP-3-1 | 9.00% | $\varepsilon_{\perp}$ [1 kHz, 20° C.]: | 6.2 |
| CCY-3-O1 | 6.00% | Δε [1 kHz, 20° C.]: | −2.8 |
| CCY-3-O2 | 8.00% | $K_1$ [pN, 20° C.]: | 15.5 |
| CCY-5-O2 | 8.00% | $K_3$ [pN, 20° C.]: | 17.6 |
| CY-3-O2 | 10.00% | $V_0$ [V, 20° C.]: | 2.67 |
| PP-1-2V1 | 9.00% | $\gamma_1$ [mPa s, 20° C.]: | 104 |
| PY-1-O2 | 15.00% | | |
| PYP-2-3 | 3.00% | | |

Example M375

For the preparation of a PS (polymer stabilised) mixture, for example for PS-VA, PS-IPS or PS-FFS displays, the mixture according to Example M372 is mixed with 0.3% of the polymerisable compound of the formula

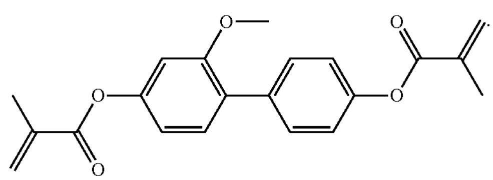

Example M376

For the preparation of a PS (polymer stabilised) mixture, for example for PS-VA, PS-IPS or PS-FFS displays, the mixture according to Example M362 is mixed with 0.3% of the polymerisable compound of the formula

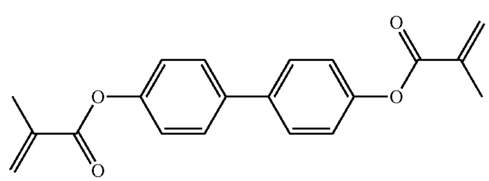 [SMILES: C=C(C)C(=O)Oc1ccc(-c2ccc(OC(=O)C(=C)C)cc2)cc1]

and 0.001% of Irganox 1076.

Example M377

For the preparation of a PS (polymer stabilised) mixture, for example for PS-VA, PS-IPS or PS-FFS displays, the mixture according to Example M242 is mixed with 0.3% of the polymerisable compound of the formula

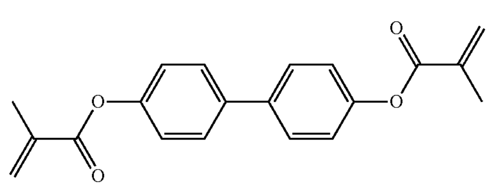 [SMILES: C=C(C)C(=O)Oc1ccc(-c2ccc(OC(=O)C(=C)C)cc2)cc1]

and 0.001% of Irganox 1076.

Example M378

For the preparation of a PS (polymer stabilised) mixture, for example for PS-VA, PS-IPS or PS-FFS displays, the mixture according to Example M361 is mixed with 0.3% of the polymerisable compound of the formula

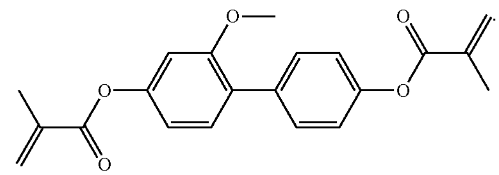

Example M379

| | | | |
|---|---|---|---|
| CCP-3-1 | 10.00% | Clearing point [° C.]: | 78.8 |
| CCY-2-1 | 1.50% | Δn [589 nm, 20° C.]: | 0.1017 |
| CCY-3-O2 | 8.50% | $\varepsilon_{\parallel}$ [1 kHz, 20° C.]: | 3.7 |
| CCY-4-O2 | 9.00% | $\varepsilon_{\perp}$ [1 kHz, 20° C.]: | 7.1 |
| CPY-3-O2 | 9.50% | Δε [1 kHz, 20° C.]: | −3.4 |
| PYP-2-3 | 10.00% | $K_1$ [pN, 20° C.]: | 15.0 |
| B(S)-2O-O5 | 4.00% | $K_3$ [pN, 20° C.]: | 14.9 |
| CC-3-V1 | 6.00% | $V_0$ [V, 20° C.]: | 2.20 |
| CC-4-V1 | 5.00% | $\gamma_1$ [mPa s, 20° C.]: | 110 |
| CCH-23 | 18.00% | | |
| CCH-35 | 4.00% | | |
| CY-3-O2 | 5.00% | | |
| Y-4O-O4 | 9.50% | | |

Example M380

The mixture according to Example M379 is stabilised with 0.04% of the compound of the formula

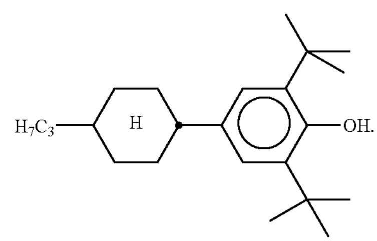

Example M381

The mixture according to Example M379 is stabilised with 0.04% of the compound of the formula

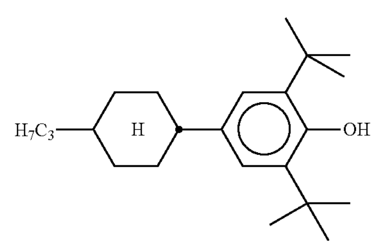

and 0.03% of the compound of the formula

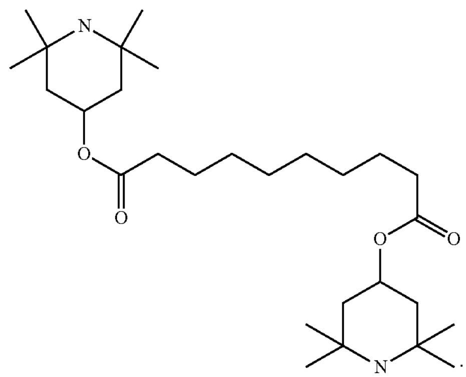

Example M382

| | | | |
|---|---|---|---|
| B(S)-2O-O5 | 4.00% | Clearing point [° C.]: | 79.9 |
| CCP-V-1 | 6.50% | Δn [589 nm, 20° C.]: | 0.1019 |
| CCY-3-O2 | 10.00% | $\varepsilon_{\parallel}$ [1 kHz, 20° C.]: | 3.7 |
| CCY-3-O3 | 9.00% | $\varepsilon_{\perp}$ [1 kHz, 20° C.]: | 7.1 |
| CLY-2-O4 | 2.00% | Δε [1 kHz, 20° C.]: | −3.4 |
| CPY-3-O2 | 10.00% | $K_1$ [pN, 20° C.]: | 15.1 |
| PYP-2-3 | 9.50% | $K_3$ [pN, 20° C.]: | 14.7 |
| CC-3-V1 | 8.00% | $V_0$ [V, 20° C.]: | 2.18 |
| CC-4-V1 | 5.00% | $\gamma_1$ [mPa s, 20° C.]: | 109 |
| CCH-23 | 18.00% | | |
| CCH-35 | 5.00% | | |
| CY-3-O2 | 5.00% | | |
| Y-4O-O4 | 8.00% | | |

Example M383

The mixture according to Example M379 is stabilised with 0.04% of the compound of the formula

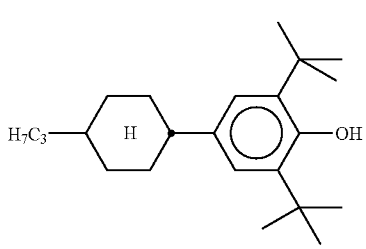

and 0.03% of the compound of the formula

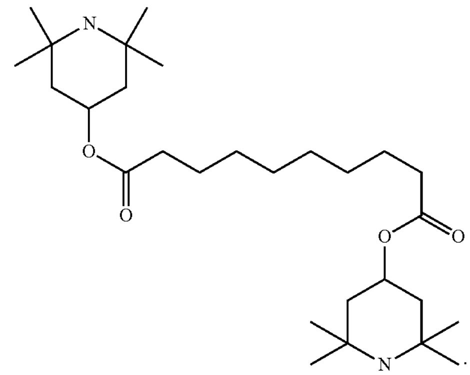

Example M384

| | | | |
|---|---|---|---|
| BCH-32 | 5.00% | Clearing point [° C.]: | 74.5 |
| CC-3-V1 | 6.00% | Δn [589 nm, 20° C.]: | 0.1024 |
| CC-4-V1 | 8.00% | $\varepsilon_{\parallel}$ [1 kHz, 20° C.]: | 3.7 |
| CCH-301 | 5.00% | $\varepsilon_{\perp}$ [1 kHz, 20° C.]: | 7.0 |
| CCH-34 | 6.50% | Δε [1 kHz, 20° C.]: | −3.3 |
| CCP-3-1 | 8.00% | $K_1$ [pN, 20° C.]: | 13.5 |
| CCY-3-O1 | 8.00% | $K_3$ [pN, 20° C.]: | 16.5 |
| CCY-3-O2 | 11.50% | $V_0$ [V, 20° C.]: | 2.33 |
| CPY-3-O2 | 5.50% | $\gamma_1$ [mPa s, 20° C.]: | 114 |
| CY-3-O2 | 15.00% | | |
| PCH-302 | 7.50% | | |
| PY-1-O2 | 3.00% | | |
| PY-2-O2 | 11.00% | | |

Example M385

For the preparation of a PS (polymer stabilised) mixture, for example for PS-VA, PS-IPS or PS-FFS displays, the mixture according to Example M384 is mixed with 0.25% of the polymerisable compound of the formula

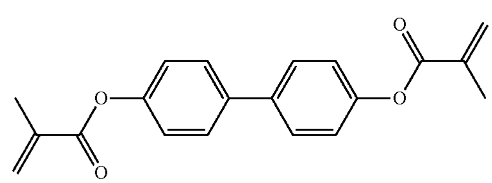 [SMILES: C=C(C)C(=O)Oc1ccc(-c2ccc(OC(=O)C(=C)C)cc2)cc1]

and 0.01% of the compound of the formula

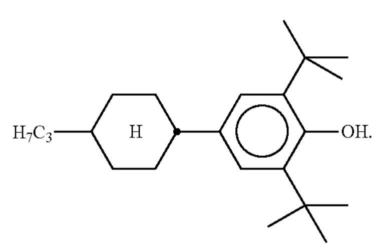

Example M386

The mixture according to Example M384 is stabilised with 0.01% of the compound of the formula

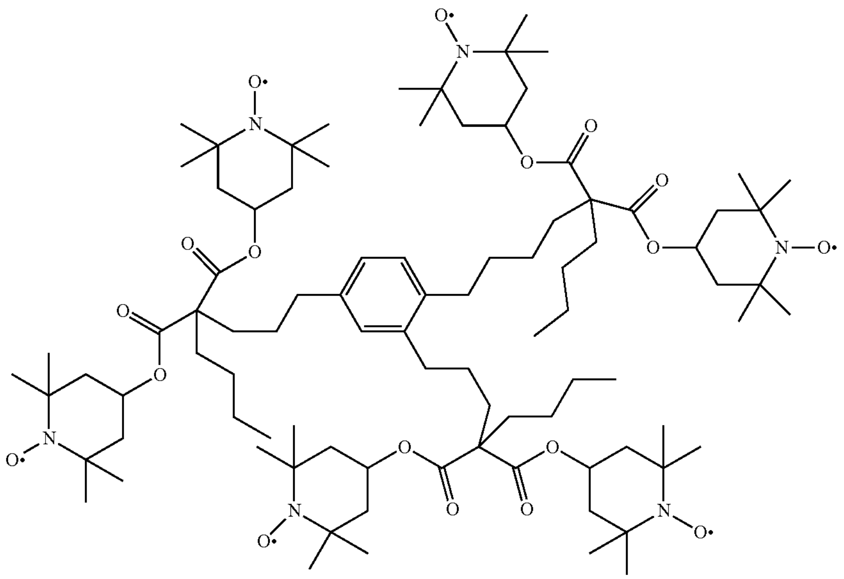

Example M387

| | | | |
|---|---|---|---|
| CCP-V-1 | 5.00% | Clearing point [° C.]: | 94.7 |
| CCP-V2-1 | 5.00% | Δn [589 nm, 20° C.]: | 0.1017 |
| CCY-3-O2 | 10.00% | Δε [1 kHz, 20° C.]: | −3.8 |
| CCY-3-O3 | 3.00% | $K_1$ [pN, 20° C.]: | 19.5 |
| CCY-4-O2 | 8.00% | $K_3$ [pN, 20° C.]: | 16.8 |
| CLY-3-O3 | 7.00% | $V_0$ [V, 20° C.]: | 2.22 |
| PYP-2-3 | 4.50% | $\gamma_1$ [mPa s, 20° C.]: | 123 |
| B(S)-2O-O4 | 3.50% | | |
| B(S)-2O-O5 | 6.00% | | |
| B(S)-2O-O6 | 4.00% | | |
| CC-3-V1 | 8.00% | | |
| CC-4-V1 | 16.00% | | |
| CCH-23 | 15.00% | | |
| Y-4O-O4 | 5.00% | | |

Example M388

| | | | |
|---|---|---|---|
| CCP-3-1 | 10.00% | Clearing point [° C.]: | 91.7 |
| CCP-3-3 | 3.50% | Δn [589 nm, 20° C.]: | 0.1023 |
| CCY-3-O2 | 11.00% | Δε [1 kHz, 20° C.]: | −3.8 |
| CCY-3-O3 | 4.50% | $K_1$ [pN, 20° C.]: | 19.2 |
| CCY-4-O2 | 4.00% | $K_3$ [pN, 20° C.]: | 17.0 |
| CLY-2-O4 | 1.50% | $V_0$ [V, 20° C.]: | 2.22 |
| CLY-3-O3 | 4.50% | $\gamma_1$ [mPa s, 20° C.]: | 125 |
| PYP-2-3 | 5.00% | | |
| B(S)-2O-O4 | 4.00% | | |
| B(S)-2O-O5 | 5.00% | | |
| B(S)-2O-O6 | 4.00% | | |
| CC-3-V1 | 8.00% | | |
| CC-4-V1 | 14.00% | | |
| CCH-23 | 14.00% | | |
| Y-4O-O4 | 7.00% | | |

Example M389

| | | | |
|---|---|---|---|
| B(S)-2O-O5 | 0.25% | Clearing point [° C.]: | 75.1 |
| BCH-32 | 1.50% | Δn [589 nm, 20° C.]: | 0.1038 |
| CC-3-V1 | 8.00% | $\varepsilon_{\parallel}$ [1 kHz, 20° C.]: | 3.4 |
| CC-4-V1 | 20.00% | $\varepsilon_{\perp}$ [1 kHz, 20° C.]: | 6.5 |
| CCH-303 | 1.50% | Δε [1 kHz, 20° C.]: | −3.0 |
| CCH-34 | 6.00% | $K_1$ [pN, 20° C.]: | 15.6 |
| CCH-35 | 8.00% | $K_3$ [pN, 20° C.]: | 16.0 |
| CCY-3-O2 | 9.50% | $V_0$ [V, 20° C.]: | 2.44 |
| CPY-2-O2 | 6.00% | $\gamma_1$ [mPa s, 20° C.]: | 99 |
| CPY-3-O2 | 11.00% | | |
| CY-3-O2 | 12.50% | | |
| PP-1-2V1 | 2.75% | | |
| PY-1-O2 | 5.50% | | |
| PY-2-O2 | 4.50% | | |
| PY-3-O2 | 3.00% | | |

Example M390

For the preparation of a PS (polymer stabilised) mixture, for example for PS-VA, PS-IPS or PS-FFS displays, the mixture according to Example M389 is mixed with 0.3% of the polymerisable compound of the formula

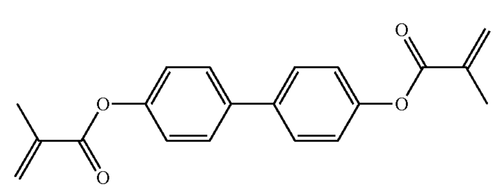 [SMILES: C=C(C)C(=O)Oc1ccc(-c2ccc(OC(=O)C(=C)C)cc2)cc1]

and 0.001% of Irganox 1076.

Example M391

For the preparation of a PS (polymer stabilised) mixture, for example for PS-VA, PS-IPS or PS-FFS displays, the mixture according to Example M389 is mixed with 0.35% of the polymerisable compound of the formula

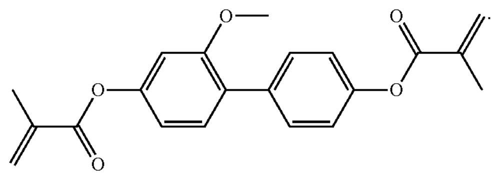

Example M392

For the preparation of a PS (polymer stabilised) mixture, for example for PS-VA, PS-IPS or PS-FFS displays, the mixture according to Example M389 is mixed with 0.3% of the polymerisable compound of the formula

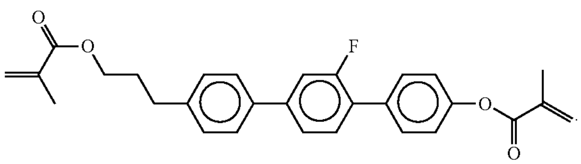

Example M393

| | | | |
|---|---|---|---|
| CC-3-V1 | 4.00% | Clearing point [° C.]: | 74.7 |
| CC-4-V1 | 7.00% | Δn [589 nm, 20° C.]: | 0.0808 |
| CCH-3O3 | 5.50% | $\varepsilon_{\parallel}$ [1 kHz, 20° C.]: | 3.4 |
| CCH-34 | 8.50% | $\varepsilon_{\perp}$ [1 kHz, 20° C.]: | 6.6 |
| CCH-35 | 9.00% | Δε [1 kHz, 20° C.]: | −3.2 |
| CCP-3-1 | 3.50% | $K_1$ [pN, 20° C.]: | 14.3 |
| CCY-3-1 | 8.00% | $K_3$ [pN, 20° C.]: | 16.4 |
| CCY-3-O2 | 11.00% | $V_0$ [V, 20° C.]: | 2.38 |
| CCY-5-O2 | 9.00% | $\gamma_1$ [mPa s, 20° C.]: | 116 |
| CY-3-O2 | 15.00% | | |
| CY-3-O4 | 2.00% | | |
| CY-5-O2 | 9.00% | | |
| PCH-301 | 5.00% | | |
| PY-1-O2 | 3.50% | | |

Example M394

For the preparation of a PS (polymer stabilised) mixture, for example for PS-VA, PS-IPS or PS-FFS displays, the mixture according to Example M393 is mixed with 0.25% of the polymerisable compound of the formula

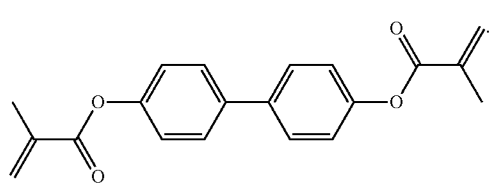

Example M395

| | | | |
|---|---|---|---|
| B(S)-2O-O5 | 2.00% | Clearing point [° C.]: | 74.3 |
| CC-3-V1 | 4.00% | Δn [589 nm, 20° C.]: | 0.0850 |
| CC-4-V1 | 13.50% | $\varepsilon_{\parallel}$ [1 kHz, 20° C.]: | 3.5 |
| CCH-301 | 2.00% | $\varepsilon_{\perp}$ [1 kHz, 20° C.]: | 6.7 |
| CCH-303 | 4.50% | Δε [1 kHz, 20° C.]: | −3.2 |
| CCH-34 | 5.50% | $K_1$ [pN, 20° C.]: | 14.3 |
| CCH-35 | 9.00% | $K_3$ [pN, 20° C.]: | 16.3 |
| CCP-3-1 | 5.00% | $V_0$ [V, 20° C.]: | 2.37 |
| CCY-3-O1 | 2.50% | $\gamma_1$ [mPa s, 20° C.]: | 107 |
| CCY-3-O2 | 11.00% | | |
| CCY-5-O2 | 9.00% | | |
| CY-3-O2 | 15.00% | | |
| CY-5-O2 | 5.00% | | |
| PCH-301 | 5.00% | | |
| PY-1-O2 | 7.00% | | |

Example M396

For the preparation of a PS (polymer stabilised) mixture, for example for PS-VA, PS-IPS or PS-FFS displays, the mixture according to Example M395 is mixed with 0.25% of the polymerisable compound of the formula

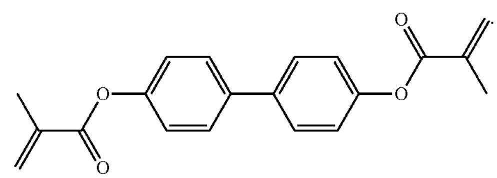

Example M397

For the preparation of a PS (polymer stabilised) mixture, for example for PS-VA, PS-IPS or PS-FFS displays, the mixture according to Example M395 is mixed with 0.25% of the polymerisable compound of the formula

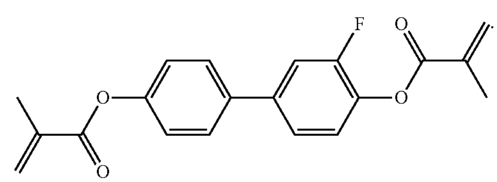

Example M398

For the preparation of a PS (polymer stabilised) mixture, for example for PS-VA, PS-IPS or PS-FFS displays, the mixture according to Example M395 is mixed with 0.25% of the polymerisable compound of the formula

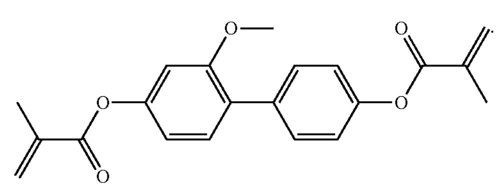

Example M399

| | | | |
|---|---|---|---|
| CC-3-V1 | 4.00% | Clearing point [° C.]: | 74.6 |
| CC-4-V1 | 11.00% | Δn [589 nm, 20° C.]: | 0.0895 |
| CCH-303 | 3.00% | $\varepsilon_{\parallel}$ [1 kHz, 20° C.]: | 3.5 |
| CCH-34 | 9.00% | $\varepsilon_{\perp}$ [1 kHz, 20° C.]: | 6.7 |
| CCH-35 | 8.50% | Δε [1 kHz, 20° C.]: | −3.2 |
| CCP-3-1 | 6.00% | $K_1$ [pN, 20° C.]: | 14.3 |
| CCY-3-O1 | 4.00% | $K_3$ [pN, 20° C.]: | 16.4 |
| CCY-3-O2 | 11.00% | $V_0$ [V, 20° C.]: | 2.37 |
| CCY-5-O2 | 9.50% | $\gamma_1$ [mPa s, 20° C.]: | 108 |
| CY-3-O2 | 15.00% | | |
| PCH-301 | 5.00% | | |
| PY-1-O2 | 10.00% | | |
| PY-2-O2 | 4.00% | | |

Example M400

For the preparation of a PS (polymer stabilised) mixture, for example for PS-VA, PS-IPS or PS-FFS displays, the mixture according to Example M399 is mixed with 0.25% of the polymerisable compound of the formula

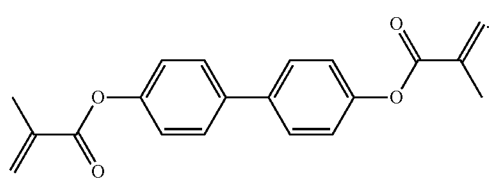

Example M401

For the preparation of a PS (polymer stabilised) mixture, for example for PS-VA, PS-IPS or PS-FFS displays, the mixture according to Example M399 is mixed with 0.25% of the polymerisable compound of the formula

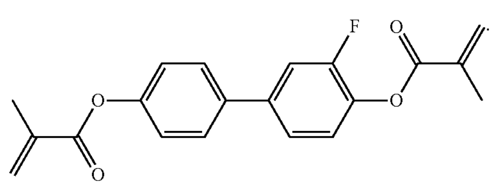 [SMILES: C=C(C)C(=O)Oc1ccc(-c2ccc(OC(=O)C(=C)C)c(F)c2)cc1]

Example M402

For the preparation of a PS (polymer stabilised) mixture, for example for PS-VA, PS-IPS or PS-FFS displays, the mixture according to Example M399 is mixed with 0.25% of the polymerisable compound of the formula

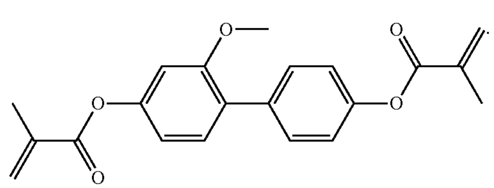 [SMILES: C=C(C)C(=O)Oc1ccc(-c2ccc(OC(=O)C(=C)C)cc2OC)cc1]

Example M403

For the preparation of a PS (polymer stabilised) mixture, for example for PS-VA, PS-IPS or PS-FFS displays, the mixture according to Example M399 is mixed with 0.3% of the polymerisable compound of the formula

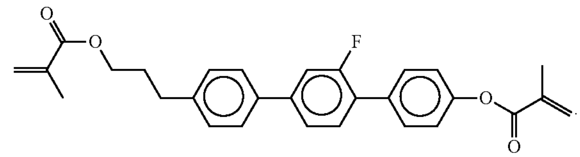

Example M404

For the preparation of a PS (polymer stabilised) mixture, for example for PS-VA, PS-IPS or PS-FFS displays, the mixture according to Example M399 is mixed with 0.3% of the polymerisable compound of the formula

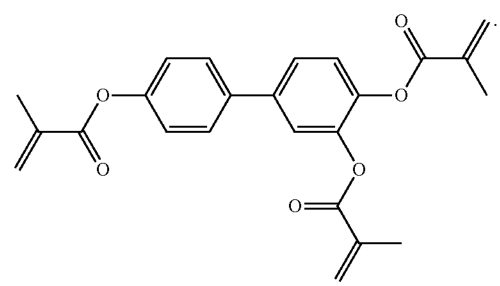 [SMILES: C=C(C)C(=O)Oc1ccc(-c2ccc(OC(=O)C(=C)C)c(OC(=O)C(=C)C)c2)cc1]

Example M405

| | | | |
|---|---|---|---|
| CCP-V-1 | 12.00% | Clearing point [° C.]: | 94.7 |
| CCP-V2-1 | 7.00% | Δn [589 nm, 20° C.]: | 0.1024 |
| CCY-3-O2 | 6.00% | $\varepsilon_{\parallel}$ [1 kHz, 20° C.]: | 3.5 |
| CLY-2-O4 | 7.00% | $\varepsilon_{\perp}$ [1 kHz, 20° C.]: | 7.3 |
| CLY-3-O3 | 6.50% | Δε [1 kHz, 20° C.]: | −3.8 |
| CLY-4-O2 | 5.00% | $K_1$ [pN, 20° C.]: | 18.5 |
| PGIY-2-O4 | 1.50% | $K_3$ [pN, 20° C.]: | 17.0 |
| B(S)-2O-O4 | 4.00% | $V_0$ [V, 20° C.]: | 2.21 |
| B(S)-2O-O5 | 4.00% | $\gamma_1$ [mPa s, 20° C.]: | 125 |
| B(S)-2O-O6 | 4.00% | | |
| CC-3-V1 | 7.00% | | |
| CC-4-V1 | 12.00% | | |
| CCH-23 | 13.00% | | |
| CY-3-O2 | 8.00% | | |
| Y-4O-O4 | 3.00% | | |

Example M406

| | | | |
|---|---|---|---|
| B(S)-2O-O5 | 4.00% | Clearing point [° C.]: | 74.5 |
| CC-3-V1 | 6.00% | Δn [589 nm, 20° C.]: | 0.0981 |
| CC-4-V1 | 14.00% | $\varepsilon_{\parallel}$ [1 kHz, 20° C.]: | 3.5 |
| CCH-34 | 8.50% | $\varepsilon_{\perp}$ [1 kHz, 20° C.]: | 6.8 |
| CCP-3-1 | 7.50% | Δε [1 kHz, 20° C.]: | −3.2 |
| CCY-3-O1 | 8.00% | $K_1$ [pN, 20° C.]: | 13.4 |
| CCY-3-O2 | 10.50% | $K_3$ [pN, 20° C.]: | 16.5 |
| CLY-3-O2 | 1.00% | $V_0$ [V, 20° C.]: | 2.38 |

-continued

| | | | |
|---|---|---|---|
| CPY-3-O2 | 4.50% | $\gamma_1$ [mPa s, 20° C.]: | 103 |
| CY-3-O2 | 11.50% | | |
| PCH-301 | 15.00% | | |
| PY-1-O2 | 8.00% | | |
| PY-2-O2 | 1.50% | | |

Example M407

For the preparation of a PS (polymer stabilised) mixture, for example for PS-VA, PS-IPS or PS-FFS displays, the mixture according to Example M406 is mixed with 0.3% of the polymerisable compound of the formula

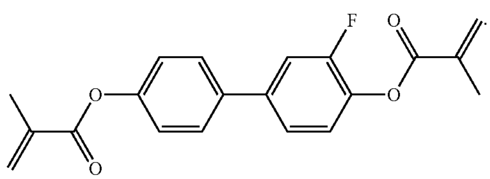

Example M408

For the preparation of a PS (polymer stabilised) mixture, for example for PS-VA, PS-IPS or PS-FFS displays, the mixture according to Example M406 is mixed with 0.35% of the polymerisable compound of the formula

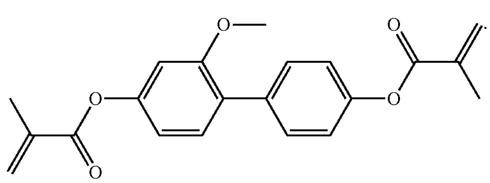

Example M409

For the preparation of a PS (polymer stabilised) mixture, for example for PS-VA, PS-IPS or PS-FFS displays, the mixture according to Example M406 is mixed with 0.35% of the polymerisable compound of the formula

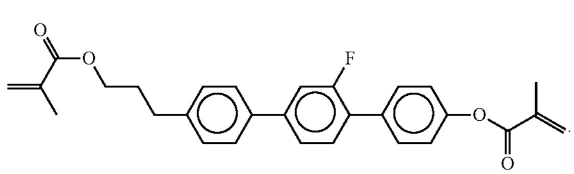

Example M410

For the preparation of a PS (polymer stabilised) mixture, for example for PS-VA, PS-IPS or PS-FFS displays, the mixture according to Example M406 is mixed with 0.35% of the polymerisable compound of the formula

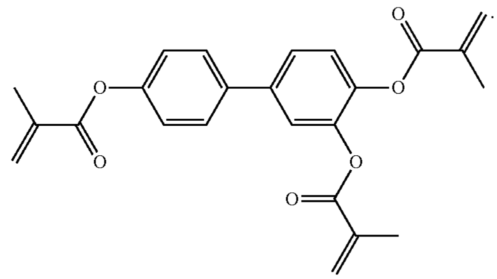 [SMILES: C=C(C)C(=O)Oc1ccc(-c2ccc(OC(=O)C(=C)C)c(OC(=O)C(=C)C)c2)cc1]

Example M411

For the preparation of a PS (polymer stabilised) mixture, for example for PS-VA, PS-IPS or PS-FFS displays, the mixture according to Example M406 is mixed with 0.35% of the polymerisable compound of the formula

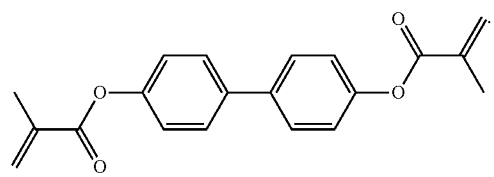 [SMILES: C=C(C)C(=O)Oc1ccc(-c2ccc(OC(=O)C(=C)C)cc2)cc1]

Example M412

| | | | |
|---|---|---|---|
| B(S)-2O-O5 | 4.00% | Clearing point [° C.]: | 74.3 |
| CC-3-V1 | 6.00% | $\Delta n$ [589 nm, 20° C.]: | 0.0984 |
| CC-4-V1 | 14.00% | $\varepsilon_{\parallel}$ [1 kHz, 20° C.]: | 3.5 |
| CCH-34 | 8.50% | $\varepsilon_{\perp}$ [1 kHz, 20° C.]: | 6.6 |
| CCH-35 | 2.00% | $\Delta\varepsilon$ [1 kHz, 20° C.]: | −3.1 |
| CCP-3-1 | 7.00% | $K_1$ [pN, 20° C.]: | 13.4 |
| CCY-3-O2 | 8.00% | $K_3$ [pN, 20° C.]: | 16.3 |
| CCY-4-O2 | 6.00% | $V_0$ [V, 20° C.]: | 2.41 |
| CLY-3-O2 | 1.00% | $\gamma_1$ [mPa s, 20° C.]: | 102 |
| CPY-3-O2 | 8.00% | | |
| CY-3-O2 | 12.50% | | |
| PCH-301 | 14.50% | | |
| PY-1-O2 | 8.50% | | |

Example M413

For the preparation of a PS (polymer stabilised) mixture, for example for PS-VA, PS-IPS or PS-FFS displays, the mixture according to Example M412 is mixed with 0.35% of the polymerisable compound of the formula

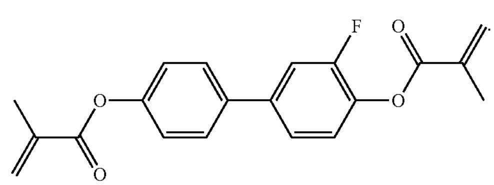

Example M414

For the preparation of a PS (polymer stabilised) mixture, for example for PS-VA, PS-IPS or PS-FFS displays, the mixture according to Example M412 is mixed with 0.35% of the polymerisable compound of the formula

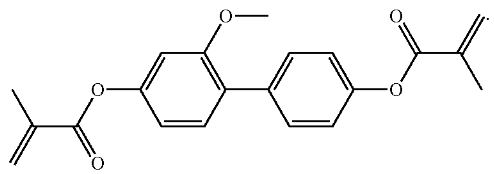

Example M415

For the preparation of a PS (polymer stabilised) mixture, for example for PS-VA, PS-IPS or PS-FFS displays, the mixture according to Example M412 is mixed with 0.35% of the polymerisable compound of the formula

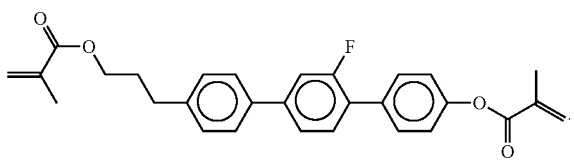

Example M416

For the preparation of a PS (polymer stabilised) mixture, for example for PS-VA, PS-IPS or PS-FFS displays, the mixture according to Example M412 is mixed with 0.35% of the polymerisable compound of the formula

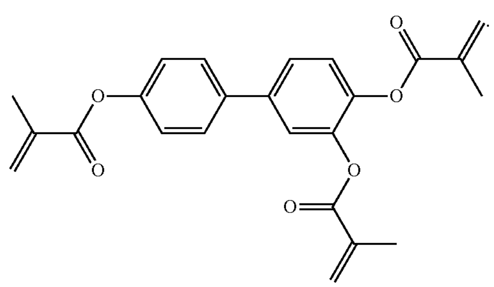 [SMILES: C=C(C)C(=O)Oc1ccc(-c2ccc(OC(=O)C(=C)C)c(OC(=O)C(=C)C)c2)cc1]

Example M417

For the preparation of a PS (polymer stabilised) mixture, for example for PS-VA, PS-IPS or PS-FFS displays, the mixture according to Example M412 is mixed with 0.35% of the polymerisable compound of the formula

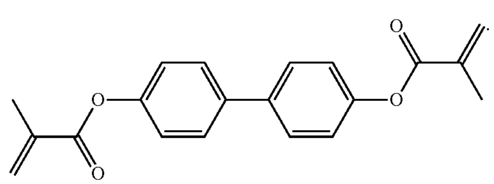

Example M418

For the preparation of a PS (polymer stabilised) mixture, for example for PS-VA, PS-IPS or PS-FFS displays, the mixture according to Example M231 is mixed with 0.3% of the polymerisable compound of the formula

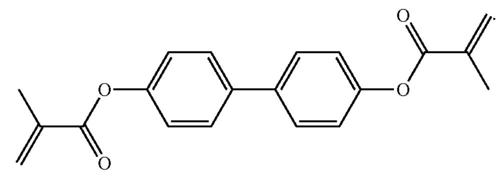 [SMILES: C=C(C)C(=O)Oc1ccc(-c2ccc(OC(=O)C(=C)C)cc2)cc1]

Example M419

For the preparation of an SA-VA mixture, the mixture according to Example M418 is mixed with 0.4% of the compound of the formula

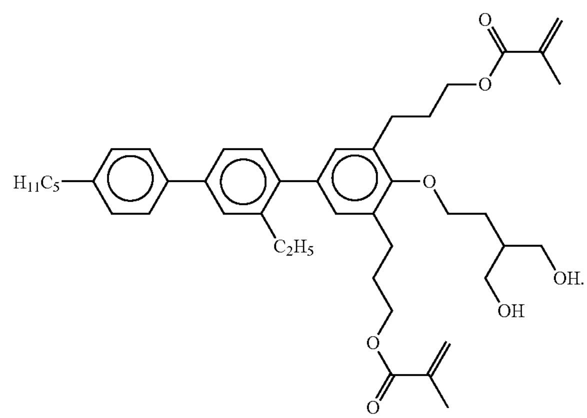

Example M420

For the preparation of a PS (polymer stabilised) mixture, for example for PS-VA, PS-IPS or PS-FFS displays, the mixture according to Example M232 is mixed with 0.3% of the polymerisable compound of the formula

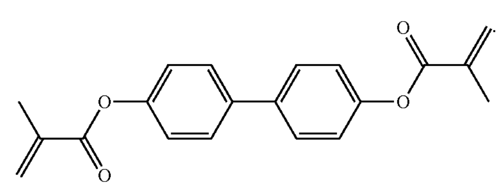

Example M421

| | | | |
|---|---|---|---|
| CCY-3-O2 | 9.50% | Clearing point [° C.]: | 74.9 |
| CPY-2-O2 | 11.00% | Δn [589 nm, 20° C.]: | 0.1081 |
| CPY-3-O2 | 10.50% | $\varepsilon_{\parallel}$ [1 kHz, 20° C.]: | 3.7 |
| B-2O-O5 | 1.50% | $\varepsilon_{\perp}$ [1 kHz, 20° C.]: | 7.5 |

-continued

| | | | |
|---|---|---|---|
| CC-3-V1 | 8.00% | Δε [1 kHz, 20° C.]: | −3.8 |
| CC-4-V1 | 17.00% | $K_1$ [pN, 20° C.]: | 14.4 |
| CCH-34 | 5.50% | $K_3$ [pN, 20° C.]: | 15.2 |
| CCH-35 | 8.00% | $V_0$ [V, 20° C.]: | 2.11 |
| CY-3-O2 | 11.00% | $\gamma_1$ [mPa s, 20° C.]: | 92 |
| PY-1-O2 | 6.00% | | |
| PY-3-O2 | 12.00% | | |

Example M422

For the preparation of a PS (polymer stabilised) mixture, for example for PS-VA, PS-IPS or PS-FFS displays, the mixture according to Example M421 is mixed with 0.3% of the polymerisable compound of the formula

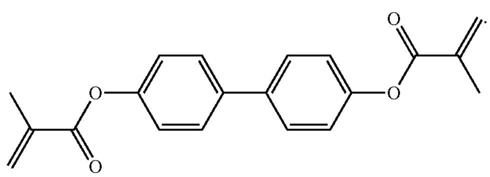

Example M423

For the preparation of a PS (polymer stabilised) mixture, for example for PS-VA, PS-IPS or PS-FFS displays, the mixture according to Example M237 is mixed with 0.3% of the polymerisable compound of the formula

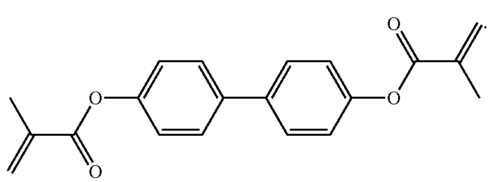

Example M424

For the preparation of a PS (polymer stabilised) mixture, for example for PS-VA, PS-IPS or PS-FFS displays, the mixture according to Example M237 is mixed with 0.3% of the polymerisable compound of the formula

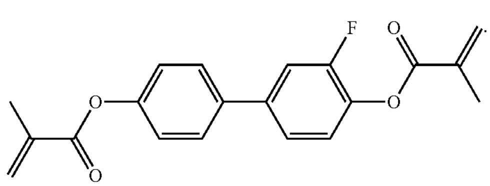

Example M425

For the preparation of a PS (polymer stabilised) mixture, for example for PS-VA, PS-IPS or PS-FFS displays, the mixture according to Example M233 is mixed with 0.3% of the polymerisable compound of the formula

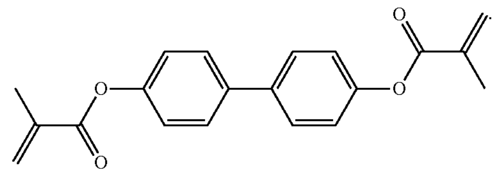

Example M426

For the preparation of a PS (polymer stabilised) mixture, for example for PS-VA, PS-IPS or PS-FFS displays, the mixture according to Example M240 is mixed with 0.3% of the polymerisable compound of the formula

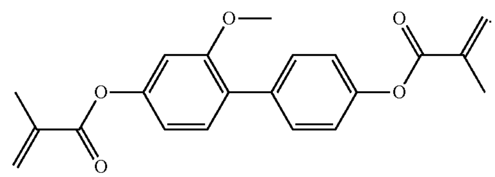

Example M427

| | | | |
|---|---|---|---|
| B-2O-O5 | 4.00% | Clearing point [° C.]: | 75.1 |
| CC-3-V1 | 8.00% | Δn [589 nm, 20° C.]: | 0.1117 |
| CC-4-V1 | 16.00% | Δε [1 kHz, 20° C.]: | −4.1 |
| CCH-34 | 8.00% | $K_1$ [pN, 20° C.]: | 15.3 |
| CCH-35 | 6.00% | $K_3$ [pN, 20° C.]: | 15.9 |
| CCY-3-O2 | 11.00% | $V_0$ [V, 20° C.]: | 2.05 |
| CPY-2-O2 | 9.00% | $\gamma_1$ [mPa s, 20° C.]: | 120 |
| CPY-3-O2 | 10.00% | | |
| CY-3-O2 | 11.00% | | |
| PPGU-3-F | 0.50% | | |
| PY-1-O2 | 6.00% | | |
| PY-3-O2 | 10.50% | | |

Example M428

For the preparation of a PS (polymer stabilised) mixture, for example for PS-VA, PS-IPS or PS-FFS displays, the mixture according to Example M427 is mixed with 0.3% of the polymerisable compound of the formula

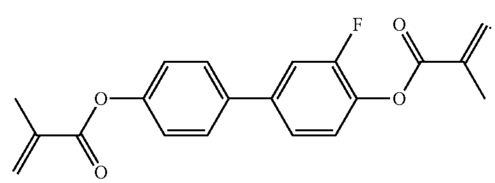 [SMILES: C=C(C)C(=O)Oc1ccc(-c2ccc(OC(=O)C(=C)C)c(F)c2)cc1]

Example M429

For the preparation of a PS (polymer stabilised) mixture, for example for PS-VA, PS-IPS or PS-FFS displays, the mixture according to Example M427 is mixed with 0.3% of the polymerisable compound of the formula

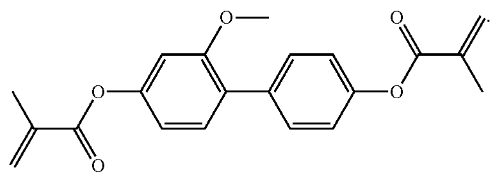

Example M430

For the preparation of a PS (polymer stabilised) mixture, for example for PS-VA, PS-IPS or PS-FFS displays, the mixture according to Example M427 is mixed with 0.3% of the polymerisable compound of the formula

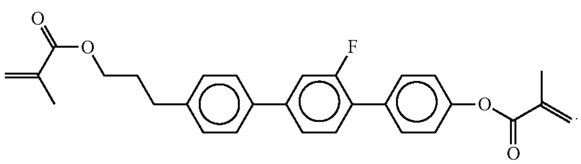

Example M431

For the preparation of a PS (polymer stabilised) mixture, for example for PS-VA, PS-IPS or PS-FFS displays, the mixture according to Example M427 is mixed with 0.3% of the polymerisable compound of the formula

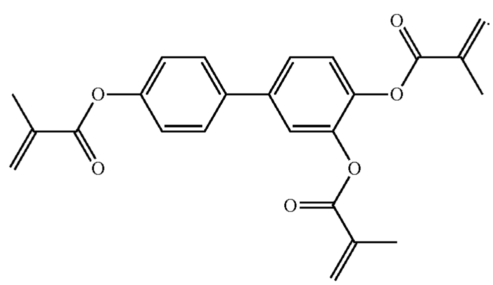 [SMILES: C=C(C)C(=O)Oc1ccc(-c2ccc(OC(=O)C(=C)C)c(OC(=O)C(=C)C)c2)cc1]

Example M432

For the preparation of a PS (polymer stabilised) mixture, for example for PS-VA, PS-IPS or PS-FFS displays, the mixture according to Example M427 is mixed with 0.3% of the polymerisable compound of the formula

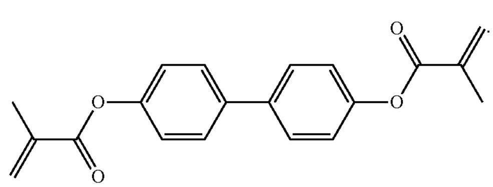

Example M433

| | | | |
|---|---|---|---|
| B(S)-2O-O4 | 4.00% | Clearing point [° C.]: | 74.1 |
| B(S)-2O-O5 | 5.00% | Δn [589 nm, 20° C.]: | 0.1191 |
| BCH-32 | 7.50% | $\varepsilon_{\parallel}$ [1 kHz, 20° C.]: | 3.8 |
| CC-3-V1 | 8.00% | $\varepsilon_{\perp}$ [1 kHz, 20° C.]: | 7.7 |
| CC-4-V1 | 11.00% | Δε [1 kHz, 20° C.]: | −4.0 |
| CCH-34 | 8.00% | $K_1$ [pN, 20° C.]: | 14.5 |
| CCH-35 | 6.00% | $K_3$ [pN, 20° C.]: | 14.8 |
| CCY-3-O2 | 11.00% | $V_0$ [V, 20° C.]: | 2.11 |
| CPY-2-O2 | 1.00% | $\gamma_1$ [mPa s, 20° C.]: | 111 |
| CPY-3-O2 | 8.00% | | |
| CY-3-O2 | 5.00% | | |
| PCH-302 | 5.00% | | |
| PY-1-O2 | 6.50% | | |
| PY-2-O2 | 7.00% | | |
| PY-3-O2 | 7.00% | | |

Example M434

For the preparation of a PS (polymer stabilised) mixture, for example for PS-VA, PS-IPS or PS-FFS displays, the mixture according to Example M433 is mixed with 0.3% of the polymerisable compound of the formula

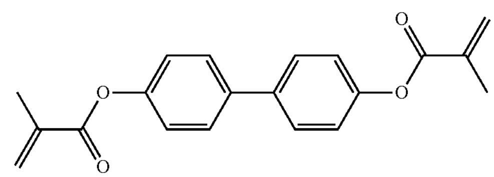

Example M435

For the preparation of a PS (polymer stabilised) mixture, for example for PS-VA, PS-IPS or PS-FFS displays, the mixture according to Example M433 is mixed with 0.3% of the polymerisable compound of the formula

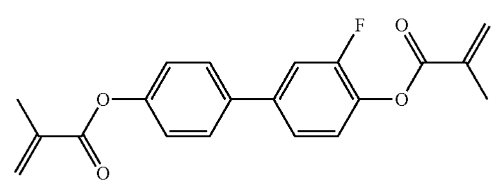

Example M436

For the preparation of a PS (polymer stabilised) mixture, for example for PS-VA, PS-IPS or PS-FFS displays, the mixture according to Example M421 is mixed with 0.3% of the polymerisable compound of the formula

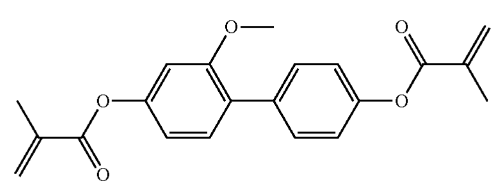

Example M437

| | | | |
|---|---|---|---|
| BCH-32 | 6.00% | Clearing point [° C.]: | 74.2 |
| CCY-3-O1 | 5.00% | Δn [589 nm, 20° C.]: | 0.1188 |
| CCY-3-O2 | 11.00% | $\varepsilon_{\parallel}$ [1 kHz, 20° C.]: | 3.6 |
| CPY-3-O2 | 12.00% | $\varepsilon_{\perp}$ [1 kHz, 20° C.]: | 6.9 |
| CC-3-V1 | 7.50% | Δε [1 kHz, 20° C.]: | −3.3 |
| CC-4-V1 | 17.00% | $K_1$ [pN, 20° C.]: | 14.9 |
| CCH-34 | 9.00% | $K_3$ [pN, 20° C.]: | 15.6 |
| CY-3-O2 | 2.00% | $V_0$ [V, 20° C.]: | 2.29 |
| PP-1-4 | 4.00% | $\gamma_1$ [mPa s, 20° C.]: | 109 |
| PY-1-O2 | 8.00% | | |
| PY-2-O2 | 6.00% | | |
| PY-3-O2 | 12.50% | | |

Example M438

For the preparation of a PS (polymer stabilised) mixture, for example for PS-VA, PS-IPS or PS-FFS displays, the mixture according to Example M437 is mixed with 0.3% of the polymerisable compound of the formula

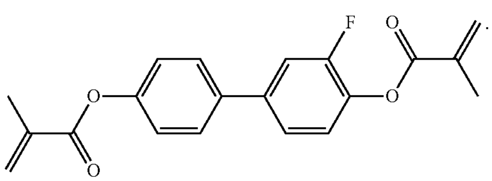 [SMILES: C=C(C)C(=O)Oc1ccc(-c2ccc(OC(=O)C(=C)C)c(F)c2)cc1]

Example M439

For the preparation of a PS (polymer stabilised) mixture, for example for PS-VA, PS-IPS or PS-FFS displays, the mixture according to Example M437 is mixed with 0.35% of the polymerisable compound of the formula

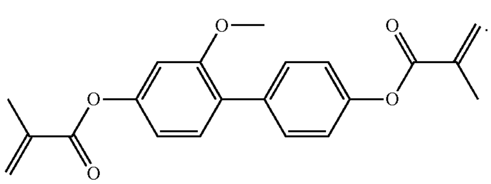 [SMILES: C=C(C)C(=O)Oc1ccc(-c2ccc(OC(=O)C(=C)C)cc2OC)cc1]

Example M440

For the preparation of a PS (polymer stabilised) mixture, for example for PS-VA, PS-IPS or PS-FFS displays, the mixture according to Example M437 is mixed with 0.35% of the polymerisable compound of the formula

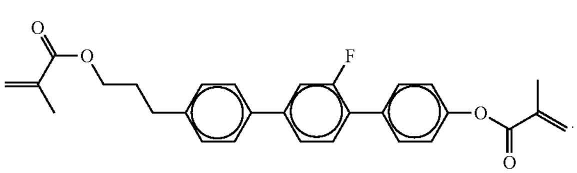

Example M441

For the preparation of a PS (polymer stabilised) mixture, for example for PS-VA, PS-IPS or PS-FFS displays, the mixture according to Example M437 is mixed with 0.35% of the polymerisable compound of the formula

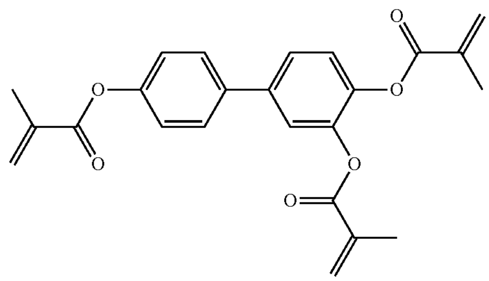

Example M442

For the preparation of a PS (polymer stabilised) mixture, for example for PS-VA, PS-IPS or PS-FFS displays, the mixture according to Example M437 is mixed with 0.3% of the polymerisable compound of the formula

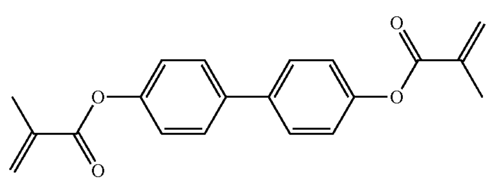

Example M443

The following stabilisers are added to the mixture according to Example M437:

0.04% of 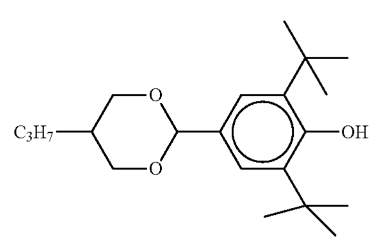

-continued 0.01% of

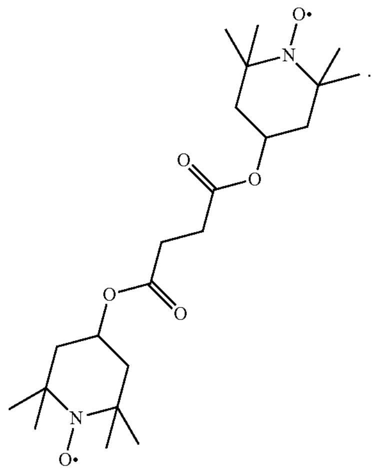

Example M444

The following stabilisers are added to the mixture according to Example M382:

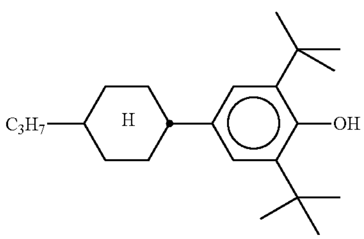

0.03% of

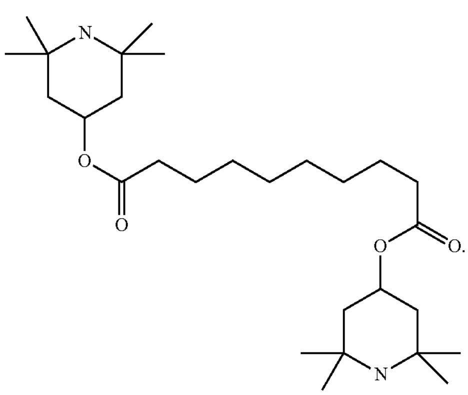

0.1% of

Example M445

The following stabiliser is added to the mixture according to Example M382:

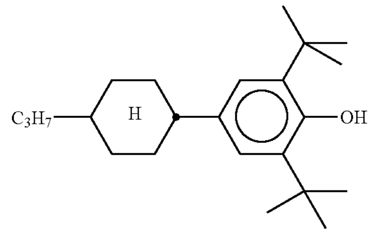

0.04% of

Example M446

For the preparation of a PS (polymer stabilised) mixture, for example for PS-VA, PS-IPS or PS-FFS displays, the mixture according to Example M14 is mixed with 0.3% of the polymerisable compound of the formula

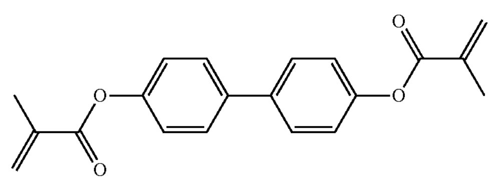

and 0.001% of Irganox 1076.

Example M447

For the preparation of a PS (polymer stabilised) mixture, for example for PS-VA, PS-IPS or PS-FFS displays, the mixture according to Example M14 is mixed with 0.3% of the polymerisable compound of the formula

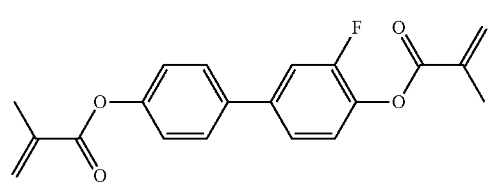

and 0.001% of Irganox 1076.

Example M448

For the preparation of a PS (polymer stabilised) mixture, for example for PS-VA, PS-IPS or PS-FFS displays, the mixture according to Example M14 is mixed with 0.3% of the polymerisable compound of the formula

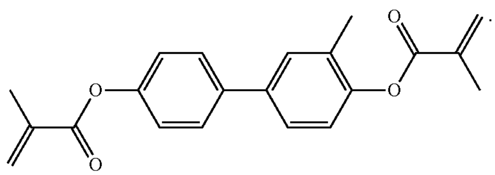 [SMILES: C=C(C)C(=O)Oc1ccc(-c2ccc(OC(=O)C(=C)C)c(C)c2)cc1]

Example M449

The following stabiliser is added to the mixture according to Example M14:

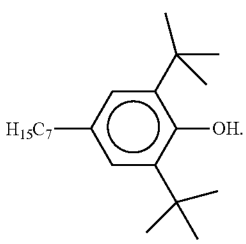

0.03% of

Example M450

| | | | |
|---|---|---|---|
| CC-3-V | 10.50% | Clearing point [° C.]: | 74.5 |
| CC-3-V1 | 5.50% | Δn [589 nm, 20° C.]: | 0.1033 |
| CC-4-V1 | 20.00% | $\varepsilon_{\parallel}$ [1 kHz, 20° C.]: | 3.6 |
| CCH-34 | 2.00% | $\varepsilon_{\perp}$ [1 kHz, 20° C.]: | 6.9 |
| CCH-35 | 1.50% | Δε [1 kHz, 20° C.]: | −3.3 |
| CCY-3-1 | 2.00% | $K_1$ [pN, 20° C.]: | 14.4 |
| CCY-3-O1 | 7.50% | $K_3$ [pN, 20° C.]: | 15.1 |
| CCY-3-O2 | 11.00% | | |
| CCY-4-O2 | 8.50% | | |
| CLY-2-O4 | 1.00% | | |
| CLY-3-O2 | 2.00% | | |
| PP-1-2V1 | 3.50% | | |
| PY-1-O2 | 9.50% | | |
| PY-2-O2 | 9.50% | | |
| PY-3-O2 | 6.00% | | |

Example M451

For the preparation of a PS (polymer stabilised) mixture, for example for PS-VA, PS-IPS or PS-FFS displays, the mixture according to Example M450 is mixed with 0.3% of the polymerisable compound of the formula

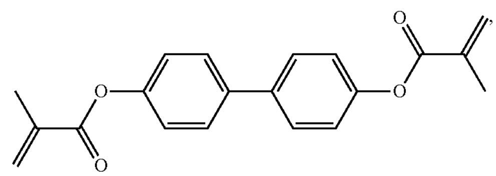 [SMILES: C=C(C)C(=O)Oc1ccc(-c2ccc(OC(=O)C(=C)C)cc2)cc1]

0.001% Irganox 1076 and
0.015%

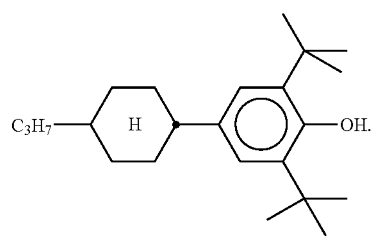

Example M452

For the preparation of an SA-VA (self-alignment VA) mixture, the mixture according to Example M451 is mixed with 0.6% of the compound of the formula

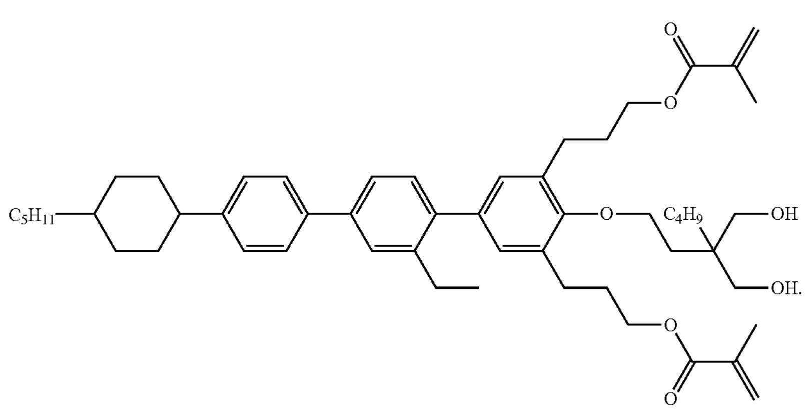

Example M453

| | | | |
|---|---|---|---|
| CC-3-V1 | 7.50% | Clearing point [° C.]: | 74.5 |
| CC-4-V1 | 20.00% | Δn [589 nm, 20° C.]: | 0.1030 |
| CCH-34 | 5.00% | Δε [1 kHz, 20° C.]: | −3.3 |
| CCH-35 | 7.50% | $K_1$ [pN, 20° C.]: | 15.1 |
| CCP-3-1 | 2.00% | $K_3$ [pN, 20° C.]: | 15.4 |
| CCY-3-O1 | 8.00% | | |
| CCY-3-O2 | 12.00% | | |
| CCY-4-O2 | 3.00% | | |
| CLY-3-O2 | 4.00% | | |
| CY-3-O2 | 1.50% | | |
| PY-1-O2 | 9.50% | | |
| PY-2-O2 | 9.50% | | |
| PY-3-O2 | 10.50% | | |

Example M454

For the preparation of a PS (polymer stabilised) mixture, for example for PS-VA, PS-IPS or PS-FFS displays, the mixture according to Example M453 is mixed with 0.3% of the polymerisable compound of the formula

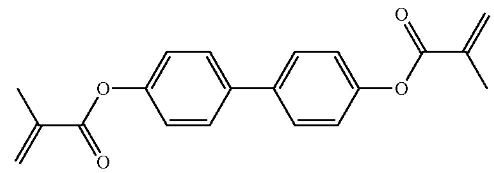

0.001% Irganox 1076 and
0.015%

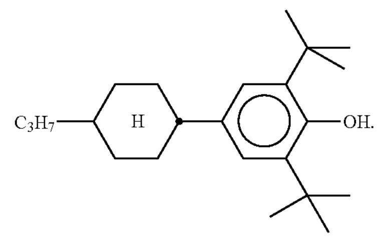

Example M455

For the preparation of an SA-VA (self-alignment VA) mixture, the mixture according to Example M454 is mixed with 0.6% of the compound of the formula

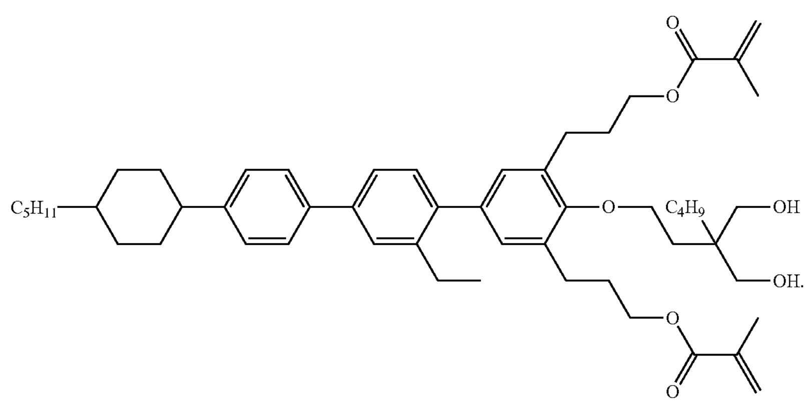

Example M456

| | | | |
|---|---|---|---|
| CC-3-V1 | 8.00% | Clearing point [° C.]: | 75.3 |
| CC-4-V1 | 15.50% | | |
| CCH-23 | 10.00% | | |
| CCP-3-1 | 9.50% | | |
| CCY-3-O1 | 7.00% | | |
| CCY-3-O2 | 8.00% | | |
| CCY-5-O2 | 7.00% | | |
| CY-3-O2 | 10.00% | | |
| PP-1-2V1 | 7.00% | | |
| PY-1-O2 | 15.00% | | |
| PYP-2-3 | 3.00% | | |

Example M457

The following stabiliser is added to the mixture according to Example M456:

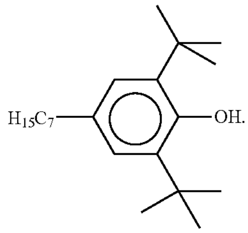

0.015%

Example M458

The following stabiliser is added to the mixture according to Example M456:

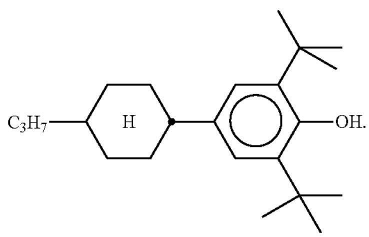

0.015%

Example M459

For the preparation of a PS (polymer stabilised) mixture, for example for PS-VA, PS-IPS or PS-FFS displays, the mixture according to Example M456 is mixed with 0.3% of the polymerisable compound of the formula

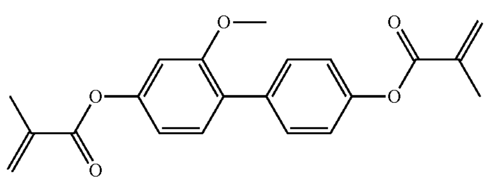 [SMILES: C=C(C)C(=O)Oc1ccc(-c2ccc(OC(=O)C(=C)C)cc2OC)cc1]

and
0.015%

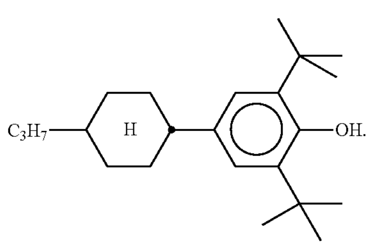

Example M460

| | | | |
|---|---|---|---|
| CC-3-V1 | 2.50% | Clearing point [° C.]: | 105.3 |
| CC-4-V1 | 10.00% | | |
| CCH-301 | 3.00% | | |
| CCH-34 | 4.00% | | |
| CCH-35 | 4.00% | | |
| CCP-3-1 | 6.00% | | |
| CCP-3-3 | 6.00% | | |
| CCY-3-O1 | 4.00% | | |
| CCY-3-O2 | 4.00% | | |
| CCY-3-O3 | 4.00% | | |
| CCY-4-O2 | 4.00% | | |
| CCY-5-O2 | 4.00% | | |
| CPY-2-O2 | 10.00% | | |
| CPY-3-O2 | 10.00% | | |
| CY-3-O2 | 6.50% | | |
| CY-3-O4 | 10.00% | | |
| PYP-2-3 | 5.00% | | |
| PYP-2-4 | 3.00% | | |

Example M461

For the preparation of a PS (polymer stabilised) mixture, for example for PS-VA, PS-IPS or PS-FFS displays, the mixture according to Example M460 is mixed with 0.3% of the polymerisable compound of the formula

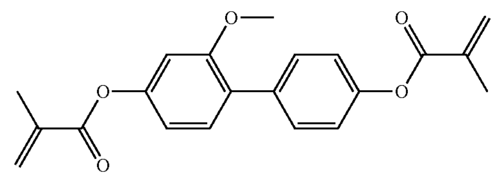 [SMILES: C=C(C)C(=O)Oc1ccc(-c2ccc(OC(=O)C(=C)C)cc2OC)cc1]

and
0.02%

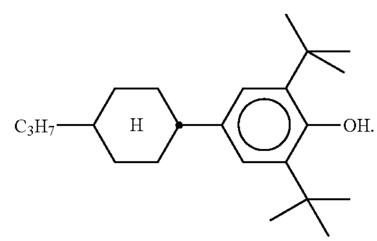

Example M462

The following stabiliser is added to the mixture according to Example M460:

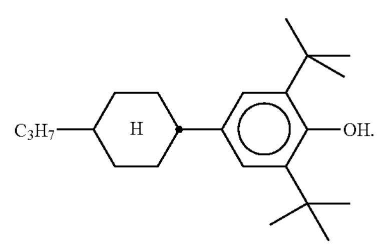

Example M463

For the preparation of an SA-VA (self-alignment VA) mixture, the mixture according to Example M389 is mixed with 0.3% of the polymerisable compound of the formula

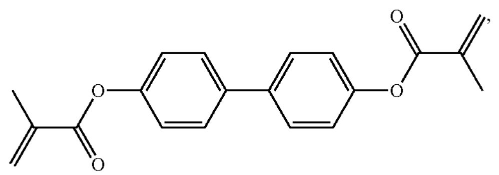

0.001% Irganox 1076 and 0.6% of the compound of the formula

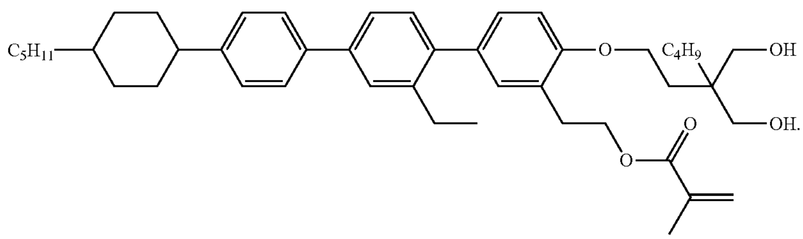

Example M465

| | | | |
|---|---|---|---|
| BCH-52 | 9.00% | Clearing point [° C.]: | 105 |
| CC-3-V1 | 2.00% | $\Delta n$ [589 nm, 25° C.]: | 0.1122 |
| CC-4-V1 | 12.50% | $\varepsilon_{\parallel}$ [1 kHz, 25° C.]: | 3.4 |
| CCH-301 | 2.00% | $\varepsilon_{\perp}$ [1 kHz, 25° C.]: | 6.8 |
| CCH-34 | 3.50% | $\Delta\varepsilon$ [1 kHz, 25° C.]: | −3.4 |
| CCH-35 | 4.00% | $K_1$ [pN, 25° C.]: | 19.9 |
| CCP-3-1 | 7.50% | $K_3$ [pN, 25° C.]: | 17.7 |
| CCY-3-O1 | 4.00% | $V_0$ [V, 20° C.]: | 2.41 |
| CCY-3-O2 | 4.00% | $\gamma_1$ [mPa s, 25° C.]: | 153 |
| CCY-3-O3 | 4.00% | | |
| CCY-4-O2 | 4.00% | | |
| CCY-5-O2 | 4.00% | | |
| CPY-2-O2 | 10.00% | | |
| CPY-3-O2 | 10.00% | | |
| CY-3-O4 | 12.50% | | |
| PY-1-O2 | 7.00% | | |

The following stabiliser is added to the mixture according to Example M464:

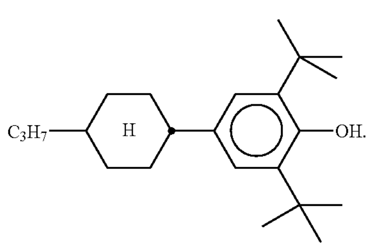

0.02%

Example M466

For the preparation of an SA-VA (self-alignment VA) mixture, the mixture according to Example M389 is mixed with 0.3% of the polymerisable compound of the formula

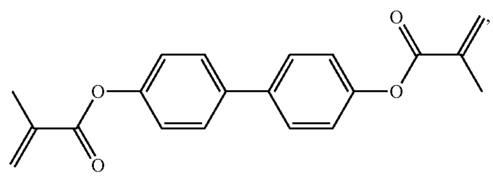

0.001% Irganox 1076 and 0.6% of the compound of the formula

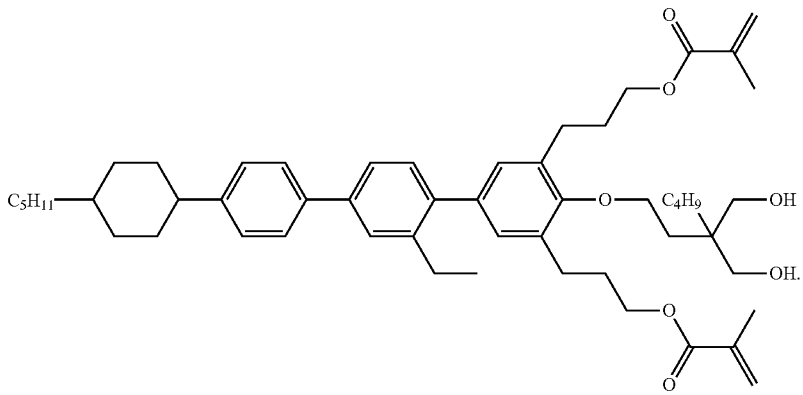

Example M467

For the preparation of a PS (polymer stabilised) mixture, for example for PS-VA, PS-IPS or PS-FFS displays, the mixture according to Example M464 is mixed with 0.3% of the polymerisable compound of the formula

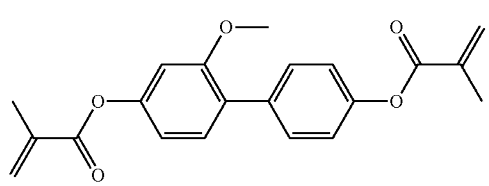 [SMILES: C=C(C)C(=O)Oc1ccc(-c2ccc(OC(=O)C(=C)C)cc2OC)cc1]

and 0.02%

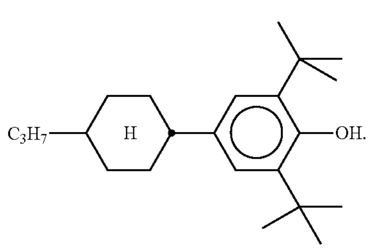

Example M468

| | | | |
|---|---|---|---|
| B(S)-2O-O4 | 4.00% | Clearing point [° C.]: | 74.5 |
| B(S)-2O-O5 | 4.00% | Δn [589 nm, 20° C.]: | 0.1257 |
| B(S)-2O-O6 | 1.00% | Δε [1 kHz, 20° C.]: | −3.1 |
| BCH-32 | 8.00% | $\varepsilon_{\parallel}$ [1 kHz, 20° C.]: | 3.6 |
| CC-3-V1 | 6.00% | $\varepsilon_{\perp}$ [1 kHz, 20° C.]: | 6.7 |
| CC-4-V1 | 14.00% | $K_1$ [pN, 20° C.]: | 14.8 |
| CCH-34 | 5.00% | $K_3$ [pN, 20° C.]: | 16.8 |
| CCP-3-1 | 7.00% | | |
| CCP-3-3 | 1.50% | | |
| CLY-3-O2 | 3.00% | | |
| CPY-3-O2 | 10.50% | | |
| PCH-302 | 16.00% | | |
| PY-1-O2 | 10.00% | | |
| PY-2-O2 | 10.00% | | |

Example M469

For the preparation of a PS (polymer stabilised) mixture, for example for PS-VA, PS-IPS or PS-FFS displays, the mixture according to Example M468 is mixed with 0.35% of the polymerisable compound of the formula

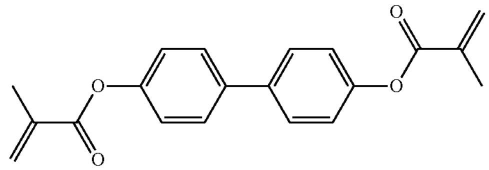 [SMILES: C=C(C)C(=O)Oc1ccc(-c2ccc(OC(=O)C(=C)C)cc2)cc1]

0.001% Irganox 1076 and
0.01%

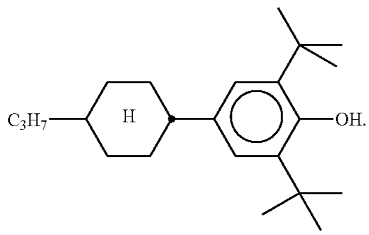

Example M470

For the preparation of a PS (polymer stabilised) mixture, for example for PS-VA, PS-IPS or PS-FFS displays, the mixture according to Example M468 is mixed with 0.3% of the polymerisable compound of the formula

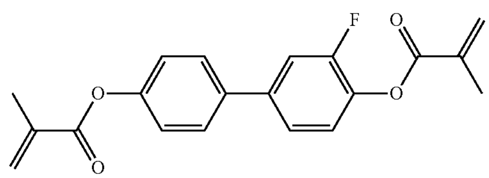 [SMILES: C=C(C)C(=O)Oc1ccc(-c2ccc(OC(=O)C(=C)C)c(F)c2)cc1]

0.001% Irganox 1076 and
0.01%

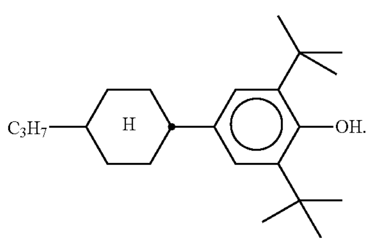

Example M471

For the preparation of a PS (polymer stabilised) mixture, for example for PS-VA, PS-IPS or PS-FFS displays, the mixture according to Example M468 is mixed with 0.3% of the polymerisable compound of the formula

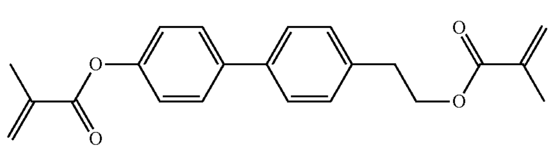 [SMILES: C=C(C)C(=O)OCCc1ccc(-c2ccc(OC(=O)C(=C)C)cc2)cc1]

0.001% Irganox 1076 and
0.01%

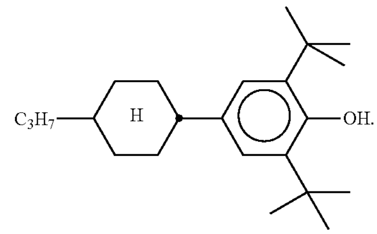

Example M472

| | | | |
|---|---|---|---|
| B(S)-2O-O5 | 5.00% | Clearing point [° C.]: | 73.7 |
| CCP-3-1 | 9.00% | Δn [589 nm, 20° C.]: | 0.1120 |
| CCY-3-O2 | 6.00% | Δε [1 kHz, 20° C.]: | −3.4 |
| CLY-3-O2 | 1.00% | $\varepsilon_{\parallel}$ [1 kHz, 20° C.]: | 3.6 |
| CPY-3-O2 | 7.50% | $\varepsilon_{\perp}$ [1 kHz, 20° C.]: | 6.9 |
| B(S)-2O-O4 | 4.00% | $K_1$ [pN, 20° C.]: | 16.3 |
| CC-3-V1 | 8.00% | $K_3$ [pN, 20° C.]: | 16.2 |
| CC-4-V1 | 15.50% | | |
| CCH-34 | 8.00% | | |
| CCH-35 | 7.50% | | |
| PCH-302 | 5.00% | | |
| PY-1-O2 | 8.00% | | |
| PY-2-O2 | 8.00% | | |
| PY-3-O2 | 7.50% | | |

Example M473

For the preparation of a PS (polymer stabilised) mixture, for example for PS-VA, PS-IPS or PS-FFS displays, the mixture according to Example M472 is mixed with 0.3% of the polymerisable compound of the formula

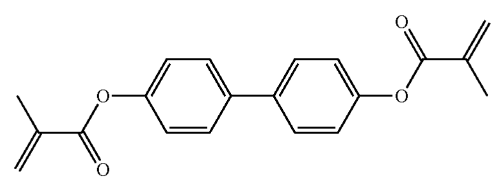

and
0.02%

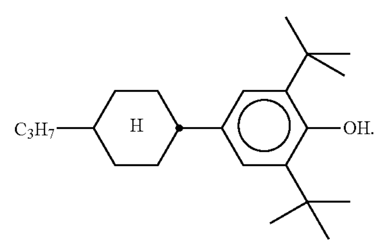

Example M474

| | | | |
|---|---|---|---|
| CC-3-V1 | 7.50% | Clearing point [° C.]: | 75 |
| CC-4-V1 | 19.50% | Δn [589 nm, 20° C.]: | 0.1041 |
| CCH-301 | 5.50% | $\varepsilon_{\parallel}$ [1 kHz, 20° C.]: | 3.6 |
| CCH-34 | 5.00% | $\varepsilon_{\perp}$ [1 kHz, 20° C.]: | 6.7 |
| CCP-3-1 | 11.00% | Δε [1 kHz, 20° C.]: | −3.1 |
| CLY-3-O2 | 5.00% | $K_1$ [pN, 20° C.]: | 14.0 |
| CPY-2-O2 | 6.00% | $K_3$ [pN, 20° C.]: | 15.7 |
| CPY-3-O2 | 11.50% | $V_0$ [V, 20° C.]: | 2.37 |
| CY-3-O2 | 15.00% | $\gamma_1$ [mPa s, 20° C.]: | 101 |
| PY-1-O2 | 6.50% | | |
| PY-2-O2 | 7.50% | | |

Example M475

For the preparation of a PS (polymer stabilised) mixture, for example for PS-VA, PS-IPS or PS-FFS displays, the mixture according to Example M474 is mixed with 0.3% of the polymerisable compound of the formula

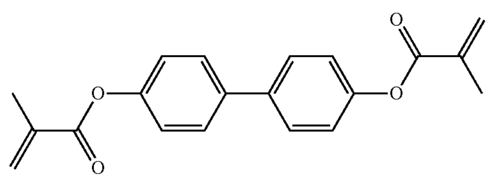 [SMILES: C=C(C)C(=O)Oc1ccc(-c2ccc(OC(=O)C(=C)C)cc2)cc1]

0.001% Irganox 1076 and 0.015%

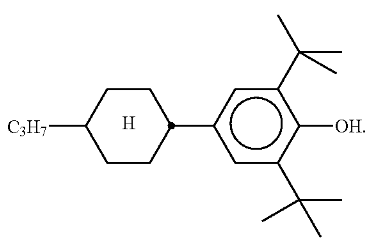

Example M476

| | | | |
|---|---|---|---|
| B(S)-2O-O6 | 0.25% | Clearing point [° C.]: | 74.5 |
| BCH-32 | 5.50% | Δn [589 nm, 20° C.]: | 0.1028 |
| CC-3-V | 10.00% | $\varepsilon_{\parallel}$ [1 kHz, 20° C.]: | 3.6 |
| CC-3-V1 | 7.50% | $\varepsilon_{\perp}$ [1 kHz, 20° C.]: | 6.7 |
| CC-4-V1 | 16.50% | Δε [1 kHz, 20° C.]: | −3.1 |
| CCH-35 | 0.25% | $K_1$ [pN, 20° C.]: | 13.8 |
| CCP-3-1 | 7.50% | $K_3$ [pN, 20° C.]: | 15.5 |
| CCY-3-O2 | 11.00% | $V_0$ [V, 20° C.]: | 2.37 |
| CCY-3-O3 | 1.00% | $\gamma_1$ [mPa s, 20° C.]: | 96 |
| CCY-4-O2 | 7.00% | | |
| CCY-5-O2 | 2.00% | | |
| CY-3-O2 | 9.00% | | |
| PY-1-O2 | 9.00% | | |
| PY-2-O2 | 9.00% | | |
| PY-3-O2 | 4.50% | | |

Example M477

For the preparation of a PS (polymer stabilised) mixture, for example for PS-VA, PS-IPS or PS-FFS displays, the mixture according to Example M476 is mixed with 0.3% of the polymerisable compound of the formula

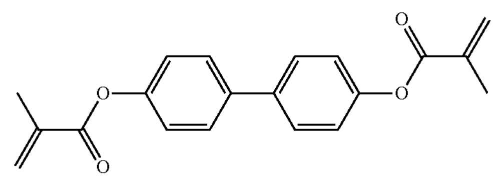 [SMILES: C=C(C)C(=O)Oc1ccc(-c2ccc(OC(=O)C(=C)C)cc2)cc1]

0.001% Irganox 1076 and 0.015%

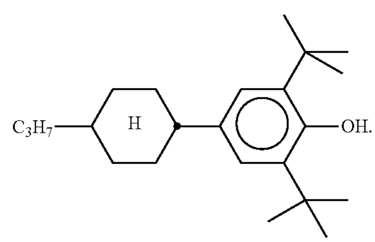

Example M478

For the preparation of an SA-VA (self-alignment VA) mixture, the mixture according to Example M477 is mixed with 0.6% of the compound of the formula

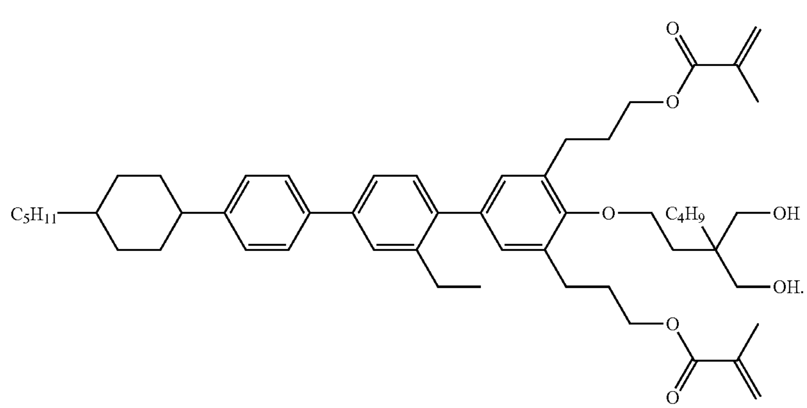

Example M479

| | | | |
|---|---|---|---|
| BCH-32 | 4.50% | Clearing point [° C.]: | 74.8 |
| CC-3-V | 15.00% | Δn [589 nm, 20° C.]: | 0.1030 |
| CC-3-V1 | 7.50% | $ε_{\|\|}$ [1 kHz, 20° C.]: | 3.6 |
| CC-4-V1 | 12.50% | $ε_{⊥}$ [1 kHz, 20° C.]: | 6.8 |
| CCP-3-1 | 7.00% | Δε [1 kHz, 20° C.]: | −3.1 |
| CCY-3-O1 | 7.00% | $K_1$ [pN, 20° C.]: | 13.8 |
| CCY-3-O2 | 10.50% | $K_3$ [pN, 20° C.]: | 15.4 |
| CCY-4-O2 | 6.50% | $V_0$ [V, 20° C.]: | 2.35 |
| CY-3-O2 | 4.50% | $γ_1$ [mPa s, 20° C.]: | 94 |
| PY-1-O2 | 9.50% | | |
| PY-2-O2 | 9.00% | | |
| PY-3-O2 | 6.50% | | |

Example M480

For the preparation of a PS (polymer stabilised) mixture, for example for PS-VA, PS-IPS or PS-FFS displays, the mixture according to Example M479 is mixed with 0.3% of the polymerisable compound of the formula

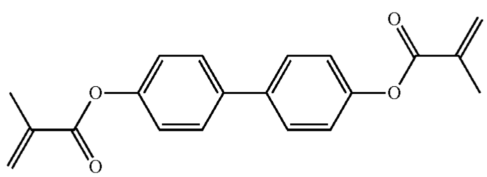 [SMILES: C=C(C)C(=O)Oc1ccc(-c2ccc(OC(=O)C(=C)C)cc2)cc1]

0.001% Irganox 1076 and
0.015%

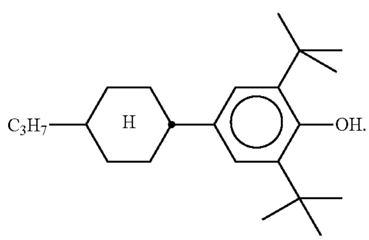

Example M481

For the preparation of a PS (polymer stabilised) mixture, for example for PS-VA, PS-IPS or PS-FFS displays, the mixture according to Example M479 is mixed with 0.3% of the polymerisable compound of the formula

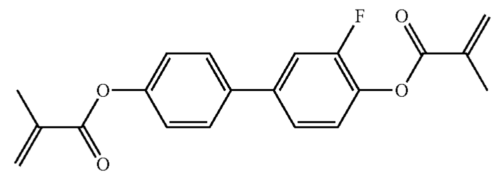

0.001% Irganox 1076 and 0.015%

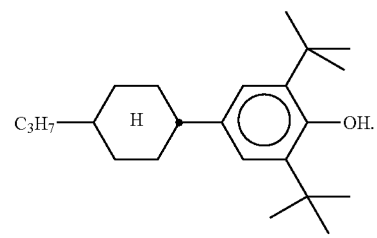

Example M482

For the preparation of an SA-VA (self-alignment VA) mixture, the mixture according to Example M480 is mixed with 0.6% of the compound of the formula

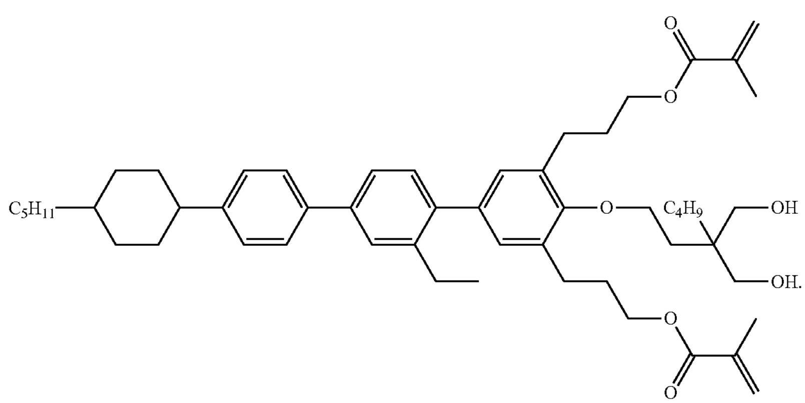

Example M483

| | | | |
|---|---|---|---|
| B(S)-2O-O4 | 4.00% | Clearing point [° C.]: | 74 |
| B(S)-2O-O5 | 5.00% | Δn [589 nm, 20° C.]: | 0.1089 |
| BCH-32 | 7.50% | $\varepsilon_{\parallel}$ [1 kHz, 20° C.]: | 3.6 |
| BCH-52 | 2.00% | $\varepsilon_{\perp}$ [1 kHz, 20° C.]: | 6.5 |
| CC-3-V1 | 7.50% | Δε [1 kHz, 20° C.]: | −3.0 |
| CC-4-V1 | 18.00% | $K_1$ [pN, 20° C.]: | 15.3 |
| CCH-34 | 8.00% | $K_3$ [pN, 20° C.]: | 13.9 |
| CCH-35 | 7.00% | $V_0$ [V, 20° C.]: | 2.29 |
| CCH-301 | 2.00% | $\gamma_1$ [mPa s, 20° C.]: | 75 |
| CCP-3-1 | 3.00% | | |
| CCY-3-O2 | 8.00% | | |
| CPY-3-O2 | 3.00% | | |
| CY-3-O2 | 4.00% | | |
| PY-1-O2 | 6.00% | | |
| PY-2-O2 | 3.00% | | |
| PY-3-O2 | 12.00% | | |

Example M484

For the preparation of a PS (polymer stabilised) mixture, for example for PS-VA, PS-IPS or PS-FFS displays, the mixture according to Example M483 is mixed with 0.3% of the polymerisable compound of the formula

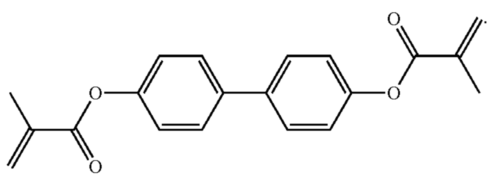

Example M485

For the preparation of a PS (polymer stabilised) mixture, for example for PS-VA, PS-IPS or PS-FFS displays, the mixture according to Example M483 is mixed with 0.3% of the polymerisable compound of the formula

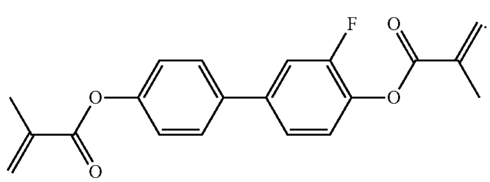

Example M486

| | | | |
|---|---|---|---|
| CC-3-V1 | 7.00% | Clearing point [° C.]: | 74.5 |
| CC-3-V2 | 17.00% | Δn [589 nm, 20° C.]: | 0.0992 |
| CCH-34 | 4.00% | Δε [1 kHz, 20° C.]: | −3.6 |
| CCH-35 | 7.00% | $\gamma_1$ [mPa s, 20° C.]: | 108 |
| CCP-3-1 | 6.50% | | |
| CCY-3-O2 | 6.00% | | |
| CPY-2-O2 | 3.00% | | |
| CPY-3-O2 | 11.00% | | |
| CY-3-O2 | 15.50% | | |
| CY-3-O4 | 7.00% | | |
| PY-3-O2 | 11.00% | | |

-continued

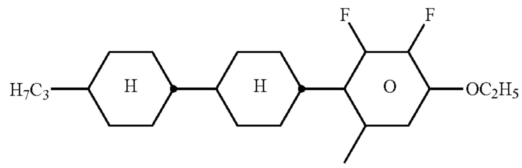

5.00%

Example M487

| | | | |
|---|---|---|---|
| CC-3-V1 | 7.00% | Clearing point [° C.]: | 74.5 |
| CC-3-V2 | 17.00% | Δn [589 nm, 20° C.]: | 0.0988 |
| CCH-34 | 4.00% | Δε [1 kHz, 20° C.]: | −3.6 |
| CCH-35 | 7.00% | $\gamma_1$ [mPa s, 20° C.]: | 112 |
| CCP-3-1 | 6.50% | | |
| CCY-3-O2 | 11.00% | | |
| CPY-2-O2 | 3.00% | | |
| CPY-3-O2 | 6.00% | | |
| CY-3-O2 | 15.50% | | |
| CY-3-O4 | 7.00% | | |
| PY-3-O2 | 11.00% | | |

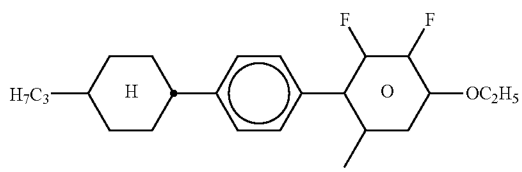

5.00%

Example M488

| | | | |
|---|---|---|---|
| CC-3-V1 | 7.00% | Clearing point [° C.]: | 74.5 |
| CC-3-V2 | 17.00% | Δn [589 nm, 20° C.]: | 0.0989 |
| CCH-34 | 4.00% | Δε [1 kHz, 20° C.]: | −3.6 |
| CCH-35 | 7.00% | $\gamma_1$ [mPa s, 20° C.]: | 111 |
| CCP-3-1 | 6.50% | | |
| CCY-3-O2 | 11.00% | | |
| CPY-2-O2 | 3.00% | | |
| CPY-3-O2 | 11.00% | | |
| CY-3-O2 | 10.50% | | |
| CY-3-O4 | 7.00% | | |
| PY-3-O2 | 11.00% | | |

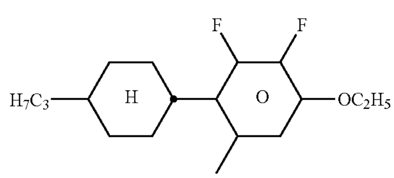

5.00%

Example M489

| | | | |
|---|---|---|---|
| CC-3-V1 | 7.00% | Clearing point [° C.]: | 75 |
| CC-3-V2 | 17.00% | Δn [589 nm, 20° C.]: | 0.0987 |
| CCH-34 | 4.00% | Δε [1 kHz, 20° C.]: | −3.6 |

-continued

| | | | |
|---|---|---|---|
| CCH-35 | 7.00% | $\gamma_1$ [mPa s, 20° C.]: | 113 |
| CCP-3-1 | 6.50% | | |
| CCY-3-O2 | 11.00% | | |
| CPY-2-O2 | 3.00% | | |
| CPY-3-O2 | 11.00% | | |
| CY-3-O2 | 15.50% | | |
| CY-3-O4 | 7.00% | | |
| PY-3-O2 | 6.00% | | |

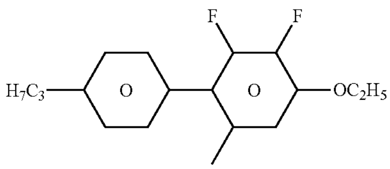

5.00%

Example M490

| | | | |
|---|---|---|---|
| CC-3-V1 | 7.00% | Clearing point [° C.]: | 74.5 |
| CC-4-V1 | 18.00% | Δn [589 nm, 20° C.]: | 0.0995 |
| CCH-34 | 3.00% | Δε [1 kHz, 20° C.]: | −3.4 |
| CCH-35 | 7.00% | $\gamma_1$ [mPa s, 20° C.]: | 114 |
| CCP-3-1 | 9.00% | | |
| CCY-3-O2 | 5.00% | | |
| CPY-3-O2 | 9.50% | | |
| CY-3-O2 | 15.50% | | |
| CY-3-O4 | 7.50% | | |
| PY-3-O2 | 11.50% | | |
| PGIY-2-O4 | 2.00% | | |

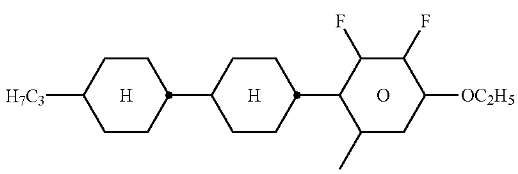

5.00%

Example M491

| | | | |
|---|---|---|---|
| CC-3-V1 | 7.00% | Clearing point [° C.]: | 74.5 |
| CC-4-V1 | 18.00% | Δn [589 nm, 20° C.]: | 0.0993 |
| CCH-34 | 3.00% | Δε [1 kHz, 20° C.]: | −3.4 |
| CCH-35 | 7.00% | $\gamma_1$ [mPa s, 20° C.]: | 115 |
| CCP-3-1 | 9.00% | | |
| CCY-3-O2 | 10.00% | | |
| CPY-3-O2 | 4.50% | | |
| CY-3-O2 | 15.50% | | |
| CY-3-O4 | 7.50% | | |
| PY-3-O2 | 11.50% | | |
| PGIY-2-O4 | 2.00% | | |

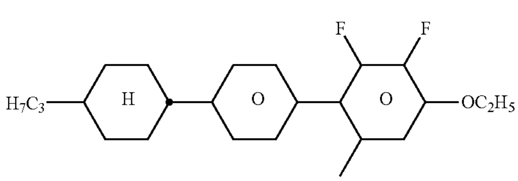

5.00%

Example M492

| | | | |
|---|---|---|---|
| CC-3-V1 | 7.00% | Clearing point [° C.]: | 74 |
| CC-4-V1 | 18.00% | Δn [589 nm, 20° C.]: | 0.0996 |
| CCH-34 | 3.00% | Δε [1 kHz, 20° C.]: | −3.4 |
| CCH-35 | 7.00% | $\gamma_1$ [mPa s, 20° C.]: | 113 |
| CCP-3-1 | 9.00% | | |
| CCY-3-O2 | 10.00% | | |
| CPY-3-O2 | 9.50% | | |
| CY-3-O2 | 10.50% | | |
| CY-3-O4 | 7.50% | | |
| PY-3-O2 | 11.50% | | |
| PGIY-2-O4 | 2.00% | | |

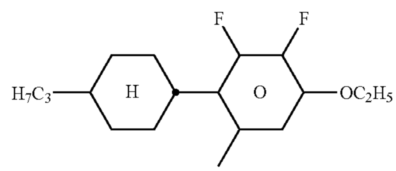

5.00%

Example M493

| | | | |
|---|---|---|---|
| CC-3-V1 | 7.00% | Clearing point [° C.]: | 75 |
| CC-4-V1 | 18.00% | Δn [589 nm, 20° C.]: | 0.0994 |
| CCH-34 | 3.00% | Δε [1 kHz, 20° C.]: | −3.4 |
| CCH-35 | 7.00% | $\gamma_1$ [mPa s, 20° C.]: | 115 |
| CCP-3-1 | 9.00% | | |
| CCY-3-O2 | 10.00% | | |
| CPY-3-O2 | 9.50% | | |
| CY-3-O2 | 15.50% | | |
| CY-3-O4 | 7.50% | | |
| PY-3-O2 | 6.50% | | |
| PGIY-2-O4 | 2.00% | | |

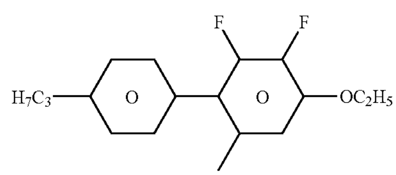

5.00%

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

The entire disclosure[s] of all applications, patents and publications, cited herein and of corresponding German application No: DE102017 010883.8, filed Nov. 24, 2017, and European application No: EP18197753.9, filed Sep. 28, 2018, are incorporated by reference herein.

The preceding examples can be repeated with similar success by substituting the generically or specifically described reactants and/or operating conditions of this invention for those used in the preceding examples.

From the foregoing description, one skilled in the art can ascertain the essential characteristics of this invention and, without departing from the spirit and scope thereof, can make various changes and modifications of the invention to adapt it to various usages and conditions.

The invention claimed is:

1. A liquid-crystalline medium comprising:

at least one compound selected from the group of the compounds of the formulae IA and IB,

IA

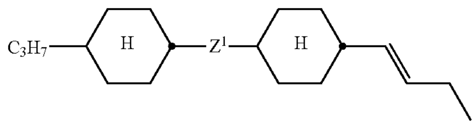

IB

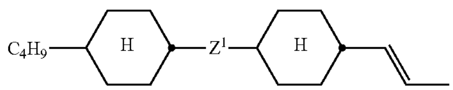

in which $Z^1$ denotes a single bond;

and at least one compound selected from formula B(S)-5cy1O-O2:

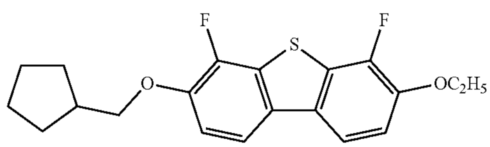

B(S)-5cy1O-O2 wherein the medium has a negative dielectric anisotropy, Δε.

2. The liquid-crystalline medium according to claim 1, which comprises at least one compound of at least one of the following formulae:

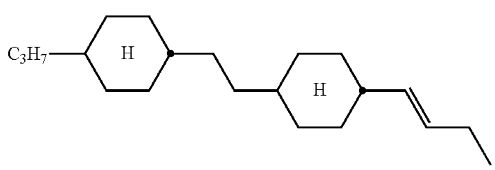

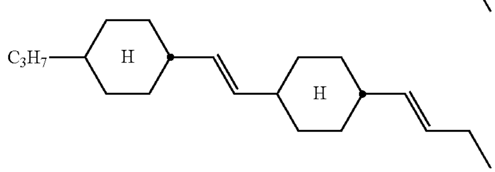

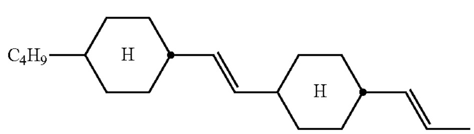

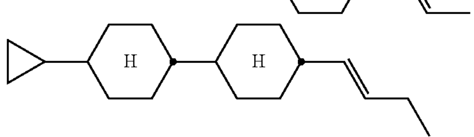

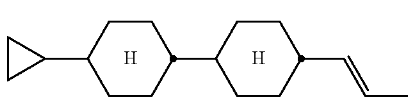

-continued

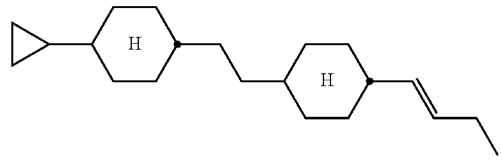

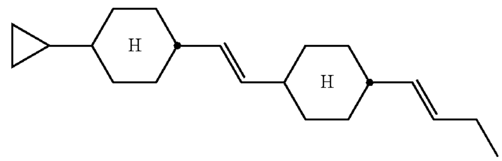

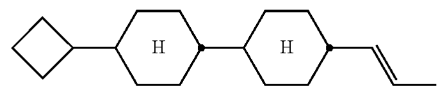

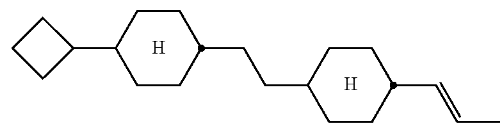

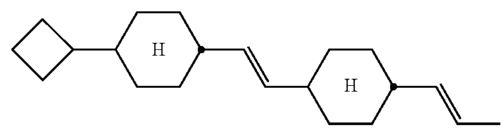

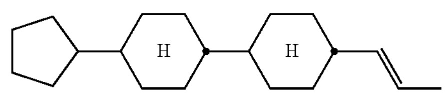

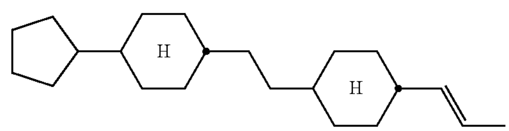

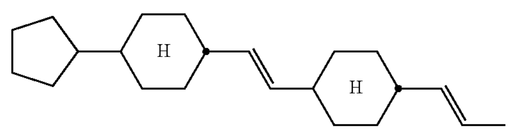

3. The liquid-crystalline medium according to claim 1, wherein the proportion of the compound(s) of the formulae IA and IB in the medium as a whole is 1-50% by weight.

4. The liquid-crystalline medium according to claim 1, which additionally comprises one or more compounds selected from the group of the compounds of the formulae IIA, IIB and IIC,

IIA

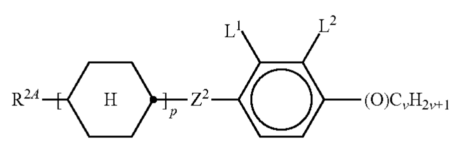

IIB

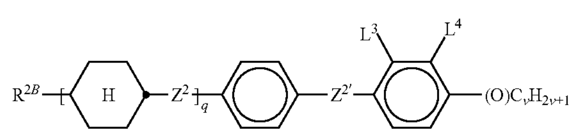

-continued

IIC

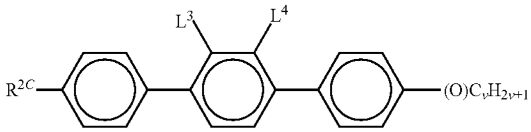

in which $R^{2A}$, $R^{2B}$ and $R^{2C}$ each, independently of one another, denote H, an alkyl having 1 to 15 C atoms or alkenyl radical having 2 to 15 C atoms which is unsubstituted, monosubstituted by CN or $CF_3$ or at least monosubstituted by halogen, where, in addition, one or more $CH_2$ groups in these radicals may each be replaced by —O—, —S—,

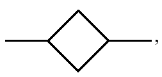

—C≡C, —$CF_2$O—, —O$CF_2$—, —OC—O— or —O—CO— in such a way that O atoms are not linked directly to one another, a cyclopropyl ring, cyclobutyl ring or cyclopentyl ring, $L^{1-4}$ each, independently of one another, denote F, Cl, $CF_3$ or $CHF_2$, $Z^2$ and $Z^{2'}$ each, independently of one another, denote a single bond, —$CH_2CH_2$—, —CH═CH—, —O$CF_2$—, —$CH_2$O—, —O$CH_2$—, —COO—, —OCO—, —$C_2F_4$—, —CF═CF—, —C≡C— or —CH═CH$CH_2$O—, p denotes 0, 1 or 2, q denotes 0 or 1, and v denotes 1 to 6.

5. The liquid-crystalline medium according to claim 1, wherein the medium additionally comprises one or more compounds of the formula III,

III

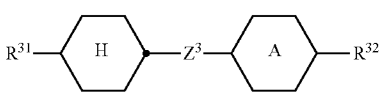

in which $R^3$ and $R^{32}$ each, independently of one another, denote a straight-chain alkyl having 1 to 12 C atoms, alkenyl having 2 to 12 C atoms, alkoxy having 1 to 12 C atoms, alkoxyalkyl having 2 to 12 C atoms, or alkenyloxy radical having 2 to 12 C atoms,

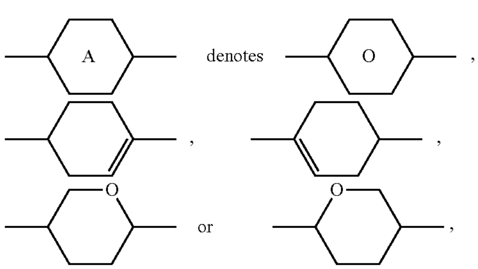

and $Z^3$ denotes a single bond, —$CH_2CH_2$—, —CH═CH—, —$CF_2$O—, —O$CF_2$—, —$CH_2$O—, —O$CH_2$—, —COO—, —OCO—, —$C_2F_4$—, —$C_4H_9$—, —C≡C— or —CF═CF—.

6. The liquid-crystalline medium according to claim 1, wherein the medium additionally comprises one or more compounds of the formulae L-1 to L-11,

L-1

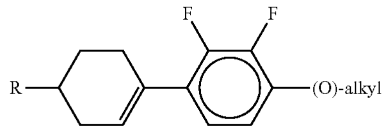

L-2

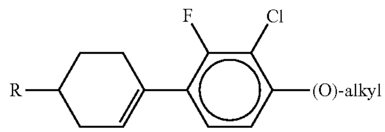

L-3

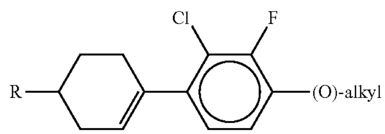

L-4

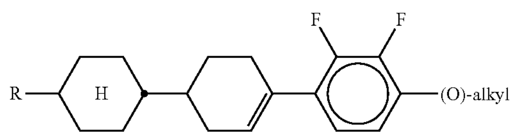

L-5

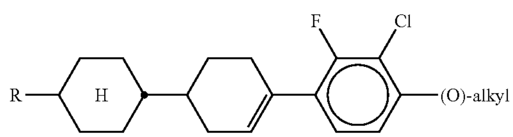

L-6

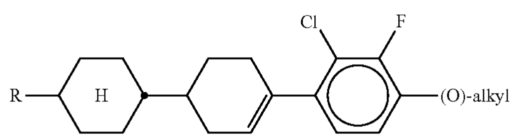

L-7

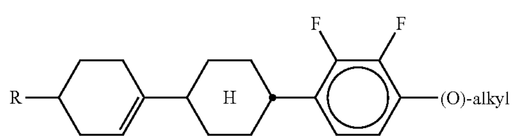

L-8

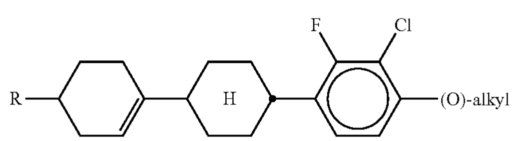

L-9

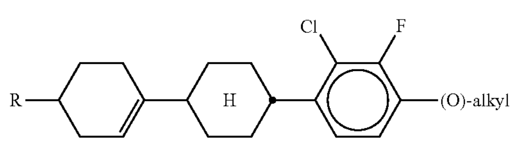

-continued

L-10

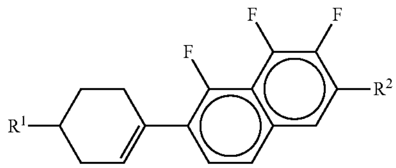

L-11

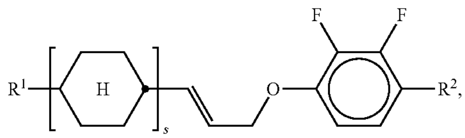

in which

R, $R^1$ and $R^2$ each, independently of one another, denote H, an alkyl having 1 to 15 C atoms or alkenyl radical having 2 to 15 C atoms which is unsubstituted, monosubstituted by CN or $CF_3$ or at least monosubstituted by halogen, where, in addition, one or more $CH_2$ groups in these radicals may each be replaced by —O—, —S—,

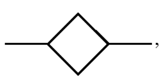

—C≡C—, —$CF_2$O—, —O$CF_2$—OC—O— or —O—CO— in such a way that O atoms are not linked directly to one another, a cyclopropyl ring, cyclobutyl ring or cyclopentyl ring, alkyl denotes an alkyl radical having 1-6 C atoms, and s denotes 1 or 2.

7. The liquid-crystalline medium according to claim 1, wherein the medium additionally comprises one or more terphenyls of the formulae T-1 to T-22,

T-1

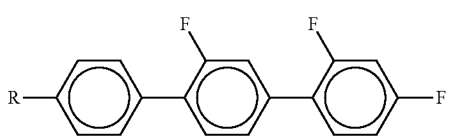

T-2

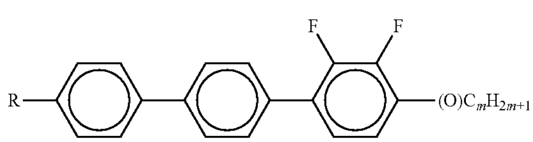

T-3

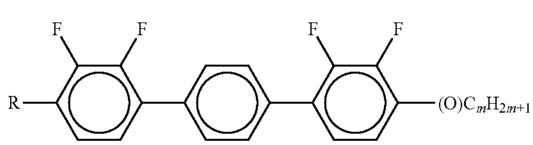

T-4

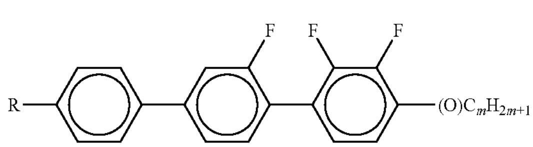

-continued

T-5

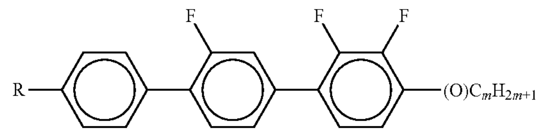

T-6

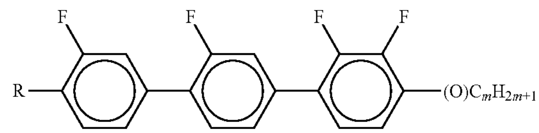

T-7

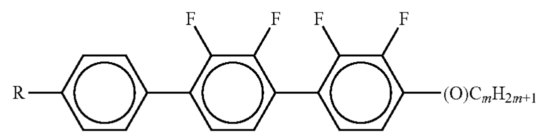

T-8

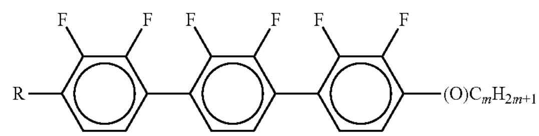

T-9

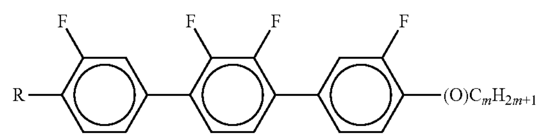

T-10

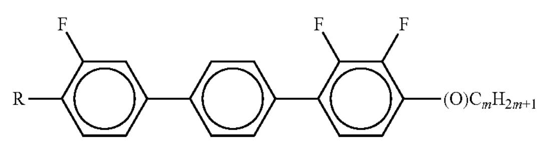

T-11

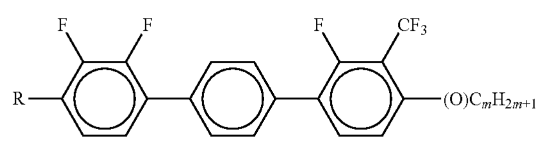

T-12

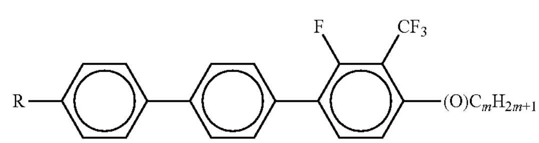

T-13

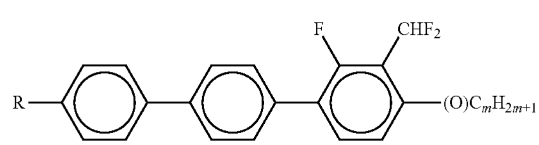

T-14

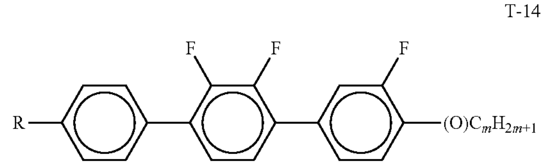

-continued
T-15
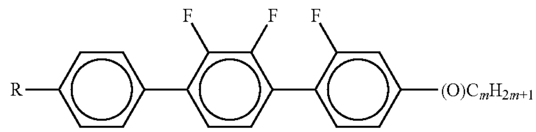
T-16
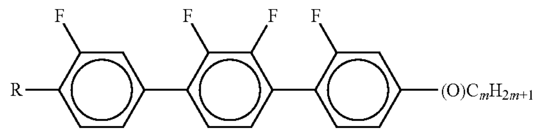
T-17
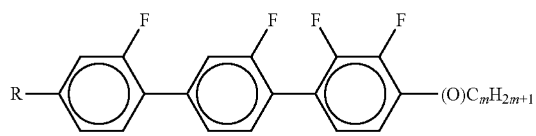
T-18
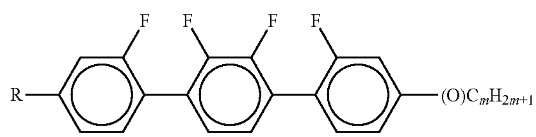
T-19
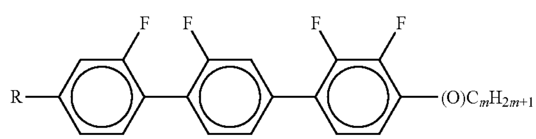
T-20
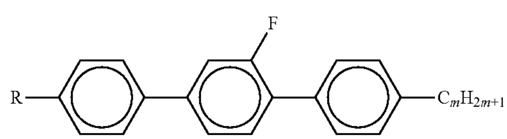
T-21
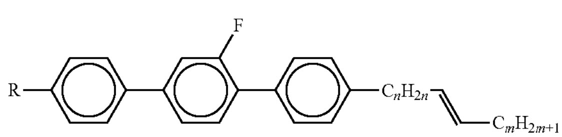
T-22
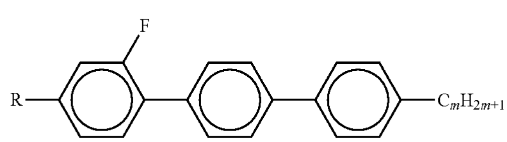
in which
R denotes a straight-chain alkyl or alkoxy radical having 1-7 C atoms,
m denotes 0, 1, 2, 3, 4, 5 or 6, and
n denotes 0, 1, 2, 3 or 4.
8. The liquid-crystalline medium according to claim 1, wherein the medium additionally comprises one or more compounds of the formulae O-1 to O-17,
O-1
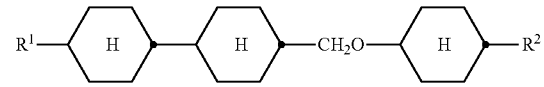
O-2
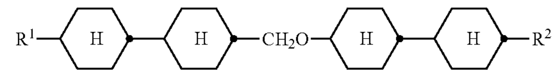
O-3
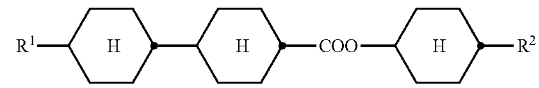
O-4
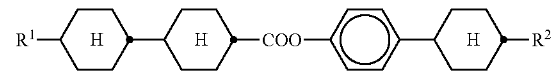
O-5
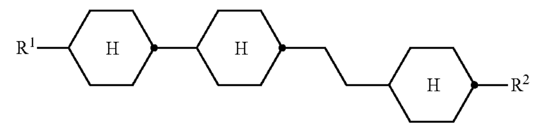
O-6
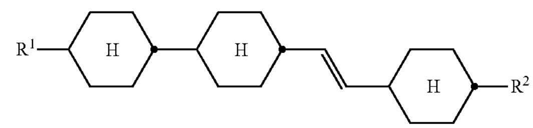
O-7
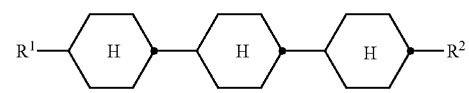
O-8
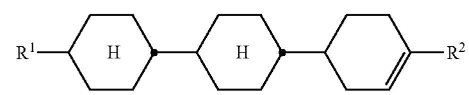
O-9
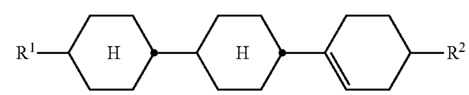
O-10
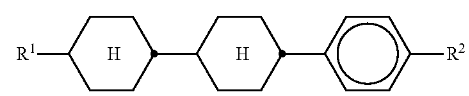
O-11
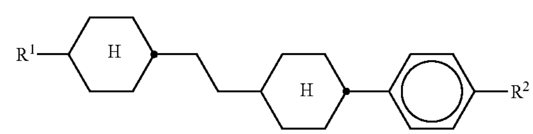
O-12
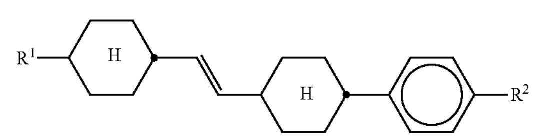
O-13
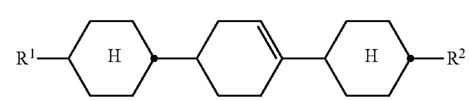

-continued

O-14

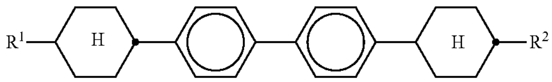

O-15

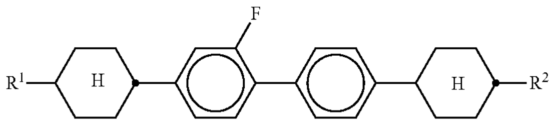

O-16

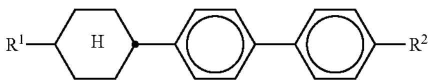

O-17

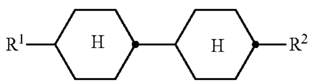

in which $R^1$ and $R^2$ each, independently of one another, denote H, an alkyl having 1 to 15 C atoms or alkenyl radical having 2 to 15 C atoms which is unsubstituted, monosubstituted by CN or $CF_3$ or at least monosubstituted by halogen, where, in addition, one or more $CH_2$ groups in these radicals may each be replaced by —O—, —S—,

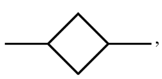

—C≡C—, —$CF_2$O—, —O$CF_2$—, OC—O— or —O—CO— in such a way that O atoms are not linked directly to one another, a cyclopropyl ring, cyclobutyl ring or cyclopentyl ring.

9. The liquid-crystalline medium according to claim 1, wherein the medium additionally comprises one or more compounds selected from the group of the compounds of the formulae BC, CR, PH-1 and PH-2,

BC

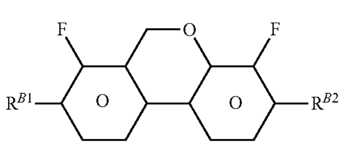

CR

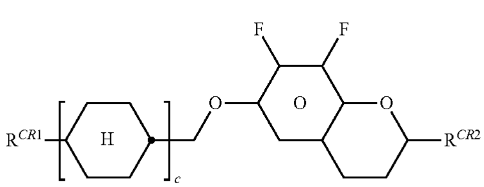

PH-1

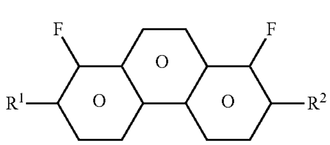

-continued

PH-2

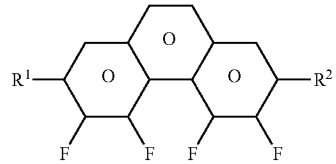

in which $R^{B1}$, $R^{B2}$, $R^{CR1}$, $R^{CR2}$, $R^1$, $R^2$ each independently of one another, denote H, an alkyl having 1 to 15 C atoms or alkenyl radical having 2 to 15 C atoms which is unsubstituted, monosubstituted by CN or $CF_3$ or at least monosubstituted by halogen, where, in addition, one or more $CH_2$ groups in these radicals may each be replaced by —O—, —S—,

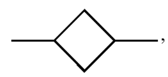

—C≡C—, —$CF_2$O—, —O$CF_2$—, —OC—O— or —O—CO— in such a way that O atoms are not linked directly to one another, a cyclopropyl ring, cyclobutyl ring or cyclopentyl ring, and c denotes 0, 1 or 2.

10. The liquid-crystalline medium according to claim 1, wherein the medium additionally comprises one or more compounds of the following formulae:

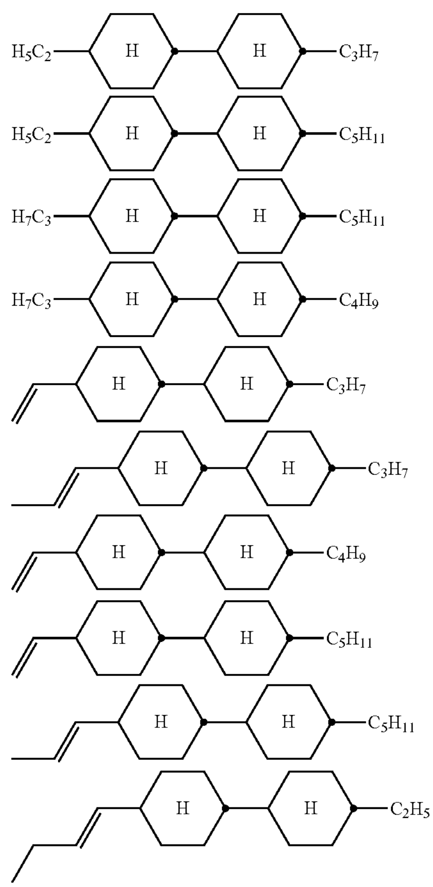

-continued
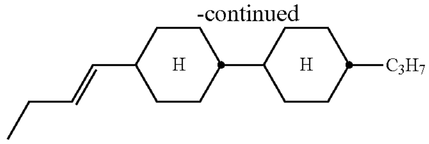
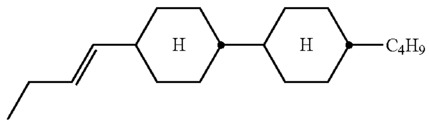
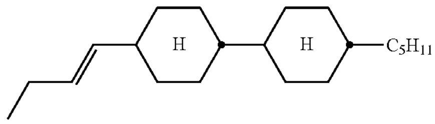
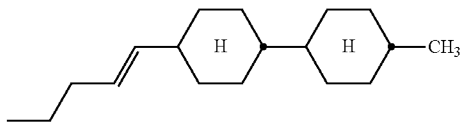
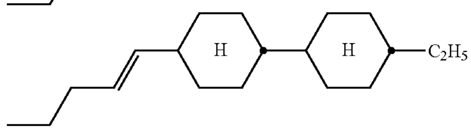
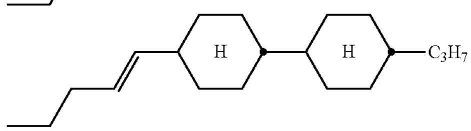
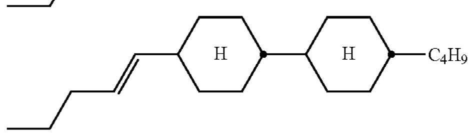
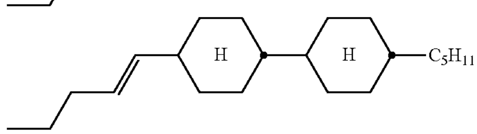
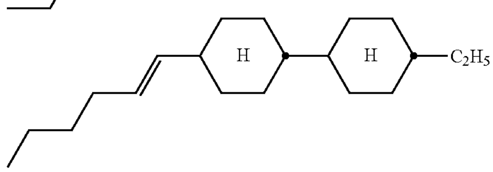
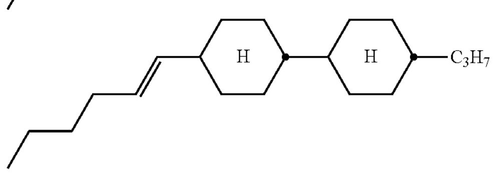
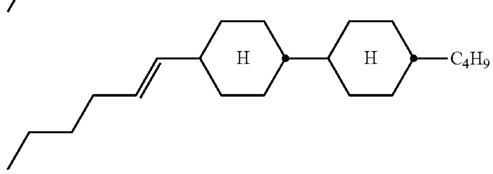
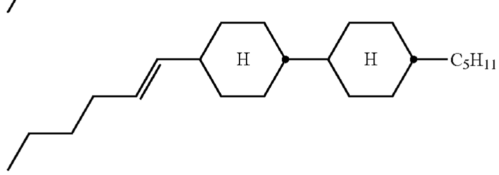
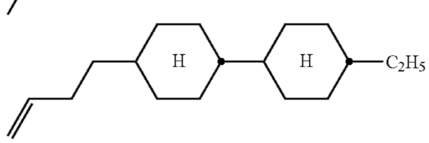
-continued
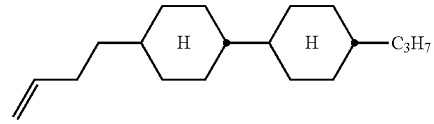
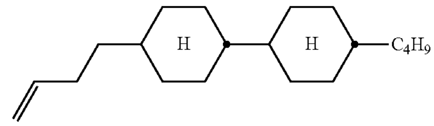
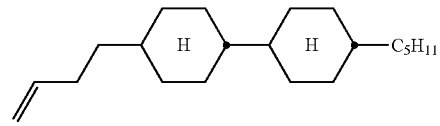
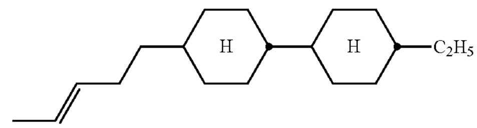
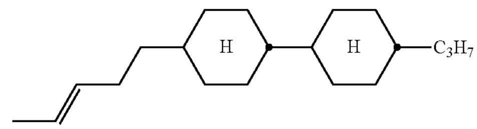
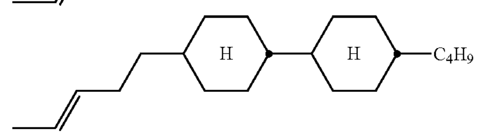
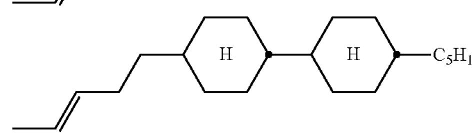
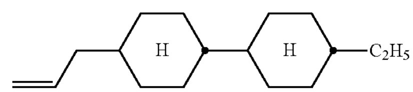
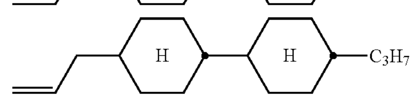
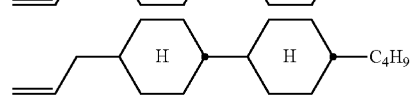
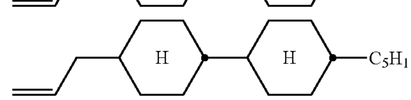
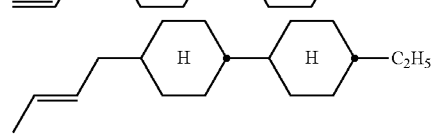
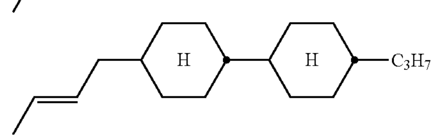
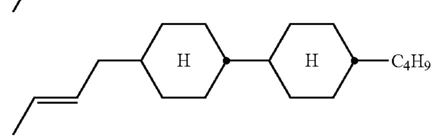
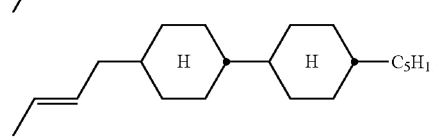

-continued

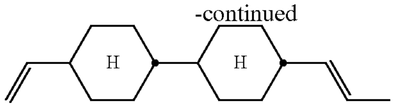

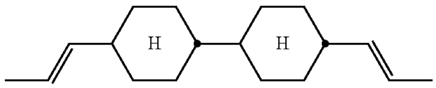.

11. The liquid-crystalline medium according to claim 1, wherein the medium comprises 5-60% of the compound of the following formula:

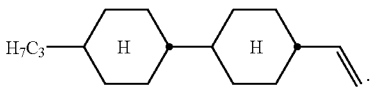

12. The liquid-crystalline medium according to claim 1, wherein the medium additionally comprises one or more compounds selected from the group of the compounds of the formulae P-1 to P-5,

P-1

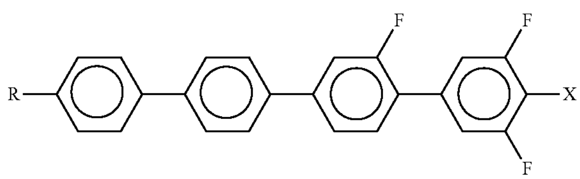

P-2

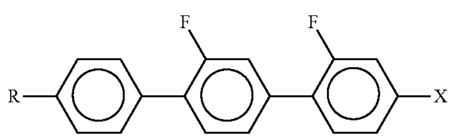

P-3

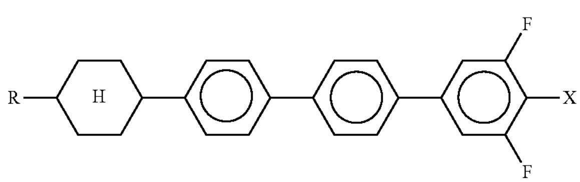

P-4

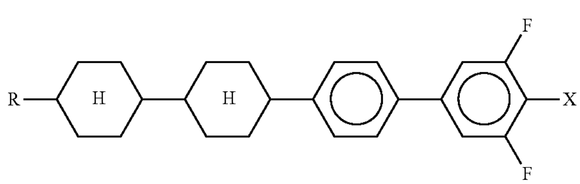

P-5

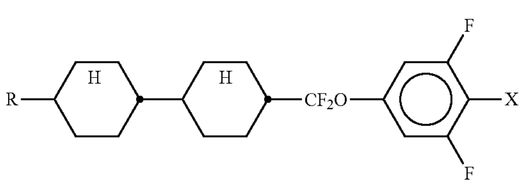

in which

R denotes straight-chain alkyl having 1 to 6 C atoms, alkoxy having 1 to 6 C atoms, or alkenyl, having 2 to 6 C atoms, and X denotes F, Cl, $CF_3$, $OCF_3$, $OCHFCF_3$ or $_{C}CF_2CHFCF_3$.

13. The liquid-crystalline medium according to claim 1, wherein the medium additionally comprises one or more compounds selected from the group of the compounds of the following formulae:

T-20

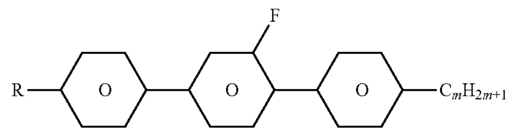

T-21

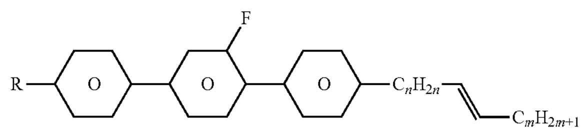

IIA-26

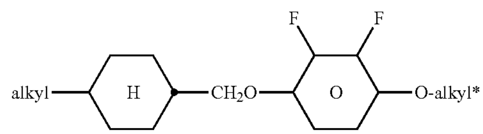

IIA-28

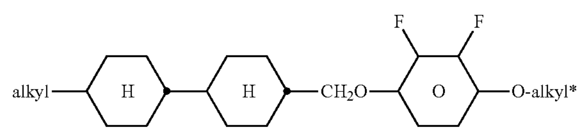

IIA-33

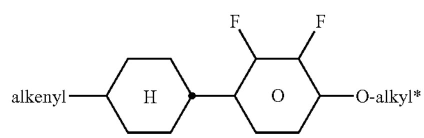

IIA-39

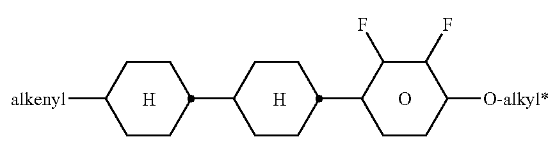

IIA-50

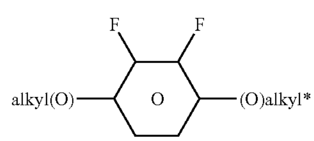

IIA-51

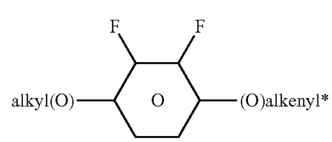

IIB-16

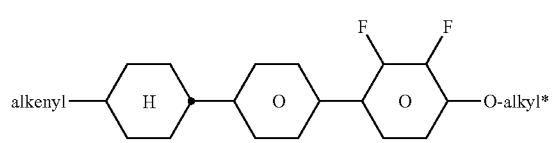

-continued

IIB-17

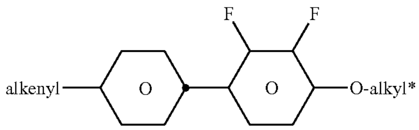

V-10

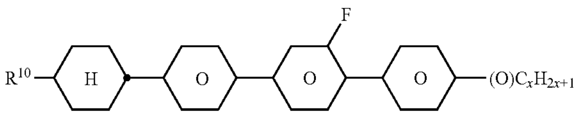

O-6a

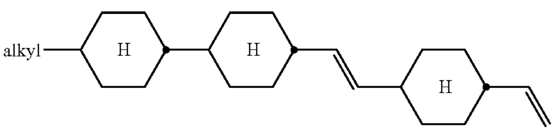

L-4

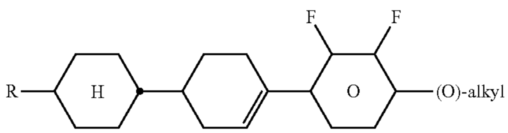

CC-3-V

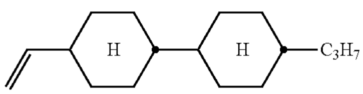

in which

R denotes a straight-chain alkyl or alkoxy radical having 1-7 C atoms, m denotes 0, 1, 2, 3, 4, 5 or 6, n denotes 0, 1, 2, 3 or 4, $R^1$, $R^2$ each, independently of one another, denote H, an alkyl having 1 to 15 C atoms or alkenyl radical having 2 to 15 C atoms which is unsubstituted, monosubstituted by CN or $CF_3$ or at least monosubstituted by halogen, where, in addition, one or more $CH_2$ groups in these radicals may each be replaced by —O—, —S—,

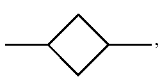

—C≡C—, —$CF_2$O—, —O$CF_2$—, —OC—O— or —O—CO— in such a way that O atoms are not linked directly to one another, a cyclopropyl ring, cyclobutyl ring or cyclopentyl ring, c denotes 0, 1 or 2, d denotes 1 or 2, R and $R^{10}$ each, independently of one another, denote H, an alkyl having 1 to 15 C atoms or alkenyl radical having 2 to 15 C atoms which is unsubstituted, monosubstituted by CN or $CF_3$ or at least monosubstituted by halogen, where, in addition, one or more $CH_2$ groups in these radicals may each be replaced by —O—, —S—,

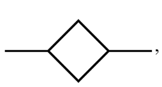

—C≡C—, —$CF_2$O—, —O$CF_2$—, —OC—O— or —O—CO— in such a way that O atoms are not linked directly to one another, a cyclopropyl ring, cyclobutyl ring or cyclopentyl ring, alkyl and alkyl* each, independently of one another, denote a straight-chain alkyl radical having 1-6 C atoms, alkenyl and alkenyl* each, independently of one another, denote a straight-chain alkenyl radical having 2-6 C atoms, and x denotes 1 to 6.

14. The liquid-crystalline medium according to claim 1, wherein the medium further comprises the compound of the formula CC-3-V1:

CC-3-VI

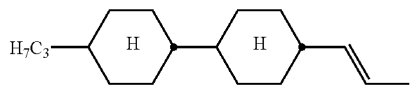

15. The liquid-crystalline medium according to claim 1, wherein the medium comprises at least one polymerizable compound.

16. The liquid-crystalline medium according to claim 1, wherein the medium further comprises one or more additives.

17. The liquid-crystalline medium according to claim 16, wherein the additive is a free-radical scavenger, antioxidant, dopant and/or UV stabilizer.

18. A process for the preparation of a liquid-crystalline medium according to claim 1, comprising mixing at least one compound of the formulae IA and/or IB with at least one compound of the formula B(S)-5cy1O-O2 and with at least one further compound wherein the further compound is a mesogenic compound, and optionally further mixing one or more additives and optionally further mixing at least one polymerizable compound.

19. An electro-optical display having active-matrix addressing, which comprises, as dielectric, a liquid-crystalline medium according to claim 1.

20. The electro-optical display according to claim 19, which is a VA, PSA, PA-VA, PS-VA, SA-VA, SS-VA, PALC, IPS, PS-IPS, FFS, UB-FFS or PS-FFS display.

21. The electro-optical display according to claim 20, which is an IPS, PS-IPS, FFS or PS-FFS display which has a planar alignment layer.

22. The liquid-crystalline medium according to claim 1, wherein the medium has a negative dielectric anisotropy, Δε, of less than −0.5.

23. The liquid-crystalline medium according to claim 1, wherein the medium has a negative dielectric anisotropy, Δε, of −0.5 to −8.0.

24. The liquid-crystalline medium according to claim 1, wherein the medium additionally comprises one or more compounds selected from the group of the compounds of the formulae BF-1, BF-2, BS- h and BS-2,

BF-1

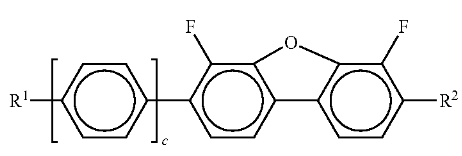

-continued

BF-2

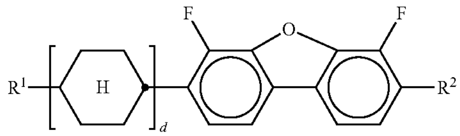

BS-1

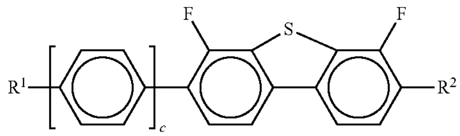

BS-2

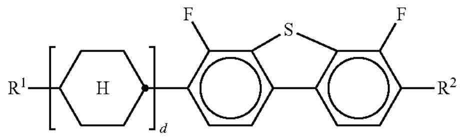

in which $R^1$ and $R^2$ each, independently of one another, denote H, an alkyl having 1 to 15 C atoms or alkenyl radical having 2 to 15 C atoms which is unsubstituted, monosubstituted by CN or $CF_3$ or at least monosubstituted by halogen, where, in addition, one or more $CH_2$ groups in these radicals may each be replaced by —O—, —S—,

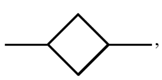

—C≡C—, —$CF_2$O—, —O$CF_2$—, —OC—O— or —O—CO— in such a way that 0 atoms are not linked directly to one another, a cyclopropyl ring, cyclobutyl ring or cyclopentyl ring, c denotes 1 or 2, and d denotes 2.

25. The liquid-crystalline medium according to claim 1, wherein the medium additionally comprises at least one compound selected from the group of the compounds of the formulae IC to IH;

IC

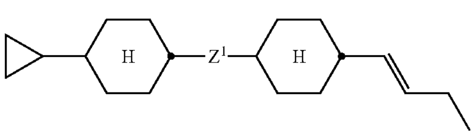

ID

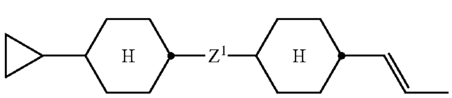

IE

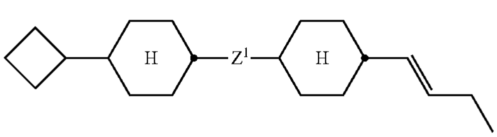

IF

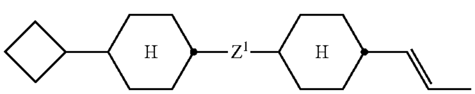

-continued

IG

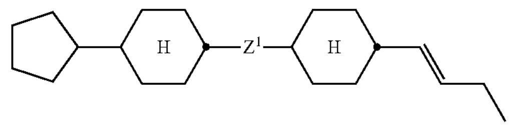

IH

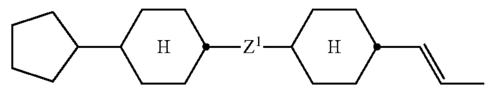

in which $Z^1$ denotes a single bond, —$CH_2CH_2$—, —CH═CH—, —$CH_2$O—, —O$CH_2$, —$CF_2$O—, —O$CF_2$—, —COO—, —OCO—, —$C_2F_4$—, —$(CH_2)_4$—, —CHFCHF—, —$CF_2CH_2$—, —$CH_2CF_2$—, —C≡C—, —CF═CF—, —CH═CHCHO— or —$CH_2CF_2$O—.

26. The liquid-crystalline medium according to claim 1, wherein the medium further comprises at least one compound of the selected from the compounds of the formulae BF-1 and BS-1:

BF-1

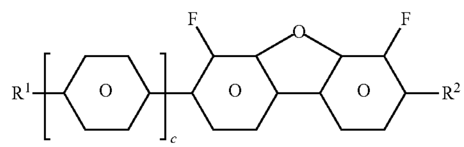

BS-1

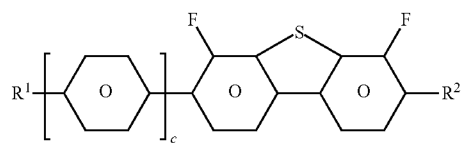

in which $R^1$ and $R^2$ each, independently of one another, denote H, an alkyl having 1 to 15 C atoms or alkenyl radical having 2 to 15 C atoms which is unsubstituted, monosubstituted by CN or $CF_3$ or at least monosubstituted by halogen, where, in addition, one or more $CH_2$ groups in these radicals may each be replaced by —O—, —S—,

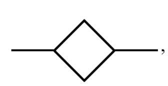

—C≡C—, —$CF_2$O—, —OC—O— or —O—CO— in such a way that O atoms are not linked directly to one another, a cyclopropyl ring, cyclobutyl ring or cyclopentyl ring, and c denotes 1 or 2.

27. The liquid-crystalline medium according to claim 1, wherein the medium further comprises one or more compounds of the formulae 11A-1 to IIC-1:

IIA-1
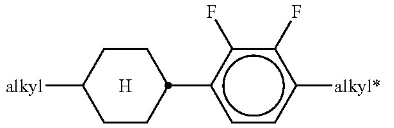
IIA-2
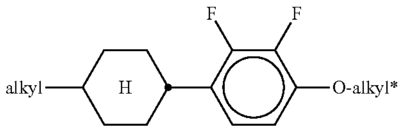
IIA-3
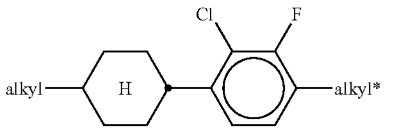
IIA-4
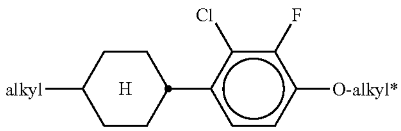
IIA-5
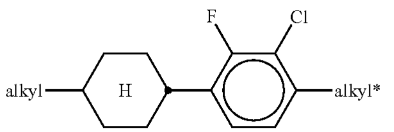
IIA-6
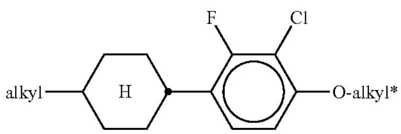
IIA-7
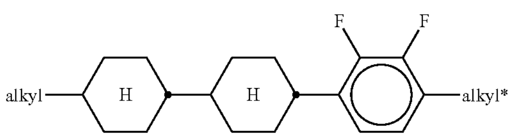
IIA-8
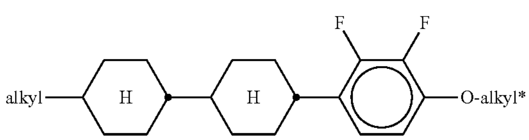
IIA-9
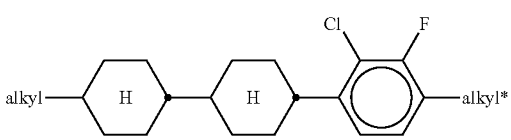
IIA-10
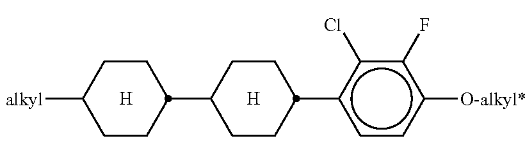
IIA-11
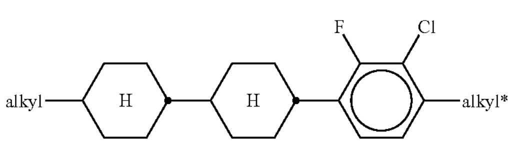
-continued
IIA-12
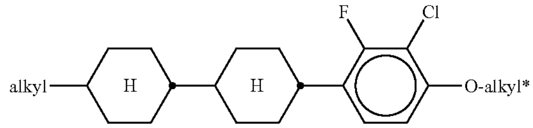
IIA-13
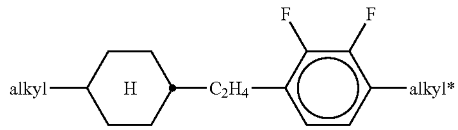
IIA-14
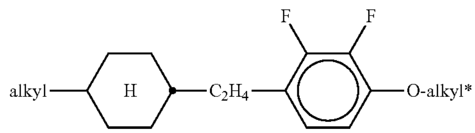
IIA-15
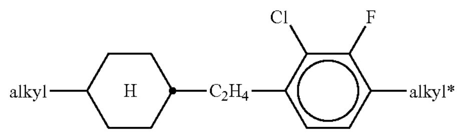
IIA-16
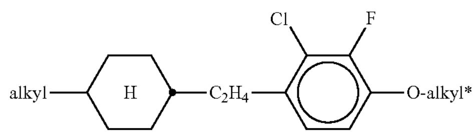
IIA-17
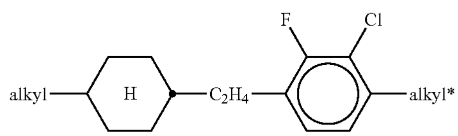
IIA-18
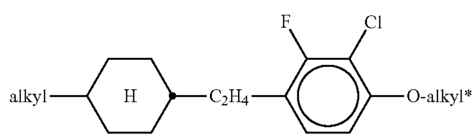
IIA-19
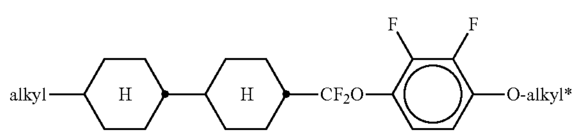
IIA-20
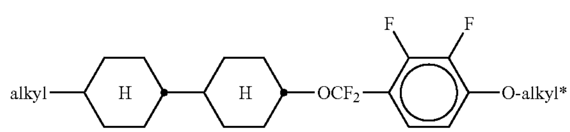
IIA-21
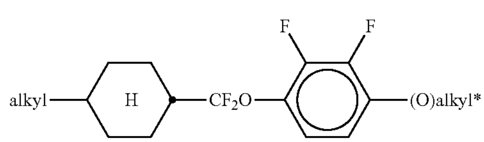

-continued
IIA-22
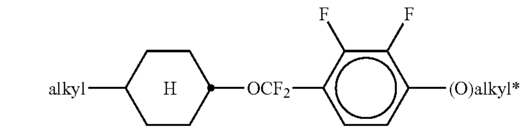
IIA-23
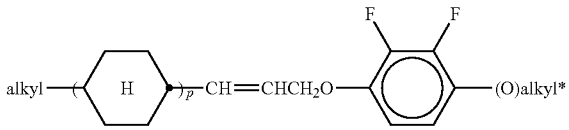
IIA-24
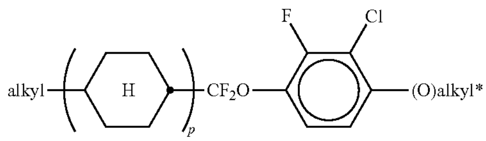
IIA-25
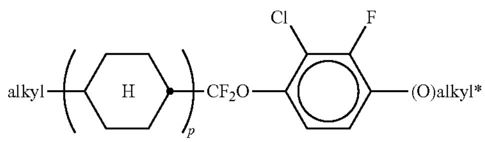
IIA-26
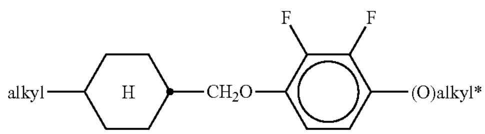
IIA-27
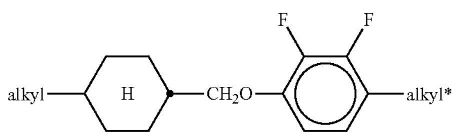
IIA-28
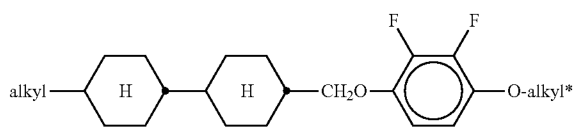
IIA-29
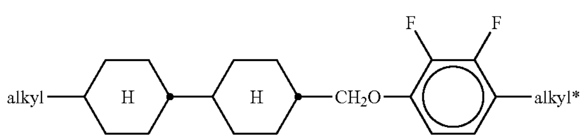
IIA-30
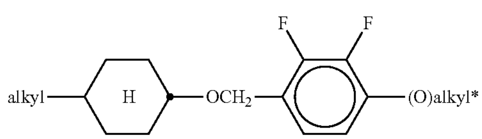
IIA-31
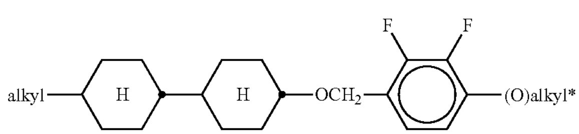
-continued
IIA-32
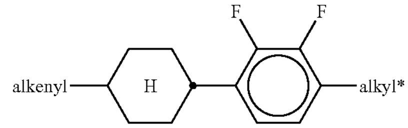
IIA-33
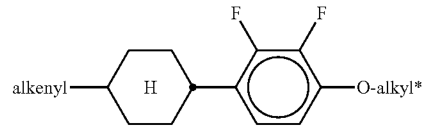
IIA-34
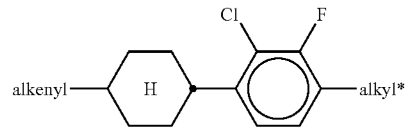
IIA-35
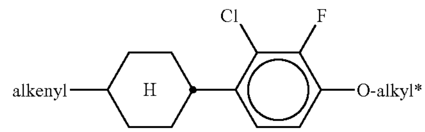
IIA-36
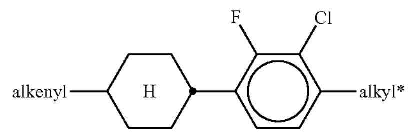
IIA-37
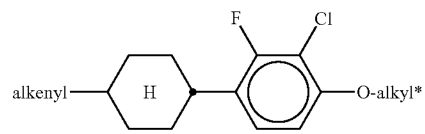
IIA-38
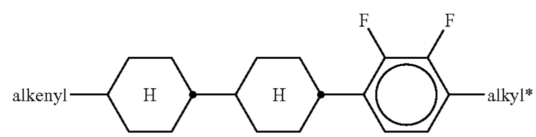
IIA-39
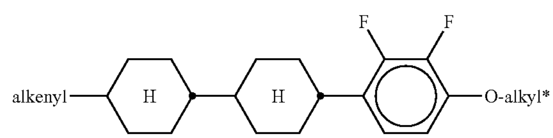
IIA-40
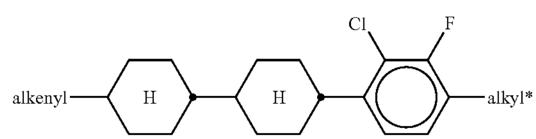
IIA-41
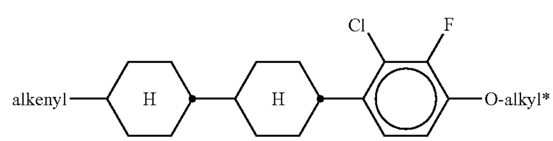
IIA-42
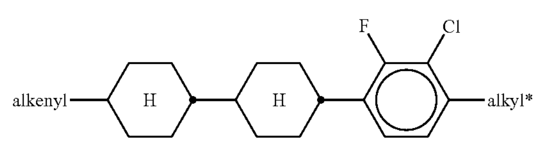

-continued
IIA-43
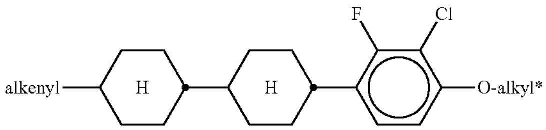
IIA-44
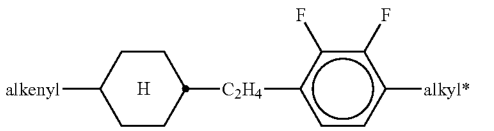
IIA-45
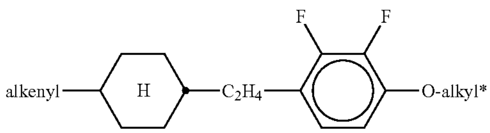
IIA-46
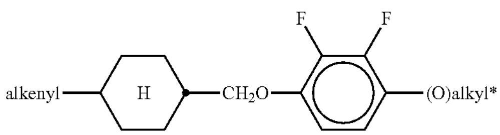
IIA-47
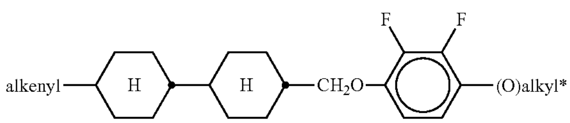
IIA-48
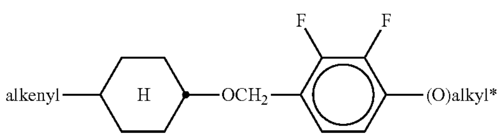
IIA-49
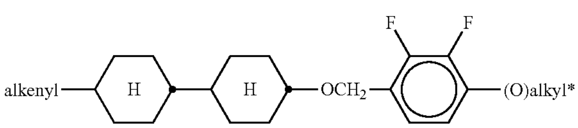
IIA-50
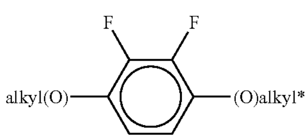
IIA-51
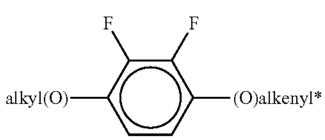
IIA-52
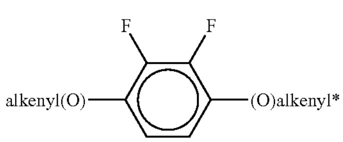
-continued
IIA-53
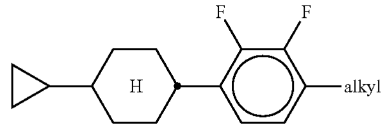
IIA-54
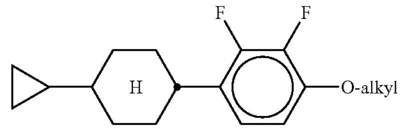
IIA-55
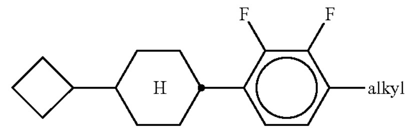
IIA-56
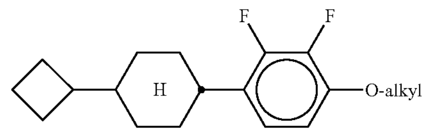
IIA-57
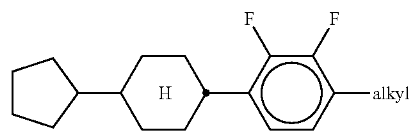
IIA-58
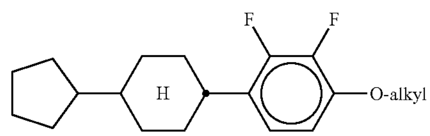
IIA-59
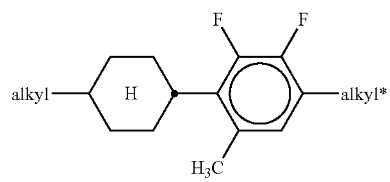
IIA-60
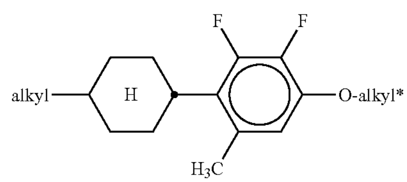
IIA-61
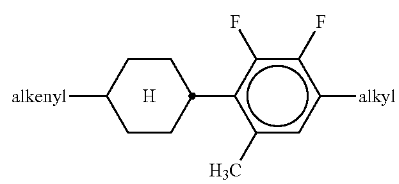
IIA-62
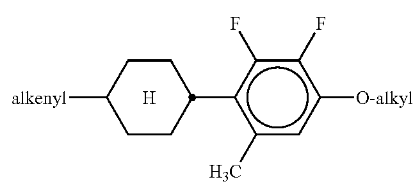

-continued
IIA-63
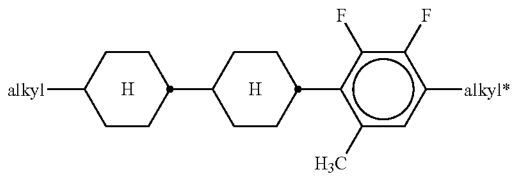
IIA-64
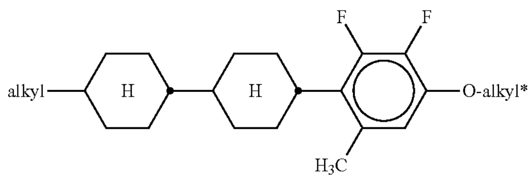
IIA-65
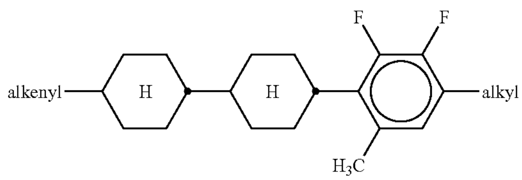
IIA-66
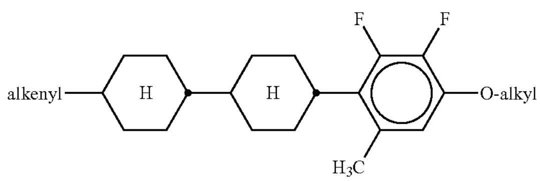
IIB-1
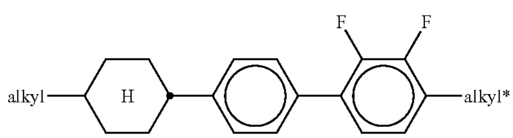
IIB-2
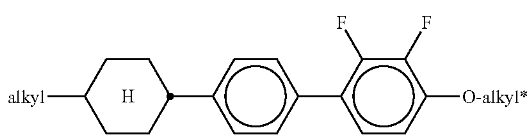
IIB-3
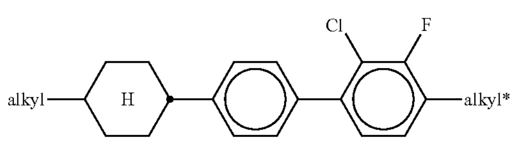
IIB-4
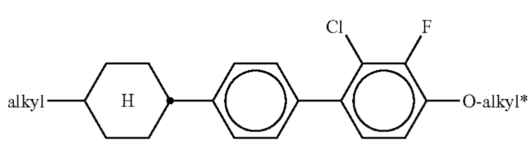
IIB-5
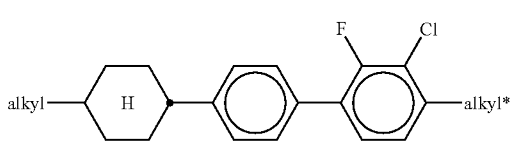
-continued
IIB-6
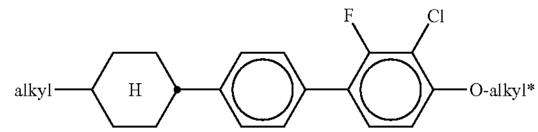
IIB-7
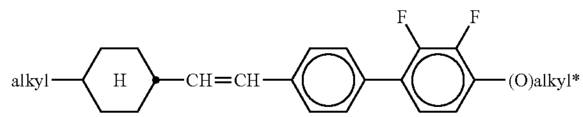
IIB-8
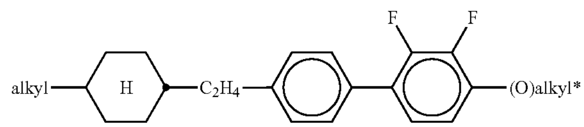
IIB-9
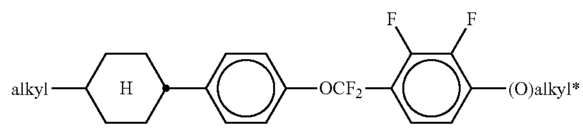
IIB-10
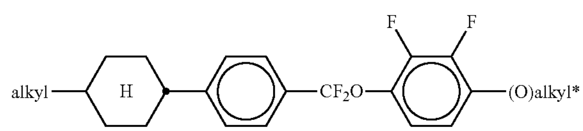
IIB-11
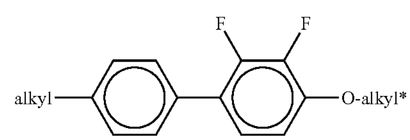
IIB-12
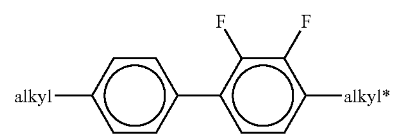
IIB-13
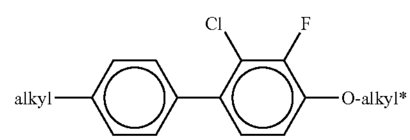
IIB-14
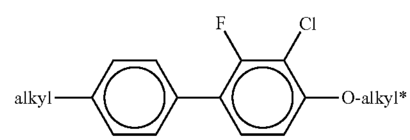
IIB-15
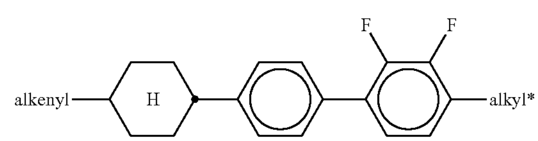
IIB-16
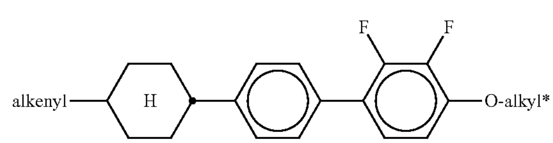

-continued
IIB-17
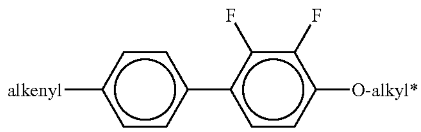
IIB-18
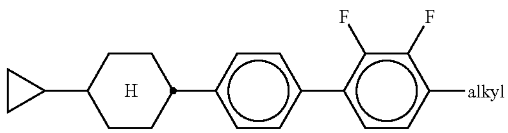
IIB-19
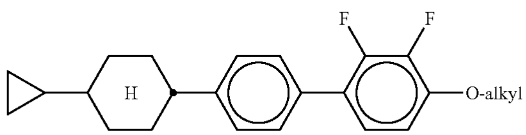
IIB-20
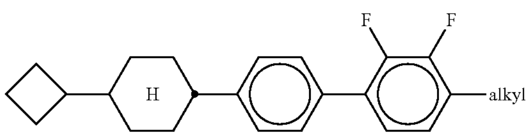
IIB-21
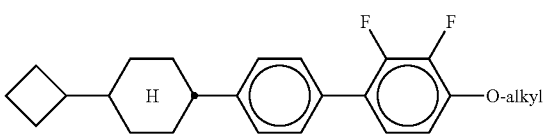
IIB-22
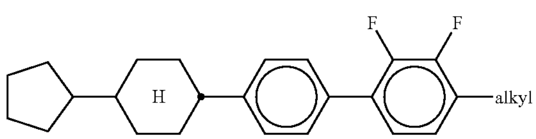
IIB-23
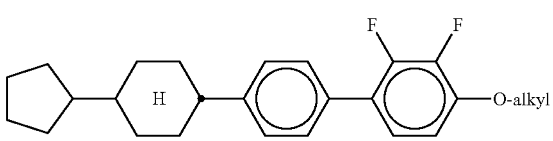
IIB-24
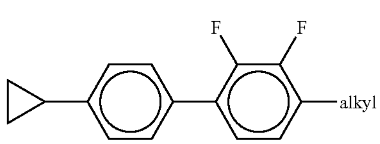
IIB-25
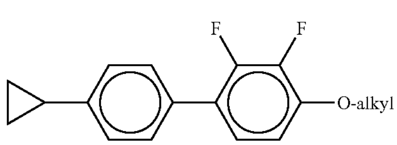
IIB-26
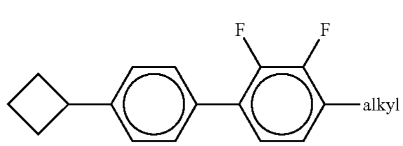
-continued
IIB-27
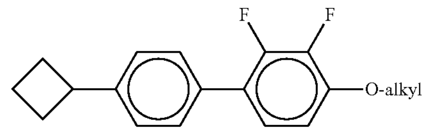
IIB-28
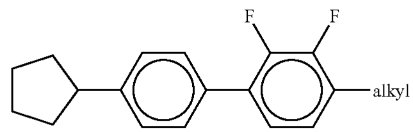
IIB-29
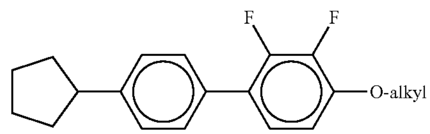
IIB-30
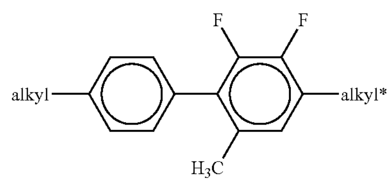
IIB-31
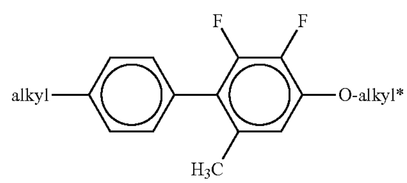
IIB-32
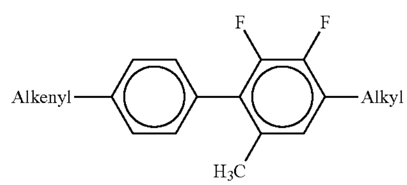
IIB-33
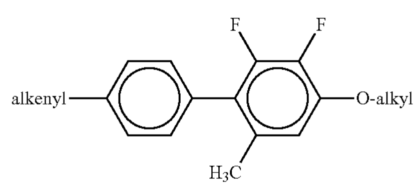
IIB-34
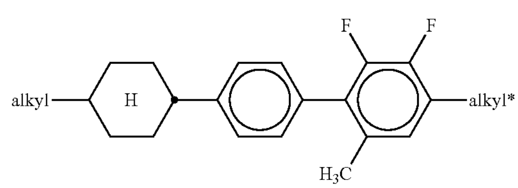
IIB-35
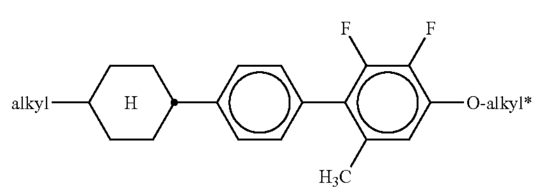

-continued

IIB-36

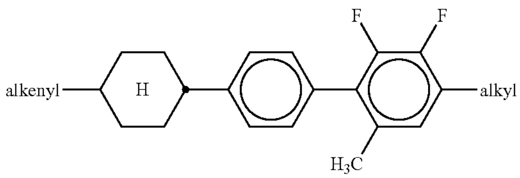

IIB-37

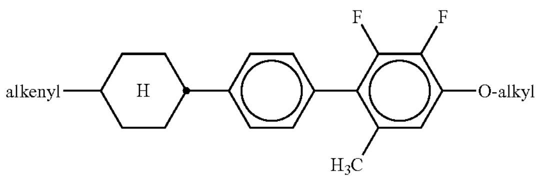

-continued

IIC-1

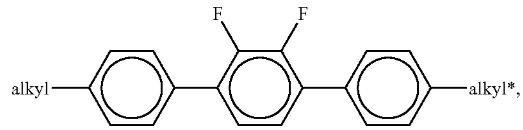

in which alkyl and alkyl* each, independently of one another, denote a straight-chain alkyl radical having 1-6 C atoms, and alkenyl and alkenyl* each, independently of one another, denote a straight-chain alkenyl radical having 2-6 C atoms.

28. The liquid-crystalline medium according to claim 1, wherein the medium further comprises one or more stabilizer compounds of the following formulae:

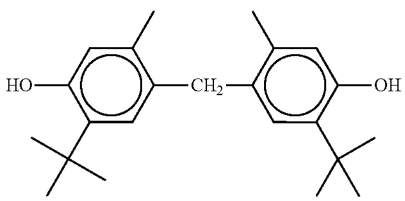

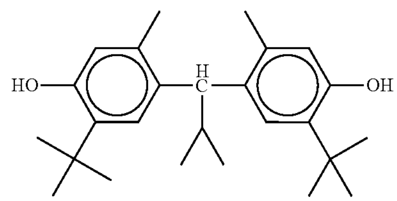

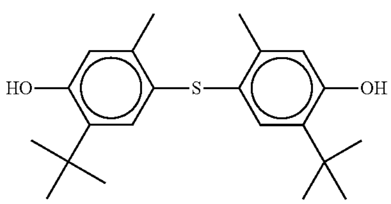

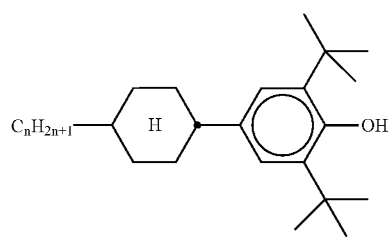

n = 1, 2, 3, 4, 5, 6 or 7

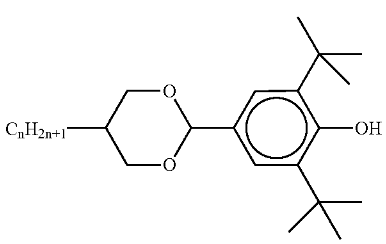

n = 1, 2, 3, 4, 5, 6 or 7

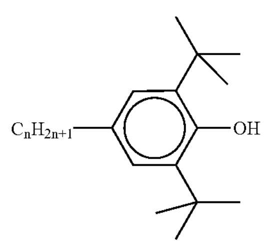

n = 1, 2, 3, 4, 5, 6 or 7

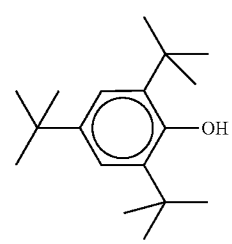

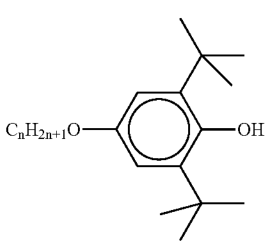

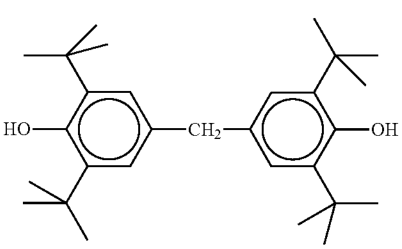

-continued
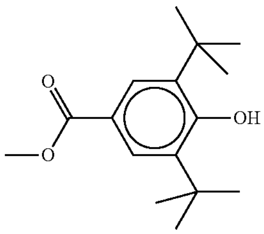
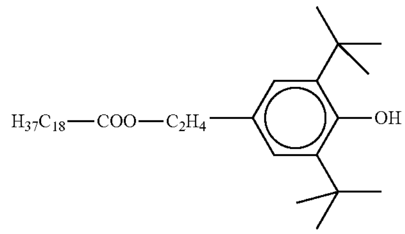
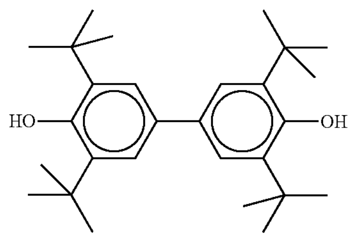
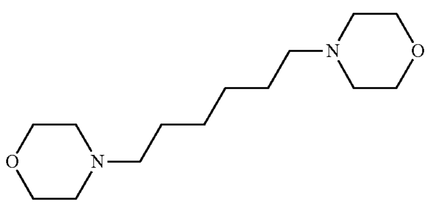
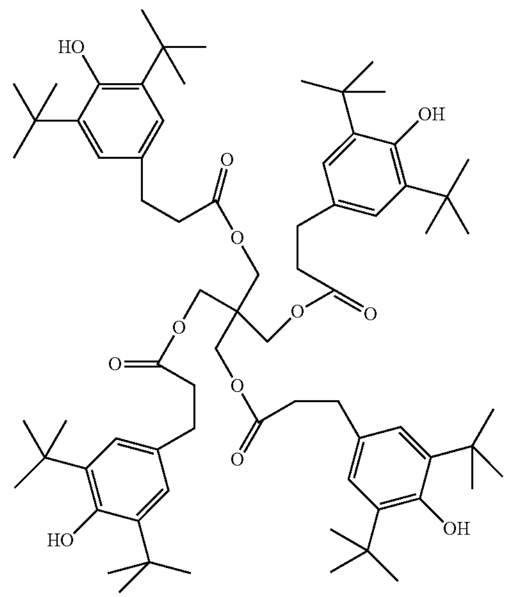
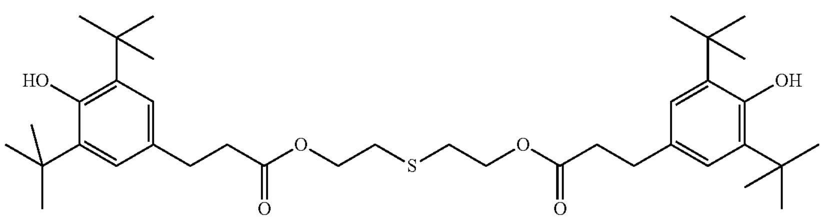
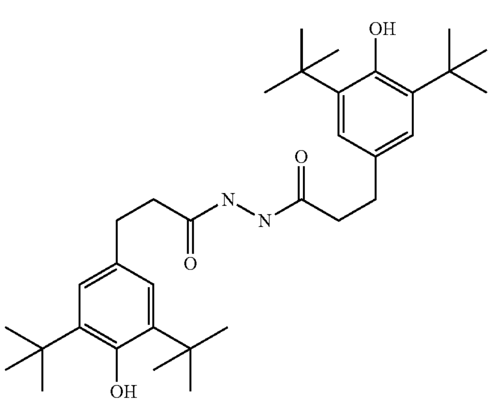
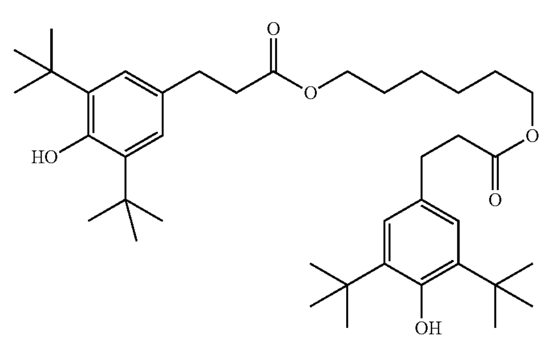

-continued
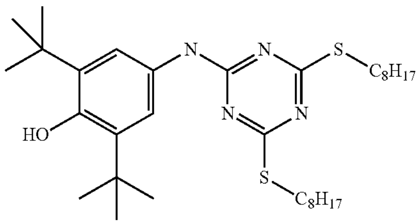
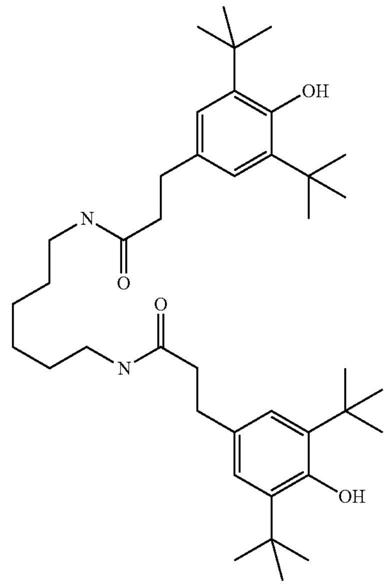
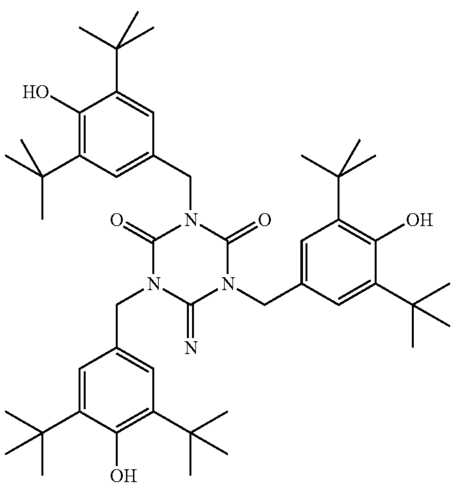
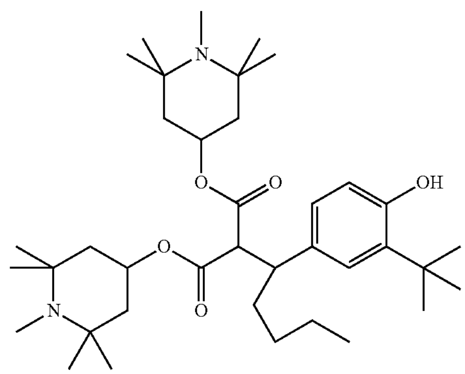
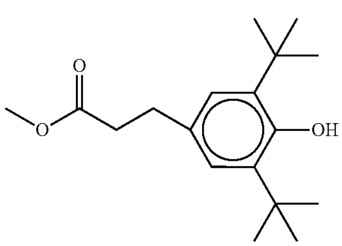
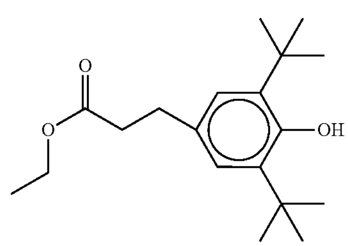
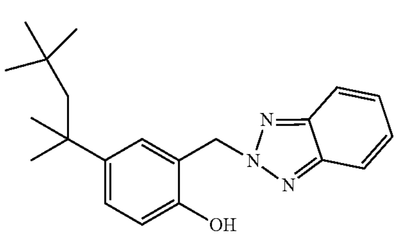
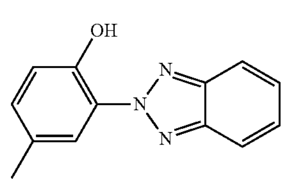

-continued
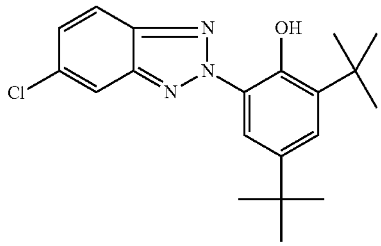
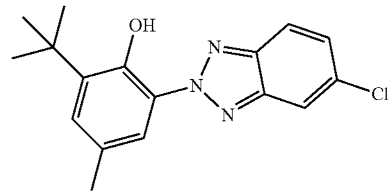
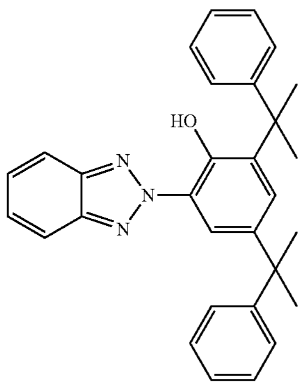
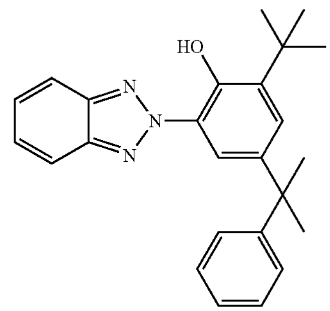
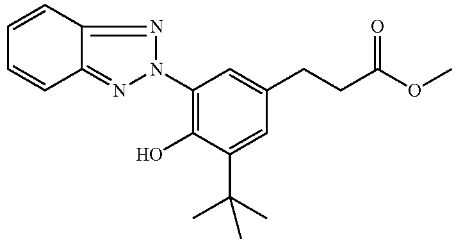
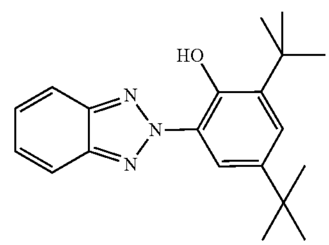
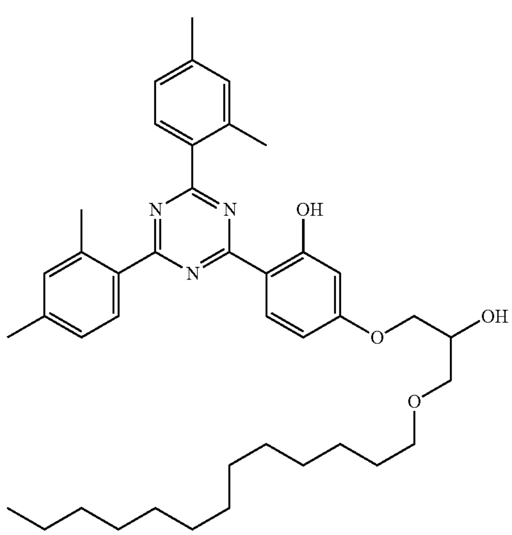
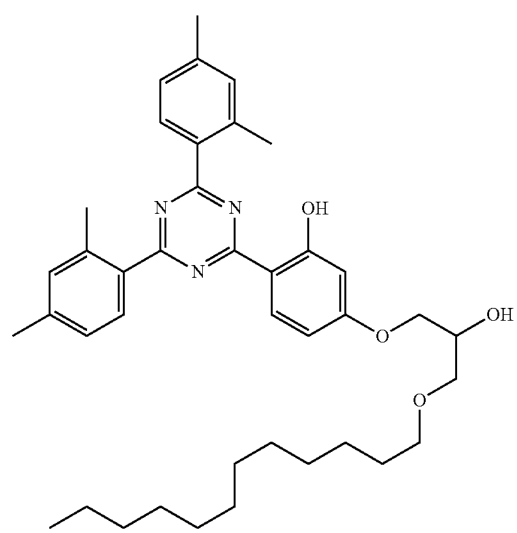

-continued
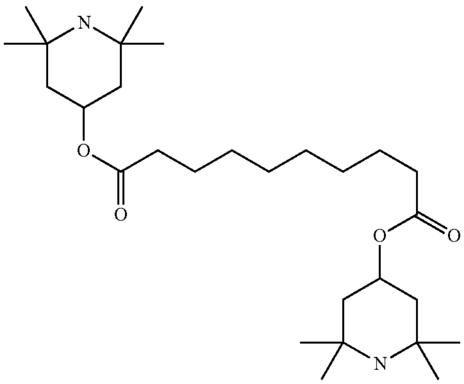
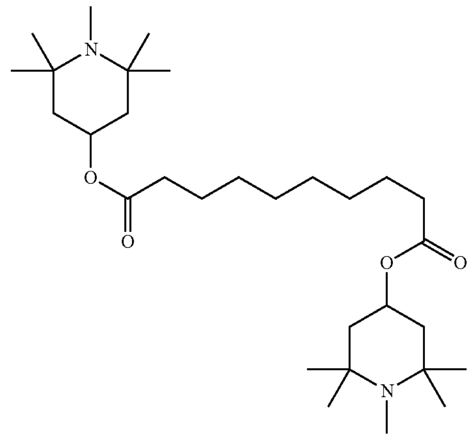
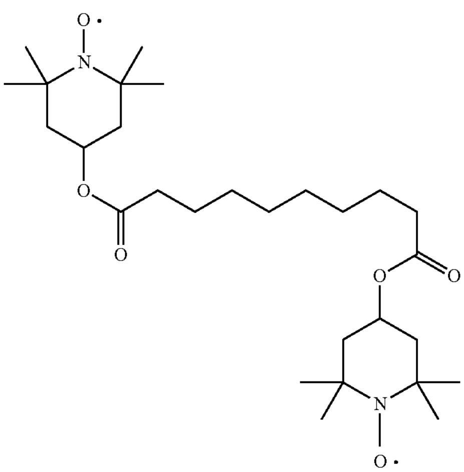
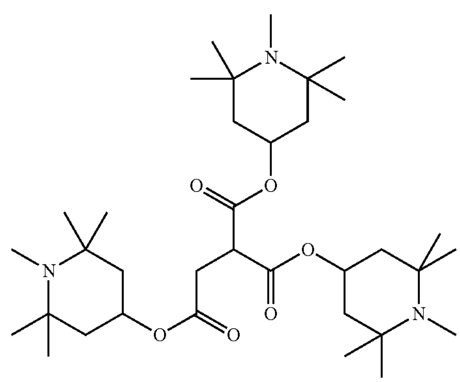
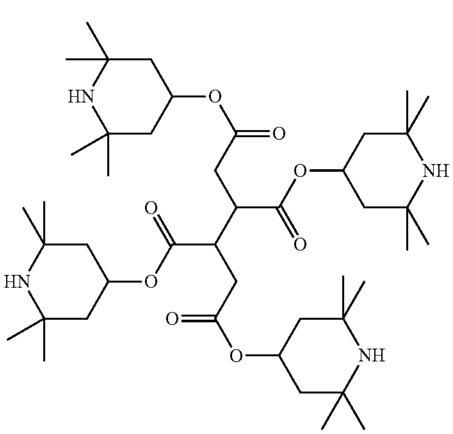
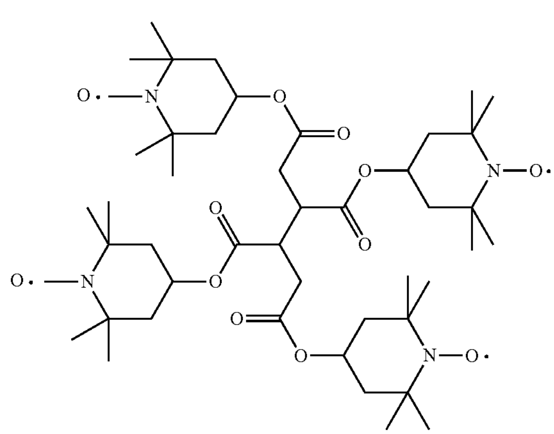

-continued
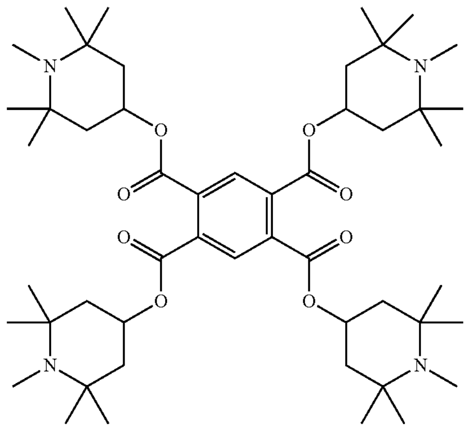
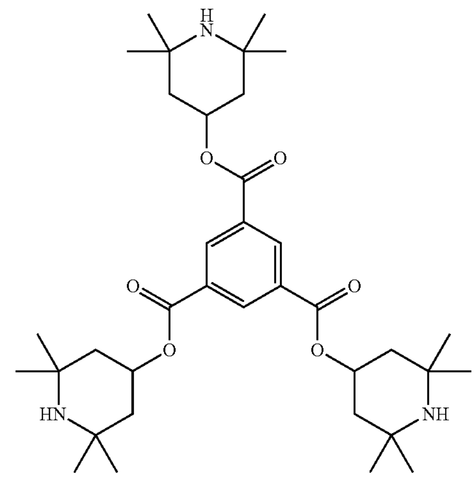
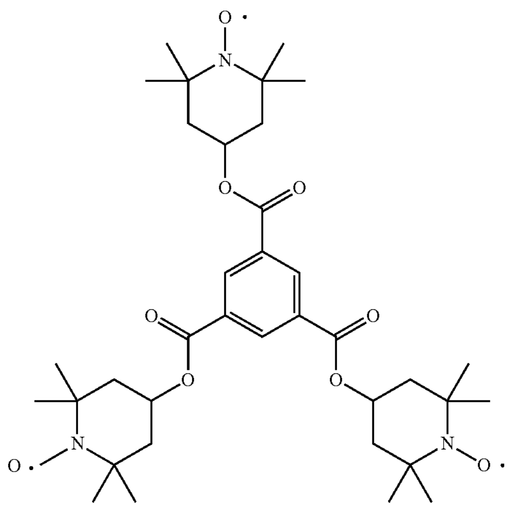
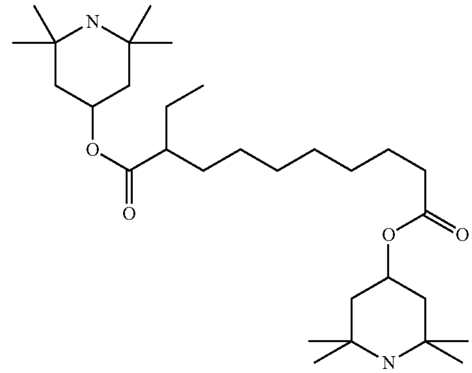
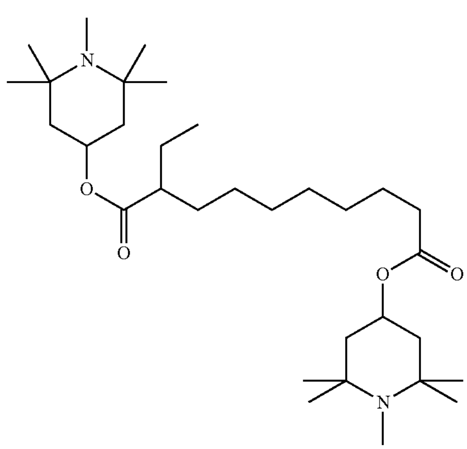

-continued
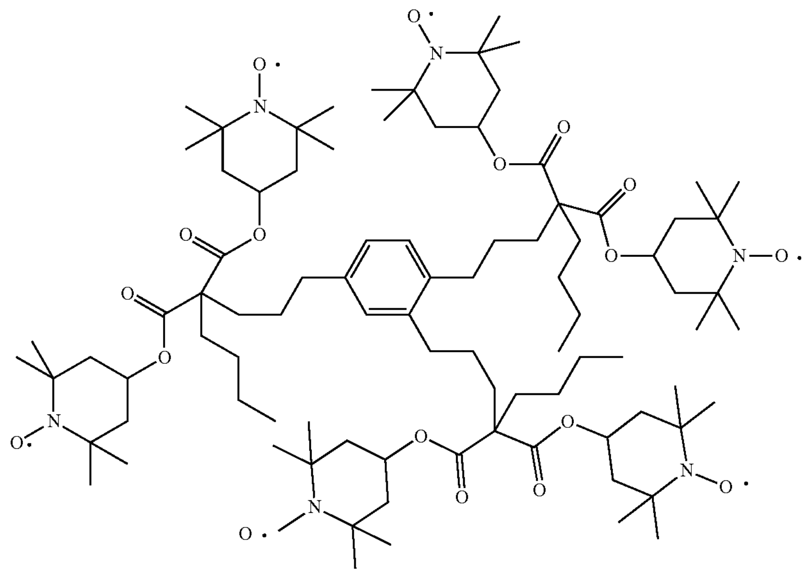
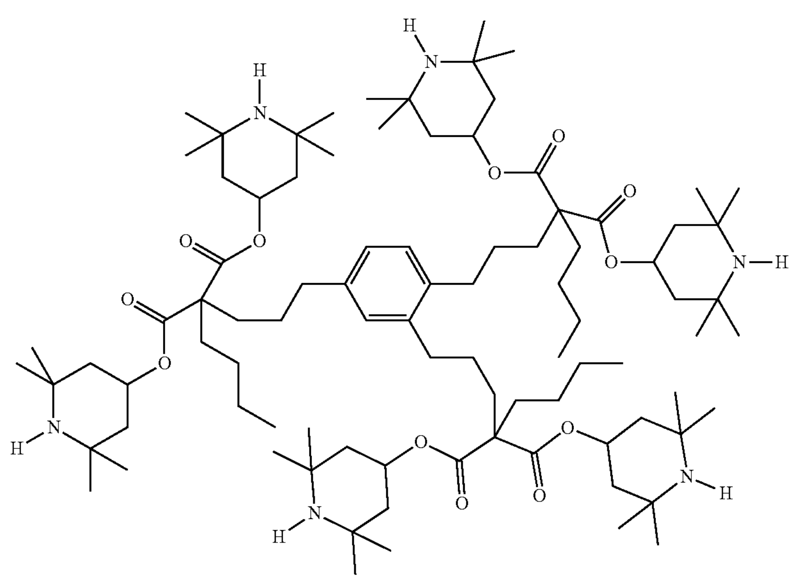

-continued
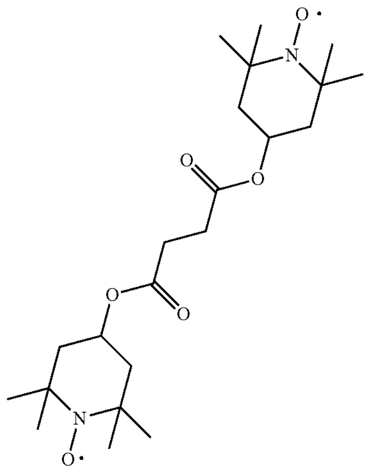
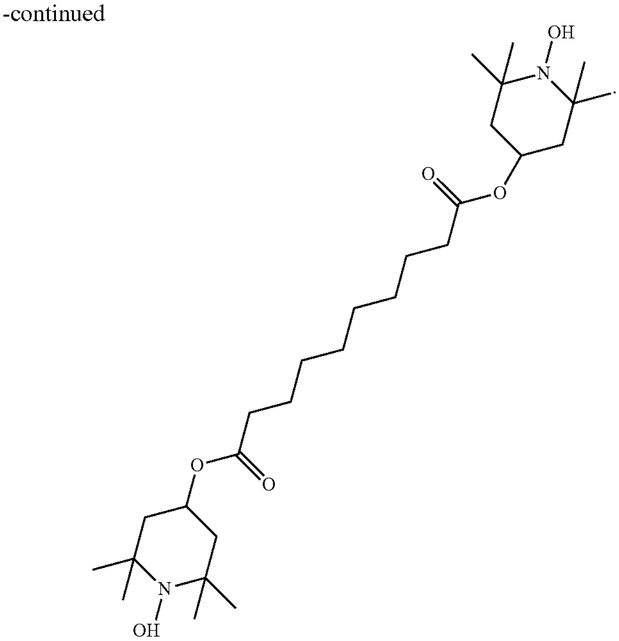
29. The liquid-crystalline medium according to claim 1, wherein the medium further comprises one or more reactive mesogen compounds of the following formulae:
RM-1
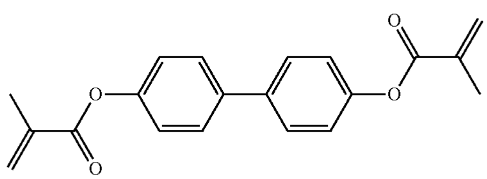
RM-2
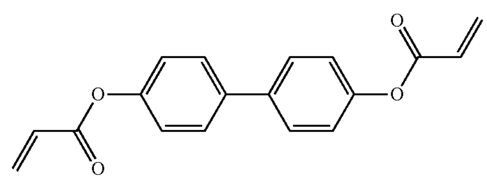
RM-4
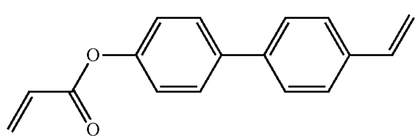
RM-3
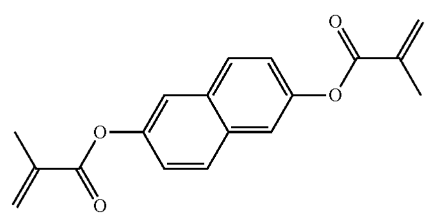
RM-5
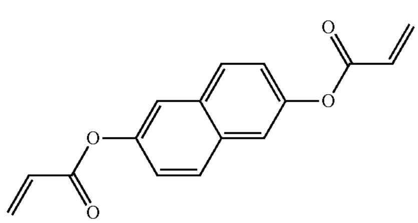
RM-6
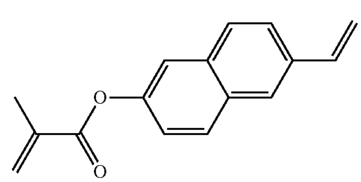
RM-7
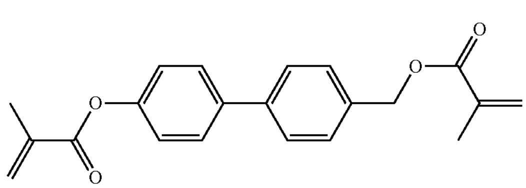
RM-8
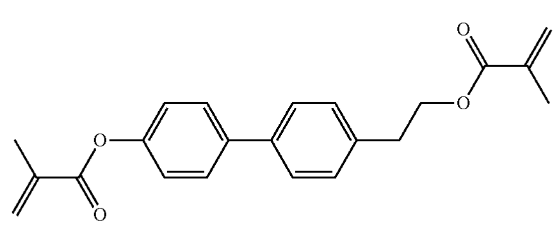

-continued
RM-9
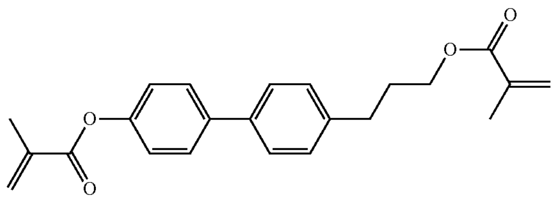
RM-10
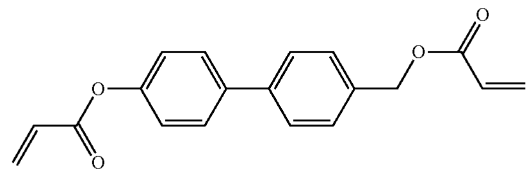
RM-11
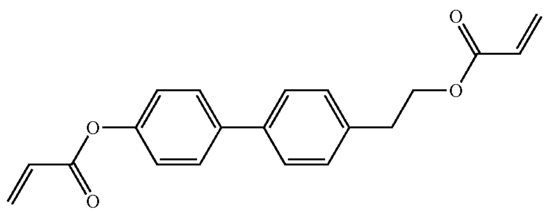
RM-12
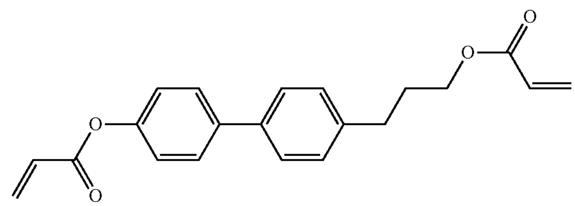
RM-13
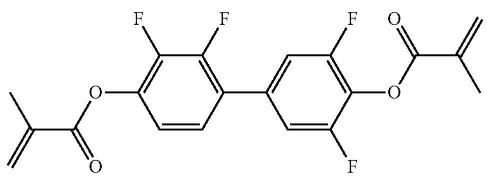
RM-14
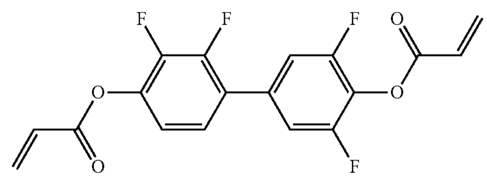
RM-15
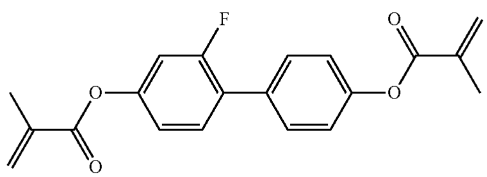
RM-16
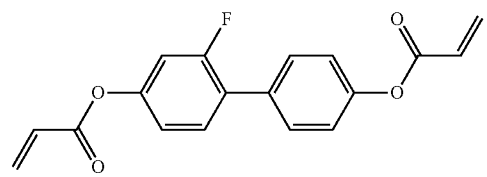
RM-17
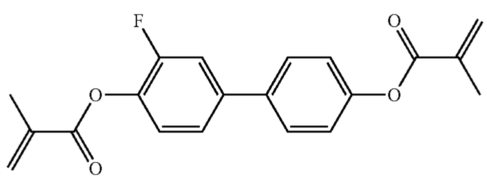
RM-18
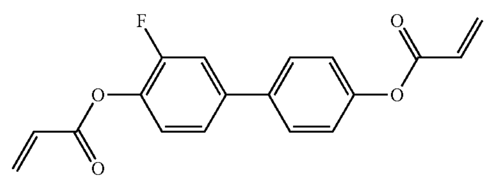
RM-19
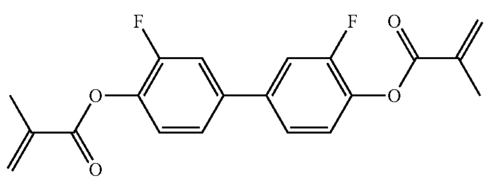
RM-20
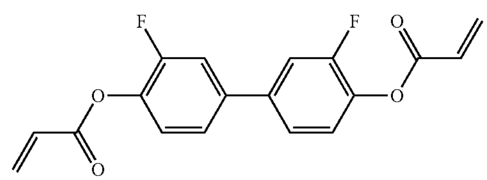
RM-21
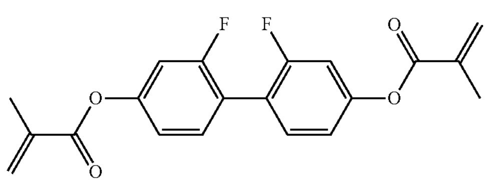
RM-22
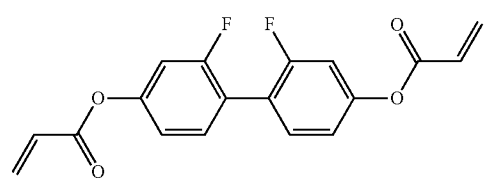
RM-23
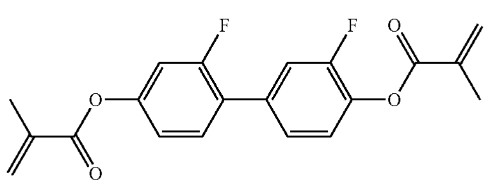
RM-24
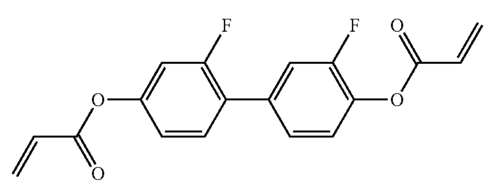

-continued
RM-25
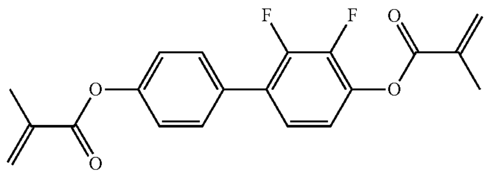
RM-26
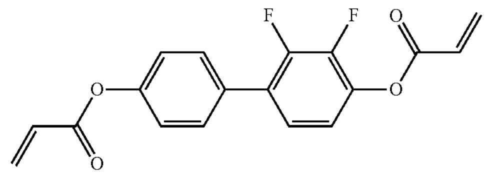
RM-27
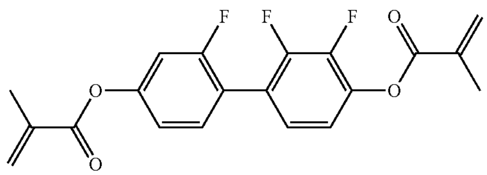
RM-28
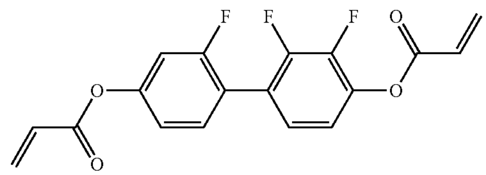
RM-29
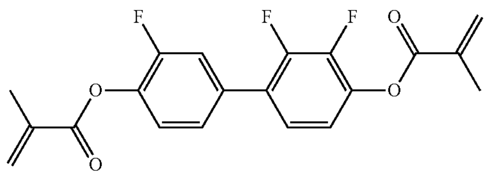
RM-30
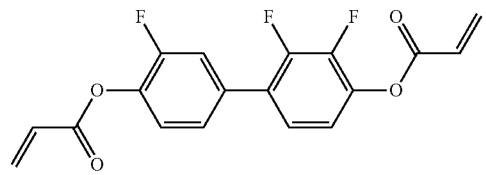
RM-31
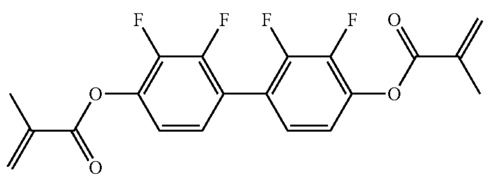
RM-32
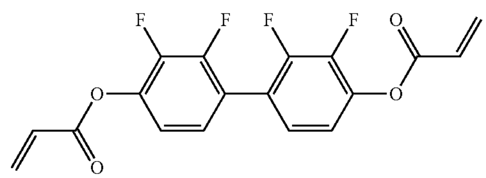
RM-33
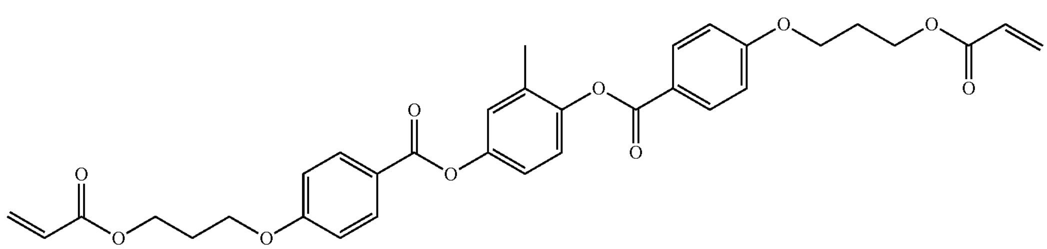
RM-34
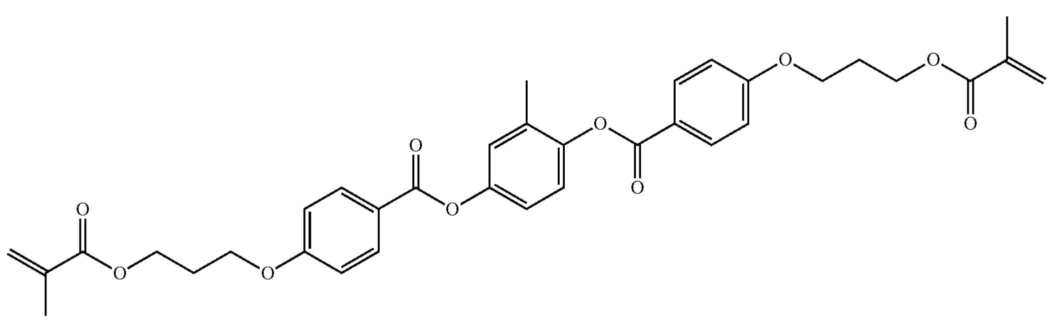
RM-35
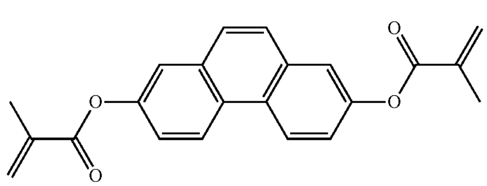
RM-36
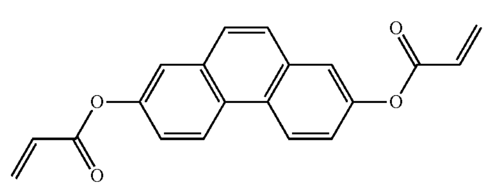

-continued
RM-37
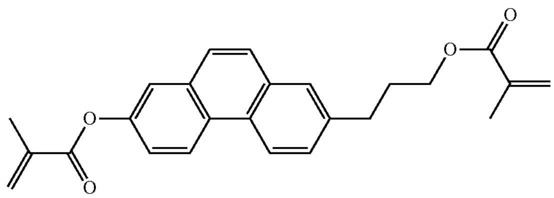
RM-38
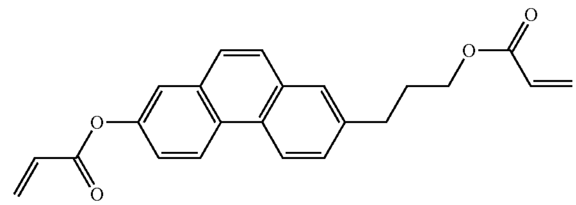
RM-39
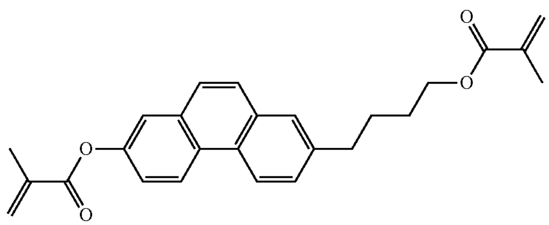
RM-40
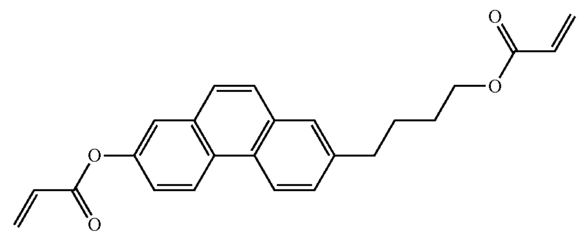
RM-41
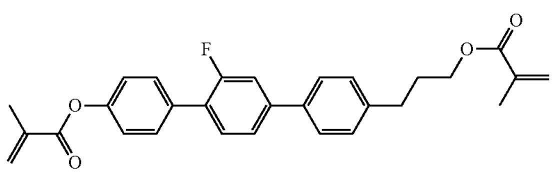
RM-42
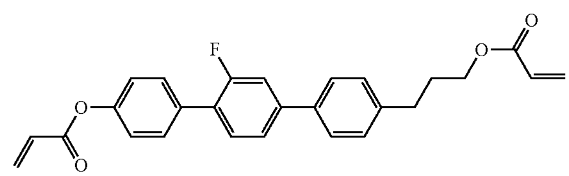
RM-43
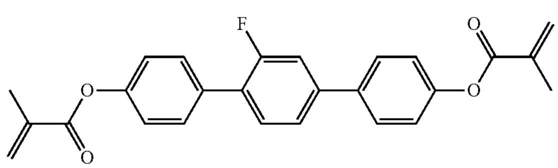
RM-44
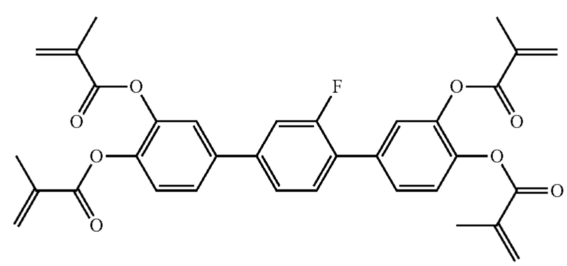
RM-45
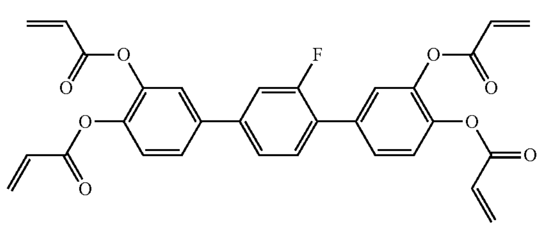
RM-46
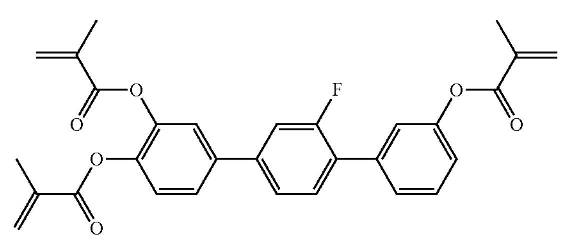
RM-47
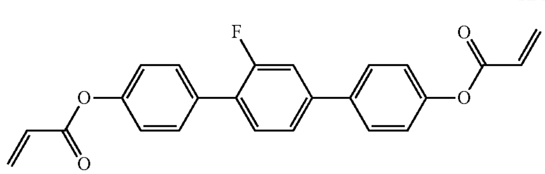
RM-48
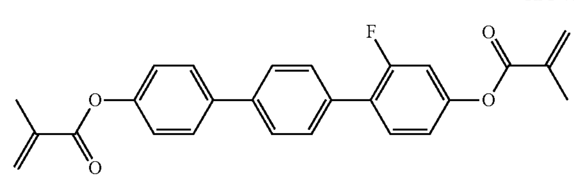
RM-49
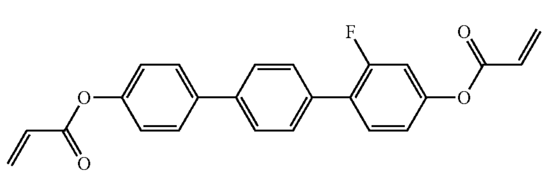
RM-50
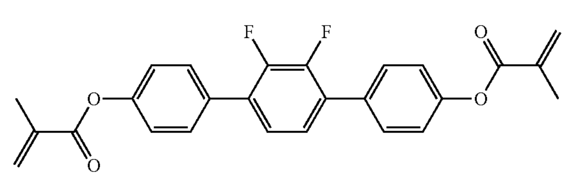

-continued
RM-51
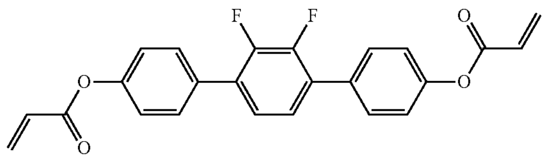
RM-53
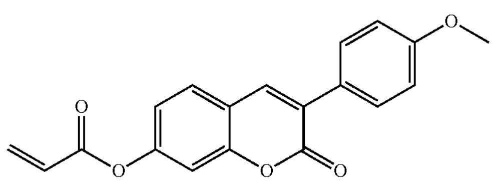
RM-55
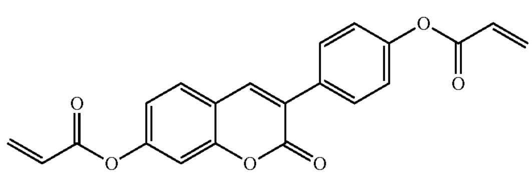
RM-57
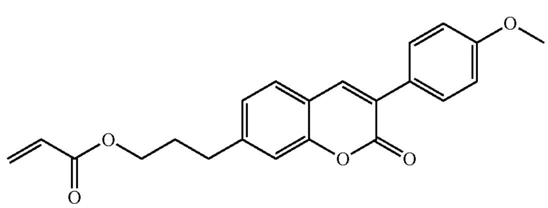
RM-59
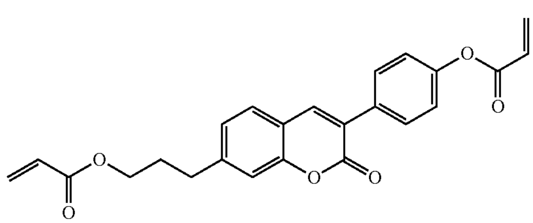
RM-61
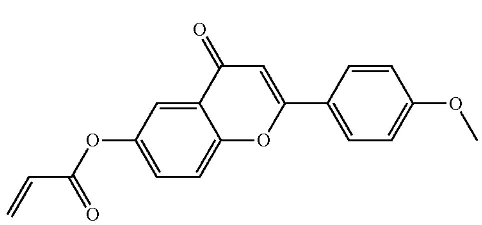
RM-52
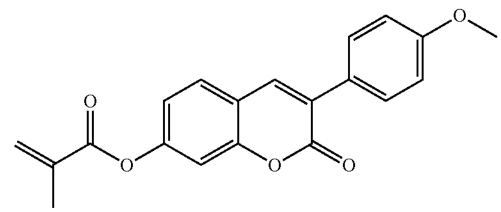
RM-54
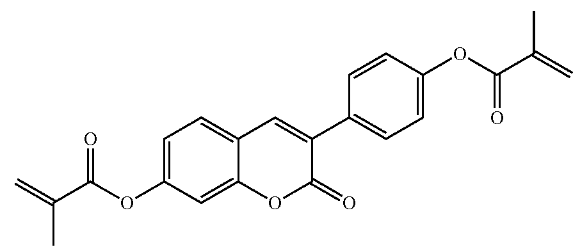
RM-56
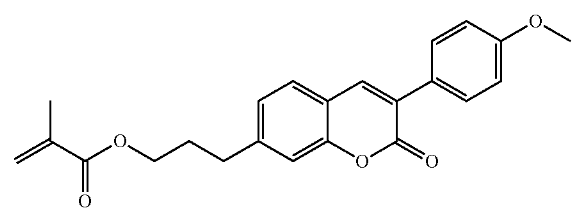
RM-58
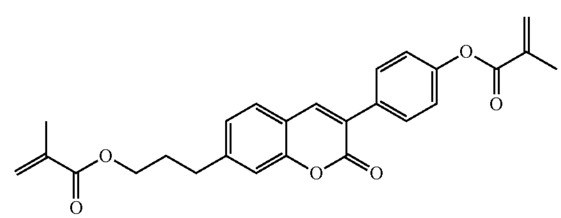
RM-60
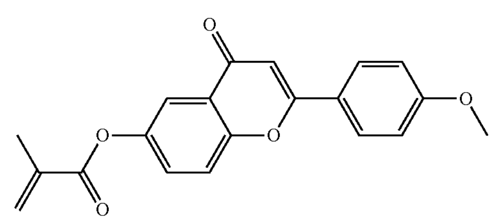
RM-62
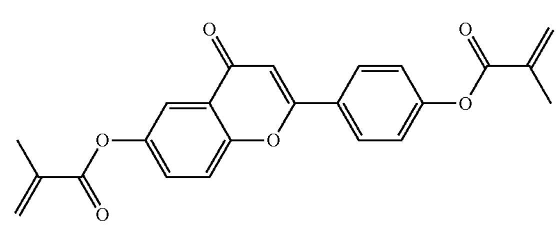

-continued
RM-63
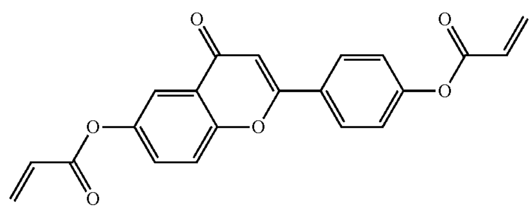
RM-64
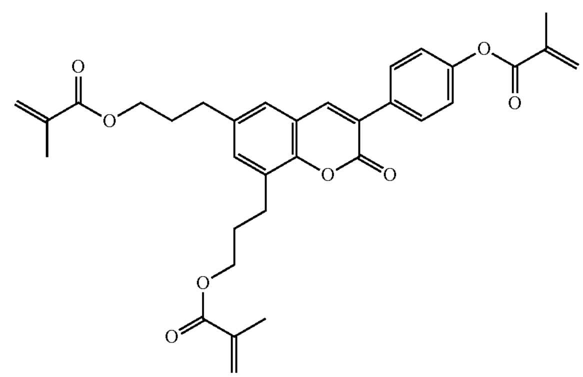
RM-65
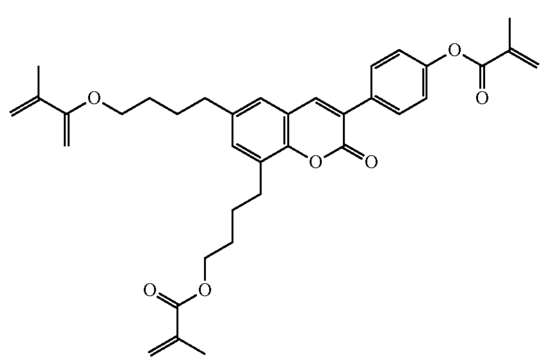
RM-66
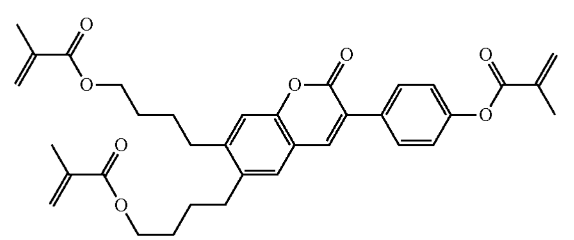
RM-67
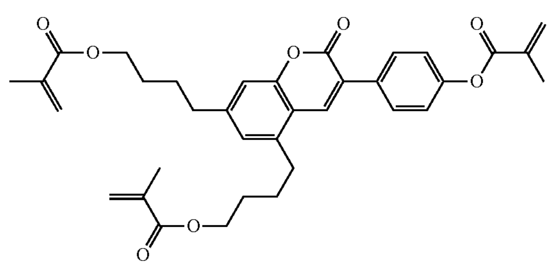
RM-68
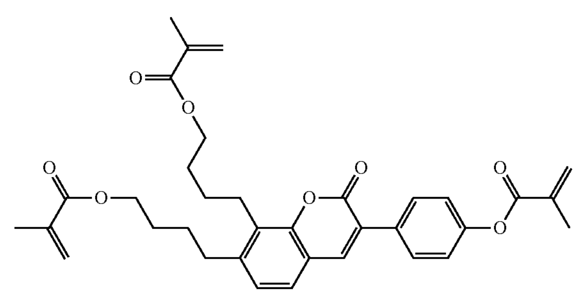
RM-69
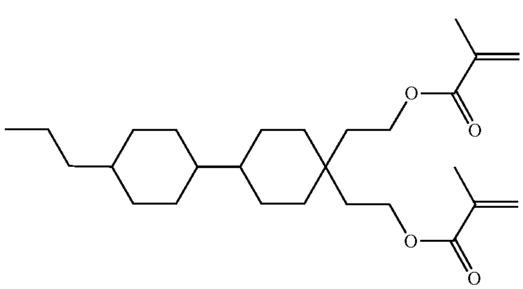
RM-70
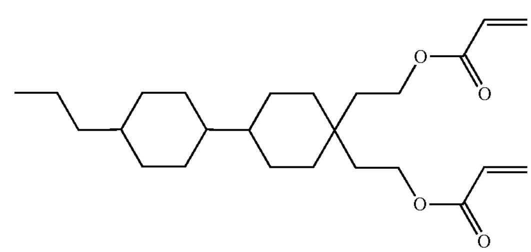
RM-71
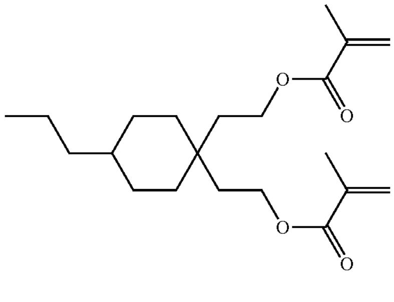
RM-72
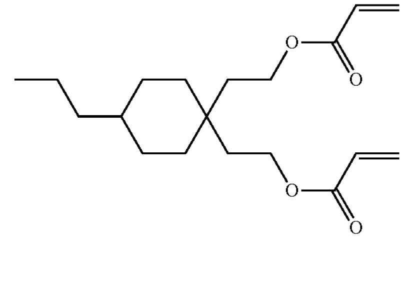

-continued
RM-73
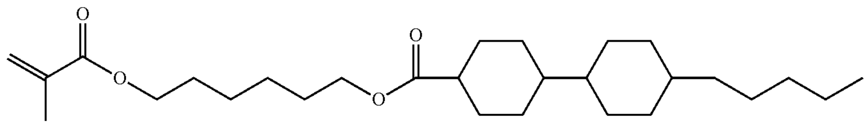
RM-74
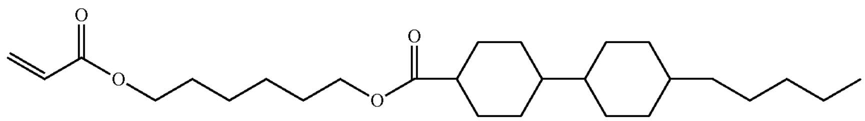
RM-75
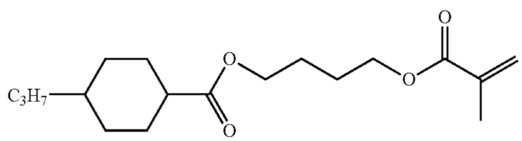
RM-76
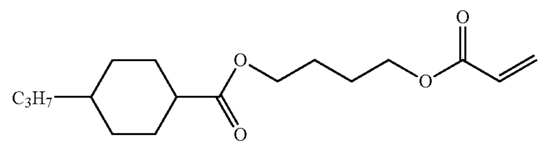
RM-77
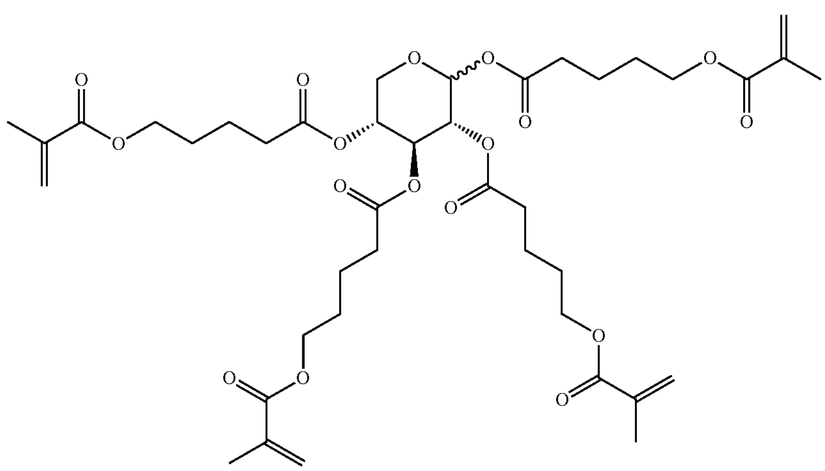
RM-78
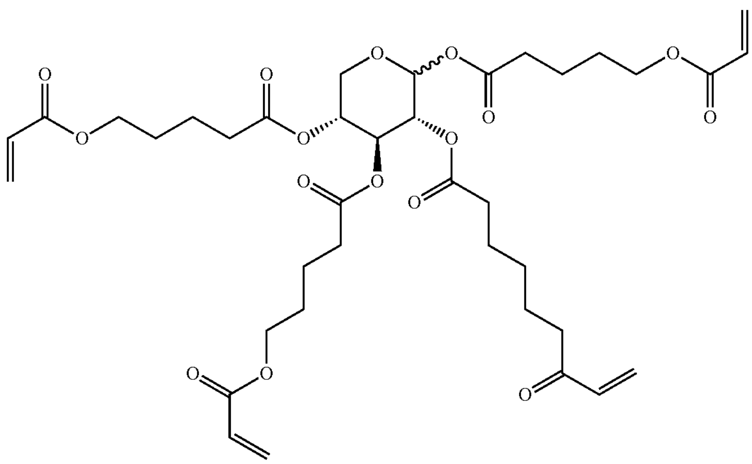

-continued
RM-79
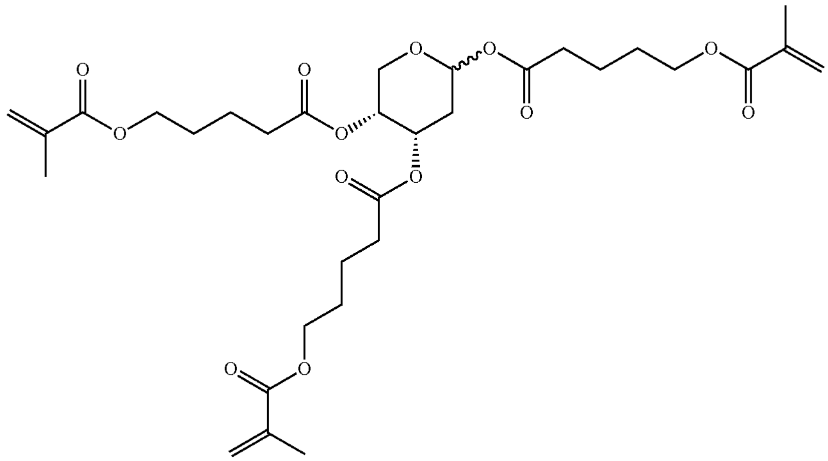
RM-80
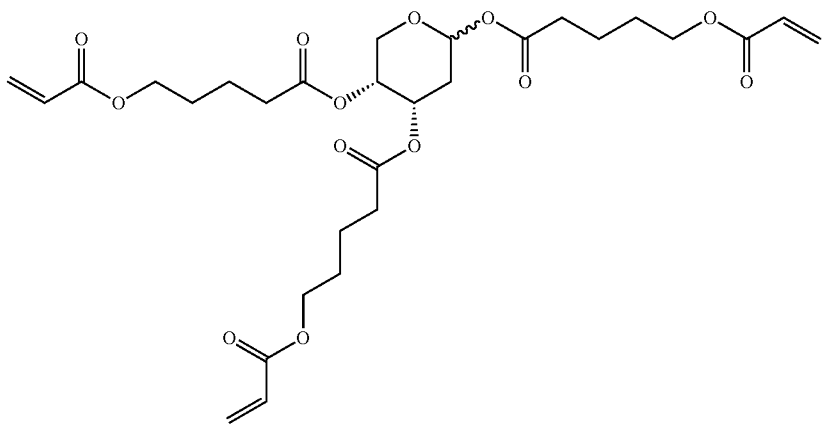
RM-80
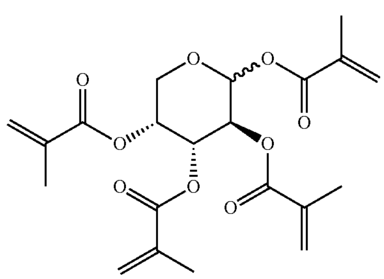
RM-82
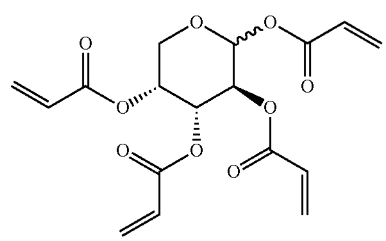
RM-83
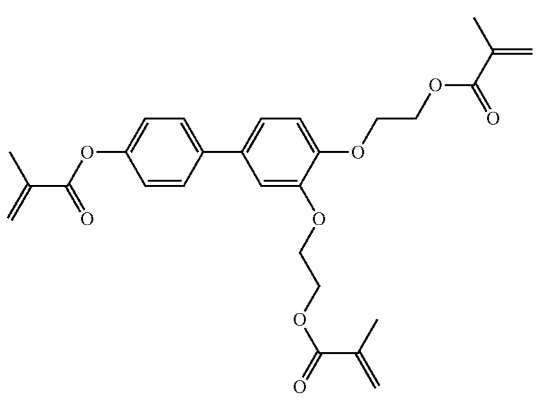
RM-84
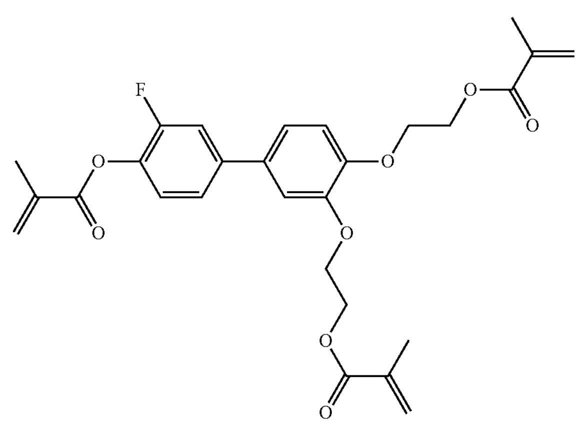

-continued
RM-85
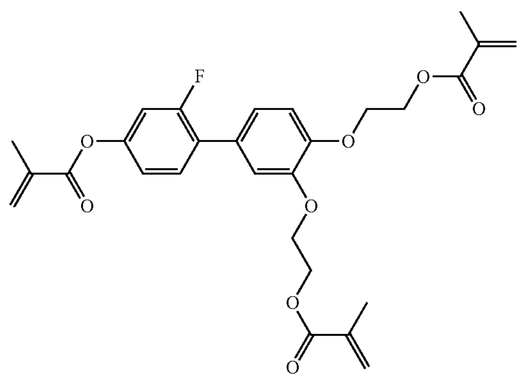
RM-86
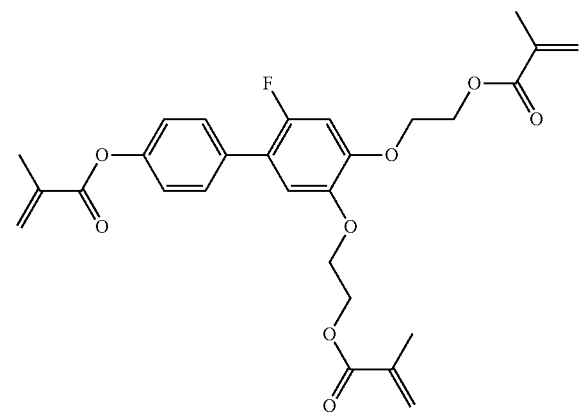
RM-87
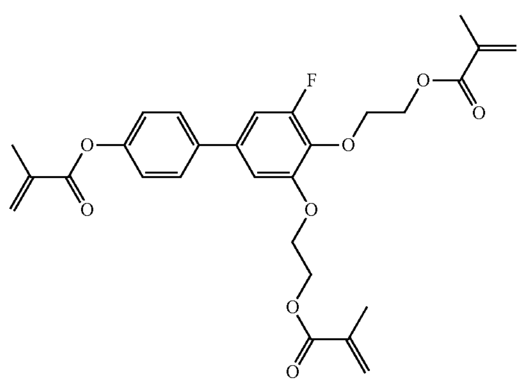
RM-88
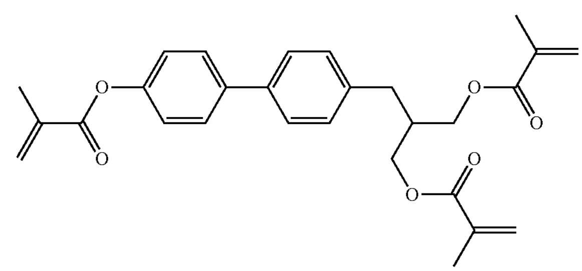
RM-89
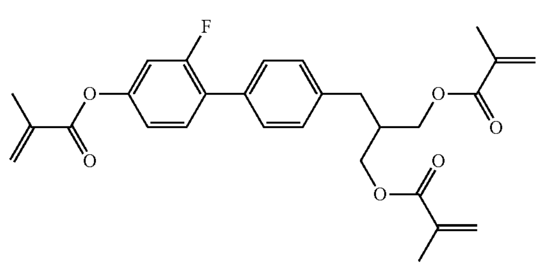
RM-90
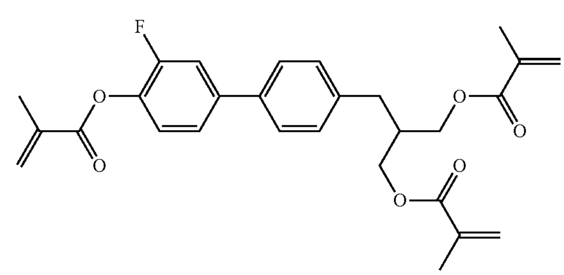
RM-91
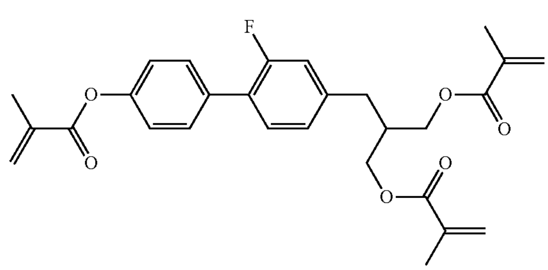
RM-92
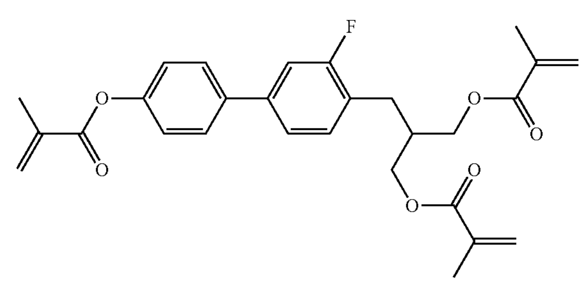

-continued
RM-93
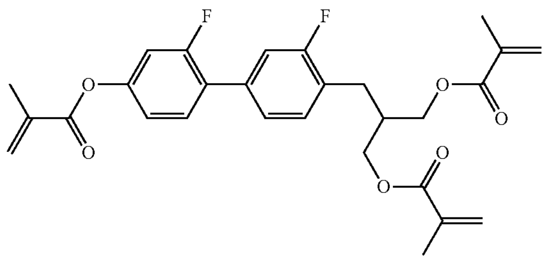
RM-94
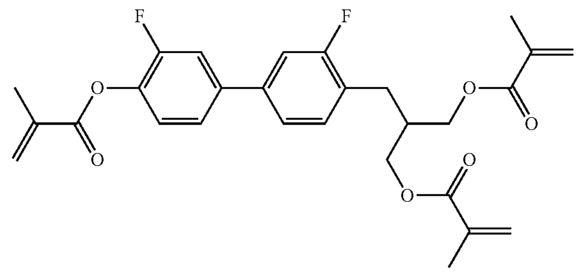
RM-95
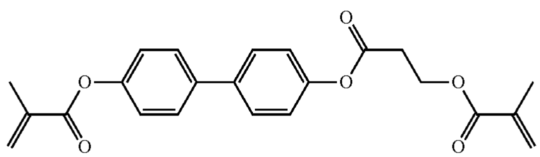
RM-96
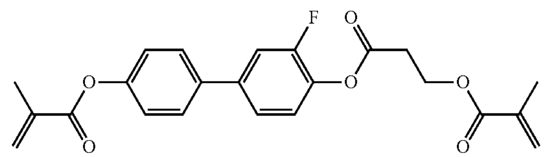
RM-97
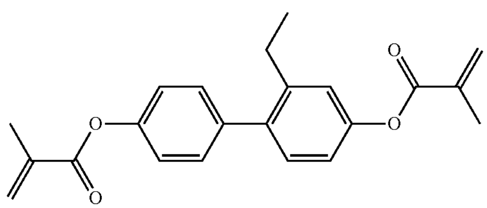
RM-98
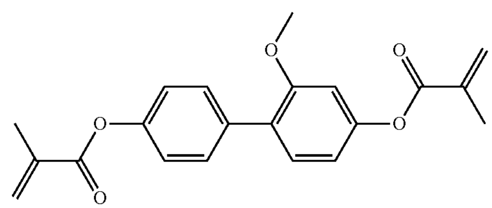
RM-99
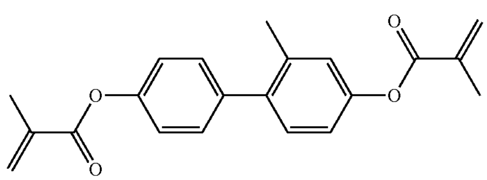
RM-100
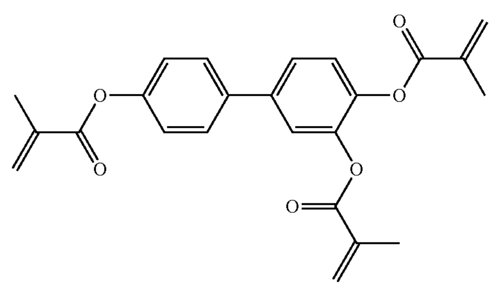
RM-101
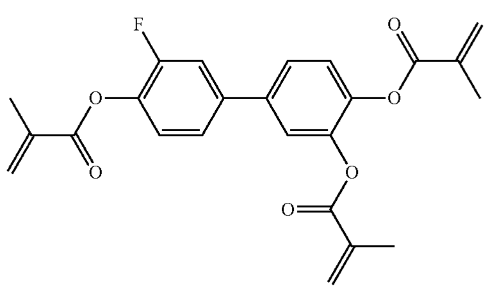
RM-102
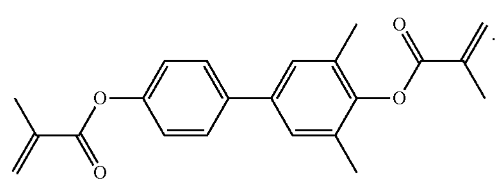

30. The liquid-crystalline medium according to claim 1, wherein the medium further comprises one or more SA-VA compounds of the following formulae:

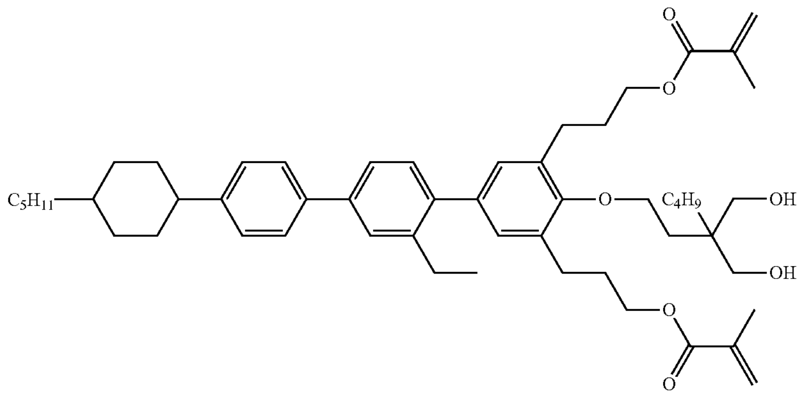

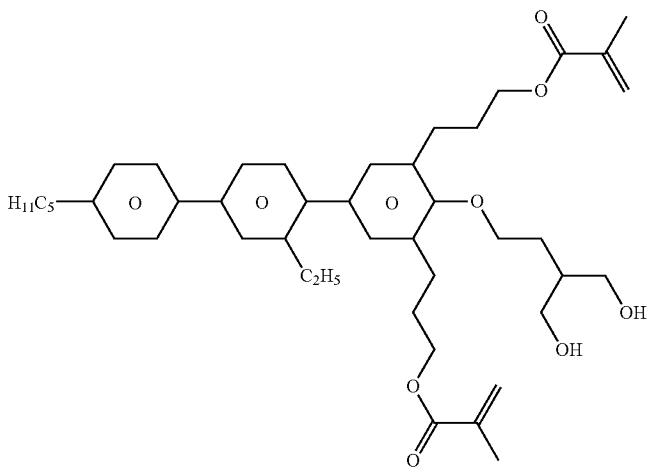

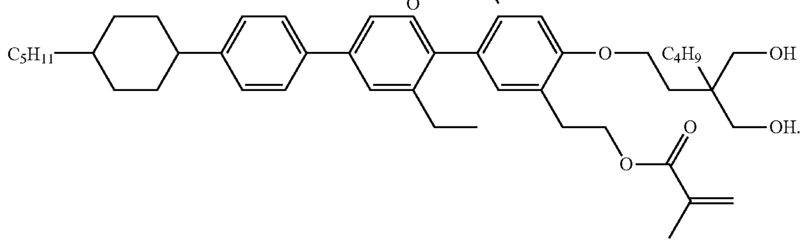

31. The liquid-crystalline medium according to claim 1, wherein said medium contains at least one compound of formulae IB.

32. The liquid-crystalline medium according to claim 3, wherein the medium further comprises the compound of the formula CC-3-V1:

CC-3-VI

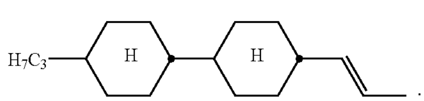

33. The liquid-crystalline medium according to claim 1, wherein the medium further comprises at least one compound of formula PP-n-m, PP-n-m

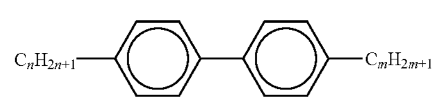

wherein n and m are each 1, 2, 3, 4, 5, or 6.

34. The liquid-crystalline medium according to claim 3, wherein the medium further comprises at least one compound selected from formulae CCH-nm and CCH-nOm, CCH-nm

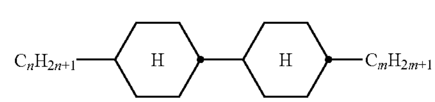

-continued
CCH-nOm
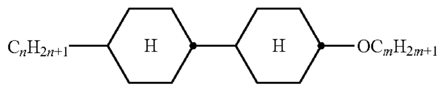
wherein n and m are each 1, 2, 3, 4, 5, or 6.
* * * * *